United States Patent
Hunt et al.

(10) Patent No.: US 12,521,451 B2
(45) Date of Patent: Jan. 13, 2026

(54) CRISPR AND AAV STRATEGIES FOR X-LINKED JUVENILE RETINOSCHISIS THERAPY

(71) Applicant: Regeneron Pharmaceuticals, Inc., Tarrytown, NY (US)

(72) Inventors: Charleen Hunt, Montvale, NJ (US); Yang Liu, Valhalla, NY (US); Guochun Gong, Pleasantville, NY (US); Carmelo Romano, Tarrytown, NY (US); Brian Zambrowicz, Sleepy Hollow, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 925 days.

(21) Appl. No.: 17/774,284

(22) PCT Filed: Nov. 7, 2020

(86) PCT No.: PCT/US2020/059568
§ 371 (c)(1),
(2) Date: May 4, 2022

(87) PCT Pub. No.: WO2021/092513
PCT Pub. Date: May 14, 2021

(65) Prior Publication Data
US 2023/0001019 A1    Jan. 5, 2023

Related U.S. Application Data

(60) Provisional application No. 62/932,608, filed on Nov. 8, 2019.

(51) Int. Cl.
| | |
|---|---|
| A61K 48/00 | (2006.01) |
| A61P 27/02 | (2006.01) |
| C07K 14/705 | (2006.01) |
| C12N 9/22 | (2006.01) |
| C12N 15/11 | (2006.01) |
| C12N 15/86 | (2006.01) |
| C12N 15/90 | (2006.01) |

(52) U.S. Cl.
CPC .......... *A61K 48/0058* (2013.01); *A61P 27/02* (2018.01); *C07K 14/7056* (2013.01); *C12N 9/22* (2013.01); *C12N 15/11* (2013.01); *C12N 15/86* (2013.01); *C12N 15/907* (2013.01); *C12N 2310/20* (2017.05); *C12N 2750/14143* (2013.01)

(58) Field of Classification Search
None
See application file for complete search history.

(56) References Cited

U.S. PATENT DOCUMENTS

| | | | |
|---|---|---|---|
| 7,465,583 | B2 | 12/2008 | Samulski et al. |
| 8,865,406 | B2 | 10/2014 | Zhang et al. |
| 9,873,893 | B2 | 1/2018 | Sieving et al. |
| 10,350,306 | B2 | 7/2019 | Sieving et al. |
| 10,577,630 | B2 | 3/2020 | Zhang et al. |
| 10,612,041 | B2 | 4/2020 | Barzel et al. |
| 10,767,175 | B2 | 9/2020 | Dellinger et al. |
| 2003/0108524 | A1 | 6/2003 | Diagana et al. |
| 2014/0155468 | A1 | 6/2014 | Gregory et al. |
| 2014/0294771 | A1 | 10/2014 | Schaffer et al. |
| 2015/0240263 | A1 | 8/2015 | Holmes et al. |
| 2016/0002666 | A1 | 1/2016 | Sieving et al. |
| 2016/0153006 | A1 | 6/2016 | Zhang et al. |
| 2016/0289675 | A1 | 10/2016 | Ryan et al. |
| 2016/0298099 | A1 | 10/2016 | Kormann et al. |
| 2016/0298134 | A1 | 10/2016 | Chen et al. |
| 2016/0340661 | A1 | 11/2016 | Cong et al. |
| 2017/0198302 | A1 | 7/2017 | Feng et al. |
| 2017/0355999 | A1 | 12/2017 | Rabar |
| 2018/0064827 | A1 | 3/2018 | Conway et al. |
| 2018/0119140 | A1 | 5/2018 | Porteus et al. |
| 2018/0179553 | A1 | 6/2018 | Watson et al. |
| 2018/0185516 | A1 | 7/2018 | Ansell et al. |
| 2018/0214577 | A1 | 8/2018 | Sieving et al. |
| 2018/0251791 | A1 | 9/2018 | Doudna et al. |
| 2019/0002869 | A1 | 1/2019 | Yin et al. |
| 2019/0010490 | A1 | 1/2019 | Cowan et al. |
| 2019/0038724 | A1 | 2/2019 | Buchlis et al. |
| 2019/0076551 | A1 | 3/2019 | Bogorad et al. |
| 2019/0112353 | A1 | 4/2019 | Zhang et al. |

(Continued)

FOREIGN PATENT DOCUMENTS

| | | |
|---|---|---|
| EP | 1308517 A1 | 5/2003 |
| EP | 3138910 B1 | 9/2017 |

(Continued)

OTHER PUBLICATIONS

Huang et al., "Morphological and Molecular Defects in Human Three-Dimensional Retinal Organoid Model of X-Linked Juvenile Retinoschisis" 13 Stem Cell Reports 906-923 (Year: 2019).*
Shengru et al., "A Patient-Specific Point Mutation Mouse Model of X-Linked Retinoschisis by CRISPR/Cas9 System" 60 Investigative Ophthalmology & Visual Science 4211 (Year: 2019).*
Bush et al., "Convergence of Human Genetics and Animal Studies: Gene Therapy for X-Linked Retinoschisis," Cold Spring Harb. Perspect. Med., 5(8):a017368, (Jun. 22, 2015).
Chan et al., "Learning to predict expression efficacy of vectors in recombinant protein production," BMC Bioinformatics, 11 Suppl 1:S21, (Jan. 18, 2010).
Chugunova et al., "Methods of Genome Engineering: a New Era of Molecular Biology," Biochemistry (Mosc.), 81(7):662-677, (Jul. 2016).

(Continued)

*Primary Examiner* — Nancy J Leith
(74) *Attorney, Agent, or Firm* — Alston & Bird LLP

(57) ABSTRACT

Nucleic acid constructs and compositions that allow insertion and/or expression of a retinoschisin coding sequence are provided. Nuclease agents targeting RS1 loci are provided. Compositions and methods of using such constructs for integration into a target genomic locus and/or expression in a cell are also provided. Methods of treating X-linked juvenile retinoschisis using the nucleic acid constructs and compositions are also provided.

19 Claims, 15 Drawing Sheets
Specification includes a Sequence Listing.

(56) References Cited

U.S. PATENT DOCUMENTS

| | | |
|---|---|---|
| 2019/0136231 A1 | 5/2019 | Morrissey et al. |
| 2019/0153440 A1 | 5/2019 | Kantardzhieva et al. |
| 2019/0185844 A1 | 6/2019 | Gagnon et al. |
| 2019/0211362 A1 | 7/2019 | Lundberg et al. |
| 2019/0225991 A1 | 7/2019 | Izpisua Belmonte et al. |
| 2019/0247517 A1 | 8/2019 | Brooks |
| 2019/0316121 A1 | 10/2019 | Smith et al. |
| 2019/0352671 A1 | 11/2019 | Holmes et al. |
| 2019/0365924 A1 | 12/2019 | Conway et al. |
| 2019/0376051 A1 | 12/2019 | Kormann et al. |
| 2019/0382798 A1 | 12/2019 | Cowan et al. |
| 2019/0390195 A1 | 12/2019 | Tondera et al. |
| 2020/0040362 A1 | 2/2020 | Carlo et al. |
| 2020/0080082 A1 | 3/2020 | Lundberg et al. |
| 2020/0115700 A1 | 4/2020 | Baltes |
| 2020/0172564 A1 | 6/2020 | Dombrowski |
| 2020/0190504 A1 | 6/2020 | Baltes |
| 2020/0208146 A1 | 7/2020 | Clark et al. |
| 2020/0231974 A1 | 7/2020 | Jarvis et al. |
| 2020/0268906 A1 | 8/2020 | Finn et al. |
| 2020/0270617 A1 | 8/2020 | Finn et al. |
| 2020/0270618 A1 | 8/2020 | Finn et al. |
| 2020/0289628 A1 | 9/2020 | Finn et al. |
| 2020/0340015 A1 | 10/2020 | Dahlman et al. |
| 2020/0384125 A1 | 12/2020 | Brooks |
| 2021/0079427 A1 | 3/2021 | Chen et al. |
| 2021/0130850 A1 | 5/2021 | Joung et al. |
| 2021/0171985 A1 | 6/2021 | Carlo et al. |
| 2021/0180053 A1 | 6/2021 | Beverly et al. |
| 2021/0198696 A1 | 7/2021 | Kong et al. |
| 2021/0316014 A1 | 10/2021 | Finn et al. |
| 2021/0332347 A1 | 10/2021 | Baltes |
| 2021/0348159 A1 | 11/2021 | Brooks et al. |
| 2022/0354967 A1 | 11/2022 | Finn et al. |
| 2022/0387560 A1 | 12/2022 | Buchlis et al. |
| 2022/0402862 A1 | 12/2022 | Scully et al. |

FOREIGN PATENT DOCUMENTS

| | | | |
|---|---|---|---|
| EP | 3196301 B1 | 10/2018 | |
| EP | 3138911 B1 | 12/2018 | |
| EP | 3470089 A1 | 4/2019 | |
| EP | 3011032 B2 | 10/2019 | |
| EP | 3089725 B1 | 10/2019 | |
| EP | 3620524 A1 | 3/2020 | |
| EP | 3640335 A2 | 4/2020 | |
| EP | 3653229 A1 | 5/2020 | |
| EP | 2839013 B1 | 8/2020 | |
| EP | 3011031 B1 | 9/2020 | |
| JP | 2016-510221 A | 4/2016 | |
| WO | WO 2011/011767 A1 | 1/2011 | |
| WO | WO 2011/100058 A1 | 8/2011 | |
| WO | WO 2012/145601 A2 | 10/2012 | |
| WO | WO 2014/186585 A2 | 11/2014 | |
| WO | WO 2015/089077 A2 | 6/2015 | |
| WO | WO 2015/127439 A1 | 8/2015 | |
| WO | WO 2016/176690 A2 | 11/2016 | |
| WO | WO 2017/077386 A1 | 5/2017 | |
| WO | WO 2017/091512 A1 | 6/2017 | |
| WO | WO 2017/093804 A2 | 6/2017 | |
| WO | WO 2017/109757 A1 | 6/2017 | |
| WO | WO 2017/134529 A1 | 8/2017 | |
| WO | WO 2017/141109 A1 | 8/2017 | |
| WO | WO 2017/158422 A1 | 9/2017 | |
| WO | WO 2017/173054 A1 | 10/2017 | |
| WO | WO 2018/007871 A1 | 1/2018 | |
| WO | WO 2018/013720 A1 | 1/2018 | |
| WO | WO 2018/013932 A1 | 1/2018 | |
| WO | WO 2018/107026 A1 | 6/2018 | |
| WO | WO 2018/107028 A1 | 6/2018 | |
| WO | WO 2018/126087 A1 | 7/2018 | |
| WO | WO 2018/220211 A1 | 12/2018 | |
| WO | WO 2018/232382 A1 | 12/2018 | |
| WO | WO 2019/010384 A1 | 1/2019 | |
| WO | WO 2019/036513 A1 | 2/2019 | |
| WO | WO 2019/067910 A1 | 4/2019 | |
| WO | WO 2019/067992 A1 | 4/2019 | |
| WO | WO 2019/079527 A1 | 4/2019 | |
| WO | WO 2020/072605 A1 | 4/2019 | |
| WO | WO 2019/113310 A1 | 6/2019 | |
| WO | WO 2019/118875 A1 | 6/2019 | |
| WO | WO 2019/122302 A1 | 6/2019 | |
| WO | WO 2019/134561 A1 | 7/2019 | |
| WO | WO 2019/140330 A1 | 7/2019 | |
| WO | WO 2019/161310 A1 | 8/2019 | |
| WO | WO 2019/183630 A2 | 9/2019 | |
| WO | WO 2019/212973 A1 | 11/2019 | |
| WO | WO 2019/237069 A1 | 12/2019 | |
| WO | WO 2019/239361 A1 | 12/2019 | |
| WO | WO 2019/246203 A1 | 12/2019 | |
| WO | WO 2020/006126 A1 | 1/2020 | |
| WO | WO 2020/006131 A2 | 1/2020 | |
| WO | WO 2020/006132 A1 | 1/2020 | |
| WO | WO 2020/014577 A1 | 1/2020 | |
| WO | WO 2020/032986 A1 | 2/2020 | |
| WO | WO 2020/046861 A1 | 3/2020 | |
| WO | WO 2020/047531 A1 | 3/2020 | |
| WO | WO 2020/055941 A1 | 3/2020 | |
| WO | WO 2020/079033 A1 | 4/2020 | |
| WO | WO 2020/081843 A1 | 4/2020 | |
| WO | WO 2020/081869 A1 | 4/2020 | |
| WO | WO 2020/082041 A1 | 4/2020 | |
| WO | WO 2020/082042 A2 | 4/2020 | |
| WO | WO 2020/082046 A2 | 4/2020 | |
| WO | WO 2020/082047 A1 | 4/2020 | |
| WO | WO 2020/112908 A2 | 6/2020 | |
| WO | WO 2020/118041 A1 | 6/2020 | |
| WO | WO 2020/168362 A1 | 8/2020 | |
| WO | WO 2020/210552 A1 | 10/2020 | |
| WO | WO 2021/092513 A1 | 5/2021 | |
| WO | WO 2021/202421 A1 | 10/2021 | |
| WO | WO 2021/224416 A1 | 11/2021 | |

OTHER PUBLICATIONS

Griesenbach et al., "Cystic Fibrosis Gene Therapy in the UK and Elsewhere," Hum. Gene Ther., 26(5):266-275, (May 2015).

Keskin et al., "A new, structurally nonredundant, diverse data set of protein-protein interfaces and its implications," Protein Sci., 13(4):1043-1055, (Apr. 2004).

Pakula and Sauer, "Genetic analysis of protein stability and function," Annu. Rev. Genet. 23:289-310, (1989).

Ali, et al., "Gene therapy for inherited retinal degeneration," Br. J. Ophthalmol., 81(9):795-801, (1997).

Anguela, et al., "In Vivo Genome Editing of Liver Albumin for Therapeutic Gene Expression: Rescue of Hemophilic Mice Via Integration of Factor 9," Blood, 120(21):751, (2012).

Barzel, et al., "Promoterless gene targeting without nucleases ameliorates haemophilia B in mice," Nature Letter, 517(7534):360-364, (2014).

Barzel, et al., "Promoterless gene targeting without nucleases ameliorates haemophilia B in mice," Nature, 517(7534):360-364, (2015).

Bellingrath et al., "Gene therapy as a treatment concept for inherited retinal diseases," Ophthalmologe, 112(9):720-727, (2015).

Bush, et al., "Cog-Wheel Octameric Structure of RS1, the Discoidin Domain Containing Retinal Protein Associated with X-Linked Retinoschisis," PLoS One, 11(1):e0147653, (2016).

Bush, et al., "Preclinical Dose-Escalation Study of Intravitreal AAV-RS1 Gene Therapy in a Mouse Model of X-linked Retinoschisis: Dose-Dependent Expression and Improved Retinal Structure and Function," Hum. Gene Ther., 27(5):376-389, (2016).

Cheong, et al., "Editing of mouse and human immunoglobulin genes by CRISPR-Cas9 system," Nat. Commun., 7:10934, doi: 10.1038/ncomms10934, (2016).

Cruz et al., "Gene therapy on inherited retinal dystrophies: an update," (2018) [Retrieved from the Internet Feb. 10, 2021: <URL: https://addi.ehu.es/bitstream/handle/10810/30847/TFG_Crespo_Cruz_Rev.pdf?sequence=4&isAllowed=y>].

Cukras et al., "Retinal AAV8-RS1 Gene Therapy for X-Linked Retinoschisis: Initial Findings from a Phase I/IIa Trial by Intravitreal Delivery," Mol. Ther. 26(9):2282-2294, (2018).

(56) References Cited

OTHER PUBLICATIONS

Dalkara, et al., "In Vivo-Directed Evolution of a New Adeno-Associated Virus for Therapeutic Outer Retinal Gene Delivery from the Vitreous," Sci. Transl. Med., 5(189):189ra76, (2013).
Deng, et al., "Bidirectional promoter trapping T-DNA for insertional mutagenesis in Verticillium dahliae," Can. J. Microbiol., 60(7):445-454, (2014).
Dinculescu et al., "Adeno-associated virus-vectored gene therapy for retinal disease," Hum. Gene Ther. 16(6):649-663, (2005).
Dreyer, et al., "Improved antiviral efficacy using TALEN-mediated homology directed recombination to introduce artificial primary miRNAs into DNA of Hepatitis B virus," Biochem. Biophy. Res. Commun., 478(4):1563-1568, (2016).
Feng, Bo, "High-efficiency CRISPR-based technology for hemophilia B gene therapy," A-Biotech (Hong Kong) Co. Ltd. (2018).
Grayson, et al., "Retinoschisin, the X-linked retinoschisis protein, is a secreted photoreceptor protein, and is expressed and released by Weri-Rb1 cells," Hum. Mol. Genet., 9(12):1873-1879, (2000).
Greiner, et al., "CRISPR-Mediated Editing of the B Cell Receptor in Primary Human B Cells," iScience, 12:369-378, (2019).
Haapaniemi et al., "CRISPR-Cas9 genome editing induces a p53-mediated DNA damage response," Nat. Med. doi: 10.1038/s41591-018-0049-z, (Jun. 11, 2018, epub ahead of print).
Hajj, et al., "Tools for translation: non-viral materials for therapeutic mRNA delivery," Nature Reviews Materials, vol. 2, Article No. 17056, doi: 10.1038/natrevmats.2017.56, (2017).
He, et al., "Knock-in of large reporter genes in human cells via CRISPR/Cas9-induced homology-dependent and independent DNA repair," Nucleic Acids Res., 44(9):e85, (2016).
Ihry et al., "p53 inhibits CRISPR-Cas9 engineering in human pluripotent stem cells," Nat. Med. doi: 10.1038/s41591-018-0050-6 (Jun. 11, 2018, epub ahead of print).
Jayaraman et al., "Maximizing the Potency of siRNA Lipid Nanoparticles for Hepatic Gene Silencing In Vivo," Angew. Chem. Int. Ed., 51:8529-8533, (2012).
Kolb, et al., "Genomic targeting of a bicistronic DNA fragment by Cre-mediated site-specific recombination," Gene, 203(2):209-216, (1997).
Komor et al., "CRISPR-Based Technologies for the Manipulation of Eukaryotic Genomes," Cell, 168(1-2):20-36, (2017).
Kosicki et al., "Repair of double-strand breaks induced by CRISPR-Cas9 leads to large deletions and complex rearrangements," Nat. Biotechnol., 36(8): 765-771, (Jul. 16, 2018).
Kulkarni et al., "Lipid Nanoparticles Enabling Gene Therapies: From Concepts to Clinical Utility," Nucleic Acids Ther., 28(3):146-157, (2018).
Laoharawee, et al., "Dose-Dependent Prevention of Metabolic and Neurologic Disease in Murine MPS II by ZFN-Mediated In Vivo Genome Editing," Mol. Ther., 26(4):1127-1136, (2018).
Liu, et al., "Cas9 and AAV Vector-Based Strategies for X-linked Juvenile Retinoschisis (XLRS) Therapy," Investigative Ophthalmology & Visual Science, vol. 61, 800, (Jun. 2020).
Mcfall, et al., "Characterization of a New Continuous Cell Line Derived from a Human Retinoblastoma," Cancer Res., 37(4):1003-1010, (1977).
Mizuno et al., "Intra-embryo Gene Cassette Knockin by CRISPR/Cas9-Mediated Genome Editing with Adeno-Associated Viral Vector," iScience, 9:286-297, (2018).
Molday, et al., "X-linked juvenile retinoschisis: Clinical diagnosis, genetic analysis, and molecular mechanisms," Prog. Retin. Eye Res., 31(3):195-212, (2012).

Ohmori, et al., "CRISPR/Cas9-mediated genome editing via postnatal administration of AAV vector cures haemophilia B mice," Sci. Rep., 7(1):4159, doi:10.1038/s41598-017-04625-5, (2017).
Papapetrou, et al., "Gene Insertion Into Genomic Safe Harbors for Human Gene Therapy," Mol. Ther., 24(4):678-684, (2016).
Pellenz et al., "New Human Chromosomal Sites with "Safe Harbor" Potential for Targeted Transgene Insertion," Hum. Gene Ther., 30(7):814-828, (2019).
Porro, et al., "Promoterless gene targeting without nucleases rescues lethality of a Crigler-Najjar syndrom mouse model," EMBO Mol. Med., 9(10):1346-1355, (2017).
Ramachandran, et al., "Evaluation of Dose and Safety of AAV7m8 and AAV8BP2 in the Non-Human Primate Retina," Hum. Gene Ther., 28(2):154-167, (2017).
Ryu, et al., "Generation of T-DNA tagging lines with a bidirectional gene trap vector and the establishment of an insertion-site database," Plant Mol. Biol., 54(4):489-502, (2004).
Sengillo et al, "Correction of Monogenic and Common Retinal Disorders with Gene Therapy," Genes (Basel), 8(2):53, (2017).
Senis, et al., "TALEN/CRISPR-mediated engineering of a promoterless anti-viral RNAi hairpin into an endogenous miRNA locus," Nucleic Acids Res., 45(1):e3, doi: 10.1093/nar/gkw805, (2017).
Sharma, et al., "In vivo genome editing of the albumin locus as a platform for protein replacement therapy," Blood, 126(15):1777-1784, (2015).
Suzuki, et al., "In vivo genome editing via CRISPR/Cas9 mediated homology-independent targeted integration," Nature, 540(7631):144-149, (2016).
Tam et al., "Advances in Lipid Nanoparticles for siRNA Delivery," Pharmaceutics, 5:498-507, (2013).
Tripathi, et al., "An adenoviral vector for probing promoter activity in primary immune cells," J. Immunol. Methods, 311(1-2): 19-30, (2006).
Vijayasarathy, et al., "Molecular Mechanisms Leading to Null-Protein Product from Retinoschisin (RS1) Signal-Sequence Mutants in X-Linked Retinoschisis (XLRS) Disease," Hum. Mutat., 31(11):1251-1260, (2010).
Wechsler, et al., "ZFN-Mediated Gene Targeting at the Albumin Locus in Liver Results in Therapeutic Levels of Human Fix in Mice and Non-Human Primates," Blood, 126(23):200, Abstract only, (2015).
Wu, et al., "Defective Discoidin Domain Structure, Subunit Assembly, and Endoplasmic Reticulum Processing of Retinoschisin are Primary Mechanisms Responsible for X-linked Retinoschisis," J. Biol. Chem., 278(30):28139-28146, (2003).
Yamamoto, et al., "Making ends meet: Targeted integration of DNA fragments by genome editing," Chromosoma., 127(4):405-420, (2018).
Yang, et al., "The DNA Element Controlling Expression of the Varicella-Zoster Virus Open Reading Frame 28 and 29 Genes Consists of Two Divergent Unidirectional Promoters Which Have a Common USF Site," J. Virol., 78(20):10939-10952, (2004).
Yin, et al., "Structure-guided chemical modification of guide RNA enables potent non-viral in vivo genome editing," Nat. Biotechnol., 35(12):1179-1187, (2017).
WIPO Application No. PCT/US2020/059568, PCT International Search Report and Written Opinion of the International Searching Authority mailed Feb. 4, 2021.
Australian Application No. 2020379046, Examination Report No. 2 mailed Feb. 6, 2025.
Australian Application No. 2020379046, Notice of Acceptance mailed Feb. 26, 2025.

* cited by examiner

| AAV | | Humanized Transcript 1 | | Humanized Transcript 2 | | Mutant Mouse | | WT Mouse | | Total Reads |
|---|---|---|---|---|---|---|---|---|---|---|
| | | Read Count | Percent of Total Reads | Read Count | Percent of Total Reads | Read Count | Percent of Total Reads | Read Count | Percent of Total Reads | |
| pssAAV mhRS1-sgu | 6209 | 4843 | 66% | 1739 | 24% | 793 | 11% | | | 7375.00 |
| | 6210 | 925 | 68% | 244 | 18% | 201 | 15% | | | 1370.00 |
| | 6211 | 1583 | 87% | 0 | 0% | 245 | 13% | | | 1828.00 |
| | 6214 | 3037 | 41% | 366 | 5% | 547 | 7% | 441 | 6% | 7375.00 |
| | 6215 | 2946 | 40% | 666 | 9% | 713 | 10% | 209 | 3% | 7375.00 |
| | 6216 | 1561 | 21% | 307 | 4% | 202 | 3% | 847 | 11% | 7375.00 |
| | 6228 | 5460 | 80% | 796 | 12% | 541 | 8% | | | 6797.00 |
| | 6229 | 3037 | 70% | 860 | 20% | 430 | 10% | | | 4327.00 |
| | 6212 | 2085 | 83% | 167 | 7% | 267 | 11% | | | 2519.00 |
| pscAAV rs1_tandem | 6230 | 2762 | 81% | 266 | 8% | 370 | 11% | | | 3398.00 |
| | 6213 | 2295 | 64% | 329 | 9% | 947 | 27% | | | 3571.00 |
| | 6225 | 1987 | 27% | 0 | 0% | 135 | 2% | 349 | 5% | 7375.00 |
| | 6266 | 1416 | 19% | 125 | 2% | 397 | 5% | 337 | 5% | 7375.00 |
| | 6267 | 1145 | 16% | 64 | 1% | 433 | 6% | 1034 | 14% | 7375.00 |
| | 6227 | 3101 | 40% | | | 4608 | 60% | | | 7709.00 |
| | 6233 | 1599 | 47% | | | 1770 | 53% | | | 3369.00 |
| | 6231 | 3814 | 92% | | | 324 | 8% | | | 4138.00 |
| pssAAV hRs1_HITI | 6226 | 425 | 12% | | | 3081 | 88% | | | 3506.00 |
| | 6232 | 4429 | 65% | | | 2347 | 35% | | | 6776.00 |
| | 6224 | 463 | 6% | | | 3746 | 51% | 356 | 5% | 7375.00 |
| | 6222 | 1613 | 22% | | | 2019 | 27% | 1140 | 15% | 7375.00 |
| | 6223 | 245 | 3% | | | 211 | 3% | 0 | 0% | 7375.00 |

*FIG. 5*

| Sample_ID | Gene | Mouse ID | Virus | Sex | Block | Well | Sample_ID | Gene | %INDEL | INDEL_READS | Total reads |
|---|---|---|---|---|---|---|---|---|---|---|---|
| S37 | Rs1 | 4416227.00 | 7m8 hRS1_cDNA HITI | Male | Rs1_cDNA | B3 | S339 | Rs1 | 16.24 | 612.00 | 3768.00 |
| S38 | Rs1 | | | | Rs1_cDNA | B4 | S340 | Rs1 | 0.04 | 4.00 | 11396.00 |
| S39 | Rs1 | 4416233.00 | 7m8 hRS1_cDNA HITI | Male | Rs1_cDNA | B5 | S341 | Rs1 | 13.15 | 1575.00 | 11973.00 |
| S40 | Rs1 | | | | Rs1_cDNA | B6 | S342 | Rs1 | 0.25 | 21.00 | 8251.00 |
| S41 | Rs1 | 4416224.00 | 7m8 hRS1_cDNA HITI | Female | Rs1_cDNA | B7 | S343 | Rs1 | 10.68 | 2000.00 | 18721.00 |
| S42 | Rs1 | | | | Rs1_cDNA | B8 | S344 | Rs1 | 0.35 | 67.00 | 19102.00 |
| S43 | Rs1 | 4416231.00 | 7m8 hRS1_cDNA HITI | Male | Rs1_cDNA | F3 | S371 | Rs1 | 15.60 | 1143.00 | 7327.00 |
| S44 | Rs1 | | | | Rs1_cDNA | F4 | S372 | Rs1 | 0.03 | 3.00 | 10484.00 |
| S45 | Rs1 | 4416222.00 | 7m8 hRS1_cDNA HITI | Female | Rs1_cDNA | F5 | S373 | Rs1 | 2.28 | 750.00 | 32964.00 |
| S46 | Rs1 | | | | Rs1_cDNA | F6 | S374 | Rs1 | 0.06 | 12.00 | 21631.00 |
| S47 | Rs1 | 4416226.00 | 7m8 hRS1_cDNA HITI | Male | Rs1_cDNA | G1 | S375 | Rs1 | 44.36 | 4745.00 | 10697.00 |
| S48 | Rs1 | | | | Rs1_cDNA | G2 | S376 | Rs1 | 0.06 | 10.00 | 18139.00 |
| S49 | Rs1 | 4416232.00 | 7m8 hRS1_cDNA HITI | Male | Rs1_cDNA | G3 | S377 | Rs1 | 0.10 | 13.00 | 13314.00 |
| S50 | Rs1 | | | | Rs1_cDNA | G4 | S378 | Rs1 | 0.96 | 117.00 | 12153.00 |
| S51 | Rs1 | 4416223.00 | 7m8 hRS1_cDNA HITI | Female | Rs1_cDNA | G5 | S379 | Rs1 | 6.39 | 1218.00 | 19070.00 |
| S52 | Rs1 | | | | Rs1_cDNA | G6 | S380 | Rs1 | 0.06 | 10.00 | 17282.00 |
| S61 | Rs1 | 4416209.00 | 7m8 mhRS1-sgu | Male | Rs1_cDNA | B1 | S337 | Rs1 | 40.37 | 2558.00 | 6337.00 |
| S62 | Rs1 | | | | Rs1_cDNA | B2 | S338 | Rs1 | 0.06 | 4.00 | 7098.00 |
| S63 | Rs1 | 4416210.00 | 7m8 mhRS1-sgu | Male | Rs1_cDNA | C1 | S345 | Rs1 | 31.26 | 5276.00 | 16880.00 |
| S64 | Rs1 | | | | Rs1_cDNA | C2 | S346 | Rs1 | 0.20 | 19.00 | 9494.00 |
| S65 | Rs1 | 4416214.00 | 7m8 mhRS1-sgu | Female | Rs1_cDNA | C5 | S349 | Rs1 | 0.21 | 58.00 | 27275.00 |
| S66 | Rs1 | | | | Rs1_cDNA | C6 | S350 | Rs1 | 0.57 | 107.00 | 18717.00 |

*FIG. 6A*

| | | | | | | | | |
|---|---|---|---|---|---|---|---|---|
| S67 | Rs1 | 4416211.00 | 7m8 mhRS1-sgu | Male | Rs1_cDNA | D1 | S353 | Rs1 | 0.16 | 18.00 | 11198.00 |
| S68 | Rs1 | | | | Rs1_cDNA | D2 | S354 | Rs1 | 2.95 | 241.00 | 8171.00 |
| S69 | Rs1 | 4416215.00 | 7m8 mhRS1-sgu | Female | Rs1_cDNA | D5 | S357 | Rs1 | 1.67 | 344.00 | 20657.00 |
| S70 | Rs1 | | | | Rs1_cDNA | D6 | S358 | Rs1 | 0.71 | 131.00 | 18442.00 |
| S71 | Rs1 | 4416216.00 | 7m8 mhRS1-sgu | Female | Rs1_cDNA | E5 | S365 | Rs1 | 10.05 | 1648.00 | 16399.00 |
| S72 | Rs1 | | | | Rs1_cDNA | E6 | S366 | Rs1 | 0.27 | 52.00 | 19225.00 |
| S73 | Rs1 | 4416228.00 | 7m8 pscAAV_rs1_tandem | Male | Rs1_cDNA | C3 | S347 | Rs1 | 10.14 | 1049.00 | 10346.00 |
| S74 | Rs1 | | | | Rs1_cDNA | C4 | S348 | Rs1 | 0.11 | 15.00 | 14040.00 |
| S75 | Rs1 | 4416225.00 | 7m8 pscAAV_rs1_tandem | Female | Rs1_cDNA | C7 | S351 | Rs1 | 32.82 | 4701.00 | 14325.00 |
| S76 | Rs1 | | | | Rs1_cDNA | C8 | S352 | Rs1 | 0.05 | 8.00 | 15328.00 |
| S77 | Rs1 | 4416229.00 | 7m8 pscAAV_rs1_tandem | Male | Rs1_cDNA | D3 | S355 | Rs1 | 32.67 | 4416.00 | 13519.00 |
| S78 | Rs1 | | | | Rs1_cDNA | D4 | S356 | Rs1 | 0.09 | 15.00 | 16677.00 |
| S79 | Rs1 | 4416226.00 | 7m8 pscAAV_rs1_tandem | Female | Rs1_cDNA | D7 | S359 | Rs1 | 19.87 | 3759.00 | 18917.00 |
| S80 | Rs1 | | | | Rs1_cDNA | D8 | S360 | Rs1 | 0.13 | 25.00 | 19461.00 |
| S81 | Rs1 | 4416212.00 | 7m8 pscAAV_rs1_tandem | Male | Rs1_cDNA | E1 | S361 | Rs1 | 0.07 | 8.00 | 11742.00 |
| S82 | Rs1 | | | | Rs1_cDNA | E2 | S362 | Rs1 | 0.17 | 21.00 | 12432.00 |
| S83 | Rs1 | 4416230.00 | 7m8 pscAAV_rs1_tandem | Male | Rs1_cDNA | E3 | S363 | Rs1 | 7.06 | 986.00 | 13974.00 |
| S84 | Rs1 | | | | Rs1_cDNA | E4 | S364 | Rs1 | 1.32 | 142.00 | 10767.00 |
| S53 | Rs1 | 4416227.00 | 7m8 pscAAV_rs1_tandem | Female | Rs1_cDNA | E7 | S367 | Rs1 | 1.48 | 260.00 | 17523.00 |
| S54 | Rs1 | | | | Rs1_cDNA | E8 | S368 | Rs1 | 0.39 | 63.00 | 16357.00 |
| S55 | Rs1 | 4416213.00 | 7m8 pscAAV_rs1_tandem | Male | Rs1_cDNA | F1 | S369 | Rs1 | 19.75 | 1286.00 | 6512.00 |
| S56 | Rs1 | | | | Rs1_cDNA | F2 | S370 | Rs1 | 0.28 | 24.00 | 8481.00 |

*FIG. 6B*

CRISPR AND AAV STRATEGIES FOR X-LINKED JUVENILE RETINOSCHISIS THERAPY

CROSS-REFERENCE TO RELATED APPLICATIONS

This application is a 35 U.S.C. § 371 national stage of International Application No. PCT/US2020/059568, filed Nov. 7, 2020, which claims the benefit U.S. Application No. 62/932,608, filed Nov. 8, 2019, which are herein incorporated by reference in their entirety for all purposes.

REFERENCE TO A SEQUENCE LISTING SUBMITTED AS A TEXT FILE VIA EFS WEB

The Sequence Listing written in file 694232SEQLIST.txt is 1,280,334 bytes, was created on Nov. 6, 2020, and is hereby incorporated by reference.

BACKGROUND

The RS1 gene encodes a highly conserved extracellular protein involved in the cellular organization of the retina. It is assembled and secreted from photoreceptors and bipolar cells as a homo-oligomeric protein complex. Over 200 mutations have been detected in RS1, many leading to early onset of macular degeneration due to a non-functional protein or the absence of protein secretion. Lack of functional Rs1 expression causes schisis within the retinal layers leading to the early and progressive vision loss associated with X-linked juvenile retinoschisis (XLRS). Although there have been gene therapy clinical trials for XLRS, the trials did not meet their endpoints. New strategies are needed for treating XLRS.

SUMMARY

Nucleic acid constructs and compositions that allow insertion of a retinoschisin coding sequence into a target genomic locus such as an endogenous RS1 locus and/or expression of the retinoschisin coding sequence are provided. The nucleic acid constructs and compositions can be used in methods for integration into a target genomic locus and/or expression in a cell or in methods of treating X-linked juvenile retinoschisis.

In one aspect, provided are bidirectional nucleic acid constructs for integration into a target genomic locus. Some such nucleic acid constructs comprise: (a) a first segment comprising a first coding sequence for a first retinoschisin protein or fragment thereof; and (b) a second segment comprising a reverse complement of a second coding sequence for a second retinoschisin protein or fragment thereof. In some such constructs, the second segment is located 3' (i.e., downstream) of the first segment.

In some such constructs, the first retinoschisin protein or fragment thereof is a human retinoschisin protein or fragment thereof, the second retinoschisin protein or fragment thereof is a human retinoschisin protein or fragment thereof, or both the first retinoschisin protein or fragment thereof and the second retinoschisin protein or fragment thereof are a human retinoschisin protein or fragment thereof. In some such constructs, the first coding sequence comprises, consists essentially of, or consists of complementary DNA (cDNA), the second coding sequence comprises, consists essentially of, or consists of cDNA, or both the first coding sequence and the second coding sequence comprise, consist essentially of, or consist of cDNA. In some such constructs, the first coding sequence comprises, consists essentially of, or consists of exons 2-6 of human RS1 or degenerate variants thereof, the second coding sequence comprises, consists essentially of, or consists of exons 2-6 of human RS1 or degenerate variants thereof, or both the first coding sequence and the second coding sequence comprise, consist essentially of, or consist of exons 2-6 of human RS1 or degenerate variants thereof.

In some such constructs, the first segment comprises a fragment or portion of the first intron of human RS1 located 5' (i.e., upstream) of the first coding sequence, and/or the second segment comprises a reverse complement of a fragment or portion of the second intron of human RS1 located 3' (i.e., downstream) of the reverse complement of the second coding sequence.

In some such constructs, the first retinoschisin protein or fragment thereof is identical to the second retinoschisin protein or fragment thereof. In some such constructs, the second coding sequence adopts a different codon usage from the codon usage of the first coding sequence. In some such constructs, the second segment has at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 97%, or at least about 99% complementarity to the first segment. In some such constructs, the second segment has less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, less than about 95%, less than about 97%, or less than about 99% complementarity to the first segment. In some such constructs, the reverse complement of the second coding sequence is: (a) not substantially complementary to the first coding sequence; (b) not substantially complementary to a fragment of the first coding sequence; (c) highly complementary to the first coding sequence; (d) highly complementary to the fragment of the first coding sequence; (e) at least about 60%, at least about 70%, at least about 80%, or at least about 90% identical to the reverse complement of the first coding sequence; (f) about 50% to about 80% identical to the reverse complement of the first coding sequence; or (g) about 60% to about 100% identical to the reverse complement of the first coding sequence.

In some such constructs, the first segment is linked to the second segment by a linker. Optionally, the linker is about 5 to about 2000 nucleotides in length.

In some such constructs, the first segment comprises a first polyadenylation signal sequence located 3' of the first coding sequence, and the second segment comprises a reverse complement of a second polyadenylation signal sequence located 5' of the reverse complement of the second coding sequence. Optionally, the first polyadenylation signal sequence is different from the second polyadenylation signal sequence.

In some such constructs, the nucleic acid construct does not comprise a promoter that drives expression of the first retinoschisin protein or fragment thereof or the second retinoschisin protein or fragment thereof. In some such constructs, the first segment comprises a first splice acceptor site located 5' of the first coding sequence, and the second segment comprises a reverse complement of a second splice acceptor site located 3' of the reverse complement of the second coding sequence. Optionally, the first splice acceptor site is from an RS1 gene, the second splice acceptor site is from an RS1 gene, or both the first splice acceptor site and the second splice acceptor site are from an RS1 gene. Optionally, the first splice acceptor site is from intron 1 of human RS1, the second splice acceptor site is from intron 1 of human RS1, or both the first acceptor site and the second splice acceptor site are from intron 1 of human RS1.

In some such constructs, the nucleic acid construct does not comprise a homology arm. In some such constructs, the nucleic acid construct comprises homology arms. In some such constructs, the nucleic acid construct is single-stranded. In some such constructs, the nucleic acid construct is double-stranded. In some such constructs, the nucleic acid construct comprises DNA.

In some such constructs, the first coding sequence is codon-optimized for expression in a host cell, the second coding sequence is codon-optimized for expression in the host cell, or both the first coding sequence and the second coding sequence are codon-optimized for expression in the host cell. In some such constructs, the nucleic acid construct comprises one or more of the following terminal structures: hairpin, loop, inverted terminal repeat (ITR), or toroid. Optionally, the nucleic acid construct comprises ITRs.

In some such constructs, the first retinoschisin protein or fragment thereof and/or the second retinoschisin protein or fragment thereof comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 5. In some such constructs, the first coding sequence and/or the second coding sequence comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 8 or 9. In some such constructs, the first coding sequence comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 8, and the second coding sequence comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 9. In some such constructs, the nucleic acid construct comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 46 or 47.

In some such constructs, the second segment is located 3' of the first segment, both the first retinoschisin protein or fragment thereof and the second retinoschisin protein or fragment thereof are a human retinoschisin protein or fragment thereof, the first retinoschisin protein or fragment thereof is identical to the second retinoschisin protein or fragment thereof, both the first coding sequence and the second coding sequence comprise complementary DNA (cDNA) comprising exons 2-6 of human RS1 or degenerate variants thereof, the second coding sequence adopts a different codon usage from the codon usage of the first coding sequence, the first segment comprises a first polyadenylation signal sequence located 3' of the first coding sequence, and the second segment comprises a reverse complement of a second polyadenylation signal sequence located 5' of the reverse complement of the second coding sequence, the first segment comprises a first splice acceptor site located 5' of the first coding sequence, and the second segment comprises a reverse complement of a second splice acceptor site located 3' of the reverse complement of the second coding sequence, the nucleic acid construct does not comprise a promoter that drives expression of the first retinoschisin protein or fragment thereof or the second retinoschisin protein or fragment thereof, and the nucleic acid construct does not comprise a homology arm.

In another aspect, provided are vectors comprising any of the above bidirectional nucleic acid constructs. Some such vectors are viral vectors. Optionally, the vector is an adeno-associated virus (AAV) vector. Optionally, the AAV comprises a single-stranded genome (ssAAV). Optionally, the AAV comprises a self-complementary genome (scAAV). Optionally, the AAV is selected from the group consisting of: AAV2, AAV5, AAV8, or AAV7m8.

Some such vectors do not comprise a promoter that drives expression of the first retinoschisin protein or fragment thereof or the second retinoschisin protein or fragment thereof. Some such vectors do not comprise a homology arm. Some such vectors do comprise homology arms.

In another aspect, provided are lipid nanoparticles comprising any of the above bidirectional nucleic acid constructs.

In another aspect, provided are cells comprising any of the above bidirectional nucleic acid constructs. Some such cells are in vitro. Some such cells are in vivo. Some such cells are mammalian cells. Some such cells are human cells. Some such cells are retinal cells.

Some such cells express the first retinoschisin protein or fragment thereof or the second retinoschisin protein or fragment thereof. In some such cells, the nucleic acid construct is genomically integrated at the target genomic locus. In some such cells, the target genomic locus is an endogenous RS1 locus. Optionally, the nucleic acid construct is genomically integrated in intron 1 of the endogenous RS1 locus. Optionally, endogenous RS1 exon 1 splices into the first coding sequence or the second coding sequence of the nucleic acid construct. Optionally, the modified RS1 locus comprising the genomically integrated nucleic acid construct encodes a protein comprising, consisting essentially of, or consisting of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 2 or 4.

In some such cells, integration of the nucleic acid construct into the endogenous RS1 locus prevents transcription of the endogenous RS1 gene downstream of the integration site. Optionally, the integration of the nucleic acid construct into the endogenous RS1 locus reduces or eliminates expression of the endogenous retinoschisin protein and replaces it with expression of the retinoschisin protein or fragment thereof encoded by the nucleic acid construct. Optionally, the endogenous RS1 locus comprises a mutated RS1 gene comprising a mutation that causes X-linked juvenile retinoschisis, and expression of the genomically integrated nucleic acid construct reduces or eliminates expression of the mutated RS1 gene.

In another aspect, provided are nucleic acid constructs for homology-independent targeted integration into a target genomic locus. Some such nucleic acid constructs comprise a coding sequence for a retinoschisin protein or fragment thereof flanked on each side by a nuclease target sequence for a nuclease agent. Also provided are nucleic acid constructs for homologous recombination with a target locus. Some such nucleic acid constructs comprise a coding sequence for a retinoschisin protein or fragment thereof flanked by homology arms on each side, optionally wherein the coding sequence and homology arms are further flanked on each side by a target sequence for a nuclease agent. Optionally, each homology arm is between about 25 nucleotides and about 2.5 kb in length.

In some such constructs for homology-independent targeted integration, the nuclease target sequence in the nucleic acid construct is identical to a nuclease target sequence for integration into the target genomic locus, wherein the nuclease target sequence in the target genomic locus is destroyed if the nucleic acid construct is inserted in the correct orientation but is reformed if the nucleic acid construct is inserted into the target genomic locus in the opposite orientation.

In some such constructs, the retinoschisin protein or fragment thereof is a human retinoschisin protein or fragment thereof. In some such constructs, the coding sequence for the retinoschisin protein or fragment thereof comprises, consists essentially of, or consists of complementary DNA (cDNA). In some such constructs, the coding sequence for the retinoschisin protein or fragment thereof comprises, consists essentially of, or consists of exons 2-6 of human RS1 or degenerate variants thereof.

In some such constructs, the nucleic acid construct comprises a fragment or portion of the first intron of human RS1 located 5' of the coding sequence. In some such constructs, the nucleic acid construct does not comprise a promoter that drives expression of the retinoschisin protein or fragment thereof. In some such constructs, the nucleic acid construct comprises a polyadenylation signal sequence located 3' of the coding sequence. In some such constructs, the nucleic acid construct comprises a splice acceptor site located 5' of the coding sequence. Optionally, the splice acceptor site is from an RS1 gene. Optionally, the splice acceptor site is from intron 1 of human RS1.

Some such constructs are single-stranded. Some such constructs are double-stranded. Some such constructs comprise DNA. In some such constructs, the coding sequence is codon-optimized for expression in a host cell.

In some such constructs, the construct comprises one or more of the following terminal structures: hairpin, loop, inverted terminal repeat (ITR), or toroid. Optionally, the nucleic acid construct comprising the coding sequence and the nuclease target sequences is flanked by ITRs.

In some such constructs, the nuclease agent is a Cas protein and a guide RNA, and the nuclease target sequence is a guide RNA target sequence. Optionally, the guide RNA target sequence is an inverted guide RNA target sequence. Optionally, the Cas protein is Cas9.

In some such constructs, the retinoschisin protein or fragment thereof comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 5. In some such constructs, the coding sequence for the retinoschisin protein or fragment thereof comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 8 or 9. In some such constructs, the nucleic acid construct comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 45.

In some such constructs, the nucleic acid construct is the nucleic acid construct for homology-independent targeted integration into the target genomic locus, the retinoschisin protein or fragment thereof is a human retinoschisin protein or fragment thereof, the coding sequence for the retinoschisin protein or fragment thereof comprises complementary DNA (cDNA) comprising exons 2-6 of human RS1 or degenerate variants thereof, the nucleic acid construct does not comprise a promoter that drives expression of the retinoschisin protein or fragment thereof, the nucleic acid construct comprises a polyadenylation signal sequence located 3' of the coding sequence, the nucleic acid construct comprises a splice acceptor site located 5' of the coding sequence, and the nuclease target sequence in the nucleic acid construct is identical to a nuclease target sequence for integration into the target genomic locus, wherein the nuclease target sequence in the target genomic locus is destroyed if the nucleic acid construct is inserted in the correct orientation but is reformed if the nucleic acid construct is inserted into the target genomic locus in the opposite orientation.

In some such constructs, the nucleic acid construct is the nucleic acid construct for homologous recombination with the target genomic locus, the retinoschisin protein or fragment thereof is a human retinoschisin protein or fragment thereof, the coding sequence for the retinoschisin protein or fragment thereof comprises complementary DNA (cDNA) comprising exons 2-6 of human RS1 or degenerate variants thereof, the nucleic acid construct does not comprise a promoter that drives expression of the retinoschisin protein or fragment thereof, the nucleic acid construct comprises a polyadenylation signal sequence located 3' of the coding sequence, the nucleic acid construct comprises a splice acceptor site located 5' of the coding sequence, and each homology arm is between about 25 nucleotides and about 2.5 kb in length.

In another aspect, provided are vectors comprising any of the above nucleic acid constructs for homology-independent targeted integration. Some such vectors are viral vectors. Some such vectors are adeno-associated virus (AAV) vectors. Optionally, the AAV comprises a single-stranded genome (ssAAV). Optionally, the AAV comprises a self-complementary genome (scAAV). Optionally, the AAV is selected from the group consisting of: AAV2, AAV5, AAV8, or AAV7m8.

In some such vectors, the vector does not comprise a promoter that drives expression of the retinoschisin protein or fragment thereof. In some such vectors, the vector does not comprise a homology arm.

In another aspect, provided are lipid nanoparticles comprising any of the above nucleic acid constructs for homology-independent targeted integration.

In another aspect, provided are cells comprising any of the above nucleic acid constructs for homology-independent targeted integration. Some such cells are in vitro. Some such cells are in vivo. Some such cells are mammalian cells. Some such cells are human cells. Some such cells are retinal cells.

In some such cells, the cell expresses the retinoschisin protein or fragment thereof. In some such cells, the nucleic acid construct is genomically integrated at the target genomic locus. Optionally, the target genomic locus is an endogenous RS1 locus. Optionally, the nucleic acid construct is genomically integrated in intron 1 of the endogenous RS1 locus. Optionally, endogenous RS1 exon 1 splices into the coding sequence for the retinoschisin protein or fragment thereof in the nucleic acid construct. Optionally, the modified RS1 locus comprising the genomically integrated nucleic acid construct encodes a protein comprising, consisting essentially of, or consisting of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 2 or 4.

In some such cells, integration of the nucleic acid construct into the endogenous RS1 locus prevents transcription of the endogenous RS1 gene downstream of the integration site. Optionally, the integration of the nucleic acid construct into the endogenous RS1 locus reduces or eliminates expression of the endogenous retinoschisin protein and replaces it with expression of the retinoschisin protein or fragment thereof encoded by the nucleic acid construct. Optionally, the endogenous RS1 locus comprises a mutated RS1 gene comprising a mutation that causes X-linked juvenile retinoschisis, and expression of the genomically integrated nucleic acid construct reduces or eliminates expression of the mutated RS1 gene.

In another aspect, provided are compositions for use in expressing retinoschisin in a cell or for use in integrating a coding sequence for a retinoschisin protein or fragment thereof into a target genomic locus in a cell. Some such compositions comprise: (a) a nucleic acid construct comprising the coding sequence for the retinoschisin protein or fragment thereof for integration into the target genomic locus; and (b) a nuclease agent or a nucleic acid encoding the nuclease agent, wherein the nuclease agent targets a nuclease target sequence in the target genomic locus.

Some such compositions comprise: (a) any of the above nucleic acid constructs for homology-independent targeted integration; and (b) a nuclease agent or a nucleic acid encoding the nuclease agent, wherein the nuclease agent targets a nuclease target sequence in the target genomic locus. Optionally, the nuclease target sequence in the target genomic locus is identical to the nuclease target sequence in the nucleic acid construct. Optionally, the nuclease target sequence in the target genomic locus is destroyed if the nucleic acid construct is inserted in the correct orientation but is reformed if the nucleic acid construct is inserted into the target genomic locus in the opposite orientation.

Some such compositions comprise: (a) any of the above bidirectional nucleic acid constructs; and (b) a nuclease agent or a nucleic acid encoding the nuclease agent, wherein the nuclease agent targets a nuclease target sequence in the target genomic locus.

In some such compositions, the target genomic locus is in an RS1 gene. Optionally, the nuclease target sequence in the target genomic locus is in the first intron in the RS1 gene. Optionally, integration of the nucleic acid construct into the endogenous RS1 locus prevents transcription of the endogenous RS1 gene downstream of the integration site. Optionally, the integration of the nucleic acid construct into the endogenous RS1 locus in the cell reduces or eliminates expression of the endogenous retinoschisin protein and replaces it with expression of the retinoschisin protein or fragment thereof encoded by the nucleic acid construct.

In some such compositions, the nuclease agent is a Cas protein and a guide RNA, and the nuclease target sequence is a guide RNA target sequence. Optionally, the Cas protein is Cas9. Optionally, the composition comprises the guide RNA and a messenger RNA encoding the Cas protein. Optionally, the guide RNA and the messenger RNA encoding the Cas protein are in a lipid nanoparticle. Optionally, the composition comprises a DNA encoding the Cas protein and a DNA encoding the guide RNA. Optionally, the DNA encoding the Cas protein and the DNA encoding the guide RNA are in one or more viral vectors. Optionally, the one or more viral vectors are adeno-associated virus (AAV) viral vectors. Optionally, the DNA encoding the Cas protein and the DNA encoding the guide RNA are in a single viral vector (e.g., a single AAV vector). Optionally, the DNA encoding the Cas protein and the DNA encoding the guide RNA are in a separate viral vectors (e.g., a separate AAV vectors).

In some such compositions, the nucleic acid construct is in a viral vector. Optionally, the viral vector is an adeno-associated virus (AAV) viral vector. Optionally, the AAV is selected from the group consisting of: AAV2, AAV5, AAV8, or AAV7m8.

Also provided are compositions comprising a guide RNA or a DNA encoding the guide RNA, wherein the guide RNA comprises a DNA-targeting segment that targets a guide RNA target sequence in an RS1 gene, and wherein the guide RNA binds to a Cas protein and targets the Cas protein to the guide RNA target sequence in the RS1 gene.

In some such compositions or compositions for use, the composition further comprises the Cas protein or a nucleic acid encoding the Cas protein. Optionally, the Cas protein is a Cas9 protein. Optionally, the Cas protein is derived from a *Streptococcus pyogenes* Cas9 protein. In some such compositions or compositions for use, the composition comprises the Cas protein in the form of a protein.

In some such compositions or compositions for use, the composition comprises the nucleic acid encoding the Cas protein, wherein the nucleic acid comprises a DNA encoding the Cas protein, optionally wherein the composition comprises the DNA encoding the guide RNA. Optionally, the composition comprises the nucleic acid encoding the Cas protein, wherein the nucleic acid comprises a DNA encoding the Cas protein, wherein the composition comprises the DNA encoding the guide RNA, and wherein the DNA encoding the Cas protein and the DNA encoding the guide RNA are in one or more viral vectors. Optionally, the one or more viral vectors are adeno-associated virus (AAV) viral vectors. Optionally, the DNA encoding the Cas protein and the DNA encoding the guide RNA are in a single viral vector (e.g., a single AAV vector). Optionally, the DNA encoding the Cas protein and the DNA encoding the guide RNA are in a separate viral vectors (e.g., a separate AAV vectors). Optionally, the AAV is selected from the group consisting of: AAV2, AAV5, AAV8, or AAV7m8.

In some such compositions or compositions for use, the composition comprises the nucleic acid encoding the Cas protein, wherein the nucleic acid comprises a messenger RNA encoding the Cas protein, optionally wherein the composition comprises the guide RNA in the form of RNA. In some such compositions or compositions for use, the composition comprises the nucleic acid encoding the Cas protein, wherein the nucleic acid comprises a messenger RNA encoding the Cas protein, wherein the composition comprises the guide RNA in the form of RNA, and wherein the guide RNA and the messenger RNA encoding the Cas protein are in a lipid nanoparticle.

In some such compositions or compositions for use, the messenger RNA encoding the Cas protein comprises at least one modification. Optionally, the messenger RNA encoding the Cas protein is modified to comprise a modified uridine at one or more or all uridine positions. Optionally, the modified uridine is pseudouridine. Optionally, the messenger RNA encoding the Cas protein is fully substituted with pseudouridine. In some such compositions or compositions for use, the messenger RNA encoding the Cas protein comprises a 5' cap. In some such compositions or compositions for use, the messenger RNA encoding the Cas protein comprises a poly(A) tail. In some such compositions or compositions for use, the messenger RNA encoding the Cas protein comprises the sequence set forth in SEQ ID NO: 6243 or 6245.

In some such compositions or compositions for use, the nucleic acid encoding the Cas protein is codon-optimized for expression in a mammalian cell or a human cell. In some such compositions or compositions for use, the Cas protein comprises the sequence set forth in SEQ ID NO: 27, 6242, or 6246.

In some such compositions or compositions for use, the guide RNA target sequence is in an intron of the RS1 gene. Optionally, the intron is the first intron of the RS1 gene.

In some such compositions or compositions for use, the RS1 gene is a human RS1 gene.

In some such compositions or compositions for use, the DNA-targeting segment comprises: (a) at least 17, at least 18, at least 19, or at least 20 contiguous nucleotides of the sequence set forth in any one of SEQ ID NOS: 3148-6241; (b) at least 17, at least 18, at least 19, or at least 20 contiguous nucleotides of the sequence set forth in any one of SEQ ID NOS: 3148-4989; (c) at least 17, at least 18, at least 19, or at least 20 contiguous nucleotides of the sequence set forth in any one of SEQ ID NOS: 3148-3151, 3154-3186, 3188-3247, and 3249-4351; (d) at least 17, at least 18, at least 19, or at least 20 contiguous nucleotides of the sequence set forth in any one of SEQ ID NOS: 3150, 3151, 3159, 3675, 4297, and 4304; or (e) at least 17, at least 18, at least 19, or at least 20 contiguous nucleotides of the sequence set forth in any one of SEQ ID NOS: 4990-6241.

In some such compositions or compositions for use, the DNA-targeting segment is: (a) at least 90%, at least 91%, at least 92%, at least 93%, at least 94%, at least 95%, at least 96%, at least 97%, at least 98%, or at least 99% identical to the sequence set forth in any one of SEQ ID NOS: 3148-6241; (b) at least 90%, at least 91%, at least 92%, at least 93%, at least 94%, at least 95%, at least 96%, at least 97%, at least 98%, or at least 99% identical to the sequence set forth in any one of SEQ ID NOS: 3148-4989; (c) at least 90%, at least 91%, at least 92%, at least 93%, at least 94%, at least 95%, at least 96%, at least 97%, at least 98%, or at least 99% identical to the sequence set forth in any one of SEQ ID NOS: 3148-3151, 3154-3186, 3188-3247, and 3249-4351; (d) at least 90%, at least 91%, at least 92%, at least 93%, at least 94%, at least 95%, at least 96%, at least 97%, at least 98%, or at least 99% identical to the sequence set forth in any one of SEQ ID NOS: 3150, 3151, 3159, 3675, 4297, and 4304; or (e) at least 90%, at least 91%, at least 92%, at least 93%, at least 94%, at least 95%, at least 96%, at least 97%, at least 98%, or at least 99% identical to the sequence set forth in any one of SEQ ID NOS: 4990-6241.

In some such compositions or compositions for use, the DNA-targeting segment comprises, consists essentially of, or consists of the sequence set forth in: (a) any one of SEQ ID NOS: 3148-6241; (b) any one of SEQ ID NOS: 3148-4989; (c) any one of SEQ ID NOS: 3148-3151, 3154-3186, 3188-3247, and 3249-4351; (d) any one of SEQ ID NOS: 3150, 3151, 3159, 3675, 4297, and 4304; or (e) any one of SEQ ID NOS: 4990-6241.

In some such compositions or compositions for use, the DNA-targeting segment comprises at least 17, at least 18, at least 19, or at least 20 contiguous nucleotides of the sequence set forth in any one of SEQ ID NOS: 3150, 3151, 3159, 3675, 4297, and 4304.

In some such compositions or compositions for use, the DNA-targeting segment is at least 90%, at least 91%, at least 92%, at least 93%, at least 94%, at least 95%, at least 96%, at least 97%, at least 98%, or at least 99% identical to the sequence set forth in any one of SEQ ID NOS: 3150, 3151, 3159, 3675, 4297, and 4304.

In some such compositions or compositions for use, the DNA-targeting segment comprises, consists essentially of, or consist of the sequence set forth in any one of SEQ ID NOS: 3150, 3151, 3159, 3675, 4297, and 4304.

In some such compositions or compositions for use, the composition comprises the guide RNA in the form of RNA. In some such compositions or compositions for use, the composition comprises the DNA encoding the guide RNA.

In some such compositions or compositions for use, the guide RNA comprises at least one modification. In some such compositions or compositions for use, the at least one modification comprises a 2'-O-methyl-modified nucleotide. In some such compositions or compositions for use, the at least one modification comprise a phosphorothioate bond between nucleotides. In some such compositions or compositions for use, the at least one modification comprise a modification at one or more of the first five nucleotides at the 5' end of the guide RNA. In some such compositions or compositions for use, the at least one modification comprises a modification at one or more of the last five nucleotides at the 3' end of the guide RNA. In some such compositions or compositions for use, the at least one modification comprises phosphorothioate bonds between the first four nucleotides at the 5' end of the guide RNA. In some such compositions or compositions for use, the at least one modification comprises phosphorothioate bonds between the last four nucleotides at the 3' end of the guide RNA. In some such compositions or compositions for use, the at least one modification comprises 2'-O-methyl-modified nucleotides at the first three nucleotides at the 5' end of the guide RNA. In some such compositions or compositions for use, the at least one modification comprises 2'-O-methyl-modified nucleotides at the last three nucleotides at the 3' end of the guide RNA. In some such compositions or compositions for use, the at least one modification comprises: (i) phosphorothioate bonds between the first four nucleotides at the 5' end of the guide RNA; (ii) phosphorothioate bonds between the last four nucleotides at the 3' end of the guide RNA; (iii) 2'-O-methyl-modified nucleotides at the first three nucleotides at the 5' end of the guide RNA; and (iv) 2'-O-methyl-modified nucleotides at the last three nucleotides at the 3' end of the guide RNA. In some such compositions or compositions for use, the guide RNA comprises the modified nucleotides of SEQ ID NO: 44.

In some such compositions or compositions for use, the guide RNA is a single guide RNA (sgRNA). Optionally, the guide RNA comprises, consists essentially of, or consists of the sequence set forth in any one of SEQ ID NOS: 33-39 and 53. In some such compositions or compositions for use, the guide RNA is a dual guide RNA (dgRNA) comprising two separate RNA molecules comprising a CRISPR RNA (crRNA) and a trans-activating crRNA (tracrRNA). Optionally, the crRNA comprises the sequence set forth in any one of SEQ ID NOS: 29 and 52. Optionally, the tracrRNA comprises the sequence set forth in any one of SEQ ID NOS: 30-32.

In some such compositions or compositions for use, the composition is associated with a lipid nanoparticle, optionally wherein the composition comprises the guide RNA. In some such compositions or compositions for use, the DNA encoding the guide RNA is in a viral vector. In some such compositions or compositions for use, the viral vector is an adeno-associated virus (AAV) viral vector. Optionally, the DNA encoding the Cas protein and the DNA encoding the guide RNA are in a single viral vector (e.g., a single AAV vector). Optionally, the DNA encoding the Cas protein and the DNA encoding the guide RNA are in a separate viral vectors (e.g., a separate AAV vectors). Optionally, the AAV is selected from the group consisting of: AAV2, AAV5, AAV8, or AAV7m8.

In some such compositions or compositions for use, the composition is a pharmaceutical composition comprising a pharmaceutically acceptable carrier.

In some such compositions or compositions for use, the composition further comprises a second guide RNA or a DNA encoding the second guide RNA, wherein the second guide RNA comprises a DNA-targeting segment that targets a second guide RNA target sequence in the RS1 gene, and wherein the second guide RNA binds to the Cas protein and targets the Cas protein to the second guide RNA target sequence in the RS1 gene.

Also provided are cells comprising any of the above compositions or compositions for use. Optionally, the cell is in vitro. Optionally, the cell is in vivo. Some such cells are mammalian cells. Optionally, the cell is a human cell. Optionally, the cell is a retinal cell.

In some such cells, the cell expresses the first retinoschisin protein or fragment thereof or the second retinoschisin protein or fragment thereof. In some such cells, the nucleic acid construct is genomically integrated at the target genomic locus. Optionally, the target genomic locus is an endogenous RS1 locus. Optionally, the nucleic acid construct is genomically integrated in intron 1 of the endogenous RS1 locus. Optionally, endogenous RS1 exon 1 splices into the first coding sequence or the second coding sequence of the nucleic acid construct. Optionally, the modified RS1 locus comprising the genomically integrated nucleic acid construct encodes a protein comprising, consisting essentially of, or consisting of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 2 or 4.

In some such cells, integration of the nucleic acid construct into the endogenous RS1 locus prevents transcription of the endogenous RS1 gene downstream of the integration site. Optionally, the integration of the nucleic acid construct into the endogenous RS1 locus reduces or eliminates expression of the endogenous retinoschisin protein and replaces it with expression of the retinoschisin protein or fragment thereof encoded by the nucleic acid construct. Optionally, the endogenous RS1 locus comprises a mutated RS1 gene comprising a mutation that causes X-linked juvenile retinoschisis, and expression of the genomically integrated nucleic acid construct reduces or eliminates expression of the mutated RS1 gene.

In another aspect, provided are methods of integrating a coding sequence for a retinoschisin protein or fragment thereof into a target genomic locus and expressing the retinoschisin protein or fragment thereof in a cell. Some such methods comprise administering any of the above nucleic acid constructs, vectors, lipid nanoparticles, or compositions to the cell, wherein the coding sequence is integrated into the target genomic locus and the retinoschisin protein or fragment thereof is expressed in the cell. Optionally, the cell is a mammalian cell. Optionally, the cell is a human cell. Optionally, the cell is a retinal cell. Optionally, the cell is in vitro. Optionally, the cell is in vivo. Optionally, the cell is a retinal cell in vivo, and the administering comprises subretinal injection or intravitreal injection.

In some such methods, the nucleic acid construct and the nuclease agent or the nucleic acid encoding the nuclease agent are administered simultaneously. In some such methods, the nucleic acid construct and the nuclease agent or the nucleic acid encoding the nuclease agent are administered sequentially in any order. Optionally, the nucleic acid construct is administered prior to the nuclease agent or the nucleic acid encoding the nuclease agent. Optionally, the nucleic acid construct is administered subsequent to the nuclease agent or the nucleic acid encoding the nuclease agent. Optionally, the time between the sequential administration is about 2 hours to about 48 hours. In some such methods, the nucleic acid construct and the nuclease agent or the nucleic acid encoding the nuclease agent are administered in the same delivery vehicle. In some such methods, the nucleic acid construct and the nuclease agent or the nucleic acid encoding the nuclease agent are administered in different delivery vehicles.

In some such methods, the target genomic locus is in an endogenous RS1 gene. Optionally, the nuclease target sequence in the target genomic locus is in the first intron in the endogenous RS1 gene. Optionally, the nucleic acid construct is genomically integrated in intron 1 of the endogenous RS1 locus, and wherein endogenous RS1 exon 1 splices into the coding sequence for the retinoschisin protein or fragment thereof in the nucleic acid construct. Optionally, the modified RS1 locus comprising the genomically integrated nucleic acid construct encodes a protein comprising, consisting essentially of, or consisting of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 2 or 4. In some such methods, integration of the nucleic acid construct into the endogenous RS1 locus prevents transcription of the endogenous RS1 gene downstream of the integration site. Optionally, the integration of the nucleic acid construct into the endogenous RS1 locus reduces or eliminates expression of the endogenous retinoschisin protein from the endogenous RS1 locus and replaces it with expression of the retinoschisin protein or fragment thereof encoded by the nucleic acid construct.

In another aspect, provided are methods of treating a subject with X-linked juvenile retinoschisis. Some such methods can comprise administering any of the above nucleic acid constructs, vectors, lipid nanoparticles, or compositions to the subject, wherein the nucleic acid construct is integrated into and expressed from the target genomic locus in one or more retinal cells of the subject, and wherein a therapeutically effective level of retinoschisin expression is achieved in the subject. In some such methods, the subject is a human. In some such methods, the subject has an endogenous RS1 gene comprising at least one mutation associated with or that causes X-linked juvenile retinoschisis. Optionally, the mutation is a R141C mutation. In some such methods, the administering comprises subretinal injection or intravitreal injection. In some such methods, integration of the nucleic acid construct results in retinal structural restoration.

In some such methods, the nucleic acid construct and the nuclease agent or the nucleic acid encoding the nuclease agent are administered simultaneously. In some such methods, the nucleic acid construct and the nuclease agent or the nucleic acid encoding the nuclease agent are administered sequentially in any order. Optionally, the nucleic acid construct is administered prior to the nuclease agent or the nucleic acid encoding the nuclease agent. Optionally, the nucleic acid construct is administered subsequent to the nuclease agent or the nucleic acid encoding the nuclease agent. Optionally, the time between the sequential administration is about 2 hours to about 48 hours. In some such methods, the nucleic acid construct and the nuclease agent or the nucleic acid encoding the nuclease agent are administered in the same delivery vehicle. In some such methods, the nucleic acid construct and the nuclease agent or the nucleic acid encoding the nuclease agent are administered in different delivery vehicles.

In some such methods, the target genomic locus is in an endogenous RS1 gene. Optionally, the nuclease target sequence in the target genomic locus is in the first intron in the endogenous RS1 gene. Optionally, the nucleic acid construct is genomically integrated in intron 1 of the endogenous RS1 locus, and wherein endogenous RS1 exon 1 splices into the coding sequence for the retinoschisin protein or fragment thereof in the nucleic acid construct. Optionally, the modified RS1 locus comprising the genomically integrated nucleic acid construct encodes a protein comprising, consisting essentially of, or consisting of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 2 or 4. In some such methods, integration of the nucleic acid construct into the endogenous RS1 locus prevents transcription of the endogenous RS1 gene downstream of the integration site. Optionally, the integration of the nucleic acid construct into the endogenous RS1 locus reduces or eliminates expression of the endogenous retinoschisin protein from the endogenous RS1 locus and replaces it with expression of the retinoschisin protein or fragment thereof encoded by the nucleic acid construct.

In another aspect, provided are methods of modifying an RS1 gene in a cell. Some such methods comprise administering to the cell any of the above compositions comprising the guide RNA or the DNA encoding the guide RNA and the Cas protein or the nucleic acid encoding the Cas protein, wherein the guide RNA binds to the Cas protein and targets the Cas protein to the guide RNA target sequence in the RS1 gene, and the Cas protein cleaves the guide RNA target sequence. In some such methods, the cell is a mammalian cell. Optionally, the cell is a human cell. Optionally, the cell is a retinal cell. Optionally, the cell is in vitro. Optionally, the cell is in vivo. In some such methods, the cell is a retinal cell, and the administering comprises subretinal injection or intravitreal injection. In some such methods, the guide RNA target sequence is in the first intron in the RS1 gene.

BRIEF DESCRIPTION OF THE FIGURES

FIG. 5 shows NGS results from mouse retina samples in eyes from $Rosa^{Cas9}/+$. $Rs1^{R141C/Y}$ mice injected with RS1 viral vector version 1 (pssAAV mhRS1-sgu), RS1 viral vector version 2 (pscAAV rs1_tandem), or RSJ viral vector version 3 (pssAAV hRs1_HITI). Read counts for the four expected sequence variants are shown: (1) WT mouse, the mouse reference sequence not containing the R141C mutant; (2) mutant mouse, the mouse reference sequence harboring the R141C mutant; (3) humanized transcript 1, the human reference sequence; and (4) humanized transcript 2, the mouse codon-optimized human reference sequence. Next generation targeted resequencing amplicons were designed for the regions depicted in FIG. 3 (horizontal arrows). mRNA from the mouse retinas was used to generate cDNA to act as a template for next generation sequencing (NGS) amplification.

FIGS. 6A and 6B show NGS results from mouse retina samples in eyes from $Rosa^{Cas9}/+$; $Rs1^{R141C/Y}$ mice injected with RS1 viral vector version 1 (mhRS1-sgu), RS1 viral vector version 2 (pscAAV_rs1_tandem), or RS1 viral vector version 3 (hRs1_cDNA HITI). For these NGS results, a separate amplicon was used to amplify the Rs1 intron 1 guide RNA target sequence. Reads that matched the mouse reference sequence or contained non-homologous end joining were quantified to assess how often the guide RNA cut without making an insertion.

FIG. 7A), RS1 viral vector version 2 (pscAAV rs1_tandem; FIG. 7B), or RS1 viral vector version 3 (pssAAV hRs1_HITI; FIG. 7C). Read counts for the four expected sequence variants are shown: (1) WT mouse, the mouse reference sequence not containing the R141C mutant; (2) mutant mouse, the mouse reference sequence harboring the R141C mutant; (3) humanized transcript 1, the human reference sequence; and (4) humanized transcript 2, the mouse codon-optimized human reference sequence. Next generation targeted resequencing amplicons were designed for the regions depicted in FIG. 3 (horizontal arrows). mRNA from the mouse retinas was used to generate cDNA to act as a template for next generation sequencing (NGS) amplification. Reads that matched the mouse reference sequence or contained non-homologous end joining were quantified to assess how often the guide RNA cut without making an insertion.

FIG. 8A) or RS1 viral vector version 2 (pscAAV rs1_tandem; FIG. 8B) two hours before treatment with lipid nanoparticles formulated with Cas9 mRNA and one of six guide RNAs targeted to human RS1 intron 1. Delta Ct values are shown (the lower the number, the higher the expression). "Ho" refers to human reference sequence, and "Mo" refers to human reference sequence codon-optimized for mouse expression.

FIG. 9A) or RS1 viral vector version 2 (pscAAV rs1_tandem; FIG. 9B) two hours after treatment with lipid nanoparticles formulated with Cas9 mRNA and one of six guide RNAs targeted to human RS1 intron 1. Delta Ct values are shown (the lower the number, the higher the expression). "Ho" refers to human reference sequence, and "Mo" refers to human reference sequence codon-optimized for mouse expression.

DEFINITIONS

Figure 1:
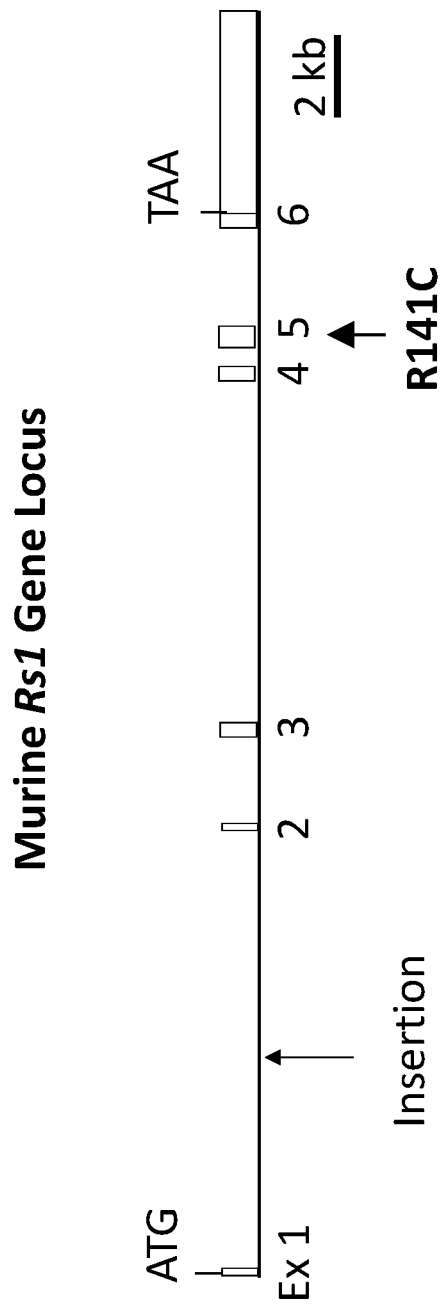
FIG. 1 (not to scale) shows a schematic of the murine Rs1 locus, including the location of the R141C mutation associated with X-linked juvenile retinoschisis (XLRS) and the insertion site for a nucleic acid construct comprising exons 2-6 of human RS1.

The terms "protein," "polypeptide," and "peptide," used interchangeably herein, include polymeric forms of amino acids of any length, including coded and non-coded amino acids and chemically or biochemically modified or derivatized amino acids. The terms also include polymers that have been modified, such as polypeptides having modified peptide backbones. The term "domain" refers to any part of a protein or polypeptide having a particular function or structure.

The terms "nucleic acid" and "polynucleotide," used interchangeably herein, include polymeric forms of nucleotides of any length, including ribonucleotides, deoxyribonucleotides, or analogs or modified versions thereof. They include single-, double-, and multi-stranded DNA or RNA, genomic DNA, cDNA, DNA-RNA hybrids, and polymers comprising purine bases, pyrimidine bases, or other natural, chemically modified, biochemically modified, non-natural, or derivatized nucleotide bases.

The term "genomically integrated" refers to a nucleic acid that has been introduced into a cell such that the nucleotide sequence integrates into the genome of the cell. Any protocol may be used for the stable incorporation of a nucleic acid into the genome of a cell.

The term "expression vector" or "expression construct" or "expression cassette" refers to a recombinant nucleic acid containing a desired coding sequence operably linked to appropriate nucleic acid sequences necessary for the expression of the operably linked coding sequence in a particular host cell or organism. Nucleic acid sequences necessary for expression in prokaryotes usually include a promoter, an operator (optional), and a ribosome binding site, as well as other sequences. Eukaryotic cells are generally known to utilize promoters, enhancers, and termination and polyadenylation signals, although some elements may be deleted and other elements added without sacrificing the necessary expression.

The term "viral vector" refers to a recombinant nucleic acid that includes at least one element of viral origin and includes elements sufficient for or permissive of packaging into a viral vector particle. The vector and/or particle can be utilized for the purpose of transferring DNA, RNA, or other nucleic acids into cells either ex vivo or in vivo. Numerous forms of viral vectors are known.

The term "isolated" with respect to proteins, nucleic acids, and cells includes proteins, nucleic acids, and cells that are relatively purified with respect to other cellular or organism components that may normally be present in situ, up to and including a substantially pure preparation of the protein, nucleic acid, or cell. The term "isolated" may include proteins and nucleic acids that have no naturally occurring counterpart or proteins or nucleic acids that have been chemically synthesized and are thus substantially uncontaminated by other proteins or nucleic acids. The term "isolated" may include proteins, nucleic acids, or cells that have been separated or purified from most other cellular components or organism components with which they are naturally accompanied (e.g., but not limited to, other cellular proteins, nucleic acids, or cellular or extracellular components).

The term "wild type" includes entities having a structure and/or activity as found in a normal (as contrasted with mutant, diseased, altered, or so forth) state or context. Wild type genes and polypeptides often exist in multiple different forms (e.g., alleles).

The term "endogenous sequence" refers to a nucleic acid sequence that occurs naturally within a cell or animal. For example, an endogenous RS1 sequence of an animal refers to a native RS1 sequence that naturally occurs at the RS1 locus in the animal.

"Exogenous" molecules or sequences include molecules or sequences that are not normally present in a cell in that form. Normal presence includes presence with respect to the particular developmental stage and environmental conditions of the cell. An exogenous molecule or sequence, for example, can include a mutated version of a corresponding endogenous sequence within the cell, such as a humanized version of the endogenous sequence, or can include a sequence corresponding to an endogenous sequence within the cell but in a different form (i.e., not within a chromosome). In contrast, endogenous molecules or sequences include molecules or sequences that are normally present in that form in a particular cell at a particular developmental stage under particular environmental conditions.

The term "heterologous" when used in the context of a nucleic acid or a protein indicates that the nucleic acid or protein comprises at least two segments that do not naturally occur together in the same molecule. For example, the term "heterologous," when used with reference to segments of a nucleic acid or segments of a protein, indicates that the nucleic acid or protein comprises two or more sub-sequences that are not found in the same relationship to each other (e.g., joined together) in nature. As one example, a "heterologous" region of a nucleic acid vector is a segment of nucleic acid within or attached to another nucleic acid molecule that is not found in association with the other molecule in nature. For example, a heterologous region of a nucleic acid vector could include a coding sequence flanked by sequences not found in association with the coding sequence in nature. Likewise, a "heterologous" region of a protein is a segment of amino acids within or attached to another peptide molecule that is not found in association with the other peptide molecule in nature (e.g., a fusion protein, or a protein with a tag). Similarly, a nucleic acid or protein can comprise a heterologous label or a heterologous secretion or localization sequence.

"Codon optimization" takes advantage of the degeneracy of codons, as exhibited by the multiplicity of three-base pair codon combinations that specify an amino acid, and generally includes a process of modifying a nucleic acid sequence for enhanced expression in particular host cells by replacing at least one codon of the native sequence with a codon that is more frequently or most frequently used in the genes of the host cell while maintaining the native amino acid sequence. For example, a nucleic acid encoding a Cas9 protein can be modified to substitute codons having a higher frequency of usage in a given prokaryotic or eukaryotic cell, including a bacterial cell, a yeast cell, a human cell, a non-human cell, a mammalian cell, a rodent cell, a mouse cell, a rat cell, a hamster cell, or any other host cell, as compared to the naturally occurring nucleic acid sequence. Codon usage tables are readily available, for example, at the "Codon Usage Database." These tables can be adapted in a number of ways. See Nakamura et al. (2000) *Nucleic Acids Research* 28:292, herein incorporated by reference in its entirety for all purposes. Computer algorithms for codon optimization of a particular sequence for expression in a particular host are also available (see, e.g., Gene Forge).

The term "locus" refers to a specific location of a gene (or significant sequence), DNA sequence, polypeptide-encoding sequence, or position on a chromosome of the genome of an organism. For example, an "RS1 locus" may refer to the specific location of an RS1 gene, RS1 DNA sequence, retinoschisin-encoding sequence, or RS1 position on a chromosome of the genome of an organism that has been identified as to where such a sequence resides. An "RS1 locus" may comprise a regulatory element of an RS1 gene, including, for example, an enhancer, a promoter, 5' and/or 3' untranslated region (UTR), or a combination thereof.

The term "gene" refers to DNA sequences in a chromosome that may contain, if naturally present, at least one coding and at least one non-coding region. The DNA sequence in a chromosome that codes for a product (e.g., but not limited to, an RNA product and/or a polypeptide product) can include the coding region interrupted with non-coding introns and sequence located adjacent to the coding region on both the 5' and 3' ends such that the gene corresponds to the full-length mRNA (including the 5' and 3' untranslated sequences). Additionally, other non-coding sequences including regulatory sequences (e.g., but not limited to, promoters, enhancers, and transcription factor binding sites), polyadenylation signals, internal ribosome entry sites, silencers, insulating sequence, and matrix attachment regions may be present in a gene. These sequences may be close to the coding region of the gene (e.g., but not limited to, within 10 kb) or at distant sites, and they influence the level or rate of transcription and translation of the gene.

The term "allele" refers to a variant form of a gene. Some genes have a variety of different forms, which are located at the same position, or genetic locus, on a chromosome. A diploid organism has two alleles at each genetic locus. Each pair of alleles represents the genotype of a specific genetic locus. Genotypes are described as homozygous if there are two identical alleles at a particular locus and as heterozygous if the two alleles differ.

A "promoter" is a regulatory region of DNA usually comprising a TATA box capable of directing RNA polymerase II to initiate RNA synthesis at the appropriate transcription initiation site for a particular polynucleotide sequence. A promoter may additionally comprise other regions which influence the transcription initiation rate. The promoter sequences disclosed herein modulate transcription of an operably linked polynucleotide. A promoter can be active in one or more of the cell types disclosed herein (e.g., a eukaryotic cell, a non-human mammalian cell, a human cell, a rodent cell, a pluripotent cell, a one-cell stage embryo, a differentiated cell, or a combination thereof). A promoter can be, for example, a constitutively active promoter, a conditional promoter, an inducible promoter, a temporally restricted promoter (e.g., a developmentally regulated promoter), or a spatially restricted promoter (e.g., a cell-specific or tissue-specific promoter). Examples of promoters can be found, for example, in WO 2013/176772, herein incorporated by reference in its entirety for all purposes.

A constitutive promoter is one that is active in all tissues or particular tissues at all developing stages. Examples of constitutive promoters include the human cytomegalovirus immediate early (hCMV), mouse cytomegalovirus immediate early (mCMV), human elongation factor 1 alpha (hEF1α), mouse elongation factor 1 alpha (mEF1α), mouse phosphoglycerate kinase (PGK), chicken beta actin hybrid (CAG or CBh), SV40 early, and beta 2 tubulin promoters.

Examples of inducible promoters include, for example, chemically regulated promoters and physically-regulated promoters. Chemically regulated promoters include, for example, alcohol-regulated promoters (e.g., an alcohol dehydrogenase (alcA) gene promoter), tetracycline-regulated promoters (e.g., a tetracycline-responsive promoter, a tetracycline operator sequence (tetO), a tet-On promoter, or a tet-Off promoter), steroid regulated promoters (e.g., a rat glucocorticoid receptor, a promoter of an estrogen receptor, or a promoter of an ecdysone receptor), or metal-regulated promoters (e.g., a metalloprotein promoter). Physically regulated promoters include, for example temperature-regulated promoters (e.g., a heat shock promoter) and light-regulated promoters (e.g., a light-inducible promoter or a light-repressible promoter).

Tissue-specific promoters can be, for example, neuron-specific promoters, glia-specific promoters, muscle cell-specific promoters, heart cell-specific promoters, kidney cell-specific promoters, bone cell-specific promoters, endothelial cell-specific promoters, or immune cell-specific promoters (e.g., a B cell promoter or a T cell promoter).

Developmentally regulated promoters include, for example, promoters active only during an embryonic stage of development, or only in an adult cell.

"Operable linkage" or being "operably linked" includes juxtaposition of two or more components (e.g., a promoter and another sequence element) such that both components function normally and allow the possibility that at least one of the components can mediate a function that is exerted upon at least one of the other components. For example, a promoter can be operably linked to a coding sequence if the promoter controls the level of transcription of the coding sequence in response to the presence or absence of one or more transcriptional regulatory factors. Operable linkage can include such sequences being contiguous with each other or acting in trans (e.g., a regulatory sequence can act at a distance to control transcription of the coding sequence).

"Complementarity" of nucleic acids means that a nucleotide sequence in one strand of nucleic acid, due to orientation of its nucleobase groups, forms hydrogen bonds with another sequence on an opposing nucleic acid strand. The complementary bases in DNA are typically A with T and C with G. In RNA, they are typically C with G and U with A. Complementarity can be perfect or substantial/sufficient. Perfect complementarity between two nucleic acids means that the two nucleic acids can form a duplex in which every base in the duplex is bonded to a complementary base by Watson-Crick pairing. "Substantial" or "sufficient" complementary means that a sequence in one strand is not completely and/or perfectly complementary to a sequence in an opposing strand, but that sufficient bonding occurs between bases on the two strands to form a stable hybrid complex in set of hybridization conditions (e.g., salt concentration and temperature). Such conditions can be predicted by using the sequences and standard mathematical calculations to predict the Tm (melting temperature) of hybridized strands, or by empirical determination of Tm by using routine methods. Tm includes the temperature at which a population of hybridization complexes formed between two nucleic acid strands are 50% denatured (i.e., a population of double-stranded nucleic acid molecules becomes half dissociated into single strands). At a temperature below the Tm, formation of a hybridization complex is favored, whereas at a temperature above the Tm, melting or separation of the strands in the hybridization complex is favored. Tm may be estimated for a nucleic acid having a known G+C content in an aqueous 1 M NaCl solution by using, e.g., Tm=81.5+ 0.41(% G+C), although other known Tm computations consider nucleic acid structural characteristics.

Hybridization requires that the two nucleic acids contain complementary sequences, although mismatches between bases are possible. The conditions appropriate for hybridization between two nucleic acids depend on the length of the nucleic acids and the degree of complementation, variables which are well known. The greater the degree of complementation between two nucleotide sequences, the greater the value of the melting temperature (Tm) for hybrids of nucleic acids having those sequences. For hybridizations between nucleic acids with short stretches of complementarity (e.g. complementarity over 35 or fewer, 30 or fewer, 25 or fewer, 22 or fewer, 20 or fewer, or 18 or fewer nucleotides) the position of mismatches becomes important (see Sambrook et al., supra, 11.7-11.8). Typically, the length for a hybridizable nucleic acid is at least about 10 nucleotides. Illustrative minimum lengths for a hybridizable nucleic acid include at least about 15 nucleotides, at least about 20 nucleotides, at least about 22 nucleotides, at least about 25 nucleotides, and at least about 30 nucleotides. Furthermore, the temperature and wash solution salt concentration may be adjusted as necessary according to factors such as length of the region of complementation and the degree of complementation.

The sequence of polynucleotide need not be 100% complementary to that of its target nucleic acid to be specifically hybridizable. Moreover, a polynucleotide may hybridize over one or more segments such that intervening or adjacent segments are not involved in the hybridization event (e.g., a loop structure or hairpin structure). A polynucleotide (e.g., gRNA) can comprise at least 70%, at least 80%, at least 90%, at least 95%, at least 99%, or 100% sequence complementarity to a target region within the target nucleic acid sequence to which they are targeted. For example, a gRNA in which 18 of 20 nucleotides are complementary to a target region, and would therefore specifically hybridize, would represent 90% complementarity. In this example, the remaining noncomplementary nucleotides may be clustered or interspersed with complementary nucleotides and need not be contiguous to each other or to complementary nucleotides.

Percent complementarity between particular stretches of nucleic acid sequences within nucleic acids can be determined routinely using BLAST programs (basic local alignment search tools) and PowerBLAST programs (Altschul et al. (1990) *J. Mol. Biol.* 215:403-410; Zhang and Madden (1997) *Genome Res.* 7:649-656) or by using the Gap program (Wisconsin Sequence Analysis Package, Version 8 for Unix, Genetics Computer Group, University Research Park, Madison Wis.), using default settings, which uses the algorithm of Smith and Waterman (Adv. Appl. Math., 1981, 2, 482-489).

The methods and compositions provided herein employ a variety of different components. Some components throughout the description can have active variants and fragments. Such components include, for example, Cas proteins, CRISPR RNAs, tracrRNAs, and guide RNAs. Biological activity for each of these components is described elsewhere herein. The term "functional" refers to the innate ability of a protein or nucleic acid (or a fragment or variant thereof) to exhibit a biological activity or function. Such biological activities or functions can include, for example, the ability of a Cas protein to bind to a guide RNA and to a target DNA sequence. The biological functions of functional fragments or variants may be the same or may in fact be changed (e.g., with respect to their specificity or selectivity or efficacy) in comparison to the original molecule, but with retention of the molecule's basic biological function.

The term "variant" refers to a nucleotide sequence differing from the sequence most prevalent in a population (e.g., by one nucleotide) or a protein sequence different from the sequence most prevalent in a population (e.g., by one amino acid).

The term "fragment," when referring to a protein, means a protein that is shorter or has fewer amino acids than the full-length protein. The term "fragment," when referring to a nucleic acid, means a nucleic acid that is shorter or has fewer nucleotides than the full-length nucleic acid. A fragment can be, for example, when referring to a protein fragment, an N-terminal fragment (i.e., removal of a portion of the C-terminal end of the protein), a C-terminal fragment (i.e., removal of a portion of the N-terminal end of the protein), or an internal fragment (i.e., removal of a portion of an internal portion of the protein).

"Sequence identity" or "identity" in the context of two polynucleotides or polypeptide sequences refers to the residues in the two sequences that are the same when aligned for maximum correspondence over a specified comparison window. When percentage of sequence identity is used in reference to proteins, residue positions which are not identical often differ by conservative amino acid substitutions, where amino acid residues are substituted for other amino acid residues with similar chemical properties (e.g., charge or hydrophobicity) and therefore do not change the functional properties of the molecule. When sequences differ in conservative substitutions, the percent sequence identity may be adjusted upwards to correct for the conservative nature of the substitution. Sequences that differ by such conservative substitutions are said to have "sequence similarity" or "similarity." Means for making this adjustment are well known. Typically, this involves scoring a conservative substitution as a partial rather than a full mismatch, thereby increasing the percentage sequence identity. Thus, for example, where an identical amino acid is given a score of 1 and a non-conservative substitution is given a score of zero, a conservative substitution is given a score between zero and 1. The scoring of conservative substitutions is calculated, e.g., as implemented in the program PC/GENE (Intelligenetics, Mountain View, California).

"Percentage of sequence identity" includes the value determined by comparing two optimally aligned sequences (greatest number of perfectly matched residues) over a comparison window, wherein the portion of the polynucleotide sequence in the comparison window may comprise additions or deletions (i.e., gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison, and multiplying the result by 100 to yield the percentage of sequence identity. Unless otherwise specified (e.g., the shorter sequence includes a linked heterologous sequence), the comparison window is the full length of the shorter of the two sequences being compared.

Unless otherwise stated, sequence identity/similarity values include the value obtained using GAP Version 10 using the following parameters: % identity and % similarity for a nucleotide sequence using GAP Weight of 50 and Length Weight of 3, and the nwsgapdna.cmp scoring matrix; % identity and % similarity for an amino acid sequence using GAP Weight of 8 and Length Weight of 2, and the BLOSUM62 scoring matrix; or any equivalent program thereof. "Equivalent program" includes any sequence comparison program that, for any two sequences in question, generates an alignment having identical nucleotide or amino acid residue matches and an identical percent sequence identity when compared to the corresponding alignment generated by GAP Version 10.

The term "conservative amino acid substitution" refers to the substitution of an amino acid that is normally present in the sequence with a different amino acid of similar size, charge, or polarity. Examples of conservative substitutions include the substitution of a non-polar (hydrophobic) residue such as isoleucine, valine, or leucine for another non-polar residue. Likewise, examples of conservative substitutions include the substitution of one polar (hydrophilic) residue for another such as between arginine and lysine, between glutamine and asparagine, or between glycine and serine. Additionally, the substitution of a basic residue such as lysine, arginine, or histidine for another, or the substitution of one acidic residue such as aspartic acid or glutamic acid for another acidic residue are additional examples of conservative substitutions. Examples of non-conservative substitutions include the substitution of a non-polar (hydrophobic) amino acid residue such as isoleucine, valine, leucine, alanine, or methionine for a polar (hydrophilic) residue such as cysteine, glutamine, glutamic acid or lysine and/or a polar residue for a non-polar residue. Typical amino acid categorizations are summarized in Table 1 below.

TABLE 1

Amino Acid Categorizations.

| Alanine | Ala | A | Nonpolar | Neutral | 1.8 |
|---|---|---|---|---|---|
| Arginine | Arg | R | Polar | Positive | −4.5 |
| Asparagine | Asn | N | Polar | Neutral | −3.5 |
| Aspartic acid | Asp | D | Polar | Negative | −3.5 |
| Cysteine | Cys | C | Nonpolar | Neutral | 2.5 |
| Glutamic acid | Glu | E | Polar | Negative | −3.5 |
| Glutamine | Gln | Q | Polar | Neutral | −3.5 |
| Glycine | Gly | G | Nonpolar | Neutral | −0.4 |
| Histidine | His | H | Polar | Positive | −3.2 |
| Isoleucine | Ile | I | Nonpolar | Neutral | 4.5 |
| Leucine | Leu | L | Nonpolar | Neutral | 3.8 |
| Lysine | Lys | K | Polar | Positive | −3.9 |
| Methionine | Met | M | Nonpolar | Neutral | 1.9 |
| Phenylalanine | Phe | F | Nonpolar | Neutral | 2.8 |
| Proline | Pro | P | Nonpolar | Neutral | −1.6 |
| Serine | Ser | S | Polar | Neutral | −0.8 |
| Threonine | Thr | T | Polar | Neutral | −0.7 |
| Tryptophan | Trp | W | Nonpolar | Neutral | −0.9 |
| Tyrosine | Tyr | Y | Polar | Neutral | −1.3 |
| Valine | Val | V | Nonpolar | Neutral | 4.2 |

A "homologous" sequence (e.g., nucleic acid sequence) includes a sequence that is either identical or substantially similar to a known reference sequence, such that it is, for example, at least 50%, at least 55%, at least 60%, at least 65%, at least 70%, at least 75%, at least 80%, at least 85%, at least 90%, at least 95%, at least 96%, at least 97%, at least 98%, at least 99%, or 100% identical to the known reference sequence. Homologous sequences can include, for example, orthologous sequence and paralogous sequences. Homologous genes, for example, typically descend from a common ancestral DNA sequence, either through a speciation event (orthologous genes) or a genetic duplication event (paralogous genes). "Orthologous" genes include genes in different species that evolved from a common ancestral gene by speciation. Orthologs typically retain the same function in the course of evolution. "Paralogous" genes include genes related by duplication within a genome. Paralogs can evolve new functions in the course of evolution.

The term "in vitro" includes artificial environments and to processes or reactions that occur within an artificial environment (e.g., a test tube or an isolated cell or cell line). The term "in vivo" includes natural environments (e.g., a cell or organism or body) and to processes or reactions that occur within a natural environment. The term "ex vivo" includes cells that have been removed from the body of an individual and processes or reactions that occur within such cells.

Repair in response to double-strand breaks (DSBs) occurs principally through two conserved DNA repair pathways: homologous recombination (HR) and non-homologous end joining (NHEJ). See Kasparek & Humphrey (2011) *Seminars in Cell & Dev. Biol.* 22:886-897, herein incorporated by reference in its entirety for all purposes. Likewise, repair of a target nucleic acid mediated by an exogenous donor nucleic acid can include any process of exchange of genetic information between the two polynucleotides.

The term "recombination" includes any process of exchange of genetic information between two polynucleotides and can occur by any mechanism. Recombination can occur via homology directed repair (HDR) or homologous recombination (HR). HDR or HR includes a form of nucleic acid repair that can require nucleotide sequence homology, uses a "donor" molecule as a template for repair of a "target" molecule (i.e., the one that experienced the double-strand break), and leads to transfer of genetic information from the donor to target. Without wishing to be bound by any particular theory, such transfer can involve mismatch correction of heteroduplex DNA that forms between the broken target and the donor, and/or synthesis-dependent strand annealing, in which the donor is used to resynthesize genetic information that will become part of the target, and/or related processes. In some cases, the donor polynucleotide, a portion of the donor polynucleotide, a copy of the donor polynucleotide, or a portion of a copy of the donor polynucleotide integrates into the target DNA. See Wang et al. (2013) *Cell* 153:910-918; Mandalos et al. (2012) *PLOS ONE* 7:e45768:1-9; and Wang et al. (2013) *Nat Biotechnol.* 31:530-532, each of which is herein incorporated by reference in its entirety for all purposes.

Non-homologous end joining (NHEJ) includes the repair of double-strand breaks in a nucleic acid by direct ligation of the break ends to one another or to an exogenous sequence without the need for a homologous template. Ligation of non-contiguous sequences by NHEJ can often result in deletions, insertions, or translocations near the site of the double-strand break. For example, NHEJ can also result in the targeted integration of an exogenous donor nucleic acid through direct ligation of the break ends with the ends of the exogenous donor nucleic acid (i.e., NHEJ-based capture). Such NHEJ-mediated targeted integration can be preferred for insertion of an exogenous donor nucleic acid when homology directed repair (HDR) pathways are not readily usable (e.g., in non-dividing cells, primary cells, and cells which perform homology-based DNA repair poorly). In addition, in contrast to homology-directed repair, knowledge concerning large regions of sequence identity flanking the cleavage site is not needed, which can be beneficial when attempting targeted insertion into organisms that have genomes for which there is limited knowledge of the genomic sequence. The integration can proceed via ligation of blunt ends between the exogenous donor nucleic acid and the cleaved genomic sequence, or via ligation of sticky ends (i.e., having 5' or 3' overhangs) using an exogenous donor nucleic acid that is flanked by overhangs that are compatible with those generated by a nuclease agent in the cleaved genomic sequence. See, e.g., US 2011/020722, WO 2014/033644, WO 2014/089290, and Maresca et al. (2013) *Genome Res.* 23(3):539-546, each of which is herein incorporated by reference in its entirety for all purposes. If blunt ends are ligated, target and/or donor resection may be needed to generation regions of microhomology needed for fragment joining, which may create unwanted alterations in the target sequence.

Compositions or methods "comprising" or "including" one or more recited elements may include other elements not specifically recited. For example, a composition that "comprises" or "includes" a protein may contain the protein alone or in combination with other ingredients. The transitional phrase "consisting essentially of" means that the scope of a claim is to be interpreted to encompass the specified elements recited in the claim and those that do not materially affect the basic and novel characteristic(s) of the claimed invention. Thus, the term "consisting essentially of" when used in a claim of this invention is not intended to be interpreted to be equivalent to "comprising."

"Optional" or "optionally" means that the subsequently described event or circumstance may or may not occur and that the description includes instances in which the event or circumstance occurs and instances in which the event or circumstance does not.

Designation of a range of values includes all integers within or defining the range, and all subranges defined by integers within the range.

Unless otherwise apparent from the context, the term "about" encompasses values ±5 of a stated value.

The term "and/or" refers to and encompasses any and all possible combinations of one or more of the associated listed items, as well as the lack of combinations when interpreted in the alternative ("or").

The term "or" refers to any one member of a particular list and also includes any combination of members of that list.

The singular forms of the articles "a," "an," and "the" include plural references unless the context clearly dictates otherwise. For example, the term "a protein" or "at least one protein" can include a plurality of proteins, including mixtures thereof.

Statistically significant means $p \leq 0.05$.

DETAILED DESCRIPTION

I. Overview

X-linked juvenile retinoschisis (XLRS) is juvenile-onset macular degeneration caused by mutations in retinoschisin (RS1). The RS1 gene encodes a 24 kDa discoidin-domain-containing protein that is secreted as a homo-oligomeric complex. Gene mutations of RS1 lead to either a non-functional protein or the absence of protein secretion, which causes schisis or splitting within the retinal layers leading to early and progressive vision loss. More than 200 different mutations in the RS1 gene are known to cause XLRS. Forty percent of the disease-causing mutations are nonsense or frameshift mutations that are predicted to result in the absence of a full-length retinoschisin protein. Fifty percent of the disease-causing mutations are missense mutations that allow for production of full-length mutant protein. Most of these are in the discoidin domain and result in misfolded protein retained in ER.

Because XLRS is a recessive disease caused by the loss in retinoschisin function, gene replacement therapy is as a potential treatment for this disease. Furthermore, because retinoschisin functions as an extracellular protein, beneficial treatment is not necessarily restricted to the transfected cell expressing the replacement gene but can encompass a wider area due to the spread of the secreted protein from the site of expression.

Provided herein are nucleic acid constructs and compositions that allow insertion of a retinoschisin coding sequence into a target genomic locus such as an endogenous RS1 locus and/or expression of the retinoschisin coding sequence. The nucleic acid constructs and compositions can be used in methods for integration into a target genomic locus and/or expression in a cell or in methods of treating X-linked juvenile retinoschisis. Also provided are nuclease agents (e.g., targeting an endogenous RS1 locus) or nucleic acids encoding nuclease agents to facilitate integration of the nucleic acid constructs into a target genomic locus such as an endogenous RS1 locus.

Integration of the nucleic acid construct into an endogenous RS1 locus, such as intron 1 of RS1, can prevent transcription of the endogenous RS1 gene downstream of the integration site. The integration of the nucleic acid construct into the endogenous RS1 locus can reduce or eliminate expression of the endogenous retinoschisin protein (e.g., an endogenous retinoschisin protein with an XLRS-causing mutation) and replace it with expression of the retinoschisin protein or fragment or variant thereof encoded by the nucleic acid construct (e.g., retinoschisin without an XLRS-causing mutation). In one example, integration of the nucleic acid construct into the endogenous RS1 locus reduces expression of the endogenous retinoschisin protein. In another example, integration of the nucleic acid construct into the endogenous RS1 locus eliminates expression of the endogenous retinoschisin protein. In this way, integration of the nucleic acid construct can simultaneously knock out the endogenous RS1 gene (e.g., an endogenous RS1 gene comprising one or more mutations associated with or that cause XLRS, such as R141C) and knock in a replacement retinoschisin coding sequence (e.g., a replacement retinoschisin coding sequence that does not comprise mutations associated with or that cause XLRS).

II. Nucleic Acid Constructs Comprising a Retinoschisin Coding Sequence for Integration into and Expression from a Target Genomic Locus Provided herein are nucleic acid constructs (i.e., exogenous donor nucleic acids) comprising a retinoschisin coding sequence (i.e., encoding a retinoschisin protein or fragment or variant thereof) for integration into and expression from a target genomic locus. The nucleic acid constructs can be isolated nucleic acid constructs.

Retinoschisin (X-linked juvenile retinoschisis protein) is a protein required for normal structure and function of the retina. An exemplary human retinoschisin protein is assigned UniProt Accession No. O15537 and has the sequence set forth in SEQ ID NO: 2. Orthologs in other species are also known. For example, an exemplary mouse retinoschisin protein is assigned UniProt Accession No. Q9Z1L4 and has the sequence set forth in SEQ ID NO: 1. Retinoschisin is encoded by the RS1 gene (also known as XLRS1). The human RS1 gene contains six separate exons interspaced by five introns. The human RS1 gene is assigned NCBI GeneID 6247. The mouse Rs1 gene is assigned NCBI GeneID 20147. An exemplary coding sequence for human RS1 is assigned CCDS ID CCDS14187.1 and is set forth in SEQ ID NO: 6. Mutations in retinoschisin cause X-linked juvenile retinoschisis (XLRS), a vitreo-retinal dystrophy characterized by macular pathology and by splitting of the superficial layer of the retina. The nucleic acid constructs disclosed herein can be used in methods to treat XLRS as described in more detail elsewhere herein.

The functional domains of RS1 are a signal peptide (SP), RS1, and the discoidin domains. The signal sequence guides the translocation of nascent RS1 from the endoplasmic reticulum (the site of synthesis) to external leaflet of the plasma membrane, during which signal sequence is cleaved by signal peptidase to generate mature protein with characteristic RS1 and a highly conserved discoidin domain. The different subdomains of RS1 signal sequence are the positively charged N region at the amino terminal end which mediates translocation, the hydrophobic core (H) required for targeting and membrane insertion and a polar "C" region that determines the site of recognition and cleavage by signal peptidase. RS1 is prominently expressed by the retinal photoreceptor and bipolar cells and is also in the pineal gland.

The retinoschisin coding sequence included in the nucleic acid constructs disclosed herein can be a coding sequence for a full-length retinoschisin protein or a fragment or variant thereof. In one example, the retinoschisin coding sequence included in the nucleic acid construct does not include the first exon of RS1. For example, the retinoschisin coding sequence included in the nucleic acid construct can include exons 2-6 of an RS1 gene or variants or degenerate variants thereof. As one example, a cDNA fragment comprising exons 2-6 of an RS1 gene can comprise the sequence set forth in SEQ ID NO: 8. Although each of the 64 codons is specific for only one amino acid or stop signal, the genetic code is degenerate (i.e., redundant) because a single amino acid may be coded for by more than one codon. A degenerate variant of a gene encodes the same protein but uses at least one different codon. The retinoschisin coding sequence in the nucleic acid construct can comprise complementary DNA (cDNA) without intervening introns, or the nucleic acid construct can comprise one or more introns separating exons in the retinoschisin coding sequence. For example, the nucleic acid construct can comprise a sequence corresponding to the RS1 genomic locus having both exons and introns.

The retinoschisin coding sequence can be from any organism. For example, the retinoschisin coding sequence can be mammalian, non-human mammalian, rodent, mouse, rat, or human or variants thereof. Alternatively, the retinoschisin coding sequence can be chimeric (e.g., part mouse and part human). In a specific example, the retinoschisin coding sequence is a human retinoschisin coding sequence.

The retinoschisin coding sequence can be codon-optimized for efficient translation into retinoschisin in a particular cell or organism. As one example, a codon-optimized version of exons 2-6 of human RS1 is set forth in SEQ ID NO: 9. For example, the nucleic acid can be modified to substitute codons having a higher frequency of usage in a human cell, a non-human cell, a mammalian cell, a rodent cell, a mouse cell, a rat cell, or any other host cell of interest.

The retinoschisin coding sequence can encode a wild type retinoschisin protein or a fragment or variant thereof. Likewise, the retinoschisin coding sequence can be a wild type coding sequence or variant thereof. In one example, the retinoschisin coding sequence does not comprise any mutations associated with or that cause X-linked juvenile retinoschisis. Alternatively, the retinoschisin coding sequence can comprise one or more mutations associated with or that cause X-linked juvenile retinoschisis (e.g., R141C).

The nucleic acid construct can further comprise one or more RS1 introns or fragments or variants thereof (e.g., one or more human RS1 introns or fragments or variants thereof). For example, the nucleic acid construct can comprise RS1 intron 1 or a fragment or variant thereof. The RS1 intron or the fragment or variant thereof can comprise a splice acceptor site or a fragment thereof. Examples of fragments of RS1 intron 1 are set forth in SEQ ID NOS: 15 and 16. In one specific example, the nucleic acid construct can comprise RS1 intron 1 or a fragment or variant thereof located 5' of exons 2-6 of RS1 (e.g., upstream of a cDNA sequence comprising, consisting essentially of, or consisting of exons 2-6 of RS1).

The nucleic acid constructs can further comprise one or more splice acceptor sites. Examples of sequences (e.g., intronic sequences) and reverse complements thereof comprising splice acceptor sites are set forth in SEQ ID NOS: 15-21. For example, the nucleic acid construct can comprise a splice acceptor site located 5' of the retinoschisin coding sequence. In a specific example, the retinoschisin coding sequence comprises, consists essentially of, or consists of exons 2-6 of RS1 (e.g., exons 2-6 of human RS1), and the splice acceptor site is the splice acceptor site from intron 1 of RS1 (e.g., human RS1) used in splicing RS1 exon 1 to RS1 exon 2. The term splice acceptor site refers to a nucleic acid sequence at a 3' intron/exon boundary that can be recognized and bound by splicing machinery.

The nucleic acid constructs disclosed herein can also comprise post-transcriptional regulatory elements, such as the woodchuck hepatitis virus post-transcriptional regulatory element.

The nucleic acid constructs can further comprise one or more polyadenylation signal sequences. Examples of polyadenylation signal sequences, or sequences comprising polyadenylation signal sequences, or reverse complements thereof are set forth in SEQ ID NOS: 22-25. For example, the nucleic acid construct can comprise a polyadenylation signal sequence located 3' of the retinoschisin coding sequence. Any suitable polyadenylation signal sequence can be used. The term polyadenylation signal sequence refers to any sequence that directs termination of transcription and addition of a poly-A tail to the mRNA transcript. In eukaryotes, transcription terminators are recognized by protein factors, and termination is followed by polyadenylation, a process of adding a poly(A) tail to the mRNA transcripts in presence of the poly(A) polymerase. The mammalian poly (A) signal typically consists of a core sequence, about 45 nucleotides long, that may be flanked by diverse auxiliary sequences that serve to enhance cleavage and polyadenylation efficiency. The core sequence consists of a highly conserved upstream element (AATAAA or AAUAAA) in the mRNA, referred to as a poly A recognition motif or poly A recognition sequence), recognized by cleavage and polyadenylation-specificity factor (CPSF), and a poorly defined downstream region (rich in Us or Gs and Us), bound by cleavage stimulation factor (CstF). Examples of transcription terminators that can be used include, for example, the human growth hormone (HGH) polyadenylation signal, the simian virus 40 (SV40) late polyadenylation signal, the rabbit beta-globin polyadenylation signal, the bovine growth hormone (BGH) polyadenylation signal, the phosphoglycerate kinase (PGK) polyadenylation signal, an AOX1 transcription termination sequence, a CYC1 transcription termination sequence, or any transcription termination sequence known to be suitable for regulating gene expression in eukaryotic cells.

The nucleic acid constructs can also comprise a polyadenylation signal sequence upstream of the retinoschisin coding sequence. The polyadenylation signal sequence upstream of the retinoschisin coding sequence can be flanked by recombinase recognition sites recognized by a site-specific recombinase. In some constructs, the recombinase recognition sites also flank a selection cassette comprising, for example, the coding sequence for a drug resistance protein. In other constructs, the recombinase recognition sites do not flank a selection cassette. The polyadenylation signal sequence prevents transcription and expression of the protein or RNA encoded by the coding sequence. However, upon exposure to the site-specific recombinase, the polyadenylation signal sequence will be excised, and the protein or RNA can be expressed.

Such a configuration can enable tissue-specific expression or developmental-stage-specific expression in animals comprising the retinoschisin coding sequence if the polyadenylation signal sequence is excised in a tissue-specific or developmental-stage-specific manner. Excision of the polyadenylation signal sequence in a tissue-specific or developmental-stage-specific manner can be achieved if an animal comprising the nucleic acid construct further comprises a coding sequence for the site-specific recombinase operably linked to a tissue-specific or developmental-stage-specific promoter. The polyadenylation signal sequence will then be excised only in those tissues or at those developmental stages, enabling tissue-specific expression or developmental-stage-specific expression. In one example, the retinoschisin or fragment or variant thereof encoded by the nucleic acid constructs can be expressed in an eye-specific or retinal-cell-specific manner.

Site-specific recombinases include enzymes that can facilitate recombination between recombinase recognition sites, where the two recombination sites are physically separated within a single nucleic acid or on separate nucleic acids. Examples of recombinases include Cre, Flp, and Dre recombinases. One example of a Cre recombinase gene is Crei, in which two exons encoding the Cre recombinase are separated by an intron to prevent its expression in a prokaryotic cell. Such recombinases can further comprise a nuclear localization signal to facilitate localization to the nucleus (e.g., NLS-Crei). Recombinase recognition sites include nucleotide sequences that are recognized by a site-specific recombinase and can serve as a substrate for a recombination event. Examples of recombinase recognition sites include FRT, FRT11, FRT71, attp, att, rox, and lox sites such as loxP, lox511, lox2272, lox66, lox71, loxM2, and lox5171.

The nucleic acid constructs can further comprise a promoter operably linked to the retinoschisin coding sequence. The retinoschisin coding sequence in the nucleic acid construct can be operably linked to any suitable promoter for expression in vivo within an animal or in vitro within an isolated cell. The promoter can be a constitutively active promoter (e.g., a CAG promoter or a U6 promoter), a conditional promoter, an inducible promoter, a temporally restricted promoter (e.g., a developmentally regulated promoter), or a spatially restricted promoter (e.g., a cell-specific or tissue-specific promoter). Such promoters are well-known and are discussed elsewhere herein. Promoters that can be used in an expression construct include promoters active, for example, in one or more of a eukaryotic cell, a human cell, a non-human cell, a mammalian cell, a non-human mammalian cell, a rodent cell, a mouse cell, a rat cell, a hamster cell, a rabbit cell, a pluripotent cell, an eye cell, a retinal cell, an embryonic stem (ES) cell, or a zygote. In a specific example, the promoter is active in an eye cell or a retinal cell.

Alternatively, some nucleic acid constructs do not comprise a promoter operably linked to the retinoschisin coding sequence (e.g., some nucleic acid constructs are promoterless constructs). Such nucleic acid constructs can be designed, for example, to be operably linked to an endogenous promoter at a target genomic locus (e.g., an endogenous RS1 promoter at an endogenous RS1 locus) upon integration into the target genomic locus.

Any target genomic locus capable of expressing a gene can be used, such as a safe harbor locus (safe harbor gene) or an endogenous RS1 locus. Interactions between integrated exogenous DNA and a host genome can limit the reliability and safety of integration and can lead to overt phenotypic effects that are not due to the targeted genetic modification but are instead due to unintended effects of the integration on surrounding endogenous genes. For example, randomly inserted transgenes can be subject to position effects and silencing, making their expression unreliable and unpredictable. Likewise, integration of exogenous DNA into a chromosomal locus can affect surrounding endogenous genes and chromatin, thereby altering cell behavior and phenotypes. Safe harbor loci include chromosomal loci where transgenes or other exogenous nucleic acid inserts can be stably and reliably expressed in all tissues of interest without overtly altering cell behavior or phenotype (i.e., without any deleterious effects on the host cell). See, e.g., Sadelain et al. (2012) *Nat. Rev. Cancer* 12:51-58, herein incorporated by reference in its entirety for all purposes. For example, the safe harbor locus can be one in which expression of the inserted gene sequence is not perturbed by any read-through expression from neighboring genes. For example, safe harbor loci can include chromosomal loci where exogenous DNA can integrate and function in a predictable manner without adversely affecting endogenous gene structure or expression. Safe harbor loci can include extragenic regions or intragenic regions such as, for example, loci within genes that are non-essential, dispensable, or able to be disrupted without overt phenotypic consequences.

Such safe harbor loci can offer an open chromatin configuration in all tissues and can be ubiquitously expressed during embryonic development and in adults. See, e.g., Zambrowicz et al. (1997) *Proc. Natl. Acad. Sci. U.S.A.* 94:3789-3794, herein incorporated by reference in its entirety for all purposes. In addition, the safe harbor loci can be targeted with high efficiency, and safe harbor loci can be disrupted with no overt phenotype. Examples of safe harbor loci include albumin, CCR5, HPRT, AAVS1, and Rosa26. See, e.g., U.S. Pat. Nos. 7,888,121; 7,972,854; 7,914,796; 7,951,925; 8,110,379; 8,409,861; 8,586,526; and US Patent Publication Nos. 2003/0232410; 2005/0208489; 2005/0026157; 2006/0063231; 2008/0159996; 2010/00218264; 2012/0017290; 2011/0265198; 2013/0137104; 2013/0122591; 2013/0177983; 2013/0177960; and 2013/0122591, each of which is herein incorporated by reference in its entirety for all purposes.

The target genomic locus can also be an endogenous RS1 locus, such as an endogenous RS1 locus comprising one or more mutations associated with or that cause XLRS (e.g., an R141C mutation in the encoded retinoschisin protein). Integration of the nucleic acid construct into the endogenous RS1 locus can, in some cases, prevent transcription of the endogenous RS1 gene downstream of the integration site. The integration of the nucleic acid construct into the endogenous RS1 locus can reduce or eliminate expression of the endogenous retinoschisin protein and replace it with expression of the retinoschisin protein or fragment or variant thereof encoded by the nucleic acid construct. In one example, integration of the nucleic acid construct into the endogenous RS1 locus reduces expression of the endogenous retinoschisin protein. In another example, integration of the nucleic acid construct into the endogenous RS1 locus eliminates expression of the endogenous retinoschisin protein. In this way, integration of the nucleic acid construct can simultaneously knock out the endogenous RS1 gene (e.g., an endogenous RS1 gene comprising one or more mutations associated with or that cause XLRS) and knock in a replacement retinoschisin coding sequence (e.g., a replacement retinoschisin coding sequence that does not comprise mutations associated with or that cause XLRS).

The nucleic acid construct can be integrated into any part of the target genomic locus. For example, the nucleic acid construct can be inserted into an intron or an exon of a target genomic locus or can replace one or more introns and/or exons of a target genomic locus. In a specific example, the nucleic acid construct can be integrated into an intron of the target genomic locus, such as the first intron of the target genomic locus (e.g., RS1 intron 1). Expression cassettes integrated into a target genomic locus can be operably linked to an endogenous promoter at the target genomic locus (e.g., the endogenous RS1 promoter) or can be operably linked to an exogenous promoter that is heterologous to the target genomic locus (e.g., a CMV promoter).

The nucleic acid constructs can comprise deoxyribonucleic acid (DNA) or ribonucleic acid (RNA), they can be single-stranded or double-stranded, and they can be in linear or circular form. For example, the nucleic acid construct can be a single-stranded oligodeoxynucleotide (ssODN). See, e.g., Yoshimi et al. (2016) *Nat. Commun.* 7:10431, herein incorporated by reference in its entirety for all purposes. The nucleic acid constructs can be naked nucleic acids or can be delivered by vectors, such as AAV vectors. In a specific example, the nucleic acid construct can be delivered via AAV and can be capable of insertion into an endogenous RS1 locus by non-homologous end joining (e.g., the nucleic acid construct can be one that does not comprise homology arms). If introduced in linear form, the ends of the nucleic acid construct (e.g., donor sequence) can be protected (e.g., from exonucleolytic degradation) by well-known methods. For example, one or more dideoxynucleotide residues can be added to the 3' terminus of a linear molecule and/or self-complementary oligonucleotides can be ligated to one or both ends. See, e.g., Chang et al. (1987) *Proc. Natl. Acad. Sci. U.S.A.* 84:4959-4963 and Nehls et al. (1996) *Science* 272:886-889, each of which is herein incorporated by reference in its entirety for all purposes. Additional methods for protecting exogenous polynucleotides from degradation include, but are not limited to, addition of terminal amino group(s) and the use of modified internucleotide linkages such as, for example, phosphorothioates, phosphoramidates, and O-methyl ribose or deoxyribose residues.

An exemplary nucleic acid construct is between about 50 nucleotides to about 5 kb in length or between about 50 nucleotides to about 3 kb in length. Alternatively, a nucleic acid construct can be between about 1 kb to about 1.5 kb, about 1.5 kb to about 2 kb, about 2 kb to about 2.5 kb, about 2.5 kb to about 3 kb, about 3 kb to about 3.5 kb, about 3.5 kb to about 4 kb, about 4 kb to about 4.5 kb, or about 4.5 kb to about 5 kb in length. Alternatively, a nucleic acid construct can be, for example, no more than 5 kb, 4.5 kb, 4 kb, 3.5 kb, 3 kb, or 2.5 kb in length.

Integration of a nucleic acid construct at a target genomic locus can result in addition of a nucleic acid sequence of interest to the target genomic locus or replacement of a nucleic acid sequence of interest at the target genomic locus (i.e., deletion and insertion). Some nucleic acid constructs are designed for insertion of a nucleic acid construct at a target genomic locus without any corresponding deletion at the target genomic locus. Other nucleic acid constructs are designed to delete a nucleic acid sequence of interest at a target genomic locus and replace it with a nucleic acid construct.

The nucleic acid construct or the corresponding nucleic acid at the target genomic locus being deleted and/or replaced can be various lengths. An exemplary nucleic acid construct or corresponding nucleic acid at the target genomic locus being deleted and/or replaced is between about 1 nucleotide to about 5 kb in length or is between about 1 nucleotide to about 3 kb nucleotides in length. For example, a nucleic acid construct or a corresponding nucleic acid at the target genomic locus being deleted and/or replaced can be between about 1 to about 100, about 100 to about 200, about 200 to about 300, about 300 to about 400, about 400 to about 500, about 500 to about 600, about 600 to about 700, about 700 to about 800, about 800 to about 900, or about 900 to about 1,000 nucleotides in length. Likewise, a nucleic acid construct or a corresponding nucleic acid at the target genomic locus being deleted and/or replaced can be between about 1 kb to about 1.5 kb, about 1.5 kb to about 2 kb, about 2 kb to about 2.5 kb, about 2.5 kb to about 3 kb, about 3 kb to about 3.5 kb, about 3.5 kb to about 4 kb, about 4 kb to about 4.5 kb, about 4.5 kb to about 5 kb in length, or longer.

The nucleic acid construct or the corresponding nucleic acid at the target genomic locus being deleted and/or replaced can be a coding region such as an exon; a non-coding region such as an intron, an untranslated region, or a regulatory region (e.g., a promoter, an enhancer, or a transcriptional repressor-binding element), or any combination thereof.

The nucleic acid constructs can, in some cases, comprise one or more of the following terminal structures: hairpin, loop, inverted terminal repeat (ITR), or toroid. For example, the nucleic acid construct can comprise ITRs.

Some such nucleic acid constructs can modify the target genomic locus (e.g., but not limited to, an endogenous RS1 locus) following cleavage or nicking of the target genomic locus with a nuclease agent such as a Cas protein. The nucleic acid construct can be designed to repair the cleaved or nicked locus via non-homologous end joining (NHEJ)-mediated ligation or homology-directed repair. Optionally, repair with the nucleic acid construct removes or disrupts the nuclease target sequence so that alleles that have been targeted cannot be re-targeted by the nuclease agent.

Some nucleic acid constructs comprise homology arms. The homology arms can be symmetrical (e.g., each 40 nucleotides or each 60 nucleotides in length), or they can be asymmetrical (e.g., one homology arm or complementary region that is 36 nucleotides in length, and one homology arm or complementary region that is 91 nucleotides in length). Other nucleic acid constructs do not comprise homology arms.

Some nucleic acid constructs disclosed herein comprise homology arms. The homology arms can flank the retinoschisin coding sequence. For ease of reference, the homology arms are referred to herein as 5' and 3' (i.e., upstream and downstream) homology arms. This terminology relates to the relative position of the homology arms to a nucleic acid insert (e.g., the retinoschisin coding sequence) within a nucleic acid construct. The 5' and 3' homology arms correspond to regions within the target genomic locus, which are referred to herein as "5' target sequence" and "3' target sequence," respectively.

A homology arm and a target sequence "correspond" or are "corresponding" to one another when the two regions share a sufficient level of sequence identity to one another to act as substrates for a homologous recombination reaction. The term "homology" includes DNA sequences that are either identical or share sequence identity to a corresponding sequence. The sequence identity between a given target sequence and the corresponding homology arm found in the nucleic acid construct can be any degree of sequence identity that allows for homologous recombination to occur. For example, the amount of sequence identity shared by the homology arm of the nucleic acid construct (or a fragment thereof) and the target sequence (or a fragment thereof) can be at least 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity, such that the sequences undergo homologous recombination. Moreover, a corresponding region of homology between the homology arm and the corresponding target sequence can be of any length that is sufficient to promote homologous recombination. Exemplary homology arms are between about 25 nucleotides to about 2.5 kb in length, are between about 25 nucleotides to about 1.5 kb in length, or are between about 25 to about 500 nucleotides in length. For example, a given homology arm (or each of the homology arms) and/or corresponding target sequence can comprise corresponding regions of homology that are between about 25 to about 30, about 30 to about 40, about 40 to about 50, about 50 to about 60, about 60 to about 70, about 70 to about 80, about 80 to about 90, about 90 to about 100, about 100 to about 150, about 150 to about 200, about 200 to about 250, about 250 to about 300, about 300 to about 350, about 350 to about 400, about 400 to about 450, or about 450 to about 500 nucleotides in length, such that the homology arms have sufficient homology to undergo homologous recombination with the corresponding target sequences within the target nucleic acid. Alternatively, a given homology arm (or each homology arm) and/or corresponding target sequence can comprise corresponding regions of homology that are between about 0.5 kb to about 1 kb, about 1 kb to about 1.5 kb, about 1.5 kb to about 2 kb, or about 2 kb to about 2.5 kb in length. For example, the homology arms can each be about 750 nucleotides in length. In another example, the homology arms can each be about 150 to about 750, about 200 to about 700, about 250 to about 650, about 300 to about 600, about 350 to about 550, about 400 to about 500, about 150 to about 450, about 200 to about 450, about 250 to about 450, about 300 to about 450, about 350 to about 450, about 400 to about 450, about 450 to about 500, about 450 to about 550, about 450 to about 600, about 450 to about 650, about 450 to about 700, about 450 to about 750, or about 450 nucleotides in length. In another example, the homology arms can each be about 500 to about 1300, about 550 to about 1250, about 600 to about 1200, about 650 to about 1150, about 700 to about 1100, about 750 to about 1050, about 800 to about 1000, about 850 to about 950, about 500 to about 900, about 550 to about 900, about 600 to about 900, about 650 to about 900, about 700 to about 900, about 750 to about 900, about 800 to about 900, about 850 to about 900, about 900 to about 950, about 900 to about 1000, about 900 to about 1050, about 900 to about 1100, about 900 to about 1150, about 900 to about 1200, about 900 to about 1250, about 900 to about 1300, or about 900 nucleotides in length. In another example, the homology arms can each be about 1500 to about 2100, about 1550 to about 2050, about 1600 to about 2000, about 1650 to about 1950, about 1700 to about 1900, about 1750 to about 1850, about 1500 to about 1800, about 1550 to about 1800, about 1600 to about 1800, about 1650 to about 1800, about 1700 to about 1800, about 1750 to about 1800, about 1800 to about 1850, about 1800 to about 1900, about 1800 to about 1950, about 1800 to about 2000, about 1800 to about 2050, about 1800 to about 2100, or about 1800 nucleotides. In another example, each homology arm is no more than about 450 nucleotides, no more than about 900 nucleotides, or no more than about 1800 nucleotides. In another example, each homology arm is at least about 450 nucleotides, at least about 900 nucleotides, or at least about 1800 nucleotides. The homology arms can be symmetrical (each about the same size in length), or they can be asymmetrical (one longer than the other).

When a CRISPR/Cas system or other nuclease agent is used in combination with an nucleic acid construct disclosed herein, the 5' and 3' target sequences can be located in sufficient proximity to the nuclease cleavage site (e.g., within sufficient proximity to a guide RNA target sequence) so as to promote the occurrence of a homologous recombination event between the target sequences and the homology arms upon a single-strand break (nick) or double-strand break at the nuclease cleavage site or nuclease cleavage site. The term "nuclease cleavage site" includes a DNA sequence at which a nick or double-strand break is created by a nuclease agent (e.g., a Cas9 protein complexed with a guide RNA). The target sequences within the targeted locus that correspond to the 5' and 3' homology arms of the nucleic acid construct are "located in sufficient proximity" to a nuclease cleavage site if the distance is such as to promote the occurrence of a homologous recombination event between the 5' and 3' target sequences and the homology arms upon a single-strand break or double-strand break at the nuclease cleavage site. Thus, the target sequences corresponding to the 5' and/or 3' homology arms of the nucleic acid construct can be, for example, within at least 1 nucleotide of a given nuclease cleavage site or within at least 10 nucleotides to about 1,000 nucleotides of a given nuclease cleavage site. As an example, the nuclease cleavage site can be immediately adjacent to at least one or both of the target sequences.

The spatial relationship of the target sequences that correspond to the homology arms of the nucleic acid construct and the nuclease cleavage site can vary. For example, target sequences can be located 5' to the nuclease cleavage site, target sequences can be located 3' to the nuclease cleavage site, or the target sequences can flank the nuclease cleavage site.

Other nucleic acid constructs do not comprise any homology arms. Such nucleic acid constructs can be capable of insertion by non-homologous end joining. For example, such nucleic acid constructs can be inserted into a blunt end double-strand break following cleavage with a nuclease agent. In a specific example, the nucleic acid construct acid can be delivered via AAV and can be capable of insertion into a target genomic locus by non-homologous end joining (e.g., the nucleic acid construct can be one that does not comprise homology arms).

In a specific example, the nucleic acid construct can be inserted via homology-independent targeted integration. For example, the retinoschisin coding sequence in the nucleic acid construct can be flanked on each side by a target site for a nuclease agent (e.g., the same target site as in the target genomic locus, and the same nuclease agent being used to cleave the target site in the target genomic locus). The nuclease agent can then cleave the target sites flanking the retinoschisin coding sequence. In a specific example, the nucleic acid construct is delivered AAV-mediated delivery, and cleavage of the target sites flanking the retinoschisin coding sequence can remove the inverted terminal repeats (ITRs) of the AAV. In some methods, the target site in the target genomic locus (e.g., a gRNA target sequence including the flanking protospacer adjacent motif) is no longer present if the retinoschisin coding sequence is inserted into the target genomic locus in the correct orientation but it is reformed if the retinoschisin coding sequence is inserted into the target genomic locus in the opposite orientation. This can help ensure that the retinoschisin coding sequence is inserted in the correct orientation for expression.

In one exemplary nucleic acid construct for homology-independent targeted integration into a target genomic locus, the retinoschisin protein or fragment thereof is a human retinoschisin protein or fragment thereof, the coding sequence for the retinoschisin protein or fragment thereof comprises complementary DNA (cDNA) comprising exons 2-6 of human RS1 or degenerate variants thereof, the nucleic acid construct does not comprise a promoter that drives expression of the retinoschisin protein or fragment thereof, the nucleic acid construct comprises a polyadenylation signal sequence located 3' of the coding sequence, the nucleic acid construct comprises a splice acceptor site located 5' of the coding sequence, and the nuclease target sequence in the nucleic acid construct is identical to a nuclease target sequence for integration into the target genomic locus, wherein the nuclease target sequence in the target genomic locus is destroyed if the nucleic acid construct is inserted in the correct orientation but is reformed if the nucleic acid construct is inserted into the target genomic locus in the opposite orientation.

In one exemplary nucleic acid construct for homology-independent targeted integration into a target genomic locus, the retinoschisin protein or fragment thereof comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 2 or 5. In one exemplary nucleic acid construct for homology-independent targeted integration into a target genomic locus, the coding sequence for the retinoschisin protein or fragment thereof comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 6, 8, or 9 or degenerate variants thereof. In one exemplary nucleic acid construct for homology-independent targeted integration into a target genomic locus, the nucleic acid construct comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 45.

Other nucleic acid constructs can have short single-stranded regions at the 5' end and/or the 3' end that are complementary to one or more overhangs created by nuclease-agent-mediated cleavage at the target genomic locus. For example, some nucleic acid constructs have short single-stranded regions at the 5' end and/or the 3' end that are complementary to one or more overhangs created by nuclease-mediated cleavage at 5' and/or 3' target sequences at the target genomic locus. Some such nucleic acid constructs have a complementary region only at the 5' end or only at the 3' end. For example, some such nucleic acid constructs have a complementary region only at the 5' end complementary to an overhang created at a 5' target sequence at the target genomic locus or only at the 3' end complementary to an overhang created at a 3' target sequence at the target genomic locus. Other such nucleic acid constructs have complementary regions at both the 5' and 3' ends. For example, other such nucleic acid constructs have complementary regions at both the 5' and 3' ends (e.g., complementary to first and second overhangs, respectively) generated by nuclease-mediated cleavage at the target genomic locus. For example, if the nucleic acid construct is double-stranded, the single-stranded complementary regions can extend from the 5' end of the top strand of the nucleic acid construct and the 5' end of the bottom strand of the donor nucleic acid, creating 5' overhangs on each end. Alternatively, the single-stranded complementary region can extend from the 3' end of the top strand of the nucleic acid construct and from the 3' end of the bottom strand of the template, creating 3' overhangs.

The complementary regions can be of any length sufficient to promote ligation between the nucleic acid construct and the target nucleic acid. Exemplary complementary regions are between about 1 to about 5 nucleotides in length, between about 1 to about 25 nucleotides in length, or between about 5 to about 150 nucleotides in length. For example, a complementary region can be at least about 1, 2, 3, 4, 5, 6, 7, 8, 9, 10, 11, 12, 13, 14, 15, 16, 17, 18, 19, 20, 21, 22, 23, 24, or 25 nucleotides in length. Alternatively, the complementary region can be about 5 to about 10, about 10 to about 20, about 20 to about 30, about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150 nucleotides in length, or longer.

Such complementary regions can be complementary to overhangs created by two pairs of nickases. Two double-strand breaks with staggered ends can be created by using first and second nickases that cleave opposite strands of DNA to create a first double-strand break, and third and fourth nickases that cleave opposite strands of DNA to create a second double-strand break. For example, a Cas protein can be used to nick first, second, third, and fourth guide RNA target sequences corresponding with first, second, third, and fourth guide RNAs. The first and second guide RNA target sequences can be positioned to create a first cleavage site such that the nicks created by the first and second nickases on the first and second strands of DNA create a double-strand break (i.e., the first cleavage site comprises the nicks within the first and second guide RNA target sequences). Likewise, the third and fourth guide RNA target sequences can be positioned to create a second cleavage site such that the nicks created by the third and fourth nickases on the first and second strands of DNA create a double-strand break (i.e., the second cleavage site comprises the nicks within the third and fourth guide RNA target sequences). The nicks within the first and second guide RNA target sequences and/or the third and fourth guide RNA target sequences can be off-set nicks that create overhangs. The offset window can be, for example, at least about 5 bp, 10 bp, 20 bp, 30 bp, 40 bp, 50 bp, 60 bp, 70 bp, 80 bp, 90 bp, 100 bp or more. See Ran et al. (2013) *Cell* 154:1380-1389; Mali et al. (2013) *Nat. Biotechnol.* 31:833-838; and Shen et al. (2014) *Nat. Methods* 11:399-404, each of which is herein incorporated by reference in its entirety for all purposes. In such cases, a double-stranded nucleic acid construct can be designed with single-stranded complementary regions that are complementary to the overhangs created by the nicks within the first and second guide RNA target sequences and by the nicks within the third and fourth guide RNA target sequences. Such nucleic acid construct can then be inserted by non-homologous-end-joining-mediated ligation.

Some of the nucleic acid constructs disclosed herein are bidirectional constructs that can be inserted into and expressed from the target genomic locus in either orientation. Such nucleic acid constructs can comprise a first segment comprising a first coding sequence for a first retinoschisin protein or fragment or variant thereof and a second segment comprising a reverse complement of a second coding sequence for a second retinoschisin protein or fragment or variant thereof. The second segment can be, for example, located 3' of the first segment in the nucleic acid construct.

The first segment and the second segment can be linked directly together or can be linked by a linker such as a peptide linker. The peptide linker can be any suitable length. For example, the linker can be between about 5 to about 2000 nucleotides in length. As an example, the linker sequence can be about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 150, 200, 250, 300, 500, 1000, 1500, 2000, or more nucleotides in length.

In some bidirectional constructs, the first retinoschisin protein or fragment or variant thereof is identical to the second retinoschisin protein or fragment or variant thereof. In other bidirectional constructs, the first retinoschisin protein or fragment or variant thereof is different from the second retinoschisin protein or fragment or variant thereof.

In some bidirectional constructs, the codon usage in the first coding sequence is the same as the codon usage in the second coding sequence. In other bidirectional constructs, the second coding sequence adopts a different codon usage from the codon usage of the first coding sequence in order to reduce hairpin formation. Such a reverse complement forms base pairs with fewer than all nucleotides of the coding sequence in the first segment, but it can optionally encode the same polypeptide.

The second segment can have any percentage of complementarity to the first segment. For example, the second segment sequence can have at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 97%, or at least about 99% complementarity to the first segment. As another example, the second segment sequence can have less than about 30%, less than about 35%, less than about 40%, less than about 45%, less than about 50%, less than about 55%, less than about 60%, less than about 65%, less than about 70%, less than about 75%, less than about 80%, less than about 85%, less than about 90%, less than about 95%, less than about 97%, or less than about 99% complementarity to the first segment. The reverse complement of the second coding sequence can be, in some nucleic acid constructs, not substantially complementary (e.g., not more than 70% complementary) to the first coding sequence, not substantially complementary to a fragment of the first coding sequence, highly complementary (e.g., at least 90% complementary) to the first coding sequence, highly complementary to a fragment of the first coding sequence, about 50% to about 80% identical to the reverse complement of the first coding sequence, or about 60% to about 100% identical to the reverse complement of the first coding sequence.

The bidirectional constructs can, in some cases, comprise one or more (e.g., two) polyadenylation signal sequences. In some bidirectional constructs, the first segment can comprise a first polyadenylation signal sequence. In some bidirectional constructs, the first segment can comprise a second polyadenylation signal sequence. In some bidirectional constructs, the first segment can comprise a first polyadenylation signal sequence, and the second segment can comprise a second polyadenylation signal sequence (e.g., a reverse complement of a polyadenylation signal sequence). In some bidirectional constructs, the first segment can comprise a first polyadenylation signal sequence located 3' of the first coding sequence. In some bidirectional constructs, the second segment can comprise a reverse complement of a second polyadenylation signal sequence located 5' of the reverse complement of the second coding sequence. In some bidirectional constructs, the first segment can comprise a first polyadenylation signal sequence located 3' of the first coding sequence, and the second segment can comprise a reverse complement of a second polyadenylation signal sequence located 5' of the reverse complement of the second coding sequence. The first and second polyadenylation signal sequences can be the same or different. In one example, the first and second polyadenylation signals are different.

The bidirectional constructs can, in some cases, can comprise one or more (e.g., two) splice acceptor sites. In some bidirectional constructs, the first segment can comprise a first splice acceptor site. In some bidirectional constructs, the first segment can comprise a second splice acceptor site. In some bidirectional constructs, the first segment can comprise a first splice acceptor site, and the second segment can comprise a second splice acceptor site (e.g., a reverse complement of a splice acceptor site). In some bidirectional constructs, the first segment comprises a first splice acceptor site located 5' of the first coding sequence. In some bidirectional constructs, the second segment comprises a reverse complement of a second splice acceptor site located 3' of the reverse complement of the second coding sequence. In some bidirectional constructs, the first segment comprises a first splice acceptor site located 5' of the first coding sequence, and the second segment comprises a reverse complement of a second splice acceptor site located 3' of the reverse complement of the second coding sequence. The first and second splice acceptor sites can be the same or different. In one example, the first and second splice acceptor sites are different. The first and/or the second splice acceptor site can be from an RS1 gene (e.g., from intron 1 of an RS1 gene) such as a human RS1 gene.

Some bidirectional constructs can comprise a promoter that drives expression of the first retinoschisin protein or fragment or variant thereof and/or the reverse complement of a promoter that drives expression of the second retinoschisin protein or fragment or variant thereof. Alternatively, a bidirectional construct can be a construct that does not comprise a promoter that drives expression of the first retinoschisin protein or fragment or variant thereof or the second retinoschisin protein or fragment or variant thereof (i.e., a promoterless construct).

One or both of the coding sequences can be codon-optimized for expression in a host cell. In some bidirectional constructs, only one of the coding sequences is codon-optimized. In some bidirectional constructs, the first coding sequence is codon-optimized. In some bidirectional constructs, the second coding sequence is codon-optimized. In some bidirectional constructs, both coding sequences are codon-optimized.

In an exemplary bidirectional construct, the second segment is located 3' of the first segment, both the first retinoschisin protein or fragment thereof and the second retinoschisin protein or fragment thereof are a human retinoschisin protein or fragment thereof, the first retinoschisin protein or fragment thereof is identical to the second retinoschisin protein or fragment thereof, both the first coding sequence and the second coding sequence comprise complementary DNA (cDNA) comprising exons 2-6 of human RS1 or degenerate variants thereof, the second coding sequence adopts a different codon usage from the codon usage of the first coding sequence, the first segment comprises a first polyadenylation signal sequence located 3' of the first coding sequence, and the second segment comprises a reverse complement of a second polyadenylation signal sequence located 5' of the reverse complement of the second coding sequence, the first segment comprises a first splice acceptor site located 5' of the first coding sequence, and the second segment comprises a reverse complement of a second splice acceptor site located 3' of the reverse complement of the second coding sequence, the nucleic acid construct does not comprise a promoter that drives expression of the first retinoschisin protein or fragment thereof or the second retinoschisin protein or fragment thereof, and optionally the nucleic acid construct does not comprise a homology arm.

In an exemplary bidirectional construct, the first retinoschisin protein or fragment thereof and/or the second retinoschisin protein or fragment thereof comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 2 or 5. In an exemplary bidirectional construct, the first coding sequence and/or the second coding sequence comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 6, 8, or 9 or degenerate variants thereof. In an exemplary bidirectional construct, the first coding sequence comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 8, and the second coding sequence comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 9. In an exemplary bidirectional construct, the nucleic acid construct comprises, consists essentially of, or consists of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 46 or 47.

The nucleic acid constructs can include modifications or sequences that provide for additional desirable features (e.g., modified or regulated stability; tracking or detecting with a fluorescent label; a binding site for a protein or protein complex; and so forth). Nucleic acid constructs can comprise one or more fluorescent labels, purification tags, epitope tags, or a combination thereof. For example, a nucleic acid construct can comprise one or more fluorescent labels (e.g., fluorescent proteins or other fluorophores or dyes), such as at least 1, at least 2, at least 3, at least 4, or at least 5 fluorescent labels. Exemplary fluorescent labels include fluorophores such as fluorescein (e.g., 6-carboxyfluorescein (6-FAM)), Texas Red, HEX, Cy3, Cy5, Cy5.5, Pacific Blue, 5-(and-6)-carboxytetramethylrhodamine (TAMRA), and Cy7. A wide range of fluorescent dyes are available commercially for labeling oligonucleotides (e.g., from Integrated DNA Technologies). Such fluorescent labels (e.g., internal fluorescent labels) can be used, for example, to detect a nucleic acid construct that has been directly integrated into a cleaved target nucleic acid having protruding ends compatible with the ends of the nucleic acid construct. The label or tag can be at the 5' end, the 3' end, or internally within the nucleic acid construct. For example, a nucleic acid construct can be conjugated at 5' end with the IR700 fluorophore from Integrated DNA Technologies (5'IRDYE®700).

The nucleic acid construct can also comprise a conditional allele. The conditional allele can be a multifunctional allele, as described in US 2011/0104799, herein incorporated by reference in its entirety for all purposes. For example, the conditional allele can comprise: (a) an actuating sequence in sense orientation with respect to transcription of a target gene; (b) a drug selection cassette (DSC) in sense or antisense orientation; (c) a nucleotide sequence of interest (NSI) in antisense orientation; and (d) a conditional by inversion module (COIN, which utilizes an exon-splitting intron and an invertible gene-trap-like module) in reverse orientation. See, e.g., US 2011/0104799. The conditional allele can further comprise recombinable units that recombine upon exposure to a first recombinase to form a conditional allele that (i) lacks the actuating sequence and the DSC; and (ii) contains the NSI in sense orientation and the COIN in antisense orientation. See, e.g., US 2011/0104799.

Nucleic acid constructs can also comprise a polynucleotide encoding a selection marker. Alternatively, the nucleic acid constructs can lack a polynucleotide encoding a selection marker. The selection marker can be contained in a selection cassette. Optionally, the selection cassette can be a self-deleting cassette. See, e.g., U.S. Pat. No. 8,697,851 and US 2013/0312129, each of which is herein incorporated by reference in its entirety for all purposes. As an example, the self-deleting cassette can comprise a Crei gene (comprises two exons encoding a Cre recombinase, which are separated by an intron) operably linked to a mouse Prm1 promoter and a neomycin resistance gene operably linked to a human ubiquitin promoter. By employing the Prm1 promoter, the self-deleting cassette can be deleted specifically in male germ cells of F0 animals. Exemplary selection markers include neomycin phosphotransferase (neo$^r$), hygromycin B phosphotransferase (hyg$^r$), puromycin-N-acetyltransferase (puro$^r$), blasticidin S deaminase (bsr$^r$), xanthine/guanine phosphoribosyl transferase (gpt), or herpes simplex virus thymidine kinase (HSV-k), or a combination thereof. The polynucleotide encoding the selection marker can be operably linked to a promoter active in a cell being targeted. Examples of promoters are described elsewhere herein.

The nucleic acid construct can also comprise a reporter gene. Exemplary reporter genes include those encoding luciferase, β-galactosidase, green fluorescent protein (GFP), enhanced green fluorescent protein (eGFP), cyan fluorescent protein (CFP), yellow fluorescent protein (YFP), enhanced yellow fluorescent protein (eYFP), blue fluorescent protein (BFP), enhanced blue fluorescent protein (eBFP), DsRed, ZsGreen, MmGFP, mPlum, mCherry, tdTomato, mStrawberry, J-Red, mOrange, mKO, mCitrine, Venus, YPet, Emerald, CyPet, Cerulean, T-Sapphire, and alkaline phosphatase. Such reporter genes can be operably linked to a promoter active in a cell being targeted. Examples of promoters are described elsewhere herein.

The nucleic acid construct can also comprise one or more expression cassettes or deletion cassettes. A given cassette can comprise one or more of a nucleotide sequence of interest, a polynucleotide encoding a selection marker, and a reporter gene, along with various regulatory components that influence expression. Examples of selectable markers and reporter genes that can be included are discussed in detail elsewhere herein.

The nucleic acid construct can comprise a nucleic acid flanked with site-specific recombination target sequences.

Alternatively, the nucleic acid construct can comprise one or more site-specific recombination target sequences. Although the entire nucleic acid construct can be flanked by such site-specific recombination target sequences, any region or individual polynucleotide of interest within the nucleic acid construct can also be flanked by such sites. Site-specific recombination target sequences, which can flank the nucleic acid construct or any polynucleotide of interest in the nucleic acid construct can include, for example, loxP, lox511, lox2272, lox66, lox71, loxM2, lox5171, FRT, FRT11, FRT71, attp, att, FRT, rox, or a combination thereof. In one example, the site-specific recombination sites flank a polynucleotide encoding a selection marker and/or a reporter gene contained within the nucleic acid construct. Following integration of the nucleic acid construct at a targeted locus, the sequences between the site-specific recombination sites can be removed.

Nucleic acid constructs can also comprise one or more restriction sites for restriction endonucleases (i.e., restriction enzymes), which include Type I, Type II, Type III, and Type IV endonucleases. Type I and Type III restriction endonucleases recognize specific recognition sites, but typically cleave at a variable position from the nuclease binding site, which can be hundreds of base pairs away from the cleavage site (recognition site). In Type II systems the restriction activity is independent of any methylase activity, and cleavage typically occurs at specific sites within or near to the binding site. Most Type II enzymes cut palindromic sequences, however Type IIa enzymes recognize non-palindromic recognition sites and cleave outside of the recognition site, Type IIb enzymes cut sequences twice with both sites outside of the recognition site, and Type IIs enzymes recognize an asymmetric recognition site and cleave on one side and at a defined distance of about 1-20 nucleotides from the recognition site. Type IV restriction enzymes target methylated DNA. Restriction enzymes are further described and classified, for example in the REBASE database (webpage at rebase.neb.com; Roberts et al., (2003) *Nucleic Acids Res.* 31:418-420; Roberts et al., (2003) *Nucleic Acids Res.* 31:1805-1812; and Belfort et al. (2002) in Mobile DNA II, pp. 761-783, Eds. Craigie et al., (ASM Press, Washington, DC)).

The nucleic acid constructs disclosed herein can also comprise additional coding sequences. For example, some nucleic acid constructs disclosed herein can comprise a sequence encoding a guide RNA that targets the target genomic locus (e.g., that targets RS1, such as intron 1 of RS1). The sequence encoding the guide RNA can be operably linked to a promoter, such as a U6 promoter. In some nucleic acid constructs, the guide RNA expression cassette is located 3' (downstream) of the retinoschisin coding sequence(s). In some bidirectional nucleic acid constructs, the guide RNA expression cassette is located between the first segment and the second segment.

III. Vectors Comprising Nucleic Acid Constructs

Also provided herein are vectors comprising the nucleic acid constructs (i.e., exogenous donor nucleic acids) comprising a retinoschisin coding sequence (i.e., encoding a retinoschisin protein or fragment or variant thereof) for integration into and expression from a target genomic locus. Also provided herein are vectors comprising the nucleic acids encoding nuclease agents (e.g., targeting an endogenous RS1 locus) disclosed elsewhere herein. Also provided herein are vectors comprising the nucleic acid constructs and/or nucleic acids encoding nuclease agents (e.g., targeting an endogenous RS1 locus) disclosed elsewhere herein (e.g., vectors comprising the nucleic acid construct and a DNA encoding a guide RNA). A vector can comprise additional sequences such as, for example, replication origins, promoters, and genes encoding antibiotic resistance. Some such vectors comprise homology arms corresponding to target sites in the target genomic locus. Other such vectors do not comprise any homology arms.

Some vectors may be circular. Alternatively, the vector may be linear. The vector can be in the packaged for delivered via a lipid nanoparticle, liposome, non-lipid nanoparticle, or viral capsid. Non-limiting exemplary vectors include plasmids, phagemids, cosmids, artificial chromosomes, minichromosomes, transposons, viral vectors, and expression vectors.

The vectors can be, for example, viral vectors such as adeno-associated virus (AAV) vectors. The AAV may be any suitable serotype and may be a single-stranded AAV (ssAAV) or a self-complementary AAV (scAAV). Other exemplary viruses/viral vectors include retroviruses, adenoviruses, vaccinia viruses, poxviruses, and herpes simplex viruses. The viruses can infect dividing cells, non-dividing cells, or both dividing and non-dividing cells. The viruses can integrate into the host genome or alternatively do not integrate into the host genome. Such viruses can also be engineered to have reduced immunity. The viruses can be replication-competent or can be replication-defective (e.g., defective in one or more genes necessary for additional rounds of virion replication and/or packaging). Viruses can cause transient expression, long-lasting expression (e.g., at least 1 week, 2 weeks, 1 month, 2 months, or 3 months), or permanent expression (e.g., of Cas9 and/or gRNA). Exemplary viral titers (e.g., AAV titers) include $10^{12}$, $10^{13}$, $10^{14}$, $10^{15}$, and $10^{16}$ vector genomes/mL. Exemplary viral titers (e.g., AAV titers) include about $10^{12}$, about $10^{13}$, about $10^{14}$, about $10^{15}$, and about $10^{16}$ vector genomes (vg)/mL, or between about $10^{12}$ to about $10^{16}$, between about $10^{12}$ to about $10^{15}$, between about $10^{12}$ to about $10^{14}$, between about $10^{12}$ to about $10^{13}$, between about $10^{13}$ to about $10^{16}$, between about $10^{14}$ to about $10^{16}$, between about $10^{15}$ to about $10^{16}$, or between about $10^{13}$ to about $10^{15}$ vg/mL. Other exemplary viral titers (e.g., AAV titers) include about $10^{12}$, about $10^{13}$, about $10^{14}$, about $10^{15}$, and about $10^{16}$ vector genomes (vg)/kg of body weight, or between about $10^{12}$ to about $10^{16}$, between about $10^{12}$ to about $10^{15}$, between about $10^{12}$ to about $10^{14}$, between about $10^{12}$ to about $10^{13}$, between about $10^{13}$ to about $10^{16}$, between about $10^{14}$ to about $10^{16}$, between about $10^{15}$ to about $10^{16}$, or between about $10^{13}$ to about $10^{15}$ vg/kg of body weight.

The ssDNA AAV genome consists of two open reading frames, Rep and Cap, flanked by two inverted terminal repeats that allow for synthesis of the complementary DNA strand. When constructing an AAV transfer plasmid, the transgene is placed between the two ITRs, and Rep and Cap can be supplied in trans. In addition to Rep and Cap, AAV can require a helper plasmid containing genes from adenovirus. These genes (E4, E2a, and VA) mediate AAV replication. For example, the transfer plasmid, Rep/Cap, and the helper plasmid can be transfected into HEK293 cells containing the adenovirus gene E1+ to produce infectious AAV particles. Alternatively, the Rep, Cap, and adenovirus helper genes may be combined into a single plasmid. Similar packaging cells and methods can be used for other viruses, such as retroviruses.

Multiple serotypes of AAV have been identified. These serotypes differ in the types of cells they infect (i.e., their tropism), allowing preferential transduction of specific cell types. Serotypes for photoreceptor cells include AAV2, AAV5, and AAV8. Serotypes for retinal pigment epithelium tissue include AAV1, AAV2, AAV4, AAV5, and AAV8. In a specific example, the AAV vector comprising the nucleic acid construct can be AAV2, AAV5, or AAV8.

Tropism can be further refined through pseudotyping, which is the mixing of a capsid and a genome from different viral serotypes. For example AAV2/5 indicates a virus containing the genome of serotype 2 packaged in the capsid from serotype 5. Use of pseudotyped viruses can improve transduction efficiency, as well as alter tropism. Hybrid capsids derived from different serotypes can also be used to alter viral tropism. For example, AAV-DJ contains a hybrid capsid from eight serotypes and displays high infectivity across a broad range of cell types in vivo. AAV-DJ8 is another example that displays the properties of AAV-DJ but with enhanced brain uptake. AAV serotypes can also be modified through mutations. Examples of mutational modifications of AAV2 include Y444F, Y500F, Y730F, and S662V. Examples of mutational modifications of AAV3 include Y705F, Y731F, and T492V. Examples of mutational modifications of AAV6 include S663V and T492V. Other pseudotyped/modified AAV variants include AAV2/1, AAV2/6, AAV2/7, AAV2/8, AAV2/9, AAV2.5, AAV8.2, and AAV/SASTG. In a specific example, the AAV is AAV7m8, an AAV variant that mediates highly efficient delivery to all retinal layers and to photoreceptors. See, e.g., Dalkara et al. (2013) *Sci. Transl. Med.* 5:189ra76, herein incorporated by reference in its entirety for all purposes.

To accelerate transgene expression, self-complementary AAV (scAAV) variants can be used. Because AAV depends on the cell's DNA replication machinery to synthesize the complementary strand of the AAV's single-stranded DNA genome, transgene expression may be delayed. To address this delay, scAAV containing complementary sequences that are capable of spontaneously annealing upon infection can be used, eliminating the requirement for host cell DNA synthesis. However, single-stranded AAV (ssAAV) vectors can also be used.

To increase packaging capacity, longer transgenes may be split between two AAV transfer plasmids, the first with a 3' splice donor and the second with a 5' splice acceptor. Upon co-infection of a cell, these viruses form concatemers, are spliced together, and the full-length transgene can be expressed. Although this allows for longer transgene expression, expression is less efficient. Similar methods for increasing capacity utilize homologous recombination. For example, a transgene can be divided between two transfer plasmids but with substantial sequence overlap such that co-expression induces homologous recombination and expression of the full-length transgene.

IV. Lipid Nanoparticles Comprising Nucleic Acid Constructs

Also provided herein are lipid nanoparticles comprising the nucleic acid constructs (i.e., exogenous donor nucleic acids) comprising a retinoschisin coding sequence (i.e., encoding a retinoschisin protein or fragment or variant thereof) for integration into and expression from a target genomic locus. Also provided herein are lipid nanoparticles comprising the nucleic acids encoding nuclease agents (e.g., targeting an endogenous RS1 locus) disclosed elsewhere herein. Also provided herein are lipid nanoparticles comprising the nucleic acid constructs and the nucleic acids encoding nuclease agents (e.g., targeting an endogenous RS1 locus) disclosed elsewhere herein.

Lipid formulations can protect biological molecules from degradation while improving their cellular uptake. Lipid nanoparticles are particles comprising a plurality of lipid molecules physically associated with each other by intermolecular forces. These include microspheres (including unilamellar and multilamellar vesicles, e.g., liposomes), a dispersed phase in an emulsion, micelles, or an internal phase in a suspension. Such lipid nanoparticles can be used to encapsulate one or more nucleic acids or proteins for delivery. Formulations which contain cationic lipids are useful for delivering polyanions such as nucleic acids. Other lipids that can be included are neutral lipids (i.e., uncharged or zwitterionic lipids), anionic lipids, helper lipids that enhance transfection, and stealth lipids that increase the length of time for which nanoparticles can exist in vivo. Examples of suitable cationic lipids, neutral lipids, anionic lipids, helper lipids, and stealth lipids can be found in WO 2016/010840 A1 and WO 2017/173054 A1, each of which is herein incorporated by reference in its entirety for all purposes. An exemplary lipid nanoparticle can comprise a cationic lipid and one or more other components. In one example, the other component can comprise a helper lipid such as cholesterol. In another example, the other components can comprise a helper lipid such as cholesterol and a neutral lipid such as DSPC. In another example, the other components can comprise a helper lipid such as cholesterol, an optional neutral lipid such as DSPC, and a stealth lipid such as S010, S024, S027, S031, or S033.

The LNP may contain one or more or all of the following: (i) a lipid for encapsulation and for endosomal escape; (ii) a neutral lipid for stabilization; (iii) a helper lipid for stabilization; and (iv) a stealth lipid. See, e.g., Finn et al. (2018) *Cell Rep.* 22(9):2227-2235 and WO 2017/173054 A1, each of which is herein incorporated by reference in its entirety for all purposes. In certain LNPs, the cargo can further comprise a nuclease agent. In certain LNPs, the cargo can further comprise a guide RNA or a nucleic acid encoding a guide RNA. In certain LNPs, the cargo can further comprise an mRNA encoding a Cas nuclease, such as Cas9, and a guide RNA or a nucleic acid encoding a guide RNA. In certain LNPs, the cargo can include an mRNA encoding a Cas nuclease, such as Cas9, a guide RNA or a nucleic acid encoding a guide RNA, and the nucleic acid construct.

The lipid for encapsulation and endosomal escape can be a cationic lipid. The lipid can also be a biodegradable lipid, such as a biodegradable ionizable lipid. One example of a suitable lipid is Lipid A or LP01, which is (9Z,12Z)-3-((4, 4-bis(octyloxy)butanoyl)oxy)-2-((((3-(diethylamino) propoxy)carbonyl)oxy)methyl)propyl octadeca-9,12-dienoate, also called 3-((4,4-bis(octyloxy)butanoyl)oxy)-2-((((3-(diethylamino)propoxy)carbonyl)oxy)methyl)propyl (9Z, 12Z)-octadeca-9,12-dienoate. See, e.g., Finn et al. (2018) *Cell Rep.* 22(9):2227-2235 and WO 2017/173054 A1, each of which is herein incorporated by reference in its entirety for all purposes. Another example of a suitable lipid is Lipid B, which is ((5-((dimethylamino)methyl)-1,3-phenylene)bis (oxy))bis(octane-8,1-diyl)bis(decanoate), also called ((5-((dimethylamino)methyl)-1,3-phenylene)bis(oxy))bis(octane-8,1-diyl)bis(decanoate). Another example of a suitable lipid is Lipid C, which is 2-((4-(((3-(dimethylamino) propoxy)carbonyl)oxy)hexadecanoyl)oxy)propane-1,3-diyl (9Z,9'Z,12Z,12'Z)-bis(octadeca-9,12-dienoate). Another example of a suitable lipid is Lipid D, which is 3-(((3-(dimethylamino)propoxy)carbonyl)oxy)-13-(octanoyloxy) tridecyl 3-octylundecanoate. Other suitable lipids include heptatriaconta-6,9,28,31-tetraen-19-yl 4-(dimethylamino) butanoate (also known as Dlin-MC3-DMA (MC3))).

Some such lipids suitable for use in the LNPs described herein are biodegradable in vivo. For example, LNPs comprising such a lipid include those where at least 75% of the lipid is cleared from the plasma within 8, 10, 12, 24, or 48 hours, or 3, 4, 5, 6, 7, or 10 days. As another example, at least 50% of the LNP is cleared from the plasma within 8, 10, 12, 24, or 48 hours, or 3, 4, 5, 6, 7, or 10 days.

Such lipids may be ionizable depending upon the pH of the medium they are in. For example, in a slightly acidic medium, the lipids may be protonated and thus bear a positive charge. Conversely, in a slightly basic medium, such as, for example, blood where pH is approximately 7.35, the lipids may not be protonated and thus bear no charge. In some embodiments, the lipids may be protonated at a pH of at least about 9, 9.5, or 10. The ability of such a lipid to bear a charge is related to its intrinsic pKa. For example, the lipid may, independently, have a pKa in the range of from about 5.8 to about 6.2.

Neutral lipids function to stabilize and improve processing of the LNPs. Examples of suitable neutral lipids include a variety of neutral, uncharged or zwitterionic lipids. Examples of neutral phospholipids suitable for use in the present disclosure include, but are not limited to, 5-heptadecylbenzene-1,3-diol (resorcinol), dipalmitoylphosphatidylcholine (DPPC), distearoylphosphatidylcholine (DSPC), phosphocholine (DOPC), dimyristoylphosphatidylcholine (DMPC), phosphatidylcholine (PLPC), 1,2-distearoyl-sn-glycero-3-phosphocholine (DAPC), phosphatidylethanolamine (PE), egg phosphatidylcholine (EPC), dilauryloylphosphatidylcholine (DLPC), dimyristoylphosphatidylcholine (DMPC), 1-myristoyl-2-palmitoyl phosphatidylcholine (MPPC), 1-palmitoyl-2-myristoyl phosphatidylcholine (PMPC), 1-palmitoyl-2-stearoyl phosphatidylcholine (PSPC), 1,2-diarachidoyl-sn-glycero-3-phosphocholine (DBPC), 1-stearoyl-2-palmitoyl phosphatidylcholine (SPPC), 1,2-dieicosenoyl-sn-glycero-3-phosphocholine (DEPC), palmitoyloleoyl phosphatidylcholine (POPC), lysophosphatidyl choline, dioleoyl phosphatidylethanolamine (DOPE), dilinoleoylphosphatidylcholine distearoylphosphatidylethanolamine (DSPE), dimyristoyl phosphatidylethanolamine (DMPE), dipalmitoyl phosphatidylethanolamine (DPPE), palmitoyloleoyl phosphatidylethanolamine (POPE), lyso-phosphatidylethanolamine, and combinations thereof. For example, the neutral phospholipid may be selected from the group consisting of distearoylphosphatidylcholine (DSPC) and dimyristoyl phosphatidyl ethanolamine (DMPE).

Helper lipids include lipids that enhance transfection. The mechanism by which the helper lipid enhances transfection can include enhancing particle stability. In certain cases, the helper lipid can enhance membrane fusogenicity. Helper lipids include steroids, sterols, and alkyl resorcinols. Examples of suitable helper lipids suitable include cholesterol, 5-heptadecylresorcinol, and cholesterol hemisuccinate. In one example, the helper lipid may be cholesterol or cholesterol hemisuccinate.

Stealth lipids include lipids that alter the length of time the nanoparticles can exist in vivo. Stealth lipids may assist in the formulation process by, for example, reducing particle aggregation and controlling particle size. Stealth lipids may modulate pharmacokinetic properties of the LNP. Suitable stealth lipids include lipids having a hydrophilic head group linked to a lipid moiety.

The hydrophilic head group of stealth lipid can comprise, for example, a polymer moiety selected from polymers based on PEG (sometimes referred to as poly(ethylene oxide)), poly(oxazoline), poly(vinyl alcohol), poly(glycerol), poly(N-vinylpyrrolidone), polyaminoacids, and poly N-(2-hydroxypropyl)methacrylamide. The term PEG means any polyethylene glycol or other polyalkylene ether polymer. In certain LNP formulations, the PEG, is a PEG-2K, also termed PEG 2000, which has an average molecular weight of about 2,000 daltons. See, e.g., WO 2017/173054 A1, herein incorporated by reference in its entirety for all purposes.

The lipid moiety of the stealth lipid may be derived, for example, from diacylglycerol or diacylglycamide, including those comprising a dialkylglycerol or dialkylglycamide group having alkyl chain length independently comprising from about C4 to about C40 saturated or unsaturated carbon atoms, wherein the chain may comprise one or more functional groups such as, for example, an amide or ester. The dialkylglycerol or dialkylglycamide group can further comprise one or more substituted alkyl groups.

As one example, the stealth lipid may be selected from PEG-dilauroylglycerol, PEG-dimyristoylglycerol (PEG-DMG), PEG-dipalmitoylglycerol, PEG-distearoylglycerol (PEG-DSPE), PEG-dilaurylglycamide, PEG-dimyristylglycamide, PEG-dipalmitoylglycamide, and PEG-distearoylglycamide, PEG-cholesterol (1-[8'-(Cholest-5-en-3[beta]-oxy)carboxamido-3',6'-dioxaoctanyl]carbamoyl-[omega]-methyl-poly(ethylene glycol), PEG-DMB (3,4-ditetradecoxylbenzyl-[omega]-methyl-poly(ethylene glycol)ether), 1,2-dimyristoyl-sn-glycero-3-phosphoethanolamine-N-[methoxy(polyethylene glycol)-2000](PEG2k-DMG), 1,2-distearoyl-sn-glycero-3-phosphoethanolamine-N-[methoxy(polyethylene glycol)-2000](PEG2k-DSPE), 1,2-distearoyl-sn-glycerol, methoxypoly ethylene glycol (PEG2k-DSG), poly(ethylene glycol)-2000-dimethacrylate (PEG2k-DMA), and 1,2-distearyloxypropyl-3-amine-N-[methoxy(polyethylene glycol)-2000](PEG2k-DSA). In one particular example, the stealth lipid may be PEG2k-DMG.

The LNPs can comprise different respective molar ratios of the component lipids in the formulation. The mol-% of the CCD lipid may be, for example, from about 30 mol-% to about 60 mol-%, from about 35 mol-% to about 55 mol-%, from about 40 mol-% to about 50 mol-%, from about 42 mol-% to about 47 mol-%, or about 45%. The mol-% of the helper lipid may be, for example, from about 30 mol-% to about 60 mol-%, from about 35 mol-% to about 55 mol-%, from about 40 mol-% to about 50 mol-%, from about 41 mol-% to about 46 mol-%, or about 44 mol-%. The mol-% of the neutral lipid may be, for example, from about 1 mol-% to about 20 mol-%, from about 5 mol-% to about 15 mol-%, from about 7 mol-% to about 12 mol-%, or about 9 mol-%. The mol-% of the stealth lipid may be, for example, from about 1 mol-% to about 10 mol-%, from about 1 mol-% to about 5 mol-%, from about 1 mol-% to about 3 mol-%, about 2 mol-%, or about 1 mol-%.

The LNPs can have different ratios between the positively charged amine groups of the biodegradable lipid (N) and the negatively charged phosphate groups (P) of the nucleic acid to be encapsulated. This may be mathematically represented by the equation N/P. For example, the N/P ratio may be from about 0.5 to about 100, from about 1 to about 50, from about 1 to about 25, from about 1 to about 10, from about 1 to about 7, from about 3 to about 5, from about 4 to about 5, about 4, about 4.5, or about 5.

In some LNPs, the cargo can comprise Cas mRNA and gRNA. The Cas mRNA and gRNAs can be in different ratios. For example, the LNP formulation can include a ratio of Cas mRNA to gRNA nucleic acid ranging from about 25:1 to about 1:25, ranging from about 10:1 to about 1:10, ranging from about 5:1 to about 1:5, or about 1:1. Alternatively, the LNP formulation can include a ratio of Cas mRNA to gRNA nucleic acid from about 1:1 to about 1:5, or about 10:1. Alternatively, the LNP formulation can include a ratio of Cas mRNA to gRNA nucleic acid of about 1:10, 25:1, 10:1, 5:1, 3:1, 1:1, 1:3, 1:5, 1:10, or 1:25. Alternatively, the LNP formulation can include a ratio of Cas mRNA to gRNA nucleic acid of from about 1:1 to about 1:2. In specific examples, the ratio of Cas mRNA to gRNA can be about 1:1 or about 1:2.

Exemplary dosing of LNPs includes about 0.1, about 0.25, about 0.3, about 0.5, about 1, about 2, about 3, about 4, about 5, about 6, about 8, or about 10 mg/kg body weight (mpk) or about 0.1 to about 10, about 0.25 to about 10, about 0.3 to about 10, about 0.5 to about 10, about 1 to about 10, about 2 to about 10, about 3 to about 10, about 4 to about 10, about 5 to about 10, about 6 to about 10, about 8 to about 10, about 0.1 to about 8, about 0.1 to about 6, about 0.1 to about 5, about 0.1 to about 4, about 0.1 to about 3, about 0.1 to about 2, about 0.1 to about 1, about 0.1 to about 0.5, about 0.1 to about 0.3, about 0.1 to about 0.25, about 0.25 to about 8, about 0.3 to about 6, about 0.5 to about 5, about 1 to about 5, or about 2 to about 3 mg/kg body weight with respect to total RNA (Cas9 mRNA and gRNA) cargo content. Such LNPs can be administered, for example, intravenously. In one example, LNP doses between about 0.01 mg/kg and about 10 mg/kg, between about 0.1 and about 10 mg/kg, or between about 0.01 and about 0.3 mg/kg can be used. For example, LNP doses of about 0.01, about 0.03, about 0.1, about 0.3, about 1, about 3, or about 10 mg/kg can be used. Additional exemplary dosing of LNPs includes about 0.1, about 0.25, about 0.3, about 0.5, about 1, about 2, about 3, about 4, about 5, about 6, about 8, or about 10 mg/kg (mpk) body weight or about 0.1 to about 10, about 0.25 to about 10, about 0.3 to about 10, about 0.5 to about 10, about 1 to about 10, about 2 to about 10, about 3 to about 10, about 4 to about 10, about 5 to about 10, about 6 to about 10, about 8 to about 10, about 0.1 to about 8, about 0.1 to about 6, about 0.1 to about 5, about 0.1 to about 4, about 0.1 to about 3, about 0.1 to about 2, about 0.1 to about 1, about 0.1 to about 0.5, about 0.1 to about 0.3, about 0.1 to about 0.25, about 0.25 to about 8, about 0.3 to about 6, about 0.5 to about 5, about 1 to about 5, or about 2 to about 3 mg/kg body weight with respect to total RNA (Cas9 mRNA and gRNA) cargo content. Such LNPs can be administered, for example, intravenously. In one example, LNP doses between about 0.01 mg/kg and about 10 mg/kg, between about 0.1 and about 10 mg/kg, or between about 0.01 and about 0.3 mg/kg can be used. For example, LNP doses of about 0.01, about 0.03, about 0.1, about 0.3, about 0.5, about 1, about 2, about 3, or about 10 mg/kg can be used. In another example, LNP doses between about 0.5 and about 10, between about 0.5 and about 5, between about 0.5 and about 3, between about 1 and about 10, between about 1 and about 5, between about 1 and about 3, or between about 1 and about 2 mg/kg can be used.

V. Compositions Comprising Nucleic Acid Constructs and/or a Nuclease Agent or a Nucleic Acid Encoding a Nuclease Agent Also provided herein are compositions comprising the nucleic acid constructs comprising a retinoschisin coding sequence (i.e., encoding a retinoschisin protein or fragment or variant thereof) for integration into and expression from a target genomic locus, vectors, or lipid nanoparticles disclosed herein and a nuclease agent or a nucleic acid encoding the nuclease agent. Also provided herein are compositions comprising the nucleic acid constructs comprising a retinoschisin coding sequence (i.e., encoding a retinoschisin protein or fragment or variant thereof) for integration into and expression from a target genomic locus, vectors, or lipid nanoparticles disclosed herein. Also provided herein are compositions comprising a nuclease agent or a nucleic acid encoding the nuclease agent (e.g., wherein the nuclease agent targets a RS1 gene or locus) or vectors or lipid nanoparticles comprising the nuclease agent or the nucleic acid encoding the nuclease agent. Such compositions can be, for example, for use in expressing retinoschisin in a cell or for use in integrating a coding sequence for a retinoschisin protein or fragment or variant thereof into a target genomic locus in a cell. Such compositions can also be, for example, for use in treating a subject with X-linked juvenile retinoschisis (XLRS). Such compositions can comprise a nucleic acid construct comprising the coding sequence for the retinoschisin protein or fragment thereof for integration into the target genomic locus (or a vector or lipid nanoparticle comprising the nucleic acid construct) and a nuclease agent or a nucleic acid encoding the nuclease agent, wherein the nuclease agent targets a nuclease target sequence in the target genomic locus. The nuclease agent can be a CRISPR/Cas system (e.g., a Cas protein and a guide RNA) or any other suitable nuclease agent. Examples of suitable nuclease agents are provided below.

A. CRISPR/Cas Systems

The methods and compositions disclosed herein can utilize Clustered Regularly Interspersed Short Palindromic Repeats (CRISPR)/CRISPR-associated (Cas) systems or components of such systems to modify a genome within a cell (e.g., an RS1 locus). CRISPR/Cas systems include transcripts and other elements involved in the expression of, or directing the activity of, Cas genes. A CRISPR/Cas system can be, for example, a type I, a type II, a type III system, or a type V system (e.g., subtype V-A or subtype V-B). The methods and compositions disclosed herein can employ CRISPR/Cas systems by utilizing CRISPR complexes (comprising a guide RNA (gRNA) complexed with a Cas protein) for site-directed binding or cleavage of nucleic acids.

CRISPR/Cas systems used in the compositions and methods disclosed herein can be non-naturally occurring. A "non-naturally occurring" system includes anything indicating the involvement of the hand of man, such as one or more components of the system being altered or mutated from their naturally occurring state, being at least substantially free from at least one other component with which they are naturally associated in nature or being associated with at least one other component with which they are not naturally associated. For example, some CRISPR/Cas systems employ non-naturally occurring CRISPR complexes comprising a gRNA and a Cas protein that do not naturally occur together, employ a Cas protein that does not occur naturally, or employ a gRNA that does not occur naturally.

1. Cas Proteins

Cas proteins generally comprise at least one RNA recognition or binding domain that can interact with guide RNAs. Cas proteins can also comprise nuclease domains (e.g., DNase domains or RNase domains), DNA-binding domains, helicase domains, protein-protein interaction domains, dimerization domains, and other domains. Some such domains (e.g., DNase domains) can be from a native Cas protein. Other such domains can be added to make a modified Cas protein. A nuclease domain possesses catalytic activity for nucleic acid cleavage, which includes the breakage of the covalent bonds of a nucleic acid molecule. Cleavage can produce blunt ends or staggered ends, and it can be single-stranded or double-stranded. For example, a wild type Cas9 protein will typically create a blunt cleavage product. Alternatively, a wild type Cpf1 protein (e.g., FnCpf1) can result in a cleavage product with a 5-nucleotide 5' overhang, with the cleavage occurring after the 18th base pair from the PAM sequence on the non-targeted strand and after the 23rd base on the targeted strand. A Cas protein can have full cleavage activity to create a double-strand break at a target genomic locus (e.g., a double-strand break with blunt ends), or it can be a nickase that creates a single-strand break at a target genomic locus.

Examples of Cas proteins include Cas1, Cas1B, Cas2, Cas3, Cas4, Cas5, Cas5e (CasD), Cas6, Cas6e, Cas6f, Cas7, Cas8a1, Cas8a2, Cas8b, Cas8c, Cas9 (Csn1 or Csx12), Cas10, Cas10d, CasF, CasG, CasH, Csy1, Csy2, Csy3, Cse1 (CasA), Cse2 (CasB), Cse3 (CasE), Cse4 (CasC), Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, and Cu1966, and homologs or modified versions thereof.

An exemplary Cas protein is a Cas9 protein or a protein derived from a Cas9 protein. Cas9 proteins are from a type II CRISPR/Cas system and typically share four key motifs with a conserved architecture. Motifs 1, 2, and 4 are RuvC-like motifs, and motif 3 is an HNH motif. Exemplary Cas9 proteins are from *Streptococcus pyogenes, Streptococcus thermophilus, Streptococcus sp., Staphylococcus aureus, Nocardiopsis dassonvillei, Streptomyces pristinaespiralis, Streptomyces viridochromogenes, Streptomyces viridochromogenes, Streptosporangium roseum, Streptosporangium roseum, Alicyclobacillus acidocaldarius, Bacillus pseudomycoides, Bacillus selenitireducens, Exiguobacterium sibiricum, Lactobacillus delbrueckii, Lactobacillus salivarius, Microscilla marina, Burkholderiales* bacterium, *Polaromonas naphthalenivorans, Polaromonas* sp., *Crocosphaera watsonii,* Cyanothece sp., *Microcystis aeruginosa, Synechococcus* sp., *Acetohalobium arabaticum, Ammonifex degensii, Caldicellulosiruptor becscii, Candidatus Desulforudis, Clostridium botulinum, Clostridium difficile, Finegoldia magna, Natranaerobius thermophilus, Pelotomaculum thermopropionicum, Acidithiobacillus caldus, Acidithiobacillus ferrooxidans, Allochromatium vinosum, Marinobacter* sp., *Nitrosococcus halophilus, Nitrosococcus watsoni, Pseudoalteromonas haloplanktis, Ktedonobacter racemifer, Methanohalobium evestigatum, Anabaena variabilis, Nodularia spumigena, Nostoc* sp., *Arthrospira maxima, Arthrospira platensis, Arthrospira* sp., *Lyngbya* sp., *Microcoleus chthonoplastes, Oscillatoria* sp., *Petrotoga mobilis, Thermosipho africanus, Acaryochloris marina, Neisseria meningitidis,* or *Campylobacter jejuni*. Additional examples of the Cas9 family members are described in WO 2014/131833, herein incorporated by reference in its entirety for all purposes. Cas9 from *S. pyogenes* (SpCas9) (e.g., assigned UniProt accession number Q99ZW2) is an exemplary Cas9 protein. An exemplary SpCas9 protein sequence is set forth in SEQ ID NO: 27 (encoded by the DNA sequence set forth in SEQ ID NO: 26). An exemplary SpCas9 cDNA sequence is set forth in SEQ ID NO: 28. Smaller Cas9 proteins (e.g., Cas9 proteins whose coding sequences are compatible with the maximum AAV packaging capacity when combined with a guide RNA coding sequence and regulatory elements for the Cas9 and guide RNA, such as SaCas9 and CjCas9 and Nme2Cas9) are other exemplary Cas9 proteins. For example, Cas9 from *S. aureus* (SaCas9) (e.g., assigned UniProt accession number J7RUA5) is another exemplary Cas9 protein. Likewise, Cas9 from *Campylobacter jejuni* (CjCas9) e.g., (assigned UniProt accession number Q0P897) is another exemplary Cas9 protein. See, e.g., Kim et al. (2017) *Nat. Commun.* 8:14500, herein incorporated by reference in its entirety for all purposes. SaCas9 is smaller than SpCas9, and CjCas9 is smaller than both SaCas9 and SpCas9. Cas9 from *Neisseria*

*meningitidis* (Nme2Cas9) is another exemplary Cas9 protein. See, e.g., Edraki et al. (2019) *Mol. Cell* 73(4):714-726, herein incorporated by reference in its entirety for all purposes. Cas9 proteins from *Streptococcus thermophilus* (e.g., *Streptococcus thermophilus* LMID-9 Cas9 encoded by the CRISPR1 locus (St1Cas9) or *Streptococcus thermophilus* Cas9 from the CRISPR3 locus (St3Cas9)) are other exemplary Cas9 proteins. Cas9 from *Francisella novicida* (FnCas9) or the RHA *Francisella novicida* Cas9 variant that recognizes an alternative PAM (E1369R/E1449H/R1556A substitutions) are other exemplary Cas9 proteins. These and other exemplary Cas9 proteins are reviewed, e.g., in Cebrian-Serrano and Davies (2017) *Mamm. Genome* 28(7): 247-261, herein incorporated by reference in its entirety for all purposes. Examples of Cas9 coding sequences, Cas9 mRNAs, and Cas9 protein sequences are provided in WO 2013/176772, WO 2014/065596, WO 2016/106121, and WO 2019/067910, each of which is herein incorporated by reference in its entirety for all purposes. Specific examples of ORFs and Cas9 amino acid sequences are provided in Table 30 at paragraph [0449] WO 2019/067910, and specific examples of Cas9 mRNAs and ORFs are provided in paragraphs [0214]-[0234] of WO 2019/067910. As one example, a Cas9 protein can comprise, consist essentially of, or consist of the sequence set forth in SEQ ID NO: 6242. Such a Cas9 protein can be encoded by a mRNA comprising, consisting essentially of, or consisting of SEQ ID NO: 6243. As another example, a Cas9 protein can comprise, consist essentially of, or consist of the sequence set forth in SEQ ID NO: 6246. Such a Cas9 protein can be encoded by a mRNA comprising, consisting essentially of, or consisting of SEQ ID NO: 6245.

Another example of a Cas protein is a Cpf1 (CRISPR from *Prevotella* and *Francisella* 1) protein. Cpf1 is a large protein (about 1300 amino acids) that contains a RuvC-like nuclease domain homologous to the corresponding domain of Cas9 along with a counterpart to the characteristic arginine-rich cluster of Cas9. However, Cpf1 lacks the HNH nuclease domain that is present in Cas9 proteins, and the RuvC-like domain is contiguous in the Cpf1 sequence, in contrast to Cas9 where it contains long inserts including the HNH domain. See, e.g., Zetsche et al. (2015) *Cell* 163(3): 759-771, herein incorporated by reference in its entirety for all purposes. Exemplary Cpf1 proteins are from *Francisella tularensis* 1, *Francisella tularensis* subsp. *novicida*, *Prevotella albensis*, Lachnospiraceae bacterium MC2017 1, *Butyrivibrio proteoclasticus*, Peregrinibacteria bacterium GW2011 GWA2_33_10, Parcubacteria bacterium GW2011_GWC2_44_17, *Smithella* sp. SCADC, *Acidaminococcus* sp. BV3L6, Lachnospiraceae bacterium MA2020, *Candidatus methanoplasma termitum*, *Eubacterium eligens*, *Moraxella bovoculi* 237, *Leptospira inadai*, Lachnospiraceae bacterium ND2006, *Porphyromonas crevioricanis* 3, *Prevotella disiens*, and *Porphyromonas macacae*. Cpf1 from *Francisella novicida* U112 (FnCpf1; assigned UniProt accession number A0Q7Q2) is an exemplary Cpf1 protein.

Cas proteins can be wild type proteins (i.e., those that occur in nature), modified Cas proteins (i.e., Cas protein variants), or fragments of wild type or modified Cas proteins. Cas proteins can also be active variants or fragments with respect to catalytic activity of wild type or modified Cas proteins. Active variants or fragments with respect to catalytic activity can comprise at least 80%, 85%, 90%, 91%, 92%, 93%, 94%, 95%, 96%, 97%, 98%, 99% or more sequence identity to the wild type or modified Cas protein or a portion thereof, wherein the active variants retain the ability to cut at a desired cleavage site and hence retain nick-inducing or double-strand-break-inducing activity. Assays for nick-inducing or double-strand-break-inducing activity are known and generally measure the overall activity and specificity of the Cas protein on DNA substrates containing the cleavage site.

Cas proteins can be modified to increase or decrease one or more of nucleic acid binding affinity, nucleic acid binding specificity, and enzymatic activity. Cas proteins can also be modified to change any other activity or property of the protein, such as stability. For example, one or more nuclease domains of the Cas protein can be modified, deleted, or inactivated, or a Cas protein can be truncated to remove domains that are not essential for the function of the protein or to optimize (e.g., enhance or reduce) the activity of or a property of the Cas protein.

One example of a modified Cas protein is the modified SpCas9-HF1 protein, which is a high-fidelity variant of *Streptococcus pyogenes* Cas9 harboring alterations (N497A/ R661A/Q695A/Q926A) designed to reduce non-specific DNA contacts. See, e.g., Kleinstiver et al. (2016) *Nature* 529(7587):490-495, herein incorporated by reference in its entirety for all purposes. Another example of a modified Cas protein is the modified eSpCas9 variant (K848A/K1003A/ R1060A) designed to reduce off-target effects. See, e.g., Slaymaker et al. (2016) *Science* 351(6268):84-88, herein incorporated by reference in its entirety for all purposes. Other SpCas9 variants include K855A and K810A/K1003A/ R1060A. These and other modified Cas proteins are reviewed, e.g., in Cebrian-Serrano and Davies (2017) *Mamm. Genome* 28(7):247-261, herein incorporated by reference in its entirety for all purposes. Another example of a modified Cas9 protein is xCas9, which is a SpCas9 variant that can recognize an expanded range of PAM sequences. See, e.g., Hu et al. (2018) *Nature* 556:57-63, herein incorporated by reference in its entirety for all purposes.

Cas proteins can comprise at least one nuclease domain, such as a DNase domain. For example, a wild type Cpf1 protein generally comprises a RuvC-like domain that cleaves both strands of target DNA, perhaps in a dimeric configuration. Cas proteins can also comprise at least two nuclease domains, such as DNase domains. For example, a wild type Cas9 protein generally comprises a RuvC-like nuclease domain and an HNH-like nuclease domain. The RuvC and HNH domains can each cut a different strand of double-stranded DNA to make a double-stranded break in the DNA. See, e.g., Jinek et al. (2012) *Science* 337:816-821, herein incorporated by reference in its entirety for all purposes.

One or more or all of the nuclease domains can be deleted or mutated so that they are no longer functional or have reduced nuclease activity. For example, if one of the nuclease domains is deleted or mutated in a Cas9 protein, the resulting Cas9 protein can be referred to as a nickase and can generate a single-strand break within a double-stranded target DNA but not a double-strand break (i.e., it can cleave the complementary strand or the non-complementary strand, but not both). If both of the nuclease domains are deleted or mutated, the resulting Cas protein (e.g., Cas9) will have a reduced ability to cleave both strands of a double-stranded DNA (e.g., a nuclease-null or nuclease-inactive Cas protein, or a catalytically dead Cas protein (dCas)). If none of the nuclease domains is deleted or mutated in a Cas9 protein, the Cas9 protein will retain double-strand-break-inducing activity. An example of a mutation that converts Cas9 into a nickase is a D10A (aspartate to alanine at position 10 of Cas9) mutation in the RuvC domain of Cas9 from *S. pyogenes*. Likewise, H939A (histidine to alanine at amino acid position 839), H840A (histidine to alanine at amino acid position 840), or N863A (asparagine to alanine at amino acid position N863) in the HNH domain of Cas9 from *S. pyogenes* can convert the Cas9 into a nickase. Other examples of mutations that convert Cas9 into a nickase include the corresponding mutations to Cas9 from *S. thermophilus*. See, e.g., Sapranauskas et al. (2011) *Nucleic Acids Res.* 39(21): 9275-9282 and WO 2013/141680, each of which is herein incorporated by reference in its entirety for all purposes. Such mutations can be generated using methods such as site-directed mutagenesis, PCR-mediated mutagenesis, or total gene synthesis. Examples of other mutations creating nickases can be found, for example, in WO 2013/176772 and WO 2013/142578, each of which is herein incorporated by reference in its entirety for all purposes. If all of the nuclease domains are deleted or mutated in a Cas protein (e.g., both of the nuclease domains are deleted or mutated in a Cas9 protein), the resulting Cas protein (e.g., Cas9) will have a reduced ability to cleave both strands of a double-stranded DNA (e.g., a nuclease-null or nuclease-inactive Cas protein). One specific example is a D10A/H840A *S. pyogenes* Cas9 double mutant or a corresponding double mutant in a Cas9 from another species when optimally aligned with *S. pyogenes* Cas9. Another specific example is a D10A/N863A *S. pyogenes* Cas9 double mutant or a corresponding double mutant in a Cas9 from another species when optimally aligned with *S. pyogenes* Cas9.

Examples of inactivating mutations in the catalytic domains of xCas9 are the same as those described above for SpCas9. Examples of inactivating mutations in the catalytic domains of *Staphylococcus aureus* Cas9 proteins are also known. For example, the *Staphylococcus aureus* Cas9 enzyme (SaCas9) may comprise a substitution at position N580 (e.g., N580A substitution) and a substitution at position D10 (e.g., D10A substitution) to generate a nuclease-inactive Cas protein. See, e.g., WO 2016/106236, herein incorporated by reference in its entirety for all purposes. Examples of inactivating mutations in the catalytic domains of Nme2Cas9 are also known (e.g., combination of D16A and H588A). Examples of inactivating mutations in the catalytic domains of St1Cas9 are also known (e.g., combination of D9A, D598A, H599A, and N622A). Examples of inactivating mutations in the catalytic domains of St3Cas9 are also known (e.g., combination of D10A and N870A). Examples of inactivating mutations in the catalytic domains of CjCas9 are also known (e.g., combination of D8A and H559A). Examples of inactivating mutations in the catalytic domains of FnCas9 and RHA FnCas9 are also known (e.g., N995A).

Examples of inactivating mutations in the catalytic domains of Cpf1 proteins are also known. With reference to Cpf1 proteins from *Francisella novicida* U112 (FnCpf1), *Acidaminococcus* sp. BV3L6 (AsCpf1), Lachnospiraceae bacterium ND2006 (LbCpf1), and *Moraxella* bovoculi 237 (MbCpf1 Cpf1), such mutations can include mutations at positions 908, 993, or 1263 of AsCpf1 or corresponding positions in Cpf1 orthologs, or positions 832, 925, 947, or 1180 of LbCpf1 or corresponding positions in Cpf1 orthologs. Such mutations can include, for example one or more of mutations D908A, E993A, and D1263A of AsCpf1 or corresponding mutations in Cpf1 orthologs, or D832A, E925A, D947A, and D1180A of LbCpf1 or corresponding mutations in Cpf1 orthologs. See, e.g., US 2016/0208243, herein incorporated by reference in its entirety for all purposes.

Cas proteins can also be operably linked to heterologous polypeptides as fusion proteins. For example, a Cas protein can be fused to a cleavage domain or an epigenetic modification domain. See WO 2014/089290, herein incorporated by reference in its entirety for all purposes. Cas proteins can also be fused to a heterologous polypeptide providing increased or decreased stability. The fused domain or heterologous polypeptide can be located at the N-terminus, the C-terminus, or internally within the Cas protein.

As one example, a Cas protein can be fused to one or more heterologous polypeptides that provide for subcellular localization. Such heterologous polypeptides can include, for example, one or more nuclear localization signals (NLS) such as the monopartite SV40 NLS and/or a bipartite alpha-importin NLS for targeting to the nucleus, a mitochondrial localization signal for targeting to the mitochondria, an ER retention signal, and the like. See, e.g., Lange et al. (2007) *J. Biol. Chem.* 282(8):5101-5105, herein incorporated by reference in its entirety for all purposes. Such subcellular localization signals can be located at the N-terminus, the C-terminus, or anywhere within the Cas protein. An NLS can comprise a stretch of basic amino acids and can be a monopartite sequence or a bipartite sequence. Optionally, a Cas protein can comprise two or more NLSs, including an NLS (e.g., an alpha-importin NLS or a monopartite NLS) at the N-terminus and an NLS (e.g., an SV40 NLS or a bipartite NLS) at the C-terminus. A Cas protein can also comprise two or more NLSs at the N-terminus and/or two or more NLSs at the C-terminus.

A Cas protein may, for example, be fused with 1-10 NLSs (e.g., fused with 1-5 NLSs or fused with one NLS. Where one NLS is used, the NLS may be linked at the N-terminus or the C-terminus of the Cas protein sequence. It may also be inserted within the Cas protein sequence. Alternatively, the Cas protein may be fused with more than one NLS. For example, the Cas protein may be fused with 2, 3, 4, or 5 NLSs. In a specific example, the Cas protein may be fused with two NLSs. In certain circumstances, the two NLSs may be the same (e.g., two SV40 NLSs) or different. For example, the Cas protein can be fused to two SV40 NLS sequences linked at the carboxy terminus. Alternatively, the Cas protein may be fused with two NLSs, one linked at the N-terminus and one at the C-terminus. In other examples, the Cas protein may be fused with 3 NLSs or with no NLS. The NLS may be a monopartite sequence, such as, e.g., the SV40 NLS, PKKKRKV (SEQ ID NO: 49) or PKKKRRV (SEQ ID NO: 50). The NLS may be a bipartite sequence, such as the NLS of nucleoplasmin, KRPAATKKAGQAKKKK (SEQ ID NO: 51). In a specific example, a single PKKKRKV (SEQ ID NO: 49) NLS may be linked at the C-terminus of the Cas protein. One or more linkers are optionally included at the fusion site.

Cas proteins can also be operably linked to a cell-penetrating domain or protein transduction domain. For example, the cell-penetrating domain can be derived from the HIV-1 TAT protein, the TLM cell-penetrating motif from human hepatitis B virus, MPG, Pep-1, VP22, a cell penetrating peptide from Herpes simplex virus, or a polyarginine peptide sequence. See, e.g., WO 2014/089290 and WO 2013/176772, each of which is herein incorporated by reference in its entirety for all purposes. The cell-penetrating domain can be located at the N-terminus, the C-terminus, or anywhere within the Cas protein.

Cas proteins can also be operably linked to a heterologous polypeptide for ease of tracking or purification, such as a fluorescent protein, a purification tag, or an epitope tag. Examples of fluorescent proteins include green fluorescent proteins (e.g., GFP, GFP-2, tagGFP, turboGFP, eGFP, Emerald, Azami Green, Monomeric Azami Green, CopGFP, AceGFP, ZsGreenl), yellow fluorescent proteins (e.g., YFP, eYFP, Citrine, Venus, YPet, PhiYFP, ZsYellowl), blue fluorescent proteins (e.g., eBFP, eBFP2, Azurite, mKalamal, GFPuv, Sapphire, T-sapphire), cyan fluorescent proteins (e.g., eCFP, Cerulean, CyPet, AmCyanl, Midoriishi-Cyan), red fluorescent proteins (e.g., mKate, mKate2, mPlum, DsRed monomer, mCherry, mRFP1, DsRed-Express, DsRed2, DsRed-Monomer, HcRed-Tandem, HcRedl, AsRed2, eqFP611, mRaspberry, mStrawberry, Jred), orange fluorescent proteins (e.g., mOrange, mKO, Kusabira-Orange, Monomeric Kusabira-Orange, mTangerine, tdTomato), and any other suitable fluorescent protein. Examples of tags include glutathione-S-transferase (GST), chitin binding protein (CBP), maltose binding protein, thioredoxin (TRX), poly(NANP), tandem affinity purification (TAP) tag, myc, AcV5, AU1, AU5, E, ECS, E2, FLAG, hemagglutinin (HA), nus, Softag 1, Softag 3, Strep, SBP, Glu-Glu, HSV, KT3, S, S1, T7, V5, VSV-G, histidine (His), biotin carboxyl carrier protein (BCCP), and calmodulin.

Cas proteins can also be tethered to labeled nucleic acids or donor sequences. Such tethering (i.e., physical linking) can be achieved through covalent interactions or noncovalent interactions, and the tethering can be direct (e.g., through direct fusion or chemical conjugation, which can be achieved by modification of cysteine or lysine residues on the protein or intein modification) or can be achieved through one or more intervening linkers or adapter molecules such as streptavidin or aptamers. See, e.g., Pierce et al. (2005) *Mini Rev. Med. Chem.* 5(1):41-55; Duckworth et al. (2007) *Angew. Chem. Int. Ed. Engl.* 46(46):8819-8822; Schaeffer and Dixon (2009) *Australian J. Chem.* 62(10): 1328-1332; Goodman et al. (2009) *Chembiochem.* 10(9): 1551-1557; and Khatwani et al. (2012) *Bioorg. Med. Chem.* 20(14):4532-4539, each of which is herein incorporated by reference in its entirety for all purposes. Noncovalent strategies for synthesizing protein-nucleic acid conjugates include biotin-streptavidin and nickel-histidine methods. Covalent protein-nucleic acid conjugates can be synthesized by connecting appropriately functionalized nucleic acids and proteins using a wide variety of chemistries. Some of these chemistries involve direct attachment of the oligonucleotide to an amino acid residue on the protein surface (e.g., a lysine amine or a cysteine thiol), while other more complex schemes require post-translational modification of the protein or the involvement of a catalytic or reactive protein domain. Methods for covalent attachment of proteins to nucleic acids can include, for example, chemical cross-linking of oligonucleotides to protein lysine or cysteine residues, expressed protein-ligation, chemoenzymatic methods, and the use of photoaptamers. The labeled nucleic acid or donor sequence can be tethered to the C-terminus, the N-terminus, or to an internal region within the Cas protein. In one example, the labeled nucleic acid or donor sequence is tethered to the C-terminus or the N-terminus of the Cas protein. Likewise, the Cas protein can be tethered to the 5' end, the 3' end, or to an internal region within the labeled nucleic acid or donor sequence. That is, the labeled nucleic acid or donor sequence can be tethered in any orientation and polarity. For example, the Cas protein can be tethered to the 5' end or the 3' end of the labeled nucleic acid or donor sequence.

Cas proteins can be provided in any form. For example, a Cas protein can be provided in the form of a protein, such as a Cas protein complexed with a gRNA. Alternatively, a Cas protein can be provided in the form of a nucleic acid encoding the Cas protein, such as an RNA (e.g., messenger RNA (mRNA)) or DNA. Optionally, the nucleic acid encoding the Cas protein can be codon optimized for efficient translation into protein in a particular cell or organism. For example, the nucleic acid encoding the Cas protein can be modified to substitute codons having a higher frequency of usage in a bacterial cell, a yeast cell, a human cell, a non-human cell, a mammalian cell, a rodent cell, a mouse cell, a rat cell, or any other host cell of interest, as compared to the naturally occurring polynucleotide sequence. When a nucleic acid encoding the Cas protein is introduced into the cell, the Cas protein can be transiently, conditionally, or constitutively expressed in the cell.

Cas proteins provided as mRNAs can be modified for improved stability and/or immunogenicity properties. The modifications may be made to one or more nucleosides within the mRNA. Examples of chemical modifications to mRNA nucleobases include pseudouridine, 1-methylpseudouridine, and 5-methyl-cytidine. For example, capped and polyadenylated Cas mRNA containing N1-methyl pseudouridine can be used. Likewise, Cas mRNAs can be modified by depletion of uridine using synonymous codons.

Nucleic acids encoding Cas proteins can be stably integrated in the genome of a cell and operably linked to a promoter active in the cell. Alternatively, nucleic acids encoding Cas proteins can be operably linked to a promoter in an expression construct. Expression constructs include any nucleic acid constructs capable of directing expression of a gene or other nucleic acid sequence of interest (e.g., a Cas gene) and which can transfer such a nucleic acid sequence of interest to a target cell. For example, the nucleic acid encoding the Cas protein can be in a vector comprising a DNA encoding a gRNA. Alternatively, it can be in a vector or plasmid that is separate from the vector comprising the DNA encoding the gRNA. Promoters that can be used in an expression construct include promoters active, for example, in one or more of a eukaryotic cell, a human cell, a non-human cell, a mammalian cell, a non-human mammalian cell, a rodent cell, a mouse cell, a rat cell, a pluripotent cell, an embryonic stem (ES) cell, an adult stem cell, a developmentally restricted progenitor cell, an induced pluripotent stem (iPS) cell, or a one-cell stage embryo. Such promoters can be, for example, conditional promoters, inducible promoters, constitutive promoters, or tissue-specific promoters. Optionally, the promoter can be a bidirectional promoter driving expression of both a Cas protein in one direction and a guide RNA in the other direction. Such bidirectional promoters can consist of (1) a complete, conventional, unidirectional Pol III promoter that contains 3 external control elements: a distal sequence element (DSE), a proximal sequence element (PSE), and a TATA box; and (2) a second basic Pol III promoter that includes a PSE and a TATA box fused to the 5' terminus of the DSE in reverse orientation. For example, in the H1 promoter, the DSE is adjacent to the PSE and the TATA box, and the promoter can be rendered bidirectional by creating a hybrid promoter in which transcription in the reverse direction is controlled by appending a PSE and TATA box derived from the U6 promoter. See, e.g., US 2016/0074535, herein incorporated by references in its entirety for all purposes. Use of a bidirectional promoter to express genes encoding a Cas protein and a guide RNA simultaneously allow for the generation of compact expression cassettes to facilitate delivery.

Different promoters can be used to drive Cas expression or Cas9 expression. In some methods, small promoters are used so that the Cas or Cas9 coding sequence can fit into an AAV construct. For example, Cas or Cas9 and one or more gRNAs (e.g., 1 gRNA or 2 gRNAs or 3 gRNAs or 4 gRNAs)

can be delivered via LNP-mediated delivery (e.g., in the form of RNA) or adeno-associated virus (AAV)-mediated delivery (e.g., AAV2-mediated delivery, AAV5-mediated delivery, AAV8-mediated delivery, or AAV7m8-mediated delivery). For example, the nuclease agent can be CRISPR/Cas9, and a Cas9 mRNA and a gRNA targeting an endogenous RS1 locus (e.g., intron 1 of RS1) can be delivered via LNP-mediated delivery, or a DNA encoding Cas9 and a DNA encoding a gRNA targeting an endogenous RS1 locus (e.g., intron 1 of RS1) can be delivered via AAV-mediated delivery. The Cas or Cas9 and the gRNA(s) can be delivered in a single AAV or via two separate AAVs. For example, a first AAV can carry a Cas or Cas9 expression cassette, and a second AAV can carry a gRNA expression cassette. Similarly, a first AAV can carry a Cas or Cas9 expression cassette, and a second AAV can carry two or more gRNA expression cassettes. Alternatively, a single AAV can carry a Cas or Cas9 expression cassette (e.g., Cas or Cas9 coding sequence operably linked to a promoter) and a gRNA expression cassette (e.g., gRNA coding sequence operably linked to a promoter). Similarly, a single AAV can carry a Cas or Cas9 expression cassette (e.g., Cas or Cas9 coding sequence operably linked to a promoter) and two or more gRNA expression cassettes (e.g., gRNA coding sequences operably linked to promoters). Different promoters can be used to drive expression of the gRNA, such as a U6 promoter or the small tRNA Gln. Likewise, different promoters can be used to drive Cas9 expression. For example, small promoters are used so that the Cas9 coding sequence can fit into an AAV construct. Similarly, small Cas9 proteins (e.g., SaCas9 or CjCas9 are used to maximize the AAV packaging capacity).

Cas proteins provided as mRNAs can be modified for improved stability and/or immunogenicity properties. The modifications may be made to one or more nucleosides within the mRNA. Examples of chemical modifications to mRNA nucleobases include pseudouridine, 1-methyl-pseudouridine, and 5-methyl-cytidine. mRNA encoding Cas proteins can also be capped. The cap can be, for example, a cap 1 structure in which the +1 ribonucleotide is methylated at the 2'O position of the ribose. The capping can, for example, give superior activity in vivo (e.g., by mimicking a natural cap), can result in a natural structure that reduce stimulation of the innate immune system of the host (e.g., can reduce activation of pattern recognition receptors in the innate immune system). mRNA encoding Cas proteins can also be polyadenylated (to comprise a poly(A) tail). mRNA encoding Cas proteins can also be modified to include pseudouridine (e.g., can be fully substituted with pseudouridine). As another example, capped and polyadenylated Cas mRNA containing N1-methyl pseudouridine can be used. As another example, Cas mRNA fully substituted with pseudouridine can be used (i.e., all standard uracil residues are replaced with pseudouridine, a uridine isomer in which the uracil is attached with a carbon-carbon bond rather than nitrogen-carbon). Likewise, Cas mRNAs can be modified by depletion of uridine using synonymous codons. For example, capped and polyadenylated Cas mRNA fully substituted with pseudouridine can be used.

Cas mRNAs can comprise a modified uridine at least at one, a plurality of, or all uridine positions. The modified uridine can be a uridine modified at the 5 position (e.g., with a halogen, methyl, or ethyl). The modified uridine can be a pseudouridine modified at the 1 position (e.g., with a halogen, methyl, or ethyl). The modified uridine can be, for example, pseudouridine, N1-methyl-pseudouridine, 5-methoxyuridine, 5-iodouridine, or a combination thereof. In some examples, the modified uridine is 5-methoxyuridine. In some examples, the modified uridine is 5-iodouridine. In some examples, the modified uridine is pseudouridine. In some examples, the modified uridine is N1-methyl-pseudouridine. In some examples, the modified uridine is a combination of pseudouridine and N1-methyl-pseudouridine. In some examples, the modified uridine is a combination of pseudouridine and 5-methoxyuridine. In some examples, the modified uridine is a combination of N1-methyl pseudouridine and 5-methoxyuridine. In some examples, the modified uridine is a combination of 5-iodouridine and N1-methyl-pseudouridine. In some examples, the modified uridine is a combination of pseudouridine and 5-iodouridine. In some examples, the modified uridine is a combination of 5-iodouridine and 5-methoxyuridine.

Cas mRNAs disclosed herein can also comprise a 5' cap, such as a Cap0, Cap1, or Cap2. A 5' cap is generally a 7-methylguanine ribonucleotide (which may be further modified, e.g., with respect to ARCA) linked through a 5'-triphosphate to the 5' position of the first nucleotide of the 5'-to-3' chain of the mRNA (i.e., the first cap-proximal nucleotide). In Cap0, the riboses of the first and second cap-proximal nucleotides of the mRNA both comprise a 2'-hydroxyl. In Cap1, the riboses of the first and second transcribed nucleotides of the mRNA comprise a 2'-methoxy and a 2'-hydroxyl, respectively. In Cap2, the riboses of the first and second cap-proximal nucleotides of the mRNA both comprise a 2'-methoxy. See, e.g., Katibah et al. (2014) *Proc. Natl. Acad. Sci. U.S.A.* 111(33):12025-30 and Abbas et al. (2017) *Proc. Natl. Acad. Sci. U.S.A.* 114(11):E2106-E2115, each of which is herein incorporated by reference in its entirety for all purposes. Most endogenous higher eukaryotic mRNAs, including mammalian mRNAs such as human mRNAs, comprise Cap1 or Cap2. Cap0 and other cap structures differing from Cap1 and Cap2 may be immunogenic in mammals, such as humans, due to recognition as non-self by components of the innate immune system such as IFIT-1 and IFIT-5, which can result in elevated cytokine levels including type I interferon. Components of the innate immune system such as IFIT-1 and IFIT-5 may also compete with eIF4E for binding of an mRNA with a cap other than Cap1 or Cap2, potentially inhibiting translation of the mRNA.

A cap can be included co-transcriptionally. For example, ARCA (anti-reverse cap analog; Thermo Fisher Scientific Cat. No. AM8045) is a cap analog comprising a 7-methylguanine 3'-methoxy-5'-triphosphate linked to the 5' position of a guanine ribonucleotide which can be incorporated in vitro into a transcript at initiation. ARCA results in a Cap0 cap in which the 2' position of the first cap-proximal nucleotide is hydroxyl. See, e.g., Stepinski et al. (2001) *RNA* 7:1486-1495, herein incorporated by reference in its entirety for all purposes.

CleanCap™ AG (m7G(5')ppp(5')(2'OMeA)pG; TriLink Biotechnologies Cat. No. N-7113) or CleanCap™ GG (m7G (5')ppp(5')(2'OMeG)pG; TriLink Biotechnologies Cat. No. N-7133) can be used to provide a Cap1 structure co-transcriptionally. 3'-O-methylated versions of CleanCap™ AG and CleanCap™ GG are also available from TriLink Biotechnologies as Cat. Nos. N-7413 and N-7433, respectively.

Alternatively, a cap can be added to an RNA post-transcriptionally. For example, Vaccinia capping enzyme is commercially available (New England Biolabs Cat. No. M2080S) and has RNA triphosphatase and guanylyltransferase activities, provided by its D1 subunit, and guanine methyltransferase, provided by its D12 subunit. As such, it can add a 7-methylguanine to an RNA, so as to give Cap0, in the presence of S-adenosyl methionine and GTP. See, e.g., Guo and Moss (1990) *Proc. Natl. Acad. Sci. U.S.A.* 87:4023-4027 and Mao and Shuman (1994) *J. Biol. Chem.* 269:24472-24479, each of which is herein incorporated by reference in its entirety for all purposes.

Cas mRNAs can further comprise a poly-adenylated (poly-A or poly(A) or poly-adenine) tail. The poly-A tail can, for example, comprise at least 20, at least 30, at least 40, at least 50, at least 60, at least 70, at least 80, at least 90, or at least 100 adenines, and optionally up to 300 adenines. For example, the poly-A tail can comprise 95, 96, 97, 98, 99, or 100 adenine nucleotides.

2. Guide RNAs

A "guide RNA" or "gRNA" is an RNA molecule that binds to a Cas protein (e.g., Cas9 protein) and targets the Cas protein to a specific location within a target DNA. Guide RNAs can comprise two segments: a "DNA-targeting segment" (also called "guide sequence") and a "protein-binding segment." "Segment" includes a section or region of a molecule, such as a contiguous stretch of nucleotides in an RNA. Some gRNAs, such as those for Cas9, can comprise two separate RNA molecules: an "activator-RNA" (e.g., tracrRNA) and a "targeter-RNA" (e.g., CRISPR RNA or crRNA). Other gRNAs are a single RNA molecule (single RNA polynucleotide), which can also be called a "single-molecule gRNA," a "single-guide RNA," or an "sgRNA." See, e.g., WO 2013/176772, WO 2014/065596, WO 2014/089290, WO 2014/093622, WO 2014/099750, WO 2013/142578, and WO 2014/131833, each of which is herein incorporated by reference in its entirety for all purposes. A guide RNA can refer to either a CRISPR RNA (crRNA) or the combination of a crRNA and a trans-activating CRISPR RNA (tracrRNA). The crRNA and tracrRNA can be associated as a single RNA molecule (single guide RNA or sgRNA) or in two separate RNA molecules (dual guide RNA or dgRNA). For Cas9, for example, a single-guide RNA can comprise a crRNA fused to a tracrRNA (e.g., via a linker). For Cpf1, for example, only a crRNA is needed to achieve binding to and/or cleavage of a target sequence. The terms "guide RNA" and "gRNA" include both double-molecule (i.e., modular) gRNAs and single-molecule gRNAs. In some of the methods and compositions disclosed herein, a gRNA is a *S. pyogenes* Cas9 gRNA or an equivalent thereof. In some of the methods and compositions disclosed herein, a gRNA is a *S. aureus* Cas9 gRNA or an equivalent thereof.

An exemplary two-molecule gRNA comprises a crRNA-like ("CRISPR RNA" or "targeter-RNA" or "crRNA" or "crRNA repeat") molecule and a corresponding tracrRNA-like ("trans-activating CRISPR RNA" or "activator-RNA" or "tracrRNA") molecule. A crRNA comprises both the DNA-targeting segment (single-stranded) of the gRNA and a stretch of nucleotides (i.e., the crRNA tail) that forms one half of the dsRNA duplex of the protein-binding segment of the gRNA. An example of a crRNA tail, located downstream (3') of the DNA-targeting segment, comprises, consists essentially of, or consists of GUUUUAGAGCUAUGCU (SEQ ID NO: 29) or GUUUUAGAGCUAUGCUGUUUUG (SEQ ID NO: 52). Any of the DNA-targeting segments disclosed herein can be joined to the 5' end of SEQ ID NO: 29 or 52 to form a crRNA.

A corresponding tracrRNA (activator-RNA) comprises a stretch of nucleotides that forms the other half of the dsRNA duplex of the protein-binding segment of the gRNA. A stretch of nucleotides of a crRNA are complementary to and hybridize with a stretch of nucleotides of a tracrRNA to form the dsRNA duplex of the protein-binding domain of the gRNA. As such, each crRNA can be said to have a corresponding tracrRNA. Exemplary tracrRNA sequences comprise, consist essentially of, or consist of

```
                                              (SEQ ID NO: 30)
AGCAUAGCAAGUUAAAAUAAGGCUAGUCCGUUAUCAACUUGAAAAAGUG

GCACCGAGUCGGUGCUUU, (SEQ ID NO: 31)
AAACAGCAUAGCAAGUUAAAAUAAGGCUAGUCCGUUAUCAACUUGAAAAG

AGUGCACCGAGUCGGUGCUUUU, or
                                              (SEQ ID NO: 32)
GUUGGAACCAUUCAAAACAGCAUAGCAAGUUAAAAUAAGGCUAGUCCGUU

AUCAACUUGAAAAAGUGGCACCGAGUCGGUGC.
```

In systems in which both a crRNA and a tracrRNA are needed, the crRNA and the corresponding tracrRNA hybridize to form a gRNA. In systems in which only a crRNA is needed, the crRNA can be the gRNA. The crRNA additionally provides the single-stranded DNA-targeting segment that hybridizes to the complementary strand of a target DNA. If used for modification within a cell, the exact sequence of a given crRNA or tracrRNA molecule can be designed to be specific to the species in which the RNA molecules will be used. See, e.g., Mali et al. (2013) *Science* 339(6121):823-826; Jinek et al. (2012) *Science* 337(6096):816-821; Hwang et al. (2013) *Nat. Biotechnol.* 31(3):227-229; Jiang et al. (2013) *Nat. Biotechnol.* 31(3):233-239; and Cong et al. (2013) *Science* 339(6121):819-823, each of which is herein incorporated by reference in its entirety for all purposes.

The DNA-targeting segment (crRNA) of a given gRNA comprises a nucleotide sequence that is complementary to a sequence on the complementary strand of the target DNA, as described in more detail below. The DNA-targeting segment of a gRNA interacts with the target DNA in a sequence-specific manner via hybridization (i.e., base pairing). As such, the nucleotide sequence of the DNA-targeting segment may vary and determines the location within the target DNA with which the gRNA and the target DNA will interact. The DNA-targeting segment of a subject gRNA can be modified to hybridize to any desired sequence within a target DNA. Naturally occurring crRNAs differ depending on the CRISPR/Cas system and organism but often contain a targeting segment of between 21 to 72 nucleotides length, flanked by two direct repeats (DR) of a length of between 21 to 46 nucleotides (see, e.g., WO 2014/131833, herein incorporated by reference in its entirety for all purposes). In the case of *S. pyogenes*, the DRs are 36 nucleotides long and the targeting segment is 30 nucleotides long. The 3' located DR is complementary to and hybridizes with the corresponding tracrRNA, which in turn binds to the Cas protein.

The DNA-targeting segment can have, for example, a length of at least about 12, at least about 15, at least about 17, at least about 18, at least about 19, at least about 20, at least about 25, at least about 30, at least about 35, or at least about 40 nucleotides. Such DNA-targeting segments can have, for example, a length from about 12 to about 100, from about 12 to about 80, from about 12 to about 50, from about 12 to about 40, from about 12 to about 30, from about 12 to about 25, or from about 12 to about 20 nucleotides. For example, the DNA targeting segment can be from about 15 to about 25 nucleotides (e.g., from about 17 to about 20 nucleotides, or about 17, 18, 19, or 20 nucleotides). See, e.g., US 2016/0024523, herein incorporated by reference in its entirety for all purposes. For Cas9 from *S. pyogenes*, a typical DNA-targeting segment is between 16 and 20 nucleotides in length or between 17 and 20 nucleotides in length. For Cas9 from *S. aureus*, a typical DNA-targeting segment is between 21 and 23 nucleotides in length. For Cpf1, a typical DNA-targeting segment is at least 16 nucleotides in length or at least 18 nucleotides in length.

In one example, the DNA-targeting segment can be about 20 nucleotides in length. However, shorter and longer sequences can also be used for the targeting segment (e.g., 15-25 nucleotides in length, such as 15, 16, 17, 18, 19, 20, 21, 22, 23, 24, or 25 nucleotides in length). The degree of identity between the DNA-targeting segment and the corresponding guide RNA target sequence (or degree of complementarity between the DNA-targeting segment and the other strand of the guide RNA target sequence) can be, for example, about 75%, about 80%, about 85%, about 90%, about 95%, about 96%, about 97%, about 98%, about 99%, or about 100%. The DNA-targeting segment and the corresponding guide RNA target sequence can contain one or more mismatches. For example, the DNA-targeting segment of the guide RNA and the corresponding guide RNA target sequence can contain 1-4, 1-3, 1-2, 1, 2, 3, or 4 mismatches (e.g., where the total length of the guide RNA target sequence is at least 17, at least 18, at least 19, or at least 20 or more nucleotides). For example, the DNA-targeting segment of the guide RNA and the corresponding guide RNA target sequence can contain 1-4, 1-3, 1-2, 1, 2, 3, or 4 mismatches where the total length of the guide RNA target sequence 20 nucleotides.

As one example, a guide RNA targeting an RS1 gene can comprise a DNA-targeting segment (i.e., guide sequence) comprising, consisting essentially of, or consisting of the sequence (DNA-targeting segment) set forth in any one of SEQ ID NOS: 3148-6241. Alternatively, a guide RNA targeting an RS1 gene can comprise a DNA-targeting segment comprising, consisting essentially of, or consisting of at least 17, at least 18, at least 19, or at least 20 contiguous nucleotides of the sequence (DNA-targeting segment) set forth in any one of SEQ ID NOS: 3148-6241. Alternatively, a guide RNA targeting an RS1 gene can comprise a DNA-targeting segment that is at least 75%, at least 80%, at least 85%, at least 90%, at least 91%, at least 92%, at least 93%, at least 94%, at least 95%, at least 96%, at least 97%, at least 98%, or at least 99% identical to the sequence (DNA-targeting segment) set forth in any one of SEQ ID NOS: 3148-6241. Alternatively, a guide RNA targeting an RS1 gene can comprise a DNA-targeting segment that is at least 90%, at least 91%, at least 92%, at least 93%, at least 94%, at least 95%, at least 96%, at least 97%, at least 98%, or at least 99% identical to the sequence (DNA-targeting segment) set forth in any one of SEQ ID NOS: 3148-6241. Alternatively, a guide RNA targeting an RS1 gene can comprise a DNA-targeting segment that is at least 75%, at least 80%, at least 85%, at least 90%, at least 91%, at least 92%, at least 93%, at least 94%, at least 95%, at least 96%, at least 97%, at least 98%, or at least 99% identical to at least 17, at least 18, at least 19, or at least 20 contiguous nucleotides of the sequence (DNA-targeting segment) set forth in any one of SEQ ID NOS: 3148-6241. Alternatively, a guide RNA targeting an RS1 gene can comprise a DNA-targeting segment that is at least 90%, at least 91%, at least 92%, at least 93%, at least 94%, at least 95%, at least 96%, at least 97%, at least 98%, or at least 99% identical to at least 17, at least 18, at least 19, or at least 20 contiguous nucleotides of the sequence (DNA-targeting segment) set forth in any one of SEQ ID NOS: 3148-6241. Alternatively, a guide RNA targeting an RS1 gene can comprise a DNA-targeting segment comprising, consisting essentially of, or consisting of a sequence that differs by no more than 3, no more than 2, or no more than 1 nucleotide from the sequence (DNA-targeting segment) set forth in any one of SEQ ID NOS: 3148-6241. Alternatively, a guide RNA targeting an RS1 gene can comprise a DNA-targeting segment comprising, consisting essentially of, or consisting of a sequence that differs by no more than 3, no more than 2, or no more than 1 nucleotide from at least 17, at least 18, at least 19, or at least 20 contiguous nucleotides of the sequence (DNA-targeting segment) set forth in any one of SEQ ID NOS: 3148-6241. Examples of such guide sequences are set forth in Tables 2 and 3.

The guide RNA can target a human RS1 gene. As one example, a guide RNA targeting an RS1 gene can comprise a DNA-targeting segment (i.e., guide sequence) comprising, consisting essentially of, or consisting of the sequence (DNA-targeting segment) set forth in any one of SEQ ID NOS: 3148-4989. Alternatively, a guide RNA targeting an RS1 gene can comprise a DNA-targeting segment comprising, consisting essentially of, or consisting of at least 17, at least 18, at least 19, or at least 20 contiguous nucleotides of the sequence (DNA-targeting segment) set forth in any one of SEQ ID NOS: 3148-4989. Alternatively, a guide RNA targeting an RS1 gene can comprise a DNA-targeting segment that is at least 75%, at least 80%, at least 85%, at least 90%, at least 91%, at least 92%, at least 93%, at least 94%, at least 95%, at least 96%, at least 97%, at least 98%, or at least 99% identical to the sequence (DNA-targeting segment) set forth in any one of SEQ ID NOS: 3148-4989. Alternatively, a guide RNA targeting an RS1 gene can comprise a DNA-targeting segment that is at least 90%, at least 91%, at least 92%, at least 93%, at least 94%, at least 95%, at least 96%, at least 97%, at least 98%, or at least 99% identical to the sequence (DNA-targeting segment) set forth in any one of SEQ ID NOS: 3148-4989. Alternatively, a guide RNA targeting an RS1 gene can comprise a DNA-targeting segment that is at least 75%, at least 80%, at least 85%, at least 90%, at least 91%, at least 92%, at least 93%, at least 94%, at least 95%, at least 96%, at least 97%, at least 98%, or at least 99% identical to at least 17, at least 18, at least 19, or at least 20 contiguous nucleotides of the sequence (DNA-targeting segment) set forth in any one of SEQ ID NOS: 3148-4989. Alternatively, a guide RNA targeting an RS1 gene can comprise a DNA-targeting segment that is at least 90%, at least 91%, at least 92%, at least 93%, at least 94%, at least 95%, at least 96%, at least 97%, at least 98%, or at least 99% identical to at least 17, at least 18, at least 19, or at least 20 contiguous nucleotides of the sequence (DNA-targeting segment) set forth in any one of SEQ ID NOS: 3148-4989. Alternatively, a guide RNA targeting an RS1 gene can comprise a DNA-targeting segment comprising, consisting essentially of, or consisting of a sequence that differs by no more than 3, no more than 2, or no more than 1 nucleotide from the sequence (DNA-targeting segment) set forth in any one of SEQ ID NOS: 3148-4989. Alternatively, a guide RNA targeting an RS1 gene can comprise a DNA-targeting segment comprising, consisting essentially of, or consisting of a sequence that differs by no more than 3, no more than 2, or no more than 1 nucleotide from at least 17, at least 18, at least 19, or at least 20 contiguous nucleotides of the sequence (DNA-targeting segment) set forth in any one of SEQ ID NOS: 3148-4989.

The guide RNA can target a human RS1 gene and be selected to avoid off-target effects. As one example, a guide RNA targeting an RS1 gene can comprise a DNA-targeting segment (i.e., guide sequence) comprising, consisting essentially of, or consisting of the sequence (DNA-targeting segment) set forth in any one of SEQ ID NOS: 3148-3151, 3154-3186, 3188-3247, and 3249-4351. Alternatively, a guide RNA targeting an RS1 gene can comprise a DNA-targeting segment comprising, consisting essentially of, or consisting of at least 17, at least 18, at least 19, or at least 20 contiguous nucleotides of the sequence (DNA-targeting segment) set forth in any one of SEQ ID NOS: 3148-3151, 3154-3186, 3188-3247, and 3249-4351. Alternatively, a guide RNA targeting an RS1 gene can comprise a DNA-targeting segment that is at least 75%, at least 80%, at least 85%, at least 90%, at least 91%, at least 92%, at least 93%, at least 94%, at least 95%, at least 96%, at least 97%, at least 98%, or at least 99% identical to the sequence (DNA-targeting segment) set forth in any one of SEQ ID NOS: 3148-3151, 3154-3186, 3188-3247, and 3249-4351. Alternatively, a guide RNA targeting an RS1 gene can comprise a DNA-targeting segment that is at least 90%, at least 91%, at least 92%, at least 93%, at least 94%, at least 95%, at least 96%, at least 97%, at least 98%, or at least 99% identical to the sequence (DNA-targeting segment) set forth in any one of SEQ ID NOS: 3148-3151, 3154-3186, 3188-3247, and 3249-4351. Alternatively, a guide RNA targeting an RS1 gene can comprise a DNA-targeting segment that is at least 75%, at least 80%, at least 85%, at least 90%, at least 91%, at least 92%, at least 93%, at least 94%, at least 95%, at least 96%, at least 97%, at least 98%, or at least 99% identical to at least 17, at least 18, at least 19, or at least 20 contiguous nucleotides of the sequence (DNA-targeting segment) set forth in any one of SEQ ID NOS: 3148-3151, 3154-3186, 3188-3247, and 3249-4351. Alternatively, a guide RNA targeting an RS1 gene can comprise a DNA-targeting segment that is at least 90%, at least 91%, at least 92%, at least 93%, at least 94%, at least 95%, at least 96%, at least 97%, at least 98%, or at least 99% identical to at least 17, at least 18, at least 19, or at least 20 contiguous nucleotides of the sequence (DNA-targeting segment) set forth in any one of SEQ ID NOS: 3148-3151, 3154-3186, 3188-3247, and 3249-4351. Alternatively, a guide RNA targeting an RS1 gene can comprise a DNA-targeting segment comprising, consisting essentially of, or consisting of a sequence that differs by no more than 3, no more than 2, or no more than 1 nucleotide from the sequence (DNA-targeting segment) set forth in any one of SEQ ID NOS: 3148-3151, 3154-3186, 3188-3247, and 3249-4351. Alternatively, a guide RNA targeting an RS1 gene can comprise a DNA-targeting segment comprising, consisting essentially of, or consisting of a sequence that differs by no more than 3, no more than 2, or no more than 1 nucleotide from at least 17, at least 18, at least 19, or at least 20 contiguous nucleotides of the sequence (DNA-targeting segment) set forth in any one of SEQ ID NOS: 3148-3151, 3154-3186, 3188-3247, and 3249-4351.

The guide RNA can target a human RS1 gene. As one example, a guide RNA targeting an RS1 gene can comprise a DNA-targeting segment (i.e., guide sequence) comprising, consisting essentially of, or consisting of the sequence (DNA-targeting segment) set forth in any one of SEQ ID NOS: 3150, 3151, 3159, 3675, 4297, and 4304. Alternatively, a guide RNA targeting an RS1 gene can comprise a DNA-targeting segment comprising, consisting essentially of, or consisting of at least 17, at least 18, at least 19, or at least 20 contiguous nucleotides of the sequence (DNA-targeting segment) set forth in any one of SEQ ID NOS: 3150, 3151, 3159, 3675, 4297, and 4304. Alternatively, a guide RNA targeting an RS1 gene can comprise a DNA-targeting segment that is at least 75%, at least 80%, at least 85%, at least 90%, at least 91%, at least 92%, at least 93%, at least 94%, at least 95%, at least 96%, at least 97%, at least 98%, or at least 99% identical to the sequence (DNA-targeting segment) set forth in any one of SEQ ID NOS: 3150, 3151, 3159, 3675, 4297, and 4304. Alternatively, a guide RNA targeting an RS1 gene can comprise a DNA-targeting segment that is at least 90%, at least 91%, at least 92%, at least 93%, at least 94%, at least 95%, at least 96%, at least 97%, at least 98%, or at least 99% identical to the sequence (DNA-targeting segment) set forth in any one of SEQ ID NOS: 3150, 3151, 3159, 3675, 4297, and 4304. Alternatively, a guide RNA targeting an RS1 gene can comprise a DNA-targeting segment that is at least 75%, at least 80%, at least 85%, at least 90%, at least 91%, at least 92%, at least 93%, at least 94%, at least 95%, at least 96%, at least 97%, at least 98%, or at least 99% identical to at least 17, at least 18, at least 19, or at least 20 contiguous nucleotides of the sequence (DNA-targeting segment) set forth in any one of SEQ ID NOS: 3150, 3151, 3159, 3675, 4297, and 4304. Alternatively, a guide RNA targeting an RS1 gene can comprise a DNA-targeting segment that is at least 90%, at least 91%, at least 92%, at least 93%, at least 94%, at least 95%, at least 96%, at least 97%, at least 98%, or at least 99% identical to at least 17, at least 18, at least 19, or at least 20 contiguous nucleotides of the sequence (DNA-targeting segment) set forth in any one of SEQ ID NOS: 3150, 3151, 3159, 3675, 4297, and 4304. Alternatively, a guide RNA targeting an RS1 gene can comprise a DNA-targeting segment comprising, consisting essentially of, or consisting of a sequence that differs by no more than 3, no more than 2, or no more than 1 nucleotide from the sequence (DNA-targeting segment) set forth in any one of SEQ ID NOS: 3150, 3151, 3159, 3675, 4297, and 4304. Alternatively, a guide RNA targeting an RS1 gene can comprise a DNA-targeting segment comprising, consisting essentially of, or consisting of a sequence that differs by no more than 3, no more than 2, or no more than 1 nucleotide from at least 17, at least 18, at least 19, or at least 20 contiguous nucleotides of the sequence (DNA-targeting segment) set forth in any one of SEQ ID NOS: 3150, 3151, 3159, 3675, 4297, and 4304.

The guide RNA can target a mouse Rs1 gene. As one example, a guide RNA targeting an RS1 gene can comprise a DNA-targeting segment (i.e., guide sequence) comprising, consisting essentially of, or consisting of the sequence (DNA-targeting segment) set forth in any one of SEQ ID NOS: 4990-6241 (e.g., SEQ ID NO: 5477 or 5981). Alternatively, a guide RNA targeting an RS1 gene can comprise a DNA-targeting segment comprising, consisting essentially of, or consisting of at least 17, at least 18, at least 19, or at least 20 contiguous nucleotides of the sequence (DNA-targeting segment) set forth in any one of SEQ ID NOS: 4990-6241 (e.g., SEQ ID NO: 5477 or 5981). Alternatively, a guide RNA targeting an RS1 gene can comprise a DNA-targeting segment that is at least 75%, at least 80%, at least 85%, at least 90%, at least 91%, at least 92%, at least 93%, at least 94%, at least 95%, at least 96%, at least 97%, at least 98%, or at least 99% identical to the sequence (DNA-targeting segment) set forth in any one of SEQ ID NOS: 4990-6241 (e.g., SEQ ID NO: 5477 or 5981). Alternatively, a guide RNA targeting an RS1 gene can comprise a DNA-targeting segment that is at least 90%, at least 91%, at least 92%, at least 93%, at least 94%, at least 95%, at least 96%, at least 97%, at least 98%, or at least 99% identical to the sequence (DNA-targeting segment) set forth in any one of SEQ ID NOS: 4990-6241 (e.g., SEQ ID NO: 5477 or 5981). Alternatively, a guide RNA targeting an RS1 gene can comprise a DNA-targeting segment that is at least 75%, at least 80%, at least 85%, at least 90%, at least 91%, at least 92%, at least 93%, at least 94%, at least 95%, at least 96%, at least 97%, at least 98%, or at least 99% identical to at least 17, at least 18, at least 19, or at least 20 contiguous nucleotides of the sequence (DNA-targeting segment) set forth in any one of SEQ ID NOS: 4990-6241 (e.g., SEQ ID NO: 5477 or 5981). Alternatively, a guide RNA targeting an RS1 gene can comprise a DNA-targeting segment that is at least 90%, at least 91%, at least 92%, at least 93%, at least 94%, at least 95%, at least 96%, at least 97%, at least 98%, or at least 99% identical to at least 17, at least 18, at least 19, or at least 20 contiguous nucleotides of the sequence (DNA-targeting segment) set forth in any one of SEQ ID NOS: 4990-6241 (e.g., SEQ ID NO: 5477 or 5981). Alternatively, a guide RNA targeting an RS1 gene can comprise a DNA-targeting segment comprising, consisting essentially of, or consisting of a sequence that differs by no more than 3, no more than 2, or no more than 1 nucleotide from the sequence (DNA-targeting segment) set forth in any one of SEQ ID NOS: 4990-6241 (e.g., SEQ ID NO: 5477 or 5981). Alternatively, a guide RNA targeting an RS1 gene can comprise a DNA-targeting segment comprising, consisting essentially of, or consisting of a sequence that differs by no more than 3, no more than 2, or no more than 1 nucleotide from at least 17, at least 18, at least 19, or at least 20 contiguous nucleotides of the sequence (DNA-targeting segment) set forth in any one of SEQ ID NOS: 4990-6241 (e.g., SEQ ID NO: 5477 or 5981).

TracrRNAs can be in any form (e.g., full-length tracrRNAs or active partial tracrRNAs) and of varying lengths. They can include primary transcripts or processed forms. For example, tracrRNAs (as part of a single-guide RNA or as a separate molecule as part of a two-molecule gRNA) may comprise, consist essentially of, or consist of all or a portion of a wild type tracrRNA sequence (e.g., about or more than about 20, 26, 32, 45, 48, 54, 63, 67, 85, or more nucleotides of a wild type tracrRNA sequence). Examples of wild type tracrRNA sequences from *S. pyogenes* include 171-nucleotide, 89-nucleotide, 75-nucleotide, and 65-nucleotide versions. See, e.g., Deltcheva et al. (2011) *Nature* 471(7340):602-607; WO 2014/093661, each of which is herein incorporated by reference in its entirety for all purposes. Examples of tracrRNAs within single-guide RNAs (sgRNAs) include the tracrRNA segments found within +48, +54, +67, and +85 versions of sgRNAs, where "+n" indicates that up to the +n nucleotide of wild type tracrRNA is included in the sgRNA. See U.S. Pat. No. 8,697,359, herein incorporated by reference in its entirety for all purposes.

The percent complementarity between the DNA-targeting segment of the guide RNA and the complementary strand of the target DNA can be at least 60% (e.g., at least 65%, at least 70%, at least 75%, at least 80%, at least 85%, at least 90%, at least 95%, at least 97%, at least 98%, at least 99%, or 100%). The percent complementarity between the DNA-targeting segment and the complementary strand of the target DNA can be at least 60% over about 20 contiguous nucleotides. As an example, the percent complementarity between the DNA-targeting segment and the complementary strand of the target DNA can be 100% over the 14 contiguous nucleotides at the 5' end of the complementary strand of the target DNA and as low as 0% over the remainder. In such a case, the DNA-targeting segment can be considered to be 14 nucleotides in length. As another example, the percent complementarity between the DNA-targeting segment and the complementary strand of the target DNA can be 100% over the seven contiguous nucleotides at the 5' end of the complementary strand of the target DNA and as low as 0% over the remainder. In such a case, the DNA-targeting segment can be considered to be 7 nucleotides in length. In some guide RNAs, at least 17 nucleotides within the DNA-targeting segment are complementary to the complementary strand of the target DNA. For example, the DNA-targeting segment can be 20 nucleotides in length and can comprise 1, 2, or 3 mismatches with the complementary strand of the target DNA. In one example, the mismatches are not adjacent to the region of the complementary strand corresponding to the protospacer adjacent motif (PAM) sequence (i.e., the reverse complement of the PAM sequence) (e.g., the mismatches are in the 5' end of the DNA-targeting segment of the guide RNA, or the mismatches are at least 2, 3, 4, 5, 6, 7, 8, 9, 10, 11, 12, 13, 14, 15, 16, 17, 18, or 19 base pairs away from the region of the complementary strand corresponding to the PAM sequence).

The protein-binding segment of a gRNA can comprise two stretches of nucleotides that are complementary to one another. The complementary nucleotides of the protein-binding segment hybridize to form a double-stranded RNA duplex (dsRNA). The protein-binding segment of a subject gRNA interacts with a Cas protein, and the gRNA directs the bound Cas protein to a specific nucleotide sequence within target DNA via the DNA-targeting segment.

Single-guide RNAs can comprise a DNA-targeting segment and a scaffold sequence (i.e., the protein-binding or Cas-binding sequence of the guide RNA). For example, such guide RNAs can have a 5' DNA-targeting segment joined to a 3' scaffold sequence. Exemplary scaffold sequences comprise, consist essentially of, or consist of:

```
                                  (version 1; SEQ ID NO: 33)
GUUUUAGAGCUAGAAAUAGCAAGUUAAAAUAAGGCUAGUCCGUUAUCAA

CUUGAAAAAGUGGCACCGAGUCGGUGCU;

(version 2; SEQ ID NO: 34)
GUUGGAACCAUUCAAAACAGCAUAGCAAGUUAAAAUAAGGCUAGUCCGU

UAUCAACUUGAAAAAGUGGCACCGAGUCGGUGC;

(version 3; SEQ ID NO: 35)
GUUUUAGAGCUAGAAAUAGCAAGUUAAAAUAAGGCUAGUCCGUUAUCAA

CUUGAAAAAGUGGCACCGAGUCGGUGC;

(version 4; SEQ ID NO: 36)
GUUUAAGAGCUAUGCUGGAAACAGCAUAGCAAGUUUAAAUAAGGCUAGU

CCGUUAUCAACUUGAAAAAGUGGCACCGAGUCGGUGC;

(version 5; SEQ ID NO: 37)
GUUUUAGAGCUAGAAAUAGCAAGUUAAAAUAAGGCUAGUCCGUUAUCAA

CUUGAAAAAGUGGCACCGAGUCGGUGCUUUUUUU;

(version 6; SEQ ID NO: 38)
GUUUUAGAGCUAGAAAUAGCAAGUUAAAAUAAGGCUAGUCCGUUAUCAA

CUUGAAAAAGUGGCACCGAGUCGGUGCUUUU;

(version 7; SEQ ID NO: 39)
GUUUAAGAGCUAUGCUGGAAACAGCAUAGCAAGUUUAAAUAAGGCUAGU

CCGUUAUCAACUUGAAAAAGUGGCACCGAGUCGGUGCUUUUUU;
```

-continued or (version 8; SEQ ID NO: 53)
GUUUUAGAGCUAGAAAUAGCAAGUUAAAAUAAGGCUAGUCCGUUAUCAA
CUUGGCACCGAGUCGGUGC.

In some guile sgRNAs, the four terminal U residues of version 6 are not present. In some sgRNAs, only 1, 2, or 3 of the four terminal U residues of version 6 are present. Guide RNAs targeting any of the guide RNA target sequences disclosed herein can include, for example, a DNA-targeting segment on the 5' end of the guide RNA fused to any of the exemplary guide RNA scaffold sequences on the 3' end of the guide RNA. That is, any of the DNA-targeting segments disclosed herein can be joined to the 5' end of any one of the above scaffold sequences to form a single guide RNA (chimeric guide RNA).

Guide RNAs can include modifications or sequences that provide for additional desirable features (e.g., modified or regulated stability; subcellular targeting; tracking with a fluorescent label; a binding site for a protein or protein complex; and the like). That is, guide RNAs can include one or more modified nucleosides or nucleotides, or one or more non-naturally and/or naturally occurring components or configurations that are used instead of or in addition to the canonical A, G, C, and U residues. Examples of such modifications include, for example, a 5' cap (e.g., a 7-methylguanylate cap (m7G)); a 3' polyadenylated tail (i.e., a 3' poly(A) tail); a riboswitch sequence (e.g., to allow for regulated stability and/or regulated accessibility by proteins and/or protein complexes); a stability control sequence; a sequence that forms a dsRNA duplex (i.e., a hairpin); a modification or sequence that targets the RNA to a subcellular location (e.g., nucleus, mitochondria, chloroplasts, and the like); a modification or sequence that provides for tracking (e.g., direct conjugation to a fluorescent molecule, conjugation to a moiety that facilitates fluorescent detection, a sequence that allows for fluorescent detection, and so forth); a modification or sequence that provides a binding site for proteins (e.g., proteins that act on DNA, including transcriptional activators, transcriptional repressors, DNA methyltransferases, DNA demethylases, histone acetyltransferases, histone deacetylases, and the like); and combinations thereof. Other examples of modifications include engineered stem loop duplex structures, engineered bulge regions, engineered hairpins 3' of the stem loop duplex structure, or any combination thereof. See, e.g., US 2015/0376586, herein incorporated by reference in its entirety for all purposes. A bulge can be an unpaired region of nucleotides within the duplex made up of the crRNA-like region and the minimum tracrRNA-like region. A bulge can comprise, on one side of the duplex, an unpaired 5'-XXXY-3' where X is any purine and Y can be a nucleotide that can form a wobble pair with a nucleotide on the opposite strand, and an unpaired nucleotide region on the other side of the duplex.

Unmodified nucleic acids can be prone to degradation. Exogenous nucleic acids can also induce an innate immune response. Modifications can help introduce stability and reduce immunogenicity. Guide RNAs can comprise modified nucleosides and modified nucleotides including, for example, one or more of the following: (1) alteration or replacement of one or both of the non-linking phosphate oxygens and/or of one or more of the linking phosphate oxygens in the phosphodiester backbone linkage (an exemplary backbone modification); (2) alteration or replacement of a constituent of the ribose sugar such as alteration or replacement of the 2' hydroxyl on the ribose sugar (an exemplary sugar modification); (3) replacement (e.g., wholesale replacement) of the phosphate moiety with dephospho linkers (an exemplary backbone modification); (4) modification or replacement of a naturally occurring nucleobase, including with a non-canonical nucleobase (an exemplary base modification); (5) replacement or modification of the ribose-phosphate backbone (an exemplary backbone modification); (6) modification of the 3' end or 5' end of the oligonucleotide (e.g., removal, modification or replacement of a terminal phosphate group or conjugation of a moiety, cap, or linker (such 3' or 5' cap modifications may comprise a sugar and/or backbone modification)); and (7) modification ore replacement of the sugar (an exemplary sugar modification). Other possible guide RNA modifications include modifications of or replacement of uracils or poly-uracil tracts. See, e.g., WO 2015/048577 and US 2016/0237455, each of which is herein incorporated by reference in its entirety for all purposes. Similar modifications can be made to Cas-encoding nucleic acids, such as Cas mRNAs. For example, Cas mRNAs can be modified by depletion of uridine using synonymous codons.

Chemical modifications such at hose listed above can be combined to provide modified gRNAs and/or mRNAs comprising residues (nucleosides and nucleotides) that can have two, three, four, or more modifications. For example, a modified residue can have a modified sugar and a modified nucleobase. In one example, every base of a gRNA is modified (e.g., all bases have a modified phosphate group, such as a phosphorothioate group). For example, all or substantially all of the phosphate groups of a gRNA can be replaced with phosphorothioate groups. Alternatively or additionally, a modified gRNA can comprise at least one modified residue at or near the 5' end. Alternatively or additionally, a modified gRNA can comprise at least one modified residue at or near the 3' end.

Some gRNAs comprise one, two, three or more modified residues. For example, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or 100% of the positions in a modified gRNA can be modified nucleosides or nucleotides.

Unmodified nucleic acids can be prone to degradation. Exogenous nucleic acids can also induce an innate immune response. Modifications can help introduce stability and reduce immunogenicity. Some gRNAs described herein can contain one or more modified nucleosides or nucleotides to introduce stability toward intracellular or serum-based nucleases. Some modified gRNAs described herein can exhibit a reduced innate immune response when introduced into a population of cells.

The gRNAs disclosed herein can comprise a backbone modification in which the phosphate group of a modified residue can be modified by replacing one or more of the oxygens with a different substituent. The modification can include the wholesale replacement of an unmodified phosphate moiety with a modified phosphate group as described herein. Backbone modifications of the phosphate backbone can also include alterations that result in either an uncharged linker or a charged linker with unsymmetrical charge distribution.

Examples of modified phosphate groups include, phosphorothioate, phosphoroselenates, borano phosphates, borano phosphate esters, hydrogen phosphonates, phosphoroamidates, alkyl or aryl phosphonates and phosphotriesters. The phosphorous atom in an unmodified phosphate group is achiral. However, replacement of one of the non-bridging oxygens with one of the above atoms or groups of atoms can render the phosphorous atom chiral. The stereogenic phosphorous atom can possess either the "R" configuration (Rp) or the "S" configuration (Sp). The backbone can also be modified by replacement of a bridging oxygen, (i.e., the oxygen that links the phosphate to the nucleoside), with nitrogen (bridged phosphoroamidates), sulfur (bridged phosphorothioates) and carbon (bridged methylenephosphonates). The replacement can occur at either linking oxygen or at both of the linking oxygens.

The phosphate group can be replaced by non-phosphorus containing connectors in certain backbone modifications. In some embodiments, the charged phosphate group can be replaced by a neutral moiety. Examples of moieties which can replace the phosphate group can include, without limitation, e.g., methyl phosphonate, hydroxylamino, siloxane, carbonate, carboxymethyl, carbamate, amide, thioether, ethylene oxide linker, sulfonate, sulfonamide, thioformacetal, formacetal, oxime, methyleneimino, methylenemethylimino, methylenehydrazo, methylenedimethylhydrazo and methyleneoxymethylimino.

Scaffolds that can mimic nucleic acids can also be constructed wherein the phosphate linker and ribose sugar are replaced by nuclease resistant nucleoside or nucleotide surrogates. Such modifications may comprise backbone and sugar modifications. In some embodiments, the nucleobases can be tethered by a surrogate backbone. Examples can include, without limitation, the morpholino, cyclobutyl, pyrrolidine and peptide nucleic acid (PNA) nucleoside surrogates.

The modified nucleosides and modified nucleotides can include one or more modifications to the sugar group (a sugar modification). For example, the 2' hydroxyl group (OH) can be modified (e.g., replaced with a number of different oxy or deoxy substituents. Modifications to the 2' hydroxyl group can enhance the stability of the nucleic acid since the hydroxyl can no longer be deprotonated to form a 2'-alkoxide ion.

Examples of 2' hydroxyl group modifications can include alkoxy or aryloxy (OR, wherein "R" can be, e.g., alkyl, cycloalkyl, aryl, aralkyl, heteroaryl or a sugar); polyethyleneglycols (PEG), $O(CH_2CH_2O)_nCH_2CH_2OR$ wherein R can be, e.g., H or optionally substituted alkyl, and n can be an integer from 0 to 20 (e.g., from 0 to 4, from 0 to 8, from 0 to 10, from 0 to 16, from 1 to 4, from 1 to 8, from 1 to 10, from 1 to 16, from 1 to 20, from 2 to 4, from 2 to 8, from 2 to 10, from 2 to 16, from 2 to 20, from 4 to 8, from 4 to 10, from 4 to 16, and from 4 to 20). The 2' hydroxyl group modification can be 2'-O-Me. Likewise, the 2' hydroxyl group modification can be a 2'-fluoro modification, which replaces the 2' hydroxyl group with a fluoride. The 2' hydroxyl group modification can include locked nucleic acids (LNA) in which the 2' hydroxyl can be connected, e.g., by a $C_{1-6}$ alkylene or $C_{1-6}$ heteroalkylene bridge, to the 4' carbon of the same ribose sugar, where exemplary bridges can include methylene, propylene, ether, or amino bridges; O-amino (wherein amino can be, e.g., $NH_2$; alkylamino, dialkylamino, heterocyclyl, arylamino, diarylamino, heteroarylamino, or diheteroarylamino, ethylenediamine, or polyamino) and aminoalkoxy, $O(CH_2)_n$-amino, (wherein amino can be, e.g., $NH_2$; alkylamino, dialkylamino, heterocyclyl, arylamino, diarylamino, heteroarylamino, or diheteroarylamino, ethylenediamine, or polyamino). The 2' hydroxyl group modification can include unlocked nucleic acids (UNA) in which the ribose ring lacks the C2'-C3' bond. The 2' hydroxyl group modification can include the methoxyethyl group (MOE), ($OCH_2CH_2OCH_3$, e.g., a PEG derivative).

Deoxy 2' modifications can include hydrogen (i.e. deoxyribose sugars, e.g., at the overhang portions of partially dsRNA); halo (e.g., bromo, chloro, fluoro, or iodo); amino (wherein amino can be, e.g., $NH_2$; alkylamino, dialkylamino, heterocyclyl, arylamino, diarylamino, heteroarylamino, diheteroarylamino, or amino acid); $NH(CH_2CH_2NH)_nCH_2CH_2$-amino (wherein amino can be, e.g., as described herein), —NHC(O)R (wherein R can be, e.g., alkyl, cycloalkyl, aryl, aralkyl, heteroaryl or sugar), cyano; mercapto; alkyl-thio-alkyl; thioalkoxy; and alkyl, cycloalkyl, aryl, alkenyl and alkynyl, which may be optionally substituted with e.g., an amino as described herein.

The sugar modification can comprise a sugar group which may also contain one or more carbons that possess the opposite stereochemical configuration than that of the corresponding carbon in ribose. Thus, a modified nucleic acid can include nucleotides containing e.g., arabinose, as the sugar. The modified nucleic acids can also include abasic sugars. These abasic sugars can also be further modified at one or more of the constituent sugar atoms. The modified nucleic acids can also include one or more sugars that are in the L form (e.g. L-nucleosides).

The modified nucleosides and modified nucleotides described herein, which can be incorporated into a modified nucleic acid, can include a modified base, also called a nucleobase. Examples of nucleobases include, but are not limited to, adenine (A), guanine (G), cytosine (C), and uracil (U). These nucleobases can be modified or wholly replaced to provide modified residues that can be incorporated into modified nucleic acids. The nucleobase of the nucleotide can be independently selected from a purine, a pyrimidine, a purine analog, or pyrimidine analog. In some embodiments, the nucleobase can include, for example, naturally-occurring and synthetic derivatives of a base.

In a dual guide RNA, each of the crRNA and the tracrRNA can contain modifications. Such modifications may be at one or both ends of the crRNA and/or tracrRNA. In a sgRNA, one or more residues at one or both ends of the sgRNA may be chemically modified, and/or internal nucleosides may be modified, and/or the entire sgRNA may be chemically modified. Some gRNAs comprise a 5' end modification. Some gRNAs comprise a 3' end modification.

The guide RNAs disclosed herein can comprise one of the modification patterns disclosed in WO 2018/107028 A1, herein incorporated by reference in its entirety for all purposes. The guide RNAs disclosed herein can also comprise one of the structures/modification patterns disclosed in US 2017/0114334, herein incorporated by reference in its entirety for all purposes. The guide RNAs disclosed herein can also comprise one of the structures/modification patterns disclosed in WO 2017/136794, WO 2017/004279, US 2018/0187186, or US 2019/0048338, each of which is herein incorporated by reference in its entirety for all purposes.

As one example, nucleotides at the 5' or 3' end of a guide RNA can include phosphorothioate linkages (e.g., the bases can have a modified phosphate group that is a phosphorothioate group). For example, a guide RNA can include phosphorothioate linkages between the 2, 3, or 4 terminal nucleotides at the 5' or 3' end of the guide RNA. As another example, nucleotides at the 5' and/or 3' end of a guide RNA can have 2'-O-methyl modifications. For example, a guide RNA can include 2'-O-methyl modifications at the 2, 3, or 4 terminal nucleotides at the 5' and/or 3' end of the guide RNA (e.g., the 5' end). See, e.g., WO 2017/173054 A1 and Finn et al. (2018) *Cell Rep.* 22(9):2227-2235, each of which is herein incorporated by reference in its entirety for all purposes. Other possible modifications are described in more detail elsewhere herein. In one specific example, the guide RNA includes 2'-O-methyl analogs and 3' phosphorothioate internucleotide linkages at the first three 5' and 3' terminal RNA residues. In another specific example, the guide RNA is modified such that all 2'OH groups that do not interact with the Cas9 protein are replaced with 2'-O-methyl analogs, and the tail region of the guide RNA, which has minimal interaction with Cas9, is modified with 5' and 3' phosphorothioate internucleotide linkages. Additionally, the DNA-targeting segment can have 2'-fluoro modifications on some bases. See, e.g., Yin et al. (2017) *Nat. Biotech.* 35(12):1179-1187, herein incorporated by reference in its entirety for all purposes. Other examples of modified guide RNAs are provided, e.g., in WO 2018/107028 A1, herein incorporated by reference in its entirety for all purposes. Such chemical modifications can, for example, provide greater stability and protection from exonucleases to guide RNAs, allowing them to persist within cells for longer than unmodified guide RNAs. Such chemical modifications can also, for example, protect against innate intracellular immune responses that can actively degrade RNA or trigger immune cascades that lead to cell death.

As one example, any of the guide RNAs described herein can comprise at least one modification. In one example, the at least one modification comprises a 2'-O-methyl (2'-O-Me) modified nucleotide, a phosphorothioate (PS) bond between nucleotides, a 2'-fluoro (2'-F) modified nucleotide, or a combination thereof. For example, the at least one modification can comprise a 2'-O-methyl (2'-O-Me) modified nucleotide. Alternatively or additionally, the at least one modification can comprise a phosphorothioate (PS) bond between nucleotides. Alternatively or additionally, the at least one modification can comprise a 2'-fluoro (2'-F) modified nucleotide. In one example, a guide RNA described herein comprises one or more 2'-O-methyl (2'-O-Me) modified nucleotides and one or more phosphorothioate (PS) bonds between nucleotides.

The modifications can occur anywhere in the guide RNA. As one example, the guide RNA comprises a modification at one or more of the first five nucleotides at the 5' end of the guide RNA, the guide RNA comprises a modification at one or more of the last five nucleotides of the 3' end of the guide RNA, or a combination thereof. For example, the guide RNA can comprise phosphorothioate bonds between the first four nucleotides of the guide RNA, phosphorothioate bonds between the last four nucleotides of the guide RNA, or a combination thereof. Alternatively or additionally, the guide RNA can comprise 2'-O-Me modified nucleotides at the first three nucleotides at the 5' end of the guide RNA, can comprise 2'-O-Me modified nucleotides at the last three nucleotides at the 3' end of the guide RNA, or a combination thereof.

In one example, a modified gRNA can comprise the following sequence: mN*mN*mN*NNNNNNNNNNNNN-NNNNGUUUUAGAmGmCmUmAmGmAmAmAmUmA mGmCAAGUUAAAAUAAGGCUAGUCCGUUAUCA-mAmCmUmUmGmAmAmAmAmAm GmUmGmGm-CmAmCmCmCmGmAmGmUmCmGmGmUmGmCmU*mU* mU*mU (SEQ ID NO: 44), where "N" may be any natural or non-natural nucleotide, and wherein the totality of N residues comprise an RS1 DNA-targeting segment as described herein (e.g., the sequence set forth in SEQ ID NO: 44, wherein the N residues are replaced with the DNA-targeting segment of any one of SEQ ID NOS: 3148-6241, or any one of SEQ ID NOS: 3148-4989, or any one of SEQ ID NOS: 3148-3151, 3154-3186, 3188-3247, and 3249-4351, or any one of SEQ ID NOS: 3150, 3151, 3159, 3675, 4297, and 4304, or any one of SEQ ID NOS: 4990-6241 (e.g., 5477 or 5981). The terms "mA," "mC," "mU," and "mG" denote a nucleotide (A, C, U, and G, respectively) that has been modified with 2'-O-Me. The symbol "*" depicts a phosphorothioate modification. A phosphorothioate linkage or bond refers to a bond where a sulfur is substituted for one nonbridging phosphate oxygen in a phosphodiester linkage, for example in the bonds between nucleotides bases. When phosphorothioates are used to generate oligonucleotides, the modified oligonucleotides may also be referred to as S-oligos. The terms A*, C*, U*, or G* denote a nucleotide that is linked to the next (e.g., 3') nucleotide with a phosphorothioate bond. The terms "mA*," "mC*," "mU*," and "mG*" denote a nucleotide (A, C, U, and G, respectively) that has been substituted with 2'-O-Me and that is linked to the next (e.g., 3') nucleotide with a phosphorothioate bond.

Another chemical modification that has been shown to influence nucleotide sugar rings is halogen substitution. For example, 2'-fluoro (2'-F) substitution on nucleotide sugar rings can increase oligonucleotide binding affinity and nuclease stability. Abasic nucleotides refer to those which lack nitrogenous bases. Inverted bases refer to those with linkages that are inverted from the normal 5' to 3' linkage (i.e., either a 5' to 5' linkage or a 3' to 3' linkage).

An abasic nucleotide can be attached with an inverted linkage. For example, an abasic nucleotide may be attached to the terminal 5' nucleotide via a 5' to 5' linkage, or an abasic nucleotide may be attached to the terminal 3' nucleotide via a 3' to 3' linkage. An inverted abasic nucleotide at either the terminal 5' or 3' nucleotide may also be called an inverted abasic end cap.

In one example, one or more of the first three, four, or five nucleotides at the 5' terminus, and one or more of the last three, four, or five nucleotides at the 3' terminus are modified. The modification can be, for example, a 2'-O-Me, 2'-F, inverted abasic nucleotide, phosphorothioate bond, or other nucleotide modification well known to increase stability and/or performance.

In another example, the first four nucleotides at the 5' terminus, and the last four nucleotides at the 3' terminus can be linked with phosphorothioate bonds.

In another example, the first three nucleotides at the 5' terminus, and the last three nucleotides at the 3' terminus can comprise a 2'-O-methyl (2'-O-Me) modified nucleotide. In another example, the first three nucleotides at the 5' terminus, and the last three nucleotides at the 3' terminus comprise a 2'-fluoro (2'-F) modified nucleotide. In another example, the first three nucleotides at the 5' terminus, and the last three nucleotides at the 3' terminus comprise an inverted abasic nucleotide.

Guide RNAs can be provided in any form. For example, the gRNA can be provided in the form of RNA, either as two molecules (separate crRNA and tracrRNA) or as one molecule (sgRNA), and optionally in the form of a complex with a Cas protein. The gRNA can also be provided in the form of DNA encoding the gRNA. The DNA encoding the gRNA can encode a single RNA molecule (sgRNA) or separate RNA molecules (e.g., separate crRNA and tracrRNA). In the latter case, the DNA encoding the gRNA can be provided as one DNA molecule or as separate DNA molecules encoding the crRNA and tracrRNA, respectively.

When a gRNA is provided in the form of DNA, the gRNA can be transiently, conditionally, or constitutively expressed in the cell. DNAs encoding gRNAs can be stably integrated into the genome of the cell and operably linked to a promoter active in the cell. Alternatively, DNAs encoding gRNAs can be operably linked to a promoter in an expression construct. For example, the DNA encoding the gRNA can be in a vector comprising a heterologous nucleic acid, such as a nucleic acid encoding a Cas protein. Alternatively, it can be in a vector or a plasmid that is separate from the vector comprising the nucleic acid encoding the Cas protein. Promoters that can be used in such expression constructs include promoters active, for example, in one or more of a eukaryotic cell, a human cell, a non-human cell, a mammalian cell, a non-human mammalian cell, a rodent cell, a mouse cell, a rat cell, a pluripotent cell, an embryonic stem (ES) cell, an adult stem cell, a developmentally restricted progenitor cell, an induced pluripotent stem (iPS) cell, or a one-cell stage embryo. Such promoters can be, for example, conditional promoters, inducible promoters, constitutive promoters, or tissue-specific promoters. Such promoters can also be, for example, bidirectional promoters. Specific examples of suitable promoters include an RNA polymerase III promoter, such as a human U6 promoter, a rat U6 polymerase III promoter, or a mouse U6 polymerase III promoter. In another example, the small tRNA Gln can be used to drive expression of a guide RNA.

Alternatively, gRNAs can be prepared by various other methods. For example, gRNAs can be prepared by in vitro transcription using, for example, T7 RNA polymerase (see, e.g., WO 2014/089290 and WO 2014/065596, each of which is herein incorporated by reference in its entirety for all purposes). Guide RNAs can also be a synthetically produced molecule prepared by chemical synthesis. For example, a guide RNA can be chemically synthesized to include 2'-O-methyl analogs and 3' phosphorothioate internucleotide linkages at the first three 5' and 3' terminal RNA residues.

Guide RNAs (or nucleic acids encoding guide RNAs) can be in compositions comprising one or more guide RNAs (e.g., 1, 2, 3, 4, or more guide RNAs) and a carrier increasing the stability of the guide RNA (e.g., prolonging the period under given conditions of storage (e.g., −20° C., 4° C., or ambient temperature) for which degradation products remain below a threshold, such below 0.5% by weight of the starting nucleic acid or protein; or increasing the stability in vivo). Non-limiting examples of such carriers include poly (lactic acid) (PLA) microspheres, poly(D,L-lactic-coglycolic-acid) (PLGA) microspheres, liposomes, micelles, inverse micelles, lipid cochleates, and lipid microtubules. Such compositions can further comprise a Cas protein, such as a Cas9 protein, or a nucleic acid encoding a Cas protein.

3. Guide RNA Target Sequences

Target DNAs for guide RNAs include nucleic acid sequences present in a DNA to which a DNA-targeting segment of a gRNA will bind, provided sufficient conditions for binding exist. Suitable DNA/RNA binding conditions include physiological conditions normally present in a cell. Other suitable DNA/RNA binding conditions (e.g., conditions in a cell-free system) are known in the art (see, e.g., Molecular Cloning: A Laboratory Manual, 3rd Ed. (Sambrook et al., Harbor Laboratory Press 2001), herein incorporated by reference in its entirety for all purposes). The strand of the target DNA that is complementary to and hybridizes with the gRNA can be called the "complementary strand," and the strand of the target DNA that is complementary to the "complementary strand" (and is therefore not complementary to the Cas protein or gRNA) can be called "noncomplementary strand" or "template strand."

The target DNA includes both the sequence on the complementary strand to which the guide RNA hybridizes and the corresponding sequence on the non-complementary strand (e.g., adjacent to the protospacer adjacent motif (PAM)). Unless otherwise specified, the term "guide RNA target sequence" as used herein refers specifically to the sequence on the non-complementary strand corresponding to (i.e., the reverse complement of) the sequence to which the guide RNA hybridizes on the complementary strand. That is, the guide RNA target sequence refers to the sequence on the non-complementary strand adjacent to the PAM (e.g., upstream or 5' of the PAM in the case of Cas9). A guide RNA target sequence is equivalent to the DNA-targeting segment of a guide RNA, but with thymines instead of uracils. As one example, a guide RNA target sequence for an SpCas9 enzyme can refer to the sequence upstream of the 5'-NGG-3' PAM on the non-complementary strand. A guide RNA is designed to have complementarity to the complementary strand of a target DNA, where hybridization between the DNA-targeting segment of the guide RNA and the complementary strand of the target DNA promotes the formation of a CRISPR complex. Full complementarity is not necessarily required, provided that there is sufficient complementarity to cause hybridization and promote formation of a CRISPR complex. If a guide RNA is referred to herein as targeting a guide RNA target sequence, what is meant is that the guide RNA hybridizes to the complementary strand sequence of the target DNA that is the reverse complement of the guide RNA target sequence on the non-complementary strand.

A target DNA or guide RNA target sequence can comprise any polynucleotide, and can be located, for example, in the nucleus or cytoplasm of a cell or within an organelle of a cell, such as a mitochondrion or chloroplast. A target DNA or guide RNA target sequence can be any nucleic acid sequence endogenous or exogenous to a cell. The guide RNA target sequence can be a sequence coding a gene product (e.g., a protein) or a non-coding sequence (e.g., a regulatory sequence) or can include both.

Site-specific binding and cleavage of a target DNA by a Cas protein can occur at locations determined by both (i) base-pairing complementarity between the guide RNA and the complementary strand of the target DNA and (ii) a short motif, called the protospacer adjacent motif (PAM), in the non-complementary strand of the target DNA. The PAM can flank the guide RNA target sequence. Optionally, the guide RNA target sequence can be flanked on the 3' end by the PAM (e.g., for Cas9). Alternatively, the guide RNA target sequence can be flanked on the 5' end by the PAM (e.g., for Cpf1). For example, the cleavage site of Cas proteins can be about 1 to about 10 or about 2 to about 5 base pairs (e.g., 3 base pairs) upstream or downstream of the PAM sequence (e.g., within the guide RNA target sequence). In the case of SpCas9, the PAM sequence (i.e., on the non-complementary strand) can be 5'-$N_1$GG-3', where $N_1$ is any DNA nucleotide, and where the PAM is immediately 3' of the guide RNA target sequence on the non-complementary strand of the target DNA. As such, the sequence corresponding to the PAM on the complementary strand (i.e., the reverse complement) would be 5'-CC$N_2$-3', where $N_2$ is any DNA nucleotide and is immediately 5' of the sequence to which the DNA-targeting segment of the guide RNA hybridizes on the complementary strand of the target DNA. In some such cases, $N_1$ and $N_2$ can be complementary and the $N_1$-$N_2$ base pair can be any base pair (e.g., $N_1$=C and $N_2$=G; $N_1$=G and $N_2$=C; $N_1$=A and $N_2$=T; or $N_1$=T, and $N_2$=A). In the case of Cas9 from S. aureus, the PAM can be NNGRRT or NNGRR, where N can A, G, C, or T, and R can be G or A. In the case of Cas9 from *C. jejuni*, the PAM can be, for example, NNNNACAC or NNNNRYAC, where N can be A, G, C, or T, and R can be G or A. In some cases (e.g., for FnCpf1), the PAM sequence can be upstream of the 5' end and have the sequence 5'-TTN-3'.

An example of a guide RNA target sequence is a 20-nucleotide DNA sequence immediately preceding an NGG motif recognized by an SpCas9 protein. For example, two examples of guide RNA target sequences plus PAMs are $GN_{19}NGG$ (SEQ ID NO: 40) or $N_{20}NGG$ (SEQ ID NO: 41). See, e.g., WO 2014/165825, herein incorporated by reference in its entirety for all purposes. The guanine at the 5' end can facilitate transcription by RNA polymerase in cells. Other examples of guide RNA target sequences plus PAMs can include two guanine nucleotides at the 5' end (e.g., $GGN_{20}NGG$; SEQ ID NO: 42) to facilitate efficient transcription by T7 polymerase in vitro. See, e.g., WO 2014/065596, herein incorporated by reference in its entirety for all purposes. Other guide RNA target sequences plus PAMs can have between 4-22 nucleotides in length of SEQ ID NOS: 40-42, including the 5' G or GG and the 3' GG or NGG. Yet other guide RNA target sequences plus PAMs can have between 14 and 20 nucleotides in length of SEQ ID NOS: 40-42.

Guide RNAs targeting an RS1 gene can target, for example, the first intron of the RS1 gene, or a sequence adjacent to the first intron of the RS1 gene (e.g., in the first exon or the second exon of the RS1 gene.

Formation of a CRISPR complex hybridized to a target DNA can result in cleavage of one or both strands of the target DNA within or near the region corresponding to the guide RNA target sequence (i.e., the guide RNA target sequence on the non-complementary strand of the target DNA and the reverse complement on the complementary strand to which the guide RNA hybridizes). For example, the cleavage site can be within the guide RNA target sequence (e.g., at a defined location relative to the PAM sequence). The "cleavage site" includes the position of a target DNA at which a Cas protein produces a single-strand break or a double-strand break. The cleavage site can be on only one strand (e.g., when a nickase is used) or on both strands of a double-stranded DNA. Cleavage sites can be at the same position on both strands (producing blunt ends; e.g. Cas9)) or can be at different sites on each strand (producing staggered ends (i.e., overhangs); e.g.; Cpf1). Staggered ends can be produced, for example, by using two Cas proteins, each of which produces a single-strand break at a different cleavage site on a different strand, thereby producing a double-strand break. For example, a first nickase can create a single-strand break on the first strand of double-stranded DNA (dsDNA), and a second nickase can create a single-strand break on the second strand of dsDNA such that overhanging sequences are created. In some cases, the guide RNA target sequence or cleavage site of the nickase on the first strand is separated from the guide RNA target sequence or cleavage site of the nickase on the second strand by at least 2, 3, 4, 5, 6, 7, 8, 9, 10, 15, 20, 25, 30, 40, 50, 75, 100, 250, 500, or 1,000 base pairs.

A guide RNA targeting an RS1 gene, such as a human RS1 gene, can target any desired location in the RS1 gene. Guide RNAs targeting an RS1 gene can target, for example, the first intron of the RS1 gene, or a sequence adjacent to the first intron of the RS1 gene (e.g., in the first exon or the second exon of the RS1 gene. For example, a guide RNA target sequence can comprise any contiguous sequence in the RS1 gene. The term RS1 gene includes the genomic region encompassing the RS1 regulatory promoters and enhancer sequences as well as the coding sequence. A guide RNA target sequence can comprise a coding sequence, a non-coding sequence (e.g., a regulatory element such as a promoter or enhancer region), or a combination thereof. As one example, a guide RNA target sequence can comprise a contiguous coding sequence in any of the RS1 coding exons. As one example, the guide RNA target sequence can be in exon 1 of the RS1 gene. As another example, the guide RNA target sequence can be in exon 2 of the RS1 gene. As another example, the guide RNA target sequence can be in exon 3 of the RS1 gene. As another example, the guide RNA target sequence can be in exon 4 of the RS1 gene. As another example, the guide RNA target sequence can be in exon 5 of the RS1 gene. As another example, the guide RNA target sequence can be in exon 6 of the RS1 gene. A guide RNA target sequence can also comprise a contiguous sequence in any of the RS1 introns. As one example, the guide RNA target sequence can be in intron 1 of the RS1 gene. As another example, the guide RNA target sequence can be in intron 2 of the RS1 gene. As another example, the guide RNA target sequence can be in intron 3 of the RS1 gene. As another example, the guide RNA target sequence can be in intron 4 of the RS1 gene. As another example, the guide RNA target sequence can be in intron 5 of the RS1 gene. As another example, the guide RNA target sequence can be in intron 6 of the RS1 gene.

The guide RNA target sequence can also be selected to minimize off-target modification or avoid off-target effects (e.g., by avoiding two or fewer mismatches to off-target genomic sequences).

As one example, a guide RNA targeting an RS1 gene can target the guide RNA target sequence set forth in any one of SEQ ID NOS: 54-3147. As another example, a guide RNA targeting an RS1 gene can target at least 17, at least 18, at least 19, or at least 20 contiguous nucleotides of the guide RNA target sequence set forth in any one of SEQ ID NOS: 54-3147. Examples of such guide RNA target sequences are set forth in Tables 2 and 3.

As one example, a guide RNA targeting a human RS1 gene can target the guide RNA target sequence set forth in any one of SEQ ID NOS: 54-1895. As another example, a guide RNA targeting a human RS1 gene can target at least 17, at least 18, at least 19, or at least 20 contiguous nucleotides of the guide RNA target sequence set forth in any one of SEQ ID NOS: 54-1895.

As one example, a guide RNA targeting a human RS1 gene can target the guide RNA target sequence set forth in any one of SEQ ID NOS: 54-57, 60-92, 94-153, and 155-1257. As another example, a guide RNA targeting a human RS1 gene can target at least 17, at least 18, at least 19, or at least 20 contiguous nucleotides of the guide RNA target sequence set forth in any one of SEQ ID NOS: 54-57, 60-92, 94-153, and 155-1257.

As one example, a guide RNA targeting a human RS1 gene can target the guide RNA target sequence set forth in any one of SEQ TD NOS: 56, 57, 65, 581, 1203, and 1210. As another example, a guide RNA targeting a human RS1 gene can target at least 17, at least 18, at least 19, or at least 20 contiguous nucleotides of the guide RNA target sequence set forth in any one of SEQ ID NOS: 56, 57, 65, 581, 1203, and 1210.

As one example, a guide RNA targeting a mouse Psi gene can target the guide RNA target sequence set forth in any one of SEQ TD NOS: 1896-3147 (e.g., SEQ ID NO: 2383 or 2887). As another example, a guide RNA targeting a mouse Rs1 gene can target at least 17, at least 18, at least 19, or at least 20 contiguous nucleotides of the guide RNA target sequence set forth in any one of SEQ ID NOS: 1896-3147 (e.g., SEQ ID NO: 2383 or 2887).

TABLE 2

Human RS1 Intron 1 Guide RNA Target Sequences and Guide Sequences.

| Target | SEQ ID NO. | PAM | Direction | Guide | SEQ ID NO. |
| --- | --- | --- | --- | --- | --- |
| GGGCCTTATGCATCTCCATC | 54 | TGG | - | GGGCCUUAUGCAUCUCCAUC | 3148 |
| TAATCAGCATATTATCCAGA | 55 | TGG | + | UAAUCAGCAUAUUAUCCAGA | 3149 |
| CCCTTTTGTACGTTTTTAA | 56 | TGG | + | CCCUUUUGUACGUUUUUAA | 3150 |
| CTGTATCTTCTTAGCCAGTA | 57 | CGG | + | CUGUAUCUUCUUAGCCAGUA | 3151 |
| GTTAACGCGTCATTTACATT | 58 | AGG | - | GUUAACGCGUCAUUUACAUU | 3152 |
| TACAATAAATTAGCCGGATG | 59 | TGG | - | UACAAUAAAUUAGCCGGAUG | 3153 |
| AAACTTTTAGGAGTCAAAGT | 60 | GGG | + | AAACUUUUAGGAGUCAAAGU | 3154 |
| AAAACTTTTAGGAGTCAAAG | 61 | TGG | + | AAAACUUUUAGGAGUCAAAG | 3155 |
| AATGTTAACAGTGTTGGCTT | 62 | TGG | + | AAUGUUAACAGUGUUGGCUU | 3156 |
| GTGGTGGCTGCAGGTGAGGG | 63 | TGG | + | GUGGUGGCUGCAGGUGAGGG | 3157 |
| TACTAAAATGTTAACAGTGT | 64 | TGG | + | UACUAAAAUGUUAACAGUGU | 3158 |
| AAAAAAGGACTTGACATGCA | 65 | GGG | + | AAAAAAGGACUUGACAUGCA | 3159 |
| GTCCCAGCTTCTCTTGAGGG | 66 | TGG | + | GUCCCAGCUUCUCUUGAGGG | 3160 |
| GTTAACAGTGTTGGCTTTGG | 67 | TGG | + | GUUAACAGUGUUGGCUUUGG | 3161 |
| GTTGGTGGTCACTGACAGTG | 68 | TGG | - | GUUGGUGGUCACUGACAGUG | 3162 |
| GAAACTAGTGGCTACCGTAC | 69 | TGG | - | GAAACUAGUGGCUACCGUAC | 3163 |
| AAAAAACGTACAAAAGGGGC | 70 | CGG | - | AAAAAACGUACAAAAGGGGC | 3164 |
| AGCCCCAGGCCATCAACCGG | 71 | CGG | + | AGCCCCAGGCCAUCAACCGG | 3165 |
| GGCAGCCAGACAGATGCTTC | 72 | TGG | - | GGCAGCCAGACAGAUGCUUC | 3166 |
| CTGGAGAACAAAAGCATTTT | 73 | TGG | - | CUGGAGAACAAAAGCAUUUU | 3167 |
| ATCTTAGATTTATGCAATGT | 74 | GGG | - | AUCUUAGAUUUAUGCAAUGU | 3168 |
| ACAAGTAGAATCAGAATTCT | 75 | TGG | + | ACAAGUAGAAUCAGAAUUCU | 3169 |
| AATATCGGCTCACTGCAACC | 76 | CGG | + | AAUAUCGGCUCACUGCAACC | 3170 |
| CCCTCAAGAGAAGCTGGGAC | 77 | TGG | - | CCCUCAAGAGAAGCUGGGAC | 3171 |
| TCTTAGGAGATGACGAGGTT | 78 | GGG | - | UCUUAGGAGAUGACGAGGUU | 3172 |
| AATAATAAAGAACTAGAGAA | 79 | AGG | + | AAUAAUAAAGAACUAGAGAA | 3173 |
| AAAAACGTACAAAAGGGGCC | 80 | GGG | - | AAAAACGUACAAAAGGGGCC | 3174 |
| GGCTGAGCAGGCGGAGAAGT | 81 | AGG | + | GGCUGAGCAGGCGGAGAAGU | 3175 |
| AGAGAAGGAGAACAGTCTG | 82 | AGG | + | AGAGAAGGAGAACAGUCUG | 3176 |
| CTTCTTTCTCTTTCACGAGA | 83 | GGG | + | CUUCUUUCUCUUUCACGAGA | 3177 |
| AATCTTAGATTTATGCAATG | 84 | TGG | - | AAUCUUAGAUUUAUGCAAUG | 3178 |
| CTGAGCAGGCGGAGAAGTAG | 85 | GGG | + | CUGAGCAGGCGGAGAAGUAG | 3179 |
| ACCTAGTGTTGACAAGGCTG | 86 | TGG | - | ACCUAGUGUUGACAAGGCUG | 3180 |
| TCCCAGCTTCTCTTGAGGGT | 87 | GGG | + | UCCCAGCUUCUCUUGAGGGU | 3181 |
| AATAATTCTGTTGGGACGAC | 88 | AGG | + | AAUAAUUCUGUUGGGACGAC | 3182 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CCTATAAAGAGGACGTTTCC | 89 | TGG | - | CCUAUAAAGAGGACGUUUCC | 3183 |
| CCTTCTTTCTCTTTCACGAG | 90 | AGG | + | CCUUCUUUCUCUUUCACGAG | 3184 |
| CCCATCGAAGTACTCACCAT | 91 | GGG | + | CCCAUCGAAGUACUCACCAU | 3185 |
| GTGTCATATGTTGCTGGTGG | 92 | GGG | - | GUGUCAUAUGUUGCUGGUGG | 3186 |
| AATGTAAATGACGCGTTAAC | 93 | AGG | + | AAUGUAAAUGACGCGUUAAC | 3187 |
| GCCTTTGAGCCAAGTGGATT | 94 | TGG | + | GCCUUUGAGCCAAGUGGAUU | 3188 |
| GTCAGACTCTGTGCTGGCTG | 95 | AGG | - | GUCAGACUCUGUGCUGGCUG | 3189 |
| CCGTCAATAGCATTCCGGTT | 96 | TGG | - | CCGUCAAUAGCAUUCCGGUU | 3190 |
| CCATTAAAAACGTACAAAA | 97 | GGG | - | CCAUUAAAAACGUACAAAA | 3191 |
| GGGATTTGGGGAGGATGGGG | 98 | AGG | - | GGGAUUUGGGGAGGAUGGGG | 3192 |
| ACTGTGTCATATGTTGCTGG | 99 | TGG | - | ACUGUGUCAUAUGUUGCUGG | 3193 |
| TACAATGTTGTGGACCGGGC | 100 | TGG | - | UACAAUGUUGUGGACCGGGC | 3194 |
| GATAGAGTAGCAAACAAAAC | 101 | AGG | - | GAUAGAGUAGCAAACAAAAC | 3195 |
| GCTCTCAAAGGAGACTGAGA | 102 | AGG | + | GCUCUCAAAGGAGACUGAGA | 3196 |
| GGAAGAGCAAGGAGCTCCTG | 103 | AGG | - | GGAAGAGCAAGGAGCUCCUG | 3197 |
| TGTGTCATATGTTGCTGGTG | 104 | GGG | - | UGUGUCAUAUGUUGCUGGUG | 3198 |
| CTGAGAAGGTGTACCTAGAG | 105 | TGG | + | CUGAGAAGGUGUACCUAGAG | 3199 |
| GTCCGGGAGCCAGTTCCTGC | 106 | AGG | - | GUCCGGGAGCCAGUUCCUGC | 3200 |
| TTAGGAGATGACGAGGTTGG | 107 | GGG | - | UUAGGAGAUGACGAGGUUGG | 3201 |
| GGAGGAAGCAGAGCTCTCAA | 108 | AGG | + | GGAGGAAGCAGAGCUCUCAA | 3202 |
| AGTCATCAGCCTGGGAAACA | 109 | TGG | - | AGUCAUCAGCCUGGGAAACA | 3203 |
| TCCGGGAGCCAGTTCCTGCA | 110 | GGG | - | UCCGGGAGCCAGUUCCUGCA | 3204 |
| GAGCAAGGAGCTCCTGAGGC | 111 | TGG | - | GAGCAAGGAGCUCCUGAGGC | 3205 |
| TCTGGTACAATGTTGTGGAC | 112 | CGG | - | UCUGGUACAAUGUUGUGGAC | 3206 |
| CCTGGGAGTGTCTGACAACC | 113 | AGG | - | CCUGGGAGUGUCUGACAACC | 3207 |
| CCAGTTCCTGCAGGGCCTCG | 114 | TGG | - | CCAGUUCCUGCAGGGCCUCG | 3208 |
| TAGGGAATGGGCTGAGCAGG | 115 | CGG | + | UAGGGAAUGGGCUGAGCAGG | 3209 |
| AGCTTTCTGTCCCTGTGAGA | 116 | AGG | + | AGCUUUCUGUCCCUGUGAGA | 3210 |
| TCGTCTCCCTGCCTTCTCAC | 117 | AGG | - | UCGUCUCCCUGCCUUCUCAC | 3211 |
| CGAAGTACTCACCATGGGCA | 118 | TGG | + | CGAAGUACUCACCAUGGGCA | 3212 |
| AGGCCACTGGACCATGCCCA | 119 | TGG | - | AGGCCACUGGACCAUGCCCA | 3213 |
| GGCAGGGAGACGAGTCTAAT | 120 | GGG | + | GGCAGGGAGACGAGUCUAAU | 3214 |
| GGGCTTAGATTTATGCAATA | 121 | TGG | - | GGGCUUAGAUUUAUGCAAUA | 3215 |
| TTCAGCGAAGACAAGGGATT | 122 | TGG | - | UUCAGCGAAGACAAGGGAUU | 3216 |
| CATGGCCCACGAGGCCCTGC | 123 | AGG | + | CAUGGCCCACGAGGCCCUGC | 3217 |
| CAGTTCCTGCAGGGCCTCGT | 124 | GGG | - | CAGUUCCUGCAGGGCCUCGU | 3218 |
| CATTAAAAACGTACAAAAG | 125 | GGG | - | CAUUAAAAACGUACAAAAG | 3219 |
| AGGCAGGGAGACGAGTCTAA | 126 | TGG | + | AGGCAGGGAGACGAGUCUAA | 3220 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CTAACATCTGGATGAACCTG | 127 | AGG | - | CUAACAUCUGGAUGAACCUG | 3221 |
| CCAGTGGCCTGTCTTCTCCT | 128 | GGG | + | CCAGUGGCCUGUCUUCUCCU | 3222 |
| TATTACAAATACTGCCGCTA | 129 | TGG | + | UAUUACAAAUACUGCCGCUA | 3223 |
| GCAGGGAGACGAGTCTAATG | 130 | GGG | + | GCAGGGAGACGAGUCUAAUG | 3224 |
| CAATCTGCTTGAGAAACAGG | 131 | AGG | - | CAAUCUGCUUGAGAAACAGG | 3225 |
| GGCTTAGATTTATGCAATAT | 132 | GGG | - | GGCUUAGAUUUAUGCAAUAU | 3226 |
| ACACTCCCAGGGCTCACTCT | 133 | CGG | + | ACACUCCCAGGGCUCACUCU | 3227 |
| TATGGGCTCATTCTGCCCCT | 134 | TGG | - | UAUGGGCUCAUUCUGCCCCU | 3228 |
| CGAAGACAAGGGATTTGGGG | 135 | AGG | - | CGAAGACAAGGGAUUUGGGG | 3229 |
| AGCACAGAGTCTGACATTGA | 136 | GGG | + | AGCACAGAGUCUGACAUUGA | 3230 |
| GTCTTAGGAGATGACGAGGT | 137 | TGG | - | GUCUUAGGAGAUGACGAGGU | 3231 |
| GCTGAGCAGGCGGAGAAGTA | 138 | GGG | + | GCUGAGCAGGCGGAGAAGUA | 3232 |
| TTCCAATCTGCTTGAGAAAC | 139 | AGG | - | UUCCAAUCUGCUUGAGAAAC | 3233 |
| GAGATCATAATACATCTCAG | 140 | AGG | + | GAGAUCAUAAUACAUCUCAG | 3234 |
| GCCCATCGAAGTACTCACCA | 141 | TGG | + | GCCCAUCGAAGUACUCACCA | 3235 |
| CAGGCGGAGAAGTAGGGGTG | 142 | GGG | + | CAGGCGGAGAAGUAGGGGUG | 3236 |
| TTGAAACCCAGTCACCAATG | 143 | TGG | - | UUGAAACCCAGUCACCAAUG | 3237 |
| ACATAATCCAACTGAGAGTC | 144 | AGG | + | ACAUAAUCCAACUGAGAGUC | 3238 |
| GTGAGTGTACTGAGTCTCCG | 145 | AGG | - | GUGAGUGUACUGAGUCUCCG | 3239 |
| CAATGGAGTCACACAGCATG | 146 | TGG | + | CAAUGGAGUCACACAGCAUG | 3240 |
| GGGGTGGGGGGACGCATTTG | 147 | AGG | + | GGGGUGGGGGGACGCAUUUG | 3241 |
| AACTGAGAGTCAGGAAACCT | 148 | CGG | + | AACUGAGAGUCAGGAAACCU | 3242 |
| TGCTCACTTCCATAAGGATA | 149 | TGG | + | UGCUCACUUCCAUAAGGAUA | 3243 |
| ATTTGGGGAGGATGGGGAGG | 150 | AGG | - | AUUUGGGGAGGAUGGGGAGG | 3244 |
| CGGGCTGGCCACGGCAAGTG | 151 | TGG | - | CGGGCUGGCCACGGCAAGUG | 3245 |
| CTCAATGTCAGACTCTGTGC | 152 | TGG | - | CUCAAUGUCAGACUCUGUGC | 3246 |
| TGCAGACTATTAATTGCAAG | 153 | GGG | - | UGCAGACUAUUAAUUGCAAG | 3247 |
| ACAGGCGTGAGCCACGGGCC | 154 | TGG | + | ACAGGCGUGAGCCACGGGCC | 3248 |
| CATCAATTGTGCCAGGCCCG | 155 | TGG | - | CAUCAAUUGUGCCAGGCCCG | 3249 |
| CAGCACAGAGTCTGACATTG | 156 | AGG | + | CAGCACAGAGUCUGACAUUG | 3250 |
| GTTGCAGACTATTAATTGCA | 157 | AGG | - | GUUGCAGACUAUUAAUUGCA | 3251 |
| GCAAGTGTGGCAACAGGGTC | 158 | CGG | - | GCAAGUGUGGCAACAGGGUC | 3252 |
| TAGGGTCTTGGAGTTTTGAT | 159 | AGG | - | UAGGGUCUUGGAGUUUUGAU | 3253 |
| AAAGCCTCACATGGCCCACG | 160 | AGG | + | AAAGCCUCACAUGGCCCACG | 3254 |
| CCTCGAGGTGAGCGTGTGCT | 161 | TGG | - | CCUCGAGGUGAGCGUGUGCU | 3255 |
| GCAGGCGGAGAAGTAGGGGT | 162 | GGG | + | GCAGGCGGAGAAGUAGGGGU | 3256 |
| CATTTTTGTGGACAGTTGTG | 163 | TGG | + | CAUUUUUGUGGACAGUUGUG | 3257 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TTGCAGACTATTAATTGCAA | 164 | GGG | - | UUGCAGACUAUUAAUUGCAA | 3258 |
| CTGGTTGTCAGACACTCCCA | 165 | GGG | + | CUGGUUGUCAGACACUCCCA | 3259 |
| CAGCGAAGACAAGGGATTTG | 166 | GGG | - | CAGCGAAGACAAGGGAUUUG | 3260 |
| TCAGCGAAGACAAGGGATTT | 167 | GGG | - | UCAGCGAAGACAAGGGAUUU | 3261 |
| TGGATTTGAAAATAAGAAGT | 168 | TGG | + | UGGAUUUGAAAAUAAGAAGU | 3262 |
| AGGTTTAAAAATATTGGGTG | 169 | TGG | + | AGGUUUAAAAAUAUUGGGUG | 3263 |
| TTGGCCCAGGGTGGTGGCAG | 170 | TGG | - | UUGGCCCAGGGUGGUGGCAG | 3264 |
| ACAGAAAAGCTGTCACCAA | 171 | AGG | - | ACAGAAAAGCUGUCACCAA | 3265 |
| ACAAGGGATTTGGGGAGGAT | 172 | GGG | - | ACAAGGGAUUUGGGGAGGAU | 3266 |
| GGCAGCCCCAGGCCATCAAC | 173 | CGG | + | GGCAGCCCCAGGCCAUCAAC | 3267 |
| CAGGTTCCCAGCTGTACAAT | 174 | GGG | - | CAGGUUCCCAGCUGUACAAU | 3268 |
| AGGCGGAGAAGTAGGGGTGG | 175 | GGG | + | AGGCGGAGAAGUAGGGGUGG | 3269 |
| AGTGTGGTGGCTGCAGGTGA | 176 | GGG | + | AGUGUGGUGGCUGCAGGUGA | 3270 |
| AGCACATTGGGCAGACACAA | 177 | GGG | + | AGCACAUUGGGCAGACACAA | 3271 |
| CCACGAGGCCCTGCAGGAAC | 178 | TGG | + | CCACGAGGCCCUGCAGGAAC | 3272 |
| CGTCTCCCTGCCTTCTCACA | 179 | GGG | - | CGUCUCCCUGCCUUCUCACA | 3273 |
| AGATACTAATCCCATGTATG | 180 | AGG | + | AGAUACUAAUCCCAUGUAUG | 3274 |
| TTAGGCTTTGCCCTCATACA | 181 | TGG | - | UUAGGCUUUGCCCUCAUACA | 3275 |
| CTACTCGGGGAGGCTGAAG | 182 | CGG | + | CUACUCGGGGAGGCUGAAG | 3276 |
| ACCTCACTGCCTCAGCAGCG | 183 | TGG | + | ACCUCACUGCCUCAGCAGCG | 3277 |
| TTGAGGACCCAGGAGAAGAC | 184 | AGG | - | UUGAGGACCCAGGAGAAGAC | 3278 |
| CTTAGGAGATGACGAGGTTG | 185 | GGG | - | CUUAGGAGAUGACGAGGUUG | 3279 |
| GGCGGAGAAGTAGGGGTGGG | 186 | GGG | + | GGCGGAGAAGUAGGGGUGGG | 3280 |
| CTGGTACAATGTTGTGGACC | 187 | GGG | - | CUGGUACAAUGUUGUGGACC | 3281 |
| GGCAAAGCATTCTGGGCAGA | 188 | GGG | - | GGCAAAGCAUUCUGGGCAGA | 3282 |
| GAAAATTACGGTGACTGCTG | 189 | TGG | - | GAAAAUUACGGUGACUGCUG | 3283 |
| GGACCAACCTAGTGTTGACA | 190 | AGG | - | GGACCAACCUAGUGUUGACA | 3284 |
| GCTTTTGTTCTCCAGTTTGT | 191 | TGG | + | GCUUUUGUUCUCCAGUUUGU | 3285 |
| TGATTTAATCACCAACAAAC | 192 | TGG | - | UGAUUUAAUCACCAACAAAC | 3286 |
| ATTTAGCAATGTTTACTGGG | 193 | TGG | + | AUUUAGCAAUGUUUACUGGG | 3287 |
| GGCATTGAATCCAATATGTG | 194 | CGG | - | GGCAUUGAAUCCAAUAUGUG | 3288 |
| GTGTTACCATCAGAGATTGC | 195 | AGG | + | GUGUUACCAUCAGAGAUUGC | 3289 |
| GTAGGCCATTCAGTGCTTAC | 196 | TGG | + | GUAGGCCAUUCAGUGCUUAC | 3290 |
| TTTGAAAATAAGAAGTTGGC | 197 | TGG | + | UUUGAAAAUAAGAAGUUGGC | 3291 |
| CACCTCGTTCCGCCGGTTGA | 198 | TGG | - | CACCUCGUUCCGCCGGUUGA | 3292 |
| ACACGCTCACCTCGAGGGCT | 199 | TGG | + | ACACGCUCACCUCGAGGGCU | 3293 |
| GATATCCAGTAAGCACTGAA | 200 | TGG | - | GAUAUCCAGUAAGCACUGAA | 3294 |
| TGGATTTAGCAATGTTTACT | 201 | GGG | + | UGGAUUUAGCAAUGUUUACU | 3295 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TAAAGAGGACGTTTCCTGGC | 202 | CGG | - | UAAAGAGGACGUUUCCUGGC | 3296 |
| TTAATCTGTCTTTTGTCGTA | 203 | GGG | - | UUAAUCUGUCUUUUGUCGUA | 3297 |
| ATAGGAAATGCCTTACTGTG | 204 | AGG | - | AUAGGAAAUGCCUUACUGUG | 3298 |
| CTTACTGGATATCTGAACCT | 205 | TGG | + | CUUACUGGAUAUCUGAACCU | 3299 |
| AGTAAACATTGCTAAATCCA | 206 | AGG | - | AGUAAACAUUGCUAAAUCCA | 3300 |
| GGGTTCTTGCCTTGGGGTAT | 207 | CGG | - | GGGUUCUUGCCUUGGGGUAU | 3301 |
| GTGAGGCTTTGTGGAACTTG | 208 | AGG | - | GUGAGGCUUUGUGGAACUUG | 3302 |
| ACATCTTACTACTACCACAT | 209 | TGG | + | ACAUCUUACUACUACCACAU | 3303 |
| CCACCAACACCCCTTGCCTT | 210 | TGG | + | CCACCAACACCCCUUGCCUU | 3304 |
| TTTTTGGGAGACCAAAGGCA | 211 | AGG | - | UUUUUGGGAGACCAAAGGCA | 3305 |
| TTTCATCCTCCACGCTGCTG | 212 | AGG | - | UUUCAUCCUCCACGCUGCUG | 3306 |
| TCAGAGCCACATGAAACTAG | 213 | TGG | - | UCAGAGCCACAUGAAACUAG | 3307 |
| TCCATTAAAAAACGTACAAA | 214 | AGG | - | UCCAUUAAAAAACGUACAAA | 3308 |
| AAAAAAGGACTTGACATGC | 215 | AGG | + | AAAAAAGGACUUGACAUGC | 3309 |
| GCTCCTGAGGCTGGAGCTAG | 216 | AGG | - | GCUCCUGAGGCUGGAGCUAG | 3310 |
| AGAAGGTGTACCTAGAGTGG | 217 | TGG | + | AGAAGGUGUACCUAGAGUGG | 3311 |
| GGTGCCAGCAGATTTGGGTC | 218 | TGG | + | GGUGCCAGCAGAUUUGGGUC | 3312 |
| GATACTAATCCCATGTATGA | 219 | GGG | + | GAUACUAAUCCCAUGUAUGA | 3313 |
| GAAATCCGAGAGTGAGCCCT | 220 | GGG | - | GAAAUCCGAGAGUGAGCCCU | 3314 |
| AAAACCCTGCAATCTCTGA | 221 | TGG | - | AAAACCCUGCAAUCUCUGA | 3315 |
| TAATAATATTTATATTATTC | 222 | AGG | - | UAAUAAUAUUUAUAUUAUUC | 3316 |
| AGAAAAGAAATGCAAGAAAT | 223 | GGG | + | AGAAAAGAAAUGCAAGAAAU | 3317 |
| TGAACTGTGTCATATGTTGC | 224 | TGG | - | UGAACUGUGUCAUAUGUUGC | 3318 |
| CAGAAAGCTTTCTGTATCTC | 225 | AGG | - | CAGAAAGCUUUCUGUAUCUC | 3319 |
| AGAAGCTGGGACTGGCTGTG | 226 | AGG | - | AGAAGCUGGGACUGGCUGUG | 3320 |
| CTTCTCTTGAGGGTGGGGAT | 227 | GGG | + | CUUCUCUUGAGGGUGGGGAU | 3321 |
| GCCCAGAATGCTTTGCCCAC | 228 | AGG | + | GCCCAGAAUGCUUUGCCCAC | 3322 |
| AGCAGGCGGAGAAGTAGGGG | 229 | TGG | + | AGCAGGCGGAGAAGUAGGGG | 3323 |
| TCTCCTCTAGCTCCAGCCTC | 230 | AGG | + | UCUCCUCUAGCUCCAGCCUC | 3324 |
| GGTTAAATGAAAGGGAAAGC | 231 | AGG | + | GGUUAAAUGAAAGGGAAAGC | 3325 |
| CTAAAGCGCGCCTTTCCTCA | 232 | TGG | + | CUAAAGCGCGCCUUUCCUCA | 3326 |
| AGAAGATGCTGGCTTGGCCC | 233 | AGG | - | AGAAGAUGCUGGCUUGGCCC | 3327 |
| CAGGAGCTCCTTGCTCTTCC | 234 | TGG | + | CAGGAGCUCCUUGCUCUUCC | 3328 |
| CTGTGTCATATGTTGCTGGT | 235 | GGG | - | CUGUGUCAUAUGUUGCUGGU | 3329 |
| TAGCACATTGGGCAGACACA | 236 | AGG | + | UAGCACAUUGGGCAGACACA | 3330 |
| GAAGCATATCACTTCTGCTA | 237 | GGG | - | GAAGCAUAUCACUUCUGCUA | 3331 |
| GTTGTGGACCGGGCTGGCCA | 238 | CGG | - | GUUGUGGACCGGGCUGGCCA | 3332 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TCCAGTGGCCTGTCTTCTCC | 239 | TGG | + | UCCAGUGGCCUGUCUUCUCC | 3333 |
| AATTTCCTGCTGTGACAACA | 240 | AGG | + | AAUUUCCUGCUGUGACAACA | 3334 |
| CAAGGGATTTGGGGAGGATG | 241 | GGG | - | CAAGGGAUUUGGGGAGGAUG | 3335 |
| AGGAAGTAGGGAACAGGGAC | 242 | TGG | - | AGGAAGUAGGGAACAGGGAC | 3336 |
| ACCTCCATCTCTATAAAAAT | 243 | AGG | + | ACCUCCAUCUCUAUAAAAAU | 3337 |
| TTACTTCTCTTTGGCTATGA | 244 | AGG | + | UUACUUCUCUUUGGCUAUGA | 3338 |
| TCCCACTGGCCCACGTTGCA | 245 | GGG | - | UCCCACUGGCCCACGUUGCA | 3339 |
| CAGCCATGTTGCTTCTCCTT | 246 | TGG | + | CAGCCAUGUUGCUUCUCCUU | 3340 |
| TATTTTTCTCCCTGTTTAGA | 247 | TGG | - | UAUUUUUCUCCCUGUUUAGA | 3341 |
| GGGCAAAGCATTCTGGGCAG | 248 | AGG | - | GGGCAAAGCAUUCUGGGCAG | 3342 |
| GAAGGAGGCGAGACACCTGT | 249 | GGG | - | GAAGGAGGCGAGACACCUGU | 3343 |
| ATTTCCTGCTGTGACAACAA | 250 | GGG | + | AUUUCCUGCUGUGACAACAA | 3344 |
| AAGAAAAGAAATGCAAGAAA | 251 | TGG | + | AAGAAAAGAAAUGCAAGAAA | 3345 |
| GCTTCTCTTGAGGGTGGGGA | 252 | TGG | + | GCUUCUCUUGAGGGUGGGGA | 3346 |
| ATTAATCTGTCTTTTGTCGT | 253 | AGG | - | AUUAAUCUGUCUUUUGUCGU | 3347 |
| ACAGGAGGAACGCACGCAGC | 254 | AGG | - | ACAGGAGGAACGCACGCAGC | 3348 |
| CCTGGTTGTCAGACACTCCC | 255 | AGG | + | CCUGGUUGUCAGACACUCCC | 3349 |
| AGGTCAACATCAATTGTGCC | 256 | AGG | - | AGGUCAACAUCAAUUGUGCC | 3350 |
| GACAAGGGATTTGGGGAGGA | 257 | TGG | - | GACAAGGGAUUUGGGGAGGA | 3351 |
| GGCTTAGATCTAAATACTCC | 258 | TGG | + | GGCUUAGAUCUAAAUACUCC | 3352 |
| GAGCACACAGCCTCACAGTA | 259 | AGG | + | GAGCACACAGCCUCACAGUA | 3353 |
| GTTACCATCAGAGATTGCAG | 260 | GGG | + | GUUACCAUCAGAGAUUGCAG | 3354 |
| TTGGATTTAGCAATGTTTAC | 261 | TGG | + | UUGGAUUUAGCAAUGUUUAC | 3355 |
| CTTGGAGTTTTGATAGGCAC | 262 | AGG | - | CUUGGAGUUUUGAUAGGCAC | 3356 |
| ATTTAATAAAAGAGAAACCT | 263 | TGG | + | AUUUAAUAAAAGAGAAACCU | 3357 |
| TTTAATAAAAGAGAAACCTT | 264 | GGG | + | UUUAAUAAAAGAGAAACCUU | 3358 |
| ATTAAAAGCAGGGAGAAGG | 265 | AGG | + | AUUAAAAGCAGGGAGAAGG | 3359 |
| GAGTTCCAGAAGCATCTGTC | 266 | TGG | + | GAGUUCCAGAAGCAUCUGUC | 3360 |
| GAAGATGCTGGCTTGGCCCA | 267 | GGG | - | GAAGAUGCUGGCUUGGCCCA | 3361 |
| GCTAGAGGAGAGAGAGTCTT | 268 | AGG | - | GCUAGAGGAGAGAGAGUCUU | 3362 |
| CGAAGGAGGCGAGACACCTG | 269 | TGG | - | CGAAGGAGGCGAGACACCUG | 3363 |
| GACAAACAGCCTTTGTCTTC | 270 | AGG | - | GACAAACAGCCUUUGUCUUC | 3364 |
| TATTGGATTCAATGCCAATA | 271 | AGG | + | UAUUGGAUUCAAUGCCAAUA | 3365 |
| TCCCCACCCTCAAGAGAAGC | 272 | TGG | - | UCCCCACCCUCAAGAGAAGC | 3366 |
| TCACAGCAGAGTGGCCCTTT | 273 | TGG | + | UCACAGCAGAGUGGCCCUUU | 3367 |
| GATTGAGAGGGAATTGGAAC | 274 | TGG | - | GAUUGAGAGGGAAUUGGAAC | 3368 |
| TTTTGGGAGACCAAAGGCAA | 275 | GGG | - | UUUUGGGAGACCAAAGGCAA | 3369 |
| CCCAGCTTCTCTTGAGGGTG | 276 | GGG | + | CCCAGCUUCUCUUGAGGGUG | 3370 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| GACTGCACTCACCTCGGAAC | 277 | CGG | + | GACUGCACUCACCUCGGAAC | 3371 |
| GGCAACAGGGTCCGGTTCCG | 278 | AGG | - | GGCAACAGGGUCCGGUUCCG | 3372 |
| TGACGAGGTTGGGGGTGTCC | 279 | GGG | - | UGACGAGGUUGGGGGUGUCC | 3373 |
| TAGGCTTTGCCCTCATACAT | 280 | GGG | - | UAGGCUUUGCCCUCAUACAU | 3374 |
| TGAAGCATATCACTTCTGCT | 281 | AGG | - | UGAAGCAUAUCACUUCUGCU | 3375 |
| AATCAGAATTCTTGGTTTCA | 282 | CGG | + | AAUCAGAAUUCUUGGUUUCA | 3376 |
| GATGTTCTAAAAATCCTTAT | 283 | TGG | - | GAUGUUCUAAAAAUCCUUAU | 3377 |
| AGACAAATGCTTTCTGCGGG | 284 | AGG | + | AGACAAAUGCUUUCUGCGGG | 3378 |
| TGTTACCATCAGAGATTGCA | 285 | GGG | + | UGUUACCAUCAGAGAUUGCA | 3379 |
| CCCGCCAAAGCGTTTTGCGC | 286 | AGG | + | CCCGCCAAAGCGUUUUGCGC | 3380 |
| CAGTTGTGTGGAAATATGAT | 287 | TGG | + | CAGUUGUGUGGAAAUAUGAU | 3381 |
| ACGATGTCCACAAAGAAGAC | 288 | AGG | - | ACGAUGUCCACAAAGAAGAC | 3382 |
| TTAGGCGACAGGCATATTCA | 289 | TGG | - | UUAGGCGACAGGCAUAUUCA | 3383 |
| GCTGGTTTAAAGCACTGATG | 290 | GGG | - | GCUGGUUUAAAGCACUGAUG | 3384 |
| CCAGGAAACGTCCTCTTTAT | 291 | AGG | + | CCAGGAAACGUCCUCUUUAU | 3385 |
| TCAGCCCATTCCCTATAAAG | 292 | AGG | - | UCAGCCCAUUCCCUAUAAAG | 3386 |
| AGAAAGCTTTCTGTATCTCA | 293 | GGG | - | AGAAAGCUUUCUGUAUCUCA | 3387 |
| ACTTATTAAATAAGTATGGA | 294 | TGG | - | ACUUAUUAAAUAAGUAUGGA | 3388 |
| ATTGGATTGCACCCAGGAAT | 295 | TGG | + | AUUGGAUUGCACCCAGGAAU | 3389 |
| TGCTTTCAGAGCCAATTCCT | 296 | GGG | - | UGCUUUCAGAGCCAAUUCCU | 3390 |
| TTCTGCCCCTTGGTCCAAAA | 297 | GGG | - | UUCUGCCCCUUGGUCCAAAA | 3391 |
| CAAATGGTGAGCTGAGGGAC | 298 | AGG | + | CAAAUGGUGAGCUGAGGGAC | 3392 |
| CCTTTAGCTTCCACCACTCT | 299 | AGG | - | CCUUUAGCUUCCACCACUCU | 3393 |
| AGGTCAACCTAGTTTAAATA | 300 | TGG | + | AGGUCAACCUAGUUUAAAUA | 3394 |
| TTGGTTGCCTGTCTTCTTTG | 301 | TGG | + | UUGGUUGCCUGUCUUCUUUG | 3395 |
| AGAAATCCGAGAGTGAGCCC | 302 | TGG | - | AGAAAUCCGAGAGUGAGCCC | 3396 |
| ACTGCAACCTTCCGCCCGCC | 303 | TGG | + | ACUGCAACCUUCCGCCCGCC | 3397 |
| ATCGATTGAACCCAGGCGGG | 304 | CGG | - | AUCGAUUGAACCCAGGCGGG | 3398 |
| TAGGCGACAGGCATATTCAT | 305 | GGG | - | UAGGCGACAGGCAUAUUCAU | 3399 |
| GGCGTGTTCCAGGAAGAGCA | 306 | AGG | - | GGCGUGUUCCAGGAAGAGCA | 3400 |
| CAAGCACACGCTCACCTCGA | 307 | GGG | + | CAAGCACACGCUCACCUCGA | 3401 |
| TTTATTATTATATGCATCAT | 308 | AGG | + | UUUAUUAUUAUAUGCAUCAU | 3402 |
| ATCTCAGGGTTCTTGCCTTG | 309 | GGG | - | AUCUCAGGGUUCUUGCCUUG | 3403 |
| CTTATTTAATAAGTTTTACA | 310 | TGG | + | CUUAUUUAAUAAGUUUUACA | 3404 |
| GGCAACCAATTTCTAACATC | 311 | TGG | - | GGCAACCAAUUUCUAACAUC | 3405 |
| AGAAGCAGTGGAGGGTAAAT | 312 | TGG | - | AGAAGCAGUGGAGGGUAAAU | 3406 |
| ATCACAGAAGCCATCTAAAC | 313 | AGG | + | AUCACAGAAGCCAUCUAAAC | 3407 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| GCTGGCTTGGCCCAGGGTGG | 314 | TGG | - | GCUGGCUUGGCCCAGGGUGG | 3408 |
| TTTAGCAATGTTTACTGGGT | 315 | GGG | + | UUUAGCAAUGUUUACUGGGU | 3409 |
| CTGTTTGTTCAGATTCGTGT | 316 | TGG | + | CUGUUUGUUCAGAUUCGUGU | 3410 |
| ACTGAGAAAACTGCAGAAGC | 317 | AGG | - | ACUGAGAAAACUGCAGAAGC | 3411 |
| TAAATTAATTAAAATTGGCC | 318 | GGG | - | UAAAUUAAUUAAAAUUGGCC | 3412 |
| TCTCCAGGTGCCCTGCAACG | 319 | TGG | + | UCUCCAGGUGCCCUGCAACG | 3413 |
| TTCCCACTGGCCCACGTTGC | 320 | AGG | - | UUCCCACUGGCCCACGUUGC | 3414 |
| TCGCTTAGCATATGTGGTTG | 321 | AGG | + | UCGCUUAGCAUAUGUGGUUG | 3415 |
| GATGCTTCTGGAACTCAAGG | 322 | GGG | - | GAUGCUUCUGGAACUCAAGG | 3416 |
| CAGCATGTGCCAAGCCCTCG | 323 | AGG | - | CAGCAUGUGCCAAGCCCUCG | 3417 |
| TCACAACAACTTCGGCCTCC | 324 | TGG | - | UCACAACAACUUCGGCCUCC | 3418 |
| ATCATCGCAGAAGGTTGCAT | 325 | TGG | - | AUCAUCGCAGAAGGUUGCAU | 3419 |
| GGCCTTTAACAGCACTTGAA | 326 | AGG | + | GGCCUUUAACAGCACUUGAA | 3420 |
| CGAGGCGGGCAAACCACTTG | 327 | AGG | - | CGAGGCGGGCAAACCACUUG | 3421 |
| TCTGAAGGGCCCTGTCAGTT | 328 | AGG | - | UCUGAAGGGCCCUGUCAGUU | 3422 |
| AGAAATATCTCAGCCTCTAA | 329 | AGG | - | AGAAAUAUCUCAGCCUCUAA | 3423 |
| GATGCTGGCTTGGCCCAGGG | 330 | TGG | - | GAUGCUGGCUUGGCCCAGGG | 3424 |
| CCACGGCAAGTGTGGCAACA | 331 | GGG | - | CCACGGCAAGUGUGGCAACA | 3425 |
| CCAAGCACACGCTCACCTCG | 332 | AGG | + | CCAAGCACACGCUCACCUCG | 3426 |
| CATCTTCACACCGCAATGTT | 333 | GGG | - | CAUCUUCACACCGCAAUGUU | 3427 |
| TTGTGTGGAAATATGATTGG | 334 | AGG | + | UUGUGUGGAAAUAUGAUUGG | 3428 |
| CTGCTTAGATTTTCTTGCTG | 335 | AGG | - | CUGCUUAGAUUUUCUUGCUG | 3429 |
| CTCCAGGTGCCCTGCAACGT | 336 | GGG | + | CUCCAGGUGCCCUGCAACGU | 3430 |
| GATGCATCCCATTGTACAGC | 337 | TGG | + | GAUGCAUCCCAUUGUACAGC | 3431 |
| GAAGGTTTCAGCGAAGACAA | 338 | GGG | - | GAAGGUUUCAGCGAAGACAA | 3432 |
| GTAGTGCCCACAGGATCTGC | 339 | GGG | - | GUAGUGCCCACAGGAUCUGC | 3433 |
| TCAGGTTCCCAGCTGTACAA | 340 | TGG | - | UCAGGUUCCCAGCUGUACAA | 3434 |
| TCCAAAATTGGATTGCACCC | 341 | AGG | + | UCCAAAAUUGGAUUGCACCC | 3435 |
| CTCCCTCTGGTACAATGTTG | 342 | TGG | - | CUCCCUCUGGUACAAUGUUG | 3436 |
| CACCTGTGGGCAAAGCATTC | 343 | TGG | - | CACCUGUGGGCAAAGCAUUC | 3437 |
| AGGACCATCCAGGGCAAATT | 344 | GGG | + | AGGACCAUCCAGGGCAAAUU | 3438 |
| AGTAACAAAAGTCATCAGCC | 345 | TGG | - | AGUAACAAAAGUCAUCAGCC | 3439 |
| CTGCAACCTTCCGCCCGCCT | 346 | GGG | + | CUGCAACCUUCCGCCCGCCU | 3440 |
| ACAGATGCTTCTGGAACTCA | 347 | AGG | - | ACAGAUGCUUCUGGAACUCA | 3441 |
| GGGCGGGCGGAAGGGGAAGA | 348 | AGG | - | GGGCGGGCGGAAGGGGAAGA | 3442 |
| CCCTGTTGCCACACTTGCCG | 349 | TGG | + | CCCUGUUGCCACACUUGCCG | 3443 |
| CGTTTCCTGGCCGGACGCAG | 350 | TGG | - | CGUUUCCUGGCCGGACGCAG | 3444 |
| CAGCCTTGTCAACACTAGGT | 351 | TGG | + | CAGCCUUGUCAACACUAGGU | 3445 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| GGACCATCCAGGGCAAATTG | 352 | GGG | + | GGACCAUCCAGGGCAAAUUG | 3446 |
| GTAACAAAAGTCATCAGCCT | 353 | GGG | - | GUAACAAAAGUCAUCAGCCU | 3447 |
| ATGCATCCATTGTACAGCT | 354 | GGG | + | AUGCAUCCAUUGUACAGCU | 3448 |
| TCTCGCTGTGTTGCTCAGGG | 355 | TGG | + | UCUCGCUGUGUUGCUCAGGG | 3449 |
| ACTGGGGAAGTAGTGCCCAC | 356 | AGG | - | ACUGGGGAAGUAGUGCCCAC | 3450 |
| GCTGAAGCAGATACACCACA | 357 | TGG | - | GCUGAAGCAGAUACACCACA | 3451 |
| ACTGACAGCACCCAACATTG | 358 | CGG | + | ACUGACAGCACCCAACAUUG | 3452 |
| CCATCTTCACACCGCAATGT | 359 | TGG | - | CCAUCUUCACACCGCAAUGU | 3453 |
| TACAGTGGACACAAAAAAAG | 360 | TGG | + | UACAGUGGACACAAAAAAAG | 3454 |
| GAGTCTCGCTGTGTTGCTCA | 361 | GGG | + | GAGUCUCGCUGUGUUGCUCA | 3455 |
| ATTACTGACCACAGTTTCAA | 362 | AGG | - | AUUACUGACCACAGUUUCAA | 3456 |
| ATGTGCTAGATGATCCATAG | 363 | CGG | - | AUGUGCUAGAUGAUCCAUAG | 3457 |
| TATCCAGATGGAGATGCATA | 364 | AGG | + | UAUCCAGAUGGAGAUGCAUA | 3458 |
| TCTGAGGTACCATATCCTTA | 365 | TGG | - | UCUGAGGUACCAUAUCCUUA | 3459 |
| CAGGAAACGTCCTCTTTATA | 366 | GGG | + | CAGGAAACGUCCUCUUUAUA | 3460 |
| AATTGCCTTCACTTAGGCGT | 367 | TGG | + | AAUUGCCUUCACUUAGGCGU | 3461 |
| AGAGGGAGCCTTTGAAACTG | 368 | TGG | + | AGAGGGAGCCUUUGAAACUG | 3462 |
| GCGTGTGCTTGGCGTGTTCC | 369 | AGG | - | GCGUGUGCUUGGCGUGUUCC | 3463 |
| TTGAAAATAAGAAGTTGGCT | 370 | GGG | + | UUGAAAAUAAGAAGUUGGCU | 3464 |
| ATCTGCGGGCAGATTACGCG | 371 | TGG | - | AUCUGCGGGCAGAUUACGCG | 3465 |
| GTAAGCACTGAATGGCCTAC | 372 | AGG | - | GUAAGCACUGAAUGGCCUAC | 3466 |
| CAGGACCATCCAGGGCAAAT | 373 | TGG | + | CAGGACCAUCCAGGGCAAAU | 3467 |
| ATTCTGCCCCTTGGTCCAAA | 374 | AGG | - | AUUCUGCCCCUUGGUCCAAA | 3468 |
| ATGCATAAGGCCCATAGACA | 375 | TGG | + | AUGCAUAAGGCCCAUAGACA | 3469 |
| ATGCATCTTTCCCATGTCTA | 376 | TGG | - | AUGCAUCUUUCCCAUGUCUA | 3470 |
| TCCTGGGTGCAATCCAATTT | 377 | TGG | - | UCCUGGGUGCAAUCCAAUUU | 3471 |
| GCCTTTCCTCATGGGTTGCA | 378 | AGG | + | GCCUUUCCUCAUGGGUUGCA | 3472 |
| AGAGCTGCCATTTGCGGGC | 379 | GGG | - | AGAGCUGCCAUUUGCGGGC | 3473 |
| ACACCCCAATTTGCCCTGGA | 380 | TGG | - | ACACCCCAAUUUGCCCUGGA | 3474 |
| TTTCGCTGTGTCTGTCTACC | 381 | AGG | - | UUUCGCUGUGUCUGUCUACC | 3475 |
| TTACAAAAATGATCCGGGCG | 382 | TGG | - | UUACAAAAAUGAUCCGGGCG | 3476 |
| CTGCTTTCAGAGCCAATTCC | 383 | TGG | - | CUGCUUUCAGAGCCAAUUCC | 3477 |
| CCCCACCCTCAAGAGAAGCT | 384 | GGG | - | CCCCACCCUCAAGAGAAGCU | 3478 |
| GGTTGCCCAGGGGCTGGGGG | 385 | AGG | - | GGUUGCCCAGGGGCUGGGGG | 3479 |
| GTCCACAACATTGTACCAGA | 386 | GGG | + | GUCCACAACAUUGUACCAGA | 3480 |
| ACCTGTGGGCAAAGCATTCT | 387 | GGG | - | ACCUGUGGGCAAAGCAUUCU | 3481 |
| TTCCAAGTAGCTCGGATCAC | 388 | AGG | + | UUCCAAGUAGCUCGGAUCAC | 3482 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CAGTGTGGTGGCTGCAGGTG | 389 | AGG | + | CAGUGUGGUGGCUGCAGGUG | 3483 |
| ATTTTCCCACATTATGTATA | 390 | TGG | + | AUUUUCCCACAUUAUGUAUA | 3484 |
| GGGATGAGCTCTTAAAAGAA | 391 | GGG | - | GGGAUGAGCUCUUAAAAGAA | 3485 |
| TAGAATTTAATATTCCAAAC | 392 | CGG | + | UAGAAUUUAAUAUUCCAAAC | 3486 |
| GAGGTTTCCTGACTCTCAGT | 393 | TGG | - | GAGGUUUCCUGACUCUCAGU | 3487 |
| AATCTAAGCAGACTCTTTCA | 394 | AGG | + | AAUCUAAGCAGACUCUUUCA | 3488 |
| TTTGGGAGACCAAAGGCAAG | 395 | GGG | - | UUUGGGAGACCAAAGGCAAG | 3489 |
| AATGTACCTTGCAACCCATG | 396 | AGG | - | AAUGUACCUUGCAACCCAUG | 3490 |
| AGTGAAATATTTCGATTATG | 397 | TGG | - | AGUGAAAUAUUUCGAUUAUG | 3491 |
| CAGATGCTTCTGGAACTCAA | 398 | GGG | - | CAGAUGCUUCUGGAACUCAA | 3492 |
| AGTAGTGCCCACAGGATCTG | 399 | CGG | - | AGUAGUGCCCACAGGAUCUG | 3493 |
| CTCCTGGGCCCTTGTTCCAC | 400 | TGG | - | CUCCUGGGCCCUUGUUCCAC | 3494 |
| TAATAAGTTTTACATGGCAC | 401 | AGG | + | UAAUAAGUUUUACAUGGCAC | 3495 |
| TCTGCTCAGAATTTCTCCTC | 402 | AGG | + | UCUGCUCAGAAUUUCUCCUC | 3496 |
| AGGAGGGGCAAGGAGTAAA | 403 | AGG | - | AGGAGGGGCAAGGAGUAAA | 3497 |
| TAGAGCTGCCATTTGCGGGG | 404 | CGG | - | UAGAGCUGCCAUUUGCGGGG | 3498 |
| ACAGTTTCAAAGGCTCCCTC | 405 | TGG | - | ACAGUUUCAAAGGCUCCCUC | 3499 |
| CGGTAGCCACTAGTTTCATG | 406 | TGG | + | CGGUAGCCACUAGUUUCAUG | 3500 |
| CCTTACACCCCAATTTGCCC | 407 | TGG | - | CCUUACACCCCAAUUUGCCC | 3501 |
| AAGAAATACAATAAATTAGC | 408 | CGG | - | AAGAAAUACAAUAAAUUAGC | 3502 |
| CTAAACCTGAGTGTAAAAAA | 409 | TGG | - | CUAAACCUGAGUGUAAAAAA | 3503 |
| CCAGTCCCAGCTTCTCTTGA | 410 | GGG | + | CCAGUCCCAGCUUCUCUUGA | 3504 |
| AGAAACGGAAGTCTGAGGCT | 411 | GGG | - | AGAAACGGAAGUCUGAGGCU | 3505 |
| CCCAGGAGAAGACAGGCCAC | 412 | TGG | - | CCCAGGAGAAGACAGGCCAC | 3506 |
| AAGTCGATCCGTGGTTGCCC | 413 | AGG | - | AAGUCGAUCCGUGGUUGCCC | 3507 |
| AAGAAACGGAAGTCTGAGGC | 414 | TGG | - | AAGAAACGGAAGUCUGAGGC | 3508 |
| GCCACGGCAAGTGTGGCAAC | 415 | AGG | - | GCCACGGCAAGUGUGGCAAC | 3509 |
| ATGACGAGGTTGGGGGTGTC | 416 | CGG | - | AUGACGAGGUUGGGGGUGUC | 3510 |
| AAAGCCTAATCACCTCCCAA | 417 | AGG | + | AAAGCCUAAUCACCUCCCAA | 3511 |
| GGTCTCCCAAAAAGAGGATC | 418 | TGG | + | GGUCUCCCAAAAAGAGGAUC | 3512 |
| TAGGTTTGATGGCCTGCTTC | 419 | AGG | + | UAGGUUUGAUGGCCUGCUUC | 3513 |
| CTTGGCGCTATACTAGGACT | 420 | GGG | - | CUUGGCGCUAUACUAGGACU | 3514 |
| GGAAACGCTACCATCAAATA | 421 | TGG | - | GGAAACGCUACCAUCAAAUA | 3515 |
| CCTACTGTGTGCCCTACCCT | 422 | GGG | + | CCUACUGUGUGCCCUACCCU | 3516 |
| CATCCCTCTGGCCCAGGGTA | 423 | GGG | - | CAUCCCUCUGGCCCAGGGUA | 3517 |
| TGGAGCATCCCTCTGGCCCA | 424 | GGG | - | UGGAGCAUCCCUCUGGCCCA | 3518 |
| TGTAGATGCTCTGCTTTTGA | 425 | TGG | + | UGUAGAUGCUCUGCUUUUGA | 3519 |
| GTAGTCCCAGCTACCATGGG | 426 | AGG | + | GUAGUCCCAGCUACCAUGGG | 3520 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| GCTTGGCGCTATACTAGGAC | 427 | TGG | - | GCUUGGCGCUAUACUAGGAC | 3521 |
| AAAAAAACAAGTCTGGGAAA | 428 | TGG | + | AAAAAAACAAGUCUGGGAAA | 3522 |
| TGCCCCCTCCCTCCTGAAGC | 429 | TGG | - | UGCCCCCUCCCUCCUGAAGC | 3523 |
| CTAAAATTACAAAAATGATC | 430 | CGG | - | CUAAAAUUACAAAAAUGAUC | 3524 |
| TCTCTCTGCTCACTTCCATA | 431 | AGG | + | UCUCUCUGCUCACUUCCAUA | 3525 |
| TCCTCTTTTTGGGAGACCAA | 432 | AGG | - | UCCUCUUUUUGGGAGACCAA | 3526 |
| TCACAGAAGCCATCTAAACA | 433 | GGG | + | UCACAGAAGCCAUCUAAACA | 3527 |
| AATGTTTACTGGGTGGGTGG | 434 | AGG | + | AAUGUUUACUGGGUGGGUGG | 3528 |
| GCGCACATGTCTCTTAGCCT | 435 | AGG | - | GCGCACAUGUCUCUUAGCCU | 3529 |
| TGCTGGTTTAAAGCACTGAT | 436 | GGG | - | UGCUGGUUUAAAGCACUGAU | 3530 |
| GCCTTTGGTCTCCCAAAAAG | 437 | AGG | + | GCCUUUGGUCUCCCAAAAAG | 3531 |
| CAGTGCCAGATCCTCTTTTT | 438 | GGG | - | CAGUGCCAGAUCCUCUUUUU | 3532 |
| CGGGCAGATTACGCGTGGCA | 439 | GGG | - | CGGGCAGAUUACGCGUGGCA | 3533 |
| GAGAGTCTTAGGAGATGACG | 440 | AGG | - | GAGAGUCUUAGGAGAUGACG | 3534 |
| AAGGGGCAAGCTAGTGATAC | 441 | TGG | + | AAGGGGCAAGCUAGUGAUAC | 3535 |
| GTGGAGTTTGGCCAGGCTGT | 442 | CGG | + | GUGGAGUUUGGCCAGGCUGU | 3536 |
| CCCACTCTTCTCCGACAGCC | 443 | TGG | - | CCCACUCUUCUCCGACAGCC | 3537 |
| ATATGGCACCTGGACACACA | 444 | AGG | - | AUAUGGCACCUGGACACACA | 3538 |
| GCATTTGTCTGTAGACAGCC | 445 | TGG | - | GCAUUUGUCUGUAGACAGCC | 3539 |
| GTTGCCCAGGGGCTGGGGGA | 446 | GGG | - | GUUGCCCAGGGGCUGGGGGA | 3540 |
| AGATGCTTCTGGAACTCAAG | 447 | GGG | - | AGAUGCUUCUGGAACUCAAG | 3541 |
| GCTGGATTCTGACTACACTG | 448 | GGG | - | GCUGGAUUCUGACUACACUG | 3542 |
| AAAAAAAAAGTCATTGTTCT | 449 | TGG | + | AAAAAAAAAGUCAUUGUUCU | 3543 |
| AGGCCTGGGGGTGGAGCCCG | 450 | AGG | - | AGGCCUGGGGGUGGAGCCCG | 3544 |
| ATTAATGTAGCAAAGTGGAC | 451 | AGG | - | AUUAAUGUAGCAAAGUGGAC | 3545 |
| GCCCTGCAACGTGGGCCAGT | 452 | GGG | + | GCCCUGCAACGUGGGCCAGU | 3546 |
| TTCTCTTACACCGCACATAT | 453 | TGG | + | UUCUCUUACACCGCACAUAU | 3547 |
| AAAAATAGGTTTAAAAATAT | 454 | TGG | + | AAAAAUAGGUUUAAAAAUAU | 3548 |
| CACAACAACTTCGGCCTCCT | 455 | GGG | - | CACAACAACUUCGGCCUCCU | 3549 |
| GCAAGGTTTTATTGAGTGGA | 456 | AGG | - | GCAAGGUUUUAUUGAGUGGA | 3550 |
| TATCTCAGGGTTCTTGCCTT | 457 | GGG | - | UAUCUCAGGGUUCUUGCCUU | 3551 |
| ATGTCTGGGAAGGCCGGGTG | 458 | TGG | + | AUGUCUGGGAAGGCCGGGUG | 3552 |
| TGCATCTTTCCCATGTCTAT | 459 | GGG | - | UGCAUCUUUCCCAUGUCUAU | 3553 |
| TGTGAAAGTGTTACTATTTT | 460 | AGG | - | UGUGAAAGUGUUACUAUUUU | 3554 |
| AAGAAAGAGAATAGATAGTA | 461 | TGG | - | AAGAAAGAGAAUAGAUAGUA | 3555 |
| CTAGCCTATGAGCTTTATGA | 462 | TGG | + | CUAGCCUAUGAGCUUUAUGA | 3556 |
| TCCACGCTGCTGAGGCAGTG | 463 | AGG | - | UCCACGCUGCUGAGGCAGUG | 3557 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TTTCTATGGCCAGCTTCAGG | 464 | AGG | + | UUUCUAUGGCCAGCUUCAGG | 3558 |
| GGGAAGGAACGCTCTATGGT | 465 | TGG | + | GGGAAGGAACGCUCUAUGGU | 3559 |
| GGGCAGATTACGCGTGGCAG | 466 | GGG | - | GGGCAGAUUACGCGUGGCAG | 3560 |
| CTTGCCATCATAAAGCTCAT | 467 | AGG | - | CUUGCCAUCAUAAAGCUCAU | 3561 |
| GAGTTTTGATAGGCACAGGA | 468 | TGG | - | GAGUUUUGAUAGGCACAGGA | 3562 |
| GCAAGAAATGGGTCCAAAAT | 469 | TGG | + | GCAAGAAAUGGGUCCAAAAU | 3563 |
| GGATGGGACAGAGCATCTCC | 470 | TGG | + | GGAUGGGACAGAGCAUCUCC | 3564 |
| GTTCCGCCGGTTGATGGCCT | 471 | GGG | - | GUUCCGCCGGUUGAUGGCCU | 3565 |
| TTTTTACACTCAGGTTTAGT | 472 | CGG | + | UUUUUACACUCAGGUUUAGU | 3566 |
| TGCCCTGCAACGTGGGCCAG | 473 | TGG | + | UGCCCUGCAACGUGGGCCAG | 3567 |
| TGGGCCAGTGGGAAGGTTTG | 474 | GGG | + | UGGGCCAGUGGGAAGGUUUG | 3568 |
| GACAAATGCTTTCTGCGGGA | 475 | GGG | + | GACAAAUGCUUUCUGCGGGA | 3569 |
| CAGATTACGCGTGGCAGGGG | 476 | TGG | - | CAGAUUACGCGUGGCAGGGG | 3570 |
| GCCCTGCAGGAACTGGCTCC | 477 | CGG | + | GCCCUGCAGGAACUGGCUCC | 3571 |
| TCTTTAGCAGGTAGAGTACC | 478 | TGG | + | UCUUUAGCAGGUAGAGUACC | 3572 |
| CACCTACCAAGCCCGACTCC | 479 | AGG | + | CACCUACCAAGCCCGACUCC | 3573 |
| CTCCTGGAGTCGGGCTTGGT | 480 | AGG | - | CUCCUGGAGUCGGGCUUGGU | 3574 |
| GATGCTTTTCTCCTGGAGTC | 481 | GGG | - | GAUGCUUUUCUCCUGGAGUC | 3575 |
| ACTGACCTTCCTAGGTTTGA | 482 | TGG | + | ACUGACCUUCCUAGGUUUGA | 3576 |
| GCAGGCCATCAAACCTAGGA | 483 | AGG | - | GCAGGCCAUCAAACCUAGGA | 3577 |
| CTCATCCCTGACTATCTGCT | 484 | AGG | + | CUCAUCCCUGACUAUCUGCU | 3578 |
| GTGGGCCAGTGGGAAGGTTT | 485 | GGG | + | GUGGGCCAGUGGGAAGGUUU | 3579 |
| AGAATCGATTGAACCCAGGC | 486 | GGG | - | AGAAUCGAUUGAACCCAGGC | 3580 |
| ACGTCCTCTTTATAGGGAAT | 487 | GGG | + | ACGUCCUCUUUAUAGGGAAU | 3581 |
| CTATTTGGCAATTTATACAA | 488 | AGG | - | CUAUUUGGCAAUUUAUACAA | 3582 |
| CAAAAATCAGCTGGGCTTTG | 489 | TGG | - | CAAAAAUCAGCUGGGCUUUG | 3583 |
| GGCTGTGAGGCAGTTTCTGA | 490 | AGG | - | GGCUGUGAGGCAGUUUCUGA | 3584 |
| CGTACAAAGGGGCCGGGCG | 491 | CGG | - | CGUACAAAGGGGCCGGGCG | 3585 |
| CTTCTTATTTTCAAATCCAA | 492 | TGG | - | CUUCUUAUUUUCAAAUCCAA | 3586 |
| CGTTCCGCCGGTTGATGGCC | 493 | TGG | - | CGUUCCGCCGGUUGAUGGCC | 3587 |
| ACTACTACCACATTGGTGAC | 494 | TGG | + | ACUACUACCACAUUGGUGAC | 3588 |
| CACAAGGGGCTTGAGGACCC | 495 | AGG | - | CACAAGGGGCUUGAGGACCC | 3589 |
| TTATAGGGAATGGGCTGAGC | 496 | AGG | + | UUAUAGGGAAUGGGCUGAGC | 3590 |
| CTTTAGCAGGTAGAGTACCT | 497 | GGG | + | CUUUAGCAGGUAGAGUACCU | 3591 |
| CCTAGACACTGCCGTGGGTT | 498 | TGG | + | CCUAGACACUGCCGUGGGUU | 3592 |
| GCTGTGGGCTCCAAACCCA | 499 | CGG | - | GCUGUGGGCUCCAAACCCA | 3593 |
| CATAGCGGGTGAGTAACCAG | 500 | TGG | + | CAUAGCGGGUGAGUAACCAG | 3594 |
| CTCTTAGCCTAGGAAGATTC | 501 | AGG | - | CUCUUAGCCUAGGAAGAUUC | 3595 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TAAAGAAATTGCCTTCACTT | 502 | AGG | + | UAAAGAAAUUGCCUUCACUU | 3596 |
| TTCATCCAACGCCTAAGTGA | 503 | AGG | - | UUCAUCCAACGCCUAAGUGA | 3597 |
| TGGCTGGATTCTGACTACAC | 504 | TGG | - | UGGCUGGAUUCUGACUACAC | 3598 |
| CTACTACCACATTGGTGACT | 505 | GGG | + | CUACUACCACAUUGGUGACU | 3599 |
| TACTTCGATGGGCTATGCAG | 506 | GGG | - | UACUUCGAUGGGCUAUGCAG | 3600 |
| TGTCCAGGTGCCATATTTGA | 507 | TGG | + | UGUCCAGGUGCCAUAUUUGA | 3601 |
| TGCATAAGGCCCATAGACAT | 508 | GGG | + | UGCAUAAGGCCCAUAGACAU | 3602 |
| GCCCAGGGGCTGGGGAGGG | 509 | GGG | - | GCCCAGGGGCUGGGGAGGG | 3603 |
| ACCTTGCAACCCATGAGGAA | 510 | AGG | - | ACCUUGCAACCCAUGAGGAA | 3604 |
| ATTACGCGTGGCAGGGGTGG | 511 | GGG | - | AUUACGCGUGGCAGGGGUGG | 3605 |
| TGTGTGTGTTGGGTGGGAGT | 512 | GGG | - | UGUGUGUGUUGGGUGGGAGU | 3606 |
| ATCATAATACATCTCAGAGG | 513 | TGG | + | AUCAUAAUACAUCUCAGAGG | 3607 |
| CTACCATCCTATGGCCACCA | 514 | GGG | - | CUACCAUCCUAUGGCCACCA | 3608 |
| AACCTCTTTGGAAAACTATT | 515 | TGG | - | AACCUCUUUGGAAAACUAUU | 3609 |
| CCCCTTGTGAGCAGAGAGTG | 516 | AGG | + | CCCCUUGUGAGCAGAGAGUG | 3610 |
| CATGAACCTTGAGATAAGTG | 517 | AGG | - | CAUGAACCUUGAGAUAAGUG | 3611 |
| CAGAAAACTTCACACTGCT | 518 | AGG | + | CAGAAAACUUCACACUGCU | 3612 |
| GGCCCATTTCAGGAGAGAAA | 519 | GGG | + | GGCCCAUUUCAGGAGAGAAA | 3613 |
| TTAAAGCACTGATGGGGTGC | 520 | AGG | - | UUAAAGCACUGAUGGGGUGC | 3614 |
| GCATATTCTGGAAAACTTTT | 521 | AGG | + | GCAUAUUCUGGAAAACUUUU | 3615 |
| CTGGAGCATCCCTCTGGCCC | 522 | AGG | - | CUGGAGCAUCCCUCUGGCCC | 3616 |
| CTCCCCCCTCCCCCAGCCCC | 523 | TGG | + | CUCCCCCCUCCCCCAGCCCC | 3617 |
| TCCCCCCTCCCCCAGCCCCT | 524 | GGG | + | UCCCCCCUCCCCCAGCCCCU | 3618 |
| TCCGTGGTTGCCCAGGGGCT | 525 | GGG | - | UCCGUGGUUGCCCAGGGGCU | 3619 |
| ATCCGTGGTTGCCCAGGGGC | 526 | TGG | - | AUCCGUGGUUGCCCAGGGGC | 3620 |
| CGACAAAGACAGATTAATG | 527 | AGG | + | CGACAAAGACAGAUUAAUG | 3621 |
| AAGATTAGACTGACCTTCCT | 528 | AGG | + | AAGAUUAGACUGACCUUCCU | 3622 |
| CTTGCTGAGGAAAGAGGAGG | 529 | GGG | - | CUUGCUGAGGAAAGAGGAGG | 3623 |
| GCAGAGAGAGAAGGAACGAC | 530 | AGG | - | GCAGAGAGAGAAGGAACGAC | 3624 |
| CTCTGCTCACAAGGGGCTTG | 531 | AGG | - | CUCUGCUCACAAGGGGCUUG | 3625 |
| GACAAAGACAGATTAATGA | 532 | GGG | + | GACAAAGACAGAUUAAUGA | 3626 |
| AAGTATGCAATGAATGTCAA | 533 | TGG | - | AAGUAUGCAAUGAAUGUCAA | 3627 |
| CCCCAGCCCCTGGGCAACCA | 534 | CGG | + | CCCCAGCCCCUGGGCAACCA | 3628 |
| GTGTTACTATTTTAGGCGAC | 535 | AGG | - | GUGUUACUAUUUUAGGCGAC | 3629 |
| AAAGCAGAGCATCTACATCG | 536 | GGG | - | AAAGCAGAGCAUCUACAUCG | 3630 |
| GGGTCTTACTCTTGTCGCCC | 537 | AGG | - | GGGUCUUACUCUUGUCGCCC | 3631 |
| TAAAACTTATTAAATAAGTA | 538 | TGG | - | UAAAACUUAUUAAAUAAGUA | 3632 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| ATCTGTGGGCAAGAAAAAGG | 539 | TGG | + | AUCUGUGGGCAAGAAAAAGG | 3633 |
| GAGTACCTGGGAGAGAGGGT | 540 | GGG | + | GAGUACCUGGGAGAGAGGGU | 3634 |
| CCTCACTCTCTGCTCACAAG | 541 | GGG | - | CCUCACUCUCUGCUCACAAG | 3635 |
| AGCTGGGAACCTGAAGACAA | 542 | AGG | + | AGCUGGGAACCUGAAGACAA | 3636 |
| GCGGGCAGATTACGCGTGGC | 543 | AGG | - | GCGGGCAGAUUACGCGUGGC | 3637 |
| AACACAAGGAAGTAGGGAAC | 544 | AGG | - | AACACAAGGAAGUAGGGAAC | 3638 |
| CTCACCAGACCCAAATCTGC | 545 | TGG | - | CUCACCAGACCCAAAUCUGC | 3639 |
| GAAGGGAGATGCTTTTCTCC | 546 | TGG | - | GAAGGGAGAUGCUUUUCUCC | 3640 |
| AAATGGAGTTTTGGTGGTGT | 547 | AGG | + | AAAUGGAGUUUUGGUGGUGU | 3641 |
| TGAAGCAGGCCATCAAACCT | 548 | AGG | - | UGAAGCAGGCCAUCAAACCU | 3642 |
| AGGTTTGATGGCCTGCTTCA | 549 | GGG | + | AGGUUUGAUGGCCUGCUUCA | 3643 |
| CACCTCTTCTTCCCTGAAGC | 550 | AGG | - | CACCUCUUCUUCCCUGAAGC | 3644 |
| ACAGTGCCAGATCCTCTTTT | 551 | TGG | - | ACAGUGCCAGAUCCUCUUUU | 3645 |
| CTGTTCATCAAGAGATGCAA | 552 | AGG | - | CUGUUCAUCAAGAGAUGCAA | 3646 |
| GGCTGGGGAGGGGGAGAC | 553 | AGG | - | GGCUGGGGAGGGGGAGAC | 3647 |
| ATAATCTGTGGGCAAGAAAA | 554 | AGG | + | AUAAUCUGUGGGCAAGAAAA | 3648 |
| TTATTATTATATGCATCATA | 555 | GGG | + | UUAUUAUUAUAUGCAUCAUA | 3649 |
| TAAACCTATTTTTATAGAGA | 556 | TGG | - | UAAACCUAUUUUUAUAGAGA | 3650 |
| ATCTGCTGGCACCTTGATCG | 557 | TGG | - | AUCUGCUGGCACCUUGAUCG | 3651 |
| TTGTTTCTATGGCCAGCTTC | 558 | AGG | + | UUGUUUCUAUGGCCAGCUUC | 3652 |
| GAGGTGAGTGCAGTCATCCG | 559 | AGG | - | GAGGUGAGUGCAGUCAUCCG | 3653 |
| AAAAGCAGAGCATCTACATC | 560 | GGG | - | AAAAGCAGAGCAUCUACAUC | 3654 |
| CAAGCTAGTGATACTGGAGG | 561 | GGG | + | CAAGCUAGUGAUACUGGAGG | 3655 |
| AGGATAGAGCTGCCATTTGC | 562 | GGG | - | AGGAUAGAGCUGCCAUUUGC | 3656 |
| AGATTACGCGTGGCAGGGGT | 563 | GGG | - | AGAUUACGCGUGGCAGGGGU | 3657 |
| AGGTGAGTGCAGTCATCCGA | 564 | GGG | - | AGGUGAGUGCAGUCAUCCGA | 3658 |
| CCTAGAGTGGTGGAAGCTAA | 565 | AGG | + | CCUAGAGUGGUGGAAGCUAA | 3659 |
| CGATAGACGCCGGCAGCCCC | 566 | AGG | + | CGAUAGACGCCGGCAGCCCC | 3660 |
| CCCCGCTGCTCAAACCTCTG | 567 | GGG | - | CCCCGCUGCUCAAACCUCUG | 3661 |
| ACTTTTCCTCACTTATCTCA | 568 | AGG | + | ACUUUUCCUCACUUAUCUCA | 3662 |
| AATCAGCTGGGCTTTGTGGC | 569 | AGG | - | AAUCAGCUGGGCUUUGUGGC | 3663 |
| GCCAGTCCCAGCTTCTCTTG | 570 | AGG | + | GCCAGUCCCAGCUUCUCUUG | 3664 |
| AGGGGGAGACAGGGAGAAT | 571 | GGG | - | AGGGGGAGACAGGGAGAAU | 3665 |
| GTGTGTGTGTTGGGTGGGAG | 572 | TGG | - | GUGUGUGUGUUGGGUGGGAG | 3666 |
| GGGAGGATCATGAGAGTTGG | 573 | AGG | - | GGGAGGAUCAUGAGAGUUGG | 3667 |
| AAGTGTCCTTCAAGGGGTCA | 574 | TGG | - | AAGUGUCCUUCAAGGGGUCA | 3668 |
| TACCATCCTATGGCCACCAG | 575 | GGG | - | UACCAUCCUAUGGCCACCAG | 3669 |
| CCTACCATCCTATGGCCACC | 576 | AGG | - | CCUACCAUCCUAUGGCCACC | 3670 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CCAGCTACCATGGGAGGCTG | 577 | AGG | + | CCAGCUACCAUGGGAGGCUG | 3671 |
| CTGATTCTTCCGATACCCCA | 578 | AGG | + | CUGAUUCUUCCGAUACCCCA | 3672 |
| CGTGGTTGCCCAGGGGCTGG | 579 | GGG | - | CGUGGUUGCCCAGGGGCUGG | 3673 |
| GAGGATAGAGCTGCCATTTG | 580 | CGG | - | GAGGAUAGAGCUGCCAUUUG | 3674 |
| AGTCTGAGGCTGGGGCAACT | 581 | GGG | - | AGUCUGAGGCUGGGGCAACU | 3675 |
| AGATGCTTTTCTCCTGGAGT | 582 | CGG | - | AGAUGCUUUUCUCCUGGAGU | 3676 |
| CCCATGGTGAGTACTTCGAT | 583 | GGG | - | CCCAUGGUGAGUACUUCGAU | 3677 |
| CAACAATTAATGAGAAAGTA | 584 | TGG | + | CAACAAUUAAUGAGAAAGUA | 3678 |
| CAATTTGCCCTGGATGGTCC | 585 | TGG | - | CAAUUUGCCCUGGAUGGUCC | 3679 |
| CGTAACATACCCAGTACCAC | 586 | TGG | + | CGUAACAUACCCAGUACCAC | 3680 |
| TCTTGCTGAGGAAAGAGGAG | 587 | GGG | - | UCUUGCUGAGGAAAGAGGAG | 3681 |
| GGTCCACAACATTGTACCAG | 588 | AGG | + | GGUCCACAACAUUGUACCAG | 3682 |
| TCATAATACATCTCAGAGGT | 589 | GGG | + | UCAUAAUACAUCUCAGAGGU | 3683 |
| AGGGATGAGCTCTTAAAAGA | 590 | AGG | - | AGGGAUGAGCUCUUAAAAGA | 3684 |
| CCCAGGGTAGGGCACACAGT | 591 | AGG | - | CCCAGGGUAGGGCACACAGU | 3685 |
| TACAGACAAATGCTTTCTGC | 592 | GGG | + | UACAGACAAAUGCUUUCUGC | 3686 |
| TAAAGCGCGCCTTTCCTCAT | 593 | GGG | + | UAAAGCGCGCCUUUCCUCAU | 3687 |
| AGTGGCCCTTTTGGACCAAG | 594 | GGG | + | AGUGGCCCUUUUGGACCAAG | 3688 |
| CCTCACTGAGAAGGTGATGT | 595 | TGG | - | CCUCACUGAGAAGGUGAUGU | 3689 |
| GGAGAAAACACAAGGAAGTA | 596 | GGG | - | GGAGAAAACACAAGGAAGUA | 3690 |
| AAGCTAGTGATACTGGAGGG | 597 | GGG | + | AAGCUAGUGAUACUGGAGGG | 3691 |
| CGTTGAGAGGAGTGCGCCGG | 598 | CGG | + | CGUUGAGAGGAGUGCGCCGG | 3692 |
| TCTGGGAAATGGAGTTTTGG | 599 | TGG | + | UCUGGGAAAUGGAGUUUUGG | 3693 |
| TTGCCCAGGGGCTGGGGGAG | 600 | GGG | - | UUGCCCAGGGGCUGGGGGAG | 3694 |
| GGGGCGAATGTTTACAGCTG | 601 | AGG | - | GGGGCGAAUGUUUACAGCUG | 3695 |
| TCAAAATGTCTGGGAAGGCC | 602 | GGG | + | UCAAAAUGUCUGGGAAGGCC | 3696 |
| TGGCCCATTTCAGGAGAGAA | 603 | AGG | + | UGGCCCAUUUCAGGAGAGAA | 3697 |
| TTCTCAGTATTTGGAAAGAC | 604 | TGG | + | UUCUCAGUAUUUGGAAAGAC | 3698 |
| GGGTGGGAGGTCACAGAAC | 605 | AGG | - | GGGUGGGAGGUCACAGAAC | 3699 |
| TTCTGGACAGTTCATTTCAA | 606 | TGG | + | UUCUGGACAGUUCAUUUCAA | 3700 |
| AGAAAGAAGGAAATTGCTTC | 607 | TGG | - | AGAAAGAAGGAAAUUGCUUC | 3701 |
| GCAAGGTGGTCTAACCTCTT | 608 | TGG | - | GCAAGGUGGUCUAACCUCUU | 3702 |
| TTCCGCCGGTTGATGGCCTG | 609 | GGG | - | UUCCGCCGGUUGAUGGCCUG | 3703 |
| GCCCATGGTGAGTACTTCGA | 610 | TGG | - | GCCCAUGGUGAGUACUUCGA | 3704 |
| GGGGCAAACATTGTGTATGA | 611 | CGG | + | GGGGCAAACAUUGUGUAUGA | 3705 |
| TAAGTATATTTACAGATTTG | 612 | TGG | + | UAAGUAUAUUUACAGAUUUG | 3706 |
| CCGTGGTTGCCCAGGGGCTG | 613 | GGG | - | CCGUGGUUGCCCAGGGGCUG | 3707 |
| AATCTGCCCGCAGATCCTGT | 614 | GGG | + | AAUCUGCCCGCAGAUCCUGU | 3708 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| ACACAAGGAAGTAGGGAACA | 615 | GGG | - | ACACAAGGAAGUAGGGAACA | 3709 |
| GCCAGGCTGTCGGAGAAGAG | 616 | TGG | + | GCCAGGCUGUCGGAGAAGAG | 3710 |
| TTAATGTAGCAAAGTGGACA | 617 | GGG | - | UUAAUGUAGCAAAGUGGACA | 3711 |
| TGCAACGTGGGCCAGTGGGA | 618 | AGG | + | UGCAACGUGGGCCAGUGGGA | 3712 |
| AGCTCCCCAAACCTTCCCAC | 619 | TGG | - | AGCUCCCCAAACCUUCCCAC | 3713 |
| AGAGTGGCCCTTTTGGACCA | 620 | AGG | + | AGAGUGGCCCUUUUGGACCA | 3714 |
| ACTACATTAATGTAGCAAAG | 621 | TGG | - | ACUACAUUAAUGUAGCAAAG | 3715 |
| TGACTAGTCCCATGTGGTAT | 622 | TGG | - | UGACUAGUCCCAUGUGGUAU | 3716 |
| GATGCTATTAATAATTCTGT | 623 | TGG | + | GAUGCUAUUAAUAAUUCUGU | 3717 |
| CTGCCTCGGGCTCCACCCCC | 624 | AGG | + | CUGCCUCGGGCUCCACCCCC | 3718 |
| GGTTGATGGCCTGGGGCTGC | 625 | CGG | - | GGUUGAUGGCCUGGGGCUGC | 3719 |
| TAGTAAGATGTGGGGCCTTT | 626 | GGG | - | UAGUAAGAUGUGGGGCCUUU | 3720 |
| CAACTCCTGAATAGCACATT | 627 | GGG | + | CAACUCCUGAAUAGCACAUU | 3721 |
| CGTTAATCCATATTTAAACT | 628 | AGG | - | CGUUAAUCCAUAUUUAAACU | 3722 |
| GCTGGGGAGGGGGAGACA | 629 | GGG | - | GCUGGGGAGGGGGAGACA | 3723 |
| AGAAGGTTTCAGCGAAGACA | 630 | AGG | - | AGAAGGUUUCAGCGAAGACA | 3724 |
| GAAACGGAAGTCTGAGGCTG | 631 | GGG | - | GAAACGGAAGUCUGAGGCUG | 3725 |
| TCTACGGGAAGATATCCTGT | 632 | AGG | + | UCUACGGGAAGAUAUCCUGU | 3726 |
| GAAAAAAAAAAAACAAGTC | 633 | TGG | + | GAAAAAAAAAAAACAAGUC | 3727 |
| AGAAAACTTCACACTGCTA | 634 | GGG | + | AGAAAACUUCACACUGCUA | 3728 |
| TTCTTGCTGAGGAAAGAGGA | 635 | GGG | - | UUCUUGCUGAGGAAAGAGGA | 3729 |
| CAGGAATTGGCTCTGAAAGC | 636 | AGG | + | CAGGAAUUGGCUCUGAAAGC | 3730 |
| CAAAAGCAGAGCATCTACAT | 637 | CGG | - | CAAAAGCAGAGCAUCUACAU | 3731 |
| CCCGCTGCTCAAACCTCTGG | 638 | GGG | - | CCCGCUGCUCAAACCUCUGG | 3732 |
| CACACTTGCCGTGGCCAGCC | 639 | CGG | + | CACACUUGCCGUGGCCAGCC | 3733 |
| ACCTATTTTTATAGAGATGG | 640 | AGG | - | ACCUAUUUUUAUAGAGAUGG | 3734 |
| AGGAGGGAGGGGGCAGGAGC | 641 | AGG | + | AGGAGGGAGGGGGCAGGAGC | 3735 |
| GTCGATCCGTGGTTGCCCAG | 642 | GGG | - | GUCGAUCCGUGGUUGCCCAG | 3736 |
| CAAGTGGCTGGACGTGCAGA | 643 | AGG | + | CAAGUGGCUGGACGUGCAGA | 3737 |
| GGATTTCTCTTCTTTGTGAT | 644 | TGG | + | GGAUUUCUCUUCUUUGUGAU | 3738 |
| GCAATTAGGGTCTAGTTGGC | 645 | TGG | - | GCAAUUAGGGUCUAGUUGGC | 3739 |
| GGGGGGAGACAGGGAGAATG | 646 | GGG | - | GGGGGGAGACAGGGAGAAUG | 3740 |
| AGAGGGTGGGGCCTCAAAGC | 647 | AGG | + | AGAGGGUGGGGCCUCAAAGC | 3741 |
| CCATCCCACTGCCTGCTTTG | 648 | AGG | - | CCAUCCCACUGCCUGCUUUG | 3742 |
| AAGCAGGCAGTGGGATGGAG | 649 | AGG | + | AAGCAGGCAGUGGGAUGGAG | 3743 |
| CCCCAGAGGTTTGAGCAGCG | 650 | GGG | + | CCCCAGAGGUUUGAGCAGCG | 3744 |
| CAGGGCATGCAAGGGAGGTG | 651 | TGG | - | CAGGGCAUGCAAGGGAGGUG | 3745 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TTTTGTTCGTTATAGAATTT | 652 | TGG | - | UUUUGUUCGUUAUAGAAUUU | 3746 |
| AAATATGATTGGAGGATCAA | 653 | AGG | + | AAAUAUGAUUGGAGGAUCAA | 3747 |
| CTGCTGGTTTAAAGCACTGA | 654 | TGG | - | CUGCUGGUUUAAAGCACUGA | 3748 |
| GATTTTCTTGCTGAGGAAAG | 655 | AGG | - | GAUUUUCUUGCUGAGGAAAG | 3749 |
| CATTTGTCTGTAGACAGCCT | 656 | GGG | - | CAUUUGUCUGUAGACAGCCU | 3750 |
| ATCCGAGGGAGAGAAGATGC | 657 | TGG | - | AUCCGAGGGAGAGAAGAUGC | 3751 |
| CCAACATTGCGGTGTGAAGA | 658 | TGG | + | CCAACAUUGCGGUGUGAAGA | 3752 |
| GTAGTAAGATGTGGGGCCTT | 659 | TGG | - | GUAGUAAGAUGUGGGGCCUU | 3753 |
| TCAACTCCTGAATAGCACAT | 660 | TGG | + | UCAACUCCUGAAUAGCACAU | 3754 |
| AGAAAATAAATTAAAAAGCA | 661 | GGG | + | AGAAAAUAAAUUAAAAAGCA | 3755 |
| CCAAAGGCAAGGGGTGTTGG | 662 | TGG | - | CCAAAGGCAAGGGGUGUUGG | 3756 |
| TTGATGTTGACCTAACTGAC | 663 | AGG | + | UUGAUGUUGACCUAACUGAC | 3757 |
| CCTTCCGCCCGCCCCGCAAA | 664 | TGG | + | CCUUCCGCCCGCCCCGCAAA | 3758 |
| GCTGCCATTTGCGGGGCGGG | 665 | CGG | - | GCUGCCAUUUGCGGGGCGGG | 3759 |
| GGATAGAGCTGCCATTTGCG | 666 | GGG | - | GGAUAGAGCUGCCAUUUGCG | 3760 |
| AGCGAGGAACATCACACACT | 667 | GGG | + | AGCGAGGAACAUCACACACU | 3761 |
| AATATGATTGGAGGATCAAA | 668 | GGG | + | AAUAUGAUUGGAGGAUCAAA | 3762 |
| ATTGAACCCAGGCGGGCGGA | 669 | AGG | - | AUUGAACCCAGGCGGGCGGA | 3763 |
| AAGTCTGAGGCTGGGGCAAC | 670 | TGG | - | AAGUCUGAGGCUGGGGCAAC | 3764 |
| GATTACGCGTGGCAGGGGTG | 671 | GGG | - | GAUUACGCGUGGCAGGGGUG | 3765 |
| TAATCTGCCCGCAGATCCTG | 672 | TGG | + | UAAUCUGCCCGCAGAUCCUG | 3766 |
| ATAGATAGTATGGAAAATTA | 673 | CGG | - | AUAGAUAGUAUGGAAAAUUA | 3767 |
| TGGAGAGGAGAGAAAGCCCC | 674 | TGG | + | UGGAGAGGAGAGAAAGCCCC | 3768 |
| AGAGGAGAGAAAGCCCCTGG | 675 | TGG | + | AGAGGAGAGAAAGCCCCUGG | 3769 |
| GGGCTATGCAGGGGCTGCAG | 676 | TGG | - | GGGCUAUGCAGGGGCUGCAG | 3770 |
| CCAGGGCAAATTGGGGTGTA | 677 | AGG | + | CCAGGGCAAAUUGGGGUGUA | 3771 |
| CGTGGGCCAGTGGGAAGGTT | 678 | TGG | + | CGUGGGCCAGUGGGAAGGUU | 3772 |
| TTGGTGATTAAATCATTGTG | 679 | TGG | + | UUGGUGAUUAAAUCAUUGUG | 3773 |
| TGTCTCTTGCTAGCTCAAAG | 680 | TGG | - | UGUCUCUUGCUAGCUCAAAG | 3774 |
| GGGCAAGCTAGTGATACTGG | 681 | AGG | + | GGGCAAGCUAGUGAUACUGG | 3775 |
| CTTCAATTAGGAAAAATAA | 682 | GGG | + | CUUCAAUUAGGAAAAAUAA | 3776 |
| TAGAAAATAAATTAAAAAGC | 683 | AGG | + | UAGAAAAUAAAUUAAAAAGC | 3777 |
| ACCTACTGTGTGCCCTACCC | 684 | TGG | + | ACCUACUGUGUGCCCUACCC | 3778 |
| GAGTGGCCCTTTTGGACCAA | 685 | GGG | + | GAGUGGCCCUUUUGGACCAA | 3779 |
| ATAATAAAGTGTCCTTCAAG | 686 | GGG | - | AUAAUAAAGUGUCCUUCAAG | 3780 |
| CTCCACCGTCAATAGCATTC | 687 | CGG | - | CUCCACCGUCAAUAGCAUUC | 3781 |
| ATGTTGCTGGTGGGGTGCA | 688 | AGG | - | AUGUUGCUGGUGGGGUGCA | 3782 |
| GTACTTCGATGGGCTATGCA | 689 | GGG | - | GUACUUCGAUGGGCUAUGCA | 3783 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CCCCAGCCATGCACAAAGAT | 690 | TGG | - | CCCCAGCCAUGCACAAAGAU | 3784 |
| AGTACCTGGGAGAGAGGGTG | 691 | GGG | + | AGUACCUGGGAGAGAGGGUG | 3785 |
| GTTTTGATAGGCACAGGATG | 692 | GGG | - | GUUUUGAUAGGCACAGGAUG | 3786 |
| TCTGTAACACACGCCTGCTG | 693 | GGG | + | UCUGUAACACACGCCUGCUG | 3787 |
| AATAGCAAAGTGGTTAAAGG | 694 | AGG | + | AAUAGCAAAGUGGUUAAAGG | 3788 |
| TATCATCAGAAAAGAAAGAA | 695 | AGG | + | UAUCAUCAGAAAAGAAAGAA | 3789 |
| GAATTTAAATTAATTAAAAT | 696 | TGG | - | GAAUUUAAAUUAAUUAAAAU | 3790 |
| CATATATTAGCAGAAACTGA | 697 | TGG | - | CAUAUAUUAGCAGAAACUGA | 3791 |
| GGTGGGGAGGTCACAGAACA | 698 | GGG | - | GGUGGGGAGGUCACAGAACA | 3792 |
| ACAAATGCTTTCTGCGGGAG | 699 | GGG | + | ACAAAUGCUUUCUGCGGGAG | 3793 |
| AGGGCCTCGTGGGCCATGTG | 700 | AGG | - | AGGGCCUCGUGGGCCAUGUG | 3794 |
| CCTGCGCAAAACGCTTTGGC | 701 | GGG | - | CCUGCGCAAAACGCUUUGGC | 3795 |
| CCGCTCCCCCACCCCACGAC | 702 | AGG | - | CCGCUCCCCCACCCCACGAC | 3796 |
| TAAGTACCATATACATAATG | 703 | TGG | - | UAAGUACCAUAUACAUAAUG | 3797 |
| GTGTGTTGGGTGGGAGTGGG | 704 | TGG | - | GUGUGUUGGGUGGGAGUGGG | 3798 |
| AAGAAAAGGTGGACTGAAA | 705 | AGG | + | AAGAAAAGGUGGACUGAAA | 3799 |
| CGTTTTTTAATGGATCCATG | 706 | TGG | + | CGUUUUUUAAUGGAUCCAUG | 3800 |
| AATTTGCCCTGGATGGTCCT | 707 | GGG | - | AAUUUGCCCUGGAUGGUCCU | 3801 |
| GGCTGGATTCTGACTACACT | 708 | GGG | - | GGCUGGAUUCUGACUACACU | 3802 |
| CTCTCCTGCGCAAAACGCTT | 709 | TGG | - | CUCUCCUGCGCAAAACGCUU | 3803 |
| ATCTCGGCTCACAACAACTT | 710 | CGG | - | AUCUCGGCUCACAACAACUU | 3804 |
| TTTTGATAGGCACAGGATGG | 711 | GGG | - | UUUUGAUAGGCACAGGAUGG | 3805 |
| AAAGTGGACAGGGCAGGGAG | 712 | AGG | - | AAAGUGGACAGGGCAGGGAG | 3806 |
| AAGAGGTGAAAGGAATTCGA | 713 | TGG | + | AAGAGGUGAAAGGAAUUCGA | 3807 |
| AGACCAAAGGCAAGGGGTGT | 714 | TGG | - | AGACCAAAGGCAAGGGGUGU | 3808 |
| AAGGTTGCATTGGACACTGC | 715 | TGG | - | AAGGUUGCAUUGGACACUGC | 3809 |
| ACCACACTGCTGTCTCTCCT | 716 | GGG | - | ACCACACUGCUGUCUCUCCU | 3810 |
| AATTAATATCGTTGATAAAT | 717 | AGG | + | AAUUAAUAUCGUUGAUAAAU | 3811 |
| ATGCTATTAATAATTCTGTT | 718 | GGG | + | AUGCUAUUAAUAAUUCUGUU | 3812 |
| AGGGCACCATCCAGCCTGTC | 719 | TGG | + | AGGGCACCAUCCAGCCUGUC | 3813 |
| TCATAGGCTAGTGTGTGTGT | 720 | TGG | - | UCAUAGGCUAGUGUGUGUGU | 3814 |
| GAAGATGGAAGGTCAGTGTT | 721 | GGG | + | GAAGAUGGAAGGUCAGUGUU | 3815 |
| CTGGGGGTGGAGCCCGAGGC | 722 | AGG | - | CUGGGGGUGGAGCCCGAGGC | 3816 |
| TTCTGTCCCTGTGAGAAGGC | 723 | AGG | + | UUCUGUCCCUGUGAGAAGGC | 3817 |
| GTATGTCACTGAAGAGAGTC | 724 | TGG | - | GUAUGUCACUGAAGAGAGUC | 3818 |
| AGTCGATCCGTGGTTGCCCA | 725 | GGG | - | AGUCGAUCCGUGGUUGCCCA | 3819 |
| CGGCGGAACGAGGTGGAGTT | 726 | TGG | + | CGGCGGAACGAGGUGGAGUU | 3820 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TTGTTTAGAAATTATTTTAT | 727 | AGG | - | UUGUUUAGAAAUUAUUUUAU | 3821 |
| GAGGAGAAATTCTGAGCAGA | 728 | TGG | - | GAGGAGAAAUUCUGAGCAGA | 3822 |
| AAACATTGTGTATGACGGCG | 729 | GGG | + | AAACAUUGUGUAUGACGGCG | 3823 |
| TGGAGAAAACACAAGGAAGT | 730 | AGG | - | UGGAGAAAACACAAGGAAGU | 3824 |
| TGAAGATGGAAGGTCAGTGT | 731 | TGG | + | UGAAGAUGGAAGGUCAGUGU | 3825 |
| TTTAAAAATATTGGGTGTGG | 732 | TGG | + | UUUAAAAAUAUUGGGUGUGG | 3826 |
| TAGAAGGCTCCTCACAGAAC | 733 | TGG | - | UAGAAGGCUCCUCACAGAAC | 3827 |
| GGTGTAACCCAGGACCATCC | 734 | AGG | + | GGUGUAACCCAGGACCAUCC | 3828 |
| TTTCTTGCTGAGGAAAGAGG | 735 | AGG | - | UUUCUUGCUGAGGAAAGAGG | 3829 |
| TCTCTTCTTTGTGATTGGCA | 736 | TGG | + | UCUCUUCUUUGUGAUUGGCA | 3830 |
| AATCGTCTGATTGCTGGAGA | 737 | GGG | + | AAUCGUCUGAUUGCUGGAGA | 3831 |
| CATTGCGGTGTGAAGATGGA | 738 | AGG | + | CAUUGCGGUGUGAAGAUGGA | 3832 |
| TGTCGTGGGTGGGGGAGCG | 739 | GGG | + | UGUCGUGGGGUGGGGGAGCG | 3833 |
| GCAAGCTAGTGATACTGGAG | 740 | GGG | + | GCAAGCUAGUGAUACUGGAG | 3834 |
| AGTTTTGATAGGCACAGGAT | 741 | GGG | - | AGUUUUGAUAGGCACAGGAU | 3835 |
| TCACCATGGGCATGGTCCAG | 742 | TGG | + | UCACCAUGGGCAUGGUCCAG | 3836 |
| GGGTACTTGAGAATTGAGAG | 743 | AGG | - | GGGUACUUGAGAAUUGAGAG | 3837 |
| TTTCACTATTTTTCCTTTAG | 744 | AGG | + | UUUCACUAUUUUUCCUUUAG | 3838 |
| GGAACAGGGACTGGTCCTTT | 745 | TGG | - | GGAACAGGGACUGGUCCUUU | 3839 |
| TGTGTTGGGTGGGAGTGGGT | 746 | GGG | - | UGUGUUGGGUGGGAGUGGGU | 3840 |
| ACAAGCGGCTAGATGTCGAG | 747 | AGG | + | ACAAGCGGCUAGAUGUCGAG | 3841 |
| GTGAGTAACCAGTGGAACAA | 748 | GGG | + | GUGAGUAACCAGUGGAACAA | 3842 |
| TTCATCCAGATGTTAGAAAT | 749 | TGG | + | UUCAUCCAGAUGUUAGAAAU | 3843 |
| CGTCTGATTGCTGGAGAGGG | 750 | AGG | + | CGUCUGAUUGCUGGAGAGGG | 3844 |
| GAGGGGGGAGACAGGGAGAA | 751 | TGG | - | GAGGGGGGAGACAGGGAGAA | 3845 |
| TCCTGCGCAAAACGCTTTGG | 752 | CGG | - | UCCUGCGCAAAACGCUUUGG | 3846 |
| AGTTTACCAATCTTTGTGCA | 753 | TGG | + | AGUUUACCAAUCUUUGUGCA | 3847 |
| GCATCCCTCTGGCCCAGGGT | 754 | AGG | - | GCAUCCCUCUGGCCCAGGGU | 3848 |
| GTGTTGGGTGGGAGTGGGTG | 755 | GGG | - | GUGUUGGGUGGGAGUGGGUG | 3849 |
| GAGGCCCCACCCTCTCTCCC | 756 | AGG | - | GAGGCCCCACCCUCUCUCCC | 3850 |
| TCTATCGTGCGCTCTTCCGC | 757 | CGG | - | UCUAUCGUGCGCUCUUCCGC | 3851 |
| TCATTAATTGTTGCAACTTA | 758 | TGG | - | UCAUUAAUUGUUGCAACUUA | 3852 |
| CCAATCCAAGAGACTAAACT | 759 | AGG | + | CCAAUCCAAGAGACUAAACU | 3853 |
| GAACAGGGACTGGTCCTTTT | 760 | GGG | - | GAACAGGGACUGGUCCUUUU | 3854 |
| GAGACAAGTCTCTCTTTAGC | 761 | AGG | + | GAGACAAGUCUCUCUUUAGC | 3855 |
| GGTGAGTAACCAGTGGAACA | 762 | AGG | + | GGUGAGUAACCAGUGGAACA | 3856 |
| TGACCCTTTCTCTCCTGAAA | 763 | TGG | - | UGACCCUUUCUCUCCUGAAA | 3857 |
| TGAGAAAGTATGGCATATTC | 764 | TGG | + | UGAGAAAGUAUGGCAUAUUC | 3858 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| ATTTGTCTGTAGACAGCCTG | 765 | GGG | - | AUUUGUCUGUAGACAGCCUG | 3859 |
| AAGGGGGAGCCCAGACAGGC | 766 | TGG | - | AAGGGGGAGCCCAGACAGGC | 3860 |
| CTGAGGCTGGGGCAACTGGG | 767 | AGG | - | CUGAGGCUGGGGCAACUGGG | 3861 |
| GACGGAGGCAAGAGACAGTC | 768 | TGG | + | GACGGAGGCAAGAGACAGUC | 3862 |
| AAGGGCTGTTTTTGTTTCTA | 769 | TGG | + | AAGGGCUGUUUUUGUUUCUA | 3863 |
| GAACAACAGTTGTCTTTGTG | 770 | TGG | + | GAACAACAGUUGUCUUUGUG | 3864 |
| AATCCAACAGAAAACAGGAT | 771 | GGG | + | AAUCCAACAGAAAACAGGAU | 3865 |
| CTGACTCAATTATAAGACAT | 772 | AGG | - | CUGACUCAAUUAUAAGACAU | 3866 |
| CCATGGGAAGGAACGCTCTA | 773 | TGG | + | CCAUGGGAAGGAACGCUCUA | 3867 |
| CGCAGGAGAGTGGCGGCATC | 774 | AGG | + | CGCAGGAGAGUGGCGGCAUC | 3868 |
| GGCAAGCTAGTGATACTGGA | 775 | GGG | + | GGCAAGCUAGUGAUACUGGA | 3869 |
| TTTAGTTTGCCGTCTGTAGG | 776 | CGG | - | UUUAGUUUGCCGUCUGUAGG | 3870 |
| ATGGAGTTTTGGTGGTGTAG | 777 | GGG | + | AUGGAGUUUUGGUGGUGUAG | 3871 |
| TGTAGCAAAGTGGACAGGGC | 778 | AGG | - | UGUAGCAAAGUGGACAGGGC | 3872 |
| AAATAATGATTATCTTTTTT | 779 | TGG | + | AAAUAAUGAUUAUCUUUUUU | 3873 |
| GACCCTTTCTCTCCTGAAAT | 780 | GGG | - | GACCCUUUCUCUCCUGAAAU | 3874 |
| GTGAAAGAAACGGAAGTCTG | 781 | AGG | - | GUGAAAGAAACGGAAGUCUG | 3875 |
| GGGTGGGGTGTGAAAGAAA | 782 | CGG | - | GGGUGGGGUGUGAAAGAAA | 3876 |
| GCATCATAGGGGTGTGGAAA | 783 | TGG | + | GCAUCAUAGGGGUGUGGAAA | 3877 |
| ATCTGTGTAAAAGAGACTCC | 784 | AGG | - | AUCUGUGUAAAAGAGACUCC | 3878 |
| GGCTATGCAGGGGCTGCAGT | 785 | GGG | - | GGCUAUGCAGGGGCUGCAGU | 3879 |
| AAGTCTGGGAAATGGAGTTT | 786 | TGG | + | AAGUCUGGGAAAUGGAGUUU | 3880 |
| GGAATTCGATGGCCCATTTC | 787 | AGG | + | GGAAUUCGAUGGCCCAUUUC | 3881 |
| TTATCTTACTTGCTTAACGC | 788 | AGG | + | UUAUCUUACUUGCUUAACGC | 3882 |
| GCTGTGAGGCAGTTTCTGAA | 789 | GGG | - | GCUGUGAGGCAGUUUCUGAA | 3883 |
| CGGATGTCTCATGTAACATG | 790 | TGG | + | CGGAUGUCUCAUGUAACAUG | 3884 |
| GGGCACCATCCAGCCTGTCT | 791 | GGG | + | GGGCACCAUCCAGCCUGUCU | 3885 |
| TTATATGCATCATAGGGGTG | 792 | TGG | + | UUAUAUGCAUCAUAGGGGUG | 3886 |
| CTACCATCAAATATGGCACC | 793 | TGG | - | CUACCAUCAAAUAUGGCACC | 3887 |
| TTATTGTATTTCTTGTAGAG | 794 | AGG | + | UUAUUGUAUUUCUUGUAGAG | 3888 |
| TGCCCCTAGCAGATAGTCA | 795 | GGG | - | UGCCCCUAGCAGAUAGUCA | 3889 |
| TTTCTGCGGGAGGGAGTCT | 796 | GGG | + | UUUCUGCGGGAGGGAGUCU | 3890 |
| TGGCGGGTCCCTGTTGCCAG | 797 | GGG | - | UGGCGGGUCCCUGUUGCCAG | 3891 |
| TTTGTTCAAAATGTCTGGGA | 798 | AGG | + | UUUGUUCAAAAUGUCUGGGA | 3892 |
| TGGCTGGGGCTGCTAGTCC | 799 | AGG | - | UGGCUGGGGCUGCUAGUCC | 3893 |
| CCAGCTCGATTTCAACACTG | 800 | GGG | + | CCAGCUCGAUUUCAACACUG | 3894 |
| CAAACTCCACCTCGTTCCGC | 801 | CGG | - | CAAACUCCACCUCGUUCCGC | 3895 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TCTGTGTAAAAGAGACTCCA | 802 | GGG | - | UCUGUGUAAAAGAGACUCCA | 3896 |
| GTGTAACCCAGGACCATCCA | 803 | GGG | + | GUGUAACCCAGGACCAUCCA | 3897 |
| TAAATTAAAAAGCAGGGAGA | 804 | AGG | + | UAAAUUAAAAAGCAGGGAGA | 3898 |
| GCTCTTAAAGAAGGGACCA | 805 | AGG | - | GCUCUUAAAGAAGGGACCA | 3899 |
| TGTGCCCTACCCTGGGCCAG | 806 | AGG | + | UGUGCCCUACCCUGGGCCAG | 3900 |
| ATTATAAGACATAGGAAGCC | 807 | AGG | - | AUUAUAAGACAUAGGAAGCC | 3901 |
| AATGAATTTGAGACGCCTAG | 808 | GGG | - | AAUGAAUUUGAGACGCCUAG | 3902 |
| AAACACTTGGAGACAGAGCG | 809 | AGG | + | AAACACUUGGAGACAGAGCG | 3903 |
| GTCTGCCCAATGTGCTATTC | 810 | AGG | - | GUCUGCCCAAUGUGCUAUUC | 3904 |
| TCATCCCTGACTATCTGCTA | 811 | GGG | + | UCAUCCCUGACUAUCUGCUA | 3905 |
| AGATAAGAAATAGAGAAAAG | 812 | AGG | + | AGAUAAGAAAUAGAGAAAAG | 3906 |
| AAGAAGTTGGCTGGGTGCAG | 813 | TGG | + | AAGAAGUUGGCUGGGUGCAG | 3907 |
| GCAAACATTGTGTATGACGG | 814 | CGG | + | GCAAACAUUGUGUAUGACGG | 3908 |
| GGCCCACGTTGCAGGGCACC | 815 | TGG | - | GGCCCACGUUGCAGGGCACC | 3909 |
| ACCTAGAGTCCAAGGAAGAG | 816 | AGG | - | ACCUAGAGUCCAAGGAAGAG | 3910 |
| GTCTAGAACTACATGCCACA | 817 | GGG | - | GUCUAGAACUACAUGCCACA | 3911 |
| TTTTCTCCTGGAGTCGGGCT | 818 | TGG | - | UUUUCUCCUGGAGUCGGGCU | 3912 |
| ATTCCTTCCCTCCGGGTATA | 819 | GGG | + | AUUCCUUCCCUCCGGGUAUA | 3913 |
| CAAACATTGTGTATGACGGC | 820 | GGG | + | CAAACAUUGUGUAUGACGGC | 3914 |
| CTTTCATAACCAAATCCACT | 821 | TGG | - | CUUUCAUAACCAAAUCCACU | 3915 |
| TGTCACAGCAGGAAATTTCA | 822 | AGG | - | UGUCACAGCAGGAAAUUUCA | 3916 |
| CCTCAGCTCACCATTTGCTC | 823 | TGG | - | CCUCAGCUCACCAUUUGCUC | 3917 |
| GGTGGGAGGATCATGAGAGT | 824 | TGG | - | GGUGGGAGGAUCAUGAGAGU | 3918 |
| GGACTCAGCCCCTGGCAACA | 825 | GGG | + | GGACUCAGCCCCUGGCAACA | 3919 |
| TGGGGCCTCAAAGCAGGCAG | 826 | TGG | + | UGGGGCCUCAAAGCAGGCAG | 3920 |
| CGTGGGTGGGGAGCGGGG | 827 | AGG | + | CGUGGGUGGGGAGCGGGG | 3921 |
| TTCTATGGCCAGCTTCAGGA | 828 | GGG | + | UUCUAUGGCCAGCUUCAGGA | 3922 |
| AGTAAGATATTTTAATACGA | 829 | TGG | - | AGUAAGAUAUUUUAAUACGA | 3923 |
| ACTGAAAAGGCCAGAGCAAA | 830 | TGG | + | ACUGAAAAGGCCAGAGCAAA | 3924 |
| CTGGTGGCCATAGGATGGTA | 831 | GGG | + | CUGGUGGCCAUAGGAUGGUA | 3925 |
| GAGAAAAGAGGCCAGGTGCA | 832 | GGG | + | GAGAAAAGAGGCCAGGUGCA | 3926 |
| TCTTTTAGTTTGCCGTCTGT | 833 | AGG | - | UCUUUUAGUUUGCCGUCUGU | 3927 |
| TGGTACTTATACTTTGATTG | 834 | TGG | + | UGGUACUUAUACUUUGAUUG | 3928 |
| CTTTCTGCGGGAGGGGAGTC | 835 | TGG | + | CUUUCUGCGGGAGGGGAGUC | 3929 |
| TAATGAATTTGAGACGCCTA | 836 | GGG | - | UAAUGAAUUUGAGACGCCUA | 3930 |
| TCACTGCCTCAGCAGCGTGG | 837 | AGG | + | UCACUGCCUCAGCAGCGUGG | 3931 |
| AAAAAAGTGGTTGCAGAAC | 838 | AGG | + | AAAAAAGUGGUUGCAGAAC | 3932 |
| TCTGGGAAGGCCGGGTGTGG | 839 | TGG | + | UCUGGGAAGGCCGGGUGUGG | 3933 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CCAGCCAAAAATAGCCAGTG | 840 | TGG | + | CCAGCCAAAAAUAGCCAGUG | 3934 |
| CCACACTGGCTATTTTTGGC | 841 | TGG | - | CCACACUGGCUAUUUUUGGC | 3935 |
| CAATTAGGGTCTAGTTGGCT | 842 | GGG | - | CAAUUAGGGUCUAGUUGGCU | 3936 |
| TGCCAGCTCGATTTCAACAC | 843 | TGG | + | UGCCAGCUCGAUUUCAACAC | 3937 |
| GAGCTAGCAAGAGACATCTA | 844 | CGG | + | GAGCUAGCAAGAGACAUCUA | 3938 |
| ACTTTTTTTGTGTCCACTGT | 845 | AGG | - | ACUUUUUUUGUGUCCACUGU | 3939 |
| TTAAATAGCAAAGTGGTTAA | 846 | AGG | + | UUAAAUAGCAAAGUGGUUAA | 3940 |
| TGAGGAAAGAGGAGGGGGCA | 847 | AGG | - | UGAGGAAAGAGGAGGGGGCA | 3941 |
| GGGGCCTCAAAGCAGGCAGT | 848 | GGG | + | GGGGCCUCAAAGCAGGCAGU | 3942 |
| ATAGCAAAGTGGTTAAAGGA | 849 | GGG | + | AUAGCAAAGUGGUUAAAGGA | 3943 |
| ATTGTATTTCTTGTAGAGAG | 850 | GGG | + | AUUGUAUUUCUUGUAGAGAG | 3944 |
| AGGGCTTCCCTAAGCCCAAA | 851 | AGG | + | AGGGCUUCCCUAAGCCCAAA | 3945 |
| CAGGCTGTCGGAGAAGAGTG | 852 | GGG | + | CAGGCUGUCGGAGAAGAGUG | 3946 |
| TTCAAAATGTCTGGGAAGGC | 853 | CGG | + | UUCAAAAUGUCUGGGAAGGC | 3947 |
| TGATGTTGACCTAACTGACA | 854 | GGG | + | UGAUGUUGACCUAACUGACA | 3948 |
| AATCTAAGATTGGTGACTGG | 855 | CGG | + | AAUCUAAGAUUGGUGACUGG | 3949 |
| CCATTTGCGGGGCGGGCGGA | 856 | AGG | - | CCAUUUGCGGGGCGGGCGGA | 3950 |
| AGTACTTCGATGGGCTATGC | 857 | AGG | - | AGUACUUCGAUGGGCUAUGC | 3951 |
| GGTTGTTAGACTCAGCACTG | 858 | TGG | - | GGUUGUUAGACUCAGCACUG | 3952 |
| CCTCTCGTGAAAGAGAAAGA | 859 | AGG | - | CCUCUCGUGAAAGAGAAAGA | 3953 |
| AGGTAGAGTACCTGGGAGAG | 860 | AGG | + | AGGUAGAGUACCUGGGAGAG | 3954 |
| AGCTAGCAAGAGACATCTAC | 861 | GGG | + | AGCUAGCAAGAGACAUCUAC | 3955 |
| GACAGCAGTGTGGTGGCTGC | 862 | AGG | + | GACAGCAGUGUGGUGGCUGC | 3956 |
| TGAGACAGGCCGATCACTTG | 863 | AGG | - | UGAGACAGGCCGAUCACUUG | 3957 |
| TGACTACTTTAAGATGCTTT | 864 | GGG | + | UGACUACUUUAAGAUGCUUU | 3958 |
| TTGCCCCCTAGCAGATAGTC | 865 | AGG | - | UUGCCCCCUAGCAGAUAGUC | 3959 |
| AACGTCCTCTTTATAGGGAA | 866 | TGG | + | AACGUCCUCUUUAUAGGGAA | 3960 |
| CTCAGTTTCCTTGTGTGTCC | 867 | AGG | + | CUCAGUUUCCUUGUGUGUCC | 3961 |
| TTCCTTTCAAGTGCTGTTAA | 868 | AGG | - | UUCCUUUCAAGUGCUGUUAA | 3962 |
| CAAAACTCCAAGACCCTAGC | 869 | AGG | + | CAAAACUCCAAGACCCUAGC | 3963 |
| CCAGGCTGTCGGAGAAGAGT | 870 | GGG | + | CCAGGCUGUCGGAGAAGAGU | 3964 |
| GGGTGGCCCTGAATCTTCCT | 871 | AGG | + | GGGUGGCCCUGAAUCUUCCU | 3965 |
| AGCCTCACTCTCTGCTCACA | 872 | AGG | - | AGCCUCACUCUCUGCUCACA | 3966 |
| TATTTCCATTTTTTACACTC | 873 | AGG | + | UAUUUCCAUUUUUUACACUC | 3967 |
| TTTTTGTTATTACTTCTCTT | 874 | TGG | + | UUUUUGUUAUUACUUCUCUU | 3968 |
| GATGGCTTTCCAGTTCTGTG | 875 | AGG | + | GAUGGCUUUCCAGUUCUGUG | 3969 |
| TTCTTCGCATCGCGGGGGTG | 876 | GGG | - | UUCUUCGCAUCGCGGGGGUG | 3970 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| ACGATGTTCTCTGCTCTTCG | 877 | TGG | - | ACGAUGUUCUCUGCUCUUCG | 3971 |
| CTTCATCTGTTTCCATGGGA | 878 | AGG | + | CUUCAUCUGUUUCCAUGGGA | 3972 |
| TCAACACTGGGGTGTCCCCT | 879 | AGG | + | UCAACACUGGGGUGUCCCCU | 3973 |
| GGGTCTATGCTATGTTACCC | 880 | AGG | - | GGGUCUAUGCUAUGUUACCC | 3974 |
| AGAGTACCTGGGAGAGAGGG | 881 | TGG | + | AGAGUACCUGGGAGAGAGGG | 3975 |
| AGGAGCCTTCTAAAGTTCAA | 882 | AGG | + | AGGAGCCUUCUAAAGUUCAA | 3976 |
| GCTTCAATTAGGAAAAAATA | 883 | AGG | + | GCUUCAAUUAGGAAAAAAUA | 3977 |
| ATAAATCTAAGATTGGTGAC | 884 | TGG | + | AUAAAUCUAAGAUUGGUGAC | 3978 |
| ACTCAAGGGGAGCCCAGAC | 885 | AGG | - | ACUCAAGGGGAGCCCAGAC | 3979 |
| GTGGAACTTGAGGATAGACG | 886 | AGG | - | GUGGAACUUGAGGAUAGACG | 3980 |
| GTAGCAAAGTGGACAGGGCA | 887 | GGG | - | GUAGCAAAGUGGACAGGGCA | 3981 |
| AGGAGAAATTCTGAGCAGAT | 888 | GGG | - | AGGAGAAAUUCUGAGCAGAU | 3982 |
| AATAATAAAGTGTCCTTCAA | 889 | GGG | - | AAUAAUAAAGUGUCCUUCAA | 3983 |
| TTGGCGGGTCCCTGTTGCCA | 890 | GGG | - | UUGGCGGGUCCCUGUUGCCA | 3984 |
| AACAGTTGTCTTTGTGTGGA | 891 | TGG | + | AACAGUUGUCUUUGUGUGGA | 3985 |
| CTACAGACAAATGCTTTCTG | 892 | CGG | + | CUACAGACAAAUGCUUUCUG | 3986 |
| TGTAGGCTTGGCGCTATACT | 893 | AGG | - | UGUAGGCUUGGCGCUAUACU | 3987 |
| TTGTGGCACAGTGAGGGAAC | 894 | TGG | + | UUGUGGCACAGUGAGGGAAC | 3988 |
| CTTAAAGTAGTCAGAGTTAC | 895 | TGG | - | CUUAAAGUAGUCAGAGUUAC | 3989 |
| CTTGTAGTCCCAGCTACCAT | 896 | GGG | + | CUUGUAGUCCCAGCUACCAU | 3990 |
| GAGCGAGGAACATCACACAC | 897 | TGG | + | GAGCGAGGAACAUCACACAC | 3991 |
| CTCCAGGGAGCTAGTGAAAC | 898 | AGG | - | CUCCAGGGAGCUAGUGAAAC | 3992 |
| CTCCTGTTTCTCAAGCAGAT | 899 | TGG | + | CUCCUGUUUCUCAAGCAGAU | 3993 |
| GGCGCGCTTTAGATACACAC | 900 | AGG | - | GGCGCGCUUUAGAUACACAC | 3994 |
| CATAGGCTAGTGTGTGTGTT | 901 | GGG | - | CAUAGGCUAGUGUGUGUGUU | 3995 |
| TAGAACTACATGCCACAGGG | 902 | TGG | - | UAGAACUACAUGCCACAGGG | 3996 |
| CATCTCAGGGCATGCAAGGG | 903 | AGG | - | CAUCUCAGGGCAUGCAAGGG | 3997 |
| CGGAATGCTATTGACGGTGG | 904 | AGG | + | CGGAAUGCUAUUGACGGUGG | 3998 |
| TTCGCATCGCGGGGTGGGG | 905 | AGG | - | UUCGCAUCGCGGGGUGGGG | 3999 |
| ATCAGCAATTAGGGTCTAGT | 906 | TGG | - | AUCAGCAAUUAGGGUCUAGU | 4000 |
| ATTTGCGGGCGGGCGGAAG | 907 | GGG | - | AUUUGCGGGCGGGCGGAAG | 4001 |
| GGTGGAAGCTAAAGGAAGAT | 908 | GGG | + | GGUGGAAGCUAAAGGAAGAU | 4002 |
| ACTTCTTCGCATCGCGGGGG | 909 | TGG | - | ACUUCUUCGCAUCGCGGGGG | 4003 |
| CTCCTCATTACAGTGAAATA | 910 | AGG | + | CUCCUCAUUACAGUGAAAUA | 4004 |
| GGAGAAAAGCATCTCCCTTC | 911 | TGG | + | GGAGAAAAGCAUCUCCCUUC | 4005 |
| TGGTGATTAAATCATTGTGT | 912 | GGG | + | UGGUGAUUAAAUCAUUGUGU | 4006 |
| TTTTATAATTGTGATGATAA | 913 | AGG | + | UUUUAUAAUUGUGAUGAUAA | 4007 |
| ATTTAAATTCCAATACCACA | 914 | TGG | + | AUUUAAAUUCCAAUACCACA | 4008 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TGATTGTGTCCTCTGTCCCC | 915 | TGG | - | UGAUUGUGUCCUCUGUCCCC | 4009 |
| ATAATGAATTTGAGACGCCT | 916 | AGG | - | AUAAUGAAUUUGAGACGCCU | 4010 |
| TGAGAAACATAAATCCCGAG | 917 | AGG | + | UGAGAAACAUAAAUCCCGAG | 4011 |
| GTGCCCTACCCTGGGCCAGA | 918 | GGG | + | GUGCCCUACCCUGGGCCAGA | 4012 |
| TGAAATGAACTGTCCAGAAC | 919 | TGG | - | UGAAAUGAACUGUCCAGAAC | 4013 |
| CCATAGAGCGTTCCTTCCCA | 920 | TGG | - | CCAUAGAGCGUUCCUUCCCA | 4014 |
| ATGTCTCATGTAACATGTGG | 921 | TGG | + | AUGUCUCAUGUAACAUGUGG | 4015 |
| TATTATTATATGCATCATAG | 922 | GGG | + | UAUUAUUAUAUGCAUCAUAG | 4016 |
| AGAGAAAAGAGGCCAGGTGC | 923 | AGG | + | AGAGAAAAGAGGCCAGGUGC | 4017 |
| AGCAATGTTTACTGGGTGGG | 924 | TGG | + | AGCAAUGUUUACUGGGUGGG | 4018 |
| CAGTGTTGGGAAGAGTCCAT | 925 | TGG | + | CAGUGUUGGGAAGAGUCCAU | 4019 |
| TGGGACGACAGGTGTAACCC | 926 | AGG | + | UGGGACGACAGGUGUAACCC | 4020 |
| TTCAAAGATTGAGAGGGAAT | 927 | TGG | - | UUCAAAGAUUGAGAGGGAAU | 4021 |
| GGGCCAGAGGGATGCTCCAG | 928 | GGG | + | GGGCCAGAGGGAUGCUCCAG | 4022 |
| CATTTGCGGGCGGGCGGAA | 929 | GGG | - | CAUUUGCGGGCGGGCGGAA | 4023 |
| CACTGCTAGGGTTAAATGAA | 930 | AGG | + | CACUGCUAGGGUUAAAUGAA | 4024 |
| AATACACATAGAAAAATGAC | 931 | AGG | + | AAUACACAUAGAAAAAUGAC | 4025 |
| AGACCCATCCTGTTTTCTGT | 932 | TGG | - | AGACCCAUCCUGUUUUCUGU | 4026 |
| CTATGCTATGTTACCCAGGC | 933 | TGG | - | CUAUGCUAUGUUACCCAGGC | 4027 |
| TTGCTGGTGGGGTGCAAGG | 934 | TGG | - | UUGCUGGUGGGGUGCAAGG | 4028 |
| CACTGGTTACTCACCCGCTA | 935 | TGG | - | CACUGGUUACUCACCCGCUA | 4029 |
| CACCACACTGCTGTCTCTCC | 936 | TGG | - | CACCACACUGCUGUCUCUCC | 4030 |
| GGGACTAGTCATGACTACAT | 937 | TGG | + | GGGACUAGUCAUGACUACAU | 4031 |
| TTATTAGATTCCAGTGGTAC | 938 | TGG | - | UUAUUAGAUUCCAGUGGUAC | 4032 |
| CTACTTAGAAATATACCTTG | 939 | GGG | - | CUACUUAGAAAUAUACCUUG | 4033 |
| TCGAACAATAGACTTTCAAT | 940 | GGG | - | UCGAACAAUAGACUUUCAAU | 4034 |
| GACAGGGAGAATGGGGAGCG | 941 | AGG | - | GACAGGGAGAAUGGGGAGCG | 4035 |
| CCAACATCACCTTCTCAGTG | 942 | AGG | + | CCAACAUCACCUUCUCAGUG | 4036 |
| CCTCAAAGCAGGCAGTGGGA | 943 | TGG | + | CCUCAAAGCAGGCAGUGGGA | 4037 |
| ATCGGGTATGTTTACACAA | 944 | TGG | - | AUCGGGUAUGUUUACACAA | 4038 |
| TTTCGTACAATACTGGAGGC | 945 | TGG | + | UUUCGUACAAUACUGGAGGC | 4039 |
| TTCGCCCCTAGACACTGCCG | 946 | TGG | + | UUCGCCCCUAGACACUGCCG | 4040 |
| TGCCCTGAGATGGGGACAAG | 947 | GGG | + | UGCCCUGAGAUGGGGACAAG | 4041 |
| GGGAGCTAGTGAAACAGGAA | 948 | AGG | - | GGGAGCUAGUGAAACAGGAA | 4042 |
| AATCTTAAATCATCTAATTG | 949 | TGG | + | AAUCUUAAAUCAUCUAAUUG | 4043 |
| AAATCCAACAGAAAACAGGA | 950 | TGG | + | AAAUCCAACAGAAAACAGGA | 4044 |
| ATGTAAACCAGTTGTCTGTT | 951 | AGG | + | AUGUAAACCAGUUGUCUGUU | 4045 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| ACCAAATCCACTTGGCTCAA | 952 | AGG | - | ACCAAAUCCACUUGGCUCAA | 4046 |
| ATCGAACAATAGACTTTCAA | 953 | TGG | - | AUCGAACAAUAGACUUUCAA | 4047 |
| AGGCTAGTGTGTGTTGGG | 954 | TGG | - | AGGCUAGUGUGUGUUGGG | 4048 |
| GGGACTCAGCCCCTGGCAAC | 955 | AGG | + | GGGACUCAGCCCCUGGCAAC | 4049 |
| TTTGGCGGGTCCCTGTTGCC | 956 | AGG | - | UUUGGCGGGUCCCUGUUGCC | 4050 |
| TTAGCTGAGCGTGGCAGCGC | 957 | AGG | + | UUAGCUGAGCGUGGCAGCGC | 4051 |
| AGTCTAGAACTACATGCCAC | 958 | AGG | - | AGUCUAGAACUACAUGCCAC | 4052 |
| TGTCGAGAGGAGCACATTGG | 959 | CGG | + | UGUCGAGAGGAGCACAUUGG | 4053 |
| TGTGGTAGTAGTAAGATGTG | 960 | GGG | - | UGUGGUAGUAGUAAGAUGUG | 4054 |
| ACTGCTAGGGTTAAATGAAA | 961 | GGG | + | ACUGCUAGGGUUAAAUGAAA | 4055 |
| AAAAAATCCTAACAGACAAC | 962 | TGG | - | AAAAAAUCCUAACAGACAAC | 4056 |
| TGTGGCACAGTGAGGGAACT | 963 | GGG | + | UGUGGCACAGUGAGGGAACU | 4057 |
| TAATTAAAATTGGCCGGGCG | 964 | GGG | - | UAAUUAAAAUUGGCCGGGCG | 4058 |
| CCAAACCGGAATGCTATTGA | 965 | CGG | + | CCAAACCGGAAUGCUAUUGA | 4059 |
| TCTATTTCTTATCTCCTGAG | 966 | TGG | - | UCUAUUUCUUAUCUCCUGAG | 4060 |
| TCTGTCCCTGTGAGAAGGCA | 967 | GGG | + | UCUGUCCCUGUGAGAAGGCA | 4061 |
| CTCGGCTTCATCTGTTTCCA | 968 | TGG | + | CUCGGCUUCAUCUGUUUCCA | 4062 |
| GAGAGTTGGAGGCTGCAGTG | 969 | AGG | - | GAGAGUUGGAGGCUGCAGUG | 4063 |
| TAAAAGAGAAACCTTGGGCC | 970 | GGG | + | UAAAAGAGAAACCUUGGGCC | 4064 |
| TATTCCTTCCCTCCGGGTAT | 971 | AGG | + | UAUUCCUUCCCUCCGGGUAU | 4065 |
| CCAAGGTATATTTCTAAGTA | 972 | GGG | + | CCAAGGUAUAUUUCUAAGUA | 4066 |
| CAAAAATAGCCAGTGTGGCT | 973 | TGG | + | CAAAAAUAGCCAGUGUGGCU | 4067 |
| ACAGGGAGAATGGGGAGCGA | 974 | GGG | - | ACAGGGAGAAUGGGGAGCGA | 4068 |
| AATATTGGGTGTGGTGGCAC | 975 | GGG | + | AAUAUUGGGUGUGGUGGCAC | 4069 |
| TTCCTGTTTCACTAGCTCCC | 976 | TGG | + | UUCCUGUUUCACUAGCUCCC | 4070 |
| AAGTACCATATACATAATGT | 977 | GGG | - | AAGUACCAUAUACAUAAUGU | 4071 |
| AAATTATGAATGATTAAAAA | 978 | TGG | - | AAAUUAUGAAUGAUUAAAAA | 4072 |
| TTCGTACAATACTGGAGGCT | 979 | GGG | + | UUCGUACAAUACUGGAGGCU | 4073 |
| ATAAAAGAGAAACCTTGGGC | 980 | CGG | + | AUAAAAGAGAAACCUUGGGC | 4074 |
| TGTTTTTATTAGATTCCAG | 981 | TGG | - | UGUUUUUUAUUAGAUUCCAG | 4075 |
| CCTACTTAGAAATATACCTT | 982 | GGG | - | CCUACUUAGAAAUAUACCUU | 4076 |
| GCAGAGAACATCGTCTCTCC | 983 | AGG | + | GCAGAGAACAUCGUCUCUCC | 4077 |
| TGTCCCCTGGAGCATCCCTC | 984 | TGG | - | UGUCCCCUGGAGCAUCCCUC | 4078 |
| CTCTAAAGATTTGCCAGTTC | 985 | TGG | + | CUCUAAAGAUUUGCCAGUUC | 4079 |
| TTCTCAAGCAGATTGGAAGC | 986 | TGG | + | UUCUCAAGCAGAUUGGAAGC | 4080 |
| GGTAGAGTACCTGGGAGAGA | 987 | GGG | + | GGUAGAGUACCUGGGAGAGA | 4081 |
| CCAGGGATGAAGCAGGAAGC | 988 | AGG | - | CCAGGGAUGAAGCAGGAAGC | 4082 |
| CCAAACCCACGGCAGTGTCT | 989 | AGG | - | CCAAACCCACGGCAGUGUCU | 4083 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CAGGAGAGACAGCAGTGTGG | 990 | TGG | + | CAGGAGAGACAGCAGUGUGG | 4084 |
| GCCTCACTCTCTGCTCACAA | 991 | GGG | - | GCCUCACUCUCUGCUCACAA | 4085 |
| GAAAAATGACAGGAAATGAC | 992 | GGG | + | GAAAAAUGACAGGAAAUGAC | 4086 |
| CAAGCCACACTGGCTATTTT | 993 | TGG | - | CAAGCCACACUGGCUAUUUU | 4087 |
| TCGGATGACTGCACTCACCT | 994 | CGG | + | UCGGAUGACUGCACUCACCU | 4088 |
| AGTAGGTTGCCAAGCCACAC | 995 | TGG | - | AGUAGGUUGCCAAGCCACAC | 4089 |
| ACTCTCTTCAGTGACATACA | 996 | TGG | + | ACUCUCUUCAGUGACAUACA | 4090 |
| AAAAGGGCCACTCTGCTGTG | 997 | AGG | - | AAAAGGGCCACUCUGCUGUG | 4091 |
| ATGTTGGAGCAAAGATTCGA | 998 | AGG | - | AUGUUGGAGCAAAGAUUCGA | 4092 |
| CAACATCACCTTCTCAGTGA | 999 | GGG | + | CAACAUCACCUUCUCAGUGA | 4093 |
| TAATAATAAAGTGTCCTTCA | 1000 | AGG | - | UAAUAAUAAAGUGUCCUUCA | 4094 |
| AAAAAAGTGGTTGCAGAACA | 1001 | GGG | + | AAAAAAGUGGUUGCAGAACA | 4095 |
| AATGGAGTTTTGGTGGTGTA | 1002 | GGG | + | AAUGGAGUUUUGGUGGUGUA | 4096 |
| TTAAAGTAGTCAGAGTTACT | 1003 | GGG | - | UUAAAGUAGUCAGAGUUACU | 4097 |
| GGTCTAATTTTAAAATGCTT | 1004 | TGG | - | GGUCUAAUUUUAAAAUGCUU | 4098 |
| TAAATGAGAAAAGCATAACA | 1005 | AGG | + | UAAAUGAGAAAAGCAUAACA | 4099 |
| AATTAGGGTCTAGTTGGCTG | 1006 | GGG | - | AAUUAGGGUCUAGUUGGCUG | 4100 |
| GGGAGCGAGGGCTTAATGTT | 1007 | TGG | - | GGGAGCGAGGGCUUAAUGUU | 4101 |
| TGTCTTTCGCTTAGCATATG | 1008 | TGG | + | UGUCUUUCGCUUAGCAUAUG | 4102 |
| TTGGAGCAAAGATTCGAAGG | 1009 | AGG | - | UUGGAGCAAAGAUUCGAAGG | 4103 |
| TTAACACAATTAGCTGAGCG | 1010 | TGG | + | UUAACACAAUUAGCUGAGCG | 4104 |
| TTGTACGAAATAAATTTCTG | 1011 | TGG | - | UUGUACGAAAUAAAUUUCUG | 4105 |
| GAAAGCAGGCCTCTCTTCCT | 1012 | TGG | + | GAAAGCAGGCCUCUCUUCCU | 4106 |
| CATGAGATGCATCCACCCTG | 1013 | TGG | + | CAUGAGAUGCAUCCACCCUG | 4107 |
| TCAGCACTGTGGAAGAAACA | 1014 | AGG | - | UCAGCACUGUGGAAGAAACA | 4108 |
| CTTCTTCGCATCGCGGGGGT | 1015 | GGG | - | CUUCUUCGCAUCGCGGGGGU | 4109 |
| AACCAGTGGAACAAGGGCCC | 1016 | AGG | + | AACCAGUGGAACAAGGGCCC | 4110 |
| CTTCCCTCCGGGTATAGGGC | 1017 | AGG | + | CUUCCCUCCGGGUAUAGGGC | 4111 |
| ATCCCTGACTATCTGCTAGG | 1018 | GGG | + | AUCCCUGACUAUCUGCUAGG | 4112 |
| TCGGCTTCATCTGTTTCCAT | 1019 | GGG | + | UCGGCUUCAUCUGUUUCCAU | 4113 |
| AGGCAAAGAAATTCTATGGA | 1020 | CGG | + | AGGCAAAGAAAUUCUAUGGA | 4114 |
| CCTGGTGGCCATAGGATGGT | 1021 | AGG | + | CCUGGUGGCCAUAGGAUGGU | 4115 |
| CAGCGCGTGGTCCCTGCCTC | 1022 | GGG | + | CAGCGCGUGGUCCCUGCCUC | 4116 |
| TGGGGGTGGAGCCCGAGGCA | 1023 | GGG | - | UGGGGGUGGAGCCCGAGGCA | 4117 |
| GAGAAACCTTGGGCCGGGCA | 1024 | TGG | + | GAGAAACCUUGGGCCGGGCA | 4118 |
| CTGACTACTTTAAGATGCTT | 1025 | TGG | + | CUGACUACUUUAAGAUGCUU | 4119 |
| GATGGATGGCGAAGCCACTC | 1026 | AGG | + | GAUGGAUGGCGAAGCCACUC | 4120 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| GCTTTGGTGGTAAAAAATAC | 1027 | AGG | + | GCUUUGGUGGUAAAAAAUAC | 4121 |
| CCCAAGGTATATTTCTAAGT | 1028 | AGG | + | CCCAAGGUAUAUUUCUAAGU | 4122 |
| GGCTAGTGTGTGTGTTGGGT | 1029 | GGG | - | GGCUAGUGUGUGUGUUGGGU | 4123 |
| CCTCAGCCTCCCATGGTAGC | 1030 | TGG | - | CCUCAGCCUCCCAUGGUAGC | 4124 |
| GCAGCGCGTGGTCCCTGCCT | 1031 | CGG | + | GCAGCGCGUGGUCCCUGCCU | 4125 |
| TATTAGATTCCAGTGGTACT | 1032 | GGG | - | UAUUAGAUUCCAGUGGUACU | 4126 |
| GAAAACCTAGTTTAGTCTCT | 1033 | TGG | - | GAAAACCUAGUUUAGUCUCU | 4127 |
| CTGGAGTCGGGCTTGGTAGG | 1034 | TGG | - | CUGGAGUCGGGCUUGGUAGG | 4128 |
| ATTAATTAAAATTGGCCGGG | 1035 | CGG | - | AUUAAUUAAAAUUGGCCGGG | 4129 |
| AGATTCATTCATTCATTCCT | 1036 | TGG | + | AGAUUCAUUCAUUCAUUCCU | 4130 |
| TTCACTTAGGCGTTGGATGA | 1037 | AGG | + | UUCACUUAGGCGUUGGAUGA | 4131 |
| TTTGAGGCAAAGAAATTCTA | 1038 | TGG | + | UUUGAGGCAAAGAAAUUCUA | 4132 |
| GAGACAGTCTGGCACATTTG | 1039 | TGG | + | GAGACAGUCUGGCACAUUUG | 4133 |
| CTCAGCCTCCCATGGTAGCT | 1040 | GGG | - | CUCAGCCUCCCAUGGUAGCU | 4134 |
| CTCCCTTGCATGCCCTGAGA | 1041 | TGG | + | CUCCCUUGCAUGCCCUGAGA | 4135 |
| TTAATTAAAATTGGCCGGGC | 1042 | GGG | - | UUAAUUAAAAUUGGCCGGGC | 4136 |
| TAGTCATGACTAGTCCCATG | 1043 | TGG | - | UAGUCAUGACUAGUCCCAUG | 4137 |
| TAGTCACATTTCTCAGTATT | 1044 | TGG | + | UAGUCACAUUUCUCAGUAUU | 4138 |
| TGAGGAGACACTGCCACTGA | 1045 | AGG | - | UGAGGAGACACUGCCACUGA | 4139 |
| CTGAGCAAACCTAGAGTCCA | 1046 | AGG | - | CUGAGCAAACCUAGAGUCCA | 4140 |
| AGCTTCAGGAGGGAGGGGGC | 1047 | AGG | + | AGCUUCAGGAGGGAGGGGGC | 4141 |
| AACGTTTCTATCATCGCAGA | 1048 | AGG | - | AACGUUUCUAUCAUCGCAGA | 4142 |
| TGTATGACGGCGGGGCGCGG | 1049 | TGG | + | UGUAUGACGGCGGGGCGCGG | 4143 |
| TGGGCCAGAGGGATGCTCCA | 1050 | GGG | + | UGGGCCAGAGGGAUGCUCCA | 4144 |
| ATTAGGGTCTAGTTGGCTGG | 1051 | GGG | - | AUUAGGGUCUAGUUGGCUGG | 4145 |
| AGAAAATGACAGGAAATGA | 1052 | CGG | + | AGAAAAUGACAGGAAAUGA | 4146 |
| GTGTGATATTCCTTCCCTCC | 1053 | GGG | + | GUGUGAUAUUCCUUCCCUCC | 4147 |
| TTGTGTATGACGGCGGGGCG | 1054 | CGG | + | UUGUGUAUGACGGCGGGGCG | 4148 |
| CCAATCTTTGTGCATGGCTG | 1055 | GGG | + | CCAAUCUUUGUGCAUGGCUG | 4149 |
| TGCAAAGGAAATCAGCAATT | 1056 | AGG | - | UGCAAAGGAAAUCAGCAAUU | 4150 |
| AGAAAGCCCCTGGTGGCCAT | 1057 | AGG | + | AGAAAGCCCCUGGUGGCCAU | 4151 |
| GCTATTAAAAAGGATGAGGT | 1058 | CGG | + | GCUAUUAAAAAGGAUGAGGU | 4152 |
| TATGGCCAGCTTCAGGAGGG | 1059 | AGG | + | UAUGGCCAGCUUCAGGAGGG | 4153 |
| TTATCAGTCATTTTTTGTAT | 1060 | GGG | + | UUAUCAGUCAUUUUUUGUAU | 4154 |
| CCATAGGATGGTAGGGATTT | 1061 | AGG | + | CCAUAGGAUGGUAGGGAUUU | 4155 |
| CCACTGAAGGACAGAAGCAG | 1062 | TGG | - | CCACUGAAGGACAGAAGCAG | 4156 |
| AGGGTTTCCTCACAGCAGAG | 1063 | TGG | + | AGGGUUUCCUCACAGCAGAG | 4157 |
| GCCAGCTCGATTTCAACACT | 1064 | GGG | + | GCCAGCUCGAUUUCAACACU | 4158 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| AAGTTCCACAAAGCCTCACA | 1065 | TGG | + | AAGUUCCACAAAGCCUCACA | 4159 |
| ATTATCAGTCATTTTTGTA | 1066 | TGG | + | AUUAUCAGUCAUUUUUGUA | 4160 |
| CTATCTCCATGACCCCTTGA | 1067 | AGG | + | CUAUCUCCAUGACCCCUUGA | 4161 |
| GACTACTTTAAGATGCTTTG | 1068 | GGG | + | GACUACUUUAAGAUGCUUUG | 4162 |
| GACTGGTCCTTTTGGGCTTA | 1069 | GGG | - | GACUGGUCCUUUUGGGCUUA | 4163 |
| ATGTGGTAGTAGTAAGATGT | 1070 | GGG | - | AUGUGGUAGUAGUAAGAUGU | 4164 |
| TACATGGCCTTTGAGCCAAG | 1071 | TGG | + | UACAUGGCCUUUGAGCCAAG | 4165 |
| CATCAACCGGCGGAACGAGG | 1072 | TGG | + | CAUCAACCGGCGGAACGAGG | 4166 |
| GGACTGGTCCTTTTGGGCTT | 1073 | AGG | - | GGACUGGUCCUUUUGGGCUU | 4167 |
| TGGTGTATCTGCTTCAGCAT | 1074 | TGG | + | UGGUGUAUCUGCUUCAGCAU | 4168 |
| AAATATTGGGTGTGGTGGCA | 1075 | CGG | + | AAAUAUUGGGUGUGGUGGCA | 4169 |
| GAAACATAAATCCCGAGAGG | 1076 | TGG | + | GAAACAUAAAUCCCGAGAGG | 4170 |
| CTACCTCCTGCCCACCTCTC | 1077 | GGG | - | CUACCUCCUGCCCACCUCUC | 4171 |
| AGATGTCGAGAGGAGCACAT | 1078 | TGG | + | AGAUGUCGAGAGGAGCACAU | 4172 |
| CTCTGTAACACACGCCTGCT | 1079 | GGG | + | CUCUGUAACACACGCCUGCU | 4173 |
| CTGGGCCAGAGGGATGCTCC | 1080 | AGG | + | CUGGGCCAGAGGGAUGCUCC | 4174 |
| AAAATAGGTTTAAAAATATT | 1081 | GGG | + | AAAAUAGGUUUAAAAAUAUU | 4175 |
| AAACCTTGGGCCGGGCATGG | 1082 | TGG | + | AAACCUUGGGCCGGGCAUGG | 4176 |
| CAGAGCAAATGGTGAGCTGA | 1083 | GGG | + | CAGAGCAAAUGGUGAGCUGA | 4177 |
| ACCTTCATTGCTACTTGAGA | 1084 | AGG | + | ACCUUCAUUGCUACUUGAGA | 4178 |
| CTAGTTTAGTCTCTTGGATT | 1085 | GGG | - | CUAGUUUAGUCUCUUGGAUU | 4179 |
| AGTCTGGCACATTTGTGGCT | 1086 | TGG | + | AGUCUGGCACAUUUGUGGCU | 4180 |
| ACATATGAGCATTTCCAGTT | 1087 | TGG | + | ACAUAUGAGCAUUUCCAGUU | 4181 |
| CCCTACTTAGAAATATACCT | 1088 | TGG | - | CCCUACUUAGAAAUAUACCU | 4182 |
| ATATGGTACCTCAGAACCCC | 1089 | AGG | + | AUAUGGUACCUCAGAACCCC | 4183 |
| GAAACCTTGTTGTCACAGC | 1090 | AGG | - | GAAACCUUGUUGUCACAGC | 4184 |
| TGGTGGAAGCTAAAGGAAGA | 1091 | TGG | + | UGGUGGAAGCUAAAGGAAGA | 4185 |
| CATATGAGCATTTCCAGTTT | 1092 | GGG | + | CAUAUGAGCAUUUCCAGUUU | 4186 |
| TCGCCCCTAGACACTGCCGT | 1093 | GGG | + | UCGCCCCUAGACACUGCCGU | 4187 |
| CATCCCTGACTATCTGCTAG | 1094 | GGG | + | CAUCCCUGACUAUCUGCUAG | 4188 |
| GCAAAGGAAATCAGCAATTA | 1095 | GGG | - | GCAAAGGAAAUCAGCAAUUA | 4189 |
| CCAGAGCAAATGGTGAGCTG | 1096 | AGG | + | CCAGAGCAAAUGGUGAGCUG | 4190 |
| TTTGTTTTGTTCAAAATGTC | 1097 | TGG | + | UUUGUUUUGUUCAAAAUGUC | 4191 |
| GTGTCCTGCCCTATACCCGG | 1098 | AGG | - | GUGUCCUGCCCUAUACCCGG | 4192 |
| GTAGACAGCCTGGGGTTCTG | 1099 | AGG | - | GUAGACAGCCUGGGGUUCUG | 4193 |
| TAATTTTATGCTTTTCTTCT | 1100 | CGG | + | UAAUUUUAUGCUUUUCUUCU | 4194 |
| CCCCAGTGTTGAAATCGAGC | 1101 | TGG | - | CCCCAGUGUUGAAAUCGAGC | 4195 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TGGGGTTTGCAGAATGACCT | 1102 | TGG | - | UGGGGUUUGCAGAAUGACCU | 4196 |
| CCTAAATCCCTACCATCCTA | 1103 | TGG | - | CCUAAAUCCCUACCAUCCUA | 4197 |
| CAAACCCACGGCAGTGTCTA | 1104 | GGG | - | CAAACCCACGGCAGUGUCUA | 4198 |
| CAGTGGAAGTGTTAAGTGGC | 1105 | TGG | - | CAGUGGAAGUGUUAAGUGGC | 4199 |
| GTGATGATAAAGGCTTTGTG | 1106 | TGG | + | GUGAUGAUAAAGGCUUUGUG | 4200 |
| TATGGGTTTCTATAATCTGT | 1107 | GGG | + | UAUGGGUUUCUAUAAUCUGU | 4201 |
| ACTGCTGTGGAGAAAACACA | 1108 | AGG | - | ACUGCUGUGGAGAAAACACA | 4202 |
| CCCCATCTCAGGGCATGCAA | 1109 | GGG | - | CCCCAUCUCAGGGCAUGCAA | 4203 |
| AATGTGGTAGTAGTAAGATG | 1110 | TGG | - | AAUGUGGUAGUAGUAAGAUG | 4204 |
| TATTATTTCAAAGATTGAGA | 1111 | GGG | - | UAUUAUUUCAAAGAUUGAGA | 4205 |
| ATATTATTTCAAAGATTGAG | 1112 | AGG | - | AUAUUAUUUCAAAGAUUGAG | 4206 |
| AAACCCACGGCAGTGTCTAG | 1113 | GGG | - | AAACCCACGGCAGUGUCUAG | 4207 |
| AGGGATGCTCCAGGGGACAG | 1114 | AGG | + | AGGGAUGCUCCAGGGGACAG | 4208 |
| CAGAGGTGGGACTCAGCCCC | 1115 | TGG | + | CAGAGGUGGGACUCAGCCCC | 4209 |
| AGCAACATATGACACAGTTC | 1116 | AGG | + | AGCAACAUAUGACACAGUUC | 4210 |
| AGTGAGGCTTCCATTTCAGA | 1117 | AGG | + | AGUGAGGCUUCCAUUUCAGA | 4211 |
| TTCAGGGAAGAAGAGGTGAA | 1118 | AGG | + | UUCAGGGAAGAAGAGGUGAA | 4212 |
| TTTCAGGAGAGAAAGGGTCA | 1119 | AGG | + | UUUCAGGAGAGAAAGGGUCA | 4213 |
| TCCCCATCTCAGGGCATGCA | 1120 | AGG | - | UCCCCAUCUCAGGGCAUGCA | 4214 |
| AGCCCCTGGTGGCCATAGGA | 1121 | TGG | + | AGCCCCUGGUGGCCAUAGGA | 4215 |
| GAATCGTCTGATTGCTGGAG | 1122 | AGG | + | GAAUCGUCUGAUUGCUGGAG | 4216 |
| AAGACATAGGAAGCCAGGTG | 1123 | CGG | - | AAGACAUAGGAAGCCAGGUG | 4217 |
| GCCTCTCTTCCTTGGACTCT | 1124 | AGG | + | GCCUCUCUUCCUUGGACUCU | 4218 |
| GGAGCGAGGGCTTAATGTTT | 1125 | GGG | - | GGAGCGAGGGCUUAAUGUUU | 4219 |
| ACATTGCATAAATCTAAGAT | 1126 | TGG | + | ACAUUGCAUAAAUCUAAGAU | 4220 |
| GGGAGCCCAGACAGGCTGGA | 1127 | TGG | - | GGGAGCCCAGACAGGCUGGA | 4221 |
| AAACATAAATCCCGAGAGGT | 1128 | TGG | + | AAACAUAAAUCCCGAGAGGU | 4222 |
| TCTACCTCCTGCCCACCTCT | 1129 | CGG | - | UCUACCUCCUGCCCACCUCU | 4223 |
| GGCCATCAACCGGCGGAACG | 1130 | AGG | + | GGCCAUCAACCGGCGGAACG | 4224 |
| AGGCGTTGAGAGGAGTGCGC | 1131 | CGG | + | AGGCGUUGAGAGGAGUGCGC | 4225 |
| TGTCCTGCCCTATACCCGGA | 1132 | GGG | - | UGUCCUGCCCUAUACCCGGA | 4226 |
| ATGCTTTGGTAAACATTTCT | 1133 | AGG | - | AUGCUUUGGUAAACAUUUCU | 4227 |
| GTGGGCCATGTGAGGCTTTG | 1134 | TGG | - | GUGGGCCAUGUGAGGCUUUG | 4228 |
| GGCGGGATAATCACTTGAGC | 1135 | TGG | - | GGCGGGAUAAUCACUUGAGC | 4229 |
| CTGGTGACAATATAATTCCA | 1136 | AGG | + | CUGGUGACAAUAUAAUUCCA | 4230 |
| GGCCAGCTTCAGGAGGGAGG | 1137 | GGG | + | GGCCAGCUUCAGGAGGGAGG | 4231 |
| TAGGACTGGGCCTTCTGAAA | 1138 | TGG | - | UAGGACUGGGCCUUCUGAAA | 4232 |
| TCCCTTGCATGCCCTGAGAT | 1139 | GGG | + | UCCCUUGCAUGCCCUGAGAU | 4233 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| GTCCCCTTGTCCCCATCTCA | 1140 | GGG | - | GUCCCCUUGUCCCCAUCUCA | 4234 |
| TGTGTGATATTCCTTCCCTC | 1141 | CGG | + | UGUGUGAUAUUCCUUCCCUC | 4235 |
| CTGCCCTATACCCGGAGGGA | 1142 | AGG | - | CUGCCCUAUACCCGGAGGGA | 4236 |
| CTTAAAATCCAACAGAAAAC | 1143 | AGG | + | CUUAAAAUCCAACAGAAAAC | 4237 |
| ACATAGGAAGCCAGGTGCGG | 1144 | TGG | - | ACAUAGGAAGCCAGGUGCGG | 4238 |
| GTGGCAGTGGAAGTGTTAAG | 1145 | TGG | - | GUGGCAGUGGAAGUGUUAAG | 4239 |
| CCCTTGCATGCCCTGAGATG | 1146 | GGG | + | CCCUUGCAUGCCCUGAGAUG | 4240 |
| GGTCCCCTTGTCCCCATCTC | 1147 | AGG | - | GGUCCCCUUGUCCCCAUCUC | 4241 |
| ATAAATCCCGAGAGGTGGGC | 1148 | AGG | + | AUAAAUCCCGAGAGGUGGGC | 4242 |
| TATGAGCATTTCCAGTTTGG | 1149 | GGG | + | UAUGAGCAUUUCCAGUUUGG | 4243 |
| TATTTGTAATACCCCCAAAC | 1150 | TGG | - | UAUUUGUAAUACCCCCAAAC | 4244 |
| GCCCAGGAGAGACAGCAGTG | 1151 | TGG | + | GCCCAGGAGAGACAGCAGUG | 4245 |
| TCACTTTTTAAATAGCAAAG | 1152 | TGG | + | UCACUUUUUAAAUAGCAAAG | 4246 |
| TCTGTGCTCTGCAAATGACC | 1153 | TGG | + | UCUGUGCUCUGCAAAUGACC | 4247 |
| AGGTCATTCTGCAAACCCCA | 1154 | AGG | + | AGGUCAUUCUGCAAACCCCA | 4248 |
| TAGGTTTGTCTATAATGTAC | 1155 | AGG | - | UAGGUUUGUCUAUAAUGUAC | 4249 |
| ACCTTCTCAAGTAGCAATGA | 1156 | AGG | - | ACCUUCUCAAGUAGCAAUGA | 4250 |
| GTATGGGTTTCTATAATCTG | 1157 | TGG | + | GUAUGGGUUUCUAUAAUCUG | 4251 |
| TACCAATCTTTGTGCATGGC | 1158 | TGG | + | UACCAAUCUUUGUGCAUGGC | 4252 |
| GACGTGCAGAAGGCGTTGAG | 1159 | AGG | + | GACGUGCAGAAGGCGUUGAG | 4253 |
| CTCACTTATCTCAAGGTTCA | 1160 | TGG | + | CUCACUUAUCUCAAGGUUCA | 4254 |
| TTCAGGAGAGAAAGGGTCAA | 1161 | GGG | + | UUCAGGAGAGAAAGGGUCAA | 4255 |
| TAGGACTTCTTCGCATCGCG | 1162 | GGG | - | UAGGACUUCUUCGCAUCGCG | 4256 |
| CTGCTCTTCGTGGACATTTC | 1163 | TGG | - | CUGCUCUUCGUGGACAUUUC | 4257 |
| AGAAATAGAGAAAAGAGGCC | 1164 | AGG | + | AGAAAUAGAGAAAAGAGGCC | 4258 |
| ACTGGTTACTCACCCGCTAT | 1165 | GGG | - | ACUGGUUACUCACCCGCUAU | 4259 |
| AGGACTTCTTCGCATCGCGG | 1166 | GGG | - | AGGACUUCUUCGCAUCGCGG | 4260 |
| CAACACGAATCTGAACAAAC | 1167 | AGG | - | CAACACGAAUCUGAACAAAC | 4261 |
| AGAAGTGATATGCTTCAATT | 1168 | AGG | + | AGAAGUGAUAUGCUUCAAUU | 4262 |
| GATAATCACTTGAGCTGGGG | 1169 | AGG | - | GAUAAUCACUUGAGCUGGGG | 4263 |
| ATATGAGCATTTCCAGTTTG | 1170 | GGG | + | AUAUGAGCAUUUCCAGUUUG | 4264 |
| CGGGATAATCACTTGAGCTG | 1171 | GGG | - | CGGGAUAAUCACUUGAGCUG | 4265 |
| CGGGAGAATCGTCTGATTGC | 1172 | TGG | + | CGGGAGAAUCGUCUGAUUGC | 4266 |
| TCACCAAAGGAGAAGCAACA | 1173 | TGG | - | UCACCAAAGGAGAAGCAACA | 4267 |
| GGGGAGGAGGATGATCTGTT | 1174 | TGG | - | GGGGAGGAGGAUGAUCUGUU | 4268 |
| CGTTGGATGAAGGTTCATTT | 1175 | CGG | + | CGUUGGAUGAAGGUUCAUUU | 4269 |
| AGGTCAATTCTGCCCATAGC | 1176 | GGG | + | AGGUCAAUUCUGCCCAUAGC | 4270 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| ATGGCCAGCTTCAGGAGGGA | 1177 | GGG | + | AUGGCCAGCUUCAGGAGGGA | 4271 |
| AAATTTATTTCGTACAATAC | 1178 | TGG | + | AAAUUUAUUUCGUACAAUAC | 4272 |
| GAAGAGCGCACGATAGACGC | 1179 | CGG | + | GAAGAGCGCACGAUAGACGC | 4273 |
| CCACTGCTTCTGTCCTTCAG | 1180 | TGG | + | CCACUGCUUCUGUCCUUCAG | 4274 |
| CAAAGAAATTCTATGGACGG | 1181 | AGG | + | CAAAGAAAUUCUAUGGACGG | 4275 |
| AAGGATGAGGTCGGGTGCAG | 1182 | TGG | + | AAGGAUGAGGUCGGGUGCAG | 4276 |
| GATCAAAGGGTATGATCTAA | 1183 | TGG | + | GAUCAAAGGGUAUGAUCUAA | 4277 |
| TTTTGTGTCCACTGTAGGCT | 1184 | TGG | - | UUUUGUGUCCACUGUAGGCU | 4278 |
| AGGGAAGGAATATCACACAG | 1185 | GGG | - | AGGGAAGGAAUAUCACACAG | 4279 |
| CTAGGACTTCTTCGCATCGC | 1186 | GGG | - | CUAGGACUUCUUCGCAUCGC | 4280 |
| ACCAATCTTTGTGCATGGCT | 1187 | GGG | + | ACCAAUCUUUGUGCAUGGCU | 4281 |
| TTGGCGACAACATATTGTAA | 1188 | TGG | - | UUGGCGACAACAUAUUGUAA | 4282 |
| TGGCCAGCTTCAGGAGGGAG | 1189 | GGG | + | UGGCCAGCUUCAGGAGGGAG | 4283 |
| GGGAGGAGGATGATCTGTTT | 1190 | GGG | - | GGGAGGAGGAUGAUCUGUUU | 4284 |
| TAGGGAAGCCCTCACTGAGA | 1191 | AGG | - | UAGGGAAGCCCUCACUGAGA | 4285 |
| AAGGTCAATTCTGCCCATAG | 1192 | CGG | + | AAGGUCAAUUCUGCCCAUAG | 4286 |
| ATCTAATTGTGGCACAGTGA | 1193 | GGG | + | AUCUAAUUGUGGCACAGUGA | 4287 |
| TACTGGAGGGGGCAGCGCG | 1194 | TGG | + | UACUGGAGGGGGCAGCGCG | 4288 |
| CATCTAATTGTGGCACAGTG | 1195 | AGG | + | CAUCUAAUUGUGGCACAGUG | 4289 |
| GCTCTGAAGCACTTGAAATG | 1196 | TGG | + | GCUCUGAAGCACUUGAAAUG | 4290 |
| CTATGTCTTATAATTGAGTC | 1197 | AGG | + | CUAUGUCUUAUAAUUGAGUC | 4291 |
| TTTATTTCGTACAATACTGG | 1198 | AGG | + | UUUAUUUCGUACAAUACUGG | 4292 |
| AATCCCGAGAGGTGGGCAGG | 1199 | AGG | + | AAUCCCGAGAGGUGGGCAGG | 4293 |
| GTATAGCGCCAAGCCTACAG | 1200 | TGG | + | GUAUAGCGCCAAGCCUACAG | 4294 |
| AACCGGAATGCTATTGACGG | 1201 | TGG | + | AACCGGAAUGCUAUUGACGG | 4295 |
| TTGTTTTGTTCAAAATGTCT | 1202 | GGG | + | UUGUUUUGUUCAAAAUGUCU | 4296 |
| TCTAGGACTTCTTCGCATCG | 1203 | CGG | - | UCUAGGACUUCUUCGCAUCG | 4297 |
| CCTAGTTTAGTCTCTTGGAT | 1204 | TGG | - | CCUAGUUUAGUCUCUUGGAU | 4298 |
| TTTAAATTCCAATACCACAT | 1205 | GGG | + | UUUAAAUUCCAAUACCACAU | 4299 |
| AGCATCCTTTGAACTTTAGA | 1206 | AGG | - | AGCAUCCUUUGAACUUUAGA | 4300 |
| GCGGGATAATCACTTGAGCT | 1207 | GGG | - | GCGGGAUAAUCACUUGAGCU | 4301 |
| ACTCTGTAACACACGCCTGC | 1208 | TGG | + | ACUCUGUAACACACGCCUGC | 4302 |
| AAGCGTTTTGCGCAGGAGAG | 1209 | TGG | + | AAGCGUUUUGCGCAGGAGAG | 4303 |
| AGAGCTTTGGCCGAGGACGA | 1210 |  | + | AGAGCUUUGGCCGAGGACGA | 4304 |
| AGAGACAGAAAGTCGATCCG | 1211 | TGG | - | AGAGACAGAAAGUCGAUCCG | 4305 |
| CTATTAAAAGGATGAGGTC | 1212 | GGG | + | CUAUUAAAAGGAUGAGGUC | 4306 |
| TGAAGGACAGAAGCAGTGGA | 1213 | GGG | - | UGAAGGACAGAAGCAGUGGA | 4307 |
| CTGAAGGACAGAAGCAGTGG | 1214 | AGG | - | CUGAAGGACAGAAGCAGUGG | 4308 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TACCTTATTTCACTGTAATG | 1215 | AGG | - | UACCUUAUUUCACUGUAAUG | 4309 |
| AATTAGACCTGCCCAGTTAG | 1216 | TGG | + | AAUUAGACCUGCCCAGUUAG | 4310 |
| CTGATATCCACTAACTGGGC | 1217 | AGG | - | CUGAUAUCCACUAACUGGGC | 4311 |
| ATTGCTGATATCCACTAACT | 1218 | GGG | - | AUUGCUGAUAUCCACUAACU | 4312 |
| CAGGCTGTCAGGAGGCATGA | 1219 | AGG | + | CAGGCUGUCAGGAGGCAUGA | 4313 |
| AAATATCTTACTTCATTACT | 1220 | TGG | + | AAAUAUCUUACUUCAUUACU | 4314 |
| TTTTCTGGTATGATACTATT | 1221 | AGG | + | UUUUCUGGUAUGAUACUAUU | 4315 |
| CTGGTATGATACTATTAGGT | 1222 | TGG | + | CUGGUAUGAUACUAUUAGGU | 4316 |
| ATCTCTTGATGAACAGCTAC | 1223 | AGG | + | AUCUCUUGAUGAACAGCUAC | 4317 |
| GATGAACAGCTACAGGCCTG | 1224 | AGG | + | GAUGAACAGCUACAGGCCUG | 4318 |
| ACAGCTACAGGCCTGAGGTT | 1225 | AGG | + | ACAGCUACAGGCCUGAGGUU | 4319 |
| CTACATGAACTCCTAACCTC | 1226 | AGG | - | CUACAUGAACUCCUAACCUC | 4320 |
| GTCCTTCAGCCTCAACTTAT | 1227 | AGG | + | GUCCUUCAGCCUCAACUUAU | 4321 |
| CACCTATAAGTTGAGGCTGA | 1228 | AGG | - | CACCUAUAAGUUGAGGCUGA | 4322 |
| ACACAGTCACCTATAAGTTG | 1229 | AGG | - | ACACAGUCACCUAUAAGUUG | 4323 |
| TCGTTAACTCCGCAGAGCAC | 1230 | AGG | + | UCGUUAACUCCGCAGAGCAC | 4324 |
| CGTTAACTCCGCAGAGCACA | 1231 | GGG | + | CGUUAACUCCGCAGAGCACA | 4325 |
| GGATGGTGCCCTGTGCTCTG | 1232 | CGG | - | GGAUGGUGCCCUGUGCUCUG | 4326 |
| CTATCCCCAGCACCTAAAGC | 1233 | TGG | + | CUAUCCCCAGCACCUAAAGC | 4327 |
| TATCCCCAGCACCTAAAGCT | 1234 | GGG | + | UAUCCCCAGCACCUAAAGCU | 4328 |
| GGTAGGGATTTAGGAAAAAG | 1235 | AGG | + | GGUAGGGAUUUAGGAAAAAG | 4329 |
| AGGGATTTAGGAAAAAGAGG | 1236 | AGG | + | AGGGAUUUAGGAAAAAGAGG | 4330 |
| TTTAGGAAAAAGAGGAGGCT | 1237 | TGG | + | UUUAGGAAAAAGAGGAGGCU | 4331 |
| AGGAAAAAGAGGAGGCTTGG | 1238 | AGG | + | AGGAAAAAGAGGAGGCUUGG | 4332 |
| GATCATCTAGCACATGTTTT | 1239 | TGG | + | GAUCAUCUAGCACAUGUUUU | 4333 |
| CTAGCACATGTTTTTGGTTT | 1240 | TGG | + | CUAGCACAUGUUUUUGGUUU | 4334 |
| TATCTGGTGGGTAGCTACTT | 1241 | AGG | + | UAUCUGGUGGGUAGCUACUU | 4335 |
| GGTGGGTAGCTACTTAGGAG | 1242 | TGG | + | GGUGGGUAGCUACUUAGGAG | 4336 |
| CCTGCTTCCTGCTTCATCCC | 1243 | TGG | + | CCUGCUUCCUGCUUCAUCCC | 4337 |
| GAAGGTGCCAGGGATGAAGC | 1244 | AGG | - | GAAGGUGCCAGGGAUGAAGC | 4338 |
| TTGCCCCTTCCGCCATGGGA | 1245 | GGG | - | UUGCCCCUUCCGCCAUGGGA | 4339 |
| CTTGCCCCTTCCGCCATGGG | 1246 | AGG | - | CUUGCCCCUUCCGCCAUGGG | 4340 |
| TAGCTTGCCCCTTCCGCCAT | 1247 | GGG | - | UAGCUUGCCCCUUCCGCCAU | 4341 |
| CTAGCTTGCCCCTTCCGCCA | 1248 | TGG | - | CUAGCUUGCCCCUUCCGCCA | 4342 |
| ACTAACATTCACATCATAGC | 1249 | AGG | + | ACUAACAUUCACAUCAUAGC | 4343 |
| CTAACATTCACATCATAGCA | 1250 | GGG | + | CUAACAUUCACAUCAUAGCA | 4344 |
| TCACATCATAGCAGGGACTC | 1251 | TGG | + | UCACAUCAUAGCAGGGACUC | 4345 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CATCATAGCAGGGACTCTGG | 1252 | TGG | + | CAUCAUAGCAGGGACUCUGG | 4346 |
| GGGAGCGCCATCTTTGTAGC | 1253 | AGG | - | GGGAGCGCCAUCUUUGUAGC | 4347 |
| TCAAGTAGCAATGAAGGTTA | 1254 | GGG | - | UCAAGUAGCAAUGAAGGUUA | 4348 |
| CTCAAGTAGCAATGAAGGTT | 1255 | AGG | - | CUCAAGUAGCAAUGAAGGUU | 4349 |
| GGAAGACCTGTGCATTTTTG | 1256 | TGG | + | GGAAGACCUGUGCAUUUUUG | 4350 |
| AACTGTCCACAAAAATGCAC | 1257 | AGG | - | AACUGUCCACAAAAAUGCAC | 4351 |
| ATTTATTTTTAGCAGAGACA | 1258 | GGG | + | AUUUAUUUUUAGCAGAGACA | 4352 |
| GGTTGGTGCAAGAGTAACTG | 1259 | CGG | + | GGUUGGUGCAAGAGUAACUG | 4353 |
| ATATCGGCTCACTGCAACCC | 1260 | GGG | + | AUAUCGGCUCACUGCAACCC | 4354 |
| AGCCAGCATCTTCTCTCCCT | 1261 | CGG | + | AGCCAGCAUCUUCUCUCCCU | 4355 |
| CACCTGTGATCCGAGCTACT | 1262 | TGG | - | CACCUGUGAUCCGAGCUACU | 4356 |
| TACTCGGGGAGGCTGAAGC | 1263 | GGG | + | UACUCGGGGAGGCUGAAGC | 4357 |
| GAACGAGGTGGAGTTTGGCC | 1264 | AGG | + | GAACGAGGUGGAGUUUGGCC | 4358 |
| GCATCACTGCACCTCAGTCT | 1265 | GGG | - | GCAUCACUGCACCUCAGUCU | 4359 |
| TGGGTTTTGCCATATTGCTC | 1266 | AGG | - | UGGGUUUUGCCAUAUUGCUC | 4360 |
| CTACTTAGGAGTGGAATTGC | 1267 | TGG | + | CUACUUAGGAGUGGAAUUGC | 4361 |
| TTCAGCCTCCCCCGAGTAGC | 1268 | TGG | - | UUCAGCCUCCCCCGAGUAGC | 4362 |
| CACTTCCACTGCCACCACCC | 1269 | TGG | + | CACUUCCACUGCCACCACCC | 4363 |
| TGCATCACTGCACCTCAGTC | 1270 | TGG | - | UGCAUCACUGCACCUCAGUC | 4364 |
| TCCACAGCCTTGTCAACACT | 1271 | AGG | + | UCCACAGCCUUGUCAACACU | 4365 |
| CTCTGGGGAGCATACAGAC | 1272 | GGG | - | CUCUGGGGAGCAUACAGAC | 4366 |
| TCCCCCAGAGGTTTGAGCAG | 1273 | CGG | + | UCCCCCAGAGGUUUGAGCAG | 4367 |
| AGGGAGAGAAGATGCTGGCT | 1274 | TGG | - | AGGGAGAGAAGAUGCUGGCU | 4368 |
| TCTTAGCCTAGGAAGATTCA | 1275 | GGG | - | UCUUAGCCUAGGAAGAUUCA | 4369 |
| GTATCTCAGGGTTCTTGCCT | 1276 | TGG | - | GUAUCUCAGGGUUCUUGCCU | 4370 |
| CTCAAGTGGTTTGCCCGCCT | 1277 | CGG | + | CUCAAGUGGUUUGCCCGCCU | 4371 |
| CAAAACCAGCCTGAGCAATA | 1278 | TGG | + | CAAAACCAGCCUGAGCAAUA | 4372 |
| TGAGGCGGGTCTATCACCTG | 1279 | AGG | + | UGAGGCGGGUCUAUCACCUG | 4373 |
| TGCCCAGGGGCTGGGGAGG | 1280 | GGG | - | UGCCCAGGGGCUGGGGAGG | 4374 |
| CAGCCATGAGCCACTGCGTC | 1281 | CGG | + | CAGCCAUGAGCCACUGCGUC | 4375 |
| TAAGATGTGGGCCTTTGGG | 1282 | AGG | - | UAAGAUGUGGGCCUUUGGG | 4376 |
| CAAAAAGTATCTGGGCATGA | 1283 | TGG | + | CAAAAAGUAUCUGGGCAUGA | 4377 |
| TTAAATTAATTAAAATTGGC | 1284 | CGG | - | UUAAAUUAAUUAAAAUUGGC | 4378 |
| TGGAAGTGAGCAGAGAGAGA | 1285 | AGG | - | UGGAAGUGAGCAGAGAGAGA | 4379 |
| CCGTCTGTATGCTCCCCCAG | 1286 | AGG | + | CCGUCUGUAUGCUCCCCCAG | 4380 |
| CAGCATTTGGGCACGAAGGC | 1287 | AGG | - | CAGCAUUUGGGCACGAAGGC | 4381 |
| CATGCCCTGAGATGGGACA | 1288 | AGG | + | CAUGCCCUGAGAUGGGACA | 4382 |
| ACTTCCACTGCCACCACCCT | 1289 | GGG | + | ACUUCCACUGCCACCACCCU | 4383 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TTTACAGCTGAGGCCCCAGC | 1290 | AGG | - | UUUACAGCUGAGGCCCCAGC | 4384 |
| ATGCCCTGAGATGGGGACAA | 1291 | GGG | + | AUGCCCUGAGAUGGGGACAA | 4385 |
| TTGAATGAATGAATGCTTTG | 1292 | AGG | + | UUGAAUGAAUGAAUGCUUUG | 4386 |
| AATGCAGCATTTGGGCACGA | 1293 | AGG | - | AAUGCAGCAUUUGGGCACGA | 4387 |
| TAAAATTACAAAAATGATCC | 1294 | GGG | - | UAAAAUUACAAAAAUGAUCC | 4388 |
| GGAAGGAGCTCTCAGCAGAT | 1295 | AGG | - | GGAAGGAGCUCUCAGCAGAU | 4389 |
| AAGTATCTGGGCATGATGGC | 1296 | AGG | + | AAGUAUCUGGGCAUGAUGGC | 4390 |
| TGCCCCGCTGCTCAAACCTC | 1297 | TGG | - | UGCCCCGCUGCUCAAACCUC | 4391 |
| TGCAGCTATTAAAAAGGATG | 1298 | AGG | + | UGCAGCUAUUAAAAAGGAUG | 4392 |
| ACGCCACTGTACTCCCAGCC | 1299 | TGG | - | ACGCCACUGUACUCCCAGCC | 4393 |
| TATTGTATTTCTTGTAGAGA | 1300 | GGG | + | UAUUGUAUUUCUUGUAGAGA | 4394 |
| TGAGTCTCGCTCAGTCACCC | 1301 | AGG | - | UGAGUCUCGCUCAGUCACCC | 4395 |
| TTGGCGGAAGAAGACACAAG | 1302 | TGG | + | UUGGCGGAAGAAGACACAAG | 4396 |
| CCGAGCTACTTGGAAGACTG | 1303 | AGG | - | CCGAGCUACUUGGAAGACUG | 4397 |
| AAGGAGCTCTCAGCAGATAG | 1304 | GGG | - | AAGGAGCUCUCAGCAGAUAG | 4398 |
| TGAAGCACTTGAAATGTGGC | 1305 | TGG | + | UGAAGCACUUGAAAUGUGGC | 4399 |
| GAAGGAGCTCTCAGCAGATA | 1306 | GGG | - | GAAGGAGCUCUCAGCAGAUA | 4400 |
| GGAGGGAAGGAATATCACAC | 1307 | AGG | - | GGAGGGAAGGAAUAUCACAC | 4401 |
| GAGGGAAGGAATATCACACA | 1308 | GGG | - | GAGGGAAGGAAUAUCACACA | 4402 |
| TGGCCGGACGCAGTGGCTCA | 1309 | TGG | - | UGGCCGGACGCAGUGGCUCA | 4403 |
| CGGGTCTATCACCTGAGGTC | 1310 | AGG | + | CGGGUCUAUCACCUGAGGUC | 4404 |
| TGGCTGTAATTCTAACACTT | 1311 | TGG | - | UGGCUGUAAUUCUAACACUU | 4405 |
| GGCTGTAATTCTAACACTTT | 1312 | GGG | - | GGCUGUAAUUCUAACACUUU | 4406 |
| GGCTTGAGCCCTGGAGTTCA | 1313 | AGG | + | GGCUUGAGCCCUGGAGUUCA | 4407 |
| CCTCTGGGGAGCATACAGA | 1314 | CGG | - | CCUCUGGGGAGCAUACAGA | 4408 |
| GGGGGAGCATACAGACGGGC | 1315 | AGG | - | GGGGGAGCAUACAGACGGGC | 4409 |
| AGGGTCTCGCCATGCTGCCC | 1316 | AGG | + | AGGGUCUCGCCAUGCUGCCC | 4410 |
| ATGAGCCACTGCGTCCGGCC | 1317 | AGG | + | AUGAGCCACUGCGUCCGGCC | 4411 |
| GAGGAGAATCGATTGAACCC | 1318 | AGG | - | GAGGAGAAUCGAUUGAACCC | 4412 |
| CAAGGCAGGAGTATCACCTG | 1319 | AGG | + | CAAGGCAGGAGUAUCACCUG | 4413 |
| ACAAAAGGGGCCGGGCGCGG | 1320 | TGG | - | ACAAAAGGGGCCGGGCGCGG | 4414 |
| AAAAAGGATGAGTTCATGTA | 1321 | GGG | + | AAAAAGGAUGAGUUCAUGUA | 4415 |
| CTGTCGTGGGTGGGGAGC | 1322 | GGG | + | CUGUCGUGGGUGGGGAGC | 4416 |
| CGCCACTGTACTCCCAGCCT | 1323 | GGG | - | CGCCACUGUACUCCCAGCCU | 4417 |
| TGCCCAGGCTGGGAGTACAG | 1324 | TGG | + | UGCCCAGGCUGGGAGUACAG | 4418 |
| CAAAAATACAAAAGTATCT | 1325 | GGG | + | CAAAAAUACAAAAGUAUCU | 4419 |
| ACAAAAATACAAAAGTATC | 1326 | TGG | + | ACAAAAAUACAAAAGUAUC | 4420 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CGGGCAAACCACTTGAGGTC | 1327 | AGG | - | CGGGCAAACCACUUGAGGUC | 4421 |
| TTGTATCTTTAGTAGAGCCA | 1328 | GGG | + | UUGUAUCUUUAGUAGAGCCA | 4422 |
| AATAAATTAGCCGGATGTGG | 1329 | TGG | - | AAUAAAUUAGCCGGAUGUGG | 4423 |
| GAGACAGGGTTTCAGCATGC | 1330 | TGG | + | GAGACAGGGUUUCAGCAUGC | 4424 |
| CCCCCAGAGGTTTGAGCAGC | 1331 | GGG | + | CCCCCAGAGGUUUGAGCAGC | 4425 |
| AAAAAAGGATGAGTTCATGT | 1332 | AGG | + | AAAAAAGGAUGAGUUCAUGU | 4426 |
| AGCACCACTGCACTCCAGTG | 1333 | TGG | + | AGCACCACUGCACUCCAGUG | 4427 |
| CAGGTGTCCTGCCCTATACC | 1334 | CGG | - | CAGGUGUCCUGCCCUAUACC | 4428 |
| GCTTGTAGTCCCAGCTACCA | 1335 | TGG | + | GCUUGUAGUCCCAGCUACCA | 4429 |
| GATGAGTTCATGTAGGGACA | 1336 | TGG | + | GAUGAGUUCAUGUAGGGACA | 4430 |
| CCATGGGAGGCTGAGGTGAG | 1337 | AGG | + | CCAUGGGAGGCUGAGGUGAG | 4431 |
| TATTTATTTTAGCAGAGAC | 1338 | AGG | + | UAUUUAUUUUAGCAGAGAC | 4432 |
| TTTGTATCTTTAGTAGAGCC | 1339 | AGG | + | UUUGUAUCUUUAGUAGAGCC | 4433 |
| AGACGGGGTTTCACCAGGTT | 1340 | GGG | - | AGACGGGGUUUCACCAGGUU | 4434 |
| GGGCTTGCAGAATGAGTGCA | 1341 | AGG | - | GGGCUUGCAGAAUGAGUGCA | 4435 |
| GGCCTGCTTCAGGGAAGAAG | 1342 | AGG | + | GGCCUGCUUCAGGGAAGAAG | 4436 |
| AGGGTTTCAGCATGCTGGCC | 1343 | AGG | + | AGGGUUUCAGCAUGCUGGCC | 4437 |
| TGAGACCAGCCTGCCCAACC | 1344 | TGG | + | UGAGACCAGCCUGCCCAACC | 4438 |
| CAGGCATGAGCTACCCCGCC | 1345 | CGG | + | CAGGCAUGAGCUACCCCGCC | 4439 |
| AAAAAAAAAAAAACAAGTCT | 1346 | GGG | + | AAAAAAAAAAAAACAAGUCU | 4440 |
| ATAAAATACCATAAACTAGG | 1347 | TGG | + | AUAAAAUACCAUAAACUAGG | 4441 |
| GCCGGTAATCCCAGTTACTC | 1348 | AGG | + | GCCGGUAAUCCCAGUUACUC | 4442 |
| TGTTAATTTTTTGTAGAGA | 1349 | CGG | - | UGUUAAUUUUUUGUAGAGA | 4443 |
| CTCAAACTTCTGAGCTCAAG | 1350 | GGG | + | CUCAAACUUCUGAGCUCAAG | 4444 |
| ATACTATGCAGCTATTAAAA | 1351 | AGG | + | AUACUAUGCAGCUAUUAAAA | 4445 |
| AGAAAAGAGGCCAGGTGCAG | 1352 | GGG | + | AGAAAAGAGGCCAGGUGCAG | 4446 |
| GTTAATTTTTTGTAGAGAC | 1353 | GGG | - | GUUAAUUUUUUGUAGAGAC | 4447 |
| CTTCAGGAGGCCAAGGCCAG | 1354 | AGG | + | CUUCAGGAGGCCAAGGCCAG | 4448 |
| CAAAAATGATCCGGGCGTGG | 1355 | TGG | - | CAAAAAUGAUCCGGGCGUGG | 4449 |
| GCACAGGATGGGGCGTGGT | 1356 | GGG | - | GCACAGGAUGGGGCGUGGU | 4450 |
| GGTCTGGAACTCTCGACCTC | 1357 | AGG | - | GGUCUGGAACUCUCGACCUC | 4451 |
| TGCCAAATAGTTTTCCAAAG | 1358 | AGG | + | UGCCAAAUAGUUUUCCAAAG | 4452 |
| CCTGTCACATGAGGGTCTTC | 1359 | AGG | + | CCUGUCACAUGAGGGUCUUC | 4453 |
| CCTCTAATCCCAGCTACTCG | 1360 | GGG | + | CCUCUAAUCCCAGCUACUCG | 4454 |
| GGCTGGGAAGTCCACGATCA | 1361 | AGG | + | GGCUGGGAAGUCCACGAUCA | 4455 |
| CCTGAAGACCCTCATGTGAC | 1362 | AGG | - | CCUGAAGACCCUCAUGUGAC | 4456 |
| CGGAAGAAGACACAAGTGGC | 1363 | TGG | + | CGGAAGAAGACACAAGUGGC | 4457 |
| GCAGGACACCTGTCACATGA | 1364 | GGG | + | GCAGGACACCUGUCACAUGA | 4458 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TGTCACATGAGGGTCTTCAG | 1365 | GGG | + | UGUCACAUGAGGGUCUUCAG | 4459 |
| CAGCAGATAGGGGAGCCAGA | 1366 | AGG | - | CAGCAGAUAGGGGAGCCAGA | 4460 |
| GGGTTTTCACCATGTTTCCC | 1367 | AGG | + | GGGUUUUCACCAUGUUUCCC | 4461 |
| CCCCGAGTAGCTGGGATTAG | 1368 | AGG | - | CCCCGAGUAGCUGGGAUUAG | 4462 |
| CACTTGAGCTGGGGAGGCGG | 1369 | AGG | - | CACUUGAGCUGGGGAGGCGG | 4463 |
| ATCAAGGTGCCAGCAGATTT | 1370 | GGG | + | AUCAAGGUGCCAGCAGAUUU | 4464 |
| CTGTCACATGAGGGTCTTCA | 1371 | GGG | + | CUGUCACAUGAGGGUCUUCA | 4465 |
| GTCCGTGGGCACAGGCCTGG | 1372 | GGG | - | GUCCGUGGGCACAGGCCUGG | 4466 |
| GGCAGGACACCTGTCACATG | 1373 | AGG | + | GGCAGGACACCUGUCACAUG | 4467 |
| AGCAGATAGGGGAGCCAGAA | 1374 | GGG | - | AGCAGAUAGGGGAGCCAGAA | 4468 |
| CGCTTGTGTGTCTGCCTGCT | 1375 | AGG | - | CGCUUGUGUGUCUGCCUGCU | 4469 |
| CCGGCATGCGCCACCATGCC | 1376 | TGG | - | CCGGCAUGCGCCACCAUGCC | 4470 |
| CCAGACCAGCCTGGCCAAGG | 1377 | TGG | - | CCAGACCAGCCUGGCCAAGG | 4471 |
| CGTGGGCACAGGCCTGGGGG | 1378 | TGG | - | CGUGGGCACAGGCCUGGGGG | 4472 |
| AGAAAACTGCAGAAGCAGGA | 1379 | AGG | - | AGAAAACUGCAGAAGCAGGA | 4473 |
| CTCTAATCCCAGCTACTCGG | 1380 | GGG | + | CUCUAAUCCCAGCUACUCGG | 4474 |
| GGATGGGGCGTGGTGGGCC | 1381 | AGG | - | GGAUGGGGCGUGGUGGGCC | 4475 |
| CTCAGGTGATACTCCTGCCT | 1382 | TGG | - | CUCAGGUGAUACUCCUGCCU | 4476 |
| CCACCTTGGCCAGGCTGGTC | 1383 | TGG | + | CCACCUUGGCCAGGCUGGUC | 4477 |
| GTCTTGGGAAATGCAGCATT | 1384 | TGG | - | GUCUUGGGAAAUGCAGCAUU | 4478 |
| CCAGGCATGGTGGCGCATGC | 1385 | CGG | + | CCAGGCAUGGUGGCGCAUGC | 4479 |
| CGGAAGAATCAGATCACACG | 1386 | TGG | - | CGGAAGAAUCAGAUCACACG | 4480 |
| GGGGTTTCACCAGGTTGGGC | 1387 | AGG | - | GGGGUUUCACCAGGUUGGGC | 4481 |
| TCACTGATGGACGTTTGGGT | 1388 | TGG | - | UCACUGAUGGACGUUUGGGU | 4482 |
| AACGTCCATCAGTGATAGAC | 1389 | TGG | + | AACGUCCAUCAGUGAUAGAC | 4483 |
| TCTATCACTGATGGACGTTT | 1390 | GGG | - | UCUAUCACUGAUGGACGUUU | 4484 |
| GATGGGGCGTGGTGGGCCA | 1391 | GGG | - | GAUGGGGCGUGGUGGGCCA | 4485 |
| GCGAGGAACATCACACACTG | 1392 | GGG | + | GCGAGGAACAUCACACACUG | 4486 |
| AATCACTTGAGCTGGGGAGG | 1393 | CGG | - | AAUCACUUGAGCUGGGGAGG | 4487 |
| CAGGAGTATCACCTGAGGTC | 1394 | AGG | + | CAGGAGUAUCACCUGAGGUC | 4488 |
| GTGGGGTGGGGAGCGGGGA | 1395 | GGG | + | GUGGGGUGGGGAGCGGGGA | 4489 |
| TTTCACCAGGTTGGGCAGGC | 1396 | TGG | - | UUUCACCAGGUUGGGCAGGC | 4490 |
| TCTTGGGAAATGCAGCATTT | 1397 | GGG | - | UCUUGGGAAAUGCAGCAUUU | 4491 |
| GTTCCAGACCAGCCTGGCCA | 1398 | AGG | - | GUUCCAGACCAGCCUGGCCA | 4492 |
| TCTCGCCATGCTGCCCAGGC | 1399 | TGG | + | UCUCGCCAUGCUGCCCAGGC | 4493 |
| TTTCAGCATGCTGGCCAGGC | 1400 | TGG | + | UUUCAGCAUGCUGGCCAGGC | 4494 |
| GGGGGCGTGGTGGGCCAGGG | 1401 | TGG | - | GGGGGCGUGGUGGGCCAGGG | 4495 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| GTCTATCACTGATGGACGTT | 1402 | TGG | - | GUCUAUCACUGAUGGACGUU | 4496 |
| TAACACAAGCCGCCTACAGA | 1403 | CGG | + | UAACACAAGCCGCCUACAGA | 4497 |
| AATAGCTGCATAGTATTCCA | 1404 | TGG | - | AAUAGCUGCAUAGUAUUCCA | 4498 |
| TCCTGCCTCAGGCTCCCGAG | 1405 | TGG | + | UCCUGCCUCAGGCUCCCGAG | 4499 |
| CTAGCAGGCAGACACACAAG | 1406 | CGG | + | CUAGCAGGCAGACACACAAG | 4500 |
| GCCACTCGGGAGCCTGAGGC | 1407 | AGG | - | GCCACUCGGGAGCCUGAGGC | 4501 |
| AGGTCCGTGGGCACAGGCCT | 1408 | GGG | - | AGGUCCGUGGGCACAGGCCU | 4502 |
| GCCTCAGGCTCCCGAGTGGC | 1409 | TGG | + | GCCUCAGGCUCCCGAGUGGC | 4503 |
| CCCAGCCACTCGGGAGCCTG | 1410 | AGG | - | CCCAGCCACUCGGGAGCCUG | 4504 |
| TGTAGAGACGGGGTTTCACC | 1411 | AGG | - | UGUAGAGACGGGGUUUCACC | 4505 |
| ACTGCCACTGTACTCCAGCC | 1412 | TGG | + | ACUGCCACUGUACUCCAGCC | 4506 |
| TCTCAAACTTCTGAGCTCAA | 1413 | GGG | + | UCUCAAACUUCUGAGCUCAA | 4507 |
| GTCTCAAACTTCTGAGCTCA | 1414 | AGG | + | GUCUCAAACUUCUGAGCUCA | 4508 |
| CCTCAGGCTCCCGAGTGGCT | 1415 | GGG | + | CCUCAGGCUCCCGAGUGGCU | 4509 |
| AGGCCTGTGCCCACGGACCT | 1416 | AGG | + | AGGCCUGUGCCCACGGACCU | 4510 |
| ACCTGTAATCCCAGCCACCT | 1417 | GGG | - | ACCUGUAAUCCCAGCCACCU | 4511 |
| AGAGTCTCGCTGTGTTGCTC | 1418 | AGG | + | AGAGUCUCGCUGUGUUGCUC | 4512 |
| TAGGTCCGTGGGCACAGGCC | 1419 | TGG | - | UAGGUCCGUGGGCACAGGCC | 4513 |
| CACCCCCAGGCCTGTGCCCA | 1420 | CGG | + | CACCCCCAGGCCUGUGCCCA | 4514 |
| TCAGCCTCCCCCGAGTAGCT | 1421 | GGG | - | UCAGCCUCCCCCGAGUAGCU | 4515 |
| GGCACAGGATGGGGCGTGG | 1422 | TGG | - | GGCACAGGAUGGGGCGUGG | 4516 |
| GCTTGTGTGTCTGCCTGCTA | 1423 | GGG | - | GCUUGUGUGUCUGCCUGCUA | 4517 |
| CCTCTCACCTCAGCCTCCCA | 1424 | TGG | - | CCUCUCACCUCAGCCUCCCA | 4518 |
| ATAATAAAATACCATAAACT | 1425 | AGG | + | AUAAUAAAAUACCAUAAACU | 4519 |
| CACCTGTAATCCCAGCCACC | 1426 | TGG | - | CACCUGUAAUCCCAGCCACC | 4520 |
| CGTCTGTAATCCCAGCCACT | 1427 | CGG | - | CGUCUGUAAUCCCAGCCACU | 4521 |
| AGGAGAATCACTTGAAACCC | 1428 | GGG | - | AGGAGAAUCACUUGAAACCC | 4522 |
| TAATCCCAGCTACTCGGGGG | 1429 | AGG | + | UAAUCCCAGCUACUCGGGGG | 4523 |
| GGGATTACAGCCACCATGCC | 1430 | TGG | - | GGGAUUACAGCCACCAUGCC | 4524 |
| CTGGAACTCCTGACCTCAAG | 1431 | TGG | + | CUGGAACUCCUGACCUCAAG | 4525 |
| TACTTAGGAGTGGAATTGCT | 1432 | GGG | + | UACUUAGGAGUGGAAUUGCU | 4526 |
| GGTCCGTGGGCACAGGCCTG | 1433 | GGG | - | GGUCCGUGGGCACAGGCCUG | 4527 |
| GAGCCACCATGCCCGGCCCA | 1434 | AGG | - | GAGCCACCAUGCCCGGCCCA | 4528 |
| CTTACTCTTGTCGCCCAGGC | 1435 | TGG | - | CUUACUCUUGUCGCCCAGGC | 4529 |
| CCTGTCGTGGGTGGGGAG | 1436 | CGG | + | CCUGUCGUGGGUGGGGAG | 4530 |
| AGGAGGTCGAGGCTGCAGTG | 1437 | AGG | + | AGGAGGUCGAGGCUGCAGUG | 4531 |
| GGAAGAATCAGATCACACGT | 1438 | GGG | - | GGAAGAAUCAGAUCACACGU | 4532 |
| ATACAGACGGGCAGGCTGTG | 1439 | GGG | - | AUACAGACGGGCAGGCUGUG | 4533 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| GAGTGGAATTGCTGGGTCAT | 1440 | AGG | + | GAGUGGAAUUGCUGGGUCAU | 4534 |
| GCCTGTCATCCCAGCTACTA | 1441 | GGG | - | GCCUGUCAUCCCAGCUACUA | 4535 |
| TTTATAAGCCACCTAGTTTA | 1442 | TGG | - | UUUAUAAGCCACCUAGUUUA | 4536 |
| GCATACAGACGGGCAGGCTG | 1443 | TGG | - | GCAUACAGACGGGCAGGCUG | 4537 |
| TGGTGGGCCAGGGTGGTCTT | 1444 | GGG | - | UGGUGGGCCAGGGUGGUCUU | 4538 |
| TCACTCTGTCACCCAGACTG | 1445 | AGG | + | UCACUCUGUCACCCAGACUG | 4539 |
| CATACAGACGGGCAGGCTGT | 1446 | GGG | - | CAUACAGACGGGCAGGCUGU | 4540 |
| AACTGAACAATGAAAACACT | 1447 | TGG | + | AACUGAACAAUGAAAACACU | 4541 |
| CTTACTCTGTTGCCCAGGCT | 1448 | GGG | + | CUUACUCUGUUGCCCAGGCU | 4542 |
| GGTTTTGAACTCCTGACCTT | 1449 | AGG | - | GGUUUUGAACUCCUGACCUU | 4543 |
| GTGGTGGGCCAGGGTGGTCT | 1450 | TGG | - | GUGGUGGGCCAGGGUGGUCU | 4544 |
| CAGGTGTGCACCACCATGGC | 1451 | CGG | + | CAGGUGUGCACCACCAUGGC | 4545 |
| TCCCTAGTAGCTGGGATGAC | 1452 | AGG | + | UCCCUAGUAGCUGGGAUGAC | 4546 |
| TTTTGCCATATTGCTCAGGC | 1453 | TGG | - | UUUUGCCAUAUUGCUCAGGC | 4547 |
| ACTTGGAAGACTGAGGTGGG | 1454 | AGG | - | ACUUGGAAGACUGAGGUGGG | 4548 |
| CTCAGCACTTTGGGAGGGCG | 1455 | AGG | + | CUCAGCACUUUGGGAGGGCG | 4549 |
| GTGTCTGCCTGCTAGGGTCT | 1456 | TGG | - | GUGUCUGCCUGCUAGGGUCU | 4550 |
| TGTCATCCCAGCTACTAGGG | 1457 | AGG | - | UGUCAUCCCAGCUACUAGGG | 4551 |
| TGTGCCCACGGACCTAGGTG | 1458 | AGG | + | UGUGCCCACGGACCUAGGUG | 4552 |
| GCTACTTGGAAGACTGAGGT | 1459 | GGG | - | GCUACUUGGAAGACUGAGGU | 4553 |
| GCCCCGCTGCTCAAACCTCT | 1460 | GGG | - | GCCCCGCUGCUCAAACCUCU | 4554 |
| TCTAACACTTTGGGAGGCTG | 1461 | AGG | - | UCUAACACUUUGGGAGGCUG | 4555 |
| TCACCTAGGTCCGTGGGCAC | 1462 | AGG | - | UCACCUAGGUCCGUGGGCAC | 4556 |
| TCCCAGGTGGCTGGGATTAC | 1463 | AGG | + | UCCCAGGUGGCUGGGAUUAC | 4557 |
| AGCTACTTGGAAGACTGAGG | 1464 | TGG | - | AGCUACUUGGAAGACUGAGG | 4558 |
| CAGGCCGATCACTTGAGGTC | 1465 | AGG | - | CAGGCCGAUCACUUGAGGUC | 4559 |
| CAGACGTGTGCCACCACGCC | 1466 | CGG | + | CAGACGUGUGCCACCACGCC | 4560 |
| GTCTCAAATTCCTGGGCTCA | 1467 | AGG | - | GUCUCAAAUUCCUGGGCUCA | 4561 |
| ACTACAGGTGTGCACCACCA | 1468 | TGG | + | ACUACAGGUGUGCACCACCA | 4562 |
| GAGACAGGGTTTCACCACCT | 1469 | TGG | + | GAGACAGGGUUUCACCACCU | 4563 |
| TGTAATCCCAGCCACCTGGG | 1470 | AGG | - | UGUAAUCCCAGCCACCUGGG | 4564 |
| GACTGTAATCCCAGCACTTC | 1471 | AGG | + | GACUGUAAUCCCAGCACUUC | 4565 |
| CTCAAGCAATCCTCTGGCCT | 1472 | TGG | - | CUCAAGCAAUCCUCUGGCCU | 4566 |
| TCTCAAATTCCTGGGCTCAA | 1473 | GGG | - | UCUCAAAUUCCUGGGCUCAA | 4567 |
| AGGGTTTCACCACCTTGGCC | 1474 | AGG | + | AGGGUUUCACCACCUUGGCC | 4568 |
| CAGGCGTGAGCCCCTGCACC | 1475 | TGG | - | CAGGCGUGAGCCCCUGCACC | 4569 |
| TTGCTCAGGGTGGAGTGCAG | 1476 | TGG | + | UUGCUCAGGGUGGAGUGCAG | 4570 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| ATAGGCACAGGATGGGGCG | 1477 | TGG | - | AUAGGCACAGGAUGGGGCG | 4571 |
| CACTGCAGCCTTGAACTCCA | 1478 | GGG | - | CACUGCAGCCUUGAACUCCA | 4572 |
| GCTACTAGGGAGGCTGAGGG | 1479 | AGG | - | GCUACUAGGGAGGCUGAGGG | 4573 |
| CAGGCACGCACCACCACATC | 1480 | CGG | + | CAGGCACGCACCACCACAUC | 4574 |
| GCCACCTGGGAGGCTGAGGC | 1481 | AGG | - | GCCACCUGGGAGGCUGAGGC | 4575 |
| GAAGACTGCTTGAGCCCAGG | 1482 | AGG | + | GAAGACUGCUUGAGCCCAGG | 4576 |
| TCCTGCCTCAGCCTCCCAGG | 1483 | TGG | + | UCCUGCCUCAGCCUCCCAGG | 4577 |
| TAAATAAATAAAAATTAGCC | 1484 | AGG | - | UAAAUAAAUAAAAAUUAGCC | 4578 |
| TTAATTTTTTGTAGAGACG | 1485 | GGG | - | UUAAUUUUUUGUAGAGACG | 4579 |
| GCCTCAGCCTCCCAGGTGGC | 1486 | TGG | + | GCCUCAGCCUCCCAGGUGGC | 4580 |
| CCCTCAGCCTCCCTAGTAGC | 1487 | TGG | + | CCCUCAGCCUCCCUAGUAGC | 4581 |
| AAAAAAAAAAAAAAGACAT | 1488 | AGG | - | AAAAAAAAAAAAAAGACAU | 4582 |
| AAAAAAAAGCCAGGCACAG | 1489 | TGG | + | AAAAAAAAGCCAGGCACAG | 4583 |
| CCTGTCCTCACCTAGGTCCG | 1490 | TGG | - | CCUGUCCUCACCUAGGUCCG | 4584 |
| AACCCGGGAGATGGAGGTTG | 1491 | TGG | - | AACCCGGGAGAUGGAGGUUG | 4585 |
| GTCTGTAATCCCAGCCACTC | 1492 | GGG | - | GUCUGUAAUCCCAGCCACUC | 4586 |
| GGGTTTCAACATATGAATTT | 1493 | TGG | + | GGGUUUCAACAUAUGAAUUU | 4587 |
| CTGTCCTCACCTAGGTCCGT | 1494 | GGG | - | CUGUCCUCACCUAGGUCCGU | 4588 |
| CCACGGACCTAGGTGAGGAC | 1495 | AGG | + | CCACGGACCUAGGUGAGGAC | 4589 |
| TCTTGCTCTGTCACCCACAC | 1496 | TGG | - | UCUUGCUCUGUCACCCACAC | 4590 |
| TCTTAAGTAGCTGGGACTAC | 1497 | AGG | - | UCUUAAGUAGCUGGGACUAC | 4591 |
| TCACCACAACCTCCATCTCC | 1498 | CGG | + | UCACCACAACCUCCAUCUCC | 4592 |
| CCAGCTACTAGGGAGGCTGA | 1499 | GGG | - | CCAGCUACUAGGGAGGCUGA | 4593 |
| AGGAGTGCCTGTCCTCACCT | 1500 | AGG | - | AGGAGUGCCUGUCCUCACCU | 4594 |
| CACCACAACCTCCATCTCCC | 1501 | GGG | + | CACCACAACCUCCAUCUCCC | 4595 |
| GTTACTCAGGAAGCTGAGGC | 1502 | AGG | + | GUUACUCAGGAAGCUGAGGC | 4596 |
| TGTAGTCCCAGCTACTTAAG | 1503 | AGG | + | UGUAGUCCCAGCUACUUAAG | 4597 |
| CCAGAGGATTGCTTGAGCCC | 1504 | AGG | + | CCAGAGGAUUGCUUGAGCCC | 4598 |
| GGCTTGAGCCTGGGAGGTTG | 1505 | AGG | - | GGCUUGAGCCUGGGAGGUUG | 4599 |
| GATCAAGGTGCCAGCAGATT | 1506 | TGG | + | GAUCAAGGUGCCAGCAGAUU | 4600 |
| CCTCAGCCTCCCAGGTGGCT | 1507 | GGG | + | CCUCAGCCUCCCAGGUGGCU | 4601 |
| GGGAGGCTGAGGTGAGAGGA | 1508 | TGG | + | GGGAGGCUGAGGUGAGAGGA | 4602 |
| CCCAGCCACCTGGGAGGCTG | 1509 | AGG | - | CCCAGCCACCUGGGAGGCUG | 4603 |
| ACAGGTGCAGCACACCAACA | 1510 | TGG | + | ACAGGUGCAGCACACCAACA | 4604 |
| GCACCACTGCACTCCAGTGT | 1511 | GGG | + | GCACCACUGCACUCCAGUGU | 4605 |
| GCCTCAGCTTCCTGAGTAAC | 1512 | TGG | - | GCCUCAGCUUCCUGAGUAAC | 4606 |
| TGAGAGGATGGCTTGAGCCC | 1513 | TGG | + | UGAGAGGAUGGCUUGAGCCC | 4607 |
| TGTAATTCTAACACTTTGGG | 1514 | AGG | - | UGUAAUUCUAACACUUUGGG | 4608 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CCTGGGCTCAAGCAATCCTC | 1515 | TGG | - | CCUGGGCUCAAGCAAUCCUC | 4609 |
| GAGCCAGGGTTTCACCATGT | 1516 | TGG | + | GAGCCAGGGUUUCACCAUGU | 4610 |
| GAGAATCGATTGAACCCAGG | 1517 | CGG | - | GAGAAUCGAUUGAACCCAGG | 4611 |
| GGTTTCAACATATGAATTTT | 1518 | GGG | + | GGUUUCAACAUAUGAAUUUU | 4612 |
| GGAGTGCAGTGGTGCAATAT | 1519 | CGG | + | GGAGUGCAGUGGUGCAAUAU | 4613 |
| ATACAAAAATTAGCCGGCCA | 1520 | TGG | - | AUACAAAAAUUAGCCGGCCA | 4614 |
| CCCAGTTACTCAGGAAGCTG | 1521 | AGG | + | CCCAGUUACUCAGGAAGCUG | 4615 |
| CAAAAATTAGCCGGCCATGG | 1522 | TGG | - | CAAAAAUUAGCCGGCCAUGG | 4616 |
| AAATAAAAATTAGCCAGGTG | 1523 | TGG | - | AAAUAAAAAUUAGCCAGGUG | 4617 |
| CAGGTGCATACCACCACACC | 1524 | TGG | - | CAGGUGCAUACCACCACACC | 4618 |
| GCACTTTGGGAAGCTGAGAC | 1525 | AGG | - | GCACUUUGGGAAGCUGAGAC | 4619 |
| CCTCAGCTTCCTGAGTAACT | 1526 | GGG | - | CCUCAGCUUCCUGAGUAACU | 4620 |
| CTTTGGGAGGGCGAGGTGGG | 1527 | AGG | + | CUUUGGGAGGGCGAGGUGGG | 4621 |
| GCTACTTAAGAGGCTGAGGC | 1528 | AGG | + | GCUACUUAAGAGGCUGAGGC | 4622 |
| TGGGAAGACTGCTTGAGCCC | 1529 | AGG | + | UGGGAAGACUGCUUGAGCCC | 4623 |
| GTTTCAACATATGAATTTTG | 1530 | GGG | + | GUUUCAACAUAUGAAUUUUG | 4624 |
| GCCTCAGCCTCTTAAGTAGC | 1531 | TGG | - | GCCUCAGCCUCUUAAGUAGC | 4625 |
| CAAGGCAGGTGGATCACCTA | 1532 | AGG | + | CAAGGCAGGUGGAUCACCUA | 4626 |
| TTCAACATATGAATTTTGGG | 1533 | GGG | + | UUCAACAUAUGAAUUUUGGG | 4627 |
| CTGCCACTGTACTCCAGCCT | 1534 | GGG | + | CUGCCACUGUACUCCAGCCU | 4628 |
| TTGTGTTTTTGTAGAGACA | 1535 | GGG | + | UUGUGUUUUUGUAGAGACA | 4629 |
| TTTCACCACCTTGGCCAGGC | 1536 | TGG | + | UUUCACCACCUUGGCCAGGC | 4630 |
| TCTCGCTCAGTCACCCAGGC | 1537 | TGG | - | UCUCGCUCAGUCACCCAGGC | 4631 |
| TGCATTTCCCAAGACCACCC | 1538 | TGG | + | UGCAUUUCCCAAGACCACCC | 4632 |
| TCTTTCTTTCTTTTTTGAGA | 1539 | TGG | - | UCUUUCUUUCUUUUUUGAGA | 4633 |
| CCTCAGTCTTCCAAGTAGCT | 1540 | CGG | + | CCUCAGUCUUCCAAGUAGCU | 4634 |
| CTTTGGGAGGACAAGGCAGG | 1541 | TGG | + | CUUUGGGAGGACAAGGCAGG | 4635 |
| GAGTGCAAGGTTTTATTGAG | 1542 | TGG | - | GAGUGCAAGGUUUUAUUGAG | 4636 |
| GTAATCTCAGCACTTTGGGA | 1543 | GGG | + | GUAAUCUCAGCACUUUGGGA | 4637 |
| CAAACATTAGCCAGGCATGG | 1544 | TGG | + | CAAACAUUAGCCAGGCAUGG | 4638 |
| TGAGACCAGCCTGGGCAGCA | 1545 | TGG | - | UGAGACCAGCCUGGGCAGCA | 4639 |
| ATACAAACATTAGCCAGGCA | 1546 | TGG | + | AUACAAACAUUAGCCAGGCA | 4640 |
| TATTATTATTATTTTGAGAC | 1547 | AGG | - | UAUUAUUAUUAUUUUGAGAC | 4641 |
| CCCAGCTACTTAAGAGGCTG | 1548 | AGG | + | CCCAGCUACUUAAGAGGCUG | 4642 |
| TCACCCACACTGGAGTGCAG | 1549 | TGG | - | UCACCCACACUGGAGUGCAG | 4643 |
| GCACTTTGGGAGGGCGAGGT | 1550 | GGG | + | GCACUUUGGGAGGGCGAGGU | 4644 |
| GAGACAGGGTTTTGCTATGT | 1551 | TGG | - | GAGACAGGGUUUUGCUAUGU | 4645 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CCTCAGCCTCTTAAGTAGCT | 1552 | GGG | - | CCUCAGCCUCUUAAGUAGCU | 4646 |
| AGGGTTTTGCTATGTTGGCC | 1553 | AGG | - | AGGGUUUUGCUAUGUUGGCC | 4647 |
| TTTGTGTTTTTTGTAGAGAC | 1554 | AGG | + | UUUGUGUUUUUUGUAGAGAC | 4648 |
| TTTCAACATATGAATTTTGG | 1555 | GGG | + | UUUCAACAUAUGAAUUUUGG | 4649 |
| GGGGCCTTTGGGAGGTGATT | 1556 | AGG | - | GGGGCCUUUGGGAGGUGAUU | 4650 |
| AGTGGAATTGCTGGGTCATA | 1557 | GGG | + | AGUGGAAUUGCUGGGUCAUA | 4651 |
| CACTGTAGCCTCAACCTCCC | 1558 | AGG | + | CACUGUAGCCUCAACCUCCC | 4652 |
| CAAAAACACAAAAATTAGC | 1559 | TGG | - | CAAAAACACAAAAAUUAGC | 4653 |
| GGAGTACAATGGCGCGATCT | 1560 | CGG | - | GGAGUACAAUGGCGCGAUCU | 4654 |
| TTTTTTTTTCTTTTGAGAC | 1561 | TGG | - | UUUUUUUUUCUUUUGAGAC | 4655 |
| TGGCCAACATGGTGAAACCC | 1562 | TGG | - | UGGCCAACAUGGUGAAACCC | 4656 |
| CGCTTGAACCCGGAAGGCAG | 1563 | AGG | + | CGCUUGAACCCGGAAGGCAG | 4657 |
| GAGACGGGGTTTCACCAGGT | 1564 | TGG | - | GAGACGGGGUUUCACCAGGU | 4658 |
| TGGGGCCTGTCGTGGGGTGG | 1565 | GGG | + | UGGGGCCUGUCGUGGGGUGG | 4659 |
| TCTCAGCTTCCCAAAGTGCT | 1566 | AGG | + | UCUCAGCUUCCCAAAGUGCU | 4660 |
| CTGGGGCCTGTCGTGGGGTG | 1567 | GGG | + | CUGGGGCCUGUCGUGGGGUG | 4661 |
| CGTTTGAACCTGGGAGGCGG | 1568 | AGG | - | CGUUUGAACCUGGGAGGCGG | 4662 |
| CACTGGGGCCTGTCGTGGGG | 1569 | TGG | + | CACUGGGGCCUGUCGUGGGG | 4663 |
| AACTCCTGACCTCAAGTGAT | 1570 | CGG | + | AACUCCUGACCUCAAGUGAU | 4664 |
| CAGGCTGGTCTTGAGCTCCT | 1571 | GGG | - | CAGGCUGGUCUUGAGCUCCU | 4665 |
| CGCGCCATTGTACTCCAGCC | 1572 | TGG | + | CGCGCCAUUGUACUCCAGCC | 4666 |
| CGCTTGAACCCGGGAGATGG | 1573 | AGG | - | CGCUUGAACCCGGGAGAUGG | 4667 |
| AGAGTCTTACTCTGTCGCCC | 1574 | AGG | + | AGAGUCUUACUCUGUCGCCC | 4668 |
| AAGAGGCTGAGGCAGGAGAA | 1575 | TGG | + | AAGAGGCUGAGGCAGGAGAA | 4669 |
| AAAAAACACAAAAATTAGCT | 1576 | GGG | - | AAAAAACACAAAAAUUAGCU | 4670 |
| ACTGGGGCCTGTCGTGGGT | 1577 | GGG | + | ACUGGGGCCUGUCGUGGGU | 4671 |
| GCACTTTGGGAGGACAAGGC | 1578 | AGG | + | GCACUUUGGGAGGACAAGGC | 4672 |
| GCCTTGGCCTCCTGAAGTGC | 1579 | TGG | - | GCCUUGGCCUCCUGAAGUGC | 4673 |
| GCCTTGTCCTCCCAAAGTGC | 1580 | TGG | - | GCCUUGUCCUCCCAAAGUGC | 4674 |
| AGCACTTTGGGAGGGCGAGG | 1581 | TGG | + | AGCACUUUGGGAGGGCGAGG | 4675 |
| ACACACTGGGGCCTGTCGTG | 1582 | GGG | + | ACACACUGGGGCCUGUCGUG | 4676 |
| TGGCTGTAATCCCAGCTACT | 1583 | CGG | + | UGGCUGUAAUCCCAGCUACU | 4677 |
| CAGGAGAATCACTTGAAACC | 1584 | CGG | - | CAGGAGAAUCACUUGAAACC | 4678 |
| TGCCTGTCATCCCAGCTACT | 1585 | AGG | - | UGCCUGUCAUCCCAGCUACU | 4679 |
| CACACACTGGGGCCTGTCGT | 1586 | GGG | + | CACACACUGGGGCCUGUCGU | 4680 |
| CAGGTGGATCACCTAAGGTC | 1587 | AGG | + | CAGGUGGAUCACCUAAGGUC | 4681 |
| TGTTGTTGTTGTTTTTGAGA | 1588 | TGG | + | UGUUGUUGUUGUUUUUGAGA | 4682 |
| TGCCTCTAATCCCAGCTACT | 1589 | CGG | + | UGCCUCUAAUCCCAGCUACU | 4683 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| GGAGTGCAGTGGAGCGATCT | 1590 | TGG | + | GGAGUGCAGUGGAGCGAUCU | 4684 |
| CCCAGCACTTCAGGAGGCCA | 1591 | AGG | + | CCCAGCACUUCAGGAGGCCA | 4685 |
| GGCTGTAATCCCAGCTACTC | 1592 | GGG | + | GGCUGUAAUCCCAGCUACUC | 4686 |
| TGCTTGAGCCCAGGAGGTCG | 1593 | AGG | + | UGCUUGAGCCCAGGAGGUCG | 4687 |
| TTTGTATTTTTGTAGAGACG | 1594 | GGG | - | UUUGUAUUUUUGUAGAGACG | 4688 |
| GGAGTCTTACTCTGTTGCCC | 1595 | AGG | + | GGAGUCUUACUCUGUUGCCC | 4689 |
| CCTTGGCCTCCTGAAGTGCT | 1596 | GGG | - | CCUUGGCCUCCUGAAGUGCU | 4690 |
| CAGGAGCTCAAGACCAGCCT | 1597 | GGG | + | CAGGAGCUCAAGACCAGCCU | 4691 |
| CCAGGCTGGTCTTGAGCTCC | 1598 | TGG | - | CCAGGCUGGUCUUGAGCUCC | 4692 |
| CCAGGAGCTCAAGACCAGCC | 1599 | TGG | + | CCAGGAGCUCAAGACCAGCC | 4693 |
| GAATTTCACTCTTGTTGCCC | 1600 | AGG | + | GAAUUUCACUCUUGUUGCCC | 4694 |
| CGATAGTTTGCTCAGAATGA | 1601 | TGG | - | CGAUAGUUUGCUCAGAAUGA | 4695 |
| CCCAGCACTTTGGGAGGACA | 1602 | AGG | + | CCCAGCACUUUGGGAGGACA | 4696 |
| ATTCTGAGCAAACTATCGCA | 1603 | AGG | + | AUUCUGAGCAAACUAUCGCA | 4697 |
| CTAAAGATACAAAAATTAGC | 1604 | CGG | - | CUAAAGAUACAAAAAUUAGC | 4698 |
| CCTTGTCCTCCCAAAGTGCT | 1605 | GGG | - | CCUUGUCCUCCCAAAGUGCU | 4699 |
| CGCTCCACTGCACTCCAGCC | 1606 | TGG | - | CGCUCCACUGCACUCCAGCC | 4700 |
| GCGCCATTGTACTCCAGCCT | 1607 | GGG | + | GCGCCAUUGUACUCCAGCCU | 4701 |
| ATCTCAAAAAAAAAAAAAAA | 1608 | AGG | + | AUCUCAAAAAAAAAAAAAAA | 4702 |
| GAGCGGGGAGGGATAGCATT | 1609 | AGG | + | GAGCGGGGAGGGAUAGCAUU | 4703 |
| TCAAGCGATTCTCCTGCCTC | 1610 | AGG | + | UCAAGCGAUUCUCCUGCCUC | 4704 |
| TTAATCCAGTCTATCACTGA | 1611 | TGG | - | UUAAUCCAGUCUAUCACUGA | 4705 |
| GAGAATCGCTTGAACCCGGA | 1612 | AGG | + | GAGAAUCGCUUGAACCCGGA | 4706 |
| GCCTCTAATCCCAGCTACTC | 1613 | GGG | + | GCCUCUAAUCCCAGCUACUC | 4707 |
| TTGTAATTTTAGTAGAGACG | 1614 | GGG | + | UUGUAAUUUUAGUAGAGACG | 4708 |
| AATCGCTTGAACCCGGGAGA | 1615 | TGG | - | AAUCGCUUGAACCCGGGAGA | 4709 |
| TTTTGCTATGTTGGCCAGGC | 1616 | TGG | - | UUUUGCUAUGUUGGCCAGGC | 4710 |
| TAAAAATACAAACATTAGCC | 1617 | AGG | + | UAAAAAUACAAACAUUAGCC | 4711 |
| TCACACACTGGGGCCTGTCG | 1618 | TGG | + | UCACACACUGGGGCCUGUCG | 4712 |
| CCATGTTGGTCAGGCTGGTC | 1619 | TGG | - | CCAUGUUGGUCAGGCUGGUC | 4713 |
| CCAGACCAGCCTGACCAACA | 1620 | TGG | + | CCAGACCAGCCUGACCAACA | 4714 |
| TGACTGTAATCCCAGCACTT | 1621 | TGG | + | UGACUGUAAUCCCAGCACUU | 4715 |
| CAGGCTGGTCTCAAATTCCT | 1622 | GGG | - | CAGGCUGGUCUCAAAUUCCU | 4716 |
| TGGGAGGATCCCTTGAGCCC | 1623 | AGG | + | UGGGAGGAUCCCUUGAGCCC | 4717 |
| TGCACCACTGCACTCCAGTC | 1624 | TGG | - | UGCACCACUGCACUCCAGUC | 4718 |
| TCTTACTCTGTCGCCCAGGC | 1625 | TGG | + | UCUUACUCUGUCGCCCAGGC | 4719 |
| TCTCACTCTGTTGCCCAGAC | 1626 | TGG | + | UCUCACUCUGUUGCCCAGAC | 4720 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| AACTGCTTGAACCCAGGAGG | 1627 | CGG | + | AACUGCUUGAACCCAGGAGG | 4721 |
| ACACAAAAATTAGCTGGGCA | 1628 | TGG | - | ACACAAAAAUUAGCUGGGCA | 4722 |
| GGATTACAGGCGTGAGCCAC | 1629 | GGG | + | GGAUUACAGGCGUGAGCCAC | 4723 |
| GCCGAGGTGGGCGGATCATG | 1630 | AGG | + | GCCGAGGUGGGCGGAUCAUG | 4724 |
| CAGAAGTTTGAGACCAGCCT | 1631 | GGG | - | CAGAAGUUUGAGACCAGCCU | 4725 |
| GAGGTCTCACTATGTTGCCC | 1632 | AGG | - | GAGGUCUCACUAUGUUGCCC | 4726 |
| TTTTGTATTTTTGTAGAGAC | 1633 | GGG | - | UUUUGUAUUUUUGUAGAGAC | 4727 |
| TCGGGAGTTCGAGACCAGCC | 1634 | TGG | - | UCGGGAGUUCGAGACCAGCC | 4728 |
| TGCCTGTAACCCCAGCACTT | 1635 | TGG | + | UGCCUGUAACCCCAGCACUU | 4729 |
| TTTGTAATTTTAGTAGAGAC | 1636 | GGG | + | UUUGUAAUUUUAGUAGAGAC | 4730 |
| GCTCCACTGCACTCCAGCCT | 1637 | GGG | - | GCUCCACUGCACUCCAGCCU | 4731 |
| GCAGGCAGATCACCTGAGGT | 1638 | CGG | - | GCAGGCAGAUCACCUGAGGU | 4732 |
| TCCTGAGTAACTGGGATTAC | 1639 | CGG | - | UCCUGAGUAACUGGGAUUAC | 4733 |
| CTTGGCCTCCCAAAGTGCTG | 1640 | GGG | - | CUUGGCCUCCCAAAGUGCUG | 4734 |
| CAGGTGTGTGCCACCACACC | 1641 | TGG | + | CAGGUGUGUGCCACCACACC | 4735 |
| CCAGGCTGGTCTCAAATTCC | 1642 | TGG | - | CCAGGCUGGUCUCAAAUUCC | 4736 |
| CCAGGAATTTGAGACCAGCC | 1643 | TGG | + | CCAGGAAUUUGAGACCAGCC | 4737 |
| TTTTTGTATTTTTGTAGAGA | 1644 | CGG | - | UUUUUGUAUUUUUGUAGAGA | 4738 |
| TGTAATCCCAGCACTTCAGG | 1645 | AGG | + | UGUAAUCCCAGCACUUCAGG | 4739 |
| GAGAACTGCTTGAACCCAGG | 1646 | AGG | + | GAGAACUGCUUGAACCCAGG | 4740 |
| CAGGAATTTGAGACCAGCCT | 1647 | GGG | + | CAGGAAUUUGAGACCAGCCU | 4741 |
| TCAGAAGTTTGAGACCAGCC | 1648 | TGG | - | UCAGAAGUUUGAGACCAGCC | 4742 |
| GACTGTAATCCCAGCACTTT | 1649 | GGG | + | GACUGUAAUCCCAGCACUUU | 4743 |
| GCACCACTGCACTCCAGTCT | 1650 | GGG | - | GCACCACUGCACUCCAGUCU | 4744 |
| TAAAAATTAGCCAGGTGTGG | 1651 | TGG | - | UAAAAAUUAGCCAGGUGUGG | 4745 |
| TTTTGTAATTTTAGTAGAGA | 1652 | CGG | + | UUUUGUAAUUUUAGUAGAGA | 4746 |
| TAAAAATACAAAAATCAGCT | 1653 | GGG | - | UAAAAAUACAAAAAUCAGCU | 4747 |
| GCCTCGGTCTCCCAAAGTGC | 1654 | TGG | + | GCCUCGGUCUCCCAAAGUGC | 4748 |
| GCACTTTGGGAGACCGAGGC | 1655 | GGG | - | GCACUUUGGGAGACCGAGGC | 4749 |
| AGCACTTTGGGAGACCGAGG | 1656 | CGG | - | AGCACUUUGGGAGACCGAGG | 4750 |
| ACCTCATGATCCGCCCACCT | 1657 | CGG | - | ACCUCAUGAUCCGCCCACCU | 4751 |
| CACTGCAACCTCTGCCTTCC | 1658 | GGG | - | CACUGCAACCUCUGCCUUCC | 4752 |
| TCTTACTCTGTTGCCCAGGC | 1659 | TGG | + | UCUUACUCUGUUGCCCAGGC | 4753 |
| CACTGCAGCCTCGACCTCCT | 1660 | GGG | - | CACUGCAGCCUCGACCUCCU | 4754 |
| AAAAAAAAAAAAAAAAGCC | 1661 | AGG | + | AAAAAAAAAAAAAAAAGCC | 4755 |
| GGGGTTTCTCCATGTTGGCC | 1662 | AGG | + | GGGGUUUCUCCAUGUUGGCC | 4756 |
| CAGGAGAACTGCTTGAACCC | 1663 | AGG | + | CAGGAGAACUGCUUGAACCC | 4757 |
| GGTGGGCGGATCATGAGGTC | 1664 | AGG | + | GGUGGGCGGAUCAUGAGGUC | 4758 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TTGCCCAGGCTGGAGTACAA | 1665 | TGG | - | UUGCCCAGGCUGGAGUACAA | 4759 |
| TCACTGCAGCCTCGACCTCC | 1666 | TGG | - | UCACUGCAGCCUCGACCUCC | 4760 |
| TCACTGCAACCTCTGCCTTC | 1667 | CGG | - | UCACUGCAACCUCUGCCUUC | 4761 |
| GGGATTACAGGCGTGAGCCA | 1668 | CGG | + | GGGAUUACAGGCGUGAGCCA | 4762 |
| GCCTGTAGTCCCAGCTACTA | 1669 | GGG | - | GCCUGUAGUCCCAGCUACUA | 4763 |
| CTAAAAATACAAAAATCAGC | 1670 | TGG | - | CUAAAAAUACAAAAAUCAGC | 4764 |
| CAGGCGCCCGCCACCACACC | 1671 | CGG | - | CAGGCGCCCGCCACCACACC | 4765 |
| CCCAGCACTTTGGGAGACCG | 1672 | AGG | - | CCCAGCACUUUGGGAGACCG | 4766 |
| TTGCCCAGACTGGAGTGCAG | 1673 | TGG | + | UUGCCCAGACUGGAGUGCAG | 4767 |
| CAAAAAAAAAAAAAAAAAA | 1674 | AGG | + | CAAAAAAAAAAAAAAAAAA | 4768 |
| ACACTTTGGGAGGCTGAGGT | 1675 | GGG | - | ACACUUUGGGAGGCUGAGGU | 4769 |
| CCTCGGTCTCCCAAAGTGCT | 1676 | GGG | + | CCUCGGUCUCCCAAAGUGCU | 4770 |
| TCACTGCAGCCTTGAACTCC | 1677 | AGG | - | UCACUGCAGCCUUGAACUCC | 4771 |
| AAAAAAAAAAAAAAAAAGA | 1678 | GGG | - | AAAAAAAAAAAAAAAAAGA | 4772 |
| GCCTGTAACCCCAGCACTTT | 1679 | GGG | + | GCCUGUAACCCCAGCACUUU | 4773 |
| ATTATTATACTTTAAGTTCT | 1680 | AGG | - | AUUAUUAUACUUUAAGUUCU | 4774 |
| TTGTATTTTTAGTAGAGACT | 1681 | GGG | - | UUGUAUUUUUAGUAGAGACU | 4775 |
| TCGCCCAGGCTGGAGTACAG | 1682 | TGG | - | UCGCCCAGGCUGGAGUACAG | 4776 |
| CGAGGCAGGCAGATCACCTG | 1683 | AGG | - | CGAGGCAGGCAGAUCACCUG | 4777 |
| CGAGGCAGGCAGATCACCTG | 1684 | AGG | - | CGAGGCAGGCAGAUCACCUG | 4778 |
| TCCCTAGTAGCTGGGACTAC | 1685 | AGG | + | UCCCUAGUAGCUGGGACUAC | 4779 |
| TTTCTCCATGTTGGCCAGGC | 1686 | TGG | + | UUUCUCCAUGUUGGCCAGGC | 4780 |
| AATACAAAATTAGCCAGGCA | 1687 | TGG | + | AAUACAAAAUUAGCCAGGCA | 4781 |
| TGTAGTCCCAGCTACTAGGG | 1688 | AGG | - | UGUAGUCCCAGCUACUAGGG | 4782 |
| GGAGTGCAATGGCGCAATCT | 1689 | CGG | - | GGAGUGCAAUGGCGCAAUCU | 4783 |
| ACAAAATTAGCCAGGCATGG | 1690 | TGG | + | ACAAAAUUAGCCAGGCAUGG | 4784 |
| AATGGTGTGAACCCGGGAGG | 1691 | CGG | + | AAUGGUGUGAACCCGGGAGG | 4785 |
| TTCTCCTGCCTCAGCCTCCC | 1692 | AGG | + | UUCUCCUGCCUCAGCCUCCC | 4786 |
| TCAGGAGTTCCAGACCAGCC | 1693 | TGG | - | UCAGGAGUUCCAGACCAGCC | 4787 |
| TCCCAAAGTGCTGGGGTTAC | 1694 | AGG | - | UCCCAAAGUGCUGGGGUUAC | 4788 |
| TGTAACCCCAGCACTTTGGG | 1695 | AGG | + | UGUAACCCCAGCACUUUGGG | 4789 |
| AAAAAAAAAAAAAAAAAAG | 1696 | AGG | - | AAAAAAAAAAAAAAAAAAG | 4790 |
| TACAAAAATTAGCCGGGTG | 1697 | TGG | + | UACAAAAAUUAGCCGGGUG | 4791 |
| CAGGTGTGAGCCACCACACC | 1698 | CGG | - | CAGGUGUGAGCCACCACACC | 4792 |
| AACACTTTGGGAGGCTGAGG | 1699 | TGG | - | AACACUUUGGGAGGCUGAGG | 4793 |
| GGTCTCGAACTCCCGACCTC | 1700 | AGG | + | GGUCUCGAACUCCCGACCUC | 4794 |
| TACAAAAAATTAGCCAGGTG | 1701 | TGG | + | UACAAAAAUUAGCCAGGUG | 4795 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CAGGCATGAGCCACCGCACC | 1702 | TGG | + | CAGGCAUGAGCCACCGCACC | 4796 |
| TGCGCCATTGCACTCCAGCC | 1703 | TGG | + | UGCGCCAUUGCACUCCAGCC | 4797 |
| TTATTATACTTTAAGTTCTA | 1704 | GGG | - | UUAUUAUACUUUAAGUUCUA | 4798 |
| GAGAATGGTGTGAACCCGGG | 1705 | AGG | + | GAGAAUGGUGUGAACCCGGG | 4799 |
| AATTAGCCGGGTGTGGTGGC | 1706 | GGG | + | AAUUAGCCGGGUGUGGUGGC | 4800 |
| CACCGCATGTTCTCACTCAT | 1707 | AGG | + | CACCGCAUGUUCUCACUCAU | 4801 |
| CAAGGCAGGTGGATCACCTG | 1708 | AGG | + | CAAGGCAGGUGGAUCACCUG | 4802 |
| CGCATGTTCTCACTCATAGG | 1709 | TGG | + | CGCAUGUUCUCACUCAUAGG | 4803 |
| AAATTAGCCGGGTGTGGTGG | 1710 | CGG | + | AAAUUAGCCGGGUGUGGUGG | 4804 |
| CGCCTGTAATCTCAGCACTT | 1711 | TGG | + | CGCCUGUAAUCUCAGCACUU | 4805 |
| CTCAGGTGATCTGCCTGCCT | 1712 | CGG | + | CUCAGGUGAUCUGCCUGCCU | 4806 |
| CTCAGGTGATCTGCCTGCCT | 1713 | CGG | + | CUCAGGUGAUCUGCCUGCCU | 4807 |
| GCTACTAGGGAGGCTGAGGC | 1714 | AGG | - | GCUACUAGGGAGGCUGAGGC | 4808 |
| TGCTTGAACCCAGGAGGCGG | 1715 | AGG | + | UGCUUGAACCCAGGAGGCGG | 4809 |
| GCCTCAGCCTCCCTAGTAGC | 1716 | TGG | + | GCCUCAGCCUCCCUAGUAGC | 4810 |
| GAGACGGGGTTTCTCCATGT | 1717 | TGG | + | GAGACGGGGUUUCUCCAUGU | 4811 |
| GAGTGAGAACATGCGGTGTT | 1718 | TGG | - | GAGUGAGAACAUGCGGUGUU | 4812 |
| GGTACATGTGCACAACGTGC | 1719 | AGG | - | GGUACAUGUGCACAACGUGC | 4813 |
| AAAAAATTAGCCGGGTGTGG | 1720 | TGG | + | AAAAAAUUAGCCGGGUGUGG | 4814 |
| CCTAGCACTTTGGGAGGCCG | 1721 | AGG | + | CCUAGCACUUUGGGAGGCCG | 4815 |
| CAGGCGTGAGCCACTGTGCC | 1722 | TGG | - | CAGGCGUGAGCCACUGUGCC | 4816 |
| CCCAGCTACTAGGGAGGCTG | 1723 | AGG | - | CCCAGCUACUAGGGAGGCUG | 4817 |
| CCCAGCTACTAGGGAGGCTG | 1724 | AGG | - | CCCAGCUACUAGGGAGGCUG | 4818 |
| CGCCTGTAATCCTAGCACTT | 1725 | TGG | + | CGCCUGUAAUCCUAGCACUU | 4819 |
| TGTAGGGACATGGATGAAGC | 1726 | TGG | + | UGUAGGGACAUGGAUGAAGC | 4820 |
| CCTCAGCCTCCCTAGTAGCT | 1727 | GGG | + | CCUCAGCCUCCCUAGUAGCU | 4821 |
| CCTCAGCCTCCCTAGTAGCT | 1728 | GGG | + | CCUCAGCCUCCCUAGUAGCU | 4822 |
| TGCCTGTAATCCTAGCACTT | 1729 | TGG | - | UGCCUGUAAUCCUAGCACUU | 4823 |
| CAGGCAGATCACCTGAGGTC | 1730 | AGG | - | CAGGCAGAUCACCUGAGGUC | 4824 |
| CAGGCAGATCACCTGAGGTC | 1731 | GGG | - | CAGGCAGAUCACCUGAGGUC | 4825 |
| GCATGTTCTCACTCATAGGT | 1732 | GGG | + | GCAUGUUCUCACUCAUAGGU | 4826 |
| CACCTATGAGTGAGAACATG | 1733 | CGG | - | CACCUAUGAGUGAGAACAUG | 4827 |
| GCAGGAGAATGGTGTGAACC | 1734 | CGG | + | GCAGGAGAAUGGUGUGAACC | 4828 |
| CAGGCATGAGCCACCATGCC | 1735 | CGG | - | CAGGCAUGAGCCACCAUGCC | 4829 |
| CAGGAGAATGGTGTGAACCC | 1736 | GGG | + | CAGGAGAAUGGUGUGAACCC | 4830 |
| CATGCCATTGCACTCCAGCC | 1737 | TGG | + | CAUGCCAUUGCACUCCAGCC | 4831 |
| TCTCACTATGTTGCCCAGGC | 1738 | TGG | - | UCUCACUAUGUUGCCCAGGC | 4832 |
| ATGCCATTGCACTCCAGCCT | 1739 | GGG | + | AUGCCAUUGCACUCCAGCCU | 4833 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| AAAAAATTAGCCAGGTGTGG | 1740 | TGG | + | AAAAAAUUAGCCAGGUGUGG | 4834 |
| TATGTATACATGTGCCATGT | 1741 | TGG | - | UAUGUAUACAUGUGCCAUGU | 4835 |
| GGGGTTTCACTGTGTTAGCC | 1742 | AGG | - | GGGGUUUCACUGUGUUAGCC | 4836 |
| GAGTTTCACTCTTGTTGCCC | 1743 | AGG | - | GAGUUUCACUCUUGUUGCCC | 4837 |
| CTCAGGTGATCCACCTGCCT | 1744 | TGG | - | CUCAGGUGAUCCACCUGCCU | 4838 |
| TTCACTCTTGTTGCCCAGGC | 1745 | TGG | + | UUCACUCUUGUUGCCCAGGC | 4839 |
| TTCACTCTTGTTGCCCAGGC | 1746 | TGG | - | UUCACUCUUGUUGCCCAGGC | 4840 |
| GCCTGTAATCTCAGCACTTT | 1747 | GGG | + | GCCUGUAAUCUCAGCACUUU | 4841 |
| GCGCCATTGCACTCCAGCCT | 1748 | GGG | + | GCGCCAUUGCACUCCAGCCU | 4842 |
| GGGGTTTCACCATGTTGGTC | 1749 | AGG | - | GGGGUUUCACCAUGUUGGUC | 4843 |
| ACCTCAGCCTCCTGAGTAGC | 1750 | TGG | - | ACCUCAGCCUCCUGAGUAGC | 4844 |
| AGCTACTCAGGAGGCTGAGG | 1751 | CGG | - | AGCUACUCAGGAGGCUGAGG | 4845 |
| AGCTACTCAGGAGGCTGAGG | 1752 | TGG | + | AGCUACUCAGGAGGCUGAGG | 4846 |
| GCTACTCAGGAGGCTGAGGT | 1753 | GGG | + | GCUACUCAGGAGGCUGAGGU | 4847 |
| TTTTTTTTTTTTTTGAGAC | 1754 | AGG | + | UUUUUUUUUUUUUUGAGAC | 4848 |
| TTTTTTTTTTTTTTGAGAC | 1755 | AGG | - | UUUUUUUUUUUUUUGAGAC | 4849 |
| TTTTTTTTTTTTTGAGACA | 1756 | GGG | + | UUUUUUUUUUUUUGAGACA | 4850 |
| TTTTTTTTTTTTTGAGACA | 1757 | GGG | - | UUUUUUUUUUUUUGAGACA | 4851 |
| TTTCACTGTGTTAGCCAGGA | 1758 | TGG | - | UUUCACUGUGUUAGCCAGGA | 4852 |
| TCACCCAGGCTGGAGTGCAA | 1759 | TGG | - | UCACCCAGGCUGGAGUGCAA | 4853 |
| ACCTGTAATCCCAGCTACTT | 1760 | GGG | + | ACCUGUAAUCCCAGCUACUU | 4854 |
| CTAAAAATACAAAATTAGCC | 1761 | AGG | + | CUAAAAAUACAAAAUUAGCC | 4855 |
| GCCTGTAATCCTAGCACTTT | 1762 | GGG | - | GCCUGUAAUCCUAGCACUUU | 4856 |
| GCCTGTAATCCTAGCACTTT | 1763 | GGG | + | GCCUGUAAUCCUAGCACUUU | 4857 |
| GGAGTGCAGTGGCGTGATCT | 1764 | TGG | + | GGAGUGCAGUGGCGUGAUCU | 4858 |
| GGAGTGCAGTGGCGTGATCT | 1765 | CGG | + | GGAGUGCAGUGGCGUGAUCU | 4859 |
| TCCCAAAGTGCTGAGATTAC | 1766 | AGG | - | UCCCAAAGUGCUGAGAUUAC | 4860 |
| TGTAATCTCAGCACTTTGGG | 1767 | AGG | + | UGUAAUCUCAGCACUUUGGG | 4861 |
| TAGACTGGATTAAGAAAATG | 1768 | TGG | + | UAGACUGGAUUAAGAAAAUG | 4862 |
| TTTCACCATGTTGGTCAGGC | 1769 | TGG | - | UUUCACCAUGUUGGUCAGGC | 4863 |
| CACTGCAACCTCCGCCTCCT | 1770 | GGG | - | CACUGCAACCUCCGCCUCCU | 4864 |
| GGAGTCTCGCTCTGTCGCCC | 1771 | AGG | - | GGAGUCUCGCUCUGUCGCCC | 4865 |
| AATGTGGCACATATACACCA | 1772 | TGG | + | AAUGUGGCACAUAUACACCA | 4866 |
| ACGCCACTGCACTCCAGCCT | 1773 | GGG | - | ACGCCACUGCACUCCAGCCU | 4867 |
| TCCCAAAGTGCTAGGATTAC | 1774 | AGG | + | UCCCAAAGUGCUAGGAUUAC | 4868 |
| TCCCAAAGTGCTAGGATTAC | 1775 | AGG | - | UCCCAAAGUGCUAGGAUUAC | 4869 |
| GGAGTGCAGTGGCGCGATCT | 1776 | TGG | - | GGAGUGCAGUGGCGCGAUCU | 4870 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| CACGCCACTGCACTCCAGCC | 1777 | TGG | - | CACGCCACUGCACUCCAGCC | 4871 |
| TGTAATCCTAGCACTTTGGG | 1778 | AGG | + | UGUAAUCCUAGCACUUUGGG | 4872 |
| CAAAAATTAGCTGGGCATGG | 1779 | TGG | - | CAAAAAUUAGCUGGGCAUGG | 4873 |
| CTTTGGGAGGCTGAGGTGGG | 1780 | AGG | - | CUUUGGGAGGCUGAGGUGGG | 4874 |
| GGTCTCAAACTCCTGACCTC | 1781 | AGG | - | GGUCUCAAACUCCUGACCUC | 4875 |
| GAGAATCGCTTGAACCCAGG | 1782 | AGG | + | GAGAAUCGCUUGAACCCAGG | 4876 |
| CAGGCGTGAGCCACCGCGCC | 1783 | CGG | + | CAGGCGUGAGCCACCGCGCC | 4877 |
| CTTTGGGAGGCCAAGGCAGG | 1784 | TGG | + | CUUUGGGAGGCCAAGGCAGG | 4878 |
| GGTCTTGAACTCCTGACCTC | 1785 | AGG | + | GGUCUUGAACUCCUGACCUC | 4879 |
| TCTCGCTCTGTCGCCCAGGC | 1786 | TGG | - | UCUCGCUCUGUCGCCCAGGC | 4880 |
| CTTTGGGAGGCCGAGGTGGG | 1787 | CGG | + | CUUUGGGAGGCCGAGGUGGG | 4881 |
| CACCTGTAATCCCAGCTACT | 1788 | TGG | + | CACCUGUAAUCCCAGCUACU | 4882 |
| CGCGCCACTGCACTCCAGCC | 1789 | TGG | + | CGCGCCACUGCACUCCAGCC | 4883 |
| ACCTGTAGTCCCAGCTACTC | 1790 | AGG | - | ACCUGUAGUCCCAGCUACUC | 4884 |
| AGGGTTTCACCATGTTGGCC | 1791 | AGG | + | AGGGUUUCACCAUGUUGGCC | 4885 |
| CACTGCAAGCTCCGCCTCCC | 1792 | GGG | - | CACUGCAAGCUCCGCCUCCC | 4886 |
| TGCCTGTAGTCCCAGCTACT | 1793 | AGG | - | UGCCUGUAGUCCCAGCUACU | 4887 |
| GGTCTCGAACTCCTGACCTC | 1794 | AGG | - | GGUCUCGAACUCCUGACCUC | 4888 |
| TCACTGCAAGCTCCGCCTCC | 1795 | CGG | - | UCACUGCAAGCUCCGCCUCC | 4889 |
| CACTGCAAGCTCCGCCTCCC | 1796 | AGG | + | CACUGCAACCUCCGCCUCCC | 4890 |
| GCACTTTGGGAGGCCGAGGT | 1797 | GGG | + | GCACUUUGGGAGGCCGAGGU | 4891 |
| TCACTGCAAGCTCCGCCTCC | 1798 | TGG | - | UCACUGCAACCUCCGCCUCC | 4892 |
| CAAGACCAGCCTGGCCAACA | 1799 | TGG | - | CAAGACCAGCCUGGCCAACA | 4893 |
| GAGATGGGGTTTCACCATGT | 1800 | TGG | - | GAGAUGGGGUUUCACCAUGU | 4894 |
| TGTAGTCCCAGCTACTCAGG | 1801 | AGG | + | UGUAGUCCCAGCUACUCAGG | 4895 |
| TGTAGTCCCAGCTACTCAGG | 1802 | AGG | - | UGUAGUCCCAGCUACUCAGG | 4896 |
| TCCTGAGTAGCTGGGACTAC | 1803 | AGG | + | UCCUGAGUAGCUGGGACUAC | 4897 |
| TCCTGAGTAGCTGGGACTAC | 1804 | AGG | - | UCCUGAGUAGCUGGGACUAC | 4898 |
| CAGGAGAATCGCTTGAACCC | 1805 | AGG | + | CAGGAGAAUCGCUUGAACCC | 4899 |
| CAGGAGAATCGCTTGAACCC | 1806 | GGG | - | CAGGAGAAUCGCUUGAACCC | 4900 |
| CGAGACCAGCCTGGCCAACA | 1807 | TGG | - | CGAGACCAGCCUGGCCAACA | 4901 |
| GCAGGAGAATCGCTTGAACC | 1808 | CGG | + | GCAGGAGAAUCGCUUGAACC | 4902 |
| GCAGGAGAATCGCTTGAACC | 1809 | CGG | - | GCAGGAGAAUCGCUUGAACC | 4903 |
| TGTAATCCCAGCTACTCGGG | 1810 | AGG | + | UGUAAUCCCAGCUACUCGGG | 4904 |
| TAAAAATACAAAAAATTAGC | 1811 | CGG | + | UAAAAAUACAAAAAAUUAGC | 4905 |
| GCGCCACTGCACTCCAGCCT | 1812 | GGG | + | GCGCCACUGCACUCCAGCCU | 4906 |
| TCCCAAGTAGCTGGGATTAC | 1813 | AGG | - | UCCCAAGUAGCUGGGAUUAC | 4907 |
| TGTAATCCCAGCTACTTGGG | 1814 | AGG | + | UGUAAUCCCAGCUACUUGGG | 4908 |

TABLE 2-continued

Human RS1 Intron 1 Guide RNA Target Sequences and Guide Sequences.

| Target | SEQ ID NO. | PAM | Direction | Guide | SEQ ID NO. |
| --- | --- | --- | --- | --- | --- |
| TCAGGAGTTCAAGACCAGCC | 1815 | TGG | - | UCAGGAGUUCAAGACCAGCC | 4909 |
| TCAGGAGTTCGAGACCAGCC | 1816 | TGG | + | UCAGGAGUUCGAGACCAGCC | 4910 |
| TCAGGAGTTCGAGACCAGCC | 1817 | TGG | - | UCAGGAGUUCGAGACCAGCC | 4911 |
| AAAAATACAAAAAATTAGCC | 1818 | AGG | + | AAAAAUACAAAAAAUUAGCC | 4912 |
| AAAAATACAAAAAATTAGCC | 1819 | GGG | + | AAAAAUACAAAAAAUUAGCC | 4913 |
| TCAGGAGATCGAGACCATCC | 1820 | TGG | + | UCAGGAGAUCGAGACCAUCC | 4914 |
| GCCTTGGCCTCCCAAAGTGC | 1821 | TGG | - | GCCUUGGCCUCCCAAAGUGC | 4915 |
| GCCTTGGCCTCCCAAAGTGC | 1822 | TGG | - | GCCUUGGCCUCCCAAAGUGC | 4916 |
| GCACTTTGGGAGGCCAAGGC | 1823 | AGG | + | GCACUUUGGGAGGCCAAGGC | 4917 |
| GCACTTTGGGAGGCCAAGGC | 1824 | AGG | + | GCACUUUGGGAGGCCAAGGC | 4918 |
| GCCTCAGCCTCCCAAAGTGC | 1825 | TGG | - | GCCUCAGCCUCCCAAAGUGC | 4919 |
| GCACTTTGGGAGGCTGAGGC | 1826 | GGG | + | GCACUUUGGGAGGCUGAGGC | 4920 |
| AGCACTTTGGGAGGCTGAGG | 1827 | CGG | + | AGCACUUUGGGAGGCUGAGG | 4921 |
| TCGCCCAGGCTGGAGTGCAG | 1828 | TGG | - | UCGCCCAGGCUGGAGUGCAG | 4922 |
| TCGCCCAGGCTGGAGTGCAG | 1829 | TGG | + | UCGCCCAGGCUGGAGUGCAG | 4923 |
| TTGTATTTTAGTAGAGACA | 1830 | GGG | + | UUGUAUUUUAGUAGAGACA | 4924 |
| TTGTATTTTAGTAGAGACA | 1831 | GGG | - | UUGUAUUUUAGUAGAGACA | 4925 |
| TTGCCCAGGCTGGAGTGCAG | 1832 | TGG | + | UUGCCCAGGCUGGAGUGCAG | 4926 |
| CACCTGTAATCCCAGCACTT | 1833 | TGG | + | CACCUGUAAUCCCAGCACUU | 4927 |
| GCCTGTAGTCCCAGCTACTC | 1834 | AGG | + | GCCUGUAGUCCCAGCUACUC | 4928 |
| ACCTGTAATCCCAGCACTTT | 1835 | GGG | + | ACCUGUAAUCCCAGCACUUU | 4929 |
| GCTACTTGGGAGGCTGAGGC | 1836 | AGG | + | GCUACUUGGGAGGCUGAGGC | 4930 |
| GCTACTCAGGAGGCTGAGGC | 1837 | GGG | - | GCUACUCAGGAGGCUGAGGC | 4931 |
| CCCAGCACTTTGGGAGGCCA | 1838 | AGG | + | CCCAGCACUUUGGGAGGCCA | 4932 |
| CCCAGCACTTTGGGAGGCCA | 1839 | AGG | + | CCCAGCACUUUGGGAGGCCA | 4933 |
| GCCTCAGCCTCCCAAGTAGC | 1840 | TGG | - | GCCUCAGCCUCCCAAGUAGC | 4934 |
| GCCTCGGCCTCCCAAAGTGC | 1841 | TGG | + | GCCUCGGCCUCCCAAAGUGC | 4935 |
| GCCTCGGCCTCCCAAAGTGC | 1842 | TGG | + | GCCUCGGCCUCCCAAAGUGC | 4936 |
| TTGTATTTTAGTAGAGATG | 1843 | GGG | - | UUGUAUUUUAGUAGAGAUG | 4937 |
| TTTTTTTTTTTTTTTGAGA | 1844 | TGG | - | UUUUUUUUUUUUUUUGAGA | 4938 |
| TTTTTTTTTTTTTTTGAGA | 1845 | CGG | - | UUUUUUUUUUUUUUUGAGA | 4939 |
| CCTTGGCCTCCCAAAGTGCT | 1846 | GGG | - | CCUUGGCCUCCCAAAGUGCU | 4940 |
| CCTTGGCCTCCCAAAGTGCT | 1847 | GGG | - | CCUUGGCCUCCCAAAGUGCU | 4941 |
| CCCAGCACTTTGGGAGGCTG | 1848 | AGG | + | CCCAGCACUUUGGGAGGCUG | 4942 |
| GCACTTTGGGAGGCCGAGGC | 1849 | AGG | - | GCACUUUGGGAGGCCGAGGC | 4943 |
| GCACTTTGGGAGGCCGAGGC | 1850 | AGG | - | GCACUUUGGGAGGCCGAGGC | 4944 |
| GCCTCAGCCTCCTGAGTAGC | 1851 | TGG | + | GCCUCAGCCUCCUGAGUAGC | 4945 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TTTGTATTTTAGTAGAGAT | 1852 | GGG | - | UUUGUAUUUUAGUAGAGAU | 4946 |
| TTTCACCATGTTGGCCAGGC | 1853 | TGG | + | UUUCACCAUGUUGGCCAGGC | 4947 |
| GCTACTCGGGAGGCTGAGGC | 1854 | AGG | + | GCUACUCGGGAGGCUGAGGC | 4948 |
| AGCACTTTGGGAGGCCGAGG | 1855 | TGG | + | AGCACUUUGGGAGGCCGAGG | 4949 |
| CCCAGCTACTTGGGAGGCTG | 1856 | AGG | + | CCCAGCUACUUGGGAGGCUG | 4950 |
| TGCCTGTAATCCCAGCACTT | 1857 | TGG | - | UGCCUGUAAUCCCAGCACUU | 4951 |
| CCTCAGCCTCCCAAAGTGCT | 1858 | GGG | - | CCUCAGCCUCCCAAAGUGCU | 4952 |
| CCTCAGCCTCCCAAGTAGCT | 1859 | GGG | - | CCUCAGCCUCCCAAGUAGCU | 4953 |
| CCCAGCTACTCAGGAGGCTG | 1860 | AGG | - | CCCAGCUACUCAGGAGGCUG | 4954 |
| CCCAGCTACTCAGGAGGCTG | 1861 | AGG | + | CCCAGCUACUCAGGAGGCUG | 4955 |
| GCCTCAGCCTCCCGAGTAGC | 1862 | TGG | - | GCCUCAGCCUCCCGAGUAGC | 4956 |
| CCTCAGCCTCCTGAGTAGCT | 1863 | GGG | - | CCUCAGCCUCCUGAGUAGCU | 4957 |
| CCTCAGCCTCCTGAGTAGCT | 1864 | GGG | + | CCUCAGCCUCCUGAGUAGCU | 4958 |
| CCCAGCTACTCGGGAGGCTG | 1865 | AGG | + | CCCAGCUACUCGGGAGGCUG | 4959 |
| TTGTATTTTAGTAGAGACG | 1866 | GGG | - | UUGUAUUUUAGUAGAGACG | 4960 |
| CCTCAGCCTCCCGAGTAGCT | 1867 | GGG | - | CCUCAGCCUCCCGAGUAGCU | 4961 |
| CCCAGCACTTTGGGAGGCCG | 1868 | AGG | - | CCCAGCACUUUGGGAGGCCG | 4962 |
| CCCAGCACTTTGGGAGGCCG | 1869 | AGG | - | CCCAGCACUUUGGGAGGCCG | 4963 |
| CCTCGGCCTCCCAAAGTGCT | 1870 | AGG | - | CCUCGGCCUCCCAAAGUGCU | 4964 |
| CCTCGGCCTCCCAAAGTGCT | 1871 | GGG | + | CCUCGGCCUCCCAAAGUGCU | 4965 |
| CCTCGGCCTCCCAAAGTGCT | 1872 | GGG | + | CCUCGGCCUCCCAAAGUGCU | 4966 |
| CGCCTGTAATCCCAGCACTT | 1873 | TGG | + | CGCCUGUAAUCCCAGCACUU | 4967 |
| CGCCTGTAATCCCAGCACTT | 1874 | TGG | - | CGCCUGUAAUCCCAGCACUU | 4968 |
| CGCCTGTAATCCCAGCACTT | 1875 | TGG | - | CGCCUGUAAUCCCAGCACUU | 4969 |
| TTTGTATTTTAGTAGAGAC | 1876 | AGG | + | UUUGUAUUUUAGUAGAGAC | 4970 |
| TTTGTATTTTAGTAGAGAC | 1877 | AGG | - | UUUGUAUUUUAGUAGAGAC | 4971 |
| TTTGTATTTTAGTAGAGAC | 1878 | GGG | - | UUUGUAUUUUAGUAGAGAC | 4972 |
| TTTGTATTTTAGTAGAGAC | 1879 | TGG | - | UUUGUAUUUUAGUAGAGAC | 4973 |
| TTTTGTATTTTAGTAGAGA | 1880 | TGG | - | UUUUGUAUUUUAGUAGAGA | 4974 |
| TTTTGTATTTTAGTAGAGA | 1881 | CGG | - | UUUUGUAUUUUAGUAGAGA | 4975 |
| GCCTGTAATCCCAGCACTTT | 1882 | GGG | + | GCCUGUAAUCCCAGCACUUU | 4976 |
| GCCTGTAATCCCAGCACTTT | 1883 | GGG | - | GCCUGUAAUCCCAGCACUUU | 4977 |
| GCCTGTAATCCCAGCACTTT | 1884 | GGG | - | GCCUGUAAUCCCAGCACUUU | 4978 |
| GCCTGTAATCCCAGCACTTT | 1885 | GGG | - | GCCUGUAAUCCCAGCACUUU | 4979 |
| TCCCAAAGTGCTGGGATTAC | 1886 | AGG | - | UCCCAAAGUGCUGGGAUUAC | 4980 |
| TCCCAAAGTGCTGGGATTAC | 1887 | AGG | - | UCCCAAAGUGCUGGGAUUAC | 4981 |
| TCCCAAAGTGCTGGGATTAC | 1888 | AGG | + | UCCCAAAGUGCUGGGAUUAC | 4982 |
| TCCCAAAGTGCTGGGATTAC | 1889 | AGG | + | UCCCAAAGUGCUGGGAUUAC | 4983 |

TABLE 2-continued

Human RS1 Intron 1 Guide RNA Target Sequences and Guide Sequences.

| Target | SEQ ID NO. | PAM | Direction | Guide | SEQ ID NO. |
|---|---|---|---|---|---|
| TCCCAAAGTGCTGGGATTAC | 1890 | AGG | + | UCCCAAAGUGCUGGGAUUAC | 4984 |
| TGTAATCCCAGCACTTTGGG | 1891 | AGG | + | UGUAAUCCCAGCACUUUGGG | 4985 |
| TGTAATCCCAGCACTTTGGG | 1892 | AGG | + | UGUAAUCCCAGCACUUUGGG | 4986 |
| TGTAATCCCAGCACTTTGGG | 1893 | AGG | + | UGUAAUCCCAGCACUUUGGG | 4987 |
| TGTAATCCCAGCACTTTGGG | 1894 | AGG | - | UGUAAUCCCAGCACUUUGGG | 4988 |
| TGTAATCCCAGCACTTTGGG | 1895 | AGG | - | UGUAAUCCCAGCACUUUGGG | 4989 |

TABLE 3

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| ACCTGAGTAATAAAAATTGT | 1896 | TGG | + | ACCUGAGUAAUAAAAAUUGU | 4990 |
| TCCAACAATTTTTATTACTC | 1897 | AGG | - | UCCAACAAUUUUUAUUACUC | 4991 |
| CAACATGCCAATTAGTTCAC | 1898 | AGG | + | CAACAUGCCAAUUAGUUCAC | 4992 |
| TTAATAACCTGTGAACTAAT | 1899 | TGG | - | UUAAUAACCUGUGAACUAAU | 4993 |
| TCACAGGTTATTAATTTAAA | 1900 | AGG | + | UCACAGGUUAUUAAUUUAAA | 4994 |
| TTTAAAAGGTCACTGTTGTG | 1901 | TGG | + | UUUAAAAGGUCACUGUUGUG | 4995 |
| CTTTGTCACTGTCTTGCTCC | 1902 | TGG | + | CUUUGUCACUGUCUUGCUCC | 4996 |
| CTGTCTTGCTCCTGGCTTCC | 1903 | TGG | + | CUGUCUUGCUCCUGGCUUCC | 4997 |
| CCTGGCTTCCTGGTTTCATG | 1904 | AGG | + | CCUGGCUUCCUGGUUUCAUG | 4998 |
| CCTCATGAAACCAGGAAGCC | 1905 | AGG | - | CCUCAUGAAACCAGGAAGCC | 4999 |
| AGAAGGTTCCTCATGAAACC | 1906 | AGG | - | AGAAGGUUCCUCAUGAAACC | 5000 |
| AATATCATTTGAACTTTAGA | 1907 | AGG | - | AAUAUCAUUUGAACUUUAGA | 5001 |
| ATTGAAACTCAACAGAAAGA | 1908 | AGG | + | AUUGAAACUCAACAGAAAGA | 5002 |
| AAACTCAACAGAAAGAAGGA | 1909 | AGG | + | AAACUCAACAGAAAGAAGGA | 5003 |
| AACTCAACAGAAAGAAGGAA | 1910 | GGG | + | AACUCAACAGAAAGAAGGAA | 5004 |
| TTGTTTTTATAGAAACTCTG | 1911 | AGG | - | UUGUUUUUAUAGAAACUCUG | 5005 |
| TAATGAGAAGTCATGTTTCT | 1912 | TGG | + | UAAUGAGAAGUCAUGUUUCU | 5006 |
| TCATGTTTCTTGGAAATTTT | 1913 | AGG | + | UCAUGUUUCUUGGAAAUUUU | 5007 |
| TGTTTCTTGGAAATTTTAGG | 1914 | AGG | + | UGUUUCUUGGAAAUUUUAGG | 5008 |
| TAGAATTTAATATTGTAAGC | 1915 | CGG | + | UAGAAUUUAAUAUUGUAAGC | 5009 |
| TGTAAGCCGGACTATTACTG | 1916 | AGG | + | UGUAAGCCGGACUAUUACUG | 5010 |
| GTAAGCCGGACTATTACTGA | 1917 | GGG | + | GUAAGCCGGACUAUUACUGA | 5011 |
| CTTAACCCTCAGTAATAGTC | 1918 | CGG | - | CUUAACCCUCAGUAAUAGUC | 5012 |
| CGGACTATTACTGAGGGTTA | 1919 | AGG | + | CGGACUAUUACUGAGGGUUA | 5013 |
| GAAGCTATTAATAGCTCTGC | 1920 | TGG | + | GAAGCUAUUAAUAGCUCUGC | 5014 |
| AAGCTATTAATAGCTCTGCT | 1921 | GGG | + | AAGCUAUUAAUAGCUCUGCU | 5015 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| TGCTGGGACAAGTGTAAATG | 1922 | AGG | + | UGCUGGGACAAGUGUAAAUG | 5016 |
| GTGTAAATGAGGACTGTCCC | 1923 | AGG | + | GUGUAAAUGAGGACUGUCCC | 5017 |
| AGGACTGTCCCAGGCAAATC | 1924 | AGG | + | AGGACUGUCCCAGGCAAAUC | 5018 |
| TCCCAGGCAAATCAGGACAA | 1925 | AGG | + | UCCCAGGCAAAUCAGGACAA | 5019 |
| CCCAGGCAAATCAGGACAAA | 1926 | GGG | + | CCCAGGCAAAUCAGGACAAA | 5020 |
| CCCTTTGTCCTGATTTGCCT | 1927 | GGG | - | CCCUUUGUCCUGAUUUGCCU | 5021 |
| ACCCTTTGTCCTGATTTGCC | 1928 | TGG | - | ACCCUUUGUCCUGAUUUGCC | 5022 |
| GGGTCACCCTAGTTTAAATA | 1929 | TGG | + | GGGUCACCCUAGUUUAAAUA | 5023 |
| GCTAATCCATATTTAAACTA | 1930 | GGG | - | GCUAAUCCAUAUUUAAACUA | 5024 |
| TGCTAATCCATATTTAAACT | 1931 | AGG | - | UGCUAAUCCAUAUUUAAACU | 5025 |
| TTTAAATATGGATTAGCATA | 1932 | AGG | + | UUUAAAUAUGGAUUAGCAUA | 5026 |
| TATTAGACTGCAGTGGTGCT | 1933 | TGG | - | UAUUAGACUGCAGUGGUGCU | 5027 |
| AGACTTCTATTAGACTGCAG | 1934 | TGG | - | AGACUUCUAUUAGACUGCAG | 5028 |
| TAGGGTTTATTGACTTTCTT | 1935 | TGG | - | UAGGGUUUAUUGACUUUCUU | 5029 |
| TGGAATATATTGAGTCTTTA | 1936 | GGG | - | UGGAAUAUAUUGAGUCUUUA | 5030 |
| ATGGAATATATTGAGTCTTT | 1937 | AGG | - | AUGGAAUAUAUUGAGUCUUU | 5031 |
| ATTTAGAAGTTTAAAAGTGA | 1938 | TGG | - | AUUUAGAAGUUUAAAAGUGA | 5032 |
| CACTTTTAAACTTCTAAATG | 1939 | TGG | + | CACUUUUAAACUUCUAAAUG | 5033 |
| TAAACTTCTAAATGTGGCCC | 1940 | TGG | + | UAAACUUCUAAAUGUGGCCC | 5034 |
| CTTCTAAATGTGGCCCTGGC | 1941 | AGG | + | CUUCUAAAUGUGGCCCUGGC | 5035 |
| TAAGCATATTATGCCTGCCA | 1942 | GGG | - | UAAGCAUAUUAUGCCUGCCA | 5036 |
| TTAAGCATATTATGCCTGCC | 1943 | AGG | - | UUAAGCAUAUUAUGCCUGCC | 5037 |
| AGGCATAATATGCTTAAATA | 1944 | AGG | + | AGGCAUAAUAUGCUUAAAUA | 5038 |
| AGAGAGTATTATGTCTAAGA | 1945 | TGG | - | AGAGAGUAUUAUGUCUAAGA | 5039 |
| GGGCACTAGAGAGGTAAGAG | 1946 | AGG | - | GGGCACUAGAGAGGUAAGAG | 5040 |
| TGAATTGATGGGCACTAGAG | 1947 | AGG | - | UGAAUUGAUGGGCACUAGAG | 5041 |
| AAAGGAATTCTGAATTGAT | 1948 | GGG | - | AAAAGGAAUUCUGAAUUGAU | 5042 |
| TAAAGGAATTCTGAATTGA | 1949 | TGG | - | UAAAAGGAAUUCUGAAUUGA | 5043 |
| TTGAAAGTATAAACTTTAAA | 1950 | AGG | - | UUGAAAGUAUAAACUUUAAA | 5044 |
| TACTTTCAAATATTAAAAAT | 1951 | TGG | + | UACUUUCAAAUAUUAAAAAU | 5045 |
| AAATATTAAAAATTGGTTGA | 1952 | AGG | + | AAAUAUUAAAAAUUGGUUGA | 5046 |
| AATATTAAAAATTGGTTGAA | 1953 | GGG | + | AAUAUUAAAAAUUGGUUGAA | 5047 |
| TTAAAAATTGGTTGAAGGGT | 1954 | TGG | + | UUAAAAAUUGGUUGAAGGGU | 5048 |
| TAAAAATTGGTTGAAGGGTT | 1955 | GGG | + | UAAAAAUUGGUUGAAGGGUU | 5049 |
| AAAAATTGGTTGAAGGGTTG | 1956 | GGG | + | AAAAAUUGGUUGAAGGGUUG | 5050 |
| TGGTTGAAGGGTTGGGGATG | 1957 | TGG | + | UGGUUGAAGGGUUGGGGAUG | 5051 |
| GGGTTGGGGATGTGGCTCAG | 1958 | TGG | + | GGGUUGGGGAUGUGGCUCAG | 5052 |
| GACTCATGAAGGCTGGGCAG | 1959 | GGG | - | GACUCAUGAAGGCUGGGCAG | 5053 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| GGACTCATGAAGGCTGGGCA | 1960 | GGG | - | GGACUCAUGAAGGCUGGGCA | 5054 |
| GGGACTCATGAAGGCTGGGC | 1961 | AGG | - | GGGACUCAUGAAGGCUGGGC | 5055 |
| CTCAGGGACTCATGAAGGCT | 1962 | GGG | - | CUCAGGGACUCAUGAAGGCU | 5056 |
| ACTCAGGGACTCATGAAGGC | 1963 | TGG | - | ACUCAGGGACUCAUGAAGGC | 5057 |
| TTTAACTCAGGGACTCATGA | 1964 | AGG | - | UUUAACUCAGGGACUCAUGA | 5058 |
| GCTTCTGGGAATTTAACTCA | 1965 | GGG | - | GCUUCUGGGAAUUUAACUCA | 5059 |
| TGCTTCTGGGAATTTAACTC | 1966 | AGG | - | UGCUUCUGGGAAUUUAACUC | 5060 |
| GTTTGTCTTATACTGCTTCT | 1967 | GGG | - | GUUUGUCUUAUACUGCUUCU | 5061 |
| TGTTTGTCTTATACTGCTTC | 1968 | TGG | - | UGUUUGUCUUAUACUGCUUC | 5062 |
| ACCTTACTTCATCCATTTTC | 1969 | TGG | + | ACCUUACUUCAUCCAUUUUC | 5063 |
| GCCAGAAAATGGATGAAGTA | 1970 | AGG | - | GCCAGAAAAUGGAUGAAGUA | 5064 |
| TGTGTAGCTATGCCAGAAAA | 1971 | TGG | - | UGUGUAGCUAUGCCAGAAAA | 5065 |
| CATACCTGCAATCCTAGTTC | 1972 | TGG | + | CAUACCUGCAAUCCUAGUUC | 5066 |
| TTGTCCAGAACTAGGATTGC | 1973 | AGG | - | UUGUCCAGAACUAGGAUUGC | 5067 |
| GCTTGAATTTGTCCAGAACT | 1974 | AGG | - | GCUUGAAUUUGUCCAGAACU | 5068 |
| AGTTCTGGACAAATTCAAGC | 1975 | AGG | + | AGUUCUGGACAAAUUCAAGC | 5069 |
| AATGCCAACCTCAGCTACTT | 1976 | AGG | + | AAUGCCAACCUCAGCUACUU | 5070 |
| CAAACCTAAGTAGCTGAGGT | 1977 | TGG | - | CAAACCUAAGUAGCUGAGGU | 5071 |
| CAACCTCAGCTACTTAGGTT | 1978 | TGG | + | CAACCUCAGCUACUUAGGUU | 5072 |
| AACCTCAGCTACTTAGGTTT | 1979 | GGG | + | AACCUCAGCUACUUAGGUUU | 5073 |
| AGCCCAAACCTAAGTAGCTG | 1980 | AGG | - | AGCCCAAACCUAAGUAGCUG | 5074 |
| CTGAGACCCTGTCTTAACAT | 1981 | TGG | + | CUGAGACCCUGUCUUAACAU | 5075 |
| TGAGACCCTGTCTTAACATT | 1982 | GGG | + | UGAGACCCUGUCUUAACAUU | 5076 |
| GAGACCCTGTCTTAACATTG | 1983 | GGG | + | GAGACCCUGUCUUAACAUUG | 5077 |
| AGACCCTGTCTTAACATTGG | 1984 | GGG | + | AGACCCUGUCUUAACAUUGG | 5078 |
| TCTCCCCCAATGTTAAGACA | 1985 | GGG | - | UCUCCCCCAAUGUUAAGACA | 5079 |
| CTCTCCCCCAATGTTAAGAC | 1986 | AGG | - | CUCUCCCCCAAUGUUAAGAC | 5080 |
| TTAACATTGGGGGAGAGCCT | 1987 | AGG | + | UUAACAUUGGGGGAGAGCCU | 5081 |
| ATTGGGGGAGAGCCTAGGCT | 1988 | AGG | + | AUUGGGGGAGAGCCUAGGCU | 5082 |
| TGTATAGCTCAGCCTAGCCT | 1989 | AGG | - | UGUAUAGCUCAGCCUAGCCU | 5083 |
| CTATACAGTAAGCCTCTGTC | 1990 | TGG | + | CUAUACAGUAAGCCUCUGUC | 5084 |
| TATACAGTAAGCCTCTGTCT | 1991 | GGG | + | UAUACAGUAAGCCUCUGUCU | 5085 |
| CAGTAAGCCTCTGTCTGGGA | 1992 | AGG | + | CAGUAAGCCUCUGUCUGGGA | 5086 |
| TAAGCCTCTGTCTGGGAAGG | 1993 | AGG | + | UAAGCCUCUGUCUGGGAAGG | 5087 |
| AAGCCTCTGTCTGGGAAGGA | 1994 | GGG | + | AAGCCUCUGUCUGGGAAGGA | 5088 |
| TTTCCCTCCTTCCCAGACAG | 1995 | AGG | - | UUUCCCUCCUUCCCAGACAG | 5089 |
| TGTCTGGGAAGGAGGGAAAA | 1996 | AGG | + | UGUCUGGGAAGGAGGGAAAA | 5090 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| TGGGAAGGAGGGAAAAAGGA | 1997 | AGG | + | UGGGAAGGAGGGAAAAAGGA | 5091 |
| GAAAAAGGAAGGAAAGACAT | 1998 | TGG | + | GAAAAAGGAAGGAAAGACAU | 5092 |
| GACATTGGTTGAATGACTTG | 1999 | TGG | + | GACAUUGGUUGAAUGACUUG | 5093 |
| ACATTGGTTGAATGACTTGT | 2000 | GGG | + | ACAUUGGUUGAAUGACUUGU | 5094 |
| ACTGTATGTTTAGAGTGTTC | 2001 | AGG | + | ACUGUAUGUUUAGAGUGUUC | 5095 |
| CTGTATGTTTAGAGTGTTCA | 2002 | GGG | + | CUGUAUGUUUAGAGUGUUCA | 5096 |
| GTTTAGAGTGTTCAGGGAAA | 2003 | AGG | + | GUUUAGAGUGUUCAGGGAAA | 5097 |
| TAGAGTGTTCAGGGAAAAGG | 2004 | AGG | + | UAGAGUGUUCAGGGAAAAGG | 5098 |
| AGGTCATTTGCAGAGCAGAG | 2005 | AGG | - | AGGUCAUUUGCAGAGCAGAG | 5099 |
| ATTCGTCTTATCTGAGTGGC | 2006 | AGG | - | AUUCGUCUUAUCUGAGUGGC | 5100 |
| GTGTATTCGTCTTATCTGAG | 2007 | TGG | - | GUGUAUUCGUCUUAUCUGAG | 5101 |
| CATGAATATAGAAGAAACAG | 2008 | AGG | - | CAUGAAUAUAGAAGAAACAG | 5102 |
| AATAAAAGACACAAGACTGC | 2009 | TGG | - | AAUAAAAGACACAAGACUGC | 5103 |
| CTAATAATATTTCTAGTGTC | 2010 | TGG | + | CUAAUAAUAUUUCUAGUGUC | 5104 |
| CTTGAGATTTTATTTTCACA | 2011 | AGG | - | CUUGAGAUUUUAUUUUCACA | 5105 |
| CTTGTGAAAATAAAATCTCA | 2012 | AGG | + | CUUGUGAAAAUAAAAUCUCA | 5106 |
| AATAAAATCTCAAGGTCATA | 2013 | CGG | + | AAUAAAAUCUCAAGGUCAUA | 5107 |
| TACGGCAAACACAAAGAAAC | 2014 | AGG | + | UACGGCAAACACAAAGAAAC | 5108 |
| GTCTTCAGACACTCCAGAAG | 2015 | AGG | + | GUCUUCAGACACUCCAGAAG | 5109 |
| TCTTCAGACACTCCAGAAGA | 2016 | GGG | + | UCUUCAGACACUCCAGAAGA | 5110 |
| CGAGATCTGATGCCCTCTTC | 2017 | TGG | - | CGAGAUCUGAUGCCCUCUUC | 5111 |
| GAGGGCATCAGATCTCGTTA | 2018 | CGG | + | GAGGGCAUCAGAUCUCGUUA | 5112 |
| GCATCAGATCTCGTTACGGA | 2019 | TGG | + | GCAUCAGAUCUCGUUACGGA | 5113 |
| GATGGTTGTGAGCCACCATG | 2020 | TGG | + | GAUGGUUGUGAGCCACCAUG | 5114 |
| GTGAGCCACCATGTGGTTGC | 2021 | TGG | + | GUGAGCCACCAUGUGGUUGC | 5115 |
| TGAGCCACCATGTGGTTGCT | 2022 | GGG | + | UGAGCCACCAUGUGGUUGCU | 5116 |
| AAATCCCAGCAACCACATGG | 2023 | TGG | - | AAAUCCCAGCAACCACAUGG | 5117 |
| TTCAAATCCCAGCAACCACA | 2024 | TGG | - | UUCAAAUCCCAGCAACCACA | 5118 |
| GGATTTGAACTTCAGACCTT | 2025 | CGG | + | GGAUUUGAACUUCAGACCUU | 5119 |
| CAGACCTTCGGAAGAGCAGT | 2026 | CGG | + | CAGACCUUCGGAAGAGCAGU | 5120 |
| AGACCTTCGGAAGAGCAGTC | 2027 | GGG | + | AGACCUUCGGAAGAGCAGUC | 5121 |
| GCACCCGACTGCTCTTCCGA | 2028 | AGG | - | GCACCCGACUGCUCUUCCGA | 5122 |
| GGCTGGTGAGATGGCTCAGT | 2029 | GGG | - | GGCUGGUGAGAUGGCUCAGU | 5123 |
| GGGCTGGTGAGATGGCTCAG | 2030 | TGG | - | GGGCUGGUGAGAUGGCUCAG | 5124 |
| TGAGCCATCTCACCAGCCCC | 2031 | AGG | + | UGAGCCAUCUCACCAGCCCC | 5125 |
| AAACCTGGGGCTGGTGAGA | 2032 | TGG | - | AAAACCUGGGGCUGGUGAGA | 5126 |
| AGAAAAAAAAAACCTGGGGC | 2033 | TGG | - | AGAAAAAAAAAACCUGGGGC | 5127 |
| ACTAAGAAAAAAAAAACCTG | 2034 | GGG | - | ACUAAGAAAAAAAAAACCUG | 5128 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| AACTAAGAAAAAAAAACCT | 2035 | GGG | - | AACUAAGAAAAAAAAACCU | 5129 |
| CAACTAAGAAAAAAAAACC | 2036 | TGG | - | CAACUAAGAAAAAAAAACC | 5130 |
| TATTGTTATTCTTTTGAGAC | 2037 | AGG | + | UAUUGUUAUUCUUUUGAGAC | 5131 |
| AGGATCCCACACTGAAACTC | 2038 | AGG | + | AGGAUCCCACACUGAAACUC | 5132 |
| GCTAGCCTGAGTTTCAGTGT | 2039 | GGG | - | GCUAGCCUGAGUUUCAGUGU | 5133 |
| GGCTAGCCTGAGTTTCAGTG | 2040 | TGG | - | GGCUAGCCUGAGUUUCAGUG | 5134 |
| GGCTAGCCTTCAATTTCCTA | 2041 | TGG | + | GGCUAGCCUUCAAUUUCCUA | 5135 |
| TCAAATCCATAGGAAATTGA | 2042 | AGG | - | UCAAAUCCAUAGGAAAUUGA | 5136 |
| TGCTATGAGGTCAAATCCAT | 2043 | AGG | - | UGCUAUGAGGUCAAAUCCAU | 5137 |
| GAAACTGGCTGACTGCTATG | 2044 | AGG | - | GAAACUGGCUGACUGCUAUG | 5138 |
| AGCACTCAGAAGGTGGAAAC | 2045 | TGG | - | AGCACUCAGAAGGUGGAAAC | 5139 |
| AAATCTTAGCACTCAGAAGG | 2046 | TGG | - | AAAUCUUAGCACUCAGAAGG | 5140 |
| TTGAAATCTTAGCACTCAGA | 2047 | AGG | - | UUGAAAUCUUAGCACUCAGA | 5141 |
| GGAATTGGGTGTGGTGGCTC | 2048 | AGG | - | GGAAUUGGGUGUGGUGGCUC | 5142 |
| ATCTTAGGAATTGGGTGTGG | 2049 | TGG | - | AUCUUAGGAAUUGGGUGUGG | 5143 |
| CATATCTTAGGAATTGGGTG | 2050 | TGG | - | CAUAUCUUAGGAAUUGGGUG | 5144 |
| AAAAACATATCTTAGGAATT | 2051 | GGG | - | AAAAACAUAUCUUAGGAAUU | 5145 |
| TAAAAACATATCTTAGGAAT | 2052 | TGG | - | UAAAAACAUAUCUUAGGAAU | 5146 |
| CTTGCTTAAAAACATATCTT | 2053 | AGG | - | CUUGCUUAAAAACAUAUCUU | 5147 |
| CTAAGATATGTTTTTAAGCA | 2054 | AGG | + | CUAAGAUAUGUUUUUAAGCA | 5148 |
| ATGTTTTTAAGCAAGGTTAT | 2055 | TGG | + | AUGUUUUUAAGCAAGGUUAU | 5149 |
| CACGTCATTGCAAAGGGTTA | 2056 | AGG | - | CACGUCAUUGCAAAGGGUUA | 5150 |
| ACCCTTTGCAATGACGTGTC | 2057 | AGG | + | ACCCUUUGCAAUGACGUGUC | 5151 |
| TCCTGACACGTCATTGCAAA | 2058 | GGG | - | UCCUGACACGUCAUUGCAAA | 5152 |
| TTCCTGACACGTCATTGCAA | 2059 | AGG | - | UUCCUGACACGUCAUUGCAA | 5153 |
| GACAACTGGAAAAAAAAAAA | 2060 | AGG | - | GACAACUGGAAAAAAAAAAA | 5154 |
| TTTTTTTTTTCCAGTTGTC | 2061 | AGG | + | UUUUUUUUUUCCAGUUGUC | 5155 |
| TTTTTTCCAGTTGTCAGGCC | 2062 | TGG | + | UUUUUUCCAGUUGUCAGGCC | 5156 |
| CCAGTTGTCAGGCCTGGCAA | 2063 | TGG | + | CCAGUUGUCAGGCCUGGCAA | 5157 |
| CCATTGCCAGGCCTGACAAC | 2064 | TGG | - | CCAUUGCCAGGCCUGACAAC | 5158 |
| CAGGCCTGGCAATGGAGCCC | 2065 | AGG | + | CAGGCCUGGCAAUGGAGCCC | 5159 |
| AGGCCTGGCAATGGAGCCCA | 2066 | GGG | + | AGGCCUGGCAAUGGAGCCCA | 5160 |
| GGGCCCTGGGCTCCATTGCC | 2067 | AGG | - | GGGCCCUGGGCUCCAUUGCC | 5161 |
| TTTAGCAAGCACAGGGCCCT | 2068 | GGG | - | UUUAGCAAGCACAGGGCCCU | 5162 |
| GTTTAGCAAGCACAGGGCCC | 2069 | TGG | - | GUUUAGCAAGCACAGGGCCC | 5163 |
| GCCCTGTGCTTGCTAAACGA | 2070 | TGG | + | GCCCUGUGCUUGCUAAACGA | 5164 |
| GCCATCGTTTAGCAAGCACA | 2071 | GGG | - | GCCAUCGUUUAGCAAGCACA | 5165 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| AGCCATCGTTTAGCAAGCAC | 2072 | AGG | - | AGCCAUCGUUUAGCAAGCAC | 5166 |
| GCTGGGTATATATAACTTAG | 2073 | GGG | - | GCUGGGUAUAUAUAACUUAG | 5167 |
| AGCTGGGTATATATAACTTA | 2074 | GGG | - | AGCUGGGUAUAUAUAACUUA | 5168 |
| AAGCTGGGTATATATAACTT | 2075 | AGG | - | AAGCUGGGUAUAUAUAACUU | 5169 |
| ATATATACCCAGCTTATCCC | 2076 | AGG | + | AUAUAUACCCAGCUUAUCCC | 5170 |
| GAAAGATCCTGGGATAAGCT | 2077 | GGG | - | GAAAGAUCCUGGGAUAAGCU | 5171 |
| AGAAAGATCCTGGGATAAGC | 2078 | TGG | - | AGAAAGAUCCUGGGAUAAGC | 5172 |
| GAAAGTCTGAGAAAGATCCT | 2079 | GGG | - | GAAAGUCUGAGAAAGAUCCU | 5173 |
| AGAAAGTCTGAGAAAGATCC | 2080 | TGG | - | AGAAAGUCUGAGAAAGAUCC | 5174 |
| CTATCGATGTTGCTTCTCTT | 2081 | TGG | + | CUAUCGAUGUUGCUUCUCUU | 5175 |
| CTTTTTGTGAGAAAAGAGCA | 2082 | AGG | - | CUUUUUGUGAGAAAAGAGCA | 5176 |
| TCTAAGCAAGAACCCTTGTC | 2083 | TGG | + | UCUAAGCAAGAACCCUUGUC | 5177 |
| ATCTCTCTGACTCCAGACAA | 2084 | GGG | - | AUCUCUCUGACUCCAGACAA | 5178 |
| TATCTCTCTGACTCCAGACA | 2085 | AGG | - | UAUCUCUCUGACUCCAGACA | 5179 |
| GTCAGAGAGATAGCTTAGTC | 2086 | TGG | + | GUCAGAGAGAUAGCUUAGUC | 5180 |
| TTTAAACAAGAAAAGTTCTG | 2087 | GGG | - | UUUAAACAAGAAAAGUUCUG | 5181 |
| TTTTAAACAAGAAAAGTTCT | 2088 | GGG | - | UUUUAAACAAGAAAAGUUCU | 5182 |
| TTTTTAAACAAGAAAAGTTC | 2089 | TGG | - | UUUUUAAACAAGAAAAGUUC | 5183 |
| CAAACAAACAAACAAAAACT | 2090 | AGG | + | CAAACAAACAAACAAAAACU | 5184 |
| CAAAAACTAGGCATGACAGC | 2091 | TGG | + | CAAAAACUAGGCAUGACAGC | 5185 |
| ACTAGGCATGACAGCTGGAG | 2092 | AGG | + | ACUAGGCAUGACAGCUGGAG | 5186 |
| AGGCATGACAGCTGGAGAGG | 2093 | TGG | + | AGGCAUGACAGCUGGAGAGG | 5187 |
| ATTAACAGCACTTGTTAAAG | 2094 | AGG | + | AUUAACAGCACUUGUUAAAG | 5188 |
| TGTTAAAGAGGACCTCAGCT | 2095 | TGG | + | UGUUAAAGAGGACCUCAGCU | 5189 |
| AGGACCTCAGCTTGGTTCCC | 2096 | AGG | + | AGGACCUCAGCUUGGUUCCC | 5190 |
| GGACCTCAGCTTGGTTCCCA | 2097 | GGG | + | GGACCUCAGCUUGGUUCCCA | 5191 |
| GAGCCCTGGGAACCAAGCTG | 2098 | AGG | - | GAGCCCUGGGAACCAAGCUG | 5192 |
| AACTGGAGTTATAGAGCCCT | 2099 | GGG | - | AACUGGAGUUAUAGAGCCCU | 5193 |
| GAACTGGAGTTATAGAGCCC | 2100 | TGG | - | GAACUGGAGUUAUAGAGCCC | 5194 |
| GGCTCTATAACTCCAGTTCC | 2101 | AGG | + | GGCUCUAUAACUCCAGUUCC | 5195 |
| GCTCTATAACTCCAGTTCCA | 2102 | GGG | + | GCUCUAUAACUCCAGUUCCA | 5196 |
| GCTGTCTGAGGCCCTGGAAC | 2103 | TGG | - | GCUGUCUGAGGCCCUGGAAC | 5197 |
| CAGGAGGCTGTCTGAGGCCC | 2104 | TGG | - | CAGGAGGCUGUCUGAGGCCC | 5198 |
| AGGCTACAGGAGGCTGTCTG | 2105 | AGG | - | AGGCUACAGGAGGCUGUCUG | 5199 |
| ATGCATGAAGAGGCTACAGG | 2106 | AGG | - | AUGCAUGAAGAGGCUACAGG | 5200 |
| CTGATGCATGAAGAGGCTAC | 2107 | AGG | - | CUGAUGCAUGAAGAGGCUAC | 5201 |
| GCCTCTTCATGCATCAGACA | 2108 | TGG | + | GCCUCUUCAUGCAUCAGACA | 5202 |
| ACCATGTCTGATGCATGAAG | 2109 | AGG | - | ACCAUGUCUGAUGCAUGAAG | 5203 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| GACATGGTCCATATGCATGC | 2110 | AGG | + | GACAUGGUCCAUAUGCAUGC | 5204 |
| GTGTTTGACCTGCATGCATA | 2111 | TGG | - | GUGUUUGACCUGCAUGCAUA | 5205 |
| AAAAATAAAAGTCTAAAAAA | 2112 | AGG | + | AAAAAUAAAAGUCUAAAAAA | 5206 |
| CATGCTATAATCCCAGTGCT | 2113 | AGG | + | CAUGCUAUAAUCCCAGUGCU | 5207 |
| ATGCTATAATCCCAGTGCTA | 2114 | GGG | + | AUGCUAUAAUCCCAGUGCUA | 5208 |
| CTATAATCCCAGTGCTAGGG | 2115 | AGG | + | CUAUAAUCCCAGUGCUAGGG | 5209 |
| ACATTTGCCTCCCTAGCACT | 2116 | GGG | - | ACAUUUGCCUCCCUAGCACU | 5210 |
| GACATTTGCCTCCCTAGCAC | 2117 | TGG | - | GACAUUUGCCUCCCUAGCAC | 5211 |
| GTGCTAGGGAGGCAAATGTC | 2118 | TGG | + | GUGCUAGGGAGGCAAAUGUC | 5212 |
| GGCAAATGTCTGGACCTTGT | 2119 | CGG | + | GGCAAAUGUCUGGACCUUGU | 5213 |
| AATGTCTGGACCTTGTCGGT | 2120 | CGG | + | AAUGUCUGGACCUUGUCGGU | 5214 |
| GACTGACTGGCCGACCGACA | 2121 | AGG | - | GACUGACUGGCCGACCGACA | 5215 |
| TGACTGGCTGGCTGACTGAC | 2122 | TGG | - | UGACUGGCUGGCUGACUGAC | 5216 |
| GCTAGGCTAGACTGACTGGC | 2123 | TGG | - | GCUAGGCUAGACUGACUGGC | 5217 |
| CTATGCTAGGCTAGACTGAC | 2124 | TGG | - | CUAUGCUAGGCUAGACUGAC | 5218 |
| CTAGCCTAGCATAGCCTACT | 2125 | AGG | + | CUAGCCUAGCAUAGCCUACU | 5219 |
| CACACCTAGTAGGCTATGCT | 2126 | AGG | - | CACACCUAGUAGGCUAUGCU | 5220 |
| TGGGCTGGAGCACACCTAGT | 2127 | AGG | - | UGGGCUGGAGCACACCUAGU | 5221 |
| GACAAGGTCTCTCATTGGGC | 2128 | TGG | - | GACAAGGUCUCUCAUUGGGC | 5222 |
| TAGAGACAAGGTCTCTCATT | 2129 | GGG | - | UAGAGACAAGGUCUCUCAUU | 5223 |
| TTAGAGACAAGGTCTCTCAT | 2130 | TGG | - | UUAGAGACAAGGUCUCUCAU | 5224 |
| AGACCTTGTCTCTAAAAAAA | 2131 | AGG | + | AGACCUUGUCUCUAAAAAAA | 5225 |
| GACCTTGTCTCTAAAAAAAA | 2132 | GGG | + | GACCUUGUCUCUAAAAAAAA | 5226 |
| TACCCTTTTTTTTAGAGACA | 2133 | AGG | - | UACCCUUUUUUUUAGAGACA | 5227 |
| GGTAGAAAGAAAAGACAAAA | 2134 | TGG | + | GGUAGAAAGAAAAGACAAAA | 5228 |
| GACAAAATGGATGTCTCCTG | 2135 | AGG | + | GACAAAAUGGAUGUCUCCUG | 5229 |
| CTCCTGAGGAATGATACCCA | 2136 | CGG | + | CUCCUGAGGAAUGAUACCCA | 5230 |
| ATCCGTGGGTATCATTCCTC | 2137 | AGG | - | AUCCGUGGGUAUCAUUCCUC | 5231 |
| GGACAATTGTGGGTATCCGT | 2138 | GGG | - | GGACAAUUGUGGGUAUCCGU | 5232 |
| AGGACAATTGTGGGTATCCG | 2139 | TGG | - | AGGACAAUUGUGGGUAUCCG | 5233 |
| GGATACCCACAATTGTCCTC | 2140 | TGG | + | GGAUACCCACAAUUGUCCUC | 5234 |
| GGAGACCAGAGGACAATTGT | 2141 | GGG | - | GGAGACCAGAGGACAAUUGU | 5235 |
| CGGAGACCAGAGGACAATTG | 2142 | TGG | - | CGGAGACCAGAGGACAAUUG | 5236 |
| GTATTGCACACGGAGACCAG | 2143 | AGG | - | GUAUUGCACACGGAGACCAG | 5237 |
| ACATGGGTTTGTATTGCACA | 2144 | CGG | - | ACAUGGGUUUGUAUUGCACA | 5238 |
| TGTTGCAAATATTCAGACAT | 2145 | GGG | - | UGUUGCAAAUAUUCAGACAU | 5239 |
| CTGTTGCAAATATTCAGACA | 2146 | TGG | - | CUGUUGCAAAUAUUCAGACA | 5240 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| CATGTCTGAATATTTGCAAC | 2147 | AGG | + | CAUGUCUGAAUAUUUGCAAC | 5241 |
| ATGTCTGAATATTTGCAACA | 2148 | GGG | + | AUGUCUGAAUAUUUGCAACA | 5242 |
| AGCACAGCTTTACTAGATGA | 2149 | GGG | - | AGCACAGCUUUACUAGAUGA | 5243 |
| AAGCACAGCTTTACTAGATG | 2150 | AGG | - | AAGCACAGCUUUACUAGAUG | 5244 |
| CATCTAGTAAAGCTGTGCTT | 2151 | TGG | + | CAUCUAGUAAAGCUGUGCUU | 5245 |
| GAAAATAAGACAGATGGGA | 2152 | GGG | - | GAAAAUAAGACAGAUGGGA | 5246 |
| AGAAAATAAGACAGATGGG | 2153 | AGG | - | AGAAAAUAAGACAGAUGGG | 5247 |
| AGTAGAAAATAAGACAGAT | 2154 | GGG | - | AGUAGAAAAUAAGACAGAU | 5248 |
| CAGTAGAAAATAAGACAGA | 2155 | TGG | - | CAGUAGAAAAUAAGACAGA | 5249 |
| CATCTGTCTTATTTTCTAC | 2156 | TGG | + | CAUCUGUCUUAUUUUCUAC | 5250 |
| ATTTTTCTACTGGTGTGCTA | 2157 | AGG | + | AUUUUUCUACUGGUGUGCUA | 5251 |
| GTGCTAAGGCACCATGACCA | 2158 | AGG | + | GUGCUAAGGCACCAUGACCA | 5252 |
| TCTCTAAGTTGCCTTGGTCA | 2159 | TGG | - | UCUCUAAGUUGCCUUGGUCA | 5253 |
| TCTTCTTCTCTAAGTTGCCT | 2160 | TGG | - | UCUUCUUCUCUAAGUUGCCU | 5254 |
| GAAGAAGAAACAGTTTATTG | 2161 | AGG | + | GAAGAAGAAACAGUUUAUUG | 5255 |
| AAGAAGAAACAGTTTATTGA | 2162 | GGG | + | AAGAAGAAACAGUUUAUUGA | 5256 |
| TTGAGGGTTTATAGTTATAG | 2163 | AGG | + | UUGAGGGUUUAUAGUUAUAG | 5257 |
| TGAGGGTTTATAGTTATAGA | 2164 | GGG | + | UGAGGGUUUAUAGUUAUAGA | 5258 |
| GTTTATAGTTATAGAGGGTA | 2165 | AGG | + | GUUUAUAGUUAUAGAGGGUA | 5259 |
| TAGTTATAGAGGGTAAGGCA | 2166 | AGG | + | UAGUUAUAGAGGGUAAGGCA | 5260 |
| TAGAGGGTAAGGCAAGGACT | 2167 | TGG | + | UAGAGGGUAAGGCAAGGACU | 5261 |
| TAAGGCAAGGACTTGGTAGC | 2168 | AGG | + | UAAGGCAAGGACUUGGUAGC | 5262 |
| GCAAGGACTTGGTAGCAGGC | 2169 | AGG | + | GCAAGGACUUGGUAGCAGGC | 5263 |
| GGACTTGGTAGCAGGCAGGC | 2170 | AGG | + | GGACUUGGUAGCAGGCAGGC | 5264 |
| TTGGTAGCAGGCAGGCAGGC | 2171 | AGG | + | UUGGUAGCAGGCAGGCAGGC | 5265 |
| AGCAGGCAGGCAGGCAGGCA | 2172 | TGG | + | AGCAGGCAGGCAGGCAGGCA | 5266 |
| CAGGCAGGCAGGCATGGTAC | 2173 | TGG | + | CAGGCAGGCAGGCAUGGUAC | 5267 |
| CATGGTACTGGTGTAGTAGC | 2174 | TGG | + | CAUGGUACUGGUGUAGUAGC | 5268 |
| ATGGTACTGGTGTAGTAGCT | 2175 | GGG | + | AUGGUACUGGUGUAGUAGCU | 5269 |
| GGAGCTTGTATCTTGAGACA | 2176 | CGG | + | GGAGCUUGUAUCUUGAGACA | 5270 |
| AAAGCTGAGAGATAGCTAAG | 2177 | TGG | + | AAAGCUGAGAGAUAGCUAAG | 5271 |
| AAGCTGAGAGATAGCTAAGT | 2178 | GGG | + | AAGCUGAGAGAUAGCUAAGU | 5272 |
| GAGAGATAGCTAAGTGGGCC | 2179 | TGG | + | GAGAGAUAGCUAAGUGGGCC | 5273 |
| AGGTTTCAAAAGCTCACACC | 2180 | AGG | - | AGGUUUCAAAAGCUCACACC | 5274 |
| TTTCACTGGGGACAGCTTTG | 2181 | AGG | - | UUUCACUGGGGACAGCUUUG | 5275 |
| TTGATGGAGGCATTTCACTG | 2182 | GGG | - | UUGAUGGAGGCAUUUCACUG | 5276 |
| GTTGATGGAGGCATTTCACT | 2183 | GGG | - | GUUGAUGGAGGCAUUUCACU | 5277 |
| TGTTGATGGAGGCATTTCAC | 2184 | TGG | - | UGUUGAUGGAGGCAUUUCAC | 5278 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| GTGAAATGCCTCCATCAACA | 2185 | AGG | + | GUGAAAUGCCUCCAUCAACA | 5279 |
| AGGTGTGGCCTTGTTGATGG | 2186 | AGG | - | AGGUGUGGCCUUGUUGAUGG | 5280 |
| GTTAGGTGTGGCCTTGTTGA | 2187 | TGG | - | GUUAGGUGUGGCCUUGUUGA | 5281 |
| TGTTTGGGAAGGGTTAGGTG | 2188 | TGG | - | UGUUUGGGAAGGGUUAGGUG | 5282 |
| AGAACTGTTTGGGAAGGGTT | 2189 | AGG | - | AGAACUGUUUGGGAAGGGUU | 5283 |
| TTGGTAGAACTGTTTGGGAA | 2190 | GGG | - | UUGGUAGAACUGUUUGGGAA | 5284 |
| GTTGGTAGAACTGTTTGGGA | 2191 | AGG | - | GUUGGUAGAACUGUUUGGGA | 5285 |
| TCCCAAACAGTTCTACCAAC | 2192 | TGG | + | UCCCAAACAGUUCUACCAAC | 5286 |
| CCCAAACAGTTCTACCAACT | 2193 | GGG | + | CCCAAACAGUUCUACCAACU | 5287 |
| CCCAGTTGGTAGAACTGTTT | 2194 | GGG | - | CCCAGUUGGUAGAACUGUUU | 5288 |
| TCCCAGTTGGTAGAACTGTT | 2195 | TGG | - | UCCCAGUUGGUAGAACUGUU | 5289 |
| ATGAATGCTTGGTTCCCAGT | 2196 | TGG | - | AUGAAUGCUUGGUUCCCAGU | 5290 |
| CTGAGGCTCATATGAATGCT | 2197 | TGG | - | CUGAGGCUCAUAUGAAUGCU | 5291 |
| CAAGCATTCATATGAGCCTC | 2198 | AGG | + | CAAGCAUUCAUAUGAGCCUC | 5292 |
| AAGCATTCATATGAGCCTCA | 2199 | GGG | + | AAGCAUUCAUAUGAGCCUCA | 5293 |
| AGCATTCATATGAGCCTCAG | 2200 | GGG | + | AGCAUUCAUAUGAGCCUCAG | 5294 |
| TGAATGAGACTGCTCCCCTG | 2201 | AGG | - | UGAAUGAGACUGCUCCCCUG | 5295 |
| GTACTCAGTACACTGCCCCA | 2202 | TGG | + | GUACUCAGUACACUGCCCCA | 5296 |
| TACTCAGTACACTGCCCCAT | 2203 | GGG | + | UACUCAGUACACUGCCCCAU | 5297 |
| TTAGAGGACTTCTGCCCATG | 2204 | GGG | - | UUAGAGGACUUCUGCCCAUG | 5298 |
| TTTAGAGGACTTCTGCCCAT | 2205 | GGG | - | UUUAGAGGACUUCUGCCCAU | 5299 |
| GTTTAGAGGACTTCTGCCCA | 2206 | TGG | - | GUUUAGAGGACUUCUGCCCA | 5300 |
| ATGGGCAGAAGTCCTCTAAA | 2207 | CGG | + | AUGGGCAGAAGUCCUCUAAA | 5301 |
| ACACATTAGTAACCGTTTAG | 2208 | AGG | - | ACACAUUAGUAACCGUUUAG | 5302 |
| TATCCCTCACCATACTTAGA | 2209 | AGG | + | UAUCCCUCACCAUACUUAGA | 5303 |
| TTTCCTTCTAAGTATGGTGA | 2210 | GGG | - | UUUCCUUCUAAGUAUGGUGA | 5304 |
| GTTTCCTTCTAAGTATGGTG | 2211 | AGG | - | GUUUCCUUCUAAGUAUGGUG | 5305 |
| GGCTTGTTTCCTTCTAAGTA | 2212 | TGG | - | GGCUUGUUUCCUUCUAAGUA | 5306 |
| GGAAACAAGCCATCCCAAAA | 2213 | TGG | + | GGAAACAAGCCAUCCCAAAA | 5307 |
| TCATGCTATCCATTTTGGGA | 2214 | TGG | - | UCAUGCUAUCCAUUUUGGGA | 5308 |
| TGAGTCATGCTATCCATTTT | 2215 | GGG | - | UGAGUCAUGCUAUCCAUUUU | 5309 |
| CTGAGTCATGCTATCCATTT | 2216 | TGG | - | CUGAGUCAUGCUAUCCAUUU | 5310 |
| TTGCTCTGGGTGAAGTACAC | 2217 | AGG | - | UUGCUCUGGGUGAAGUACAC | 5311 |
| TACTTCACCCAGAGCAAATG | 2218 | TGG | + | UACUUCACCCAGAGCAAAUG | 5312 |
| ACCCAGAGCAAATGTGGATA | 2219 | CGG | + | ACCCAGAGCAAAUGUGGAUA | 5313 |
| ACCGTATCCACATTTGCTCT | 2220 | GGG | - | ACCGUAUCCACAUUUGCUCU | 5314 |
| CACCGTATCCACATTTGCTC | 2221 | TGG | - | CACCGUAUCCACAUUUGCUC | 5315 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| CAGAGCAAATGTGGATACGG | 2222 | TGG | + | CAGAGCAAAUGUGGAUACGG | 5316 |
| AGAGCAAATGTGGATACGGT | 2223 | GGG | + | AGAGCAAAUGUGGAUACGGU | 5317 |
| GTGGATACGGTGGGAAACAG | 2224 | AGG | + | GUGGAUACGGUGGGAAACAG | 5318 |
| GGGAAACAGAGGACAGTGAT | 2225 | AGG | + | GGGAAACAGAGGACAGUGAU | 5319 |
| AGGACAGTGATAGGACACAA | 2226 | AGG | + | AGGACAGUGAUAGGACACAA | 5320 |
| GTCTCAGTTTCTAGTTCAGA | 2227 | TGG | + | GUCUCAGUUUCUAGUUCAGA | 5321 |
| AGACATAAACCAACACACAT | 2228 | AGG | + | AGACAUAAACCAACACACAU | 5322 |
| TGTATCTTTCCTATGTGTGT | 2229 | TGG | - | UGUAUCUUUCCUAUGUGUGU | 5323 |
| ATAGGAAAGATACACTCCAC | 2230 | TGG | + | AUAGGAAAGAUACACUCCAC | 5324 |
| AGATACACTCCACTGGACAG | 2231 | TGG | + | AGAUACACUCCACUGGACAG | 5325 |
| GATACACTCCACTGGACAGT | 2232 | GGG | + | GAUACACUCCACUGGACAGU | 5326 |
| CATGGGCTCCCACTGTCCAG | 2233 | TGG | - | CAUGGGCUCCCACUGUCCAG | 5327 |
| CAGTGGGAGCCCATGCACAA | 2234 | AGG | + | CAGUGGGAGCCCAUGCACAA | 5328 |
| GCCCATGCACAAAGGTTCTT | 2235 | TGG | + | GCCCAUGCACAAAGGUUCUU | 5329 |
| GCCAAAGAACCTTTGTGCAT | 2236 | GGG | - | GCCAAAGAACCUUUGUGCAU | 5330 |
| AGCCAAAGAACCTTTGTGCA | 2237 | TGG | - | AGCCAAAGAACCUUUGUGCA | 5331 |
| TGACAGCAGTTTCTTATTAT | 2238 | TGG | + | UGACAGCAGUUUCUUAUUAU | 5332 |
| GACAGCAGTTTCTTATTATT | 2239 | GGG | + | GACAGCAGUUUCUUAUUAUU | 5333 |
| GATGAGCTTTGTTTCTGCCC | 2240 | TGG | + | GAUGAGCUUUGUUUCUGCCC | 5334 |
| ATGAGCTTTGTTTCTGCCCT | 2241 | GGG | + | AUGAGCUUUGUUUCUGCCCU | 5335 |
| CCCTGGGTGAGAGTTTATTT | 2242 | AGG | + | CCCUGGGUGAGAGUUUAUUU | 5336 |
| CCTAAATAAACTCTCACCCA | 2243 | GGG | - | CCUAAAUAAACUCUCACCCA | 5337 |
| TCCTAAATAAACTCTCACCC | 2244 | AGG | - | UCCUAAAUAAACUCUCACCC | 5338 |
| CACACTAAGACAACCACTGA | 2245 | TGG | + | CACACUAAGACAACCACUGA | 5339 |
| ACTTTGTTCTAGGCCATCAG | 2246 | TGG | - | ACUUUGUUCUAGGCCAUCAG | 5340 |
| CAGTGCTCTGACTTTGTTCT | 2247 | AGG | - | CAGUGCUCUGACUUUGUUCU | 5341 |
| AGTCAGAGCACTGTGCGTTG | 2248 | TGG | + | AGUCAGAGCACUGUGCGUUG | 5342 |
| CACTGTGCGTTGTGGATCTT | 2249 | AGG | + | CACUGUGCGUUGUGGAUCUU | 5343 |
| GATGCTTTAATCATCATGAA | 2250 | TGG | - | GAUGCUUUAAUCAUCAUGAA | 5344 |
| ACTAACACATTTTAATAGGA | 2251 | TGG | - | ACUAACACAUUUUAAUAGGA | 5345 |
| ATGGACTAACACATTTTAAT | 2252 | AGG | - | AUGGACUAACACAUUUUAAU | 5346 |
| AAAATGTGTTAGTCCATTTT | 2253 | TGG | + | AAAAUGUGUUAGUCCAUUUU | 5347 |
| AAATGTGTTAGTCCATTTTT | 2254 | GGG | + | AAAUGUGUUAGUCCAUUUUU | 5348 |
| AATGTGTTAGTCCATTTTTG | 2255 | GGG | + | AAUGUGUUAGUCCAUUUUUG | 5349 |
| AGTAAACATAACCCCAAAAA | 2256 | TGG | - | AGUAAACAUAACCCCAAAAA | 5350 |
| GGGTTATGTTTACTATACAA | 2257 | AGG | + | GGGUUAUGUUUACUAUACAA | 5351 |
| TTATGTTTACTATACAAAGG | 2258 | TGG | + | UUAUGUUUACUAUACAAAGG | 5352 |
| GTTTACTATACAAAGGTGGA | 2259 | AGG | + | GUUUACUAUACAAAGGUGGA | 5353 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| TTTACTATACAAAGGTGGAA | 2260 | GGG | + | UUUACUAUACAAAGGUGGAA | 5354 |
| TTACTATACAAAGGTGGAAG | 2261 | GGG | + | UUACUAUACAAAGGUGGAAG | 5355 |
| CAAAGGTGGAAGGGGTTATC | 2262 | TGG | + | CAAAGGUGGAAGGGGUUAUC | 5356 |
| GTTATCTGGCCCCATCTTAC | 2263 | AGG | + | GUUAUCUGGCCCCAUCUUAC | 5357 |
| ACACAGTTACCTGTAAGATG | 2264 | GGG | - | ACACAGUUACCUGUAAGAUG | 5358 |
| GACACAGTTACCTGTAAGAT | 2265 | GGG | - | GACACAGUUACCUGUAAGAU | 5359 |
| GGACACAGTTACCTGTAAGA | 2266 | TGG | - | GGACACAGUUACCUGUAAGA | 5360 |
| AGGTAACTGTGTCCCTTTTG | 2267 | TGG | + | AGGUAACUGUGUCCCUUUUG | 5361 |
| TGGTTTTTATATCCACAAAA | 2268 | GGG | - | UGGUUUUUAUAUCCACAAAA | 5362 |
| ATGGTTTTTATATCCACAAA | 2269 | AGG | - | AUGGUUUUUAUAUCCACAAA | 5363 |
| AATAAAATTGCAGTATCTGA | 2270 | TGG | - | AAUAAAAUUGCAGUAUCUGA | 5364 |
| TATTTTTGATTATGTGTCTG | 2271 | AGG | + | UAUUUUUGAUUAUGUGUCUG | 5365 |
| ATTTTTGATTATGTGTCTGA | 2272 | GGG | + | AUUUUUGAUUAUGUGUCUGA | 5366 |
| CAGTATGCACATCTGCATGC | 2273 | AGG | + | CAGUAUGCACAUCUGCAUGC | 5367 |
| CATCTGCATGCAGGTGCCTG | 2274 | TGG | + | CAUCUGCAUGCAGGUGCCUG | 5368 |
| CAGGTGCCTGTGGAAGCCTG | 2275 | TGG | + | CAGGUGCCUGUGGAAGCCUG | 5369 |
| ATGTCTCCACAGGCTTCCAC | 2276 | AGG | - | AUGUCUCCACAGGCUUCCAC | 5370 |
| AGGTGATCTGATGTCTCCAC | 2277 | AGG | - | AGGUGAUCUGAUGUCUCCAC | 5371 |
| GACATCAGATCACCTGAAGC | 2278 | TGG | + | GACAUCAGAUCACCUGAAGC | 5372 |
| TCACCTGAAGCTGGAGTTTC | 2279 | AGG | + | UCACCUGAAGCUGGAGUUUC | 5373 |
| CTGCCTGAAACTCCAGCTTC | 2280 | AGG | - | CUGCCUGAAACUCCAGCUUC | 5374 |
| AGTTTTATGCCACCAGACAC | 2281 | TGG | + | AGUUUUAUGCCACCAGACAC | 5375 |
| TTCTCAGCACCAGTGTCTGG | 2282 | TGG | - | UUCUCAGCACCAGUGUCUGG | 5376 |
| CTATTCTCAGCACCAGTGTC | 2283 | TGG | - | CUAUUCUCAGCACCAGUGUC | 5377 |
| ATAAAATATACTGCTTTTGC | 2284 | AGG | - | AUAAAAUAUACUGCUUUUGC | 5378 |
| GTTGCTTTTGGCTGGAGAGA | 2285 | TGG | - | GUUGCUUUUGGCUGGAGAGA | 5379 |
| TTTTAAAGGTTGCTTTTGGC | 2286 | TGG | - | UUUUAAAGGUUGCUUUUGGC | 5380 |
| CAGCTTTTAAAGGTTGCTTT | 2287 | TGG | - | CAGCUUUUAAAGGUUGCUUU | 5381 |
| AAAGCAACCTTTAAAAGCTG | 2288 | TGG | + | AAAGCAACCUUUAAAAGCUG | 5382 |
| ACATAAACCACAGCTTTTAA | 2289 | AGG | - | ACAUAAACCACAGCUUUUAA | 5383 |
| CTCTAAGTGGATGAATTAAA | 2290 | TGG | - | CUCUAAGUGGAUGAAUUAAA | 5384 |
| CATTTAATTCATCCACTTAG | 2291 | AGG | + | CAUUUAAUUCAUCCACUUAG | 5385 |
| ATTTAATTCATCCACTTAGA | 2292 | GGG | + | AUUUAAUUCAUCCACUUAGA | 5386 |
| ATTGAAGTGTACCCTCTAAG | 2293 | TGG | - | AUUGAAGUGUACCCUCUAAG | 5387 |
| AAAATATGCTTACAGATCTG | 2294 | TGG | + | AAAAUAUGCUUACAGAUCUG | 5388 |
| AAATATGCTTACAGATCTGT | 2295 | GGG | + | AAAUAUGCUUACAGAUCUGU | 5389 |
| TGCTAAAAGGGTTCTAAAAT | 2296 | TGG | - | UGCUAAAAGGGUUCUAAAAU | 5390 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| TAATATCTGTAGTGCTAAAA | 2297 | GGG | - | UAAUAUCUGUAGUGCUAAAA | 5391 |
| TTAATATCTGTAGTGCTAAA | 2298 | AGG | - | UUAAUAUCUGUAGUGCUAAA | 5392 |
| GCTGGGGGCTGGGGAGAATA | 2299 | GGG | - | GCUGGGGGCUGGGGAGAAUA | 5393 |
| AGCTGGGGGCTGGGGAGAAT | 2300 | AGG | - | AGCUGGGGGCUGGGGAGAAU | 5394 |
| GGGACTGGAGCTGGGGGCTG | 2301 | GGG | - | GGGACUGGAGCUGGGGGCUG | 5395 |
| AGGGACTGGAGCTGGGGGCT | 2302 | GGG | - | AGGGACUGGAGCUGGGGGCU | 5396 |
| CAGGGACTGGAGCTGGGGGC | 2303 | TGG | - | CAGGGACUGGAGCUGGGGGC | 5397 |
| CAGCCCCCAGCTCCAGTCCC | 2304 | TGG | + | CAGCCCCCAGCUCCAGUCCC | 5398 |
| ATGCCAGGGACTGGAGCTGG | 2305 | GGG | - | AUGCCAGGGACUGGAGCUGG | 5399 |
| GATGCCAGGGACTGGAGCTG | 2306 | GGG | - | GAUGCCAGGGACUGGAGCUG | 5400 |
| GGATGCCAGGGACTGGAGCT | 2307 | GGG | - | GGAUGCCAGGGACUGGAGCU | 5401 |
| TGGATGCCAGGGACTGGAGC | 2308 | TGG | - | UGGAUGCCAGGGACUGGAGC | 5402 |
| GATTTGTGGATGCCAGGGAC | 2309 | TGG | - | GAUUUGUGGAUGCCAGGGAC | 5403 |
| AAGGGGATTTGTGGATGCCA | 2310 | GGG | - | AAGGGGAUUUGUGGAUGCCA | 5404 |
| GAAGGGGATTTGTGGATGCC | 2311 | AGG | - | GAAGGGGAUUUGUGGAUGCC | 5405 |
| GATGGCAGGAAGGGGATTTG | 2312 | TGG | - | GAUGGCAGGAAGGGGAUUUG | 5406 |
| AATCTATAGATGGCAGGAAG | 2313 | GGG | - | AAUCUAUAGAUGGCAGGAAG | 5407 |
| GAATCTATAGATGGCAGGAA | 2314 | GGG | - | GAAUCUAUAGAUGGCAGGAA | 5408 |
| TGAATCTATAGATGGCAGGA | 2315 | AGG | - | UGAAUCUAUAGAUGGCAGGA | 5409 |
| GAGGTGAATCTATAGATGGC | 2316 | AGG | - | GAGGUGAAUCUAUAGAUGGC | 5410 |
| AGAAGAGGTGAATCTATAGA | 2317 | TGG | - | AGAAGAGGUGAAUCUAUAGA | 5411 |
| TTCAGTGTAAAGTCTAGAAG | 2318 | AGG | - | UUCAGUGUAAAGUCUAGAAG | 5412 |
| TTCTAGACTTTACACTGAAA | 2319 | TGG | + | UUCUAGACUUUACACUGAAA | 5413 |
| AAATGGTATTACACAACATG | 2320 | TGG | + | AAAUGGUAUUACACAACAUG | 5414 |
| TTGCTTGCCGTGTGTCTGTG | 2321 | AGG | + | UUGCUUGCCGUGUGUCUGUG | 5415 |
| AGATGAACCTCACAGACACA | 2322 | CGG | - | AGAUGAACCUCACAGACACA | 5416 |
| TCATCTGTGTTGAGCATGAA | 2323 | AGG | + | UCAUCUGUGUUGAGCAUGAA | 5417 |
| TAGGCGACAGGCATATTCAT | 2324 | GGG | - | UAGGCGACAGGCAUAUUCAU | 5418 |
| TTAGGCGACAGGCATATTCA | 2325 | TGG | - | UUAGGCGACAGGCAUAUUCA | 5419 |
| GTGTTGCTATTTTAGGCGAC | 2326 | AGG | - | GUGUUGCUAUUUUAGGCGAC | 5420 |
| TGTGAAAGTGTTGCTATTTT | 2327 | AGG | - | UGUGAAAGUGUUGCUAUUUU | 5421 |
| CCTTCTTTCTTCTTCCCAAG | 2328 | AGG | + | CCUUCUUUCUUCUUCCCAAG | 5422 |
| CCTCTTGGGAAGAAGAAAGA | 2329 | AGG | - | CCUCUUGGGAAGAAGAAAGA | 5423 |
| CTTCTTTCTTCTTCCCAAGA | 2330 | GGG | + | CUUCUUUCUUCUUCCCAAGA | 5424 |
| GCTGCAATAATGTCCCTCTT | 2331 | GGG | - | GCUGCAAUAAUGUCCCUCUU | 5425 |
| GGCTGCAATAATGTCCCTCT | 2332 | TGG | - | GGCUGCAAUAAUGUCCCUCU | 5426 |
| AGACACAGGAGAAAACTAGC | 2333 | AGG | - | AGACACAGGAGAAAACUAGC | 5427 |
| AGAAACACGAAAAAGACAC | 2334 | AGG | - | AGAAACACGAAAAAGACAC | 5428 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| CGTGTTTCTCAAGTAGATGA | 2335 | AGG | + | CGUGUUUCUCAAGUAGAUGA | 5429 |
| GTGTTTCTCAAGTAGATGAA | 2336 | GGG | + | GUGUUUCUCAAGUAGAUGAA | 5430 |
| TCTCAAGTAGATGAAGGGAC | 2337 | TGG | + | UCUCAAGUAGAUGAAGGGAC | 5431 |
| TTAGGAAACTGACAAAGCAG | 2338 | GGG | - | UUAGGAAACUGACAAAGCAG | 5432 |
| TTTAGGAAACTGACAAAGCA | 2339 | GGG | - | UUUAGGAAACUGACAAAGCA | 5433 |
| ATTTAGGAAACTGACAAAGC | 2340 | AGG | - | AUUUAGGAAACUGACAAAGC | 5434 |
| AATACAGTATTCACTCATTT | 2341 | AGG | - | AAUACAGUAUUCACUCAUUU | 5435 |
| AAATGAGTGAATACTGTATT | 2342 | TGG | + | AAAUGAGUGAAUACUGUAUU | 5436 |
| TATTTTGGTCTTTCTGATTG | 2343 | GGG | - | UAUUUUGGUCUUUCUGAUUG | 5437 |
| TTATTTTGGTCTTTCTGATT | 2344 | GGG | - | UUAUUUUGGUCUUUCUGAUU | 5438 |
| ATTATTTTGGTCTTTCTGAT | 2345 | TGG | - | AUUAUUUUGGUCUUUCUGAU | 5439 |
| GAGATTATTTTAAATTATTT | 2346 | TGG | - | GAGAUUAUUUUAAAUUAUUU | 5440 |
| ATCTCGTCTCTATATCACTA | 2347 | AGG | + | AUCUCGUCUCUAUAUCACUA | 5441 |
| CTAAGGTATCCTTTTCCACT | 2348 | TGG | + | CUAAGGUAUCCUUUUCCACU | 5442 |
| TAAGGTATCCTTTTCCACTT | 2349 | GGG | + | UAAGGUAUCCUUUUCCACUU | 5443 |
| CTGCATGGCCCAAGTGGAAA | 2350 | AGG | - | CUGCAUGGCCCAAGUGGAAA | 5444 |
| ATTTCTCTGCATGGCCCAAG | 2351 | TGG | - | AUUUCUCUGCAUGGCCCAAG | 5445 |
| GGCATGCTTATTTCTCTGCA | 2352 | TGG | - | GGCAUGCUUAUUUCUCUGCA | 5446 |
| GGGTGGGGTGGGGTCAATCA | 2353 | AGG | - | GGGUGGGGUGGGGUCAAUCA | 5447 |
| CTGGGGGTTGGGGTGGGGTG | 2354 | GGG | - | CUGGGGGUUGGGGUGGGGUG | 5448 |
| ACTGGGGGTTGGGGTGGGGT | 2355 | GGG | - | ACUGGGGGUUGGGGUGGGGU | 5449 |
| CACTGGGGGTTGGGGTGGGG | 2356 | TGG | - | CACUGGGGGUUGGGGUGGGG | 5450 |
| CACCCCACCCCAACCCCCAG | 2357 | TGG | + | CACCCCACCCCAACCCCCAG | 5451 |
| CACCACTGGGGGTTGGGGTG | 2358 | GGG | - | CACCACUGGGGGUUGGGGUG | 5452 |
| TCACCACTGGGGGTTGGGGT | 2359 | GGG | - | UCACCACUGGGGGUUGGGGU | 5453 |
| GTCACCACTGGGGGTTGGGG | 2360 | TGG | - | GUCACCACUGGGGGUUGGGG | 5454 |
| CTTGTCACCACTGGGGGTTG | 2361 | GGG | - | CUUGUCACCACUGGGGGUUG | 5455 |
| CCCAACCCCCAGTGGTGACA | 2362 | AGG | + | CCCAACCCCCAGUGGUGACA | 5456 |
| CCTTGTCACCACTGGGGGTT | 2363 | GGG | - | CCUUGUCACCACUGGGGGUU | 5457 |
| TCCTTGTCACCACTGGGGGT | 2364 | TGG | - | UCCUUGUCACCACUGGGGGU | 5458 |
| GAGGTCCTTGTCACCACTGG | 2365 | GGG | - | GAGGUCCUUGUCACCACUGG | 5459 |
| GGAGGTCCTTGTCACCACTG | 2366 | GGG | - | GGAGGUCCUUGUCACCACUG | 5460 |
| GGGAGGTCCTTGTCACCACT | 2367 | GGG | - | GGGAGGUCCUUGUCACCACU | 5461 |
| GGGGAGGTCCTTGTCACCAC | 2368 | TGG | - | GGGGAGGUCCUUGUCACCAC | 5462 |
| GGTGACAAGGACCTCCCCAG | 2369 | CGG | + | GGUGACAAGGACCUCCCCAG | 5463 |
| AAATGGTTGAGCCGCTGGGG | 2370 | AGG | - | AAAUGGUUGAGCCGCUGGGG | 5464 |
| TTCAAATGGTTGAGCCGCTG | 2371 | GGG | - | UUCAAAUGGUUGAGCCGCUG | 5465 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| ATTCAAATGGTTGAGCCGCT | 2372 | GGG | - | AUUCAAAUGGUUGAGCCGCU | 5466 |
| TATTCAAATGGTTGAGCCGC | 2373 | TGG | - | UAUUCAAAUGGUUGAGCCGC | 5467 |
| GCTCAACCATTTGAATAAAA | 2374 | AGG | + | GCUCAACCAUUUGAAUAAAA | 5468 |
| AAGTGTCCTTTTTATTCAAA | 2375 | TGG | - | AAGUGUCCUUUUUAUUCAAA | 5469 |
| ATCTTAGATTTGTGCAAAAT | 2376 | GGG | - | AUCUUAGAUUUGUGCAAAAU | 5470 |
| CATCTTAGATTTGTGCAAAA | 2377 | TGG | - | CAUCUUAGAUUUGUGCAAAA | 5471 |
| ACAAATCTAAGATGAGCAAG | 2378 | TGG | + | ACAAAUCUAAGAUGAGCAAG | 5472 |
| GTCACCTGTAAACATGTGCC | 2379 | TGG | + | GUCACCUGUAAACAUGUGCC | 5473 |
| TGCTCCAGGCACATGTTTAC | 2380 | AGG | - | UGCUCCAGGCACAUGUUUAC | 5474 |
| GTAAACATGTGCCTGGAGCA | 2381 | CGG | + | GUAAACAUGUGCCUGGAGCA | 5475 |
| CTCAGGTCGTTCCGTGCTCC | 2382 | AGG | - | CUCAGGUCGUUCCGUGCUCC | 5476 |
| GAGCACGGAACGACCTGAGT | 2383 | AGG | + | GAGCACGGAACGACCUGAGU | 5477 |
| CGACCTGAGTAGGCAGAAAA | 2384 | AGG | + | CGACCUGAGUAGGCAGAAAA | 5478 |
| CCTGAGTAGGCAGAAAAAGG | 2385 | TGG | + | CCUGAGUAGGCAGAAAAAGG | 5479 |
| CCACCTTTTTCTGCCTACTC | 2386 | AGG | - | CCACCUUUUUCUGCCUACUC | 5480 |
| ATTTATGATTTTCTTTTAA | 2387 | AGG | + | AUUUAUGAUUUUCUUUUAA | 5481 |
| AGTGAGAAAGGTGGGGAAA | 2388 | TGG | - | AGUGAGAAAGGUGGGGAAA | 5482 |
| TTGGAAAGTGAGAAAGGTGG | 2389 | GGG | - | UUGGAAAGUGAGAAAGGUGG | 5483 |
| GTTGGAAAGTGAGAAAGGTG | 2390 | GGG | - | GUUGGAAAGUGAGAAAGGUG | 5484 |
| TGTTGGAAAGTGAGAAAGGT | 2391 | GGG | - | UGUUGGAAAGUGAGAAAGGU | 5485 |
| TTGTTGGAAAGTGAGAAAGG | 2392 | TGG | - | UUGUUGGAAAGUGAGAAAGG | 5486 |
| ATATTGTTGGAAAGTGAGAA | 2393 | AGG | - | AUAUUGUUGGAAAGUGAGAA | 5487 |
| TTTCCAACAATATTATATTC | 2394 | TGG | + | UUUCCAACAAUAUUAUAUUC | 5488 |
| ACACCAGAATATAATATTGT | 2395 | TGG | - | ACACCAGAAUAUAAUAUUGU | 5489 |
| CTTTTATTCCCCAGTTGTTT | 2396 | TGG | + | CUUUUAUUCCCCAGUUGUUU | 5490 |
| TTTAATCACCAAAACAACTG | 2397 | GGG | - | UUUAAUCACCAAAACAACUG | 5491 |
| ATTTAATCACCAAAACAACT | 2398 | GGG | - | AUUUAAUCACCAAAACAACU | 5492 |
| GATTTAATCACCAAAACAAC | 2399 | TGG | - | GAUUUAAUCACCAAAACAAC | 5493 |
| TTTTGGTGATTAAATCATTT | 2400 | TGG | + | UUUUGGUGAUUAAAUCAUUU | 5494 |
| TTTGGTGATTAAATCATTTT | 2401 | GGG | + | UUUGGUGAUUAAAUCAUUUU | 5495 |
| TTGGTGATTAAATCATTTTG | 2402 | GGG | + | UUGGUGAUUAAAUCAUUUUG | 5496 |
| TGGTGATTAAATCATTTTGG | 2403 | GGG | + | UGGUGAUUAAAUCAUUUUGG | 5497 |
| ACTCTCATTCACTGCTCCCT | 2404 | TGG | + | ACUCUCAUUCACUGCUCCCU | 5498 |
| AAAAAAACACTGTCACCAA | 2405 | GGG | - | AAAAAAACACUGUCACCAA | 5499 |
| GAAAAAAACACTGTCACCA | 2406 | AGG | - | GAAAAAAACACUGUCACCA | 5500 |
| GCAGAGACAGAGGGAACAGC | 2407 | AGG | - | GCAGAGACAGAGGGAACAGC | 5501 |
| TGAAAATGAGCAGAGACAGA | 2408 | GGG | - | UGAAAAUGAGCAGAGACAGA | 5502 |
| ATGAAAATGAGCAGAGACAG | 2409 | AGG | - | AUGAAAAUGAGCAGAGACAG | 5503 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| CTGTCTCTGCTCATTTTCAT | 2410 | AGG | + | CUGUCUCUGCUCAUUUUCAU | 5504 |
| TGCTCATTTTCATAGGAATC | 2411 | TGG | + | UGCUCAUUUUCAUAGGAAUC | 5505 |
| ATCTGGCACCTTAGAATCCC | 2412 | AGG | + | AUCUGGCACCUUAGAAUCCC | 5506 |
| GCAGGCAGCCTGGGATTCTA | 2413 | AGG | - | GCAGGCAGCCUGGGAUUCUA | 5507 |
| CATTTGACTGCAGGCAGCCT | 2414 | GGG | - | CAUUUGACUGCAGGCAGCCU | 5508 |
| GCATTTGACTGCAGGCAGCC | 2415 | TGG | - | GCAUUUGACUGCAGGCAGCC | 5509 |
| CCTGCAGTCAAATGCTTGCT | 2416 | AGG | + | CCUGCAGUCAAAUGCUUGCU | 5510 |
| CCTAGCAAGCATTTGACTGC | 2417 | AGG | - | CCUAGCAAGCAUUUGACUGC | 5511 |
| CTGCAGTCAAATGCTTGCTA | 2418 | GGG | + | CUGCAGUCAAAUGCUUGCUA | 5512 |
| CAGTCAAATGCTTGCTAGGG | 2419 | AGG | + | CAGUCAAAUGCUUGCUAGGG | 5513 |
| AGTCAAATGCTTGCTAGGGA | 2420 | GGG | + | AGUCAAAUGCUUGCUAGGGA | 5514 |
| GTCAAATGCTTGCTAGGGAG | 2421 | GGG | + | GUCAAAUGCUUGCUAGGGAG | 5515 |
| TTGCTAGGGAGGGGAGCCAG | 2422 | TGG | + | UUGCUAGGGAGGGGAGCCAG | 5516 |
| TGCTAGGGAGGGGAGCCAGT | 2423 | GGG | + | UGCUAGGGAGGGGAGCCAGU | 5517 |
| TAGGGAGGGGAGCCAGTGGG | 2424 | TGG | + | UAGGGAGGGGAGCCAGUGGG | 5518 |
| AGGGAGGGGAGCCAGTGGGT | 2425 | GGG | + | AGGGAGGGGAGCCAGUGGGU | 5519 |
| GGGAGGGGAGCCAGTGGGTG | 2426 | GGG | + | GGGAGGGGAGCCAGUGGGUG | 5520 |
| GGAGGGGAGCCAGTGGGTGG | 2427 | GGG | + | GGAGGGGAGCCAGUGGGUGG | 5521 |
| TTGCAGGTTCCCCCACCCAC | 2428 | TGG | - | UUGCAGGUUCCCCCACCCAC | 5522 |
| ATTTGGAGTTGATTTCTTGC | 2429 | AGG | - | AUUUGGAGUUGAUUUCUUGC | 5523 |
| AAATCAACTCCAAATTTAAT | 2430 | AGG | + | AAAUCAACUCCAAAUUUAAU | 5524 |
| GAGCTTAGTCCTATTAAATT | 2431 | TGG | - | GAGCUUAGUCCUAUUAAAUU | 5525 |
| CTGCTAATCAGGCATGGTGT | 2432 | AGG | - | CUGCUAAUCAGGCAUGGUGU | 5526 |
| ACCATGCCTGATTAGCAGCT | 2433 | AGG | + | ACCAUGCCUGAUUAGCAGCU | 5527 |
| ACCTAGCTGCTAATCAGGCA | 2434 | TGG | - | ACCUAGCUGCUAAUCAGGCA | 5528 |
| ATGAGACCTAGCTGCTAATC | 2435 | AGG | - | AUGAGACCUAGCUGCUAAUC | 5529 |
| GGTCTCATCCTTACCCCTCC | 2436 | AGG | + | GGUCUCAUCCUUACCCCUCC | 5530 |
| TCCTTACCCCTCCAGGAATA | 2437 | AGG | + | UCCUUACCCCUCCAGGAAUA | 5531 |
| TCCTTATTCCTGGAGGGGTA | 2438 | AGG | - | UCCUUAUUCCUGGAGGGGUA | 5532 |
| TACCCCTCCAGGAATAAGGA | 2439 | AGG | + | UACCCCUCCAGGAAUAAGGA | 5533 |
| AACCTTCCTTATTCCTGGAG | 2440 | GGG | - | AACCUUCCUUAUUCCUGGAG | 5534 |
| CAACCTTCCTTATTCCTGGA | 2441 | GGG | - | CAACCUUCCUUAUUCCUGGA | 5535 |
| GCAACCTTCCTTATTCCTGG | 2442 | AGG | - | GCAACCUUCCUUAUUCCUGG | 5536 |
| TCTGCAACCTTCCTTATTCC | 2443 | TGG | - | UCUGCAACCUUCCUUAUUCC | 5537 |
| AGGTTGCAGAAGTCCCTGAA | 2444 | AGG | + | AGGUUGCAGAAGUCCCUGAA | 5538 |
| GGCTCAGCAAATACCTTTCA | 2445 | GGG | - | GGCUCAGCAAAUACCUUUCA | 5539 |
| AGGCTCAGCAAATACCTTTC | 2446 | AGG | - | AGGCUCAGCAAAUACCUUUC | 5540 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| GCTGAGCCTCTTGTGAACCG | 2447 | TGG | + | GCUGAGCCUCUUGUGAACCG | 5541 |
| CTGAGCCTCTTGTGAACCGT | 2448 | GGG | + | CUGAGCCUCUUGUGAACCGU | 5542 |
| GCCTCTTGTGAACCGTGGGT | 2449 | TGG | + | GCCUCUUGUGAACCGUGGGU | 5543 |
| GCCAACCCACGGTTCACAAG | 2450 | AGG | - | GCCAACCCACGGUUCACAAG | 5544 |
| AGTTCAGGTGAGCCAACCCA | 2451 | CGG | - | AGUUCAGGUGAGCCAACCCA | 5545 |
| AAGAATATCTACTAAAGTTC | 2452 | AGG | - | AAGAAUAUCUACUAAAGUUC | 5546 |
| ATATTCTTTAGCGACATATT | 2453 | TGG | + | AUAUUCUUUAGCGACAUAUU | 5547 |
| TATTCTTTAGCGACATATTT | 2454 | GGG | + | UAUUCUUUAGCGACAUAUUU | 5548 |
| TTAGCGACATATTTGGGCTT | 2455 | TGG | + | UUAGCGACAUAUUUGGGCUU | 5549 |
| TGTGGAGAGATAAAGAGAG | 2456 | AGG | - | UGUGGAGAGAUAAAGAGAG | 5550 |
| TTATCTCTCCACAAAAGTCT | 2457 | TGG | + | UUAUCUCUCCACAAAAGUCU | 5551 |
| TCAGTTTGCCAAGACTTTTG | 2458 | TGG | - | UCAGUUUGCCAAGACUUUUG | 5552 |
| TGATGTTTATGCAACCAGTA | 2459 | AGG | + | UGAUGUUUAUGCAACCAGUA | 5553 |
| TATGCAACCAGTAAGGCCTC | 2460 | TGG | + | UAUGCAACCAGUAAGGCCUC | 5554 |
| ATGCAACCAGTAAGGCCTCT | 2461 | GGG | + | AUGCAACCAGUAAGGCCUCU | 5555 |
| TGCAACCAGTAAGGCCTCTG | 2462 | GGG | + | UGCAACCAGUAAGGCCUCUG | 5556 |
| CTCAGCCCCAGAGGCCTTAC | 2463 | TGG | - | CUCAGCCCCAGAGGCCUUAC | 5557 |
| CAGTAAGGCCTCTGGGCTG | 2464 | AGG | + | CAGUAAGGCCUCUGGGCUG | 5558 |
| AGTAAGGCCTCTGGGCTGA | 2465 | GGG | + | AGUAAGGCCUCUGGGCUGA | 5559 |
| GTAAGGCCTCTGGGCTGAG | 2466 | GGG | + | GUAAGGCCUCUGGGCUGAG | 5560 |
| TAAGGCCTCTGGGCTGAGG | 2467 | GGG | + | UAAGGCCUCUGGGCUGAGG | 5561 |
| GGCCTCTGGGCTGAGGGGG | 2468 | TGG | + | GGCCUCUGGGCUGAGGGGG | 5562 |
| GCCTCTGGGCTGAGGGGGT | 2469 | GGG | + | GCCUCUGGGCUGAGGGGGU | 5563 |
| TCCCACCCCCTCAGCCCCAG | 2470 | AGG | - | UCCCACCCCCUCAGCCCCAG | 5564 |
| CTGAGGGGGTGGGAAGCCAG | 2471 | TGG | + | CUGAGGGGGUGGGAAGCCAG | 5565 |
| TGAGGGGGTGGGAAGCCAGT | 2472 | GGG | + | UGAGGGGGUGGGAAGCCAGU | 5566 |
| GGGGGTGGGAAGCCAGTGGG | 2473 | TGG | + | GGGGGUGGGAAGCCAGUGGG | 5567 |
| GGTGGGAAGCCAGTGGGTGG | 2474 | CGG | + | GGUGGGAAGCCAGUGGGUGG | 5568 |
| TTGCAGGTTCCGCCACCCAC | 2475 | TGG | - | UUGCAGGUUCCGCCACCCAC | 5569 |
| ATTTGGGGCGGATTTCTTGC | 2476 | AGG | - | AUUUGGGGCGGAUUUCUUGC | 5570 |
| AGAAATCCGCCCCAAATTTA | 2477 | AGG | + | AGAAAUCCGCCCCAAAUUUA | 5571 |
| ATGCTTCCTTAAATTTGGGG | 2478 | CGG | - | AUGCUUCCUUAAAUUUGGGG | 5572 |
| CCCCAAATTTAAGGAAGCAT | 2479 | AGG | + | CCCCAAAUUUAAGGAAGCAU | 5573 |
| CCTATGCTTCCTTAAATTTG | 2480 | GGG | - | CCUAUGCUUCCUUAAAUUUG | 5574 |
| TCCTATGCTTCCTTAAATTT | 2481 | GGG | - | UCCUAUGCUUCCUUAAAUUU | 5575 |
| TTCCTATGCTTCCTTAAATT | 2482 | TGG | - | UUCCUAUGCUUCCUUAAAUU | 5576 |
| CCTACCCTATGTCTGCCTTG | 2483 | TGG | + | CCUACCCUAUGUCUGCCUUG | 5577 |
| CCACAAGGCAGACATAGGGT | 2484 | AGG | - | CCACAAGGCAGACAUAGGGU | 5578 |

TABLE 3-continued

Mouse Rs1 Intron 1 Guide RNA Target Sequences and Guide Sequences.

| Target | SEQ ID NO. | PAM | Direction | Guide | SEQ ID NO. |
| --- | --- | --- | --- | --- | --- |
| CTAGCCACAAGGCAGACATA | 2485 | GGG | - | CUAGCCACAAGGCAGACAUA | 5579 |
| CCTATGTCTGCCTTGTGGCT | 2486 | AGG | + | CCUAUGUCUGCCUUGUGGCU | 5580 |
| CCTAGCCACAAGGCAGACAT | 2487 | AGG | - | CCUAGCCACAAGGCAGACAU | 5581 |
| GAACTAAGGACCTAGCCACA | 2488 | AGG | - | GAACUAAGGACCUAGCCACA | 5582 |
| TCCTTAGTTCATTGTCTCTT | 2489 | AGG | + | UCCUUAGUUCAUUGUCUCUU | 5583 |
| ACCTAAGAGACAATGAACTA | 2490 | AGG | - | ACCUAAGAGACAAUGAACUA | 5584 |
| TTCTACTCTCAAGAGAATCT | 2491 | GGG | - | UUCUACUCUCAAGAGAAUCU | 5585 |
| CTTCTACTCTCAAGAGAATC | 2492 | TGG | - | CUUCUACUCUCAAGAGAAUC | 5586 |
| CAGATTCTCTTGAGAGTAGA | 2493 | AGG | + | CAGAUUCUCUUGAGAGUAGA | 5587 |
| ATTCTCTTGAGAGTAGAAGG | 2494 | TGG | + | AUUCUCUUGAGAGUAGAAGG | 5588 |
| TCTCGGATTTGTTAATCAGG | 2495 | AGG | - | UCUCGGAUUUGUUAAUCAGG | 5589 |
| TCCTGATTAACAAATCCGAG | 2496 | AGG | + | UCCUGAUUAACAAAUCCGAG | 5590 |
| ACCTCTCGGATTTGTTAATC | 2497 | AGG | - | ACCUCUCGGAUUUGUUAAUC | 5591 |
| TTCATGAGATTAGCACCTCT | 2498 | CGG | - | UUCAUGAGAUUAGCACCUCU | 5592 |
| GCTAATCTCATGAATTCTCC | 2499 | CGG | + | GCUAAUCUCAUGAAUUCUCC | 5593 |
| TCATGAATTCTCCCGGACTA | 2500 | TGG | + | UCAUGAAUUCUCCCGGACUA | 5594 |
| GCTATATATAACCATAGTCC | 2501 | GGG | - | GCUAUAUAUAACCAUAGUCC | 5595 |
| AGCTATATATAACCATAGTC | 2502 | CGG | - | AGCUAUAUAUAACCAUAGUC | 5596 |
| TCAGTGATCTCATGTAGCTT | 2503 | AGG | + | UCAGUGAUCUCAUGUAGCUU | 5597 |
| TGATCTCATGTAGCTTAGGC | 2504 | TGG | + | UGAUCUCAUGUAGCUUAGGC | 5598 |
| CTCATGTAGCTTAGGCTGGC | 2505 | TGG | + | CUCAUGUAGCUUAGGCUGGC | 5599 |
| TTGAGCTCACTATGAAGCAA | 2506 | AGG | + | UUGAGCUCACUAUGAAGCAA | 5600 |
| AAGGATGACCCTGAACTTCT | 2507 | TGG | + | AAGGAUGACCCUGAACUUCU | 5601 |
| CAGGAAAACCAAGAAGTTCA | 2508 | GGG | - | CAGGAAAACCAAGAAGUUCA | 5602 |
| GCAGGAAAACCAAGAAGTTC | 2509 | AGG | - | GCAGGAAAACCAAGAAGUUC | 5603 |
| AGCACTTGGAAGATGAAAGC | 2510 | AGG | - | AGCACUUGGAAGAUGAAAGC | 5604 |
| ATTCTTGTAATCGCAGCACT | 2511 | TGG | - | AUUCUUGUAAUCGCAGCACU | 5605 |
| GCTGCCATGTCTAGTTCATG | 2512 | TGG | + | GCUGCCAUGUCUAGUUCAUG | 5606 |
| AGCACCACATGAACTAGACA | 2513 | TGG | - | AGCACCACAUGAACUAGACA | 5607 |
| TGTCTAGTTCATGTGGTGCT | 2514 | AGG | + | UGUCUAGUUCAUGUGGUGCU | 5608 |
| GTCTAGTTCATGTGGTGCTA | 2515 | GGG | + | GUCUAGUUCAUGUGGUGCUA | 5609 |
| GGTGCTAGGGATCAACCCTG | 2516 | AGG | + | GGUGCUAGGGAUCAACCCUG | 5610 |
| TTAACATGCACAAAGCCTCA | 2517 | GGG | - | UUAACAUGCACAAAGCCUCA | 5611 |
| CTTAACATGCACAAAGCCTC | 2518 | AGG | - | CUUAACAUGCACAAAGCCUC | 5612 |
| ATTCTTTTGAGTCAGGGTCA | 2519 | GGG | - | AUUCUUUUGAGUCAGGGUCA | 5613 |
| TATTCTTTTGAGTCAGGGTC | 2520 | AGG | - | UAUUCUUUUGAGUCAGGGUC | 5614 |
| TGACCCTGACTCAAAAGAAT | 2521 | AGG | + | UGACCCUGACUCAAAAGAAU | 5615 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| GACCCTGACTCAAAAGAATA | 2522 | GGG | + | GACCCUGACUCAAAAGAAUA | 5616 |
| ACCCTGACTCAAAAGAATAG | 2523 | GGG | + | ACCCUGACUCAAAAGAAUAG | 5617 |
| CCCTGACTCAAAAGAATAGG | 2524 | GGG | + | CCCUGACUCAAAAGAAUAGG | 5618 |
| CCCCCTATTCTTTTGAGTCA | 2525 | GGG | - | CCCCCUAUUCUUUUGAGUCA | 5619 |
| CCTGACTCAAAAGAATAGGG | 2526 | GGG | + | CCUGACUCAAAAGAAUAGGG | 5620 |
| CCCCCCTATTCTTTTGAGTC | 2527 | AGG | - | CCCCCCUAUUCUUUUGAGUC | 5621 |
| CTGACTCAAAAGAATAGGGG | 2528 | GGG | + | CUGACUCAAAAGAAUAGGGG | 5622 |
| ACTCAAAAGAATAGGGGGGG | 2529 | AGG | + | ACUCAAAAGAAUAGGGGGGG | 5623 |
| AAAAGAATAGGGGGGGAGGA | 2530 | AGG | + | AAAAGAAUAGGGGGGGAGGA | 5624 |
| GAATAGGGGGGAGGAAGGA | 2531 | AGG | + | GAAUAGGGGGGAGGAAGGA | 5625 |
| AGGGGGGAGGAAGGAAGGA | 2532 | AGG | + | AGGGGGGAGGAAGGAAGGA | 5626 |
| GGGGAGGAAGGAAGGAAGGA | 2533 | AGG | + | GGGGAGGAAGGAAGGAAGGA | 5627 |
| AGGAAGGAAGGAAGGAAGGA | 2534 | AGG | + | AGGAAGGAAGGAAGGAAGGA | 5628 |
| AGGAAGGAAGGAAGGAAGGA | 2535 | AGG | + | AGGAAGGAAGGAAGGAAGGA | 5629 |
| GGAAGGAAGGAAGGAAGGAA | 2536 | GGG | + | GGAAGGAAGGAAGGAAGGAA | 5630 |
| AGGAAGGAAGGAAGGAAGGG | 2537 | AGG | + | AGGAAGGAAGGAAGGAAGGG | 5631 |
| GGAAGGAAGGAAGGAAGGGA | 2538 | GGG | + | GGAAGGAAGGAAGGAAGGGA | 5632 |
| AGGAAGGAAGGAAGGGAGGG | 2539 | AGG | + | AGGAAGGAAGGAAGGGAGGG | 5633 |
| GGAAGGAAGGAAGGGAGGGA | 2540 | GGG | + | GGAAGGAAGGAAGGGAGGGA | 5634 |
| AGGAAGGAAGGGAGGGAGGG | 2541 | AGG | + | AGGAAGGAAGGGAGGGAGGG | 5635 |
| GGAAGGAAGGGAGGGAGGGA | 2542 | GGG | + | GGAAGGAAGGGAGGGAGGGA | 5636 |
| AGGAAGGGAGGGAGGGAGGG | 2543 | AGG | + | AGGAAGGGAGGGAGGGAGGG | 5637 |
| GGAAGGGAGGGAGGGAGGGA | 2544 | GGG | + | GGAAGGGAGGGAGGGAGGGA | 5638 |
| AGGGAGGGAGGGAGGGAGGG | 2545 | AGG | + | AGGGAGGGAGGGAGGGAGGG | 5639 |
| GGGAGGGAGGGAGGGAGGGA | 2546 | GGG | + | GGGAGGGAGGGAGGGAGGGA | 5640 |
| AGGGAGGGAGGGAGGGAGGG | 2547 | AGG | + | AGGGAGGGAGGGAGGGAGGG | 5641 |
| GGGAGGGAGGGAGGGAGGGA | 2548 | GGG | + | GGGAGGGAGGGAGGGAGGGA | 5642 |
| AGGGAGGGAGGGAGGGAGGG | 2549 | AGG | + | AGGGAGGGAGGGAGGGAGGG | 5643 |
| GGGAGGGAGGGAGGGAGGGA | 2550 | GGG | + | GGGAGGGAGGGAGGGAGGGA | 5644 |
| AGGGAGGGAGGGAGGGAGGG | 2551 | AGG | + | AGGGAGGGAGGGAGGGAGGG | 5645 |
| GGGAGGGAGGGAGGGAGGGA | 2552 | GGG | + | GGGAGGGAGGGAGGGAGGGA | 5646 |
| AGGGAGGGAGGGAGGGAGGG | 2553 | AGG | + | AGGGAGGGAGGGAGGGAGGG | 5647 |
| GGGAGGGAGGGAGGGAGGGA | 2554 | GGG | + | GGGAGGGAGGGAGGGAGGGA | 5648 |
| AGGGAGGGAGGGAGGGAGGG | 2555 | AGG | + | AGGGAGGGAGGGAGGGAGGG | 5649 |
| AGGGAGGGAGGGAGGGAGGA | 2556 | AGG | + | AGGGAGGGAGGGAGGGAGGA | 5650 |
| GATGTTGAGAACAAAAGCCA | 2557 | AGG | + | GAUGUUGAGAACAAAAGCCA | 5651 |
| GAACAAAAGCCAAGGCCAAC | 2558 | AGG | + | GAACAAAAGCCAAGGCCAAC | 5652 |
| GCCAAGGCCAACAGGTGAGT | 2559 | TGG | + | GCCAAGGCCAACAGGUGAGU | 5653 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| CCAAGGCCAACAGGTGAGTT | 2560 | GGG | + | CCAAGGCCAACAGGUGAGUU | 5654 |
| CCCAACTCACCTGTTGGCCT | 2561 | TGG | - | CCCAACUCACCUGUUGGCCU | 5655 |
| CCAACAGGTGAGTTGGGATT | 2562 | AGG | + | CCAACAGGUGAGUUGGGAUU | 5656 |
| CCTAATCCCAACTCACCTGT | 2563 | TGG | - | CCUAAUCCCAACUCACCUGU | 5657 |
| AAAAGTCCTTTTCATAGCAA | 2564 | AGG | + | AAAAGUCCUUUUCAUAGCAA | 5658 |
| AAAGTCCTTTTCATAGCAAA | 2565 | GGG | + | AAAGUCCUUUUCAUAGCAAA | 5659 |
| AAGTCCTTTTCATAGCAAAG | 2566 | GGG | + | AAGUCCUUUUCAUAGCAAAG | 5660 |
| ACATCCCCTTTGCTATGAAA | 2567 | AGG | - | ACAUCCCCUUUGCUAUGAAA | 5661 |
| TTTTCATAGCAAAGGGGATG | 2568 | TGG | + | UUUUCAUAGCAAAGGGGAUG | 5662 |
| GTGGAAGAAGAGAAGTTGAC | 2569 | AGG | + | GUGGAAGAAGAGAAGUUGAC | 5663 |
| AGAGAAGTTGACAGGTAAGT | 2570 | AGG | + | AGAGAAGUUGACAGGUAAGU | 5664 |
| GAGAAGTTGACAGGTAAGTA | 2571 | GGG | + | GAGAAGUUGACAGGUAAGUA | 5665 |
| AGAAAAAGAAAAAAATCTG | 2572 | TGG | + | AGAAAAAGAAAAAAAUCUG | 5666 |
| AAGAAAAAATCTGTGGACC | 2573 | AGG | + | AAGAAAAAAUCUGUGGACC | 5667 |
| AGAAAAAATCTGTGGACCA | 2574 | GGG | + | AGAAAAAAUCUGUGGACCA | 5668 |
| AAAATCTGTGGACCAGGGCA | 2575 | TGG | + | AAAAUCUGUGGACCAGGGCA | 5669 |
| CTGCGTTTCTTGCCATGCCC | 2576 | TGG | - | CUGCGUUUCUUGCCAUGCCC | 5670 |
| GAGCAAATGTTCATAAAGAG | 2577 | AGG | + | GAGCAAAUGUUCAUAAAGAG | 5671 |
| CAAATGTTCATAAAGAGAGG | 2578 | TGG | + | CAAAUGUUCAUAAAGAGAGG | 5672 |
| AAATGTTCATAAAGAGAGGT | 2579 | GGG | + | AAAUGUUCAUAAAGAGAGGU | 5673 |
| GTTCATAAAGAGAGGTGGGC | 2580 | AGG | + | GUUCAUAAAGAGAGGUGGGC | 5674 |
| CATAAAGAGAGGTGGGCAGG | 2581 | AGG | + | CAUAAAGAGAGGUGGGCAGG | 5675 |
| GGTGGGCAGGAGGCAGACCA | 2582 | TGG | + | GGUGGGCAGGAGGCAGACCA | 5676 |
| TCTGATGAGTCTTGAGACCA | 2583 | TGG | - | UCUGAUGAGUCUUGAGACCA | 5677 |
| CAAGACTCATCAGAGAGATA | 2584 | AGG | + | CAAGACUCAUCAGAGAGAUA | 5678 |
| AGAGATAAGGCAATATCCTG | 2585 | AGG | + | AGAGAUAAGGCAAUAUCCUG | 5679 |
| TCCTGAGGAGCACCCATCTG | 2586 | AGG | + | UCCUGAGGAGCACCCAUCUG | 5680 |
| CCTGAGGAGCACCCATCTGA | 2587 | GGG | + | CCUGAGGAGCACCCAUCUGA | 5681 |
| CCCTCAGATGGGTGCTCCTC | 2588 | AGG | - | CCCUCAGAUGGGUGCUCCUC | 5682 |
| CTGAGGAGCACCCATCTGAG | 2589 | GGG | + | CUGAGGAGCACCCAUCUGAG | 5683 |
| TTGCTCAACGCCCCTCAGAT | 2590 | GGG | - | UUGCUCAACGCCCCUCAGAU | 5684 |
| CTTGCTCAACGCCCCTCAGA | 2591 | TGG | - | CUUGCUCAACGCCCCUCAGA | 5685 |
| TCTGAGGGGCGTTGAGCAAG | 2592 | TGG | + | UCUGAGGGGCGUUGAGCAAG | 5686 |
| CTGAGGGGCGTTGAGCAAGT | 2593 | GGG | + | CUGAGGGGCGUUGAGCAAGU | 5687 |
| CATTTCTCTGCATTCACAGA | 2594 | TGG | + | CAUUUCUCUGCAUUCACAGA | 5688 |
| TTCTCTGCATTCACAGATGG | 2595 | AGG | + | UUCUCUGCAUUCACAGAUGG | 5689 |
| TGCAACTATCTTTAGCAGTG | 2596 | AGG | + | UGCAACUAUCUUUAGCAGUG | 5690 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| TCTTTAGCAGTGAGGCATGC | 2597 | TGG | + | UCUUUAGCAGUGAGGCAUGC | 5691 |
| CTTTAGCAGTGAGGCATGCT | 2598 | GGG | + | CUUUAGCAGUGAGGCAUGCU | 5692 |
| ATGCTGGGTAGTGCTAAGAG | 2599 | CGG | + | AUGCUGGGUAGUGCUAAGAG | 5693 |
| TGCTGGGTAGTGCTAAGAGC | 2600 | GGG | + | UGCUGGGUAGUGCUAAGAGC | 5694 |
| TGGGTAGTGCTAAGAGCGGG | 2601 | CGG | + | UGGGUAGUGCUAAGAGCGGG | 5695 |
| GGGTAGTGCTAAGAGCGGGC | 2602 | GGG | + | GGGUAGUGCUAAGAGCGGGC | 5696 |
| GGTAGTGCTAAGAGCGGGCG | 2603 | GGG | + | GGUAGUGCUAAGAGCGGGCG | 5697 |
| CTAAGAGCGGGCGGGGTCTG | 2604 | TGG | + | CUAAGAGCGGGCGGGGUCUG | 5698 |
| AGCGGGCGGGGTCTGTGGAA | 2605 | TGG | + | AGCGGGCGGGGUCUGUGGAA | 5699 |
| GCGGGGTCTGTGGAATGGAG | 2606 | AGG | + | GCGGGGUCUGUGGAAUGGAG | 5700 |
| AATGACGTGGTAATAAGGAG | 2607 | TGG | - | AAUGACGUGGUAAUAAGGAG | 5701 |
| AGTAAAATGACGTGGTAATA | 2608 | AGG | - | AGUAAAAUGACGUGGUAAUA | 5702 |
| TAATCAAAGTAAAATGACG | 2609 | TGG | - | UAAUCAAAGUAAAAUGACG | 5703 |
| CTATGTATCTTGCCTCTTGA | 2610 | CGG | + | CUAUGUAUCUUGCCUCUUGA | 5704 |
| GTACTTGTGTGACCGTCAAG | 2611 | AGG | - | GUACUUGUGUGACCGUCAAG | 5705 |
| AGTACTTCCAGTTGAAGAGT | 2612 | AGG | + | AGUACUUCCAGUUGAAGAGU | 5706 |
| TGTAATGCCTACTCTTCAAC | 2613 | TGG | - | UGUAAUGCCUACUCUUCAAC | 5707 |
| GTTGAAGAGTAGGCATTACA | 2614 | AGG | + | GUUGAAGAGUAGGCAUUACA | 5708 |
| TCTGCTTCCATGAATATTCT | 2615 | AGG | + | UCUGCUUCCAUGAAUAUUCU | 5709 |
| CTGCTTCCATGAATATTCTA | 2616 | GGG | + | CUGCUUCCAUGAAUAUUCUA | 5710 |
| AATGTGCCCTAGAATATTCA | 2617 | TGG | - | AAUGUGCCCUAGAAUAUUCA | 5711 |
| CTAGGGCACATTTTTATTCC | 2618 | AGG | + | CUAGGGCACAUUUUUAUUCC | 5712 |
| TGCTTTCATATATTTTTCC | 2619 | TGG | - | UGCUUUCAUAUAUUUUUCC | 5713 |
| AAAGCATTTCTAATTATGAA | 2620 | TGG | + | AAAGCAUUUCUAAUUAUGAA | 5714 |
| TTTCTAATTATGAATGGAAT | 2621 | TGG | + | UUUCUAAUUAUGAAUGGAAU | 5715 |
| CTAATTATGAATGGAATTGG | 2622 | TGG | + | CUAAUUAUGAAUGGAAUUGG | 5716 |
| TGAATGGAATTGGTGGTTTA | 2623 | TGG | + | UGAAUGGAAUUGGUGGUUUA | 5717 |
| GAATGGAATTGGTGGTTTAT | 2624 | GGG | + | GAAUGGAAUUGGUGGUUUAU | 5718 |
| AATGGAATTGGTGGTTTATG | 2625 | GGG | + | AAUGGAAUUGGUGGUUUAUG | 5719 |
| GGAACACATATGCTCAGCCT | 2626 | TGG | + | GGAACACAUAUGCUCAGCCU | 5720 |
| GGTTTTGGTAATTTATTCCA | 2627 | AGG | - | GGUUUUGGUAAUUUAUUCCA | 5721 |
| ATAAATTACCAAAACCAAAG | 2628 | AGG | + | AUAAAUUACCAAAACCAAAG | 5722 |
| GAGTCTAGCCTCTTTGGTTT | 2629 | TGG | - | GAGUCUAGCCUCUUUGGUUU | 5723 |
| AGAAGGGAGTCTAGCCTCTT | 2630 | TGG | - | AGAAGGGAGUCUAGCCUCUU | 5724 |
| GCTTCTGTTGATCGGTAGAA | 2631 | GGG | - | GCUUCUGUUGAUCGGUAGAA | 5725 |
| TGCTTCTGTTGATCGGTAGA | 2632 | AGG | - | UGCUUCUGUUGAUCGGUAGA | 5726 |
| TCTTATATGCTTCTGTTGAT | 2633 | CGG | - | UCUUAUAUGCUUCUGUUGAU | 5727 |
| CAACAGAAGCATATAAGAGT | 2634 | TGG | + | CAACAGAAGCAUAUAAGAGU | 5728 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| TTCTCTACTCTACCAACTTG | 2635 | TGG | + | UUCUCUACUCUACCAACUUG | 5729 |
| CTACTCTACCAACTTGTGGT | 2636 | TGG | + | CUACUCUACCAACUUGUGGU | 5730 |
| TACTCTACCAACTTGTGGTT | 2637 | GGG | + | UACUCUACCAACUUGUGGUU | 5731 |
| AACAGGACCCAACCACAAGT | 2638 | TGG | - | AACAGGACCCAACCACAAGU | 5732 |
| GTCCTGTTTAGAATAATAAG | 2639 | AGG | + | GUCCUGUUUAGAAUAAUAAG | 5733 |
| TGCCTCTTATTATTCTAAAC | 2640 | AGG | - | UGCCUCUUAUUAUUCUAAAC | 5734 |
| GCATCTACATGTAGAGCTCT | 2641 | AGG | + | GCAUCUACAUGUAGAGCUCU | 5735 |
| TCTAGGAAGCCATTCAATGC | 2642 | AGG | + | UCUAGGAAGCCAUUCAAUGC | 5736 |
| GGTTTAGATCCTGCATTGAA | 2643 | TGG | - | GGUUUAGAUCCUGCAUUGAA | 5737 |
| TCAATGCAGGATCTAAACCT | 2644 | TGG | + | UCAAUGCAGGAUCUAAACCU | 5738 |
| CACAGACATTGCTAAAGCCA | 2645 | AGG | - | CACAGACAUUGCUAAAGCCA | 5739 |
| TGGCTTTAGCAATGTCTGTG | 2646 | CGG | + | UGGCUUUAGCAAUGUCUGUG | 5740 |
| AGCAATGTCTGTGCGGTACT | 2647 | TGG | + | AGCAAUGUCUGUGCGGUACU | 5741 |
| CAAAGAAAACCAAGATTTAT | 2648 | CGG | + | CAAAGAAAACCAAGAUUUAU | 5742 |
| AAAACCAAGATTTATCGGAA | 2649 | TGG | + | AAAACCAAGAUUUAUCGGAA | 5743 |
| ACCAAGATTTATCGGAATGG | 2650 | TGG | + | ACCAAGAUUUAUCGGAAUGG | 5744 |
| TCCACCATTCCGATAAATCT | 2651 | TGG | - | UCCACCAUUCCGAUAAAUCU | 5745 |
| GGTGGACACTGAAAGTAGAC | 2652 | AGG | + | GGUGGACACUGAAAGUAGAC | 5746 |
| ACACTGAAAGTAGACAGGAA | 2653 | AGG | + | ACACUGAAAGUAGACAGGAA | 5747 |
| CCTAGTGTGCAGTGTGCAGA | 2654 | TGG | + | CCUAGUGUGCAGUGUGCAGA | 5748 |
| CCATCTGCACACTGCACACT | 2655 | AGG | - | CCAUCUGCACACUGCACACU | 5749 |
| GTGTGCAGTGTGCAGATGGA | 2656 | AGG | + | GUGUGCAGUGUGCAGAUGGA | 5750 |
| TGTGCAGTGTGCAGATGGAA | 2657 | GGG | + | UGUGCAGUGUGCAGAUGGAA | 5751 |
| TGCAGATGGAAGGGCAGTGC | 2658 | TGG | + | UGCAGAUGGAAGGGCAGUGC | 5752 |
| GCAGATGGAAGGGCAGTGCT | 2659 | GGG | + | GCAGAUGGAAGGGCAGUGCU | 5753 |
| CAGATGGAAGGGCAGTGCTG | 2660 | GGG | + | CAGAUGGAAGGGCAGUGCUG | 5754 |
| TGGGGAGAATCCATTGCATT | 2661 | TGG | + | UGGGGAGAAUCCAUUGCAUU | 5755 |
| CTTCTTCTTTCCAAATGCAA | 2662 | TGG | - | CUUCUUCUUUCCAAAUGCAA | 5756 |
| TTAGCAAAAGAAATCGCAGA | 2663 | GGG | - | UUAGCAAAAGAAAUCGCAGA | 5757 |
| ATTAGCAAAAGAAATCGCAG | 2664 | AGG | - | AUUAGCAAAAGAAAUCGCAG | 5758 |
| GCGATTTCTTTTGCTAATGC | 2665 | AGG | + | GCGAUUUCUUUUGCUAAUGC | 5759 |
| AAGCAAGTACTACAGTGAAA | 2666 | AGG | - | AAGCAAGUACUACAGUGAAA | 5760 |
| TTCACTGTAGTACTTGCTTG | 2667 | TGG | + | UUCACUGUAGUACUUGCUUG | 5761 |
| ACTGTAGTACTTGCTTGTGG | 2668 | TGG | + | ACUGUAGUACUUGCUUGUGG | 5762 |
| TGTGGTGGTTTGAATGAAAA | 2669 | TGG | + | UGUGGUGGUUUGAAUGAAAA | 5763 |
| TGAATGAAAATGGTCCCCAC | 2670 | AGG | + | UGAAUGAAAAUGGUCCCCAC | 5764 |
| GTTTTCAAAAATAGCCTGTG | 2671 | GGG | - | GUUUUCAAAAAUAGCCUGUG | 5765 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| AGTTTTCAAAAATAGCCTGT | 2672 | GGG | - | AGUUUUCAAAAAUAGCCUGU | 5766 |
| AAGTTTTCAAAAATAGCCTG | 2673 | TGG | - | AAGUUUUCAAAAAUAGCCUG | 5767 |
| TTGAAAACTTGATCCCCAGT | 2674 | TGG | + | UUGAAAACUUGAUCCCCAGU | 5768 |
| CCCCAGTTGGTGAAACTGTT | 2675 | TGG | + | CCCCAGUUGGUGAAACUGUU | 5769 |
| CCAAACAGTTTCACCAACTG | 2676 | GGG | - | CCAAACAGUUUCACCAACUG | 5770 |
| TCCAAACAGTTTCACCAACT | 2677 | GGG | - | UCCAAACAGUUUCACCAACU | 5771 |
| TTCCAAACAGTTTCACCAAC | 2678 | TGG | - | UUCCAAACAGUUUCACCAAC | 5772 |
| GTTGGTGAAACTGTTTGGAA | 2679 | AGG | + | GUUGGUGAAACUGUUUGGAA | 5773 |
| GAAACTGTTTGGAAGGATT | 2680 | AGG | + | GAAACUGUUUGGAAGGAUU | 5774 |
| TTGGAAGGATTAGGAAGTG | 2681 | TGG | + | UUGGAAGGAUUAGGAAGUG | 5775 |
| ATTAGGAAGTGTGGCCTTGC | 2682 | TGG | + | AUUAGGAAGUGUGGCCUUGC | 5776 |
| AAGTGTGGCCTTGCTGGATG | 2683 | AGG | + | AAGUGUGGCCUUGCUGGAUG | 5777 |
| TTGACAGACCTCATCCAGCA | 2684 | AGG | - | UUGACAGACCUCAUCCAGCA | 5778 |
| TGCTGGATGAGGTCTGTCAA | 2685 | TGG | + | UGCUGGAUGAGGUCUGUCAA | 5779 |
| TGGATGAGGTCTGTCAATGG | 2686 | CGG | + | UGGAUGAGGUCUGUCAAUGG | 5780 |
| TGAGGTCTGTCAATGGCGGA | 2687 | AGG | + | UGAGGUCUGUCAAUGGCGGA | 5781 |
| GAGACAGAGAGAGGCACACT | 2688 | GGG | - | GAGACAGAGAGAGGCACACU | 5782 |
| GGAGACAGAGAGAGGCACAC | 2689 | TGG | - | GGAGACAGAGAGAGGCACAC | 5783 |
| AATAAGTAGGAGACAGAGAG | 2690 | AGG | - | AAUAAGUAGGAGACAGAGAG | 5784 |
| TCATTTTTCAATCAATAAGT | 2691 | AGG | - | UCAUUUUUCAAUCAAUAAGU | 5785 |
| AATTCTGGATGGCAGAGCAA | 2692 | AGG | - | AAUUCUGGAUGGCAGAGCAA | 5786 |
| TGGGTGATTAGAATTCTGGA | 2693 | TGG | - | UGGGUGAUUAGAAUUCUGGA | 5787 |
| GTTTTGGGTGATTAGAATTC | 2694 | TGG | - | GUUUUGGGUGAUUAGAAUUC | 5788 |
| TAATTAGGCTATATGGTTTT | 2695 | GGG | - | UAAUUAGGCUAUAUGGUUUU | 5789 |
| TTAATTAGGCTATATGGTTT | 2696 | TGG | - | UUAAUUAGGCUAUAUGGUUU | 5790 |
| CAGTATTTAATTAGGCTATA | 2697 | TGG | - | CAGUAUUUAAUUAGGCUAUA | 5791 |
| TATAAAACAGTATTTAATT | 2698 | AGG | - | UAUAAAACAGUAUUUAAUU | 5792 |
| ACTGTTTTATAAGTTACCT | 2699 | TGG | + | ACUGUUUUUAUAAGUUACCU | 5793 |
| TTTATAAGTTACCTTGGTCA | 2700 | TGG | + | UUUAUAAGUUACCUUGGUCA | 5794 |
| TACCTTGGTCATGGTACTTT | 2701 | AGG | + | UACCUUGGUCAUGGUACUUU | 5795 |
| ATCCTAAAGTACCATGACCA | 2702 | AGG | - | AUCCUAAAGUACCAUGACCA | 5796 |
| TAGTTAAGAAACTAAGACAT | 2703 | TGG | + | UAGUUAAGAAACUAAGACAU | 5797 |
| CTTAACCAAAACACCACAGA | 2704 | CGG | + | CUUAACCAAAACACCACAGA | 5798 |
| TTAACCAAAACACCACAGAC | 2705 | GGG | + | UUAACCAAAACACCACAGAC | 5799 |
| CAAGCCCGTCTGTGGTGTTT | 2706 | TGG | - | CAAGCCCGUCUGUGGUGUUU | 5800 |
| GTCATATGCAAGCCCGTCTG | 2707 | TGG | - | GUCAUAUGCAAGCCCGUCUG | 5801 |
| GCATATGACAACAGTTCTAG | 2708 | AGG | + | GCAUAUGACAACAGUUCUAG | 5802 |
| CCCTGATCAAATGCCCTAGC | 2709 | AGG | + | CCCUGAUCAAAUGCCCUAGC | 5803 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| CCTGCTAGGGCATTTGATCA | 2710 | GGG | - | CCUGCUAGGGCAUUUGAUCA | 5804 |
| ACCTGCTAGGGCATTTGATC | 2711 | AGG | - | ACCUGCUAGGGCAUUUGAUC | 5805 |
| ATCAGACACAGAACCTGCTA | 2712 | GGG | - | AUCAGACACAGAACCUGCUA | 5806 |
| CATCAGACACAGAACCTGCT | 2713 | AGG | - | CAUCAGACACAGAACCUGCU | 5807 |
| AGCAGGTTCTGTGTCTGATG | 2714 | AGG | + | AGCAGGUUCUGUGUCUGAUG | 5808 |
| GCAGGTTCTGTGTCTGATGA | 2715 | GGG | + | GCAGGUUCUGUGUCUGAUGA | 5809 |
| CTGTGTCTGATGAGGGCTGC | 2716 | TGG | + | CUGUGUCUGAUGAGGGCUGC | 5810 |
| TGATGAGGGCTGCTGGTTCA | 2717 | TGG | + | UGAUGAGGGCUGCUGGUUCA | 5811 |
| GATGAGGGCTGCTGGTTCAT | 2718 | GGG | + | GAUGAGGGCUGCUGGUUCAU | 5812 |
| GAGGGCTGCTGGTTCATGGG | 2719 | TGG | + | GAGGGCUGCUGGUUCAUGGG | 5813 |
| CTTTTTCTCAGTGTCCTTAC | 2720 | AGG | + | CUUUUUCUCAGUGUCCUUAC | 5814 |
| TTTCTCAGTGTCCTTACAGG | 2721 | TGG | + | UUUCUCAGUGUCCUUACAGG | 5815 |
| TCAGTGTCCTTACAGGTGGA | 2722 | AGG | + | UCAGUGUCCUUACAGGUGGA | 5816 |
| CTGGATACCTTCCACCTGTA | 2723 | AGG | - | CUGGAUACCUUCCACCUGUA | 5817 |
| TGGAAGGTATCCAGCTTTCT | 2724 | TGG | + | UGGAAGGUAUCCAGCUUUCU | 5818 |
| AATATAAGGTCCAAGAAAGC | 2725 | TGG | - | AAUAUAAGGUCCAAGAAAGC | 5819 |
| GGAATGCGTGCTTTAATATA | 2726 | AGG | - | GGAAUGCGUGCUUUAAUAUA | 5820 |
| AAGCTATCTACTCACATCAA | 2727 | TGG | - | AAGCUAUCUACUCACAUCAA | 5821 |
| GAGGTGCTTAAATCACTTTG | 2728 | GGG | - | GAGGUGCUUAAAUCACUUUG | 5822 |
| GGAGGTGCTTAAATCACTTT | 2729 | GGG | - | GGAGGUGCUUAAAUCACUUU | 5823 |
| TGGAGGTGCTTAAATCACTT | 2730 | TGG | - | UGGAGGUGCUUAAAUCACUU | 5824 |
| CCTCCAAAACCCTCCGTCTC | 2731 | CGG | + | CCUCCAAAACCCUCCGUCUC | 5825 |
| CCGGAGACGGAGGGTTTTGG | 2732 | AGG | - | CCGGAGACGGAGGGUUUUGG | 5826 |
| CATCCGGAGACGGAGGGTTT | 2733 | TGG | - | CAUCCGGAGACGGAGGGUUU | 5827 |
| GGGGAGCATCCGGAGACGGA | 2734 | GGG | - | GGGGAGCAUCCGGAGACGGA | 5828 |
| GGGGGAGCATCCGGAGACGG | 2735 | AGG | - | GGGGGAGCAUCCGGAGACGG | 5829 |
| AATGGGGAGCATCCGGAGA | 2736 | CGG | - | AAUGGGGAGCAUCCGGAGA | 5830 |
| GTCTCCGGATGCTCCCCAT | 2737 | TGG | + | GUCUCCGGAUGCUCCCCAU | 5831 |
| TTCACCAATGGGGAGCATC | 2738 | CGG | - | UUCACCAAUGGGGAGCAUC | 5832 |
| TGAAATCTGTTCACCAATGG | 2739 | GGG | - | UGAAAUCUGUUCACCAAUGG | 5833 |
| TTGAAATCTGTTCACCAATG | 2740 | GGG | - | UUGAAAUCUGUUCACCAAUG | 5834 |
| GTTGAAATCTGTTCACCAAT | 2741 | GGG | - | GUUGAAAUCUGUUCACCAAU | 5835 |
| TGTTGAAATCTGTTCACCAA | 2742 | TGG | - | UGUUGAAAUCUGUUCACCAA | 5836 |
| TTTCAACATAGCAATTGAGC | 2743 | AGG | + | UUUCAACAUAGCAAUUGAGC | 5837 |
| CAACATAGCAATTGAGCAGG | 2744 | AGG | + | CAACAUAGCAAUUGAGCAGG | 5838 |
| TAGCAATTGAGCAGGAGGAA | 2745 | AGG | + | UAGCAAUUGAGCAGGAGGAA | 5839 |
| CTGGCTGTGATCAAATAATT | 2746 | TGG | - | CUGGCUGUGAUCAAAUAAUU | 5840 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| TTTGATCACAGCCAGTACTT | 2747 | TGG | + | UUUGAUCACAGCCAGUACUU | 5841 |
| TTGGGTGTTCACCAAAGTAC | 2748 | TGG | - | UUGGGUGUUCACCAAAGUAC | 5842 |
| GTGAACACCCAAACCCAGCA | 2749 | TGG | + | GUGAACACCCAAACCCAGCA | 5843 |
| TTCAGCTCCATGCTGGGTTT | 2750 | GGG | - | UUCAGCUCCAUGCUGGGUUU | 5844 |
| ATTCAGCTCCATGCTGGGTT | 2751 | TGG | - | AUUCAGCUCCAUGCUGGGUU | 5845 |
| CAGATATTCAGCTCCATGCT | 2752 | GGG | - | CAGAUAUUCAGCUCCAUGCU | 5846 |
| ACAGATATTCAGCTCCATGC | 2753 | TGG | - | ACAGAUAUUCAGCUCCAUGC | 5847 |
| CTGTAATCTCAGTATCCAGC | 2754 | AGG | + | CUGUAAUCUCAGUAUCCAGC | 5848 |
| TAATCTCAGTATCCAGCAGG | 2755 | TGG | + | UAAUCUCAGUAUCCAGCAGG | 5849 |
| AGTATCCAGCAGGTGGATAT | 2756 | TGG | + | AGUAUCCAGCAGGUGGAUAU | 5850 |
| GTATCCAGCAGGTGGATATT | 2757 | GGG | + | GUAUCCAGCAGGUGGAUAUU | 5851 |
| TATCCAGCAGGTGGATATTG | 2758 | GGG | + | UAUCCAGCAGGUGGAUAUUG | 5852 |
| ATTCCCCAATATCCACCTGC | 2759 | TGG | - | AUUCCCCAAUAUCCACCUGC | 5853 |
| ATTGGGGAATTAAGACTTCA | 2760 | AGG | + | AUUGGGGAAUUAAGACUUCA | 5854 |
| TAAGACTTCAAGGCCAGACT | 2761 | TGG | + | UAAGACUUCAAGGCCAGACU | 5855 |
| ACTTACTATGTAGCCAAGTC | 2762 | TGG | - | ACUUACUAUGUAGCCAAGUC | 5856 |
| TAGTAAGTTTGATGCCATCC | 2763 | TGG | + | UAGUAAGUUUGAUGCCAUCC | 5857 |
| AGTAAGTTTGATGCCATCCT | 2764 | GGG | + | AGUAAGUUUGAUGCCAUCCU | 5858 |
| GGATCTCATATAGCCCAGGA | 2765 | TGG | - | GGAUCUCAUAUAGCCCAGGA | 5859 |
| AACAGGATCTCATATAGCCC | 2766 | AGG | - | AACAGGAUCUCAUAUAGCCC | 5860 |
| TATTTGGGGTTTTGGAAAC | 2767 | AGG | - | UAUUUGGGGGUUUUGGAAAC | 5861 |
| TTGTTTCTATTTGGGGGTTT | 2768 | TGG | - | UUGUUUCUAUUUGGGGGUUU | 5862 |
| TTTTTATTGTTTCTATTTGG | 2769 | GGG | - | UUUUUAUUGUUUCUAUUUGG | 5863 |
| TTTTTTATTGTTTCTATTTG | 2770 | GGG | - | UUUUUUAUUGUUUCUAUUUG | 5864 |
| TTTTTTTATTGTTTCTATTT | 2771 | GGG | - | UUUUUUUAUUGUUUCUAUUU | 5865 |
| ATTTTTTTATTGTTTCTATT | 2772 | TGG | - | AUUUUUUUAUUGUUUCUAUU | 5866 |
| AAATAGAAACAATAAAAAAA | 2773 | TGG | + | AAAUAGAAACAAUAAAAAAA | 5867 |
| TAGGGTAGCAGTGAACATGA | 2774 | AGG | - | UAGGGUAGCAGUGAACAUGA | 5868 |
| ATGTTCACTGCTACCCTAGA | 2775 | AGG | + | AUGUUCACUGCUACCCUAGA | 5869 |
| CAAGCAAAACTGACCTTCTA | 2776 | GGG | - | CAAGCAAAACUGACCUUCUA | 5870 |
| ACAAGCAAAACTGACCTTCT | 2777 | AGG | - | ACAAGCAAAACUGACCUUCU | 5871 |
| TTGTAACAGATGACTAACAG | 2778 | AGG | + | UUGUAACAGAUGACUAACAG | 5872 |
| AGATGACTAACAGAGGAACA | 2779 | AGG | + | AGAUGACUAACAGAGGAACA | 5873 |
| CTAACAGAGGAACAAGGTCC | 2780 | CGG | + | CUAACAGAGGAACAAGGUCC | 5874 |
| AGCATACTGGTAGCTCTTCC | 2781 | GGG | - | AGCAUACUGGUAGCUCUUCC | 5875 |
| CAGCATACTGGTAGCTCTTC | 2782 | CGG | - | CAGCAUACUGGUAGCUCUUC | 5876 |
| CGGAAGAGCTACCAGTATGC | 2783 | TGG | + | CGGAAGAGCUACCAGUAUGC | 5877 |
| TTCATTGGCAGCCAGCATAC | 2784 | TGG | - | UUCAUUGGCAGCCAGCAUAC | 5878 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| TAAGACTTCAGCAGCTTCAT | 2785 | TGG | - | UAAGACUUCAGCAGCUUCAU | 5879 |
| GCTGAAGTCTTAGTAGATTT | 2786 | AGG | + | GCUGAAGUCUUAGUAGAUUU | 5880 |
| CTTAGTAGATTTAGGAGCTA | 2787 | TGG | + | CUUAGUAGAUUUAGGAGCUA | 5881 |
| CTGGGGCTGTGATGGAAGTC | 2788 | AGG | - | CUGGGGCUGUGAUGGAAGUC | 5882 |
| TGGTGGTGCTGGGGCTGTGA | 2789 | TGG | - | UGGUGGUGCUGGGGCUGUGA | 5883 |
| TCACAGCCCCAGCACCACCA | 2790 | TGG | + | UCACAGCCCCAGCACCACCA | 5884 |
| CACAGCCCCAGCACCACCAT | 2791 | GGG | + | CACAGCCCCAGCACCACCAU | 5885 |
| CAGTGCCCATGGTGGTGCTG | 2792 | GGG | - | CAGUGCCCAUGGUGGUGCUG | 5886 |
| GCAGTGCCCATGGTGGTGCT | 2793 | GGG | - | GCAGUGCCCAUGGUGGUGCU | 5887 |
| GGCAGTGCCCATGGTGGTGC | 2794 | TGG | - | GGCAGUGCCCAUGGUGGUGC | 5888 |
| CTGCTGGGCAGTGCCCATGG | 2795 | TGG | - | CUGCUGGGCAGUGCCCAUGG | 5889 |
| AGACTGCTGGGCAGTGCCCA | 2796 | TGG | - | AGACUGCUGGGCAGUGCCCA | 5890 |
| CTAAAAGAAGATAGACTGCT | 2797 | GGG | - | CUAAAAGAAGAUAGACUGCU | 5891 |
| CCAGCAGTCTATCTTCTTTT | 2798 | AGG | + | CCAGCAGUCUAUCUUCUUUU | 5892 |
| CCTAAAAGAAGATAGACTGC | 2799 | TGG | - | CCUAAAAGAAGAUAGACUGC | 5893 |
| CTATCTTCTTTTAGGTCTTC | 2800 | AGG | + | CUAUCUUCUUUUAGGUCUUC | 5894 |
| TTTAGGTCTTCAGGTGTCCC | 2801 | TGG | + | UUUAGGUCUUCAGGUGUCCC | 5895 |
| TTAGGTCTTCAGGTGTCCCT | 2802 | GGG | + | UUAGGUCUUCAGGUGUCCCU | 5896 |
| GTGTCCCTGGGTAGAGAACA | 2803 | AGG | + | GUGUCCCUGGGUAGAGAACA | 5897 |
| GAAGCCTTGTTCTCTACCCA | 2804 | GGG | - | GAAGCCUUGUUCUCUACCCA | 5898 |
| AGAAGCCTTGTTCTCTACCC | 2805 | AGG | - | AGAAGCCUUGUUCUCUACCC | 5899 |
| AACAAGGCTTCTGCTTGCAT | 2806 | AGG | + | AACAAGGCUUCUGCUUGCAU | 5900 |
| ACAAGGCTTCTGCTTGCATA | 2807 | GGG | + | ACAAGGCUUCUGCUUGCAUA | 5901 |
| GTGAGACTGTCACTGTACTG | 2808 | GGG | - | GUGAGACUGUCACUGUACUG | 5902 |
| TGTGAGACTGTCACTGTACT | 2809 | GGG | - | UGUGAGACUGUCACUGUACU | 5903 |
| TTGTGAGACTGTCACTGTAC | 2810 | TGG | - | UUGUGAGACUGUCACUGUAC | 5904 |
| TCACAATGAGTGCAGCAATG | 2811 | TGG | + | UCACAAUGAGUGCAGCAAUG | 5905 |
| GCAGCAATGTGGCCACAGAA | 2812 | CGG | + | GCAGCAAUGUGGCCACAGAA | 5906 |
| CAGCAATGTGGCCACAGAAC | 2813 | GGG | + | CAGCAAUGUGGCCACAGAAC | 5907 |
| AGCAATGTGGCCACAGAACG | 2814 | GGG | + | AGCAAUGUGGCCACAGAACG | 5908 |
| ACACACATTTCCCCGTTCTG | 2815 | TGG | - | ACACACAUUUCCCCGUUCUG | 5909 |
| TCAAGCTGAAAGCTTTTCAC | 2816 | AGG | + | UCAAGCUGAAAGCUUUUCAC | 5910 |
| TCTCTTGCTAAATGACAAAG | 2817 | TGG | + | UCUCUUGCUAAAUGACAAAG | 5911 |
| CTAAATGACAAAGTGGTTAG | 2818 | AGG | + | CUAAAUGACAAAGUGGUUAG | 5912 |
| AATGACAAAGTGGTTAGAGG | 2819 | AGG | + | AAUGACAAAGUGGUUAGAGG | 5913 |
| ATGACAAAGTGGTTAGAGGA | 2820 | GGG | + | AUGACAAAGUGGUUAGAGGA | 5914 |
| GTGTAGACAATGAAAGCTGT | 2821 | AGG | - | GUGUAGACAAUGAAAGCUGU | 5915 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| AGCTTTCATTGTCTACACTC | 2822 | AGG | + | AGCUUUCAUUGUCUACACUC | 5916 |
| TCTTTTGAGAATTTTACAGT | 2823 | AGG | + | UCUUUUGAGAAUUUUACAGU | 5917 |
| CTAGTCAACACAGAAATAAA | 2824 | AGG | + | CUAGUCAACACAGAAAUAAA | 5918 |
| TTTGTTTTGTTGAAAAGAAG | 2825 | TGG | + | UUUGUUUUGUUGAAAAGAAG | 5919 |
| TTGTTTTGTTGAAAAGAAGT | 2826 | GGG | + | UUGUUUUGUUGAAAAGAAGU | 5920 |
| TGTTTTGTTGAAAAGAAGTG | 2827 | GGG | + | UGUUUUGUUGAAAAGAAGUG | 5921 |
| GTTTTGTTGAAAAGAAGTGG | 2828 | GGG | + | GUUUUGUUGAAAAGAAGUGG | 5922 |
| TTGAAAAGAAGTGGGGTTT | 2829 | TGG | + | UUGAAAAGAAGUGGGGUUU | 5923 |
| TGGGGGTTTTGGTACTGATG | 2830 | AGG | + | UGGGGGUUUUGGUACUGAUG | 5924 |
| GGGGGTTTTGGTACTGATGA | 2831 | GGG | + | GGGGGUUUUGGUACUGAUGA | 5925 |
| GGGGTTTTGGTACTGATGAG | 2832 | GGG | + | GGGGUUUUGGUACUGAUGAG | 5926 |
| TATGTTACTTATTCATTCTC | 2833 | AGG | + | UAUGUUACUUAUUCAUUCUC | 5927 |
| CTTATTCATTCTCAGGTTCA | 2834 | TGG | + | CUUAUUCAUUCUCAGGUUCA | 5928 |
| TTAATCTATCATTTGTCATA | 2835 | AGG | - | UUAAUCUAUCAUUUGUCAUA | 5929 |
| TAATAAAGCATGCAAATGC | 2836 | TGG | + | UAAUAAAGCAUGCAAAUGC | 5930 |
| TGCAAATGCTGGAGCTCTGC | 2837 | TGG | + | UGCAAAUGCUGGAGCUCUGC | 5931 |
| AAATGCTGGAGCTCTGCTGG | 2838 | CGG | + | AAAUGCUGGAGCUCUGCUGG | 5932 |
| GGCGGAGTACCTGATATGCA | 2839 | AGG | + | GGCGGAGUACCUGAUAUGCA | 5933 |
| GATCTTCATCCTTGCATATC | 2840 | AGG | - | GAUCUUCAUCCUUGCAUAUC | 5934 |
| GCTTTTTATTTGATTTCTG | 2841 | GGG | - | GCUUUUUAUUUGAUUUCUG | 5935 |
| AGCTTTTTTATTTGATTTCT | 2842 | GGG | - | AGCUUUUUUAUUUGAUUUCU | 5936 |
| CAGCTTTTTTATTTGATTTC | 2843 | TGG | - | CAGCUUUUUUAUUUGAUUUC | 5937 |
| CAGAAATCAAATAAAAAAGC | 2844 | TGG | + | CAGAAAUCAAAUAAAAAAGC | 5938 |
| AGAAATCAAATAAAAAGCT | 2845 | GGG | + | AGAAAUCAAAUAAAAAGCU | 5939 |
| TAAAAAGCTGGGCATAGTG | 2846 | AGG | + | UAAAAAGCUGGGCAUAGUG | 5940 |
| AGCTGGGCATAGTGAGGAAG | 2847 | AGG | + | AGCUGGGCAUAGUGAGGAAG | 5941 |
| GCATAGTGAGGAAGAGGAGA | 2848 | TGG | + | GCAUAGUGAGGAAGAGGAGA | 5942 |
| CATAGTGAGGAAGAGGAGAT | 2849 | GGG | + | CAUAGUGAGGAAGAGGAGAU | 5943 |
| AGTGAGGAAGAGGAGATGGG | 2850 | AGG | + | AGUGAGGAAGAGGAGAUGGG | 5944 |
| AGGAGATGGGAGGATTCCTG | 2851 | TGG | + | AGGAGAUGGGAGGAUUCCUG | 5945 |
| GATGGGAGGATTCCTGTGGC | 2852 | TGG | + | GAUGGGAGGAUUCCUGUGGC | 5946 |
| GGAGGATTCCTGTGGCTGGC | 2853 | TGG | + | GGAGGAUUCCUGUGGCUGGC | 5947 |
| TTAGCTGTCCAGCCAGCCAC | 2854 | AGG | - | UUAGCUGUCCAGCCAGCCAC | 5948 |
| TGGAAATAGATGAATAGGCT | 2855 | AGG | - | UGGAAAUAGAUGAAUAGGCU | 5949 |
| TAGCCTATTCATCTATTTCC | 2856 | AGG | + | UAGCCUAUUCAUCUAUUUCC | 5950 |
| TGGCCTGGAAATAGATGAAT | 2857 | AGG | - | UGGCCUGGAAAUAGAUGAAU | 5951 |
| CATCTATTTCCAGGCCACTA | 2858 | AGG | + | CAUCUAUUUCCAGGCCACUA | 5952 |
| ATCTATTTCCAGGCCACTAA | 2859 | GGG | + | AUCUAUUUCCAGGCCACUAA | 5953 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| ATTTCCAGGCCACTAAGGGA | 2860 | TGG | + | AUUUCCAGGCCACUAAGGGA | 5954 |
| GGTACCATCCCTTAGTGGCC | 2861 | TGG | - | GGUACCAUCCCUUAGUGGCC | 5955 |
| TTTAAGGTACCATCCCTTAG | 2862 | TGG | - | UUUAAGGUACCAUCCCUUAG | 5956 |
| ATTATTATTGTTATTTTTA | 2863 | AGG | - | AUUAUUAUUGUUAUUUUUA | 5957 |
| ACAATAATAATAAATAAAAA | 2864 | AGG | + | ACAAUAAUAAUAAAUAAAAA | 5958 |
| TAATAAATAAAAAAGGTAGC | 2865 | TGG | + | UAAUAAAUAAAAAAGGUAGC | 5959 |
| AAAAAGGTAGCTGGTTCCTG | 2866 | AGG | + | AAAAAGGUAGCUGGUUCCUG | 5960 |
| TGGTTCCTGAGGAGCATCTA | 2867 | AGG | + | UGGUUCCUGAGGAGCAUCUA | 5961 |
| GATATCCTTAGATGCTCCTC | 2868 | AGG | - | GAUAUCCUUAGAUGCUCCUC | 5962 |
| GTATGTGCACGTGGAGTTAA | 2869 | AGG | - | GUAUGUGCACGUGGAGUUAA | 5963 |
| GTATACAGTGTATGTGCACG | 2870 | TGG | - | GUAUACAGUGUAUGUGCACG | 5964 |
| TGCACATACACTGTATACAC | 2871 | AGG | + | UGCACAUACACUGUAUACAC | 5965 |
| TTTTTTTGGTAAAACTTGAT | 2872 | AGG | - | UUUUUUUGGUAAAACUUGAU | 5966 |
| TTTTTTTTTTTTTTTTTTT | 2873 | TGG | - | UUUUUUUUUUUUUUUUUUU | 5967 |
| AAGAACACTTTATTCACTGT | 2874 | TGG | + | AAGAACACUUUAUUCACUGU | 5968 |
| AACACTTTATTCACTGTTGG | 2875 | TGG | + | AACACUUUAUUCACUGUUGG | 5969 |
| ACACTTTATTCACTGTTGGT | 2876 | GGG | + | ACACUUUAUUCACUGUUGGU | 5970 |
| CTGTTGGTGGGTATGTAAAC | 2877 | TGG | + | CUGUUGGUGGGUAUGUAAAC | 5971 |
| CTCTGTGCTGATTTTCATAG | 2878 | TGG | - | CUCUGUGCUGAUUUUCAUAG | 5972 |
| CACTATGAAAATCAGCACAG | 2879 | AGG | + | CACUAUGAAAAUCAGCACAG | 5973 |
| TTGTTTTGTTGGAGTGGGAA | 2880 | GGG | - | UUGUUUUGUUGGAGUGGGAA | 5974 |
| TTTGTTTTGTTGGAGTGGGA | 2881 | AGG | - | UUUGUUUUGUUGGAGUGGGA | 5975 |
| TTGTTTTGTTTTGTTGGAGT | 2882 | GGG | - | UUGUUUUGUUUUGUUGGAGU | 5976 |
| TTTGTTTTGTTTTGTTGGAG | 2883 | TGG | - | UUUGUUUUGUUUUGUUGGAG | 5977 |
| TTTGTTTTGTTTTGTTTTGT | 2884 | TGG | - | UUUGUUUUGUUUUGUUUUGU | 5978 |
| GTTCTAGTTCTAGTTCTAGA | 2885 | GGG | - | GUUCUAGUUCUAGUUCUAGA | 5979 |
| AGTTCTAGTTCTAGTTCTAG | 2886 | AGG | - | AGUUCUAGUUCUAGUUCUAG | 5980 |
| CTAGAACTACTGCACGATCC | 2887 | AGG | + | CUAGAACUACUGCACGAUCC | 5981 |
| GATCCAGGTTTACCACTCCT | 2888 | AGG | + | GAUCCAGGUUUACCACUCCU | 5982 |
| ATACCTAGGAGTGGTAAACC | 2889 | TGG | - | AUACCUAGGAGUGGUAAACC | 5983 |
| TTTGAGTAAATACCTAGGAG | 2890 | TGG | - | UUUGAGUAAAUACCUAGGAG | 5984 |
| ACTCCTAGGTATTTACTCAA | 2891 | AGG | + | ACUCCUAGGUAUUUACUCAA | 5985 |
| AGTCCTTTGAGTAAATACCT | 2892 | AGG | - | AGUCCUUUGAGUAAAUACCU | 5986 |
| TATACGTCAACCTGTGACAG | 2893 | AGG | + | UAUACGUCAACCUGUGACAG | 5987 |
| GTATATGATGCCTCTGTCAC | 2894 | AGG | - | GUAUAUGAUGCCUCUGUCAC | 5988 |
| CAGAGGCATCATATACAAGC | 2895 | AGG | + | CAGAGGCAUCAUAUACAAGC | 5989 |
| AGAGGCATCATATACAAGCA | 2896 | GGG | + | AGAGGCAUCAUAUACAAGCA | 5990 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| CATCATATACAAGCAGGGAG | 2897 | TGG | + | CAUCAUAUACAAGCAGGGAG | 5991 |
| CATATACAAGCAGGGAGTGG | 2898 | TGG | + | CAUAUACAAGCAGGGAGUGG | 5992 |
| TGAGGGGTGGGATTAAAGGC | 2899 | AGG | - | UGAGGGGUGGGAUUAAAGGC | 5993 |
| TGCCTTTAATCCCACCCCTC | 2900 | AGG | + | UGCCUUUAAUCCCACCCCUC | 5994 |
| CTCCTGAGGGGTGGGATTAA | 2901 | AGG | - | CUCCUGAGGGGUGGGAUUAA | 5995 |
| CTTTAATCCCACCCCTCAGG | 2902 | AGG | + | CUUUAAUCCCACCCCUCAGG | 5996 |
| GACTCTGCCTCCTGAGGGGT | 2903 | GGG | - | GACUCUGCCUCCUGAGGGGU | 5997 |
| TGACTCTGCCTCCTGAGGGG | 2904 | TGG | - | UGACUCUGCCUCCUGAGGGG | 5998 |
| ACCCCTCAGGAGGCAGAGTC | 2905 | AGG | + | ACCCCUCAGGAGGCAGAGUC | 5999 |
| ACCTGACTCTGCCTCCTGAG | 2906 | GGG | - | ACCUGACUCUGCCUCCUGAG | 6000 |
| TACCTGACTCTGCCTCCTGA | 2907 | GGG | - | UACCUGACUCUGCCUCCUGA | 6001 |
| CTACCTGACTCTGCCTCCTG | 2908 | AGG | - | CUACCUGACUCUGCCUCCUG | 6002 |
| GGTAGATCTCTGTGAGTTCG | 2909 | AGG | + | GGUAGAUCUCUGUGAGUUCG | 6003 |
| CTGTGAGTTCGAGGCCAGTT | 2910 | TGG | + | CUGUGAGUUCGAGGCCAGUU | 6004 |
| ACTCACTATGTAGACCAAAC | 2911 | TGG | - | ACUCACUAUGUAGACCAAAC | 6005 |
| CATATGGCTATATGGTCTTA | 2912 | TGG | - | CAUAUGGCUAUAUGGUCUUA | 6006 |
| CATAAGACCATATAGCCATA | 2913 | TGG | + | CAUAAGACCAUAUAGCCAUA | 6007 |
| AAGACCATATAGCCATATGG | 2914 | AGG | + | AAGACCAUAUAGCCAUAUGG | 6008 |
| AGACCATATAGCCATATGGA | 2915 | GGG | + | AGACCAUAUAGCCAUAUGGA | 6009 |
| GACCATATAGCCATATGGAG | 2916 | GGG | + | GACCAUAUAGCCAUAUGGAG | 6010 |
| ACCATATAGCCATATGGAGG | 2917 | GGG | + | ACCAUAUAGCCAUAUGGAGG | 6011 |
| CCATATAGCCATATGGAGGG | 2918 | GGG | + | CCAUAUAGCCAUAUGGAGGG | 6012 |
| CCCCCCTCCATATGGCTATA | 2919 | TGG | - | CCCCCCUCCAUAUGGCUAUA | 6013 |
| CTCACAATCCCCCCTCCATA | 2920 | TGG | - | CUCACAAUCCCCCCUCCAUA | 6014 |
| GAGAGAATTATTAAATGAAT | 2921 | TGG | + | GAGAGAAUUAUUAAAUGAAU | 6015 |
| TATACACTGTCTTCTTTCAT | 2922 | AGG | + | UAUACACUGUCUUCUUUCAU | 6016 |
| CATAGGAAAAATGAACAGAA | 2923 | AGG | + | CAUAGGAAAAAUGAACAGAA | 6017 |
| ATAGGAAAAATGAACAGAAA | 2924 | GGG | + | AUAGGAAAAAUGAACAGAAA | 6018 |
| AACAGAAGGGAGAGATCTT | 2925 | TGG | + | AACAGAAGGGAGAGAUCUU | 6019 |
| ACAGAAGGGAGAGATCTTT | 2926 | GGG | + | ACAGAAGGGAGAGAUCUUU | 6020 |
| GAAAGGGAGAGATCTTTGGG | 2927 | TGG | + | GAAAGGGAGAGAUCUUUGGG | 6021 |
| AAAGGGAGAGATCTTTGGGT | 2928 | GGG | + | AAAGGGAGAGAUCUUUGGGU | 6022 |
| AAGGGAGAGATCTTTGGGTG | 2929 | GGG | + | AAGGGAGAGAUCUUUGGGUG | 6023 |
| ATACATGACATGAAAGCAGA | 2930 | AGG | + | AUACAUGACAUGAAAGCAGA | 6024 |
| TACATGACATGAAAGCAGAA | 2931 | GGG | + | UACAUGACAUGAAAGCAGAA | 6025 |
| ACATGACATGAAAGCAGAAG | 2932 | GGG | + | ACAUGACAUGAAAGCAGAAG | 6026 |
| AGCAGAAGGGGATTAGTTAT | 2933 | TGG | + | AGCAGAAGGGGAUUAGUUAU | 6027 |
| GAAGGGGATTAGTTATTGGA | 2934 | AGG | + | GAAGGGGAUUAGUUAUUGGA | 6028 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| GGGATTAGTTATTGGAAGGC | 2935 | AGG | + | GGGAUUAGUUAUUGGAAGGC | 6029 |
| GGATTAGTTATTGGAAGGCA | 2936 | GGG | + | GGAUUAGUUAUUGGAAGGCA | 6030 |
| TTAGTTATTGGAAGGCAGGG | 2937 | AGG | + | UUAGUUAUUGGAAGGCAGGG | 6031 |
| TAGTTATTGGAAGGCAGGGA | 2938 | GGG | + | UAGUUAUUGGAAGGCAGGGA | 6032 |
| TGGAAGGCAGGGAGGGACCC | 2939 | AGG | + | UGGAAGGCAGGGAGGGACCC | 6033 |
| AAGGCAGGGAGGGACCCAGG | 2940 | AGG | + | AAGGCAGGGAGGGACCCAGG | 6034 |
| GGAGGGACCCAGGAGGATGA | 2941 | AGG | + | GGAGGGACCCAGGAGGAUGA | 6035 |
| GAGGGACCCAGGAGGATGAA | 2942 | GGG | + | GAGGGACCCAGGAGGAUGAA | 6036 |
| TCTCTTCCCTTCATCCTCCT | 2943 | GGG | - | UCUCUUCCCUUCAUCCUCCU | 6037 |
| TTCTCTTCCCTTCATCCTCC | 2944 | TGG | - | UUCUCUUCCCUUCAUCCUCC | 6038 |
| GATGAAGGGAAGAGAATGCA | 2945 | AGG | + | GAUGAAGGGAAGAGAAUGCA | 6039 |
| ATGAAGGGAAGAGAATGCAA | 2946 | GGG | + | AUGAAGGGAAGAGAAUGCAA | 6040 |
| GGGAAGAGAATGCAAGGGAA | 2947 | AGG | + | GGGAAGAGAAUGCAAGGGAA | 6041 |
| AATGCAAGGGAAAGGAGTAA | 2948 | AGG | + | AAUGCAAGGGAAAGGAGUAA | 6042 |
| GCAAGGGAAAGGAGTAAAGG | 2949 | AGG | + | GCAAGGGAAAGGAGUAAAGG | 6043 |
| AGGGAAAGGAGTAAAGGAGG | 2950 | AGG | + | AGGGAAAGGAGUAAAGGAGG | 6044 |
| GAAAGGAGTAAAGGAGGAGG | 2951 | AGG | + | GAAAGGAGUAAAGGAGGAGG | 6045 |
| AGTAAAGGAGGAGGAGGTAG | 2952 | AGG | + | AGUAAAGGAGGAGGAGGUAG | 6046 |
| TATTAATTCCAGCACTTGTG | 2953 | AGG | + | UAUUAAUUCCAGCACUUGUG | 6047 |
| TAATTCCAGCACTTGTGAGG | 2954 | AGG | + | UAAUUCCAGCACUUGUGAGG | 6048 |
| AATTCCAGCACTTGTGAGGA | 2955 | GGG | + | AAUUCCAGCACUUGUGAGGA | 6049 |
| ATTCCAGCACTTGTGAGGAG | 2956 | GGG | + | AUUCCAGCACUUGUGAGGAG | 6050 |
| TGTCCCTCCTCACAAGTGC | 2957 | TGG | - | UGUCCCUCCUCACAAGUGC | 6051 |
| GACAGAGCTCTGTGAGTTCA | 2958 | AGG | + | GACAGAGCUCUGUGAGUUCA | 6052 |
| TGGAACTGACTATGCAGAGG | 2959 | GGG | - | UGGAACUGACUAUGCAGAGG | 6053 |
| CTGGAACTGACTATGCAGAG | 2960 | GGG | - | CUGGAACUGACUAUGCAGAG | 6054 |
| CCCTCTGCATAGTCAGTTCC | 2961 | AGG | + | CCCUCUGCAUAGUCAGUUCC | 6055 |
| CCTGGAACTGACTATGCAGA | 2962 | GGG | - | CCUGGAACUGACUAUGCAGA | 6056 |
| TCCTGGAACTGACTATGCAG | 2963 | AGG | - | UCCUGGAACUGACUAUGCAG | 6057 |
| GTCAGTTCCAGGATAGCCAA | 2964 | TGG | + | GUCAGUUCCAGGAUAGCCAA | 6058 |
| TATGTAGCCATTGGCTATCC | 2965 | TGG | - | UAUGUAGCCAUUGGCUAUCC | 6059 |
| GGGTCTCATTATGTAGCCAT | 2966 | TGG | - | GGGUCUCAUUAUGUAGCCAU | 6060 |
| ATGAGACCCTGTGTCAGAGA | 2967 | AGG | + | AUGAGACCCUGUGUCAGAGA | 6061 |
| AGACCCTGTGTCAGAGAAGG | 2968 | TGG | + | AGACCCUGUGUCAGAGAAGG | 6062 |
| CGGCCACCTTCTCTGACACA | 2969 | GGG | - | CGGCCACCUUCUCUGACACA | 6063 |
| CCTGTGTCAGAGAAGGTGGC | 2970 | CGG | + | CCUGUGUCAGAGAAGGUGGC | 6064 |
| CCGGCCACCTTCTCTGACAC | 2971 | AGG | - | CCGGCCACCUUCUCUGACAC | 6065 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| GTCAGAGAAGGTGGCCGGCG | 2972 | AGG | + | GUCAGAGAAGGUGGCCGGCG | 6066 |
| TCAGAGAAGGTGGCCGGCGA | 2973 | GGG | + | UCAGAGAAGGUGGCCGGCGA | 6067 |
| TAAGCATCAATATCCCTCGC | 2974 | CGG | - | UAAGCAUCAAUAUCCCUCGC | 6068 |
| TAACTCATTCAGCTGTGTGG | 2975 | TGG | - | UAACUCAUUCAGCUGUGUGG | 6069 |
| GTTTAACTCATTCAGCTGTG | 2976 | TGG | - | GUUUAACUCAUUCAGCUGUG | 6070 |
| AGTGCAAAAGTAGCAGGAAC | 2977 | AGG | - | AGUGCAAAAGUAGCAGGAAC | 6071 |
| ATTGAAAGTGCAAAAGTAGC | 2978 | AGG | - | AUUGAAAGUGCAAAAGUAGC | 6072 |
| ATGCTCCCAGATTACTTACA | 2979 | TGG | + | AUGCUCCCAGAUUACUUACA | 6073 |
| AAATTCCATGTAAGTAATCT | 2980 | GGG | - | AAAUUCCAUGUAAGUAAUCU | 6074 |
| TAAATTCCATGTAAGTAATC | 2981 | TGG | - | UAAAUUCCAUGUAAGUAAUC | 6075 |
| ATGGAATTTATATTTTATTG | 2982 | TGG | + | AUGGAAUUUAUAUUUUAUUG | 6076 |
| GAGGTTTGTCTATGATGTAC | 2983 | AGG | - | GAGGUUUGUCUAUGAUGUAC | 6077 |
| TTGGTTGAAAATTTTTCTTG | 2984 | AGG | - | UUGGUUGAAAAUUUUUCUUG | 6078 |
| AAATTTTCAACCAATAGTCC | 2985 | AGG | + | AAAUUUUCAACCAAUAGUCC | 6079 |
| GTTATTTTGCCTGGACTAT | 2986 | TGG | - | GUUAUUUUGCCUGGACUAU | 6080 |
| AAAAAGAGGTTATTTTTGCC | 2987 | TGG | - | AAAAAGAGGUUAUUUUUGCC | 6081 |
| AGAAAGAAAGAAAGAAAAAG | 2988 | AGG | - | AGAAAGAAAGAAAGAAAAAG | 6082 |
| TCTTTTTTTTTTTTTTTTTT | 2989 | TGG | + | UCUUUUUUUUUUUUUUUUUU | 6083 |
| TTTTTTTGGTTTTTTGAAAC | 2990 | AGG | + | UUUUUUUGGUUUUUUGAAAC | 6084 |
| TTTTTTGGTTTTTTGAAACA | 2991 | GGG | + | UUUUUUGGUUUUUUGAAACA | 6085 |
| AGGGTTTCTCTGTATAGCCC | 2992 | TGG | + | AGGGUUUCUCUGUAUAGCCC | 6086 |
| CTGTATAGCCCTGGCTGTCC | 2993 | TGG | + | CUGUAUAGCCCUGGCUGUCC | 6087 |
| AGTGAGTTCCAGGACAGCCA | 2994 | GGG | - | AGUGAGUUCCAGGACAGCCA | 6088 |
| AAGTGAGTTCCAGGACAGCC | 2995 | AGG | - | AAGUGAGUUCCAGGACAGCC | 6089 |
| TGGTGTACAAAGTGAGTTCC | 2996 | AGG | - | UGGUGUACAAAGUGAGUUCC | 6090 |
| TGGAACTCACTTTGTACACC | 2997 | AGG | + | UGGAACUCACUUUGUACACC | 6091 |
| ACTCACTTTGTACACCAGGC | 2998 | TGG | + | ACUCACUUUGUACACCAGGC | 6092 |
| TTCTGAGTTCGAGGCCAGCC | 2999 | TGG | - | UUCUGAGUUCGAGGCCAGCC | 6093 |
| CAGGTGGATTTCTGAGTTCG | 3000 | AGG | - | CAGGUGGAUUUCUGAGUUCG | 6094 |
| ACTCGGGAGGCAGAGGCAGG | 3001 | TGG | - | ACUCGGGAGGCAGAGGCAGG | 6095 |
| AGCACTCGGGAGGCAGAGGC | 3002 | AGG | - | AGCACUCGGGAGGCAGAGGC | 6096 |
| GCCTCTGCCTCCCGAGTGCT | 3003 | CGG | + | GCCUCUGCCUCCCGAGUGCU | 6097 |
| TCCGAGCACTCGGGAGGCAG | 3004 | AGG | - | UCCGAGCACUCGGGAGGCAG | 6098 |
| CTTTAATCCGAGCACTCGGG | 3005 | AGG | - | CUUUAAUCCGAGCACUCGGG | 6099 |
| CTCCCGAGTGCTCGGATTAA | 3006 | AGG | + | CUCCCGAGUGCUCGGAUUAA | 6100 |
| CGCCTTTAATCCGAGCACTC | 3007 | GGG | - | CGCCUUUAAUCCGAGCACUC | 6101 |
| ACGCCTTTAATCCGAGCACT | 3008 | CGG | - | ACGCCUUUAAUCCGAGCACU | 6102 |
| TATTTTTTGCGGGACGGTGG | 3009 | TGG | - | UAUUUUUUGCGGGACGGUGG | 6103 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| GGTTATTTTTGCGGGACGG | 3010 | TGG | - | GGUUAUUUUUGCGGGACGG | 6104 |
| ACAGGTTATTTTTGCGGGA | 3011 | CGG | - | ACAGGUUAUUUUUGCGGGA | 6105 |
| AAAAACAGGTTATTTTTGC | 3012 | GGG | - | AAAAACAGGUUAUUUUUGC | 6106 |
| CAAAACAGGTTATTTTTTG | 3013 | CGG | - | CAAAACAGGUUAUUUUUUG | 6107 |
| ATAATTAAAACAACAAAAAC | 3014 | AGG | - | AUAAUUAAAACAACAAAAAC | 6108 |
| TTTTTAAGATTTTATGTGTA | 3015 | TGG | + | UUUUUAAGAUUUUAUGUGUA | 6109 |
| TTTTAAGATTTTATGTGTAT | 3016 | GGG | + | UUUUAAGAUUUUAUGUGUAU | 6110 |
| CTGTGTACCACTTGTATGCT | 3017 | TGG | + | CUGUGUACCACUUGUAUGCU | 6111 |
| TTGGGCACCAAGCATACAAG | 3018 | TGG | - | UUGGGCACCAAGCAUACAAG | 6112 |
| TGTATGCTTGGTGCCCAAGA | 3019 | AGG | + | UGUAUGCUUGGUGCCCAAGA | 6113 |
| TGATCTGTTCTGTCCTTCTT | 3020 | GGG | - | UGAUCUGUUCUGUCCUUCUU | 6114 |
| ATGATCTGTTCTGTCCTTCT | 3021 | TGG | - | AUGAUCUGUUCUGUCCUUCU | 6115 |
| AGAAGGACAGAACAGATCAT | 3022 | AGG | + | AGAAGGACAGAACAGAUCAU | 6116 |
| GAAGGACAGAACAGATCATA | 3023 | GGG | + | GAAGGACAGAACAGAUCAUA | 6117 |
| GAACAGATCATAGGGTTTCC | 3024 | TGG | + | GAACAGAUCAUAGGGUUUCC | 6118 |
| AACAGATCATAGGGTTTCCT | 3025 | GGG | + | AACAGAUCAUAGGGUUUCCU | 6119 |
| TTTCCTGGGATAAGAGTTAT | 3026 | AGG | + | UUUCCUGGGAUAAGAGUUAU | 6120 |
| ACTCCTATAACTCTTATCCC | 3027 | AGG | - | ACUCCUAUAACUCUUAUCCC | 6121 |
| GATGACTGTAAGCCACCAAG | 3028 | TGG | + | GAUGACUGUAAGCCACCAAG | 6122 |
| GTAAGCCACCAAGTGGACGC | 3029 | TGG | + | GUAAGCCACCAAGUGGACGC | 6123 |
| TAAGCCACCAAGTGGACGCT | 3030 | GGG | + | UAAGCCACCAAGUGGACGCU | 6124 |
| AATTCCCAGCGTCCACTTGG | 3031 | TGG | - | AAUUCCCAGCGUCCACUUGG | 6125 |
| TTCAATTCCCAGCGTCCACT | 3032 | TGG | - | UUCAAUUCCCAGCGUCCACU | 6126 |
| GGACGCTGGGAATTGAACCT | 3033 | TGG | + | GGACGCUGGGAAUUGAACCU | 6127 |
| GGAATTGAACCTTGGTTAGC | 3034 | TGG | + | GGAAUUGAACCUUGGUUAGC | 6128 |
| GACACTCTTCCAGCTAACCA | 3035 | AGG | - | GACACUCUUCCAGCUAACCA | 6129 |
| GGGACTGGAATTAAAAATAC | 3036 | TGG | - | GGGACUGGAAUUAAAAAUAC | 6130 |
| CATAGACAAACAACGGGGAC | 3037 | TGG | - | CAUAGACAAACAACGGGGAC | 6131 |
| ATCTTCATAGACAAACAACG | 3038 | GGG | - | AUCUUCAUAGACAAACAACG | 6132 |
| AATCTTCATAGACAAACAAC | 3039 | GGG | - | AAUCUUCAUAGACAAACAAC | 6133 |
| AAATCTTCATAGACAAACAA | 3040 | CGG | - | AAAUCUUCAUAGACAAACAA | 6134 |
| TTGTCTATGAAGATTTTGCT | 3041 | TGG | + | UUGUCUAUGAAGAUUUUGCU | 6135 |
| TTTTGCTTGGTAGTCCAGTC | 3042 | TGG | + | UUUUGCUUGGUAGUCCAGUC | 6136 |
| CCAGTCTGGCTTTAAGAAAC | 3043 | AGG | + | CCAGUCUGGCUUUAAGAAAC | 6137 |
| CCTGTTTCTTAAAGCCAGAC | 3044 | TGG | - | CCUGUUUCUUAAAGCCAGAC | 6138 |
| CAGTCTGGCTTTAAGAAACA | 3045 | GGG | + | CAGUCUGGCUUUAAGAAACA | 6139 |
| AACAGGGTCTCATGCATCCC | 3046 | TGG | + | AACAGGGUCUCAUGCAUCCC | 6140 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| ATGGAAGTCTGAGCAAGCCA | 3047 | GGG | - | AUGGAAGUCUGAGCAAGCCA | 6141 |
| CATGGAAGTCTGAGCAAGCC | 3048 | AGG | - | CAUGGAAGUCUGAGCAAGCC | 6142 |
| CTCAGACTTCCATGCAGCTG | 3049 | AGG | + | CUCAGACUUCCAUGCAGCUG | 6143 |
| GACTTCCATGCAGCTGAGGA | 3050 | TGG | + | GACUUCCAUGCAGCUGAGGA | 6144 |
| TAAAGCCATCCTCAGCTGCA | 3051 | TGG | - | UAAAGCCAUCCUCAGCUGCA | 6145 |
| TCTACGAGGAAAAGGCAGGA | 3052 | GGG | - | UCUACGAGGAAAAGGCAGGA | 6146 |
| CTCTACGAGGAAAAGGCAGG | 3053 | AGG | - | CUCUACGAGGAAAAGGCAGG | 6147 |
| GCACTCTACGAGGAAAAGGC | 3054 | AGG | - | GCACUCUACGAGGAAAAGGC | 6148 |
| CTCAGCACTCTACGAGGAAA | 3055 | AGG | - | CUCAGCACUCUACGAGGAAA | 6149 |
| TGTAATCTCAGCACTCTACG | 3056 | AGG | - | UGUAAUCUCAGCACUCUACG | 6150 |
| GAGAAGTCTGCTGGTGGCAC | 3057 | AGG | - | GAGAAGUCUGCUGGUGGCAC | 6151 |
| TGTTAGGAGAAGTCTGCTGG | 3058 | TGG | - | UGUUAGGAGAAGUCUGCUGG | 6152 |
| TCTTGTTAGGAGAAGTCTGC | 3059 | TGG | - | UCUUGUUAGGAGAAGUCUGC | 6153 |
| GACTTCTCCTAACAAGAATG | 3060 | TGG | + | GACUUCUCCUAACAAGAAUG | 6154 |
| TCCTAACAAGAATGTGGCAC | 3061 | AGG | + | UCCUAACAAGAAUGUGGCAC | 6155 |
| CCTAACAAGAATGTGGCACA | 3062 | GGG | + | CCUAACAAGAAUGUGGCACA | 6156 |
| CCCTGTGCCACATTCTTGTT | 3063 | AGG | - | CCCUGUGCCACAUUCUUGUU | 6157 |
| AACAAGAATGTGGCACAGGG | 3064 | AGG | + | AACAAGAAUGUGGCACAGGG | 6158 |
| ATGTGGCACAGGGAGGCAAC | 3065 | TGG | + | AUGUGGCACAGGGAGGCAAC | 6159 |
| TGTGGCACAGGGAGGCAACT | 3066 | GGG | + | UGUGGCACAGGGAGGCAACU | 6160 |
| GAGGCAACTGGGAATCAAAC | 3067 | AGG | + | GAGGCAACUGGGAAUCAAAC | 6161 |
| CAACTGGGAATCAAACAGGA | 3068 | AGG | + | CAACUGGGAAUCAAACAGGA | 6162 |
| CTGGGAATCAAACAGGAAGG | 3069 | AGG | + | CUGGGAAUCAAACAGGAAGG | 6163 |
| AAACAGGAAGGAGGAGTAAA | 3070 | AGG | + | AAACAGGAAGGAGGAGUAAA | 6164 |
| AGGAAGGAGGAGTAAAAGGA | 3071 | AGG | + | AGGAAGGAGGAGUAAAAGGA | 6165 |
| GGAAGGAGGAGTAAAAGGAA | 3072 | GGG | + | GGAAGGAGGAGUAAAAGGAA | 6166 |
| GAAGGAGGAGTAAAAGGAAG | 3073 | GGG | + | GAAGGAGGAGUAAAAGGAAG | 6167 |
| GGAGGAGTAAAAGGAAGGGG | 3074 | AGG | + | GGAGGAGUAAAAGGAAGGGG | 6168 |
| GAGTAAAAGGAAGGGGAGGA | 3075 | AGG | + | GAGUAAAAGGAAGGGGAGGA | 6169 |
| AAAGGAAGGGGAGGAAGGAG | 3076 | AGG | + | AAAGGAAGGGGAGGAAGGAG | 6170 |
| GGGAGGAAGGAGAGGAGAAG | 3077 | TGG | + | GGGAGGAAGGAGAGGAGAAG | 6171 |
| GGAAGGAGAGGAGAAGTGGC | 3078 | AGG | + | GGAAGGAGAGGAGAAGUGGC | 6172 |
| AGGAGAGGAGAAGTGGCAGG | 3079 | AGG | + | AGGAGAGGAGAAGUGGCAGG | 6173 |
| GTGGCAGGAGGAGAAGAAAA | 3080 | AGG | + | GUGGCAGGAGGAGAAGAAAA | 6174 |
| GCAGGAGGAGAAGAAAAGG | 3081 | AGG | + | GCAGGAGGAGAAGAAAAGG | 6175 |
| GGAGGAGAAGAAAAGGAGG | 3082 | CGG | + | GGAGGAGAAGAAAAGGAGG | 6176 |
| AGAAAAGGAGGCGGAGAAA | 3083 | AGG | + | AGAAAAGGAGGCGGAGAAA | 6177 |
| AAAAGGAGGCGGAGAAAAGG | 3084 | TGG | + | AAAAGGAGGCGGAGAAAAGG | 6178 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| AGGCGGAGAAAAGGTGGTAG | 3085 | TGG | + | AGGCGGAGAAAAGGUGGUAG | 6179 |
| CGGAGAAAAGGTGGTAGTGG | 3086 | TGG | + | CGGAGAAAAGGUGGUAGUGG | 6180 |
| AGAAAAGGTGGTAGTGGTGG | 3087 | AGG | + | AGAAAAGGUGGUAGUGGUGG | 6181 |
| GGTGGTAGTGGTGGAGGAAG | 3088 | AGG | + | GGUGGUAGUGGUGGAGGAAG | 6182 |
| GGTAGTGGTGGAGGAAGAGG | 3089 | AGG | + | GGUAGUGGUGGAGGAAGAGG | 6183 |
| AGTGGTGGAGGAAGAGGAGG | 3090 | AGG | + | AGUGGUGGAGGAAGAGGAGG | 6184 |
| GGTGGAGGAAGAGGAGGAGG | 3091 | AGG | + | GGUGGAGGAAGAGGAGGAGG | 6185 |
| GGAGGAAGAGGAGGAGGAGG | 3092 | AGG | + | GGAGGAAGAGGAGGAGGAGG | 6186 |
| GGAAGAGGAGGAGGAGGAGG | 3093 | AGG | + | GGAAGAGGAGGAGGAGGAGG | 6187 |
| AGAGGAGGAGGAGGAGGAGG | 3094 | AGG | + | AGAGGAGGAGGAGGAGGAGG | 6188 |
| GGAGGAGGAGGAGGAGGAGG | 3095 | AGG | + | GGAGGAGGAGGAGGAGGAGG | 6189 |
| GGAGGAGGAGGAGGAGGAGG | 3096 | AGG | + | GGAGGAGGAGGAGGAGGAGG | 6190 |
| GAGGAGGAGGAGGAGGAGGA | 3097 | GGG | + | GAGGAGGAGGAGGAGGAGGA | 6191 |
| AGGAGGAGGAGGAGGAGGAG | 3098 | GGG | + | AGGAGGAGGAGGAGGAGGAG | 6192 |
| GGAGGAGGAGGAGGAGGAGG | 3099 | GGG | + | GGAGGAGGAGGAGGAGGAGG | 6193 |
| GAGGGGGACTTAATCAGTAA | 3100 | AGG | + | GAGGGGGACUUAAUCAGUAA | 6194 |
| ACTTAATCAGTAAAGGAAAA | 3101 | AGG | + | ACUUAAUCAGUAAAGGAAAA | 6195 |
| AAAAGGCTGAGCTCAGTCCT | 3102 | TGG | + | AAAAGGCUGAGCUCAGUCCU | 6196 |
| CTCAGTCCTTGGAACCTACA | 3103 | TGG | + | CUCAGUCCUUGGAACCUACA | 6197 |
| GTCCTTGGAACCTACATGGT | 3104 | AGG | + | GUCCUUGGAACCUACAUGGU | 6198 |
| CTCCTACCATGTAGGTTCCA | 3105 | AGG | - | CUCCUACCAUGUAGGUUCCA | 6199 |
| CTCATTCTCTCCTACCATGT | 3106 | AGG | - | CUCAUUCUCUCCUACCAUGU | 6200 |
| GTTTCCTCTGATCCCCACAC | 3107 | TGG | + | GUUUCCUCUGAUCCCCACAC | 6201 |
| TGCTCCAGTGTGGGGATCAG | 3108 | AGG | - | UGCUCCAGUGUGGGGAUCAG | 6202 |
| TGATCCCCACACTGGAGCAA | 3109 | TGG | + | UGAUCCCCACACUGGAGCAA | 6203 |
| GGCACCATTGCTCCAGTGTG | 3110 | GGG | - | GGCACCAUUGCUCCAGUGUG | 6204 |
| TGGCACCATTGCTCCAGTGT | 3111 | GGG | - | UGGCACCAUUGCUCCAGUGU | 6205 |
| ATGGCACCATTGCTCCAGTG | 3112 | TGG | - | AUGGCACCAUUGCUCCAGUG | 6206 |
| GAAGTGGGAGAGTGATGTGA | 3113 | TGG | - | GAAGUGGGAGAGUGAUGUGA | 6207 |
| TGTGAGGAGTTGGGTGAAGT | 3114 | GGG | - | UGUGAGGAGUUGGGUGAAGU | 6208 |
| TTGTGAGGAGTTGGGTGAAG | 3115 | TGG | - | UUGUGAGGAGUUGGGUGAAG | 6209 |
| TTTTATTTTGTGAGGAGTT | 3116 | GGG | - | UUUUAUUUUGUGAGGAGUU | 6210 |
| TTTTTATTTTGTGAGGAGT | 3117 | TGG | - | UUUUUAUUUUGUGAGGAGU | 6211 |
| TTTTGTTTTTATTTTGTG | 3118 | AGG | - | UUUUGUUUUUAUUUUGUG | 6212 |
| TTAAAAAGAAAGCTGTAGC | 3119 | CGG | + | UUAAAAAGAAAGCUGUAGC | 6213 |
| TAAAAAGAAAGCTGTAGCC | 3120 | GGG | + | UAAAAAGAAAGCUGUAGCC | 6214 |
| AAGAAAGCTGTAGCCGGGCG | 3121 | TGG | + | AAGAAAGCUGUAGCCGGGCG | 6215 |

TABLE 3-continued

Mouse Rs1 Intron 1 Guide RNA Target Sequences and Guide Sequences.

| Target | SEQ ID NO. | PAM | Direction | Guide | SEQ ID NO. |
|---|---|---|---|---|---|
| AAAGCTGTAGCCGGGCGTGG | 3122 | TGG | + | AAAGCUGUAGCCGGGCGUGG | 6216 |
| AAAGTGTGTGCCACCACGCC | 3123 | CGG | - | AAAGUGUGUGCCACCACGCC | 6217 |
| GTGGCACACACTTTTAATCC | 3124 | CGG | + | GUGGCACACACUUUUAAUCC | 6218 |
| ACACTTTTAATCCCGGCACT | 3125 | TGG | + | ACACUUUUAAUCCCGGCACU | 6219 |
| CACTTTTAATCCCGGCACTT | 3126 | GGG | + | CACUUUUAAUCCCGGCACUU | 6220 |
| TTTTAATCCCGGCACTTGGG | 3127 | AGG | + | UUUUAAUCCCGGCACUUGGG | 6221 |
| TCCCGGCACTTGGGAGGCAG | 3128 | AGG | + | UCCCGGCACUUGGGAGGCAG | 6222 |
| GCCTCTGCCTCCCAAGTGCC | 3129 | GGG | - | GCCUCUGCCUCCCAAGUGCC | 6223 |
| TGCCTCTGCCTCCCAAGTGC | 3130 | CGG | - | UGCCUCUGCCUCCCAAGUGC | 6224 |
| ACTTGGGAGGCAGAGGCAAG | 3131 | CGG | + | ACUUGGGAGGCAGAGGCAAG | 6225 |
| CAAGCGGATTTCTGAGTTCG | 3132 | AGG | + | CAAGCGGAUUUCUGAGUUCG | 6226 |
| TTCTGAGTTCGAGGCCAGCT | 3133 | TGG | + | UUCUGAGUUCGAGGCCAGCU | 6227 |
| ACTCACTTTGTAGACCAAGC | 3134 | TGG | - | ACUCACUUUGUAGACCAAGC | 6228 |
| TGGTCTACAAAGTGAGTTCC | 3135 | AGG | + | UGGUCUACAAAGUGAGUUCC | 6229 |
| AAGTGAGTTCCAGGACAGCC | 3136 | AGG | + | AAGUGAGUUCCAGGACAGCC | 6230 |
| AGTGAGTTCCAGGACAGCCA | 3137 | GGG | + | AGUGAGUUCCAGGACAGCCA | 6231 |
| CTGTGTAGCCCTGGCTGTCC | 3138 | TGG | - | CUGUGUAGCCCUGGCUGUCC | 6232 |
| AGGGTTTCTCTGTGTAGCCC | 3139 | TGG | - | AGGGUUUCUCUGUGUAGCCC | 6233 |
| TCTTTTGGTTTTTCAAGACA | 3140 | GGG | - | UCUUUUGGUUUUUCAAGACA | 6234 |
| TTCTTTTGGTTTTTCAAGAC | 3141 | AGG | - | UUCUUUUGGUUUUUCAAGAC | 6235 |
| ACAGCTTTCTTTTTTCTTT | 3142 | TGG | - | ACAGCUUUCUUUUUUCUUU | 6236 |
| TATATTAATATAGCAAAGCA | 3143 | GGG | - | UAUAUUAAUAUAGCAAAGCA | 6237 |
| ATATATTAATATAGCAAAGC | 3144 | AGG | - | AUAUAUUAAUAUAGCAAAGC | 6238 |
| TGTTTTTCTTATAGAATTA | 3145 | TGG | - | UGUUUUUCUUAUAGAAUUA | 6239 |
| TTCTGGAGGGAGGAAAAGGA | 3146 | TGG | - | UUCUGGAGGGAGGAAAAGGA | 6240 |
| CTCATTCTGGAGGGAGGAAA | 3147 | AGG | - | CUCAUUCUGGAGGGAGGAAA | 6241 |

B. Other Nuclease Agents and Target Sequences for Nuclease Agents

Any nuclease agent that induces a nick or double-strand break at a desired target sequence can be used in the methods and compositions disclosed herein. A naturally occurring or native nuclease agent can be employed so long as the nuclease agent induces a nick or double-strand break at a desired target sequence. Alternatively, a modified or engineered nuclease agent can be employed. An "engineered nuclease agent" includes a nuclease that is engineered (modified or derived) from its native form to specifically recognize and induce a nick or double-strand break in the desired target sequence. Thus, an engineered nuclease agent can be derived from a native, naturally occurring nuclease agent or it can be artificially created or synthesized. The engineered nuclease can induce a nick or double-strand break in a target sequence, for example, wherein the target sequence is not a sequence that would have been recognized by a native (non-engineered or non-modified) nuclease agent. The modification of the nuclease agent can be as little as one amino acid in a protein cleavage agent or one nucleotide in a nucleic acid cleavage agent. Producing a nick or double-strand break at a target sequence or other DNA can be referred to herein as "cutting" or "cleaving" the target sequence or other DNA.

Active variants and fragments of the exemplified target sequences are also provided. Such active variants can comprise at least 65%, 70%, 75%, 80%, 85%, 90%, 91%, 92%, 93%, 94%, 95%, 96%, 97%, 98%, 99% or more sequence identity to the given target sequence, wherein the active variants retain biological activity and hence are capable of being recognized and cleaved by a nuclease agent in a sequence-specific manner. Assays to measure the double-strand break of a target sequence by a nuclease agent are well-known. See, e.g., Frendewey et al. (2010) Methods in Enzymology 476:295-307, which is herein incorporated by reference herein in its entirety for all purposes.

The target sequence of the nuclease agent can be positioned anywhere in or near the target locus. The target sequence can be located within a coding region of a gene, or within regulatory regions that influence the expression of the gene. A target sequence of the nuclease agent can be located in an intron, an exon, a promoter, an enhancer, a regulatory region, or any non-protein coding region.

One type of nuclease agent is a Transcription Activator-Like Effector Nuclease (TALEN). TAL effector nucleases are a class of sequence-specific nucleases that can be used to make double-strand breaks at specific target sequences in the genome of a prokaryotic or eukaryotic organism. TAL effector nucleases are created by fusing a native or engineered transcription activator-like (TAL) effector, or functional part thereof, to the catalytic domain of an endonuclease, such as, for example, FokI. The unique, modular TAL effector DNA binding domain allows for the design of proteins with potentially any given DNA recognition specificity. Thus, the DNA binding domains of the TAL effector nucleases can be engineered to recognize specific DNA target sites and thus, used to make double-strand breaks at desired target sequences. See WO 2010/079430; Morbitzer et al. (2010) *Proc. Natl. Acad. Sci. U.S.A.* 107(50):21617-21622; Scholze & Boch (2010) *Virulence* 1:428-432; Christian et al. *Genetics* (2010) 186:757-761; Li et al. (2010) *Nucleic Acids Res.* (2010) doi:10.1093/nar/gkq704; and Miller et al. (2011) *Nat. Biotechnol.* 29:143-148, each of which is herein incorporated by reference in its entirety for all purposes.

Examples of suitable TAL nucleases, and methods for preparing suitable TAL nucleases, are disclosed, e.g., in US 2011/0239315 A1, US 2011/0269234 A1, US 2011/0145940 A1, US 2003/0232410 A1, US 2005/0208489 A1, US 2005/0026157 A1, US 2005/0064474 A1, US 2006/0188987 A1, and US 2006/0063231 A1, each of which is herein incorporated by reference in its entirety for all purposes. In various embodiments, TAL effector nucleases are engineered that cut in or near a target nucleic acid sequence in, e.g., a locus of interest or a genomic locus of interest, wherein the target nucleic acid sequence is at or near a sequence to be modified by a targeting vector. The TAL nucleases suitable for use with the various methods and compositions provided herein include those that are specifically designed to bind at or near target nucleic acid sequences to be modified by targeting vectors as described herein.

In some TALENs, each monomer of the TALEN comprises 33-35 TAL repeats that recognize a single base pair via two hypervariable residues. In some TALENs, the nuclease agent is a chimeric protein comprising a TAL-repeat-based DNA binding domain operably linked to an independent nuclease such as a FokI endonuclease. For example, the nuclease agent can comprise a first TAL-repeat-based DNA binding domain and a second TAL-repeat-based DNA binding domain, wherein each of the first and the second TAL-repeat-based DNA binding domains is operably linked to a FokI nuclease, wherein the first and the second TAL-repeat-based DNA binding domain recognize two contiguous target DNA sequences in each strand of the target DNA sequence separated by a spacer sequence of varying length (12-20 bp), and wherein the FokI nuclease subunits dimerize to create an active nuclease that makes a double strand break at a target sequence.

The nuclease agent employed in the various methods and compositions disclosed herein can further comprise a zinc-finger nuclease (ZFN). In some ZFNs, each monomer of the ZFN comprises 3 or more zinc finger-based DNA binding domains, wherein each zinc finger-based DNA binding domain binds to a 3 bp subsite. In other ZFNs, the ZFN is a chimeric protein comprising a zinc finger-based DNA binding domain operably linked to an independent nuclease such as a FokI endonuclease. For example, the nuclease agent can comprise a first ZFN and a second ZFN, wherein each of the first ZFN and the second ZFN is operably linked to a FokI nuclease subunit, wherein the first and the second ZFN recognize two contiguous target DNA sequences in each strand of the target DNA sequence separated by about 5-7 bp spacer, and wherein the FokI nuclease subunits dimerize to create an active nuclease that makes a double strand break. See, e.g., US20060246567; US20080182332; US20020081614; US20030021776; WO/2002/057308A2; US20130123484; US20100291048; WO/2011/017293A2; and Gaj et al. (2013) Trends Biotechnol., 31(7):397-405, each of which is herein incorporated by reference in its entirety for all purposes.

Active variants and fragments of nuclease agents (i.e., an engineered nuclease agent) are also provided. Such active variants can comprise at least 65%, 70%, 75%, 80%, 85%, 90%, 91%, 92%, 93%, 94%, 95%, 96%, 97%, 98%, 99% or more sequence identity to the native nuclease agent, wherein the active variants retain the ability to cut at a desired target sequence and hence retain nick or double-strand-break-inducing activity. For example, any of the nuclease agents described herein can be modified from a native endonuclease sequence and designed to recognize and induce a nick or double-strand break at a target sequence that was not recognized by the native nuclease agent. Thus, some engineered nucleases have a specificity to induce a nick or double-strand break at a target sequence that is different from the corresponding native nuclease agent target sequence. Assays for nick or double-strand-break-inducing activity are known and generally measure the overall activity and specificity of the endonuclease on DNA substrates containing the target sequence.

The nuclease agent may be introduced into the cell or animal by any known means. A polypeptide encoding the nuclease agent may be directly introduced into the cell or animal. Alternatively, a polynucleotide encoding the nuclease agent can be introduced into the cell or animal. When a polynucleotide encoding the nuclease agent is introduced, the nuclease agent can be transiently, conditionally, or constitutively expressed within the cell. The polynucleotide encoding the nuclease agent can be contained in an expression cassette and be operably linked to a conditional promoter, an inducible promoter, a constitutive promoter, or a tissue-specific promoter. Examples of promoters are discussed in further detail elsewhere herein. Alternatively, the nuclease agent can be introduced into the cell as an mRNA encoding the nuclease agent.

A polynucleotide encoding a nuclease agent can be stably integrated in the genome of a cell and operably linked to a promoter active in the cell. Alternatively, a polynucleotide encoding a nuclease agent can be in an expression vector or a targeting vector.

When the nuclease agent is provided to the cell through the introduction of a polynucleotide encoding the nuclease agent, such a polynucleotide encoding a nuclease agent can be modified to substitute codons having a higher frequency of usage in the cell of interest, as compared to the naturally occurring polynucleotide sequence encoding the nuclease agent. For example, the polynucleotide encoding the nuclease agent can be modified to substitute codons having a higher frequency of usage in a given eukaryotic cell of interest, including a human cell, a non-human cell, a mammalian cell, a rodent cell, a mouse cell, a rat cell or any other host cell of interest, as compared to the naturally occurring polynucleotide sequence.

The term "target sequence for a nuclease agent" includes a DNA sequence at which a nick or double-strand break is induced by a nuclease agent. The target sequence for a nuclease agent can be endogenous (or native) to the cell or the target sequence can be exogenous to the cell. A target sequence that is exogenous to the cell is not naturally occurring in the genome of the cell. The target sequence can also exogenous to the polynucleotides of interest that one desires to be positioned at the target locus. In some cases, the target sequence is present only once in the genome of the host cell.

The length of the target sequence can vary, and includes, for example, target sequences that are about 30-36 bp for a zinc finger nuclease (ZFN) pair (i.e., about 15-18 bp for each ZFN), about 36 bp for a Transcription Activator-Like Effector Nuclease (TALEN), or about 20 bp for a CRISPR/Cas9 guide RNA.

VI. Cells or Animals or Genomes Comprising Nucleic Acid Constructs and/or Nuclease Agents or Nucleic Acids Encoding Nuclease Agents Genomes, cells, and animals produced by the methods disclosed herein are also provided. Likewise, genomes, cells, and animals comprising the nucleic acid constructs comprising a retinoschisin coding sequence (i.e., encoding a retinoschisin protein or fragment or variant thereof) for integration into and expression from a target genomic locus, vectors, lipid nanoparticles, or compositions as described herein are also provided. Likewise, genomes, cells, and animals comprising the described nuclease agents or nucleic acids encoding the nuclease agents (e.g., targeting an endogenous RS1 locus) or vectors, lipid nanoparticles, or compositions as described herein are also provided. The genomes, cells, or animals can comprise the nucleic acid construct genomically integrated at a target genomic locus (e.g., at an RS1 locus) and can express the retinoschisin protein or fragment or variant thereof. The retinoschisin coding sequence can be operably linked to an endogenous promoter at the target genomic locus upon integration into the target genomic locus, or it can be operably linked to an exogenous promoter present in the nucleic acid construct. If the nucleic acid construct is a bidirectional nucleic acid construct disclosed herein, the genome, cell, or animal can express the first retinoschisin protein or fragment or variant thereof or can express the second retinoschisin protein or fragment or variant thereof. In some genomes, cells, or animals, the target genomic locus is an RS1 locus. For example, the nucleic acid construct can be genomically integrated in intron 1 of the endogenous RS1 locus. Endogenous RS1 exon 1 can then splice into the coding sequence for the retinoschisin protein or fragment or variant thereof in the nucleic acid construct. In a specific example, the modified RS1 locus comprising the genomically integrated nucleic acid construct encodes a protein comprising, consisting essentially of, or consisting of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 2 or 4. In a specific example, the modified RS1 locus comprising the genomically integrated nucleic acid construct comprises an RS1 coding sequence comprising, consisting essentially of, or consisting of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 6, 11, or 12.

In some genomes, cells, or animals, integration of the nucleic acid construct into the endogenous RS1 locus prevents transcription of the endogenous RS1 gene downstream of the integration site. For example, the integration of the nucleic acid construct into the endogenous RS1 locus can reduce or eliminate expression of the endogenous retinoschisin protein and replace it with expression of the retinoschisin protein or fragment or variant thereof encoded by the nucleic acid construct. In one example, integration of the nucleic acid construct into the endogenous RS1 locus reduces expression of the endogenous retinoschisin protein. In another example, integration of the nucleic acid construct into the endogenous RS1 locus eliminates expression of the endogenous retinoschisin protein. In a specific example, the endogenous RS1 locus comprises a mutated RS1 gene comprising a mutation that causes X-linked juvenile retinoschisis, and expression of the genomically integrated nucleic acid construct reduces or eliminates expression of the mutated RS1 gene.

The target genomic locus at which the nucleic acid construct is stably integrated can be heterozygous for the retinoschisin coding sequence from the nucleic acid construct or homozygous for the retinoschisin coding sequence from the nucleic acid construct. A diploid organism has two alleles at each genetic locus. Each pair of alleles represents the genotype of a specific genetic locus. Genotypes are described as homozygous if there are two identical alleles at a particular locus and as heterozygous if the two alleles differ. An animal comprising a genomically integrated nucleic acid construct as described herein can comprise the nucleic acid construct in a target genomic locus in its germline.

The genomes, cells, or animals provided herein can be, for example, eukaryotic, including, for example, animal, mammalian, non-human mammalian, and human. The term "animal" includes mammals, fishes, and birds. A mammal can be, for example, a non-human mammal, a human, a rodent, a rat, a mouse, or a hamster. Other non-human mammals include, for example, non-human primates, monkeys, apes, cats, dogs, rabbits, horses, bulls, deer, bison, livestock (e.g., bovine species such as cows, steer, and so forth; ovine species such as sheep, goats, and so forth; and porcine species such as pigs and boars). Birds include, for example, chickens, turkeys, ostrich, geese, ducks, and so forth. Domesticated animals and agricultural animals are also included. The term "non-human" excludes humans.

The cells can be isolated cells (e.g., in vitro) or can be in vivo within an animal. Cells can also be any type of undifferentiated or differentiated state. For example, a cell can be a totipotent cell, a pluripotent cell (e.g., a human pluripotent cell or a non-human pluripotent cell such as a mouse embryonic stem (ES) cell or a rat ES cell), or a non-pluripotent cell. Totipotent cells include undifferentiated cells that can give rise to any cell type, and pluripotent cells include undifferentiated cells that possess the ability to develop into more than one differentiated cell types.

The cells provided herein can also be germ cells (e.g., sperm or oocytes). The cells can be mitotically competent cells or mitotically-inactive cells, meiotically competent cells or meiotically-inactive cells. Similarly, the cells can also be primary somatic cells or cells that are not a primary somatic cell. Somatic cells include any cell that is not a gamete, germ cell, gametocyte, or undifferentiated stem cell.

For example, the cells can be liver cells, kidney cells, hematopoietic cells, endothelial cells, epithelial cells, fibroblasts, mesenchymal cells, keratinocytes, blood cells, melanocytes, monocytes, mononuclear cells, monocytic precursors, B cells, erythroid-megakaryocytic cells, eosinophils, macrophages, T cells, islet beta cells, exocrine cells, pancreatic progenitors, endocrine progenitors, adipocytes, preadipocytes, neurons, glial cells, neural stem cells, neurons, hepatoblasts, hepatocytes, cardiomyocytes, skeletal myoblasts, smooth muscle cells, ductal cells, acinar cells, alpha cells, beta cells, delta cells, PP cells, cholangiocytes, white or brown adipocytes, or ocular cells (e.g., trabecular meshwork cells, retinal pigment epithelial cells, retinal microvascular endothelial cells, retinal pericyte cells, conjunctival epithelial cells, conjunctival fibroblasts, iris pigment epithelial cells, keratocytes, lens epithelial cells, non-pigment ciliary epithelial cells, ocular choroid fibroblasts, photoreceptor cells, ganglion cells, bipolar cells, horizontal cells, or amacrine cells). For example, the cells can be eye cells, such as retinal cells (e.g., photoreceptors).

The cells provided herein can be normal, healthy cells, or can be diseased or mutant-bearing cells. For example, the cells can comprise one or more mutations associated with or that cause XLRS (e.g., encoding a R141C substitution in the retinoschisin protein).

The animals provided herein can be humans or they can be non-human animals. Non-human animals comprising a nucleic acid or expression cassette as described herein can be made by the methods described elsewhere herein. The term "animal" includes mammals, fishes, and birds. Mammals include, for example, humans, non-human primates, monkeys, apes, cats, dogs, horses, bulls, deer, bison, sheep, rabbits, rodents (e.g., mice, rats, hamsters, and guinea pigs), and livestock (e.g., bovine species such as cows and steer; ovine species such as sheep and goats; and porcine species such as pigs and boars). Birds include, for example, chickens, turkeys, ostrich, geese, and ducks. Domesticated animals and agricultural animals are also included. The term "non-human animal" excludes humans. Particular examples of non-human animals include rodents, such as mice and rats.

Non-human animals can be from any genetic background. For example, suitable mice can be from a 129 strain, a C57BL/6 strain, a mix of 129 and C57BL/6, a BALB/c strain, or a Swiss Webster strain. Examples of 129 strains include 129P1, 129P2, 129P3, 129X1, 129S1 (e.g., 129S1/SV, 129S1/Svlm), 129S2, 129S4, 129S5, 12959/SvEvH, 129S6 (129/SvEvTac), 129S7, 129S8, 129T1, and 129T2. See, e.g., Festing et al. (1999) *Mammalian Genome* 10:836, herein incorporated by reference in its entirety for all purposes. Examples of C57BL strains include C57BL/A, C57BL/An, C57BL/GrFa, C57BL/Kal_wN, C57BL/6, C57BL/6J, C57BL/6ByJ, C57BL/6NJ, C57BL/10, C57BL/10ScSn, C57BL/10Cr, and C57BL/Ola. Suitable mice can also be from a mix of an aforementioned 129 strain and an aforementioned C57BL/6 strain (e.g., 50% 129 and 50% C57BL/6). Likewise, suitable mice can be from a mix of aforementioned 129 strains or a mix of aforementioned BL/6 strains (e.g., the 129S6 (129/SvEvTac) strain).

Similarly, rats can be from any rat strain, including, for example, an ACI rat strain, a Dark Agouti (DA) rat strain, a Wistar rat strain, a LEA rat strain, a Sprague Dawley (SD) rat strain, or a Fischer rat strain such as Fisher F344 or Fisher F6. Rats can also be obtained from a strain derived from a mix of two or more strains recited above. For example, a suitable rat can be from a DA strain or an ACI strain. The ACI rat strain is characterized as having black agouti, with white belly and feet and an RT1$^{av1}$ aplotype. Such strains are available from a variety of sources including Harlan Laboratories. The Dark Agouti (DA) rat strain is characterized as having an agouti coat and an RT1$^{av1}$ haplotype. Such rats are available from a variety of sources including Charles River and Harlan Laboratories. In some cases, suitable rats can be from an inbred rat strain. See, e.g., US 2014/0235933, herein incorporated by reference in its entirety for all purposes.

VII. Methods for Modifying a Target Genomic Locus, Expressing Retinoschisin in a Cell, or Treating XLRS Also provided herein are methods for modifying a target genomic locus or methods for expressing retinoschisin in a cell using the nucleic acid constructs comprising a retinoschisin coding sequence (i.e., encoding a retinoschisin protein or fragment or variant thereof) for integration into and expression from a target genomic locus as provided herein. Also provided herein are methods for modifying a target genomic locus or methods for expressing retinoschisin in a cell using the nuclease agents (or nucleic acids encoding) disclosed herein in combination with the nucleic acid constructs comprising a retinoschisin coding sequence (i.e., encoding a retinoschisin protein or fragment or variant thereof) for integration into and expression from a target genomic locus as provided herein. Also provided herein are methods for modifying a target genomic locus using the nuclease agents (or nucleic acids encoding) disclosed herein.

The methods can be, for example, methods of modifying a target genomic locus (e.g., an endogenous RS1 locus). Some such methods comprise administering a nuclease agent or a nucleic acid encoding the nuclease agent, wherein the nuclease agent targets a nuclease target sequence in the target genomic locus and cleaves the target genomic locus.

The methods can be, for example, methods of integrating a coding sequence for a retinoschisin protein or fragment thereof into a target genomic locus and expressing the retinoschisin protein or fragment thereof in a cell. Some such methods comprise administering a nucleic acid construct, vector, or lipid nanoparticle as described elsewhere herein to a cell. The coding sequence can then be integrated into the target genomic locus, and the retinoschisin protein or fragment thereof is expressed in the cell. The retinoschisin coding sequence can be operably linked to an endogenous promoter at the target genomic locus upon integration into the target genomic locus, or it can be operably linked to an exogenous promoter present in the nucleic acid construct. Some such methods comprise administering to a cell a nucleic acid construct, vector, or lipid nanoparticle as described elsewhere herein and a nuclease agent or a nucleic acid encoding the nuclease agent, wherein the nuclease agent targets a nuclease target sequence in the target genomic locus. The nuclease agent can cleave the target genomic locus, and the coding sequence from the nucleic acid construct can be integrated into the target genomic locus so that the retinoschisin protein or fragment thereof is expressed in the cell. Some such methods comprise administering to a cell a composition comprising a nucleic acid construct, vector, or lipid nanoparticle disclosed herein and a nuclease agent or a nucleic acid encoding the nuclease agent, wherein the nuclease agent targets a nuclease target sequence in the target genomic locus. The nuclease agent can cleave the target genomic locus, and the coding sequence from the nucleic acid construct can be integrated into the target genomic locus so that the retinoschisin protein or fragment thereof is expressed in the cell. The nuclease agent or nucleic acid encoding the nuclease agent can be administered, for example, in a vector (e.g., viral vector such as an AAV vector) or in a lipid nanoparticle.

The cells in the above methods can be isolated cells (e.g., in vitro) or can be in vivo within an animal. The cells can also be any type of undifferentiated or differentiated state. For example, a cell can be a totipotent cell, a pluripotent cell (e.g., a human pluripotent cell or a non-human pluripotent cell such as a mouse embryonic stem (ES) cell or a rat ES cell), or a non-pluripotent cell. Totipotent cells include undifferentiated cells that can give rise to any cell type, and pluripotent cells include undifferentiated cells that possess the ability to develop into more than one differentiated cell types.

The cells can also be germ cells (e.g., sperm or oocytes). The cells can be mitotically competent cells or mitotically-inactive cells, meiotically competent cells or meiotically-inactive cells. Similarly, the cells can also be primary somatic cells or cells that are not a primary somatic cell. Somatic cells include any cell that is not a gamete, germ cell, gametocyte, or undifferentiated stem cell. For example, the cells can be liver cells, kidney cells, hematopoietic cells, endothelial cells, epithelial cells, fibroblasts, mesenchymal cells, keratinocytes, blood cells, melanocytes, monocytes, mononuclear cells, monocytic precursors, B cells, erythroid-megakaryocytic cells, eosinophils, macrophages, T cells, islet beta cells, exocrine cells, pancreatic progenitors, endocrine progenitors, adipocytes, preadipocytes, neurons, glial cells, neural stem cells, neurons, hepatoblasts, hepatocytes, cardiomyocytes, skeletal myoblasts, smooth muscle cells, ductal cells, acinar cells, alpha cells, beta cells, delta cells, PP cells, cholangiocytes, white or brown adipocytes, or ocular cells (e.g., trabecular meshwork cells, retinal pigment epithelial cells, retinal microvascular endothelial cells, retinal pericyte cells, conjunctival epithelial cells, conjunctival fibroblasts, iris pigment epithelial cells, keratocytes, lens epithelial cells, non-pigment ciliary epithelial cells, ocular choroid fibroblasts, photoreceptor cells, ganglion cells, bipolar cells, horizontal cells, or amacrine cells). For example, the cells can be eye cells, such as retinal cells (e.g., photoreceptors).

The cells provided herein can be normal, healthy cells, or can be diseased or mutant-bearing cells. For example, the cells can comprise one or more mutations associated with or that cause XLRS (e.g., R141C).

The cells can be, for example, eukaryotic, including, for example, animal, mammalian, non-human mammalian, and human. In a specific example, the cells are human cells. The term "animal" includes mammals, fishes, and birds. A mammal can be, for example, a non-human mammal, a human, a rodent, a rat, a mouse, or a hamster. Other non-human mammals include, for example, non-human primates, monkeys, apes, cats, dogs, rabbits, horses, bulls, deer, bison, livestock (e.g., bovine species such as cows, steer, and so forth; ovine species such as sheep, goats, and so forth; and porcine species such as pigs and boars). Birds include, for example, chickens, turkeys, ostrich, geese, ducks, and so forth. Domesticated animals and agricultural animals are also included. The term "non-human" excludes humans.

The cells can be in vivo within an animal. The animal can be a human or can be a non-human animal. Non-human animals comprising a nucleic acid or expression cassette as described herein can be made by the methods described elsewhere herein. The term "animal" includes mammals, fishes, and birds. Mammals include, for example, humans, non-human primates, monkeys, apes, cats, dogs, horses, bulls, deer, bison, sheep, rabbits, rodents (e.g., mice, rats, hamsters, and guinea pigs), and livestock (e.g., bovine species such as cows and steer; ovine species such as sheep and goats; and porcine species such as pigs and boars). Birds include, for example, chickens, turkeys, ostrich, geese, and ducks. Domesticated animals and agricultural animals are also included. The term "non-human animal" excludes humans. Particular examples of non-human animals include rodents, such as mice and rats.

Non-human animals can be from any genetic background. For example, suitable mice can be from a 129 strain, a C57BL/6 strain, a mix of 129 and C57BL/6, a BALB/c strain, or a Swiss Webster strain. Examples of 129 strains include 129P1, 129P2, 129P3, 129X1, 129S1 (e.g., 129S1/SV, 129S1/Svlm), 129S2, 129S4, 129S5, 12959/SvEvH, 129S6 (129/SvEvTac), 129S7, 129S8, 129T1, and 129T2. See, e.g., Festing et al. (1999) *Mammalian Genome* 10:836, herein incorporated by reference in its entirety for all purposes. Examples of C57BL strains include C57BL/A, C57BL/An, C57BL/GrFa, C57BL/Kal_wN, C57BL/6, C57BL/6J, C57BL/6ByJ, C57BL/6NJ, C57BL/10, C57BL/10ScSn, C57BL/10Cr, and C57BL/Ola. Suitable mice can also be from a mix of an aforementioned 129 strain and an aforementioned C57BL/6 strain (e.g., 50% 129 and 50% C57BL/6). Likewise, suitable mice can be from a mix of aforementioned 129 strains or a mix of aforementioned BL/6 strains (e.g., the 129S6 (129/SvEvTac) strain).

Similarly, rats can be from any rat strain, including, for example, an ACI rat strain, a Dark Agouti (DA) rat strain, a Wistar rat strain, a LEA rat strain, a Sprague Dawley (SD) rat strain, or a Fischer rat strain such as Fisher F344 or Fisher F6. Rats can also be obtained from a strain derived from a mix of two or more strains recited above. For example, a suitable rat can be from a DA strain or an ACI strain. The ACI rat strain is characterized as having black agouti, with white belly and feet and an $RT1^{av1}$ haplotype. Such strains are available from a variety of sources including Harlan Laboratories. The Dark Agouti (DA) rat strain is characterized as having an agouti coat and an $RT1^{av1}$ haplotype. Such rats are available from a variety of sources including Charles River and Harlan Laboratories. In some cases, suitable rats can be from an inbred rat strain. See, e.g., US 2014/0235933, herein incorporated by reference in its entirety for all purposes.

Also provided are methods of treating a subject with X-linked juvenile retinoschisis (XLRS). Such methods can comprise administering a nucleic acid construct, vector, or lipid nanoparticle as described elsewhere herein to a subject with XLRS, wherein the nucleic acid construct is integrated into and expressed from the target genomic locus in one or more retinal cells (e.g., photoreceptors) in the subject, and a therapeutically effective level of retinoschisin expression is achieved in the subject. The subject can have, for example, an endogenous RS1 gene comprising at least one mutation associated with or that causes X-linked juvenile retinoschisis (e.g., R141C). The retinoschisin coding sequence can be operably linked to an endogenous promoter at the target genomic locus upon integration into the target genomic locus, or it can be operably linked to an exogenous promoter present in the nucleic acid construct. Such methods can also comprise administering to the subject a nucleic acid construct, vector, or lipid nanoparticle as described elsewhere herein and a nuclease agent or a nucleic acid encoding the nuclease agent, wherein the nuclease agent targets a nuclease target sequence in the target genomic locus, the nucleic acid construct is integrated into and expressed from the target genomic locus in one or more retinal cells (e.g., photoreceptors) in the subject, and a therapeutically effective level of retinoschisin expression is achieved in the subject. Such methods can also comprise administering to the subject a composition comprising a nucleic acid construct, vector, or lipid nanoparticle disclosed herein and a nuclease agent or a nucleic acid encoding the nuclease agent, wherein the nuclease agent targets a nuclease target sequence in the target genomic locus, the nucleic acid construct is integrated into and expressed from the target genomic locus in one or more retinal cells (e.g., photoreceptors) in the subject, and a therapeutically effective level of retinoschisin expression is achieved in the subject.

XLRS is a vitreo-retinal dystrophy characterized by macular pathology and by splitting of the superficial layer of the retina. Macular changes are present in almost all cases. In the fundi, radially oriented intraretinal foveomacular cysts are seen in a spoke-wheel configuration, with the absence of foveal reflex in most cases. In addition, approximately half of cases have bilateral peripheral retinoschisis in the inferotemporal part of the retina. Aside from the typical fundus appearance, strabismus, nystagmus, axial hyperopia, defective color vision and foveal ectopy can be present. The most important complications are vitreous hemorrhage, retinal detachment, and neovascular glaucoma. Foveal schisis with "spoke-wheel" pattern is the characteristic finding on fundus exam, present in nearly 100% of cases. Schisis may occur peripherally in up to 50% of patients. Peripheral schisis can lead to holes and tears of the inner leaf with potential for hemorrhage from unsupported crossing vessels. Additional peripheral changes include pigmentation resembling RP, retinal fibrosis and white flecks.

Because XLRS is a recessive disease caused by the loss in retinoschisin function, gene replacement therapy has been considered as a potential treatment for this disease. Furthermore, because retinoschisin functions as an extracellular protein, beneficial treatment is not necessarily restricted to the transfected cell expressing the replacement gene but can encompass a wider area due to the spread of the secreted protein from the site of expression.

In some methods, integration of the nucleic acid construct results in retinal structural restoration (e.g., at least partial retinal structural restoration). In some methods, integration of the nucleic acid construct results in retinal functional restoration (e.g., at least partial retinal functional restoration).

The subject with XLRS in the above methods can be any type of animal as disclosed above. In a particular example, the subject is a human.

In methods targeting a cell in vivo in an animal, the nucleic acid construct can be inserted in particular types of cells in the animal. The method and vehicle for introducing the nuclease agent (or nucleic acid encoding the nuclease agent) and the nucleic acid construct into the animal can affect which types of cells in the animal are targeted. In some methods, for example, the nucleic acid construct is inserted into a target genomic locus (e.g., an endogenous RS1 locus) in retinal cells, such as photoreceptors. Methods and vehicles for introducing the nuclease agent (or nucleic acid encoding the nuclease agent) and the nucleic acid construct into the animal (including methods and vehicles that target the eye or retinal cells (e.g., photoreceptors), such as lipid nanoparticle-mediated delivery and AAV2-mediated delivery, AAV5-mediated delivery, AAV8-mediated delivery, or AAV7m8-mediated delivery and intravitreal or subretinal injection), are disclosed in more detail elsewhere herein.

Any target genomic locus capable of expressing a gene can be used, such as a safe harbor locus (safe harbor gene) or an endogenous RS1 locus. Such loci are described in more detail elsewhere herein. In a specific example, the target genomic locus can be an endogenous RS1 locus, such as an endogenous RS1 locus comprising one or more mutations associated with or that cause XLRS (e.g., R141C). For example, the nucleic acid construct can be genomically integrated in intron 1 of the endogenous RS1 locus. Endogenous RS1 exon 1 can then splice into the coding sequence for the retinoschisin protein or fragment or variant thereof in the nucleic acid construct. In a specific example, the modified RS1 locus comprising the genomically integrated nucleic acid construct encodes a protein comprising, consisting essentially of, or consisting of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 2 or 4. In a specific example, the modified RS1 locus comprising the genomically integrated nucleic acid construct comprises an RS1 coding sequence comprising, consisting essentially of, or consisting of a sequence at least about 90%, at least about 91%, at least about 92%, at least about 93%, at least about 94%, at least about 95%, at least about 96%, at least about 97%, at least about 98%, at least about 99%, or 100% identical to SEQ ID NO: 6, 11, or 12.

Integration of the nucleic acid construct into the endogenous RS1 locus can, in some cases, prevent transcription of the endogenous RS1 gene downstream of the integration site. The integration of the nucleic acid construct into the endogenous RS1 locus can reduce or eliminate expression of the endogenous retinoschisin protein and replace it with expression of the retinoschisin protein or fragment or variant thereof encoded by the nucleic acid construct. In one example, integration of the nucleic acid construct into the endogenous RS1 locus reduces expression of the endogenous retinoschisin protein. In another example, integration of the nucleic acid construct into the endogenous RS1 locus eliminates expression of the endogenous retinoschisin protein. In methods targeting cells in vivo, such as methods of treating a subject with XLRS, the integration of the nucleic acid construct into the endogenous RS1 locus in one or more cells can reduce or eliminate expression of the endogenous retinoschisin protein in those cells and replace it with expression of the retinoschisin protein or fragment or variant thereof encoded by the nucleic acid construct. In this way, integration of the nucleic acid construct can simultaneously knock out the endogenous RS1 gene (e.g., an endogenous RS1 gene comprising one or more mutations associated with or that cause XLRS, such as R141C) and knock in a replacement retinoschisin coding sequence (e.g., a replacement retinoschisin coding sequence that does not comprise mutations associated with or that cause XLRS). In other methods, however, an endogenous RS1 gene comprising one or more mutations associated with or that cause XLRS can first be inactivated (e.g., using one or more nuclease agents that target and disrupt the endogenous RS1 gene), and a nucleic acid construct comprising a replacement retinoschisin coding sequence (e.g., a replacement retinoschisin coding sequence that does not comprise mutations associated with or that cause XLRS) can subsequently be integrated into a target genomic locus. In other methods, the nucleic acid construct can be integrated first, and the endogenous RS1 gene can subsequently be inactivated.

Targeted insertion of the nucleic acid construct comprising the retinoschisin coding sequence into a target genomic locus, and particularly an endogenous RS1 locus, offers multiple advantages. Such methods result in stable modification to allow for stable, long-term expression of the retinoschisin coding sequence. With respect to the RS1 locus, such methods are able to utilize the endogenous RS1 promoter and regulatory regions to achieve physiologically relevant expression (level of expression, timing of expression, and location of expression). For example, the retinoschisin coding sequence in the nucleic acid construct can comprise a promoterless gene, and the inserted nucleic acid construct can be operably linked to an endogenous promoter in the target genomic locus (e.g., RS1 locus). Use of an endogenous promoter is advantageous because it obviates the need for inclusion of a promoter in the nucleic acid construct, allowing packaging of larger transgenes that may not normally package efficiently (e.g., in AAV). Alternatively, the retinoschisin coding sequence in the nucleic acid construct can be operably linked to an exogenous promoter in the nucleic acid construct. Examples of types of promoters that can be used are disclosed elsewhere herein.

Optionally, some or all of the endogenous gene (e.g., endogenous RS1 gene) at the target genomic locus can be expressed upon insertion of the retinoschisin coding sequence from the nucleic acid construct. Alternatively, in some methods, none of the endogenous gene at the target genomic locus is expressed. As one example, the modified target genomic locus (e.g., modified RS1 locus) after integration of the nucleic acid construct can encode a chimeric protein comprising an endogenous secretion signal or a fragment thereof and the retinoschisin protein encoded by the nucleic acid construct. In another example, the first intron of an RS1 locus can be targeted. The secretion signal peptide of RS1 is encoded by exon 1 and part of exon 2 of the RS1 gene. In such a scenario, a promoterless cassette bearing a splice acceptor and the retinoschisin coding sequence will support expression and secretion of the retinoschisin protein. Splicing between endogenous RS1 exon 1 and the integrated retinoschisin coding sequence creates a chimeric mRNA and protein including the endogenous retinoschisin sequence encoded by exon 1 operably linked to the retinoschisin protein sequence encoded by the integrated nucleic acid construct.

The retinoschisin coding sequence in the nucleic acid construct can be inserted into the target genomic locus by any means, including homologous recombination (HR) and non-homologous end joining (NHEJ) as described elsewhere herein.

In a specific example, the nucleic acid construct can be inserted via homology-independent targeted integration (e.g., directional homology-independent targeted integration). For example, the retinoschisin coding sequence in the nucleic acid construct can be flanked on each side by a target site for a nuclease agent (e.g., the same target site as in the target genomic locus, and the same nuclease agent being used to cleave the target site in the target genomic locus). The nuclease agent can then cleave the target sites flanking the retinoschisin coding sequence. In a specific example, the nucleic acid construct is delivered AAV-mediated delivery, and cleavage of the target sites flanking the retinoschisin coding sequence can remove the inverted terminal repeats (ITRs) of the AAV. Removal of the ITRs can make it easier to assess successful targeting, because presence of the ITRs can hamper sequencing efforts due to the repeated sequences. In some methods, the target site in the target genomic locus (e.g., a gRNA target sequence including the flanking protospacer adjacent motif) is no longer present if the retinoschisin coding sequence is inserted into the target genomic locus in the correct orientation but it is reformed if the retinoschisin protein coding sequence is inserted into the target genomic locus in the opposite orientation. This can help ensure that the retinoschisin coding sequence is inserted in the correct orientation for expression.

In methods in which a nucleic acid construct (or vector or LNP) and a nuclease agent or nucleic acid encoding a nuclease agent are administered together with a nucleic acid construct, the nucleic acid construct and the nuclease agent or the nucleic acid encoding the nuclease agent can be administered simultaneously. Alternatively, the nucleic acid construct and the nuclease agent or the nucleic acid encoding the nuclease agent can be administered sequentially in any order. For example, the nucleic acid construct can be administered after the nuclease agent or the nucleic acid encoding the nuclease agent, or the nuclease agent or the nucleic acid encoding the nuclease agent can be administered after the nucleic acid construct. For example, the nuclease agent or the nucleic acid encoding the nuclease agent can be administered about 1 hour to about 48 hours, about 1 hour to about 24 hours, about 1 hour to about 12 hours, about 1 hour to about 6 hours, about 1 hour to about 2 hours, about 2 hours to about 48 hours, about 2 hours to about 24 hours, about 2 hours to about 12 hours, about 2 hours to about 6 hours, about 3 hours to about 48 hours, about 6 hours to about 48 hours, about 12 hours to about 48 hours, or about 24 hours to about 48 hours prior to or subsequent to administration of the nucleic acid construct.

The nucleic acid construct and the nuclease agent or nucleic acid encoding a nuclease agent can be administered in any suitable delivery vehicle. In some methods, the nucleic acid construct and the nuclease agent or nucleic acid encoding a nuclease agent can be administered in the same delivery vehicle (e.g., the same lipid nanoparticle or vector). In some methods in which the nuclease agent comprises a Cas protein or a nucleic acid encoding a Cas protein and a guide RNA or a DNA encoding a guide RNA, both components can be administered in the same delivery vehicle, or alternatively they can be delivered in separate delivery vehicles. In other methods, the nucleic acid construct and the nuclease agent or nucleic acid encoding a nuclease agent can be administered in different delivery vehicles (e.g., administration of the nuclease agent or the nucleic acid encoding the nuclease agent in a first vector or in an LNP, and administration of the nucleic acid construct in a second vector, such as an AAV vector).

The nuclease agent (or nucleic acid encoding the nuclease agent) and the nucleic acid construct can be introduced in any form (e.g., DNA or RNA for guide RNAs; DNA, RNA, or protein for Cas proteins) via any delivery method (e.g., AAV, LNP, or HDD) and any route of administration (e.g., intravitreal injection or subretinal injection) as disclosed elsewhere herein. As one example, the nucleic acid construct is delivered via adeno-associated virus (AAV)-mediated delivery (e.g., AAV2-mediated delivery, AAV5-mediated delivery, AAV8-mediated delivery, or AAV7m8-mediated delivery). Likewise, the nuclease agent (or nucleic acid encoding the nuclease agent) can be delivered by lipid nanoparticle (LNP)-mediated delivery or AAV-mediated delivery. For example, the nuclease agent can be CRISPR/Cas9, and a Cas9 mRNA and a gRNA targeting an endogenous RS1 locus (e.g., intron 1 of RS1) can be delivered via LNP-mediated delivery or AAV-mediated delivery, and the nucleic acid construct (e.g., a bidirectional construct or a homology-independent targeted integration construct) can be delivered via AAV2-mediated delivery, AAV5-mediated delivery, AAV8-mediated delivery, or AAV7m8-mediated delivery. In another specific example, both the nucleic acid encoding the nuclease agent and the nucleic acid construct are delivered via AAV-mediated delivery (e.g., in a single AAV or via two separate AAVs). For example, a first AAV can carry a Cas9 expression cassette, and a second AAV can carry a gRNA expression cassette and the nucleic acid construct. Similarly, a first AAV can carry a Cas9 expression cassette, and a second AAV can carry two or more gRNA expression cassettes and the nucleic acid construct. Alternatively, a first AAV can carry a Cas9 expression cassette (e.g., Cas9 coding sequence operably linked to a promoter) and a gRNA expression cassette (e.g., gRNA coding sequence operably linked to a promoter), and the second AAV can carry the nucleic acid construct. Similarly, a first AAV can carry a Cas9 expression cassette (e.g., Cas9 coding sequence operably linked to a promoter) and two gRNA expression cassettes (e.g., gRNA coding sequences operably linked to promoters), and the second AAV can carry the nucleic acid construct. Different promoters can be used to drive expression of the gRNA, such as a U6 promoter or the small tRNA Gln. Likewise, different promoters can be used to drive Cas9 expression. In some methods, small promoters are used so that the Cas9 coding sequence can fit into an AAV construct. In some methods, small Cas9 proteins (e.g., SaCas9 or CjCas9 are used to maximize the AAV packaging capacity).

The methods disclosed herein comprise administering or introducing into a cell or animal nuclease agents (or nucleic acids encoding nuclease agents) and nucleic acid constructs (i.e., exogenous donor nucleic acids) comprising a retinoschisin coding sequence (i.e., encoding a retinoschisin protein or fragment or variant thereof) for integration into and expression from a target genomic locus. "Introducing" includes presenting to the cell or animal the nucleic acid or protein in such a manner that the nucleic acid or protein gains access to the interior of the cell or to the interior of cells within the animal. The introducing can be accomplished by any means, and two or more of the components (e.g., two of the components, or all of the components) can be introduced into the cell or animal simultaneously or sequentially in any combination. For example, a nuclease agent can be introduced into a cell or animal before introduction of the nucleic acid construct. In addition, two or more of the components can be introduced into the cell or animal by the same delivery method or different delivery methods. Similarly, two or more of the components can be introduced into an animal by the same route of administration or different routes of administration.

A guide RNA can be introduced into the cell in the form of an RNA (e.g., in vitro transcribed RNA) or in the form of a DNA encoding the guide RNA. Likewise, protein components such as Cas9 proteins, ZFNs, or TALENs can be introduced into the cell in the form of DNA, RNA, or protein. For example, a guide RNA and a Cas9 protein can both be introduced in the form of RNA. When introduced in the form of a DNA, the DNA encoding a guide RNA can be operably linked to a promoter active in the cell. For example, a guide RNA may be delivered via AAV and expressed in vivo under a U6 promoter. Such DNAs can be in one or more expression constructs. For example, such expression constructs can be components of a single nucleic acid molecule. Alternatively, they can be separated in any combination among two or more nucleic acid molecules (i.e., DNAs encoding one or more CRISPR RNAs and DNAs encoding one or more tracrRNAs can be components of a separate nucleic acid molecules).

Nucleic acids encoding guide RNAs or nuclease agents can be operably linked to a promoter in an expression construct. Expression constructs include any nucleic acid constructs capable of directing expression of a gene or other nucleic acid sequence of interest and which can transfer such a nucleic acid sequence of interest to a target cell. Suitable promoters that can be used in an expression construct include promoters active, for example, in one or more of a eukaryotic cell, a human cell, a non-human cell, a mammalian cell, a non-human mammalian cell, a rodent cell, a mouse cell, a rat cell, a hamster cell, a rabbit cell, a pluripotent cell, an embryonic stem (ES) cell, an adult stem cell, a developmentally restricted progenitor cell, an induced pluripotent stem (iPS) cell, or a one-cell stage embryo. Such promoters can be, for example, conditional promoters, inducible promoters, constitutive promoters, or tissue-specific promoters. Optionally, the promoter can be a bidirectional promoter driving expression of both a guide RNA in one direction and another component in the other direction. Such bidirectional promoters can consist of (1) a complete, conventional, unidirectional Pol III promoter that contains 3 external control elements: a distal sequence element (DSE), a proximal sequence element (PSE), and a TATA box; and (2) a second basic Pol III promoter that includes a PSE and a TATA box fused to the 5' terminus of the DSE in reverse orientation. For example, in the H1 promoter, the DSE is adjacent to the PSE and the TATA box, and the promoter can be rendered bidirectional by creating a hybrid promoter in which transcription in the reverse direction is controlled by appending a PSE and TATA box derived from the U6 promoter. See, e.g., US 2016/0074535, herein incorporated by references in its entirety for all purposes. Use of a bidirectional promoter to express genes encoding a guide RNA and another component simultaneously allows for the generation of compact expression cassettes to facilitate delivery.

Guide RNAs or nucleic acids encoding guide RNAs (or other components) can be provided in compositions comprising a carrier increasing the stability of the guide RNA (e.g., prolonging the period under given conditions of storage (e.g., $-20°$ C., $4°$ C., or ambient temperature) for which degradation products remain below a threshold, such below 0.5% by weight of the starting nucleic acid or protein; or increasing the stability in vivo). Non-limiting examples of such carriers include poly(lactic acid) (PLA) microspheres, poly(D,L-lactic-coglycolic-acid) (PLGA) microspheres, liposomes, micelles, inverse micelles, lipid cochleates, and lipid microtubules.

The methods provided herein do not depend on a particular method for introducing a nucleic acid or protein into the cell, only that the nucleic acid or protein gains access to the interior of a least one cell. Methods for introducing nucleic acids and proteins into various cell types are known in the art and include, for example, stable transfection methods, transient transfection methods, and virus-mediated methods.

Transfection protocols as well as protocols for introducing nucleic acids or proteins into cells may vary. Non-limiting transfection methods include chemical-based transfection methods using liposomes; nanoparticles; calcium phosphate (Graham et al. (1973) *Virology* 52 (2): 456-67, Bacchetti et al. (1977) *Proc. Natl. Acad. Sci. USA* 74 (4): 1590-4, and Kriegler, M (1991). Transfer and Expression: A Laboratory Manual. New York: W. H. Freeman and Company. pp. 96-97); dendrimers; or cationic polymers such as DEAE-dextran or polyethylenimine. Non-chemical methods include electroporation, sonoporation, and optical transfection. Particle-based transfection includes the use of a gene gun, or magnet-assisted transfection (Bertram (2006) *Current Pharmaceutical Biotechnology* 7, 277-28). Viral methods can also be used for transfection.

Introduction of nucleic acids or proteins into a cell can also be mediated by electroporation, by intracytoplasmic injection, by viral infection, by adenovirus, by lentivirus, by retrovirus, by transfection, by lipid-mediated transfection, or by nucleofection. Introduction of nucleic acids or proteins into a cell can also be mediated by adeno-associated virus. Nucleofection is an improved electroporation technology that enables nucleic acid substrates to be delivered not only to the cytoplasm but also through the nuclear membrane and into the nucleus. In addition, use of nucleofection in the methods disclosed herein typically requires much fewer cells than regular electroporation (e.g., only about 2 million compared with 7 million by regular electroporation). In one example, nucleofection is performed using the LONZA® NUCLEOFECTOR™ system.

Introduction of nucleic acids or proteins into a cell (e.g., a one-cell stage embryo) can also be accomplished by microinjection. In one-cell stage embryos, microinjection can be into the maternal and/or paternal pronucleus or into the cytoplasm. If the microinjection is into only one pronucleus, the paternal pronucleus is preferable due to its larger size. Microinjection of an mRNA is preferably into the cytoplasm (e.g., to deliver mRNA directly to the translation machinery), while microinjection of a Cas protein or a nucleic acid encoding a Cas protein or encoding an RNA is preferable into the nucleus/pronucleus. Alternatively, microinjection can be carried out by injection into both the nucleus/pronucleus and the cytoplasm: a needle can first be introduced into the nucleus/pronucleus and a first amount can be injected, and while removing the needle from the one-cell stage embryo a second amount can be injected into the cytoplasm. If a Cas protein is injected into the cytoplasm, the Cas protein preferably comprises a nuclear localization signal to ensure delivery to the nucleus/pronucleus. Methods for carrying out microinjection are well known. See, e.g., Nagy et al. (Nagy A, Gertsenstein M, Vintersten K, Behringer R., 2003, Manipulating the Mouse Embryo. Cold Spring Harbor, New York: Cold Spring Harbor Laboratory Press); Meyer et al. (2010) *Proc. Natl. Acad. Sci. USA* 107:15022-15026 and Meyer et al. (2012) *Proc. Natl. Acad. Sci. USA* 109:9354-9359. Introduction into one-cell stage embryos can also be accomplished by electroporation.

Various methods and compositions are provided herein to allow for introduction of a nucleic acid or protein into a cell or animal. Such methods for introducing nucleic acid or proteins into a cell or animal can include, for example, vector delivery, particle-mediated delivery, exosome-mediated delivery, lipid-nanoparticle (LNP)-mediated delivery, cell-penetrating-peptide-mediated delivery, or implantable-device-mediated delivery. As specific examples, a nucleic acid or protein can be introduced into a cell or animal in a carrier such as a poly(lactic acid) (PLA) microsphere, a poly(D,L-lactic-coglycolic-acid) (PLGA) microsphere, a liposome, a micelle, an inverse micelle, a lipid cochleate, or a lipid microtubule. Some specific examples of delivery to an animal include hydrodynamic delivery, virus-mediated delivery (e.g., adeno-associated virus (AAV)-mediated delivery, or by adenovirus, by lentivirus, or by retrovirus), and lipid-nanoparticle-mediated delivery. In one specific example, both the nuclease agent and nucleic acid construct can be delivered via LNP-mediated delivery. In another specific example, both the nuclease agent and nucleic acid construct can be delivered via AAV-mediated delivery. For example, the nuclease agent and the nucleic acid construct can be delivered via multiple different AAV vectors (e.g., two different AAV vectors). In a specific example in which the nuclease agent is CRISPR/Cas (e.g., CRISPR/Cas9), a first AAV vector can deliver the Cas (e.g., Cas9), and a second AAV vector can deliver the gRNA and the nucleic acid construct. For example, small promoters can be used so that the Cas9 coding sequence can fit into an AAV construct.

In another specific example, the nuclease agent can be delivered via LNP-mediated delivery and the nucleic acid construct can be delivered via AAV-mediated delivery. In another specific example, the nuclease agent can be delivered via AAV-mediated delivery and the nucleic acid construct can be delivered via LNP-mediated delivery.

Introduction of nucleic acids can also be accomplished by virus-mediated delivery, such as AAV-mediated delivery or lentivirus-mediated delivery (e.g., an AAV vector or a lentiviral vector). Other exemplary viruses/viral vectors include retroviruses, adenoviruses, vaccinia viruses, poxviruses, and herpes simplex viruses. The viruses can infect dividing cells, non-dividing cells, or both dividing and non-dividing cells. The viruses can integrate into the host genome or alternatively do not integrate into the host genome. Such viruses can also be engineered to have reduced immunity. The viruses can be replication-competent or can be replication-defective (e.g., defective in one or more genes necessary for additional rounds of virion replication and/or packaging). Viruses can cause transient expression, long-lasting expression (e.g., at least 1 week, 2 weeks, 1 month, 2 months, or 3 months), or permanent expression (e.g., of Cas9 and/or gRNA). Exemplary viral titers (e.g., AAV titers) include $10^{12}$, $10^{13}$, $10^{14}$, $10^{15}$, and $10^{16}$ vector genomes/mL. Exemplary viral titers (e.g., AAV titers) include about $10^{12}$, about $10^{13}$, about $10^{14}$, about $10^{15}$, and about $10^{16}$ vector genomes (vg)/mL, or between about $10^{12}$ to about $10^{16}$, between about $10^{12}$ to about $10^{15}$, between about $10^{12}$ to about $10^{14}$, between about $10^{12}$ to about 101, between about $10^{13}$ to about $10^{16}$, between about $10^{14}$ to about $10^{16}$, between about $10^{15}$ to about $10^{16}$, or between about $10^{13}$ to about $10^{15}$ vg/mL. Other exemplary viral titers (e.g., AAV titers) include about $10^{12}$, about $10^{13}$, about $10^{14}$, about $10^{15}$, and about $10^{16}$ vector genomes (vg)/kg of body weight, or between about $10^{12}$ to about $10^{16}$, between about $10^{12}$ to about $10^{15}$, between about $10^{12}$ to about $10^{14}$, between about $10^{12}$ to about $10^{13}$, between about 101 to about $10^{16}$, between about $10^{14}$ to about $10^{16}$, between about $10^{15}$ to about $10^{16}$, or between about $10^{13}$ to about $10^{15}$ vg/kg of body weight.

The ssDNA AAV genome consists of two open reading frames, Rep and Cap, flanked by two inverted terminal repeats that allow for synthesis of the complementary DNA strand. When constructing an AAV transfer plasmid, the transgene is placed between the two ITRs, and Rep and Cap can be supplied in trans. In addition to Rep and Cap, AAV can require a helper plasmid containing genes from adenovirus. These genes (E4, E2a, and VA) mediate AAV replication. For example, the transfer plasmid, Rep/Cap, and the helper plasmid can be transfected into HEK293 cells containing the adenovirus gene E1+ to produce infectious AAV particles. Alternatively, the Rep, Cap, and adenovirus helper genes may be combined into a single plasmid. Similar packaging cells and methods can be used for other viruses, such as retroviruses.

Multiple serotypes of AAV have been identified. These serotypes differ in the types of cells they infect (i.e., their tropism), allowing preferential transduction of specific cell types. Serotypes for photoreceptor cells include AAV2, AAV5, and AAV8. Serotypes for retinal pigment epithelium tissue include AAV1, AAV2, AAV4, AAV5, and AAV8. In a specific example, the AAV vector comprising the nucleic acid construct can be AAV2, AAV5, or AAV8.

Tropism can be further refined through pseudotyping, which is the mixing of a capsid and a genome from different viral serotypes. For example AAV2/5 indicates a virus containing the genome of serotype 2 packaged in the capsid from serotype 5. Use of pseudotyped viruses can improve transduction efficiency, as well as alter tropism. Hybrid capsids derived from different serotypes can also be used to alter viral tropism. For example, AAV-DJ contains a hybrid capsid from eight serotypes and displays high infectivity across a broad range of cell types in vivo. AAV-DJ8 is another example that displays the properties of AAV-DJ but with enhanced brain uptake. AAV serotypes can also be modified through mutations. Examples of mutational modifications of AAV2 include Y444F, Y500F, Y730F, and S662V. Examples of mutational modifications of AAV3 include Y705F, Y731F, and T492V. Examples of mutational modifications of AAV6 include S663V and T492V. Other pseudotyped/modified AAV variants include AAV2/1, AAV2/6, AAV2/7, AAV2/8, AAV2/9, AAV2.5, AAV8.2, and AAV/SASTG. In a specific example, the AAV is AAV7m8, an AAV variant that mediates highly efficient delivery to all retinal layers and to photoreceptors. See, e.g., Dalkara et al. (2013) *Sci. Transt. Med.* 5:189ra76, herein incorporated by reference in its entirety for all purposes.

To accelerate transgene expression, self-complementary AAV (scAAV) variants can be used. Because AAV depends on the cell's DNA replication machinery to synthesize the complementary strand of the AAV's single-stranded DNA genome, transgene expression may be delayed. To address this delay, scAAV containing complementary sequences that are capable of spontaneously annealing upon infection can be used, eliminating the requirement for host cell DNA synthesis. However, single-stranded AAV (ssAAV) vectors can also be used.

To increase packaging capacity, longer transgenes may be split between two AAV transfer plasmids, the first with a 3' splice donor and the second with a 5' splice acceptor. Upon co-infection of a cell, these viruses form concatemers, are spliced together, and the full-length transgene can be expressed. Although this allows for longer transgene expression, expression is less efficient. Similar methods for increasing capacity utilize homologous recombination. For example, a transgene can be divided between two transfer plasmids but with substantial sequence overlap such that co-expression induces homologous recombination and expression of the full-length transgene.

In certain AAVs, the cargo can include a nuclease agent (i.e., nucleic acid encoding a nuclease agent). In certain AAVs, the cargo can include a guide RNA or a nucleic acid encoding a guide RNA. In certain AAVs, the cargo can include an mRNA encoding a Cas nuclease, such as Cas9, and a guide RNA or a nucleic acid encoding a guide RNA. In certain AAVs, the cargo can include a nucleic acid construct as described elsewhere herein. In certain AAVs, the cargo can include a nuclease agent and a nucleic acid construct as described elsewhere herein. In certain AAVs, the cargo can include an mRNA encoding a Cas nuclease, such as Cas9, a guide RNA or a nucleic acid encoding a guide RNA, and a nucleic acid construct as described elsewhere herein.

Introduction of nucleic acids and proteins can also be accomplished by lipid nanoparticle (LNP)-mediated delivery. For example, LNP-mediated delivery can be used to deliver a guide RNA in the form of RNA. Delivery through such methods results in transient presence of the guide RNA, and the biodegradable lipids improve clearance, improve tolerability, and decrease immunogenicity. Lipid formulations can protect biological molecules from degradation while improving their cellular uptake. Lipid nanoparticles are particles comprising a plurality of lipid molecules physically associated with each other by intermolecular forces. These include microspheres (including unilamellar and multilamellar vesicles, e.g., liposomes), a dispersed phase in an emulsion, micelles, or an internal phase in a suspension. Such lipid nanoparticles can be used to encapsulate one or more nucleic acids or proteins for delivery. Formulations which contain cationic lipids are useful for delivering polyanions such as nucleic acids. Other lipids that can be included are neutral lipids (i.e., uncharged or zwitterionic lipids), anionic lipids, helper lipids that enhance transfection, and stealth lipids that increase the length of time for which nanoparticles can exist in vivo. Examples of suitable cationic lipids, neutral lipids, anionic lipids, helper lipids, and stealth lipids can be found in WO 2016/010840 A1 and WO 2017/173054 A1, each of which is herein incorporated by reference in its entirety for all purposes. An exemplary lipid nanoparticle can comprise a cationic lipid and one or more other components. In one example, the other component can comprise a helper lipid such as cholesterol. In another example, the other components can comprise a helper lipid such as cholesterol and a neutral lipid such as DSPC. In another example, the other components can comprise a helper lipid such as cholesterol, an optional neutral lipid such as DSPC, and a stealth lipid such as S010, S024, S027, S031, or S033.

The LNP may contain one or more or all of the following: (i) a lipid for encapsulation and for endosomal escape; (ii) a neutral lipid for stabilization; (iii) a helper lipid for stabilization; and (iv) a stealth lipid. See, e.g., Finn et al. (2018) *Cell Rep.* 22(9):2227-2235 and WO 2017/173054 A1, each of which is herein incorporated by reference in its entirety for all purposes. In certain LNPs, the cargo can include a nuclease agent. In certain LNPs, the cargo can include a guide RNA or a nucleic acid encoding a guide RNA. In certain LNPs, the cargo can include an mRNA encoding a Cas nuclease, such as Cas9, and a guide RNA or a nucleic acid encoding a guide RNA. In certain LNPs, the cargo can include an exogenous donor sequence. In certain LNPs, the cargo can include a nuclease agent and an exogenous donor sequence. In certain LNPs, the cargo can include an mRNA encoding a Cas nuclease, such as Cas9, a guide RNA or a nucleic acid encoding a guide RNA, and an exogenous donor sequence.

The lipid for encapsulation and endosomal escape can be a cationic lipid. The lipid can also be a biodegradable lipid, such as a biodegradable ionizable lipid. One example of a suitable lipid is Lipid A or LP01, which is (9Z,12Z)-3-((4, 4-bis(octyloxy)butanoyl)oxy)-2-((((3-(diethylamino) propoxy)carbonyl)oxy)methyl)propyl octadeca-9,12-dienoate, also called 3-((4,4-bis(octyloxy)butanoyl)oxy)-2-((((3-(diethylamino)propoxy)carbonyl)oxy)methyl)propyl (9Z, 12Z)-octadeca-9,12-dienoate. See, e.g., Finn et al. (2018) *Cell Rep.* 22(9):2227-2235 and WO 2017/173054 A1, each of which is herein incorporated by reference in its entirety for all purposes. Another example of a suitable lipid is Lipid B, which is ((5-((dimethylamino)methyl)-1,3-phenylene)bis (oxy))bis(octane-8,1-diyl)bis(decanoate), also called ((5-((dimethylamino)methyl)-1,3-phenylene)bis(oxy))bis(octane-8,1-diyl)bis(decanoate). Another example of a suitable lipid is Lipid C, which is 2-((4-(((3-(dimethylamino) propoxy)carbonyl)oxy)hexadecanoyl)oxy)propane-1,3-diyl (9Z,9'Z,12Z,12'Z)-bis(octadeca-9,12-dienoate). Another example of a suitable lipid is Lipid D, which is 3-(((3-(dimethylamino)propoxy)carbonyl)oxy)-13-(octanoyloxy) tridecyl 3-octylundecanoate. Other suitable lipids include heptatriaconta-6,9,28,31-tetraen-19-yl 4-(dimethylamino) butanoate (also known as Dlin-MC3-DMA (MC3))).

Some such lipids suitable for use in the LNPs described herein are biodegradable in vivo. For example, LNPs comprising such a lipid include those where at least 75% of the lipid is cleared from the plasma within 8, 10, 12, 24, or 48 hours, or 3, 4, 5, 6, 7, or 10 days. As another example, at least 50% of the LNP is cleared from the plasma within 8, 10, 12, 24, or 48 hours, or 3, 4, 5, 6, 7, or 10 days.

Such lipids may be ionizable depending upon the pH of the medium they are in. For example, in a slightly acidic medium, the lipids may be protonated and thus bear a positive charge. Conversely, in a slightly basic medium, such as, for example, blood where pH is approximately 7.35, the lipids may not be protonated and thus bear no charge. In some embodiments, the lipids may be protonated at a pH of at least about 9, 9.5, or 10. The ability of such a lipid to bear a charge is related to its intrinsic pKa. For example, the lipid may, independently, have a pKa in the range of from about 5.8 to about 6.2.

Neutral lipids function to stabilize and improve processing of the LNPs. Examples of suitable neutral lipids include a variety of neutral, uncharged or zwitterionic lipids. Examples of neutral phospholipids suitable for use in the present disclosure include, but are not limited to, 5-heptadecylbenzene-1,3-diol (resorcinol), dipalmitoylphosphatidylcholine (DPPC), distearoylphosphatidylcholine (DSPC), phosphocholine (DOPC), dimyristoylphosphatidylcholine (DMPC), phosphatidylcholine (PLPC), 1,2-distearoyl-sn-glycero-3-phosphocholine (DAPC), phosphatidylethanolamine (PE), egg phosphatidylcholine (EPC), dilauryloylphosphatidylcholine (DLPC), dimyristoylphosphatidylcholine (DMPC), 1-myristoyl-2-palmitoyl phosphatidylcholine (MPPC), 1-palmitoyl-2-myristoyl phosphatidylcholine (PMPC), 1-palmitoyl-2-stearoyl phosphatidylcholine (PSPC), 1,2-diarachidoyl-sn-glycero-3-phosphocholine (DBPC), 1-stearoyl-2-palmitoyl phosphatidylcholine (SPPC), 1,2-dieicosenoyl-sn-glycero-3-phosphocholine (DEPC), palmitoyloleoyl phosphatidylcholine (POPC), lysophosphatidyl choline, dioleoyl phosphatidylethanolamine (DOPE), dilinoleoylphosphatidylcholine distearoylphosphatidylethanolamine (DSPE), dimyristoyl phosphatidylethanolamine (DMPE), dipalmitoyl phosphatidylethanolamine (DPPE), palmitoyloleoyl phosphatidylethanolamine (POPE), lyso-phosphatidylethanolamine, and combinations thereof. For example, the neutral phospholipid may be selected from the group consisting of distearoylphosphatidylcholine (DSPC) and dimyristoyl phosphatidyl ethanolamine (DMPE).

Helper lipids include lipids that enhance transfection. The mechanism by which the helper lipid enhances transfection can include enhancing particle stability. In certain cases, the helper lipid can enhance membrane fusogenicity. Helper lipids include steroids, sterols, and alkyl resorcinols. Examples of suitable helper lipids suitable include cholesterol, 5-heptadecylresorcinol, and cholesterol hemisuccinate. In one example, the helper lipid may be cholesterol or cholesterol hemisuccinate.

Stealth lipids include lipids that alter the length of time the nanoparticles can exist in vivo. Stealth lipids may assist in the formulation process by, for example, reducing particle aggregation and controlling particle size. Stealth lipids may modulate pharmacokinetic properties of the LNP. Suitable stealth lipids include lipids having a hydrophilic head group linked to a lipid moiety.

The hydrophilic head group of stealth lipid can comprise, for example, a polymer moiety selected from polymers based on PEG (sometimes referred to as poly(ethylene oxide)), poly(oxazoline), poly(vinyl alcohol), poly(glycerol), poly(N-vinylpyrrolidone), polyaminoacids, and poly N-(2-hydroxypropyl)methacrylamide. The term PEG means any polyethylene glycol or other polyalkylene ether polymer. In certain LNP formulations, the PEG, is a PEG-2K, also termed PEG 2000, which has an average molecular weight of about 2,000 daltons. See, e.g., WO 2017/173054 A1, herein incorporated by reference in its entirety for all purposes.

The lipid moiety of the stealth lipid may be derived, for example, from diacylglycerol or diacylglycamide, including those comprising a dialkylglycerol or dialkylglycamide group having alkyl chain length independently comprising from about C4 to about C40 saturated or unsaturated carbon atoms, wherein the chain may comprise one or more functional groups such as, for example, an amide or ester. The dialkylglycerol or dialkylglycamide group can further comprise one or more substituted alkyl groups.

As one example, the stealth lipid may be selected from PEG-dilauroylglycerol, PEG-dimyristoylglycerol (PEG-DMG), PEG-dipalmitoylglycerol, PEG-distearoylglycerol (PEG-DSPE), PEG-dilaurylglycamide, PEG-dimyristylglycamide, PEG-dipalmitoylglycamide, and PEG-distearoylglycamide, PEG-cholesterol (1-[8'-(Cholest-5-en-3 [beta]-oxy)carboxamido-3',6'-dioxaoctanyl]carbamoyl-[omega]-methyl-poly(ethylene glycol), PEG-DMB (3,4-ditetradecoxylbenzyl-[omega]-methyl-poly(ethylene glycol)ether), 1,2-dimyristoyl-sn-glycero-3-phosphoethanolamine-N-[methoxy(polyethylene glycol)-2000](PEG2k-DMG), 1,2-distearoyl-sn-glycero-3-phosphoethanolamine-N-[methoxy(polyethylene glycol)-2000](PEG2k-DSPE), 1,2-distearoyl-sn-glycerol, methoxypoly ethylene glycol (PEG2k-DSG), poly(ethylene glycol)-2000-dimethacrylate (PEG2k-DMA), and 1,2-distearyloxypropyl-3-amine-N-[methoxy(polyethylene glycol)-2000](PEG2k-DSA). In one particular example, the stealth lipid may be PEG2k-DMG.

The LNPs can comprise different respective molar ratios of the component lipids in the formulation. The mol-% of the CCD lipid may be, for example, from about 30 mol-% to about 60 mol-%, from about 35 mol-% to about 55 mol-%, from about 40 mol-% to about 50 mol-%, from about 42 mol-% to about 47 mol-%, or about 45%. The mol-% of the helper lipid may be, for example, from about 30 mol-% to about 60 mol-%, from about 35 mol-% to about 55 mol-%, from about 40 mol-% to about 50 mol-%, from about 41 mol-% to about 46 mol-%, or about 44 mol-%. The mol-% of the neutral lipid may be, for example, from about 1 mol-% to about 20 mol-%, from about 5 mol-% to about 15 mol-%, from about 7 mol-% to about 12 mol-%, or about 9 mol-%. The mol-% of the stealth lipid may be, for example, from about 1 mol-% to about 10 mol-%, from about 1 mol-% to about 5 mol-%, from about 1 mol-% to about 3 mol-%, about 2 mol %, or about 1 mol-%.

The LNPs can have different ratios between the positively charged amine groups of the biodegradable lipid (N) and the negatively charged phosphate groups (P) of the nucleic acid to be encapsulated. This may be mathematically represented by the equation N/P. For example, the N/P ratio may be from about 0.5 to about 100, from about 1 to about 50, from about 1 to about 25, from about 1 to about 10, from about 1 to about 7, from about 3 to about 5, from about 4 to about 5, about 4, about 4.5, or about 5.

In some LNPs, the cargo can comprise Cas mRNA and gRNA. The Cas mRNA and gRNAs can be in different ratios. For example, the LNP formulation can include a ratio of Cas mRNA to gRNA nucleic acid ranging from about 25:1 to about 1:25, ranging from about 10:1 to about 1:10, ranging from about 5:1 to about 1:5, or about 1:1. Alternatively, the LNP formulation can include a ratio of Cas mRNA to gRNA nucleic acid from about 1:1 to about 1:5, or about 10:1. Alternatively, the LNP formulation can include a ratio of Cas mRNA to gRNA nucleic acid of about 1:10, 25:1, 10:1, 5:1, 3:1, 1:1, 1:3, 1:5, 1:10, or 1:25. Alternatively, the LNP formulation can include a ratio of Cas mRNA to gRNA nucleic acid of from about 1:1 to about 1:2. In specific examples, the ratio of Cas mRNA to gRNA can be about 1:1 or about 1:2.

Exemplary dosing of LNPs includes about 0.1, about 0.25, about 0.3, about 0.5, about 1, about 2, about 3, about 4, about 5, about 6, about 8, or about 10 mg/kg body weight (mpk) or about 0.1 to about 10, about 0.25 to about 10, about 0.3 to about 10, about 0.5 to about 10, about 1 to about 10, about 2 to about 10, about 3 to about 10, about 4 to about 10, about 5 to about 10, about 6 to about 10, about 8 to about 10, about 0.1 to about 8, about 0.1 to about 6, about 0.1 to about 5, about 0.1 to about 4, about 0.1 to about 3, about 0.1 to about 2, about 0.1 to about 1, about 0.1 to about 0.5, about 0.1 to about 0.3, about 0.1 to about 0.25, about 0.25 to about 8, about 0.3 to about 6, about 0.5 to about 5, about 1 to about 5, or about 2 to about 3 mg/kg body weight with respect to total RNA (Cas9 mRNA and gRNA) cargo content. Such LNPs can be administered, for example, intravenously. In one example, LNP doses between about 0.01 mg/kg and about 10 mg/kg, between about 0.1 and about 10 mg/kg, or between about 0.01 and about 0.3 mg/kg can be used. For example, LNP doses of about 0.01, about 0.03, about 0.1, about 0.3, about 1, about 3, or about 10 mg/kg can be used. Additional exemplary dosing of LNPs includes about 0.1, about 0.25, about 0.3, about 0.5, about 1, about 2, about 3, about 4, about 5, about 6, about 8, or about 10 mg/kg (mpk) body weight or about 0.1 to about 10, about 0.25 to about 10, about 0.3 to about 10, about 0.5 to about 10, about 1 to about 10, about 2 to about 10, about 3 to about 10, about 4 to about 10, about 5 to about 10, about 6 to about 10, about 8 to about 10, about 0.1 to about 8, about 0.1 to about 6, about 0.1 to about 5, about 0.1 to about 4, about 0.1 to about 3, about 0.1 to about 2, about 0.1 to about 1, about 0.1 to about 0.5, about 0.1 to about 0.3, about 0.1 to about 0.25, about 0.25 to about 8, about 0.3 to about 6, about 0.5 to about 5, about 1 to about 5, or about 2 to about 3 mg/kg body weight with respect to total RNA (Cas9 mRNA and gRNA) cargo content. Such LNPs can be administered, for example, intravenously. In one example, LNP doses between about 0.01 mg/kg and about 10 mg/kg, between about 0.1 and about 10 mg/kg, or between about 0.01 and about 0.3 mg/kg can be used. For example, LNP doses of about 0.01, about 0.03, about 0.1, about 0.3, about 0.5, about 1, about 2, about 3, or about 10 mg/kg can be used. In another example, LNP doses between about 0.5 and about 10, between about 0.5 and about 5, between about 0.5 and about 3, between about 1 and about 10, between about 1 and about 5, between about 1 and about 3, or between about 1 and about 2 mg/kg can be used.

The mode of delivery can be selected to decrease immunogenicity. For example, different components may be delivered by different modes (e.g., bi-modal delivery). These different modes may confer different pharmacodynamics or pharmacokinetic properties on the subject delivered molecule. For example, the different modes can result in different tissue distribution, different half-life, or different temporal distribution. Some modes of delivery (e.g., delivery of a nucleic acid vector that persists in a cell by autonomous replication or genomic integration) result in more persistent expression and presence of the molecule, whereas other modes of delivery are transient and less persistent (e.g., delivery of an RNA or a protein). Delivery of components in a more transient manner, for example as RNA, can ensure that the Cas/gRNA complex is only present and active for a short period of time and can reduce immunogenicity. Such transient delivery can also reduce the possibility of off-target modifications.

Administration in vivo can be by any suitable route including, for example, via intravitreal injection or subretinal injection. Significantly smaller amounts of the components (compared with systemic approaches) may exert an effect when administered locally (for example, subretinal or intravitreal) compared to when administered systemically (for example, intravenously). Local modes of administration may also reduce or eliminate the incidence of potentially toxic side effects that may occur when therapeutically effective amounts of a component are administered systemically.

Compositions comprising the nuclease agents (e.g., Cas9 mRNAs and guide RNAs or nucleic acids encoding the guide RNAs) and/or nucleic acid constructs disclosed herein can be formulated using one or more physiologically and pharmaceutically acceptable carriers, diluents, excipients or auxiliaries. The formulation can depend on the route of administration chosen. The term "pharmaceutically acceptable" means that the carrier, diluent, excipient, or auxiliary is compatible with the other ingredients of the formulation and not substantially deleterious to the recipient thereof.

The frequency of administration and the number of dosages can depend on the half-life of the nucleic acid constructs or nuclease agents (or nucleic acids encoding the nuclease agents) and the route of administration among other factors. The introduction of nucleic acids or proteins into the cell or animal can be performed one time or multiple times over a period of time. For example, the introduction can be performed only once over a period of time, at least two times over a period of time, at least three times over a period of time, at least four times over a period of time, at least five times over a period of time, at least six times over a period of time, at least seven times over a period of time, at least eight times over a period of time, at least nine times over a period of times, at least ten times over a period of time, at least eleven times, at least twelve times over a period of time, at least thirteen times over a period of time, at least fourteen times over a period of time, at least fifteen times over a period of time, at least sixteen times over a period of time, at least seventeen times over a period of time, at least eighteen times over a period of time, at least nineteen times over a period of time, or at least twenty times over a period of time.

Optionally, such methods can further comprise assessing expression and/or activity of the inserted retinoschisin coding sequence or the encoded retinoschisin protein in the animal or in a cell. Various methods can be used to identify cells having a targeted genetic modification. The screening can comprise a quantitative assay for assessing modification of allele (MOA) of a parental chromosome. For example, the quantitative assay can be carried out via a quantitative PCR, such as a real-time PCR (qPCR). The real-time PCR can utilize a first primer set that recognizes the target locus and a second primer set that recognizes a non-targeted reference locus. The primer set can comprise a fluorescent probe that recognizes the amplified sequence. Other examples of suitable quantitative assays include fluorescence-mediated in situ hybridization (FISH), comparative genomic hybridization, isothermic DNA amplification, quantitative hybridization to an immobilized probe(s), INVADER® Probes, TAQMAN® Molecular Beacon probes, or ECLIPSE™ probe technology (see, e.g., US 2005/0144655, herein incorporated by reference in its entirety for all purposes).

Next-generation sequencing (NGS) can also be used for screening. Next-generation sequencing can also be referred to as "NGS" or "massively parallel sequencing" or "high throughput sequencing." NGS can be used as a screening tool in addition to the MOA assays to define the exact nature of the targeted genetic modification and whether it is consistent across cell types or tissue types or organ types.

Assessing modification of the target genomic locus in an animal can be in any cell type from any tissue or organ. For example, the assessment can be in multiple cell types from the same tissue or organ (e.g., eye) or in cells from multiple locations within the tissue or organ. This can provide information about which cell types within a target tissue or organ are being targeted or which sections of a tissue or organ are being reached by the nucleic acid construct. As another example, the assessment can be in multiple types of tissue or in multiple organs. In methods in which a particular tissue, organ, or cell type is being targeted, this can provide information about how effectively that tissue or organ is being targeted and whether there are off-target effects in other tissues or organs.

Methods for measuring expression of retinoschisin can include, for example, measuring protein expression. Such methods are well-known. Such methods can also comprise assessing expression of the mRNA encoded by the retinoschisin coding sequence. This measuring can be within the eye or particular cell types or regions within the eye (e.g., retinal cells such as photoreceptors).

One example of an assay that can be used is the BASESCOPE™ RNA in situ hybridization (ISH) assay, which a method that can quantify cell-specific edited transcripts, including single nucleotide changes, in the context of intact fixed tissue. The BASESCOPE™ RNA ISH assay can complement NGS and qPCR in characterization of gene editing. Whereas NGS/qPCR can provide quantitative average values of wild type and edited sequences, they provide no information on heterogeneity or percentage of edited cells within a tissue. The BASESCOPE™ ISH assay can provide a landscape view of an entire tissue and quantification of wild type versus edited transcripts with single-cell resolution, where the actual number of cells within the target tissue containing the edited mRNA transcript can be quantified. The BASESCOPE™ assay achieves single-molecule RNA detection using paired oligo ("ZZ") probes to amplify signal without non-specific background. However, the BASESCOPE™ probe design and signal amplification system enables single-molecule RNA detection with a 1 ZZ probe and it can differentially detect single nucleotide edits and mutations in intact fixed tissue.

Assays for measuring activity of a retinoschisin protein can include, for example, optical coherence tomography (OCT) and electroretinogram (ERG) testing. OCT scans can be used to score retinal cavities and/or to measure retinal photoreceptor thickness). Other assays include optokinetic tests. Such methods are well-known. For example, if the cell or animal being modified is a cell with a mutation that is associated with or causes X-linked juvenile retinoschisis (e.g., an R141C mutation), such functional assays can be used to assess rescue of the disease phenotype. Optical coherence tomography (OCT) provides high-resolution cross-sectional images of the macular region. In individuals with XLRS, OCT reveals cystic spaces primarily in the inner nuclear and outer plexiform layers of the retina. Such functional testing can also include electroretinogram (ERG) testing, which are diagnostic tests that measure the electrical activity generated by neural and non-neuronal cells in the retina in response to a light stimulus. XLRS is associated with reduced phototropic and scotopic b-wave amplitudes in ERGs.

All patent filings, websites, other publications, accession numbers and the like cited above or below are incorporated by reference in their entirety for all purposes to the same extent as if each individual item were specifically and individually indicated to be so incorporated by reference. If different versions of a sequence are associated with an accession number at different times, the version associated with the accession number at the effective filing date of this application is meant. The effective filing date means the earlier of the actual filing date or filing date of a priority application referring to the accession number if applicable. Likewise, if different versions of a publication, website or the like are published at different times, the version most recently published at the effective filing date of the application is meant unless otherwise indicated. Any feature, step, element, embodiment, or aspect of the invention can be used in combination with any other unless specifically indicated otherwise. Although the present invention has been described in some detail by way of illustration and example for purposes of clarity and understanding, it will be apparent that certain changes and modifications may be practiced within the scope of the appended claims.

BRIEF DESCRIPTION OF THE SEQUENCES

The nucleotide and amino acid sequences listed in the accompanying sequence listing are shown using standard letter abbreviations for nucleotide bases, and three-letter code for amino acids. The nucleotide sequences follow the standard convention of beginning at the 5' end of the sequence and proceeding forward (i.e., from left to right in each line) to the 3' end. Only one strand of each nucleotide sequence is shown, but the complementary strand is understood to be included by any reference to the displayed strand. When a nucleotide sequence encoding an amino acid sequence is provided, it is understood that codon degenerate variants thereof that encode the same amino acid sequence are also provided. The amino acid sequences follow the standard convention of beginning at the amino terminus of the sequence and proceeding forward (i.e., from left to right in each line) to the carboxy terminus.

TABLE 4

Description of Sequences.

| SEQ ID NO | Type | Description |
| --- | --- | --- |
| 1 | Protein | Mouse Retinoschisin (UniProt Q9Z1L4) |
| 2 | Protein | Human Retinoschisin (UniProt O15537) |
| 3 | Protein | Human Retinoschisin R141C |
| 4 | Protein | Chimeric Mouse-Human Retinoschisin |
| 5 | Protein | Human Portion of Chimeric Human Retinoschisin |

TABLE 4-continued

Description of Sequences.

| SEQ ID NO | Type | Description |
|---|---|---|
| 6 | DNA | Human RS1 Coding Sequence (NCBI CCDS14187.1) |
| 7 | DNA | Mouse Rs1 Sequence in Hybrid cDNA |
| 8 | DNA | Human RS1 cDNA Exons 2-6 |
| 9 | DNA | Codon-Optimized Human RS1 cDNA Exons 2-6 |
| 10 | DNA | Reverse Complement of Codon-Optimized Human RS1 cDNA Exons 2-6 |
| 11 | DNA | $T^h$ Hybrid RSI cDNA |
| 12 | DNA | $T^{mh}$ Hybrid RS1 cDNA |
| 13 | DNA | $T^h$ Nucleotide Sequence (SA, hRS1, poly A) |
| 14 | DNA | $T^{mh}$ Hybrid RSI Sequence (SA, hRS1, poly A) |
| 15 | DNA | Fragment of Human RS1 Intron 1 with Splice Acceptor (V1) |
| 16 | DNA | Fragment of Human RS1 Intron 1 with Splice Acceptor (V1) |
| 17 | DNA | Mouse Splice Acceptor V1 |
| 18 | DNA | Mouse Splice Acceptor V2 |
| 19 | DNA | Reverse Complement of Mouse Splice Acceptor V1 |
| 20 | DNA | Reverse Complement of Mouse Splice Acceptor V2 |
| 21 | DNA | ADML Splice Acceptor |
| 22 | DNA | bGH Poly A |
| 23 | DNA | SV40 Poly A |
| 24 | DNA | Reverse Complement of SV40 PolyA |
| 25 | DNA | Human RSI PolyA |
| 26 | DNA | Cas9 DNA |
| 27 | Protein | Cas9 Protein |
| 28 | DNA | Cas9 cDNA |
| 29 | RNA | crRNA Tail |
| 30 | RNA | TracrRNA V1 |
| 31 | RNA | TracrRNA V2 |
| 32 | RNA | TracrRNA V3 |
| 33 | RNA | Guide RNA Scaffold V1 |
| 34 | RNA | Guide RNA Scaffold V2 |
| 35 | RNA | Guide RNA Scaffold V3 |
| 36 | RNA | Guide RNA Scaffold V4 |
| 37 | RNA | Guide RNA Scaffold V5 |
| 38 | RNA | Guide RNA Scaffold V6 |
| 39 | RNA | Guide RNA Scaffold V7 |
| 40 | DNA | Guide RNA Target Sequence Plus PAM V1 |
| 41 | DNA | Guide RNA Target Sequence Plus PAM V2 |
| 42 | DNA | Guide RNA Target Sequence Plus PAM V3 |
| 43 | RNA | Mouse Rsl Intron 1 Guide RNA |
| 44 | DNA | Generic Modified sgRNA |
| 45 | DNA | pAAVhRs1 cDNA, HITI |
| 46 | DNA | pscAAV Rs1 tandem. sgU |
| 47 | DNA | pAAV mhRs1 sgU |
| 48 | Protein | Mouse Retinoschisin R141C |
| 49 | Protein | NLS v1 |
| 50 | Protein | NLS v2 |
| 51 | Protein | NLS v3 |
| 52 | RNA | crRNA Tail v2 |
| 53 | RNA | Guide RNA Scaffold V8 |
| 54-1895 | DNA | Human RS1 Intron 1 Guide RNA Target Sequences |
| 1896-3147 | DNA | Mouse Rs1 Intron 1 Guide RNA Target Sequences |
| 3148-4989 | RNA | Human RS1 Intron 1 Guide Sequences |
| 4990-6241 | RNA | Mouse Rs1 Intron 1 Guide Sequences |
| 6242 | Protein | Cas9 Protein |
| 6243 | RNA | Cas9 mRNA |
| 6244 | DNA | Cas9 DNA |
| 6245 | RNA | Cas9 mRNA |
| 6246 | Protein | Cas9 Protein |
| 6247 | DNA | HDR-1800 Construct |
| 6248 | DNA | HDR-900 Construct |
| 6249 | DNA | HDR-450 Construct |

EXAMPLES

Example 1. Insertion of RS1 Coding Sequence into Mouse Rs1 Locus in XLRS Mouse Model In order to model potential X-linked juvenile retinoschisis therapy (XLRS) CRISPR therapeutics strategies in vivo, we generated a mouse line with constitutive expression of Cas9 protein in all tissues ($Rosa^{Cas9}/+$; see, e.g., US 2019/0032155 and WO 2019/028032, each of which is herein incorporated by reference in its entirety for all purposes) and crossed it to mice containing a mutant copy of murine retinoschisin (Rs1) ($Rs1^{R141C/Y}$) to generate $Rosa^{Cas9}/+$; $Rs1^{R141C/Y}$ mice. The mice with the Rs1 R141C mutation, which causes intracellular retention of retinoschisin to replicate key features of the human condition, including intraretinal schisis, retinal degeneration, and a reduced ERG b-wave.

The Rs1 gene is a highly conserved extracellular protein involved in the cellular organization of the retina. It is assembled and secreted from photoreceptors and bipolar cells as a homo-oligomeric protein complex. Over 200 mutations have been detected in Rs1, many leading to early onset of macular degeneration due to a non-functional protein or the absence of protein secretion. Lack of functional Rs1 expression causes schisis within the retinal layers leading to the early and progressive vision loss associated with XLRS. To date, there are no publications reporting pre-clinical or clinical studies using Cas9 technology for XLRS treatment. Here, we describe an approach for the use of Cas9 in combination with adeno-associated virus (AAV) to rescue the non-secreting R141C variant of Rs1 in mice. The constructs are designed to be integrated into the endogenous Rs1 locus in the retina (e.g., photoreceptors), where the hybrid mouse-human RS1 transcript will be expressed through the endogenous Rs1 promoter.

Figure 2:
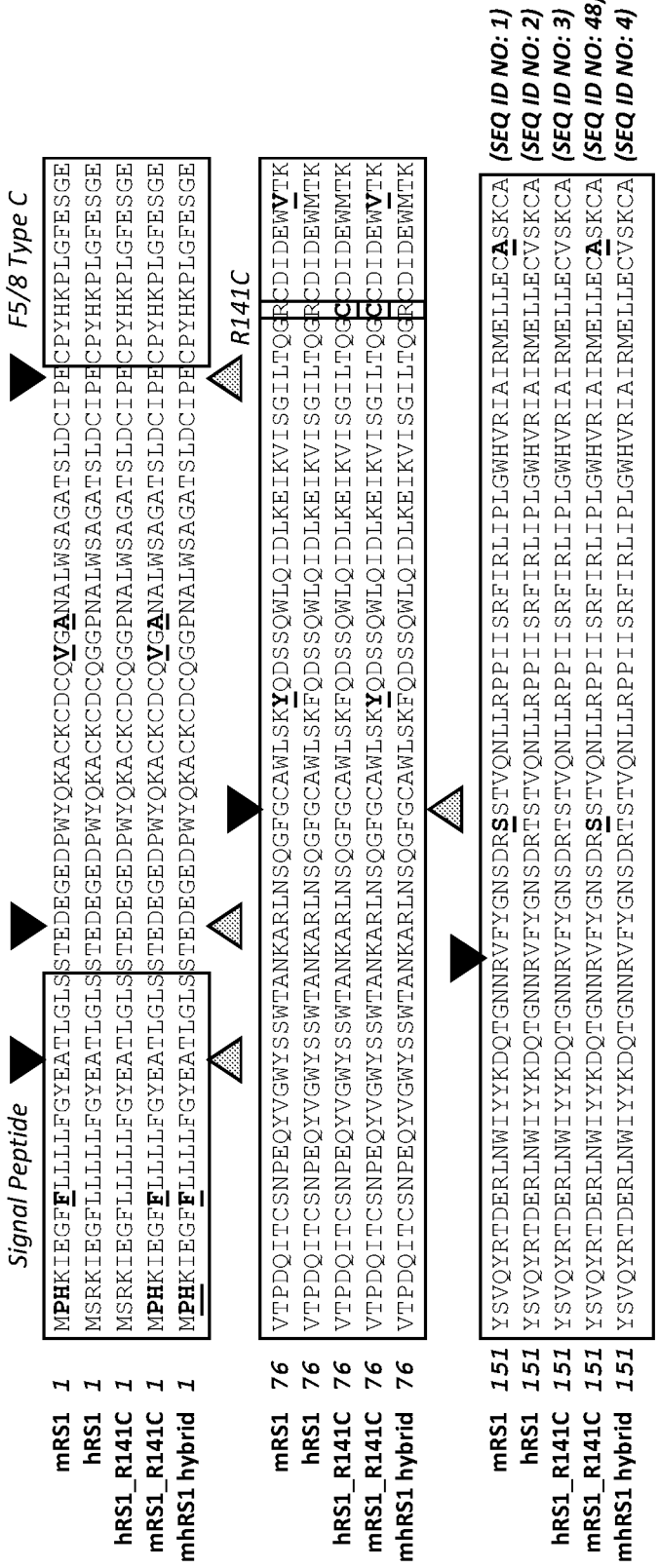
FIG. 2 shows an alignment of mouse retinoschisin, human retinoschisin, human retinoschisin with an R141C mutation, mouse retinoschisin with an R141C mutation, and a mouse/human retinoschisin hybrid expressed upon integration of a nucleic acid construct comprising exons 2-6 of human RS1 into intron 1 of the mouse Rs1 locus.

Subretinal delivery of AAV serotype 7m8 has led to successful expression of transgenes (data not shown). While AAVs have the potential to persist ectopically for a year or more, we endeavor to develop a strategy for permanent rescue of mutant Rs1 phenotypes. To this end, three viral vectors were designed encoding WT human RS1 exons 2-6 (without a promoter) as well as a guide RNA targeting mouse Rs1 intron 1. The sequence of the guide RNA is set forth in SEQ ID NO: 43, and the guide RNA target sequence in mouse Rs1 intron 1 is set forth in SEQ ID NO: 2383. Upon injection of any one of these viruses into RosaCas9/+; Rs1 R141C/Y mice, we expected the guide RNA expression to lead to cutting at the Rs1 locus and integration of the viral genome containing the human RS1 cDNA fragment. The mouse Rs1 locus is shown in FIG. 1. Mouse exon 1 would splice into human exon 2-6 cDNA (FIG. 2), and expression of the hybrid mouse human protein should prevent transcription of mutant mouse Rs1.

Figure 3A:
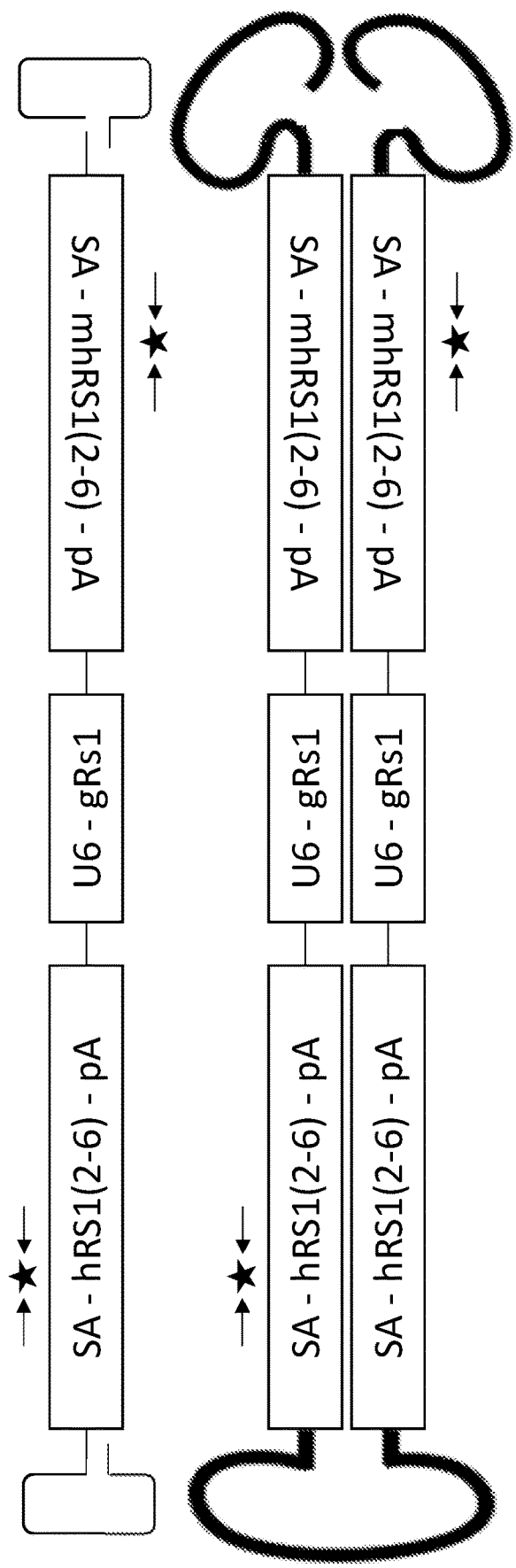
FIG. 3A (not to scale) shows a schematic of a bidirectional nucleic acid construct comprising a first segment comprising a splice acceptor (A), exons 2-6 of human RS1, and bovine growth hormone (bGH) polyA and a second segment comprising the reverse complement of SV40 polyA, the reverse complement of exons 2-6 of human RS1, and the reverse complement of a splice acceptor (A). The bidirectional construct also comprises a U6 promoter operably linked to a sequence encoding a guide RNA targeting intron 1 of the murine Rs1 locus in between the two human RS1 segments. The horizontal arrows flanking the star represent the next generation targeted resequencing amplicons designed for NGS. A bidirectional ssAAV construct is shown at the top, and a bidirectional scAAV construct is shown at the bottom.

Viral vector version 1 (SEQ ID NO: 47) was generated by bidirectional insertion in a single stranded AAV (ssAAV) vector. Two hundred bases of RS1 human intron 1 (containing exon 2 splice signals) were placed in front of a cDNA encoding exons 2-6 of human RS1 transcript followed by bovine growth hormone (bGH) polyA ($T^h$). A second human cDNA was generated with mouse codon optimization and integrated into the vector in the opposite orientation. This sequence was flanked by 200 bp containing the mouse splice signals and an SV40 polyA ($T^{mh}$). The sequences were designed to be divergent enough so as to reduce the likelihood of viral transcripts self-annealing. Further, an sgRNA expression unit was added in between the transcripts (FIG. 3A). The benefit of this strategy is that the viral genome can be inserted in either orientation and still form a viable reading frame for allele rescue.

Viral vector version 2 (SEQ ID NO: 46) was generated by bidirectional insertion in a self-complimentary AAV (scAAV) vector. This version is configured just as version 1, with two differences. First, the sequence was incorporated into a self-complimentary AAV vector. Second, to comply with the maximum self-complimentary genome size of 2100 bp, the splice signal regions were reduced to 60 bp (FIG. 3A).

Figure 3B:
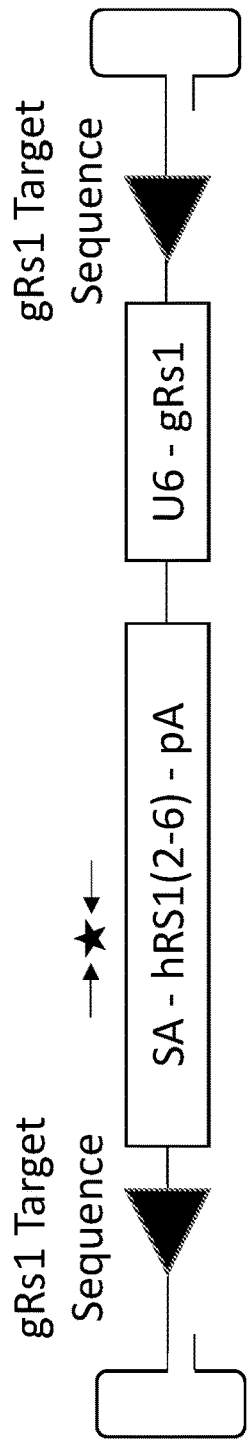
FIG. 3B (not to scale) shows a schematic for a homology-independent targeted integration nucleic acid construct comprising a splice acceptor (A), exons 2-6 of human RS1, and a polyA sequence. The construct also comprises a U6 promoter operably linked to a sequence encoding a guide RNA targeting intron 1 of the murine Rs1 locus downstream of the human RS1 segment. The horizontal arrows flanking the star represent the next generation targeted resequencing amplicons designed for NGS.

Viral vector version 3 (SEQ ID NO: 45) was designed for homology-independent targeted integration (HITI). HITI leverages the need for the Cas9 recognition sequence to have a protospacer adjacent motif (PAM). The construct was designed to express $T^h$ and the same guide RNA targeting the Rs1 intron 1. However, where versions 1 and 2 do not contain guide RNA target sequences, version 3 is flanked by an inverted guide RNA target sequence on each side (FIG. 3B). Once the viral genome is double-stranded, it will express one guide RNA sequence that should simultaneously cause a double-strand break in mouse Rs1 intron 1 as well as on both sides of the viral genome, effectively cleaving off the ITR sequences. The liberated viral genome is now free to insert into the mouse genome in either orientation. However, if the cDNA integrates in the reverse orientation, the guide RNA target sequences should be reconstituted and available for further Cas9 cleavage. If the cDNA integrates in the desired orientation, the guide RNA target sequences will be destroyed, and the sequence locked in place.

While the Rs1 sequences of version 1 and 2 are near identical, the viral backbones may change the timing of double-stranded viral production and thus impact gene insertion efficiencies. An scAAV will become double stranded faster than an ssAAV due to differences in the mechanism by which the second strand is synthesized. Both ITRs in ssAAVs can act as replication origins and contain single-stranded nuclease domains that cut newly synthesized strands. Replication can be initiated from either ITR, so a mixture of the + strand and − strand will be generated. Once the polymerase gets to the other ITR, the synthesized strand is cleaved and released. The primary mechanism to synthesize the compliment strand is to use host-cell machinery. However, at a low level, the + and − strands synthesized by the virus may spontaneously anneal to create the double-stranded virus. In the case of scAAV, one of the two ITR sequences is mutated to remove the nuclease domain. The replication fork starts at the active ITR and moves through the mutant ITR, without being cleaved, and the synthesis continues on the opposite strand. The single-stranded synthesis containing both the + and − strand self-compliment to make the double-stranded virus.

Versions 1-3 were each able to mediate gene insertion at the mouse Rs1 locus in the Cas9 mouse background. In the pilot study, a small amount of virus was injected into right eye of each mouse, and the left eye was not injected as a control. Both retinas were harvested and cut in half. Half of each retina was used for non-homologous end joining (NHEJ) characterization at the intron 1 of mouse Rs1 locus. The other half was used to generate cDNA for NGS amplicon sequencing over the mutant region. Due to PCR efficiencies and bias, we were able to amplify each transcript variant, but we could not quantify the actual expression profiles. NHEJ characterization provides a clue to guide RNA activity as well as insertion activity. Detection of NHEJ implies an allele without gene insertion that will likely express the mutant mouse transcript. Detection of either modified transcript indicates that gene insertion has occurred.

Figure 4:
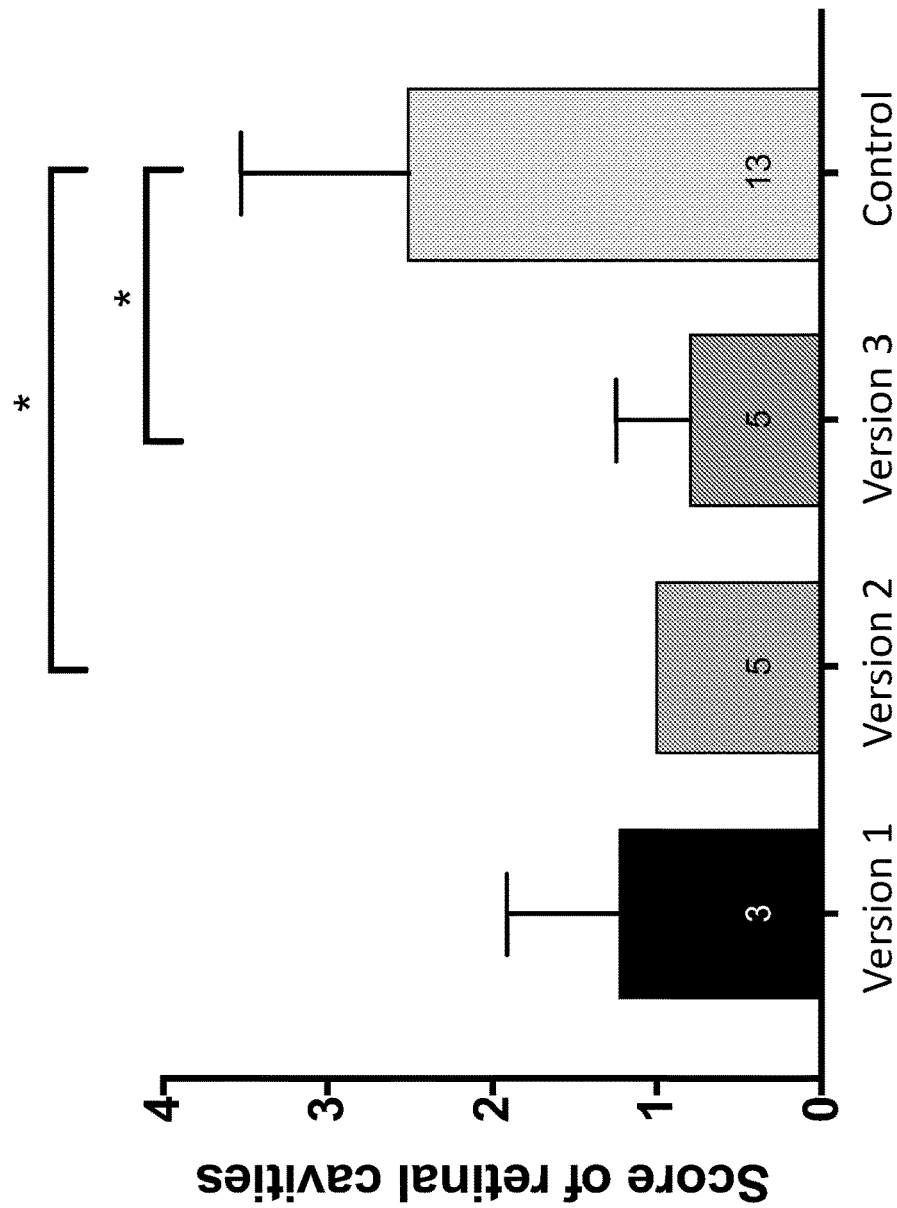
FIG. 4 shows scoring of retinal cavities shown in optical coherence tomography (OCT) scans in eyes from $Rosa^{Cas9}/+$; $Rs1^{R141C/Y}$ mice injected with RS1 viral vector version 1, RSJ viral vector version 2, or RS1 viral vector version 3. A score of 1 was assigned if there were 1-4 cavities on at least one individual image. A score of 2 was assigned if there were ≥4 cavities on at least one individual image, but the cavities were not fused. A score of 3 was assigned if there were fused cavities on at least one individual image. A score of 4 was assigned if there were fused cavities on at least one individual image and the retina was stretched. The average scores for each treatment group were compared with a control group containing the pooled non-treated eyes by nonparametric Kruskal-Wallis one-way analysis of variance and Post hoc test Dunn's multiple comparisons test.

Thirteen mice were injected in the right eyes: three for version 1, and five each for versions 2 and 3. All injected eyes had improved retinal organization as seen in optical coherence tomography (OCT) imaging. See FIG. 4. Scoring of retinal cavities shown in OCT scans (containing 61 images each) from 3 different locations of each eye was conducted based on the following preset criteria by three independent readers. A score of 1 was assigned if there were 1-4 cavities on at least one individual image. A score of 2 was assigned if there were ≥4 cavities on at least one individual image, but the cavities were not fused. A score of 3 was assigned if there were fused cavities on at least one individual image. A score of 4 was assigned if there were fused cavities on at least one individual image and the retina was stretched. The average scores for each treatment group were compared with a control group containing the pooled non-treated eyes by nonparametric Kruskal-Wallis one-way analysis of variance and Post hoc test Dunn's multiple comparisons test.

Figure 7A:
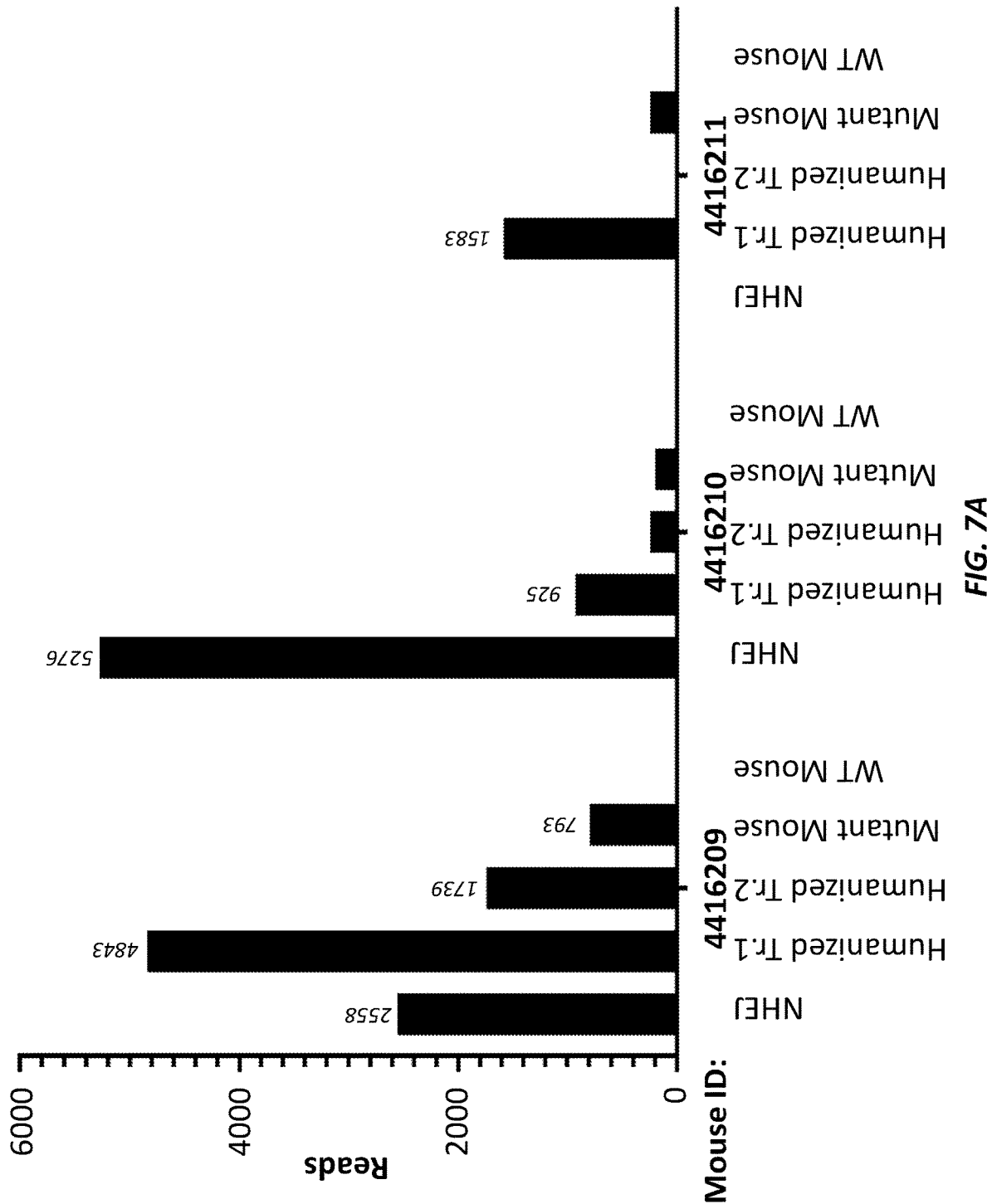
FIGS. 7A-7C show NGS results from mouse retina samples in eyes from $Rosa^{Cas9/+}$; $RS1^{R141C/Y}$ mice injected with RS1 viral vector version 1 (pssAAV mhRS1-sgu.
Figure 7B:
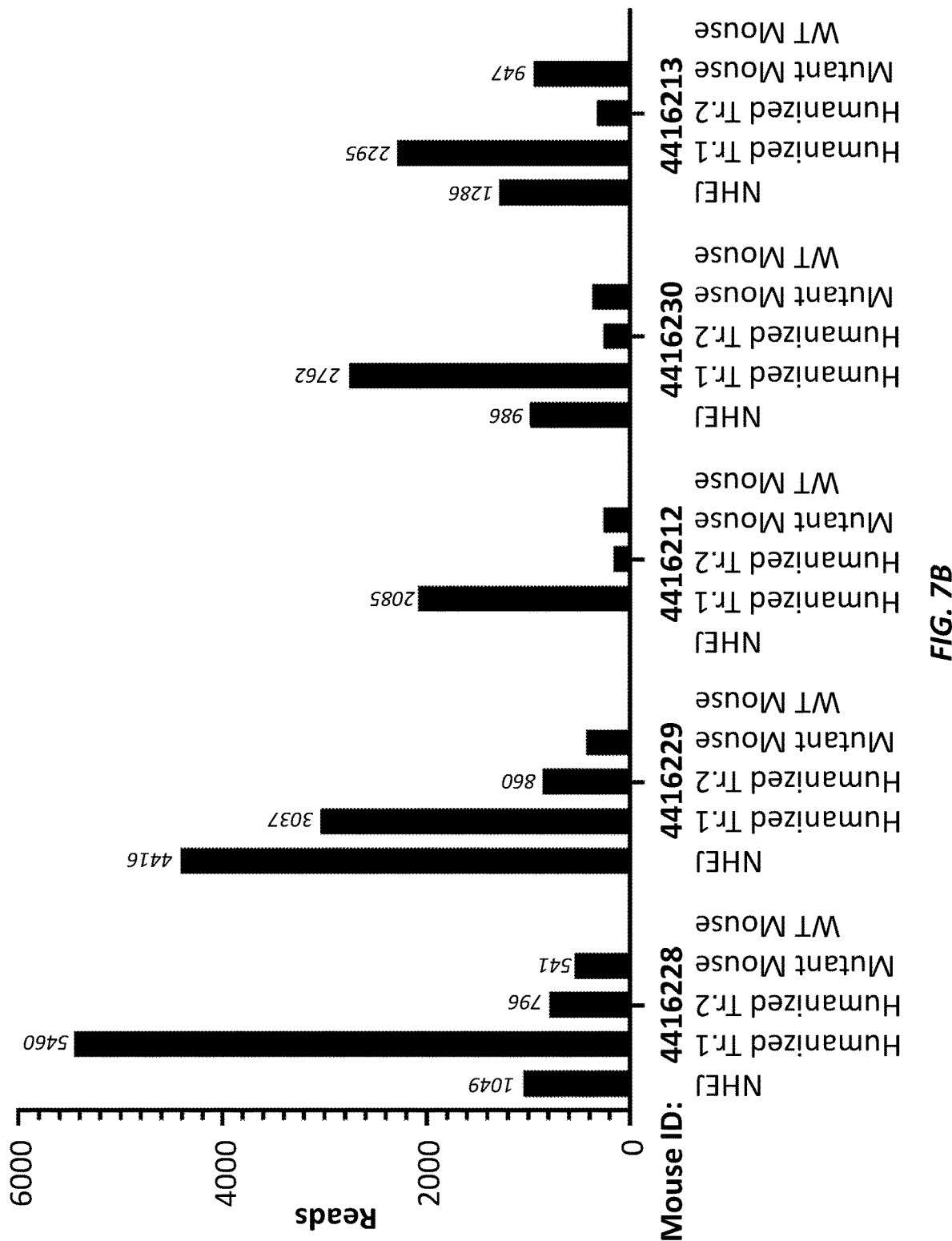
Figure 7C:
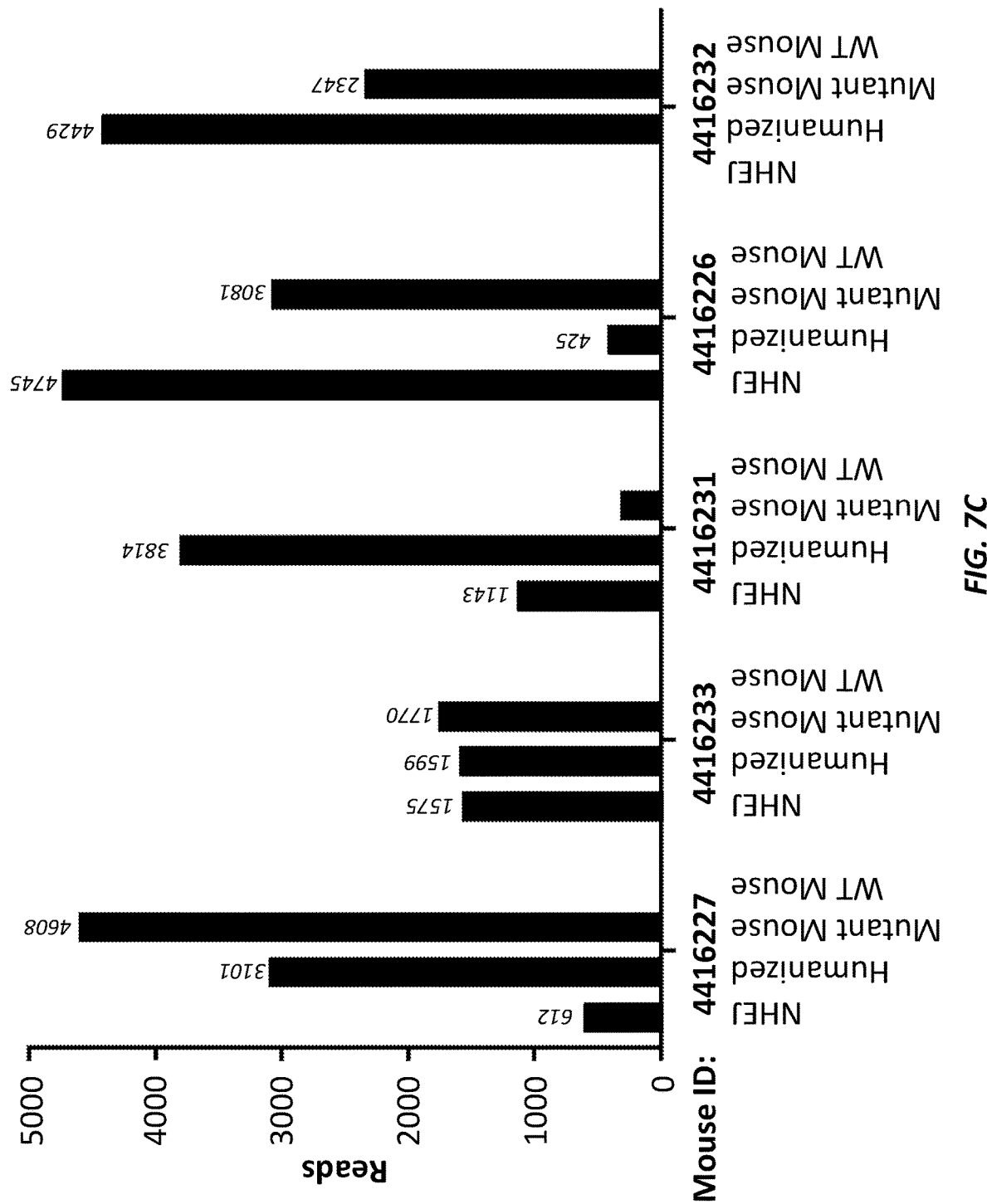

Next generation targeted resequencing amplicons were designed for the regions depicted in FIG. 3 (horizontal arrows) as these regions are distinct in the four expected sequence variants ((1) WT mouse, the mouse reference sequence not containing the R141C mutant; (2) mutant mouse, the mouse reference sequence harboring the R141C mutant; (3) humanized transcript 1, the human reference sequence; and (4) humanized transcript 2, the mouse codon-optimized human reference sequence). Mouse retinas were harvested from study mice and total mRNA was extracted from the tissues. mRNA was used to generate cDNA to act as a template for next generation sequencing (NGS) amplification. Target-specific oligos with incorporated barcodes for sequence identification were used to amplify all four variants per tissue. The PCR products from each mouse were normalized and pooled into a single tube for further preparation. The finalized library was loaded on to a MiSeq and the 2×300 program was used to sequence samples. Informatic codes were then used to deconvolute the samples and create a de novo sequence reference. The number of reads that matched each variant were quantified and the percentage was obtained by dividing the variant read count by the total read count. As expected, WT mouse sequences were only found in female $Rosa^{Cas9/+};Rs1^{R141C/+}$ mice. The NGS results for the four expected sequence variants are shown in FIG. 5. PCR bias and efficiency are not accounted for. A separate amplicon was used to amplify the Rs1 intron 1 guide RNA target sequence. Reads that matched the mouse reference sequence or contained non-homologous end joining were quantified to assess how often the guide RNA cut without making an insertion. See FIGS. 6A and 6B. Bar graphs showing some of the data from the tables in FIG. 5 are shown in FIGS. 7A-7C for versions 1-3, respectively.

All mice showed varying levels of all transcripts, with more $T^h$ reads than $T^{mh}$ reads in all mice. As expected, mice with very high NHEJ rates had lower amounts of human transcripts present. While versions 1 and 2 had similar sequence profiles, version 3 had a greater presence of residual mutant mouse transcript. This was likely due to the need for a specific insertion orientation. While the guide RNA design should help to push the insertion towards the desired insertion, it is likely that Cas9 cleavage damaged the recognition sequences beyond the possibility of re-targeting. Additionally, a large insertion/deletion (indel) on the viral genome may have disrupted the splice signals and prevented proper expression.

Example 2. Insertion of RS1 Coding Sequence into Human RS1 Locus in Human Retinoblastoma Cells We next tested insertion of RS1 coding sequence into the human RS1 locus in WERI-Rb1 human retinoblastoma cells in vitro. The WERI-Rb1 cell line (ATCC® HTB 169™) was derived from human retinoblastoma. Retinoblastoma cells are precursors of photoreceptors and are an appropriate in vitro photoreceptor cell model because photoreceptor cell lines are not available. The cells were characterized in-house with retinal specific cell markers by ICC and RT-PCR, which showed only cone-specific mRNAs/proteins but not their rod counterparts were found, suggesting that this neoplasm was of cone cell lineage. In addition, RS1 was reported to be expressed and released by WERI-Rb1 cells. We also detected RS1 expression at mRNA level and protein levels (data not shown). Lipid nanoparticles (LNPs) were formulated with one of six guide RNAs targeting intron 1 of the human RS1 and Cas9 mRNA (sequence set forth in SEQ ID NO: 6245).

TABLE 5

Human RS1 Guide RNAs.

| gRNA | Guide RNA Target Sequence (5' to 3') | Direction | SEQ ID NO |
|---|---|---|---|
| hG1 | CTGTATCTTCTTAGCCAGTA | + | 57 |
| hG2 | CCCTTTTGTACGTTTTTTAA | + | 56 |
| hG3 | AAAAAAGGACTTGACATGCA | + | 65 |
| hG4 | AGAGCTTTGGCCGAGGACGA | + | 1210 |
| hG5 | TCTAGGACTTCTTCGCATCG | - | 1203 |
| hG6 | AGTCTGAGGCTGGGGCAACT | - | 581 |

Figure 8A:
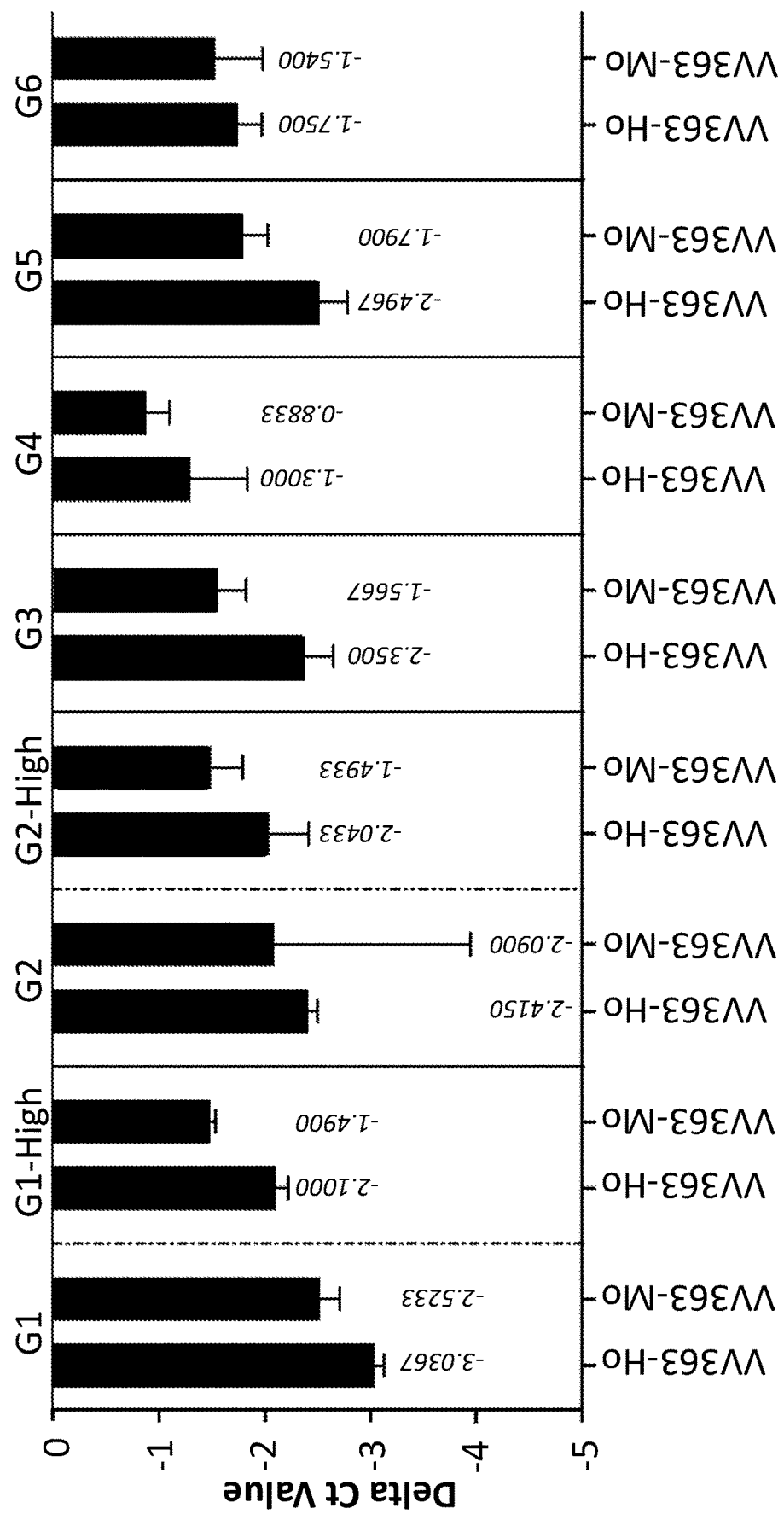
FIGS. 8A and 8B show RT-qPCR results from human retinoblastoma cells treated with RS1 viral vector version 1 (pssAAV mhRS1-sgu.
Figure 8B:
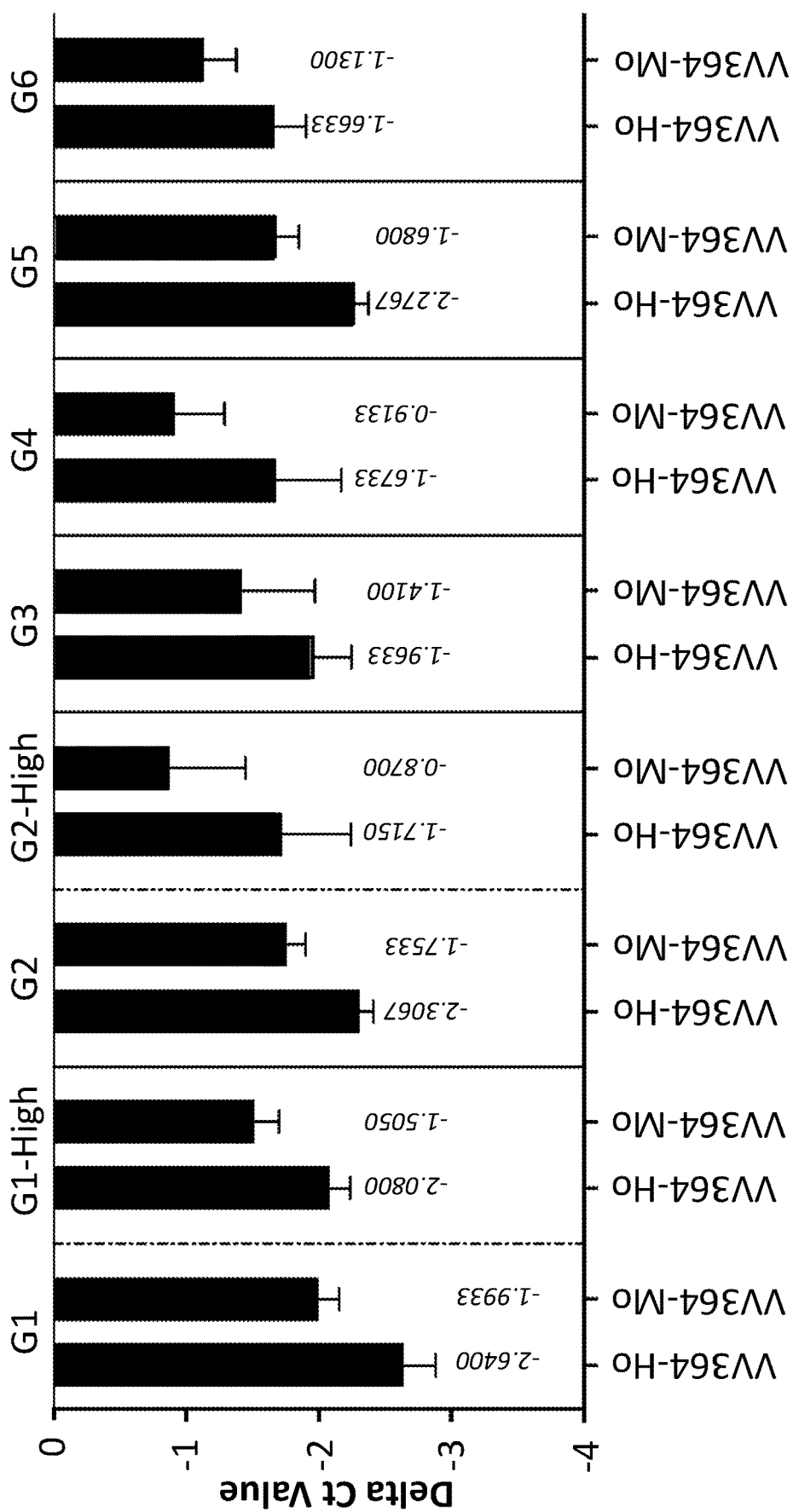
Figure 9A:
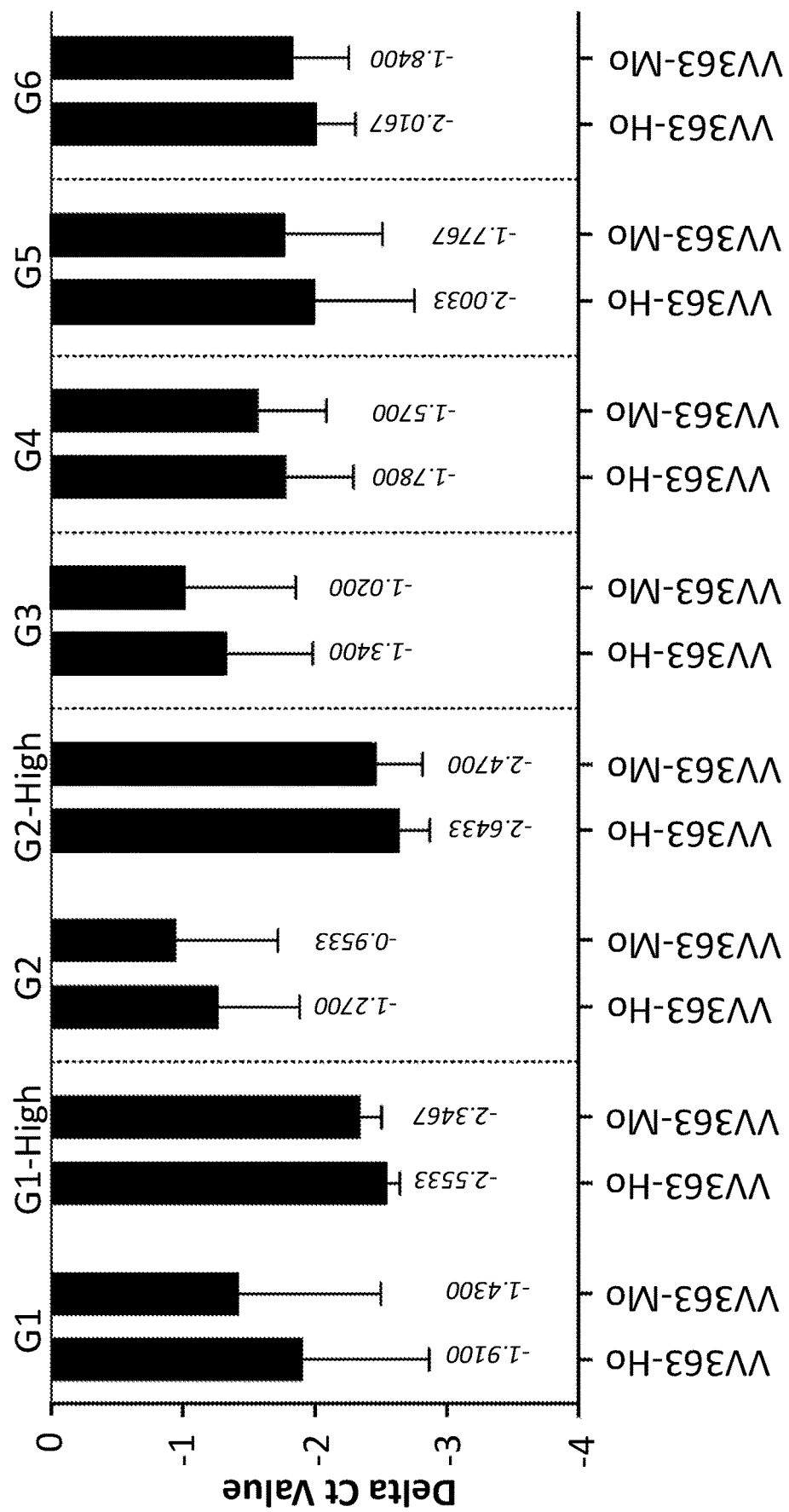
FIGS. 9A and 9B show RT-qPCR results from human retinoblastoma cells treated with RS1 viral vector version 1 (pssAAV mhRS1-sgu.
Figure 9B:
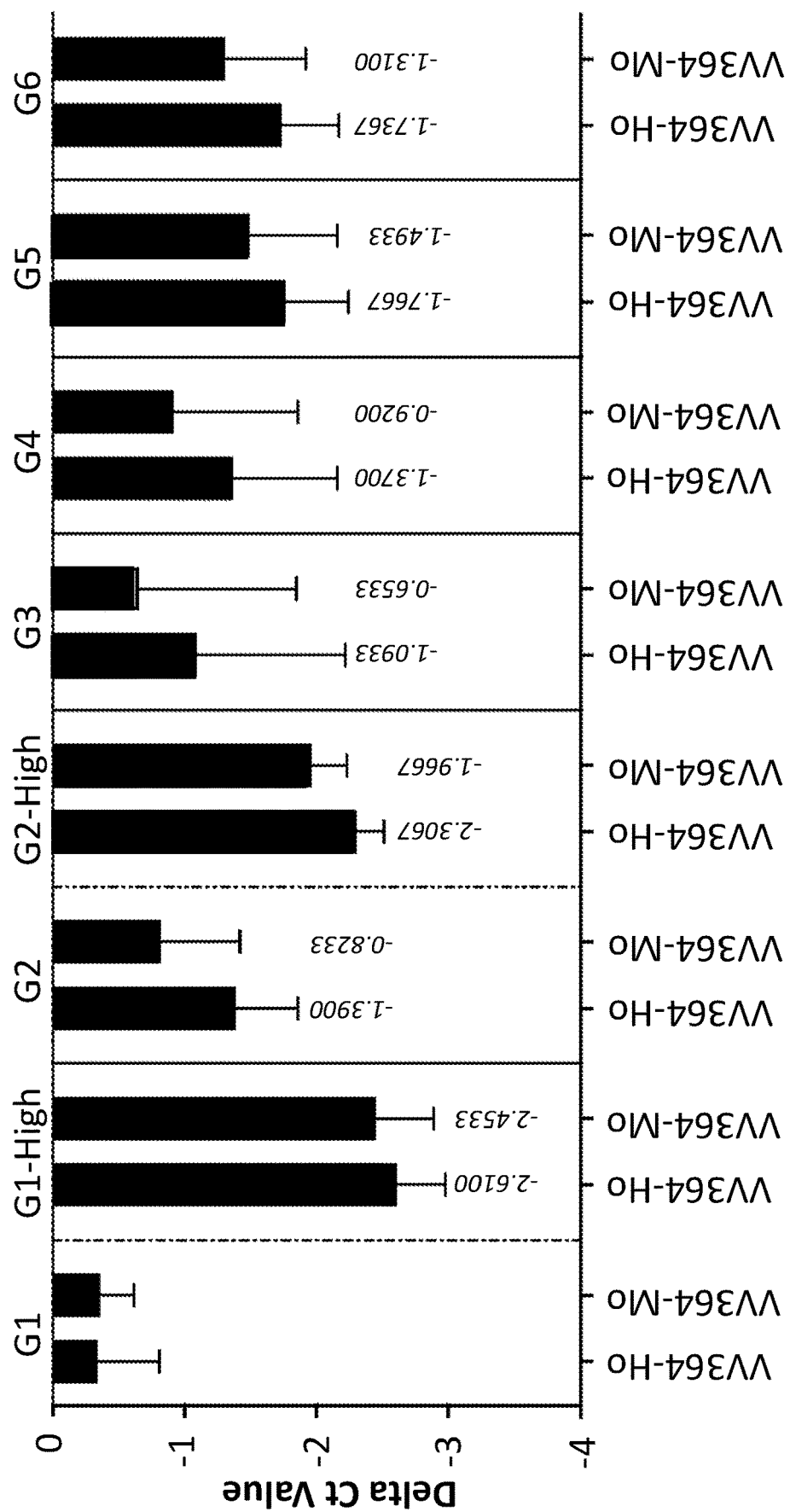

In a first experiment, human retinoblastoma cells in suspension were transduced with approximately 5e5 MOI of AAV donor (viral vector versions 1 and 2 from Example 1), and CRISPR/Cas9 LNPs were administered 2 hours post-infection. All LNPs were dosed at 500 ng per well (48-well plate), except the "high" samples, which were dosed at 1000 ng LNP. Complete gene expression analysis by RT-qPCR was then done. RT-qPCR was performed by harvesting the total RNA from samples and treating them with DNAse to degrade all DNA contained in the samples. Next, the RNA samples were subjected to reverse transcription to create cDNA for all mRNA contained in the sample. Target specific TaqMan assays were then used to quantify the unique RS1 sequences expressed in the cells. RNA was harvested 72 hours post-infection. A no reverse transcription control was completed by harvesting the total RNA and DNAase treating as above. For the control, the reverse transcription polymerase was replaced with water such that no cDNA should be generated. Reverse transcribed and control non-reverse transcribed samples were run with a housekeeping gene (DROSHA). Results for viral vector version 1 (bidirectional insertion in a single stranded AAV (ssAAV) vector) are shown in FIG. 8A. Results for viral vector version 1 (bidirectional insertion in a self-complimentary AAV (scAAV) vector) are shown in FIG. 8B. These results are shown as delta Ct in order to normalize differences in RNA quantity and quality. The lower the number, the higher the expression of the target sequence. These results indicate robust expression of the introduced sequences. TaqMan assays and viral sequences were optimized to reduce cross-detection of the endogenous human RS1 expression. In a second experiment, human retinoblastoma cells in suspension were transduced with approximately 5e5 MOI of AAV donor (viral vector versions 1 and 2 from Example 1), and CRISPR/Cas9 LNPs were administered 2 hours prior to infection. All LNPs were dosed at 500 ng per well (48-well plate), except the "high" samples, which were dosed at 1000 ng LNP. Complete gene expression analysis by RT-qPCR was then done. Results for viral vector version 1 (bidirectional insertion in a single stranded AAV (ssAAV) vector) are shown in FIG. 9A. Results for viral vector version 1 (bidirectional insertion in a self-complimentary AAV (scAAV) vector) are shown in FIG. 9B. These results are shown as delta Ct in order to normalize differences in RNA quantity and quality. The lower the number, the higher the expression of the target sequence. These results indicate robust expression of the introduced sequences. TaqMan assays and viral sequences were optimized to reduce cross-detection of the endogenous human RS1 expression.

Example 3. Insertion of RS1 Coding Sequence into Mouse Rs1 Locus in XLRS Mouse Model Via Homologous Recombination In order to model potential X-linked juvenile retinoschisis therapy (XLRS) CRISPR therapeutics strategies in vivo, we use the mouse line described in Example 1 with constitutive expression of Cas9 protein in all tissues crossed to mice containing a mutant copy of murine retinoschisin (Rs1) (Rosa$^{Cas9}$/+; Rs1$^{R141C/Y}$ mice). CRISPR/Cas9 is used in combination with adeno-associated virus (AAV) to rescue the non-secreting R141C variant of Rs1 in mice. The constructs are designed to be integrated into the endogenous Rs1 locus in the retina (e.g., photoreceptors) via homologous recombination, where the hybrid mouse-human RS1 transcript will be expressed through the endogenous Rs1 promoter. The mice are at the age of P14 when the retina is still undergoing mitosis, cellular differentiation, and maturation. Injection is during mitosis of the retina, and the evaluation is post-mitosis at 2 months post-injection.

Figure 10:
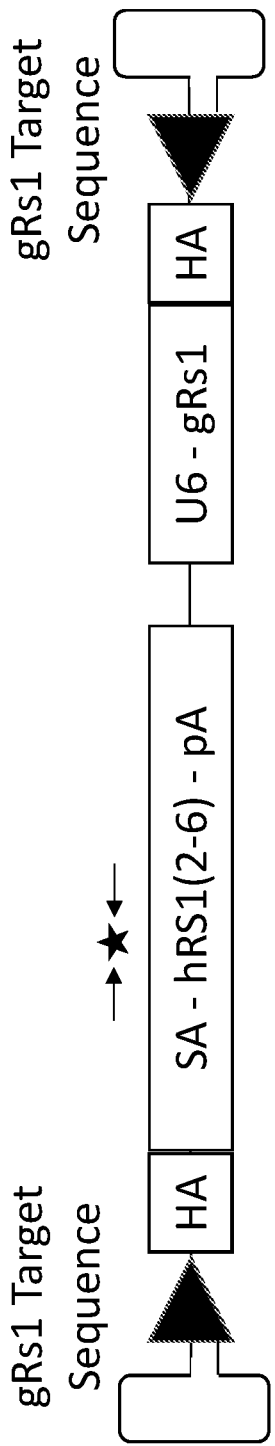
FIG. 10 shows a schematic for a nucleic acid construct for homologous recombination comprising a splice acceptor (A), exons 2-6 of human RS1, and a polyA sequence. The construct also comprises a U6 promoter operably linked to a sequence encoding a guide RNA targeting intron 1 of the murine Rs1 locus downstream of the human RS1 segment. The construct also comprises upstream and downstream homology arms (HA). The horizontal arrows flanking the star represent the next generation targeted resequencing amplicons designed for NGS.

Three viral vectors were designed encoding WT human RS1 exons 2-6 (without a promoter) as well as a guide RNA targeting mouse Rs1 intron 1 (guide RNA target sequence set forth in SEQ ID NO: 2887), with all of these elements flanked by homology arms. See FIG. 10. These elements are flanked by an inverted guide RNA target sequence on each side. Once the viral genome is double-stranded, it will express one guide RNA sequence that simultaneously causes a double-strand break in mouse Rs1 intron 1 as well as on both sides of the viral genome, effectively cleaving off the ITR sequences. The homology arms in the first viral vector are approximately 1800 bp each, the homology arms in the second viral vector are approximately 900 bp each, and the homology arms in the third viral vector are approximately 450 bp each. The sequences for the three vectors are set forth in SEQ ID NOS: 6247-6249, respectively. Upon injection of any one of these viruses into the eye of RosaCas9/+; Rs1R141C/Y mice, guide RNA expression leads to cutting at the Rs1 locus and homologous recombination with the viral genome containing the human RS1 cDNA fragment. The mouse Rs1 locus is shown in FIG. 1. Mouse exon 1 splices into human exon 2-6 cDNA (FIG. 2), and expression of the hybrid mouse human protein prevents transcription of mutant mouse Rs1.

Retinas are harvested and cut in half. Half of each retina is used for non-homologous end joining (NHEJ) characterization at the intron 1 of mouse Rs1 locus. The other half is used to generate cDNA for NGS amplicon sequencing over the mutant region. NHEJ characterization provides information on guide RNA activity as well as insertion activity. Detection of NHEJ implies an allele without gene insertion that will likely express the mutant mouse transcript. Detection of the inserted transcript indicates that gene insertion has occurred.

Retinal organization is assessed by optical coherence tomography (OCT) imaging. Scoring of retinal cavities in OCT scans is conducted based on the following preset criteria by three independent readers. A score of 1 is assigned if there are 1-4 cavities on at least one individual image. A score of 2 is assigned if there are ≥4 cavities on at least one individual image, but the cavities are not fused. A score of 3 is assigned if there are fused cavities on at least one individual image. A score of 4 is assigned if there are fused cavities on at least one individual image and the retina is stretched. The average scores for each treatment group are compared with a control group containing the pooled non-treated eyes by nonparametric Kruskal-Wallis one-way analysis of variance and Post hoc test Dunn's multiple comparisons test.

Mouse retinas are harvested from study mice, and total mRNA is extracted from the tissues. mRNA is used to generate cDNA to act as a template for next generation sequencing (NGS) amplification. Target-specific oligos with incorporated barcodes for sequence identification are used to amplify all variants per tissue. The PCR products from each mouse are normalized and pooled into a single tube for further preparation. The finalized library is loaded on to a MiSeq, and the 2×300 program is used to sequence samples. Informatic codes are then used to deconvolute the samples and create a de novo sequence reference. The number of reads that match each variant are quantified, and the percentage is obtained by dividing the variant read count by the total read count.

Example 4. Insertion of RS1 Coding Sequence into Human RS1 Locus in Human Retinoblastoma Cells Via Homologous Recombination We next test insertion of RS1 coding sequence into the human RS1 locus via homologous recombination in human retinoblastoma cells in vitro. Lipid nanoparticles (LNPs) are formulated with guide RNAs targeting intron 1 of the human RS1 and Cas9 mRNA. In a first experiment, human retinoblastoma cells in suspension are transduced with approximately 5e5 MOI of AAV donor (viral vectors from Example 3, but with human RS1 homology arms), and CRISPR/Cas9 LNPs are administered 2 hours post-infection. All LNPs are dosed at 500 ng per well or 1000 ng per well. Complete gene expression analysis by RT-qPCR is then done. In a second experiment, human retinoblastoma cells in suspension are transduced with approximately 5e5 MOI of AAV donor (viral vectors from Example 3, but with human RS1 homology arms), and CRISPR/Cas9 LNPs were administered 2 hours prior to infection. All LNPs were dosed at 500 ng per well or 1000 ng per well. Complete gene expression analysis by RT-qPCR is then done.

---

SEQUENCE LISTING

The patent contains a lengthy sequence listing. A copy of the sequence listing is available in electronic form from the USPTO web site (https://seqdata.uspto.gov/docdetail?docId=US12521451B2). An electronic copy of the sequence listing will also be available from the USPTO upon request and payment of the fee set forth in 37 CFR 1.19(b)(3).

We claim:

1. A method of expressing retinoschisin or integrating a coding sequence for a retinoschisin protein or functional fragment thereof into a target genomic locus in a retinal cell, comprising administering to the retinal cell a composition or combination comprising:
   (a) a nucleic acid construct comprising the coding sequence for the retinoschisin protein or functional fragment thereof for integration into the target genomic locus, wherein the coding sequence comprises exons 2-6 of human RS1 or encodes the same protein encoded by exons 2-6 of human RS1,
   wherein the nucleic acid construct does not comprise a promoter that drives expression of the retinoschisin protein or functional fragment thereof, and wherein:
      (I) the nucleic acid construct comprises a polyadenylation signal sequence located 3' of the coding sequence, and
      (II) the nucleic acid construct comprises a splice acceptor site located 5' of the coding sequence; and
   (b) a nuclease agent comprising a Cas protein or a nucleic acid encoding the Cas protein and a guide RNA or a DNA encoding the guide RNA, wherein the nuclease agent targets a nuclease target sequence in the target genomic locus,
   wherein the target genomic locus is in an endogenous RS1 locus comprising an endogenous RS1 gene,
   wherein integration of the nucleic acid construct into the endogenous RS1 locus prevents transcription of the endogenous RS1 gene downstream of the integration site,
   wherein the integration of the nucleic acid construct into the endogenous RS1 locus in the retinal cell reduces or eliminates expression of endogenous retinoschisin protein and replaces it with expression of the retinoschisin protein or functional fragment thereof encoded by the nucleic acid construct, and
   wherein (a) and (b) are administered simultaneously or sequentially, in any order.

2. The method of claim 1, wherein the splice acceptor site is from intron 1 of human RS1.

3. The method of claim 1, wherein the nucleic acid construct is for homology-independent targeted integration into the target genomic locus, wherein the nucleic acid construct comprises the coding sequence for the retinoschisin protein or functional fragment thereof flanked on each side by a nuclease target sequence for a nuclease agent.

4. The method of claim 3, wherein:
   (I) the nuclease target sequence in the target genomic locus is identical to the nuclease target sequence in the nucleic acid construct, and the nuclease target sequence in the target genomic locus is destroyed if the nucleic acid construct is inserted into the target genomic locus in the correct orientation but is reformed if the nucleic acid construct is inserted into the target genomic locus in the opposite orientation; or
   (II) the coding sequence for the retinoschisin protein or functional fragment thereof comprises complementary DNA (cDNA) comprising exons 2-6 of human RS1 or encoding the same protein encoded by exons 2-6 of human RS1,
      the nuclease target sequence in the target genomic locus is identical to the nuclease target sequence in the nucleic acid construct, and
      the nuclease target sequence in the target genomic locus is destroyed if the nucleic acid construct is inserted into the target genomic locus in the correct orientation but is reformed if the nucleic acid construct is inserted into the target genomic locus in the opposite orientation.

5. The method of claim 1, wherein the nucleic acid construct is for homologous recombination with the target genomic locus, wherein the nucleic acid construct comprises the coding sequence for the retinoschisin protein or functional fragment thereof flanked by homology arms on each side.

6. The method of claim 5, wherein the coding sequence and homology arms are further flanked on each side by a nuclease target sequence for a nuclease agent.

7. The method of claim 5, wherein each homology arm is between about 25 nucleotides and about 2.5 kb in length.

8. The method of claim 5, wherein the retinoschisin protein or functional fragment thereof is a human retinoschisin protein or functional fragment thereof, the coding sequence for the retinoschisin protein or functional fragment thereof comprises complementary DNA (cDNA) comprising exons 2-6 of human RS1 or encoding the same protein encoded by exons 2-6 of human RS1, and each homology arm is between about 25 nucleotides and about 2.5 kb in length.

9. The method of claim 1, wherein the nucleic acid construct is bidirectional and comprises:
   (a) a first segment comprising a first coding sequence for a first retinoschisin protein or functional fragment thereof, wherein the first coding sequence comprises exons 2-6 of human RS1 or encodes the same protein encoded by exons 2-6 of human RS1; and
   (b) a second segment comprising a reverse complement of a second coding sequence for a second retinoschisin protein or functional fragment thereof, wherein the second coding sequence comprises exons 2-6 of human RS1 or encodes the same protein encoded by exons 2-6 of human RS1.

10. The method of claim 9, wherein:
   (I) the nucleic acid construct does not comprise a homology arm; or
   (II) the first retinoschisin protein or functional fragment thereof is identical to the second retinoschisin protein or functional fragment thereof, and the second coding sequence adopts a different codon usage from the codon usage of the first coding sequence; or
   (III) the second segment is located 3' of the first segment, both the first retinoschisin protein or functional fragment thereof and the second retinoschisin protein or functional fragment thereof are a human retinoschisin protein or functional fragment thereof,
      the first retinoschisin protein or functional fragment thereof is identical to the second retinoschisin protein or functional fragment thereof,
      both the first coding sequence and the second coding sequence comprise complementary DNA (cDNA) comprising exons 2-6 of human RS1 or encoding the same protein encoded by exons 2-6 of human RS1,
      the second coding sequence adopts a different codon usage from the codon usage of the first coding sequence,
      the first segment comprises a first polyadenylation signal sequence located 3' of the first coding sequence, and the second segment comprises a reverse complement of a second polyadenylation signal sequence located 5' of the reverse complement of the second coding sequence,
      the first segment comprises a first splice acceptor site located 5' of the first coding sequence, and the second segment comprises a reverse complement of a second splice acceptor site located 3' of the reverse complement of the second coding sequence, the nucleic acid construct does not comprise a promoter that drives expression of the first retinoschisin protein or functional fragment thereof or the second retinoschisin protein or functional fragment thereof, and the nucleic acid construct does not comprise a homology arm.

11. The method of claim 1, wherein the nuclease target sequence in the target genomic locus is in the first intron in the endogenous RS1 gene at the endogenous RS1 locus.

12. The method of claim 1, wherein the nucleic acid construct is in an adeno-associated virus (AAV) viral vector.

13. The method of claim 12, wherein the AAV is selected from the group consisting of: AAV2; AAV5; AAV8; and AAV7m8.

14. The method of claim 1, wherein the Cas protein is a Cas9 protein.

15. The method of claim 14, wherein:
(I) the composition or combination comprises a DNA encoding the Cas9 protein, and wherein the composition or combination comprises the DNA encoding the guide RNA; or
(II) the composition or combination comprises a messenger RNA encoding the Cas9 protein, wherein the composition or combination comprises the guide RNA in the form of RNA.

16. The method of claim 15, wherein:
(I) the DNA encoding the Cas9 protein and the DNA encoding the guide RNA are in one or more viral vectors; or
(II) the guide RNA and the messenger RNA encoding the Cas9 protein are in a lipid nanoparticle.

17. The method of claim 1, wherein the endogenous RS1 locus comprises a mutated RS1 gene comprising a mutation that causes X-linked juvenile retinoschisis.

18. The method of claim 1, wherein the retinal cell is a human retinal cell.

19. The method of claim 1, wherein the retinal cell is in vivo in an animal.

* * * * *